US012221364B2

(12) United States Patent
Kamen et al.

(10) Patent No.: US 12,221,364 B2
(45) Date of Patent: Feb. 11, 2025

(54) SYSTEMS, METHODS, AND APPARATUSES FOR PRODUCING AND PACKAGING FLUIDS

(71) Applicant: DEKA Products Limited Partnership, Manchester, NH (US)

(72) Inventors: Dean Kamen, Bedford, NH (US); Hans Erik Johnson, Tewksbury, MA (US); Thaddeus Joseph Hughes, Manchester, NH (US); Michael J. Haynes, Manchester, NH (US); Margaret Bayne Bradley, Manchester, NH (US); Robert Houston Lawler, Jr., Manchester, NH (US); Gregory Hurley, Windham, NH (US); Keller Waldron, Manchester, NH (US); Jeremy Shane Dube, Alton Bay, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 742 days.

(21) Appl. No.: 17/032,795

(22) Filed: Sep. 25, 2020

(65) Prior Publication Data

US 2021/0155507 A1 May 27, 2021

Related U.S. Application Data

(60) Provisional application No. 62/939,862, filed on Nov. 25, 2019, provisional application No. 62/939,855,
(Continued)

(51) Int. Cl.
*C02F 1/44* (2023.01)
*B65B 3/26* (2006.01)
(Continued)

(52) U.S. Cl.
CPC ................ *C02F 1/441* (2013.01); *B65B 3/26* (2013.01); *B65B 31/024* (2013.01); *B65B 43/14* (2013.01);
(Continued)

(58) Field of Classification Search
CPC ........... B65B 3/003; B65B 3/26; B65B 31/02; B65B 31/024; B65B 43/14; B65B 51/10;
(Continued)

(56) References Cited

U.S. PATENT DOCUMENTS 3,327,709 A 6/1967 Nehring et al.
3,509,879 A 5/1970 Bathish et al.
(Continued)

FOREIGN PATENT DOCUMENTS

CN 101128177 A 2/2008
CN 100453308 C 1/2009
(Continued)

OTHER PUBLICATIONS

Communications Relating to the Results of the Partial International Search and Provisional Opinion on Patentability mailed Jan. 11, 2022 received in international patent application PCT/US2021/052012 from European Patent Office as International Searching Authority, European Patent Office, P.B. 5818 Patentlaan 2 NL—2280 HV Rijswijk (9 pgs).
(Continued)

*Primary Examiner* — Terry K Cecil
(74) *Attorney, Agent, or Firm* — Toohey Law Group, LLC; Kevin D. Mandro

(57) ABSTRACT

A system for producing and packaging fluid may comprise a water distillation device. The system may further comprise a mixing circuit coupled to an output of the water distillation device and including a source of concentrate. The mixing circuit may include a plurality of flow controllers configured
(Continued)

to adjust the flow of fluid through the mixing circuit so as to generate a preset fluid. The system may further comprise an enclosure including an antechamber and a packaging compartment. The system may further comprise a reservoir dispenser in the packaging compartment having a feed plate and a housing block. The reservoir dispenser may include a bias member which urges the feed plate toward the housing block. The system may further comprise a filling station in the packaging compartment including a filling nozzle coupled to the mixing circuit. The system may further comprise a sealing station in the packaging compartment having a ram and a sealing member dispenser. The system may further comprise a quarantine repository in the packaging compartment having a plurality of reservoir holders. The system may further comprise a labeler in the packaging compartment. The system may further comprise an output chute from the packaging compartment to an exterior of the enclosure.

33 Claims, 165 Drawing Sheets

Related U.S. Application Data filed on Nov. 25, 2019, provisional application No. 62/939,870, filed on Nov. 25, 2019.

(51) Int. Cl.
*B65B 31/02* (2006.01)
*B65B 43/14* (2006.01)

(52) U.S. Cl.
CPC ...... *C02F 2209/40* (2013.01); *C02F 2307/10* (2013.01)

(58) Field of Classification Search
CPC ... B65B 57/00; B65B 7/02; B65B 7/28; C02F 1/441; C02F 2209/40; C02F 2307/10
See application file for complete search history.

(56) References Cited

U.S. PATENT DOCUMENTS

| | | | | |
|---|---|---|---|---|
| 4,120,134 | A | 10/1978 | Scholle | |
| 4,303,067 | A | 12/1981 | Connolly et al. | |
| 4,417,607 | A | 11/1983 | Scholle et al. | |
| 4,495,067 | A * | 1/1985 | Klein | A61K 9/0019 210/257.2 |
| 4,610,790 | A | 9/1986 | Reti | |
| 4,694,959 | A | 9/1987 | Ausnit | |
| 4,754,786 | A | 7/1988 | Roberts | |
| 4,964,261 | A | 10/1990 | Benn | |
| 5,129,212 | A | 7/1992 | Duffey et al. | |
| 5,341,854 | A | 8/1994 | Zezulka et al. | |
| 5,881,535 | A | 3/1999 | Gliniecki | |
| 5,976,300 | A | 11/1999 | Buchanan et al. | |
| 6,070,622 | A | 6/2000 | Rutter | |
| 6,391,623 | B1 | 5/2002 | Besemer et al. | |
| 7,163,035 | B2 | 1/2007 | Khan et al. | |
| 7,610,115 | B2 | 10/2009 | Rob et al. | |
| 7,912,579 | B2 * | 3/2011 | Stettes | G07F 13/065 700/231 |
| 8,151,835 | B2 | 4/2012 | Khan et al. | |
| 8,518,252 | B1 | 8/2013 | Li | |
| 8,741,155 | B2 * | 6/2014 | Coulter | C02F 1/008 210/85 |
| 9,173,816 | B2 | 11/2015 | Reinhardt et al. | |
| 9,750,863 | B2 * | 9/2017 | Minkus | A61M 1/1686 |
| 9,830,485 | B1 | 11/2017 | Lecky | |
| 2005/0171501 | A1 | 8/2005 | Kelly | |
| 2007/0119121 | A1 | 5/2007 | Woods et al. | |
| 2008/0051937 | A1 | 2/2008 | Khan et al. | |
| 2011/0017570 | A1 | 1/2011 | Graf | |
| 2012/0312415 | A1 | 12/2012 | Gay et al. | |
| 2013/0343857 | A1 | 12/2013 | Yoshikane et al. | |
| 2015/0360865 | A1 | 12/2015 | Massey | |
| 2017/0319770 | A1 | 11/2017 | Fitzgerald et al. | |
| 2018/0044047 | A1 | 2/2018 | Fianchini et al. | |
| 2019/0002136 | A1 | 1/2019 | Bomgaars et al. | |
| 2021/0171371 | A1 | 6/2021 | Foss et al. | |
| 2022/0160582 | A1 | 5/2022 | Wood et al. | |

FOREIGN PATENT DOCUMENTS

| | | | |
|---|---|---|---|
| CN | 108473218 | A | 8/2018 |
| DE | 29515682 | U1 | 12/1995 |
| EP | 3090721 | A1 | 11/2016 |
| FR | 2590231 | A1 | 1/1988 |
| WO | WO 1998038091 | | 9/1998 |
| WO | WO2018130944 | A1 | 7/2018 |

OTHER PUBLICATIONS

International Search Report and Written Opinion dated Feb. 12, 2021 eceived in counterpart international patent application PCT/US2020/052774 from European Patent Office as International Searching Authority, European Patent Office, P.B. 5818 Patentlaan 2 NL—2280 HV Rijswijk (15 pgs).

United States Pharmacopoeia <1231> Water for Pharmaceutical Purposes , webpage: <http://www.uspbpep.com/usp29/v29240/usp29nf24s0_c1231.html>, retrieved Apr. 27, 2021.

* cited by examiner

SYSTEMS, METHODS, AND APPARATUSES FOR PRODUCING AND PACKAGING FLUIDS

CROSS-REFERENCE TO RELATED APPLICATIONS

The present application claims the benefit of U.S. Provisional Application Ser. No. 62/939,855, entitled Systems, Methods, and Apparatuses for Producing and Packaging Fluids, filed Nov. 25, 2019, and claims the benefit of U.S. Provisional Application Ser. No. 62/939,870, entitled Fluid Reservoirs and Related Methods, filed Nov. 25, 2019, and also claims the benefit of U.S. Provisional Application Ser. No. 62/939,862, entitled Systems, Methods, and Apparatuses for Producing and Packaging Fluids, filed Nov. 25, 2019.

STATEMENT REGARDING FEDERALLY SPONSORED RESEARCH OR DEVELOPMENT

This invention was made with Government support under Agreement HHSO100201900017C, awarded by HHS. The Government has certain rights in the invention.

BACKGROUND

Field of Disclosure

This disclosure relates to medical fluids. More specifically, this disclosure relates to the generation and packaging of medical fluids.

Description of Related Art

Almost every hospitalized patient is administered saline or a saline based solution. As a result, the quantity of saline solution consumed is very large. More than a billion bags of saline are used per year in the US alone. Despite the demand, there are only a small number of different saline manufactures which provide this solution for the US market. Unfortunately, manufacturing challenges which limit production from one manufacturer can and do cause shortages of saline in the United States. Compounding the issue, these manufactures have uneven market share in regards to all bagged saline products. For instance, 50% of 250 ml or smaller saline bags are provided by a single manufacture. As a result, when such a manufacturer faces production problems, the impact on the availability of that particular type of bag is much greater.

Most recently, the media spotlight has been shown on delays caused in the wake of hurricane Maria which have led to a shortage of small volume saline bags. According to the American Society of Health-System Pharmacists, shortages for large volume bags and bags of saline for irrigation purposes also currently exist. An alternative means of producing medical fluid bags which may perhaps be locatable in the institution using the bag would be desirable.

SUMMARY

In accordance with an embodiment of the present disclosure, a sealing member dispenser may comprise a dispenser body including at least one trough configured to receive a plurality of sealing members and an exit port extending from the trough to an exterior face of the dispenser body. The exit port may have a guide portion adjacent the exterior face of the dispenser body. The sealing member dispenser may further comprise a blocking element that obstructs passage of a sealing member through the exit port. The sealing member dispenser may further comprise a cover coupled to the dispenser body and overhanging the trough. The cover may include an orifice in line with the exit port. The orifice may present an opening which is too smaller for a sealing member of the plurality of sealing members to pass therethrough.

In some embodiments, the trough may extend along a spiral path. In some embodiments, the dispenser body may be a drum. In some embodiments, the guide portion may include a funneling contour. In some embodiments, the guide portion may be a chamfered edge. In some embodiments, the guide portion may be a filleted edge. In some embodiments, the blocking element may be displaceable. In some embodiments, the blocking element may be an outlet cover which is coupled to a handle. Displacement of the handle may result in displacement of the outlet cover out of an obstructing position. In some embodiments, the blocking element may include a detent member which protrudes into the exit port. In some embodiments, the detent member may be a ball detent. In some embodiments, the sealing member dispenser may further comprise a follower and a bias member coupled to the follower and a portion of the dispenser body. In some embodiments, the bias member may be a constant force spring. In some embodiments, the dispenser body may further comprise a receiving slit sized to accept a follower. In some embodiments, sealing member dispenser may further comprise a magnetic body. In some embodiments, the sealing member dispenser may further comprise a rotor which is coupled to a shaft and a bias assembly configured to exert a biasing force against the shaft with urges the shaft to rotate. In some embodiments, the sealing member dispenser may include a rotor which is coupled to a shaft. In some embodiments, the sealing member dispenser may include a rotor drive assembly configured to automatically index the rotor until a sealing member is displaced along the trough to the exit point. In some embodiments, the rotational displacement for indexing the rotor may vary as the sealing member dispenser is depleted of sealing members.

In accordance with another embodiment of the present disclosure a reservoir feeding apparatus may comprise a housing block including at least one channel extending therethrough. The reservoir feeding apparatus may further comprise a set of retention pins associated with each of the at least one channel. The reservoir feeding apparatus may further comprise a set of guides associated with each of the at least one channel. There may be a slot defined between the guides of each set of guides. The reservoir feeding apparatus may further comprise a feed plate coupled to the housing block by at least one bias member. The feed plate may include at least one follower projection. The reservoir feeding apparatus may further comprise an elongate member extending from the housing block through the feed plate. The bias member may urge displacement of the feed plate along the elongate member toward a stop face of the housing block. The bias member may also be configured to urge the follower projection into contact with a port of a reservoir disposed within the guide.

In some embodiments, each retention pin may be biased by a retention pin bias member into an extended state in which the retention pin extends into the channel it is associated with. In some embodiments, the retention pins of each set of retention pins may be disposed on opposing sides of the channel which the set of retention pins is associated with. In some embodiments, each retention pin may be biased by a retention pin bias member into an extended state and the ends of the retention pins of a set of retention pins are spaced from one another a distance less than the diameter of the port of the reservoir when in the extended state. In some embodiments, each retention pin may be configured to be displaced out of an obstructing position upon introduction of a grasper to collect a reservoir from the reservoir feeder. In some embodiments, the bias member may be a constant force spring. In some embodiments, a length of the follower projection is at least equal to a distance from the stop face to the retention pins. In some embodiments, the reservoir feeding apparatus may further comprise a feed plate retainer for holding the feed plate in a loading orientation. The feed plate retainer may be coupled to the housing block via at least one standoff. In some embodiments, the feed plate retainer may comprise a spring biased latch member. In some embodiments, the feed plate retainer may include a magnet and the feed plate includes a metallic body.

In accordance with another embodiment of the present disclosure, a reservoir feeding apparatus may comprise a housing block including at least one channel extending therethrough. The reservoir feeding apparatus may further comprise a set of retention pins associated with each of the at least one channel. The reservoir feeding apparatus may further comprise A reservoir magazine coupled to the housing block. The reservoir feeding apparatus may further comprise a feed plate coupled to the housing block by at least one bias member. The feed plate may include at least one follower projection. The reservoir feeding apparatus may further comprise an elongate member extending from the housing block through the feed plate. The bias member may urge displacement of the feed plate along the elongate member toward a stop face of the housing block. The bias member may also urge displacement of the follower projection through the reservoir magazine toward the housing block.

In some embodiments, each retention pin may be biased by a retention pin bias member into an extended state in which the retention pin extends into the channel it is associated with. In some embodiments, the retention pins of each set of retention pins may be disposed on opposing sides of the channel which the set of retention pins is associated with. In some embodiments, each retention pin may be biased by a retention pin bias member into an extended state and the ends of the retention pins of a set of retention pins are spaced from one another a distance less than the diameter of a port of a reservoir when in the extended state. In some embodiments, each retention pin may be configured to be displaced out of an obstructing position upon introduction of a grasper to collect a reservoir from the reservoir feeder. In some embodiments, the bias member may be a constant force spring. In some embodiments, a length of the follower projection may be at least equal to a distance from the stop face to the retention pins. In some embodiments, the reservoir feeding apparatus may further comprise a feed plate retainer for holding the feed plate in a loading orientation. The feed plate retainer may be coupled to the housing block via at least one standoff. In some embodiments, the feed plate retainer may comprise a spring biased latch member. In some embodiments, the feed plate retainer may include a magnet and the feed plate may include a metallic body.

In accordance with another embodiment of the present disclosure a bag sealing apparatus comprise a ram displaceable along a displacement axis by a ram actuator. The bag sealing apparatus may further comprise a sealing member dispenser receptacle for receiving a sealing member dispenser. The bag sealing apparatus may further comprise a sealing member dispenser sensor configured to output a first signal indicative of the presence of a sealing member dispenser within the receptacle. The bag sealing apparatus may further comprise a reservoir guide including a first portion and a second portion having a gap therebetween. The reservoir guide guiding a port of a reservoir into alignment with the displacement axis when a reservoir is disposed within the gap. At least one of the first and second portion of the reservoir guide may include a grasper docking face.

In some embodiments, the bag sealing apparatus may be a stoppering apparatus. In some embodiments, the sealing member receptacle may be disposed intermediate the ram and the reservoir guide. In some embodiments, the sealing member dispenser sensor may be a magnetic sensor. In some embodiments, the sealing member dispenser sensor is a Hall effect sensor. In some embodiments, the bag sealing apparatus may further comprise a reservoir detection sensor configured to output a second signal indicative of the presence of a reservoir in the reservoir guide. In some embodiments, the bag sealing apparatus may further comprise a controller. The controller may be configured to prevent actuation by the ram actuator in the absence of at least one of the first and second signal. In some embodiments, the bag sealing apparatus may further comprise an optical port detection sensor configured to output a second signal indicative of the presence of a port in alignment with the axis of displacement based on an intensity of reflection of light emitted from the sensor. In some embodiments, the bag sealing apparatus may further comprise a controller configured to prevent actuation by the ram actuator in the absence of the first signal.

In accordance with an embodiment of the present disclosure an apparatus for packaging fluid may comprise a fill conduit dispenser having a reel portion containing a length of fill conduit. The apparatus may further comprise a feeder assembly including an actuator coupled to a at least one feeding member/The apparatus may further comprise a tubing retainer having a first portion coupled to a sled and a cam follower. The tubing retainer may have a second portion coupled to a base plate. The tubing retainer may include receptacles for a segment of the fill conduit and a port of a bag. The apparatus may further comprise a sled actuator. The apparatus may further comprise an occluder assembly having an occluder actuator which is coupled to a carriage mounted to an occluder. The apparatus may further comprise a cutter assembly including a cutter actuator coupled to a cutting element and a cam surface. The cam surface and cutting element may be configured to displace in unison with one another. The apparatus may further comprise a guide coupled to the first portion of the tubing retainer, the occluder assembly, and the cutter assembly. The apparatus may further comprise a bias member urging the cam follower against the cam surface. The apparatus may further comprise a controller configured to government operation of the sled actuator, the occluder actuator, and the cutter actuator to occluder, cut, and join the segment of the fill conduit and port.

In some embodiments, the first and second portion of the tubing retainer may be separated by a first gap. In some embodiments, the occluder may comprise a first occluder portion and a second occluder portion separated by a second gap. In some embodiments, the first and second gap are disposed in the same plane and the first and second gap are sized to accept the cutting element therein. In some embodiments, the occluder comprises a first occluder portion and second occluder portion, the first occluder portion mounted on a rail and rotatable with respect to the carriage. In some embodiments, the occluder may comprise a first occluder portion coupled to the first retainer portion by a first pin and the occluder may comprise a second occluder portion coupled to the second retainer portion by a second pin. In some embodiments, the occluder may comprise a first and second occluder portion. The first occluder portion may be mounted on a rail and coupled to the first retainer portion by a pin linking the first occluder portion and first retainer portion such that actuation of the sled by the sled actuator results in displacement of the first occluder portion along the rail. In some embodiments, displacement of the cam follower along the cam surface may alter the size of the gap. In some embodiments, the cam surface may be shaped such that the gap is largest when the cutting element is disposed within the gap and the gap decreases as the cutting element is withdrawn. In some embodiments, the occluder may comprise a first portion and a second portion. The first portion may be rotatable with respect to the carriage and coupled to the first retainer portion via a linkage. The bias member may couple the first portion of the occluder to the carriage. In some embodiments, the cutting element may include a metal plate and a coating. In some embodiments, the coating may be ceramic. In some embodiments, the cutter assembly may include at least one heating element. In some embodiments, the apparatus may further comprise a tube sealing assembly having opposed jaws each having a heating element and a low thermal conductivity cutting insert therein. The tube sealing assembly may have a sealing actuator configured to displace the jaws toward and away from each other. In some embodiments, the controller may be configured to govern operation of the sealing actuator to displace the jaws against the port for a period of time, the jaws heating the port until the cutting inserts press though the port. In some embodiments, the apparatus may further comprise a counterweight coupled to the sled. The counterweight may be configured to hold the cam follower against the cam surface.

In accordance with another embodiment of the present disclosure, a reservoir filling set may comprise a carrier including a plurality of compartments. The reservoir filling set may further comprise a plurality of packets each housing a flexible reservoir which is attached to an administration set and a filling line. The reservoir filling set may further comprise an adapter including a plurality of retainer recesses each having an end of one of the filling lines disposed therein. The retainer recesses may constrain the ends of the filling lines to extend straight along an axes of the retainer recesses. The reservoir filling set may further comprise a plurality of sealing members. A sealing member of the plurality of sealing members may be included in each end of the filling lines.

In some embodiments, the administration set may include at least one occluding member associated therewith. The occluding member may be in an occluding state in which flow through at least a portion of the administration set is inhibited. In some embodiments, the occluding member may be a roller clamp. In some embodiments, the occluding member may be a slide clamp. In some embodiments, the occluding member may be a thumb clamp. In some embodiments, the carrier may include a handle. In some embodiments, each packet may include a pocket in which the flexible reservoir is disposed and a flap which in a closed position retains the administration set within the packet. In some embodiments, the flexible reservoir housed by each packet may be an IV bag. In some embodiments, the plurality of sealing members may be septa. In some embodiments, the retainer recesses may be spaced at preset angular increments from one another. The angular increments may be selected so as to align with spikes in a spike port of a filling apparatus.

In accordance with another embodiment of the present disclosure a system for packaging fluid may comprise a fluid source. The system may further comprise a spike port including a plurality of spikes. The system may further comprise an in line heater. The system may further comprise at least one pump. The system may further comprise a plurality of valves. The system may further comprise a controller configured to, in a first mode power the heater to heat fluid to a predefined temperature set point and govern operation of the at least one pump and plurality of valves to recirculate fluid through the spike port for a predetermine period of time to disinfect the spike port, and in second mode govern operation of the at least one pump and plurality of valves to route fluid from the source to the spikes of the spike port.

In some embodiments, the spike port may include a recess in which the spikes are disposed and includes a recirculation port. In some embodiments, the spike port may be configured to accept a spiking adapter having a number of fluid lines included in retaining recess of the spiking adapter. The spikes of the spike port may be spaced so as to align with the retaining recesses of the spiking adapter. In some embodiments, the spike port may include at least one alignment guide configured to cooperate with an alignment element of the spiking adapter. In some embodiments, the system further may comprise a passive manifold which furcates fluid input from a common point to each of the spikes of the spike port. In some embodiments, the spike port may include a cap and a gasket against which the cap sealed when the cap is in a closed orientation. In some embodiments, the predefined temperature set point may be at least 70° C.

In accordance with another embodiment of the present disclosure a method of filling a reservoir may comprise creating a junction between a filling conduit and a port of the reservoir by heating the filling conduit and port, cutting the filling conduit and port, bringing the filling conduit into coaxial alignment with the port and bonding a cut end of the port to a cut end of the filling conduit. The method may further comprise delivering fluid through the filling conduit past the junction and into the reservoir via the port. The method may further comprise actuating jaws against a portion of the port and heating the jaws until a non-thermally conductive insert in each jaw is pressed through the port.

In some embodiments, cutting the filling conduit and port may comprise driving a heated blade into a gap in a retainer in which the filling conduit and port are disposed. In some embodiments, bringing the filling conduit into coaxial alignment with the port may comprise actuating a sled to displace a movable portion of the retainer relative to a stationary portion of the retainer such that the cut ends of the port and filling conduit are slid across opposing surfaces of the heated blade. In some embodiments, bonding the cut end of the port to the cut end of the filling conduit may comprise biasing the movable portion of the retainer toward the stationary portion of the retainer and displacing a cam surface relative to a cam follower coupled to the movable portion of the retainer in unison with the heated blade as the heated blade is retracted away from the retainer. In some embodiments, the method may further comprise actuating the sled along a path orthogonal generally parallel to the plane of the junction. In some embodiments, the method may further comprise forming a seal in the port which isolates an aliquot of liquid within the port from fluid in the reservoir. In some embodiments, the reservoir may be bag.

In accordance with another embodiment of the present disclosure a method of filling a reservoir may comprise creating a junction between a filling conduit and a port of the reservoir by cutting the filling conduit and port with a heated cutting element, sliding cut ends of the port and filling conduit across opposing surfaces of the cutting element to position the filling conduit into coaxial alignment with the port and bonding a cut end of the port to a cut end of the filling conduit as the cutting element is withdrawn. The method may further comprise delivering fluid through the filling conduit past the junction and into the reservoir via the port. The method may further comprise actuating jaws against a portion of the port and heating the jaws until a non-thermally conductive insert in each jaw is pressed through the port.

In some embodiments, cutting the filling conduit and port may comprise driving the cutting element into a gap in a retainer in which the filling conduit and port are disposed. In some embodiments, bringing the filling conduit into coaxial alignment with the port may comprise actuating a sled to displace a movable portion of the retainer relative to a stationary portion of the retainer. In some embodiments, bonding the cut end of the port to the cut end of the filling conduit may comprise biasing the movable portion of the retainer toward the stationary portion of the retainer and displacing a cam surface relative to a cam follower coupled to the movable portion of the retainer in unison with the cutting element as the cutting element is withdrawn from the retainer. In some embodiments, the method may further comprise actuating the sled along a path generally parallel to the plane of the junction. In some embodiments, the method may further comprise forming a seal in the port which isolates an aliquot of liquid within the port from fluid in the reservoir. In some embodiments, the reservoir may be a bag. In some embodiments, the method may further comprise sensing, with at least one sensor, the presence of at least one of the fill conduit and port in a tubing retainer.

In accordance with another embodiment of the present disclosure a system for producing and packaging fluid may comprise a water distillation device. The system may further comprise a mixing circuit coupled to an output of the water distillation device and including a source of concentrate. The mixing circuit may include a plurality of flow controllers configured to adjust the flow of fluid through the mixing circuit so as to generate a preset fluid. The system may further comprise an enclosure including an antechamber and a packaging compartment. The system may further comprise a reservoir dispenser in the packaging compartment having a feed plate and a housing block. The reservoir dispenser may include a bias member which urges the feed plate toward the housing block. The system may further comprise a filling station in the packaging compartment including a filling nozzle coupled to the mixing circuit. The system may further comprise a sealing station in the packaging compartment having a ram and a sealing member dispenser. The system may further comprise a quarantine repository in the packaging compartment having a plurality of reservoir holders. The system may further comprise a labeler in the packaging compartment. The system may further comprise an output chute from the packaging compartment to an exterior of the enclosure.

In some embodiments, the system may further comprise at least one of a reverse osmosis unit and ultrafilter. In some embodiments, the concentrate source may be a reservoir of crystalline concentrate having a purified water inlet and a fluid concentrate outlet. In some embodiments, the concentrate source may include a crystalline constituent dispenser. In some embodiments, the antechamber may include a flexible sterile barrier. In some embodiments, the flexible sterile barrier may include at least one gloved interface. In some embodiments, the antechamber and packaging compartment may be separated by a partition. In some embodiments, the partition may include a door having a sample container holder. In some embodiments, the system may further comprise a pyrogen tester. In some embodiments, the system may further comprise a robotic arm including a gripper. In some embodiments, the system may further comprise a control system configured to displace the robotic arm and actuate the gripper to collect a reservoir from the reservoir dispenser, displace the reservoir to the fill station, command filling of the reservoir, displace the reservoir to the sealing station, and command actuation of the ram to drive a sealing member from the sealing member into a port of the reservoir. In some embodiments, the filling station may further comprise a set of reservoir characteristic sensors and the system may further comprise a control system configured to analyze data received from the reservoir characteristic sensors and determine a capacity of a reservoir in place at the filling station. In some embodiments, the control system may be configured to govern operation of the flow controllers based on the capacity of the reservoir determine based on the data from the reservoir characteristic sensors. In some embodiments, the control system may be configured to govern operation of the flow controllers to deliver a volume of a concentrate to the reservoir and a subsequent volume of purified water to the reservoir to achieve a fill volume selected based on the capacity of the reservoir.

In accordance with another embodiment of the present disclosure a system for producing and packaging fluid may comprise a water distillation device. The system may further comprise a mixing circuit coupled to an output of the water distillation device and including a source of concentrate. The mixing circuit may be configured to adjust the flow of fluid through the mixing circuit so as to generate a fluid of a predefined composition. The system may further comprise an enclosure including an antechamber and a packaging compartment. The system may further comprise a reservoir dispenser at least partially in the packaging compartment having a reservoir magazine and an outlet end. The reservoir dispenser may include an actuator configured to drive a follower of the reservoir magazine toward the outlet end of the reservoir dispenser. The system may further comprise a filling station in the packaging compartment including a filling nozzle coupled to the mixing circuit and a reservoir volume sensing assembly. The system may further comprise a sealing station in the packaging compartment. The system may further comprise a repository in the packaging compartment having a plurality of reservoir holders. The system may further comprise a labeler in the packaging compartment. The system may further comprise an output chute from the packaging compartment to an exterior of the enclosure.

In some embodiments, the system may further comprise at least one of a reverse osmosis unit and an ultrafilter. In some embodiments, the concentrate source may be a reservoir of crystalline concentrate having a purified water inlet and a fluid concentrate outlet. In some embodiments, the antechamber may include a flexible sterile barrier. In some embodiments, the flexible sterile barrier may include at least one gloved interface. In some embodiments, the antechamber and packaging compartment may be separated by a partition. In some embodiments, the partition may include a door having a sample container holder. In some embodiments, the system may further comprise a pyrogen tester. In some embodiments, the system may further comprise a robotic arm including a gripper. In some embodiments, the system may further comprise a control system configured to displace the robotic arm and actuate the gripper to collect a reservoir from the reservoir dispenser, displace the reservoir to the fill station, determine a volume of the reservoir via data from the reservoir volume sensing assembly, command filling of the reservoir with a volume of fluid no greater than the volume of the reservoir, displace the reservoir to the sealing station, and command sealing of the reservoir. In some embodiments, the reservoir volume sensing assembly may comprise a set of reservoir characteristic sensors and the system may further comprise a control system configured to analyze data received from the reservoir characteristic sensors and configured to determine a capacity of a reservoir in place at the filling station. In some embodiments, the control system may be configured to govern operation of at least one flow controller based on the capacity of the reservoir determined based on the data from the reservoir characteristic sensors. In some embodiments, the control system may be configured to govern operation of the at least one flow controller to deliver a volume of a concentrate to the reservoir and a subsequent volume of purified water to the reservoir to achieve a fill volume selected based on the capacity of the reservoir.

In accordance with another embodiment of the present disclosure a system for producing and packaging fluid may comprise a water purification device. The system may further comprise a mixing circuit coupled to an output of the water purification device and including a source of concentrate. The mixing circuit may be configured to generate a fluid of a predefined composition. The system may further comprise an enclosure including an antechamber and a packaging compartment. The system may further comprise a reservoir dispenser extending from the antechamber to the packaging compartment and having a reservoir magazine and an outlet end. The reservoir dispenser may include a drive configured to displace a follower of the reservoir magazine toward the outlet end of the reservoir dispenser. The system may further comprise a filling station in the packaging compartment including a filling nozzle coupled to the mixing circuit and a reservoir volume sensing assembly. The system may further comprise a sealing station in the packaging compartment. The system may further comprise at least one reservoir hanger in the packaging compartment. The system may further comprise a labeler in the packaging compartment. The system may further comprise an output chute from the packaging compartment to an exterior of the enclosure.

In some embodiments, the system may further comprise at least one of a reverse osmosis unit and an ultrafilter. In some embodiments, the concentrate source may be a reservoir of a crystalline salt concentrate. In some embodiments, the antechamber may include at least one gloved interface. In some embodiments, the antechamber may include at least one flexible barrier element. In some embodiments, the antechamber and packaging compartment may be separated by a partition including at least one door between the antechamber and the packaging compartment. In some embodiments, the system may further comprise a robotic arm including a gripper. In some embodiments, the system may further comprise a robotic manipulator and a control system configured to displace the robotic manipulator to collect a reservoir from the reservoir dispenser, displace the reservoir to the fill station, determine a volume of the reservoir via data from the reservoir volume sensing assembly, command filling of the reservoir with a volume of fluid no greater than the volume of the reservoir, displace the reservoir to the sealing station, and command sealing of the reservoir. In some embodiments, the reservoir volume sensing assembly may comprise a set of reservoir characteristic sensors. In some embodiments, the control system may be configured to govern operation of at least one flow controller based on a capacity of the reservoir determined based on the data from the reservoir characteristic sensors. In some embodiments, the control system may be configured to govern operation of the at least one flow controller to deliver a volume of a concentrate to the reservoir and a subsequent volume of purified water to the reservoir to achieve a fill volume selected based on a capacity of the reservoir determined based on the data from the reservoir characteristic sensors.

In accordance with another embodiment of the present disclosure a fluid production system for a medical fluid packaging system may comprise a water distillation device. The system may further comprise a plurality of filters including at least one of a reverse osmosis filter and a carbon filter. The system may further comprise a mixing circuit including a purified water flow path and a concentrate flow path including concentrate source. There may be a flow controller and an ultrafilter on each of the purified water flow path and concentrate flow path. The system may further comprise, a sensor suite including a total organic carbon sensor, a bioburden sensor, a particulate monitor, a plurality of ultra pure water conductivity sensors, and a concentrate conductivity sensor. The system may further comprise a controller configured to govern operation of the flow controllers to dispense a predetermined volume of fluid in a first stage and second stage, the first stage delivering fluid at least predominately from the concentrate flow path and the second stage delivering fluid at least predominantly from the purified water flow path, the controller proportioning fluid in the first and second stages based on data from the concentrate conductivity sensor, a predefined desired fluid composition, and the predetermined volume.

In some embodiments, the water distillation device may be a water vapor compression distillation device. In some embodiments, the system further may comprise at least one of: a sediment filter, water softener, and temperature regulator. In some embodiments, the controller may be configured to analyze data from each sensor of the sensor suite and generate an error when the data indicates that the fluid quality characteristic exceeds a threshold. In some embodiments, the concentrate source is a container of crystalline concentrate including a purified water inlet and a concentrated solution outlet. In some embodiments, the concentrate source may include a crystalline constituent dispenser. In some embodiments, the purified water may be water for injection quality water. In some embodiments, the system may further comprise at least one manual sampling port. In some embodiments, the particulate counter may be disposed downstream of the ultrafilters. In some embodiments, the controller may command delivery of fluid exclusively from the concentrate flow path during the first stage. In some embodiments, the controller may command delivery of fluid exclusively from the purified water flow path in the second stage. In some embodiments, the water distillation device may include a condensate reservoir therein. In some embodiments, the water distillation device may be configured to generate purified water in a first temperature range and a second temperature range. In some embodiments, the first temperature range may be below 40° C. and the second temperature range may be above 60° C. In some embodiments, the controller may be configured to govern operation of the flow controllers in a disinfection stage in which the controller governs operation of the flow controllers to route water at a temperature within the second temperature range through the system, to a nozzle, and into a drain.

In accordance with another embodiment of the present disclosure a method of filling a bag with medical fluid may comprise placing a first filling nozzle into a first port of the bag in communication with a first compartment of the and placing a second filling nozzle into a second port of the bag in communication with a second compartment of the bag. The first and second filling nozzle in communication with a fluid source via a common flow channel. The method may further comprise delivering fluid into the first and second compartment of the bag. The method may further comprise halting, with an unpowered valve, delivery of fluid in a smaller of the first and second compartment of the bag upon fully filling that compartment. The method may further comprise halting delivery of fluid into a larger of the first and second compartment of the bag upon fully filling that compartment. The method may further comprise separating the first compartment of the bag from a second compartment of the bag at a perforation in a seal extending between the first and second compartment. The method may further comprise accessing the smaller compartment to collect a sample of fluid for testing.

In some embodiments, the fluid may be a mixture of water for injection and at least one concentrate. In some embodiments, the fluid may be a saline solution. In some embodiments, the method may further comprise performing an endotoxin test on the sample and discarding the larger compartment when the endotoxin test indicates present of endotoxin greater than a predefined level.

In accordance with another embodiment of the present disclosure a bag for containing a medical fluid and a separable sampling aliquot may comprise a first compartment having a first filling port and a delivery port. The bag may further comprise a second compartment having a second filling port. The bag may further comprise a seal separating the first compartment and second compartment. The bag may further comprise a perforation extending along the length of the seal.

In some embodiments, the first compartment may have a capacity which is greater than the second compartment. In some embodiments, the seal may extend along the length of the bag from a first end of the bag to a second end of the bag.

In accordance with an embodiment of the present disclosure a reservoir for holding a fluid may comprise a first and second sheet of material sealed to one another at a peripheral seal to define an interior volume of the reservoir. The reservoir may further comprise at least one port bonded into the peripheral seal and providing a fluid pathway into the interior volume. The reservoir may further comprise an internal seal extending from the peripheral seal. The internal seal may define a sectioned off portion of the interior volume and a main section of the interior volume. The sectioned off portion may be in fluid communication with the main volume via a gap in the internal seal.

In some embodiments, the gap may be configured to be sealed after the reservoir is filled to isolate the sectioned off portion from the main volume. In some embodiments, the at least one port may include a fill port and an administration port. In some embodiments, the sectioned off portion may have a volume capacity smaller than that of the main volume. In some embodiments, each of the at least one port may be in direct fluid communication with the main volume.

In some embodiments, the internal seal may be disposed at an angle which directs fluid toward the at least one port when the reservoir is hung for gravity based administration of fluid contained therein. In some embodiments, the reservoir may be a bag.

In accordance with another embodiment of the present disclosure, a reservoir for holding a fluid may comprise a first and second sheet of material sealed to one another at a peripheral seal to define an interior volume of the reservoir. The reservoir may further comprise at least one port bonded into the peripheral seal and providing a fluid pathway into the interior volume. The peripheral seal may have an enlarged region in which the at least one port is located. The reservoir may further comprise a sampling reservoir defined in the enlarged region. The sampling reservoir may extend from a flow path through the enlarged region which connects a port of the at least one port to the interior volume of the reservoir. In some embodiments, the sampling reservoir may be in communication with the flow path via a branch pathway included in the enlarged region. In some embodiments, the branch pathway may be configured to be sealed after the reservoir is filled so as to isolate the sampling reservoir from the interior volume. In some embodiments, the reservoir is a bag. In some embodiments, the at least one port may include a filling port and an administration port. In some embodiments, the flow path through the enlarged region which is connected to the sampling reservoir connects the filling port to the interior volume.

In accordance with another embodiment of the present disclosure a method of packaging fluid in a reservoir may comprise introducing a filling nozzle into a filling port of the reservoir. The method may further comprise delivering a predefined amount of fluid into the reservoir via the filling nozzle. The method may further comprise removing the filling nozzle. The method may further comprise sealing the port of the reservoir. The method may further comprise forming a seal in the in the reservoir. The seal may create an internal aliquot of fluid within the reservoir that is isolated from the remainder of the reservoir.

In some embodiments, the reservoir may be a bag. In some embodiments, forming the seal comprises sealing a gap within a partial wall included in the reservoir which defines a main interior volume of the reservoir and a sectioned off interior volume of the reservoir. The gap may provide fluid communication between the main volume and sectioned off interior volume when unsealed. In some embodiments, the reservoir may be constructed of a first and section sheet of material which are joined to one another at a peripheral seal which defines an interior volume of the reservoir and forming the seal may comprise sealing closed a section of a flow path defined in an enlarged portion of the peripheral seal. In some embodiments, sealing closed the section of the flow path defined in the enlarged portion of the peripheral seal may isolate a sampling reservoir defined in the enlarged portion of the peripheral seal from the interior volume of the reservoir. In some embodiments, the method may further comprise collecting a sample from the internal aliquot and testing the sample.

In accordance with another embodiment of the present disclosure a filling and sampling nozzle may comprise a first portion including a single lumen. The sampling portion may further comprise a second portion include a filling lumen and a sampling lumen. The filling lumen may be continuous with the single lumen of the first portion. The filling lumen and single lumen may define a continuous flow path from the first portion to an outlet of the nozzle. The sampling lumen may have an opening at the outlet of the nozzle and may be in fluid communication with a sample flow path coupled to a sidewall of the nozzle.

In accordance with another embodiment of the present disclosure a method of packaging fluid in a reservoir may comprise introducing a nozzle into a port of the reservoir. The method may further comprise delivering a first volume of fluid through a continuous flow path extending from first portion of the nozzle through a second portion of the nozzle and into the reservoir. The method may further comprise delivering a second volume of fluid through the continuous flow path into the reservoir. The second volume of fluid may be in excess of the capacity of the reservoir. The method may further comprise directing overflow during delivery of the second volume through a sampling lumen of the nozzle into a sampling conduit coupled to the nozzle.

In some embodiments, the method may further comprise providing the overflow to a sensing assembly. In some embodiments, the method may further comprise providing the overflow to a vial. In some embodiments, the first volume of fluid may be equal to a capacity of the reservoir. In some embodiments, the reservoir may be a bag.

BRIEF DESCRIPTION OF THE DRAWINGS

FIG. 113 depicts a front view of an example packaging assembly;

Figure 114A:
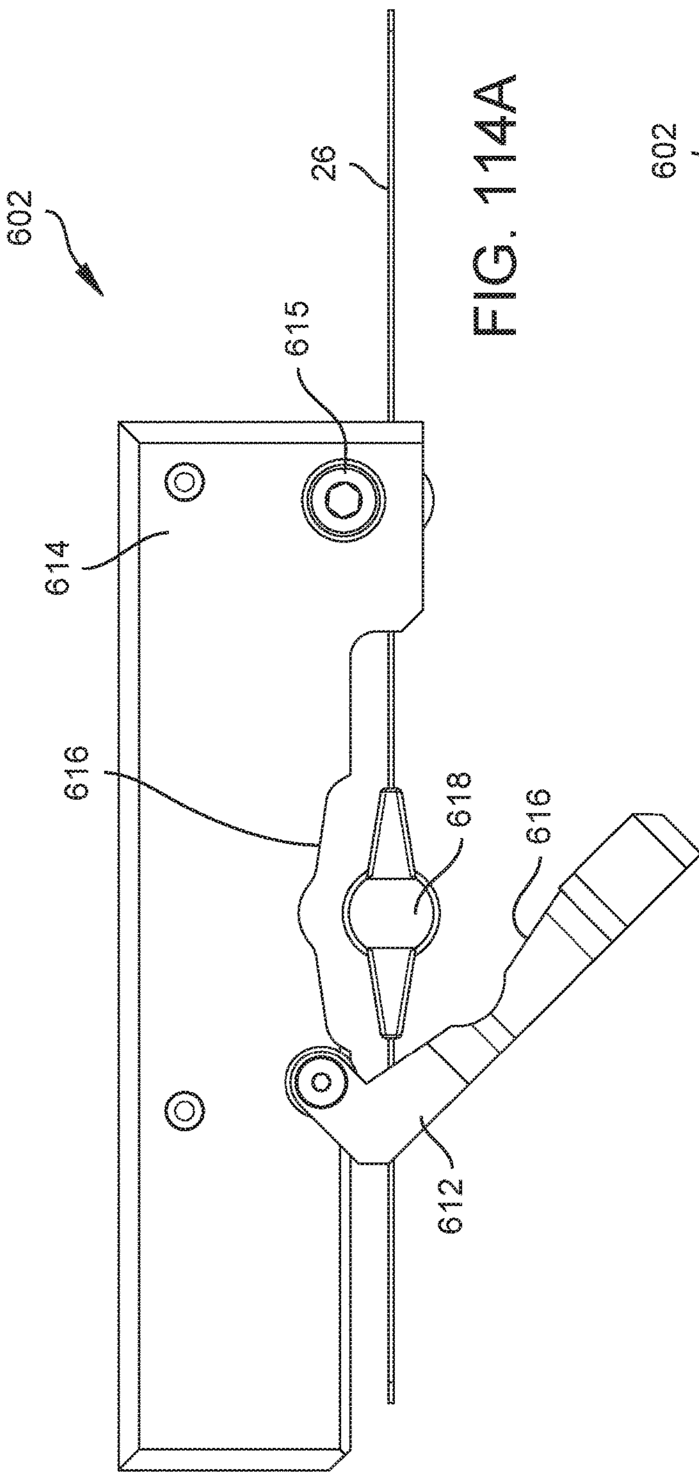
Figure 114B:
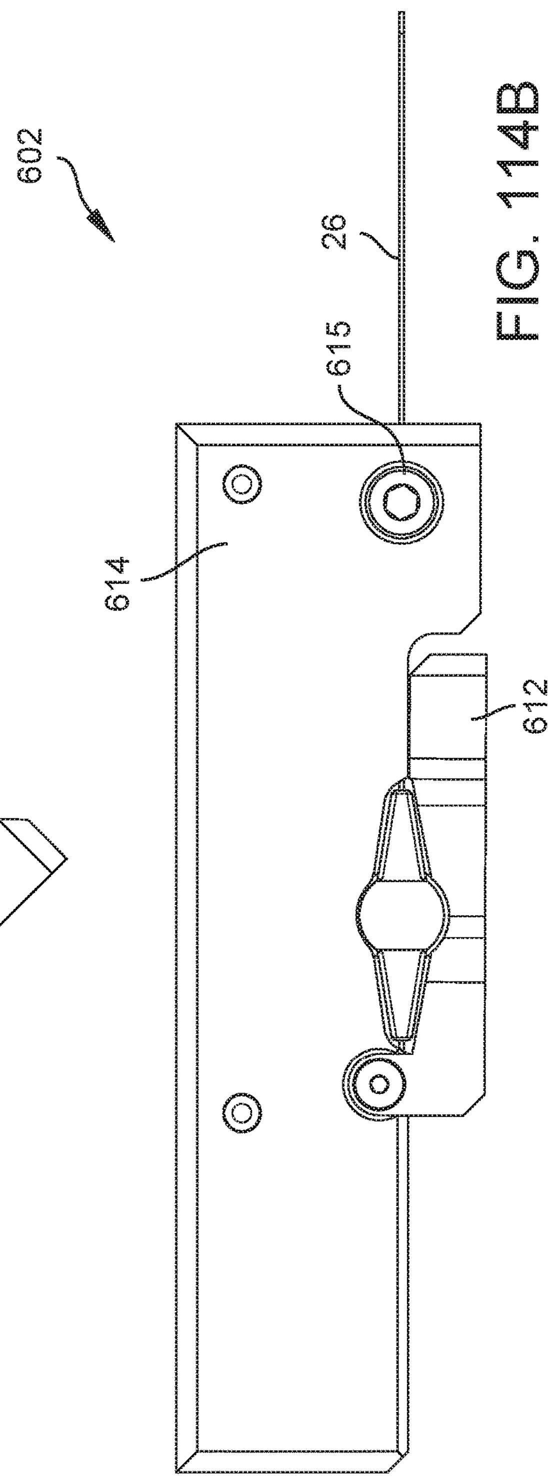
Figure 115:
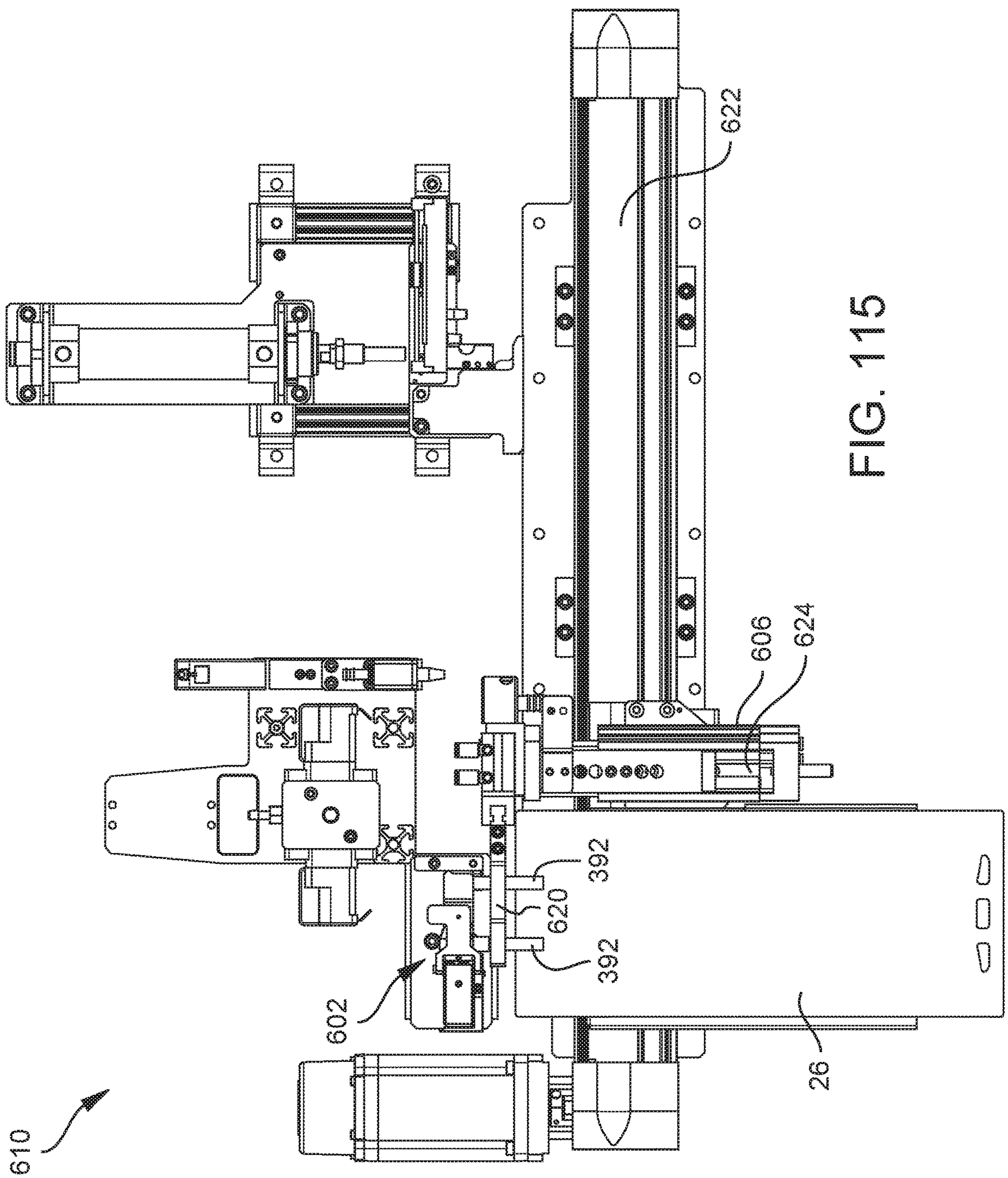
Figure 116:
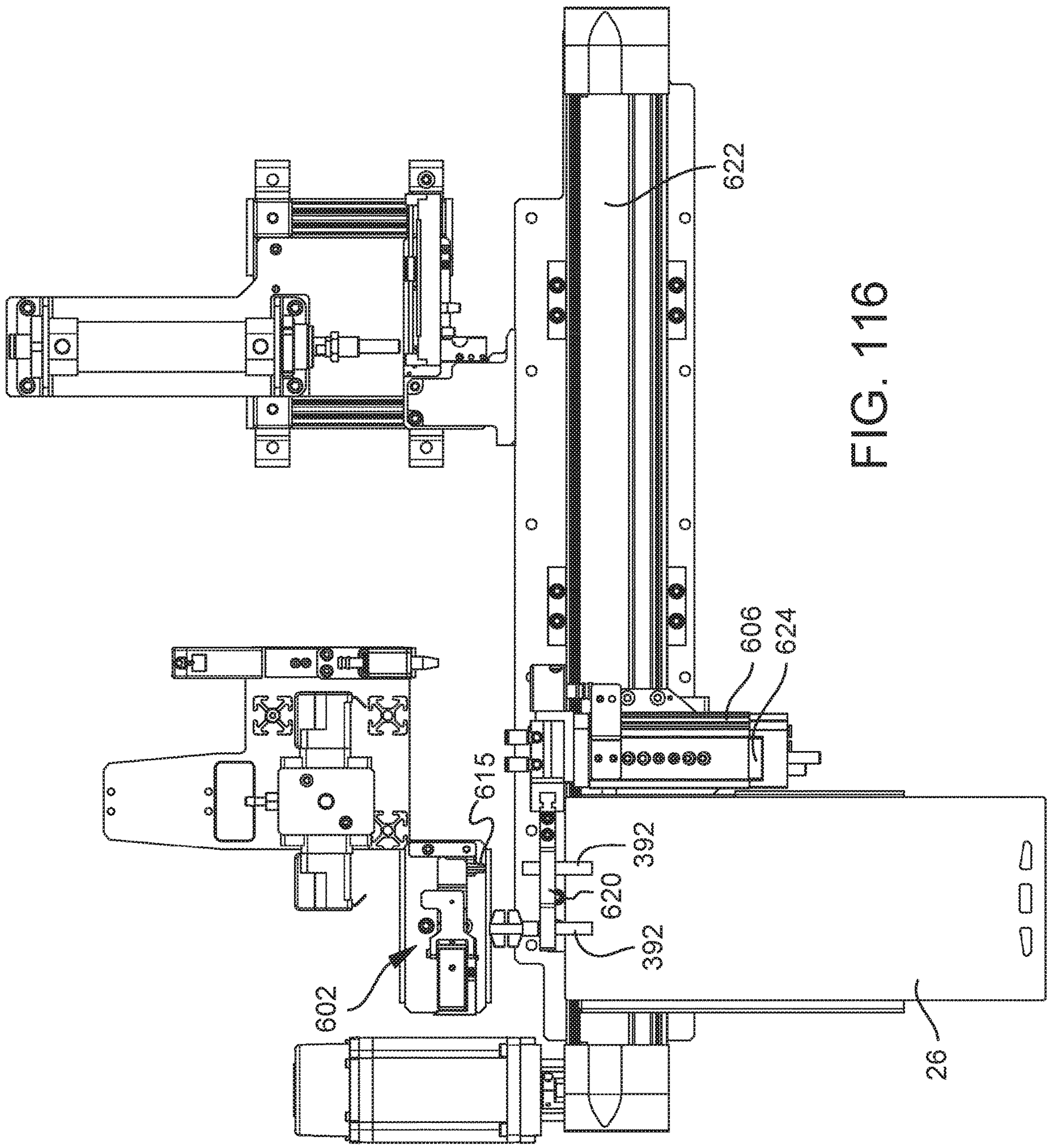
Figure 117:
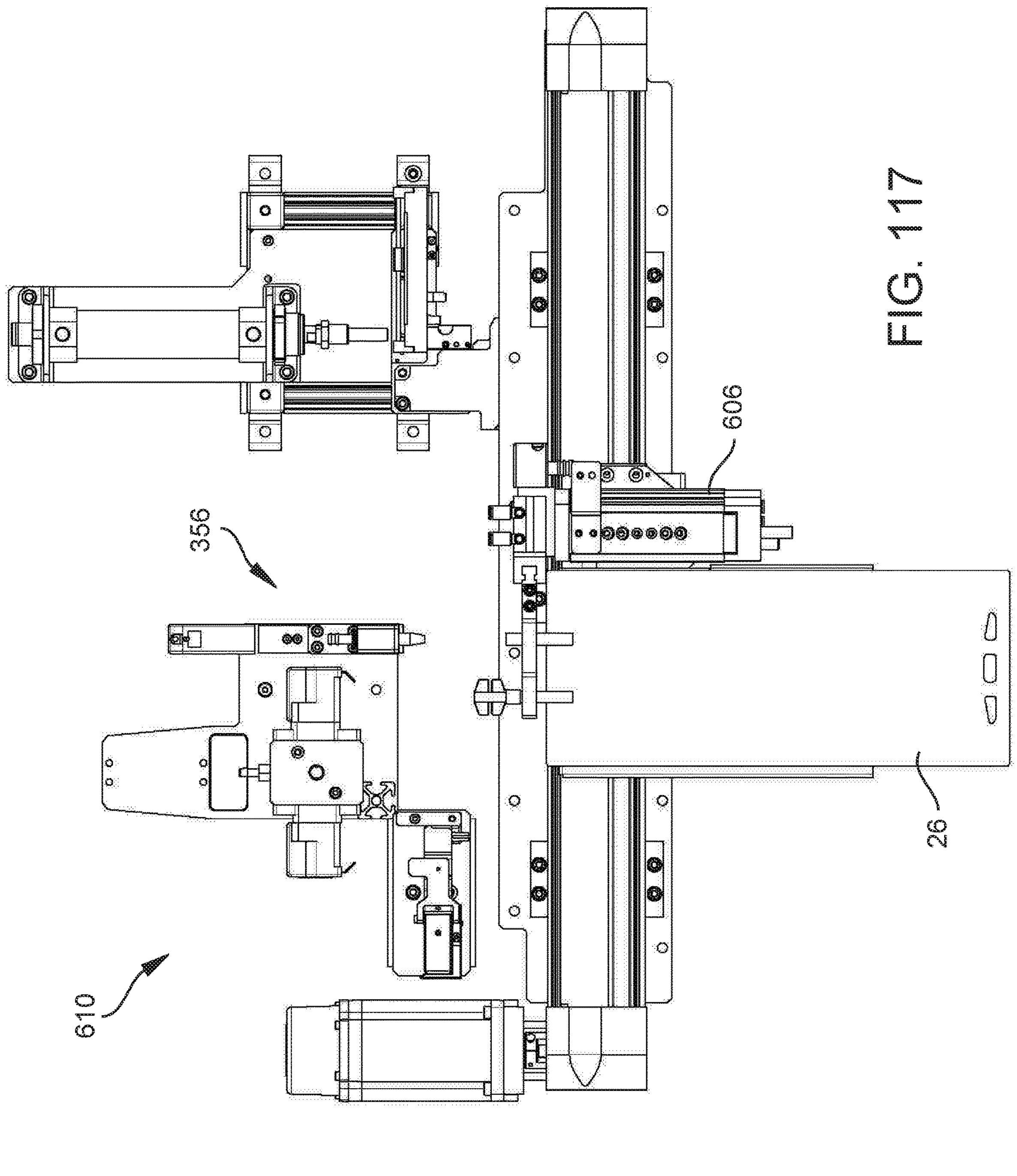
Figure 118A:
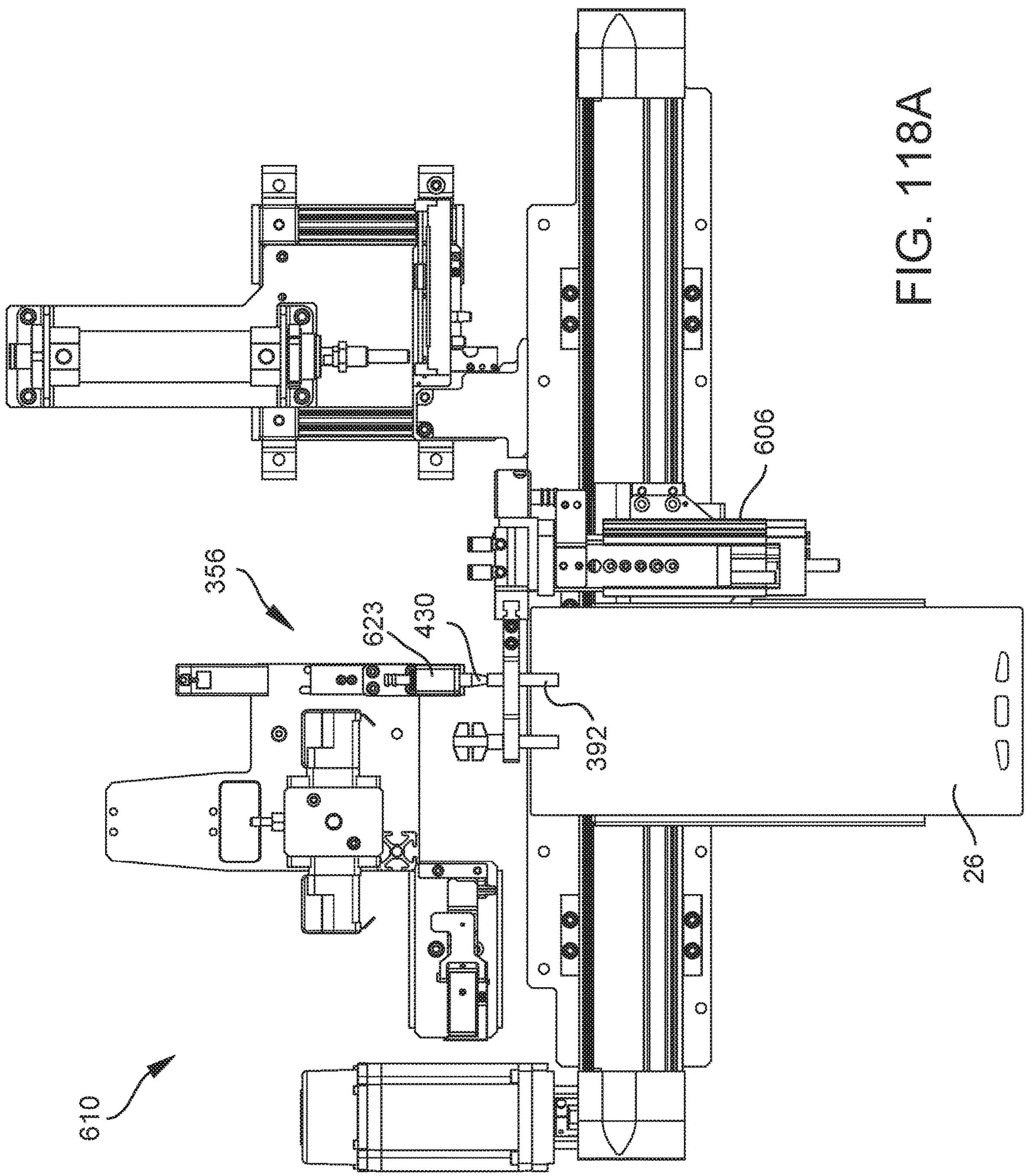
Figure 118B:
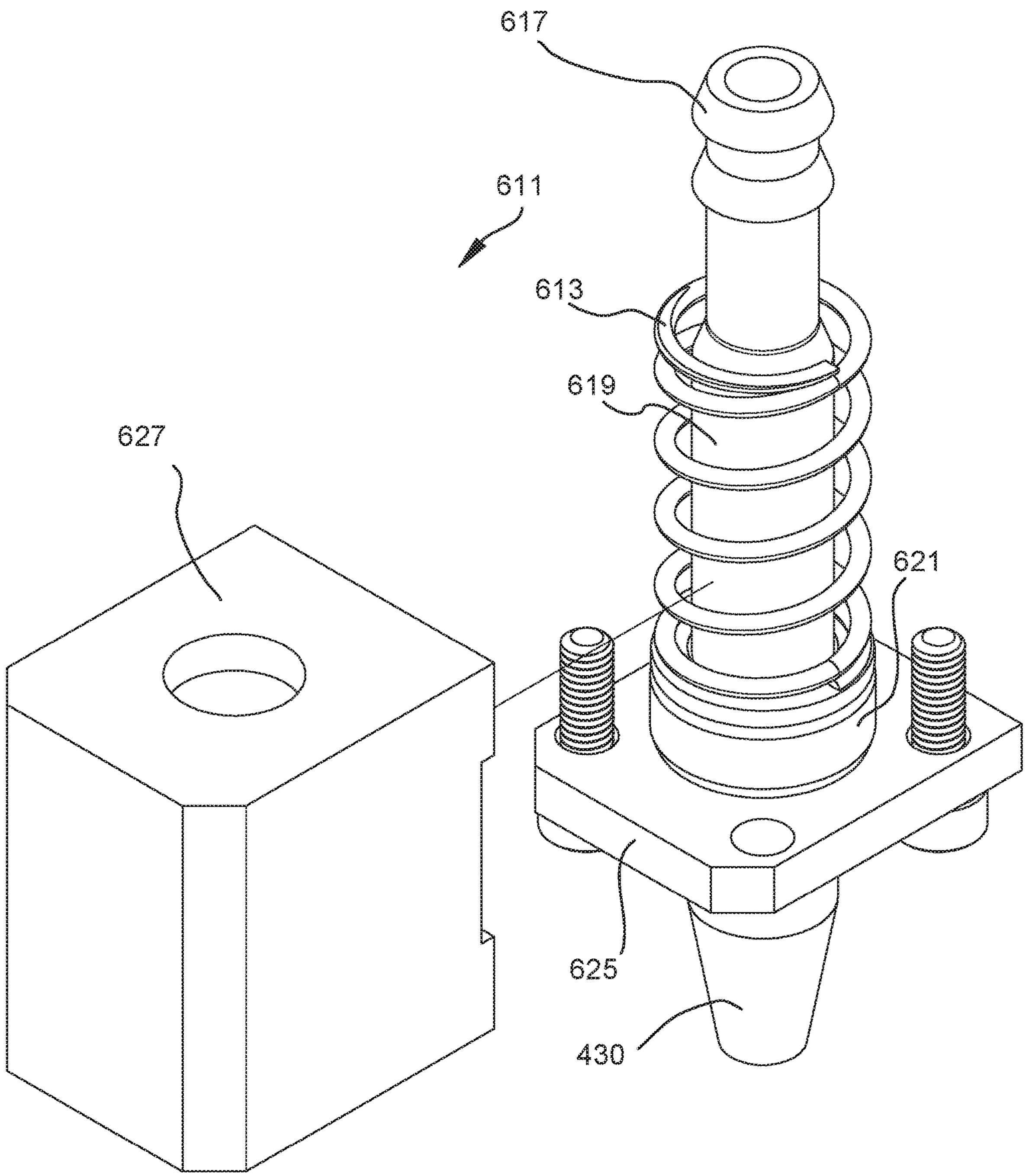
Figure 119:
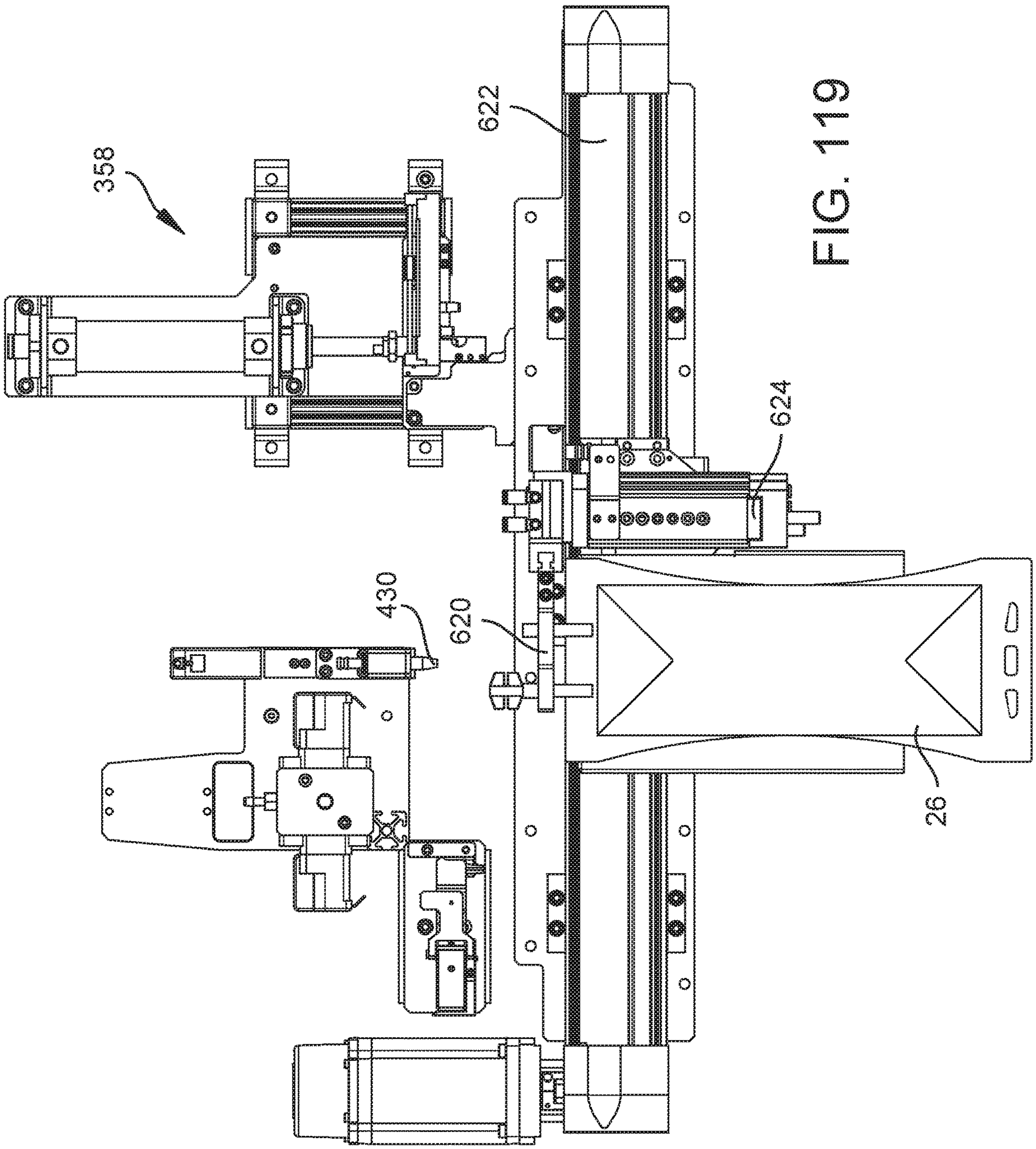
Figure 120:
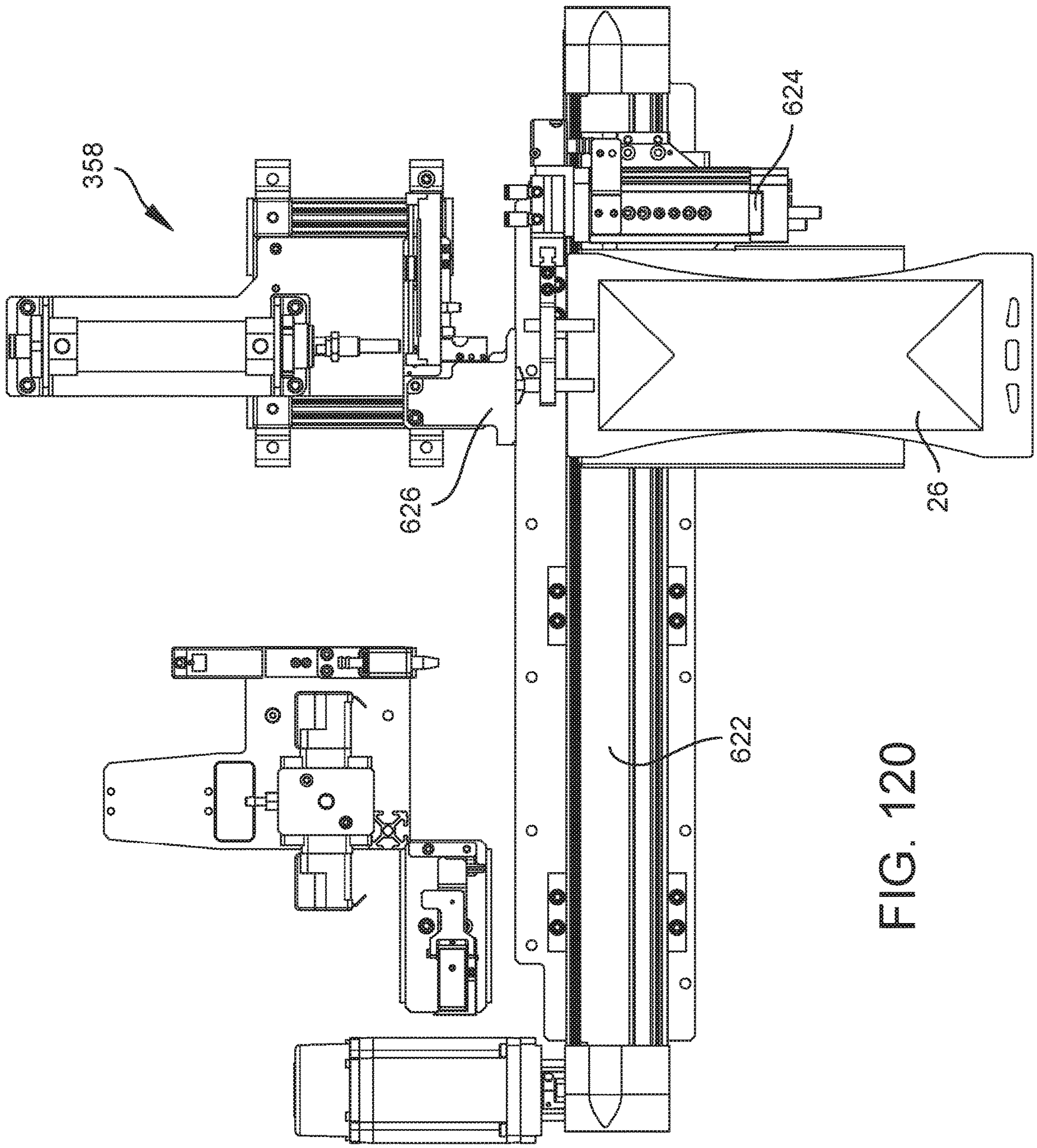
Figure 121:
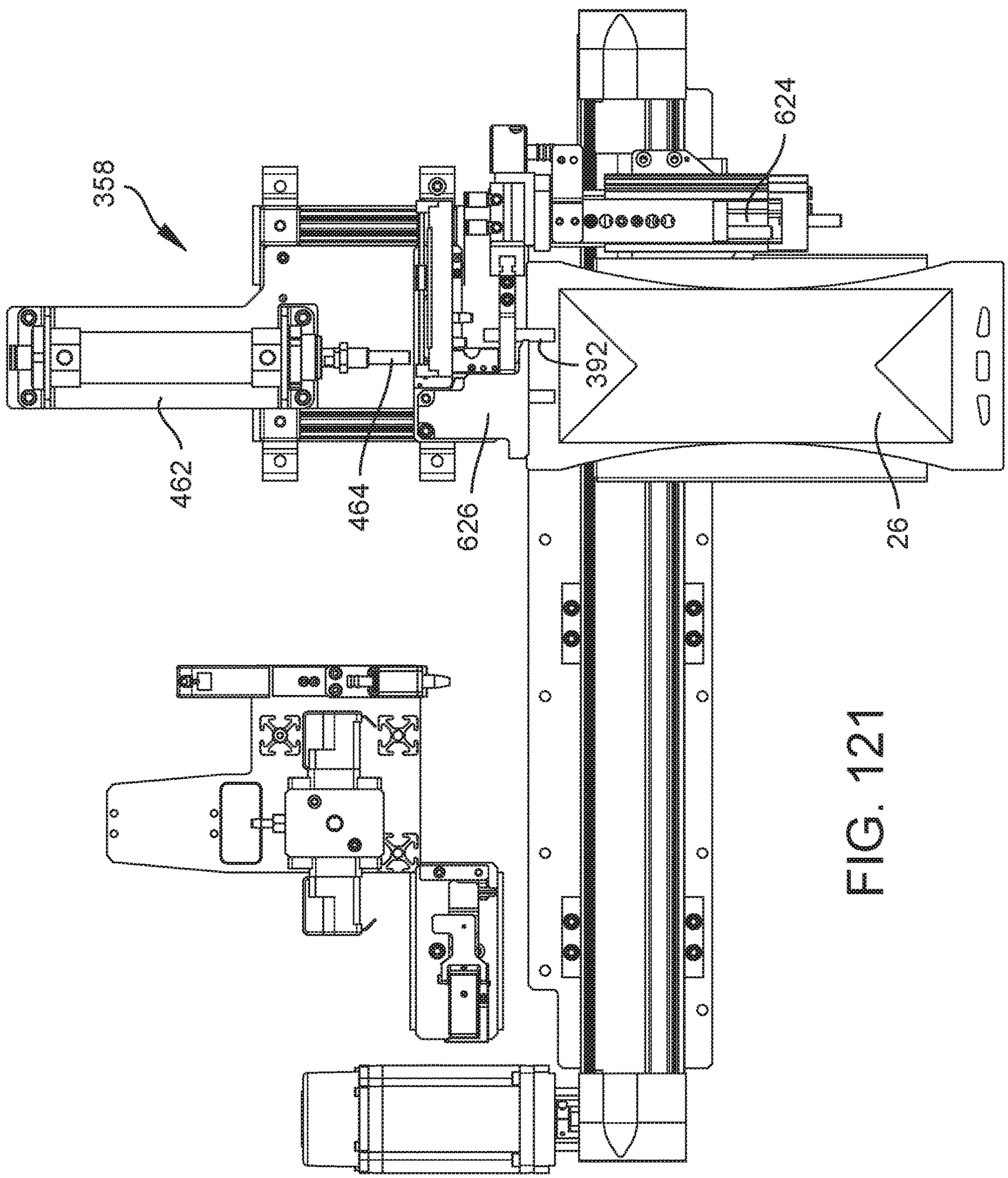
Figure 122:
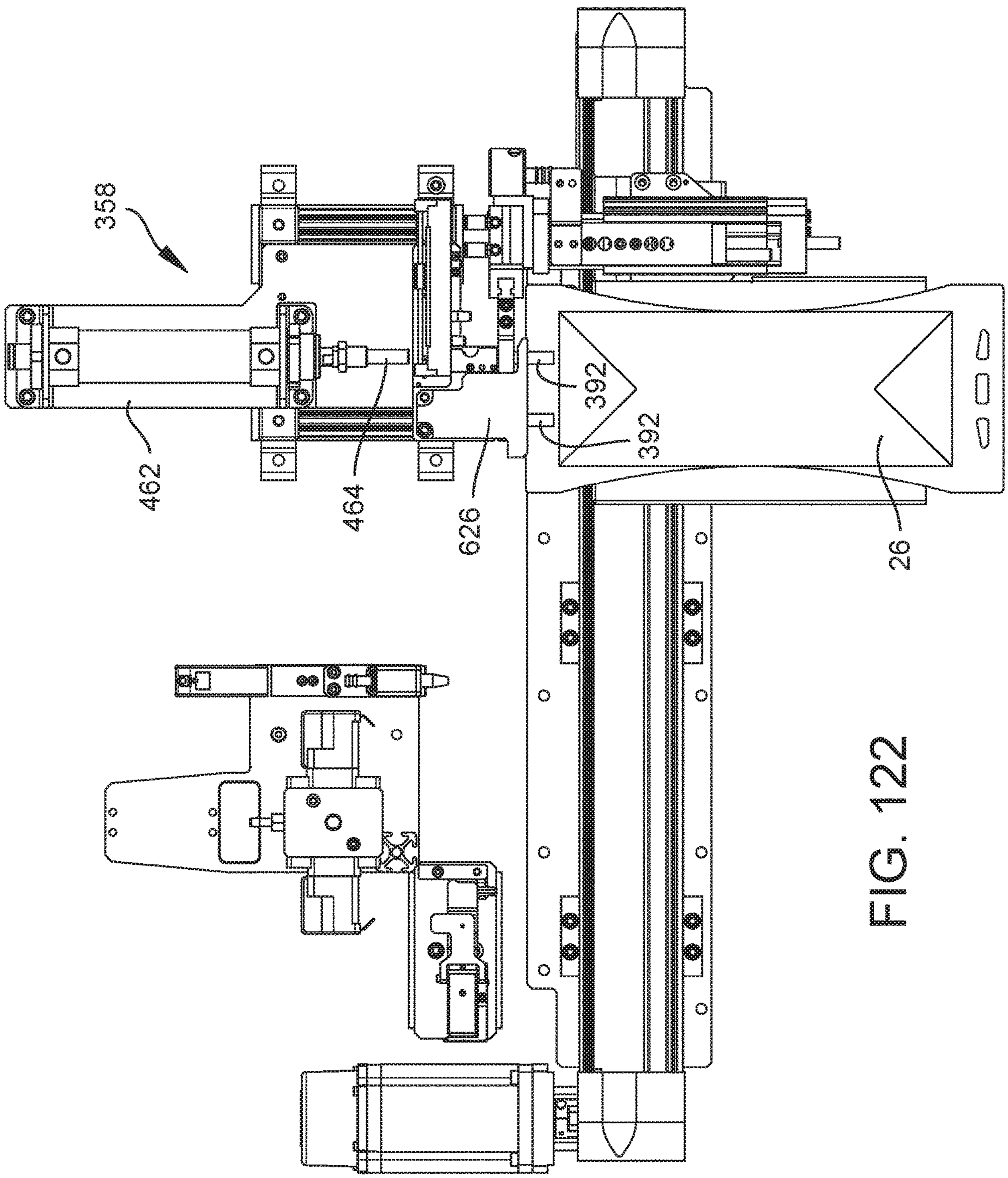
Figure 123:
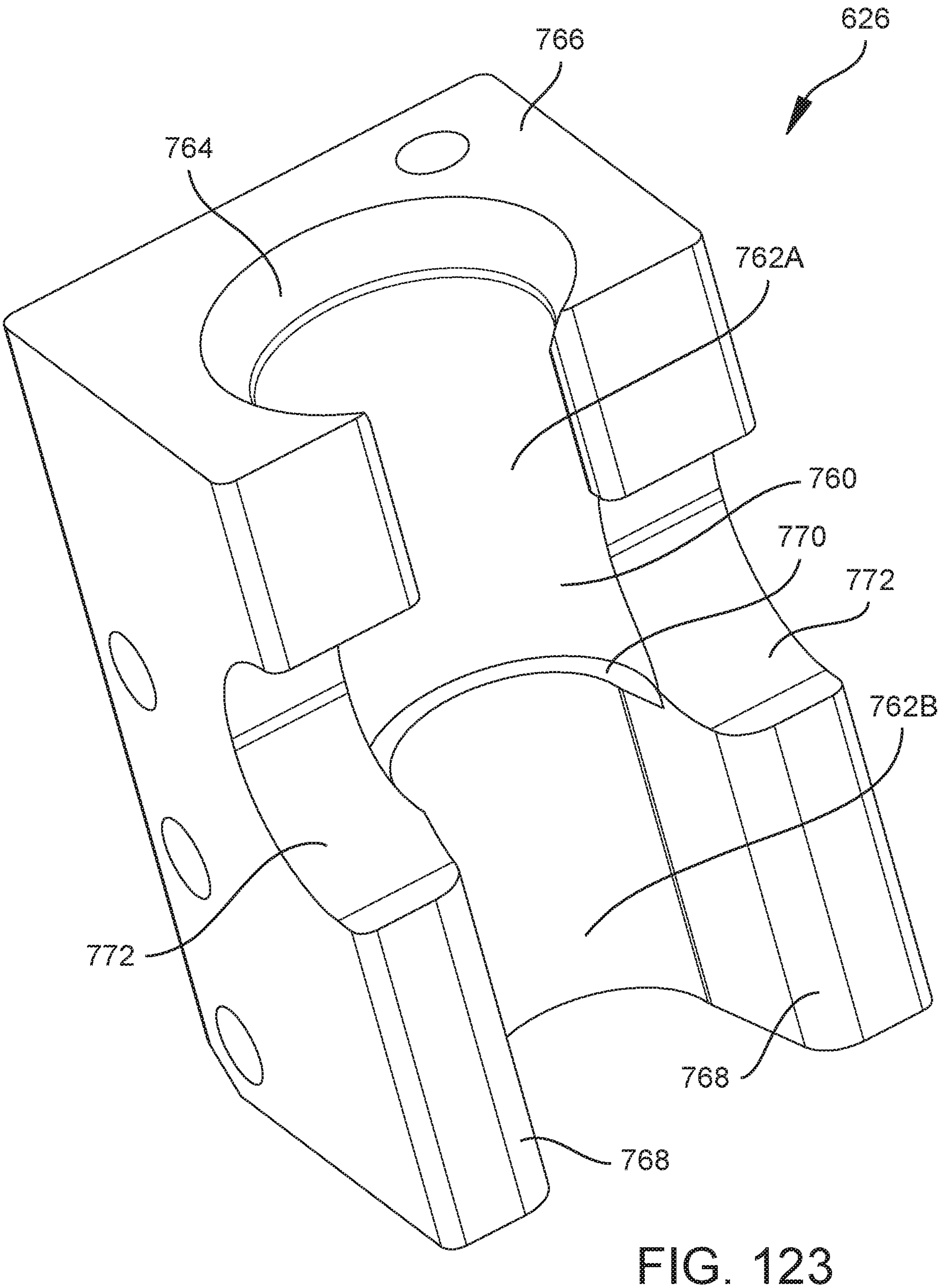
Figure 124:
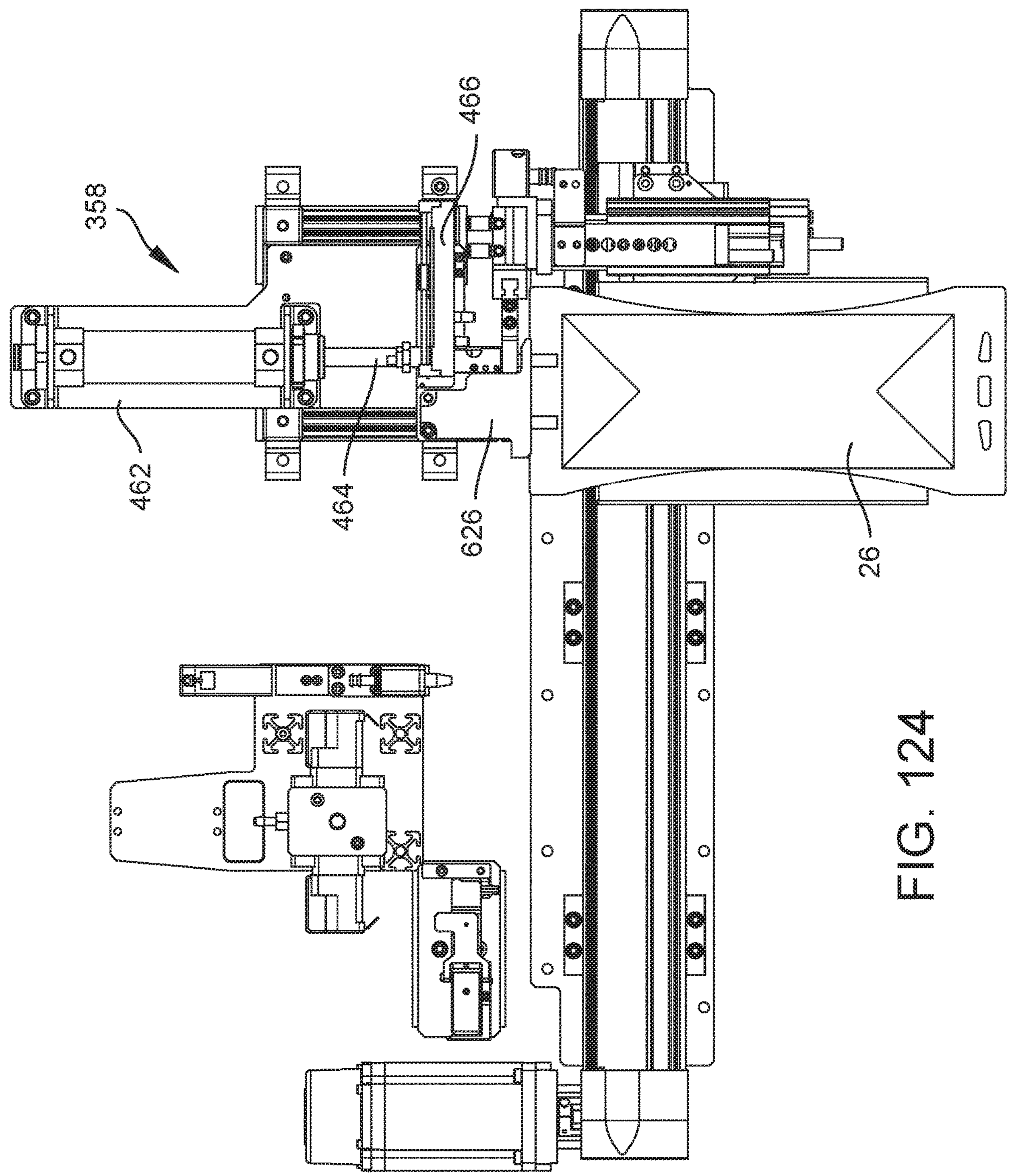
Figure 125:
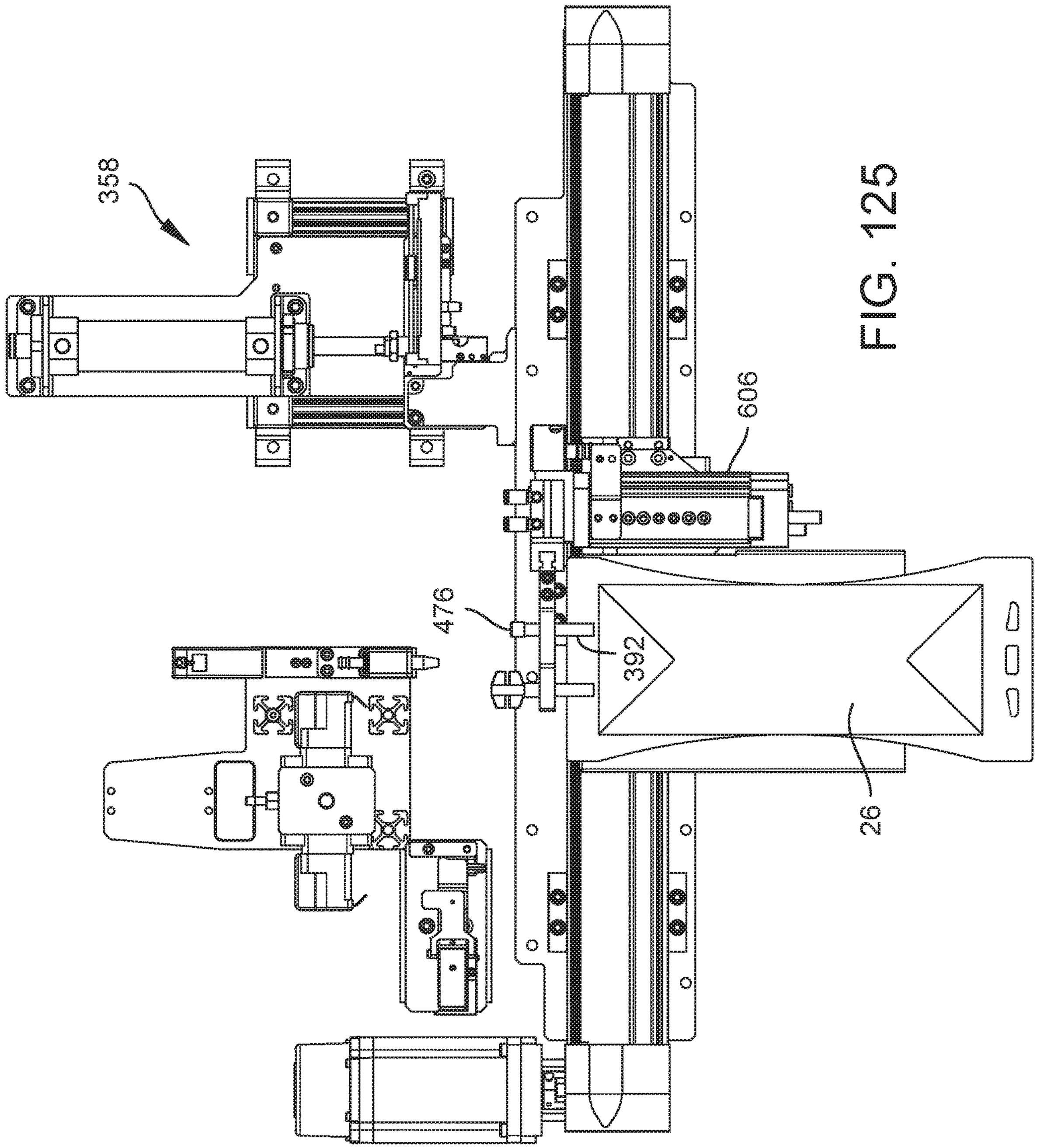
Figure 126:
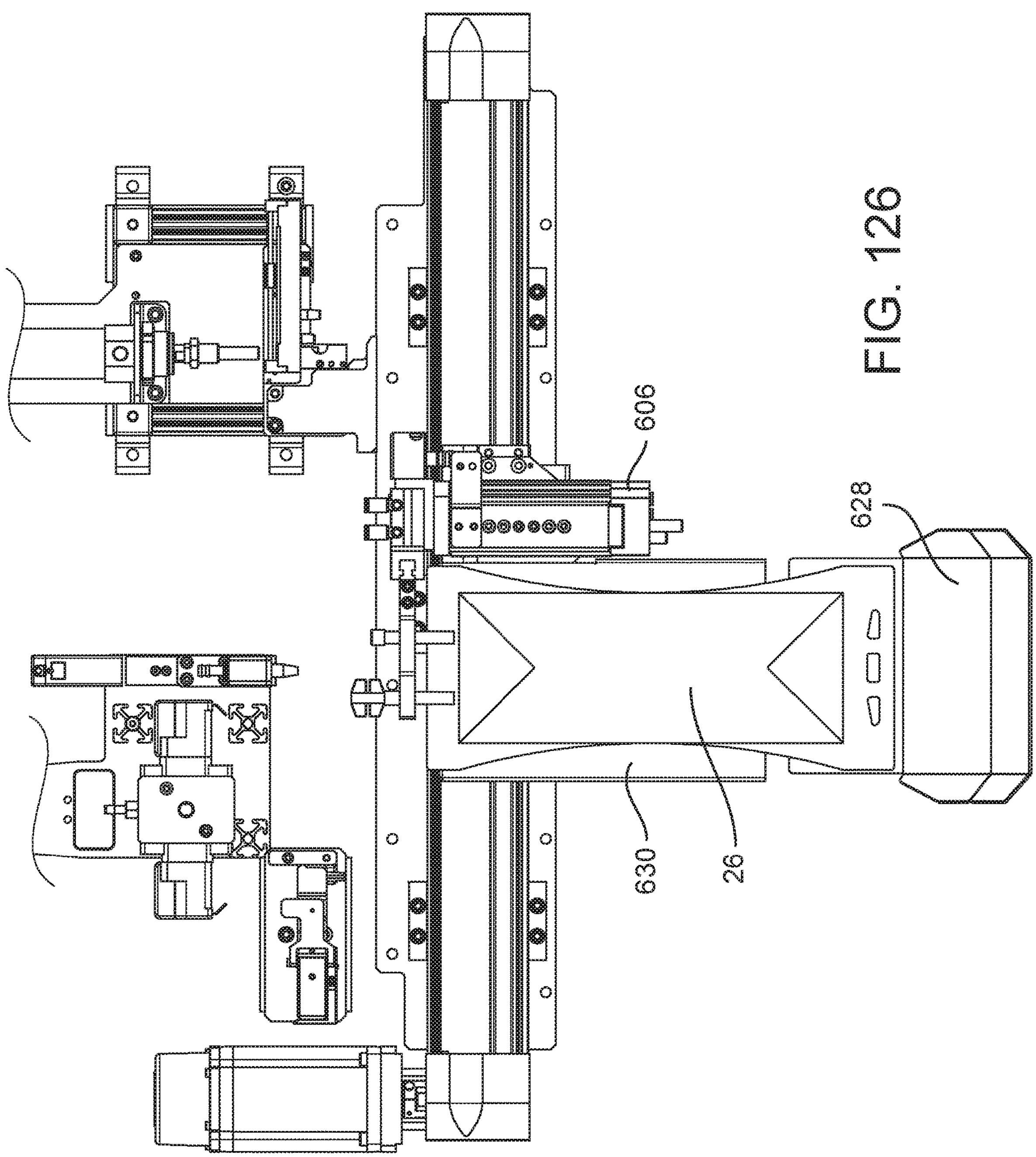
Figure 127:
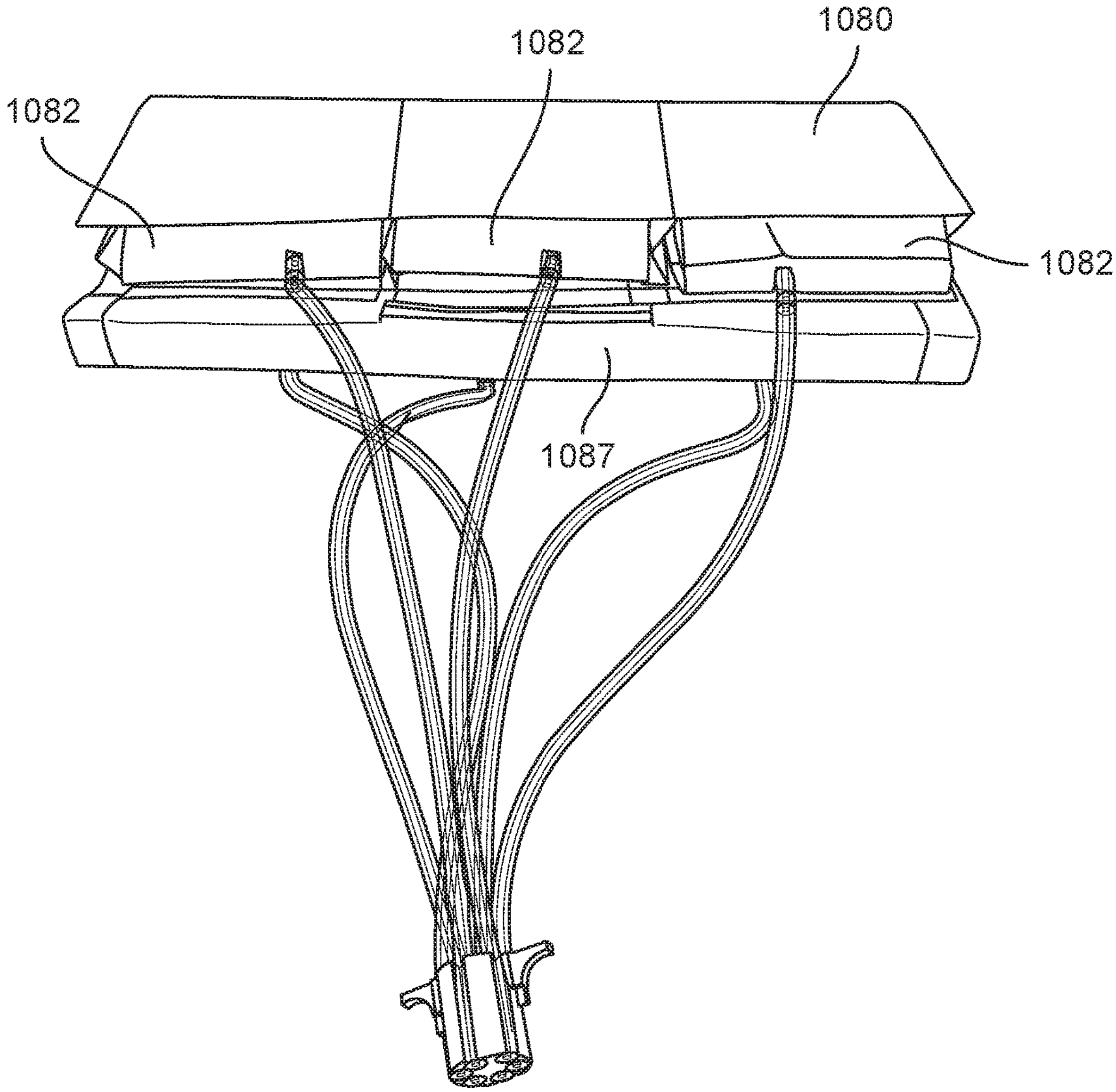
Figure 128:
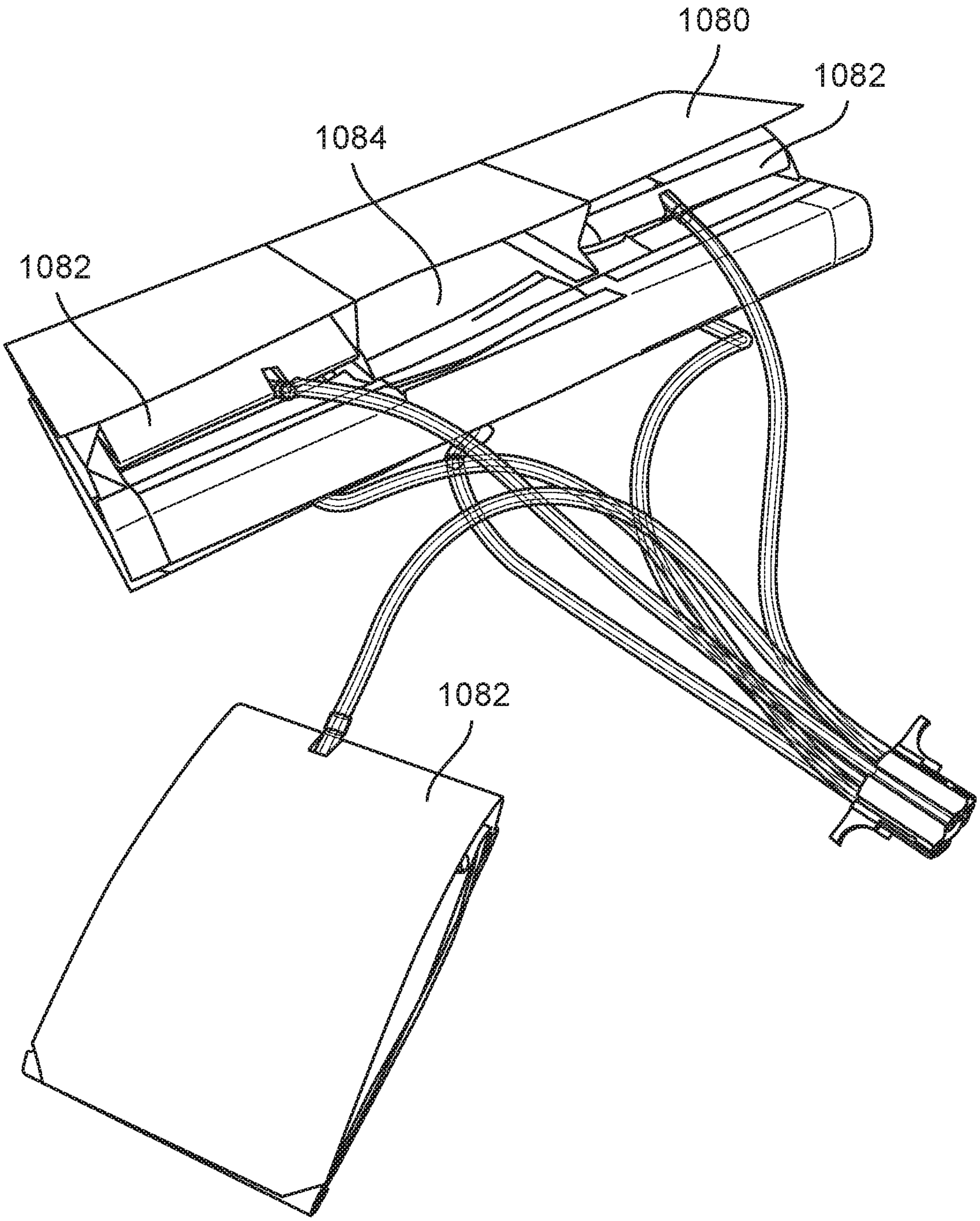
Figure 129:
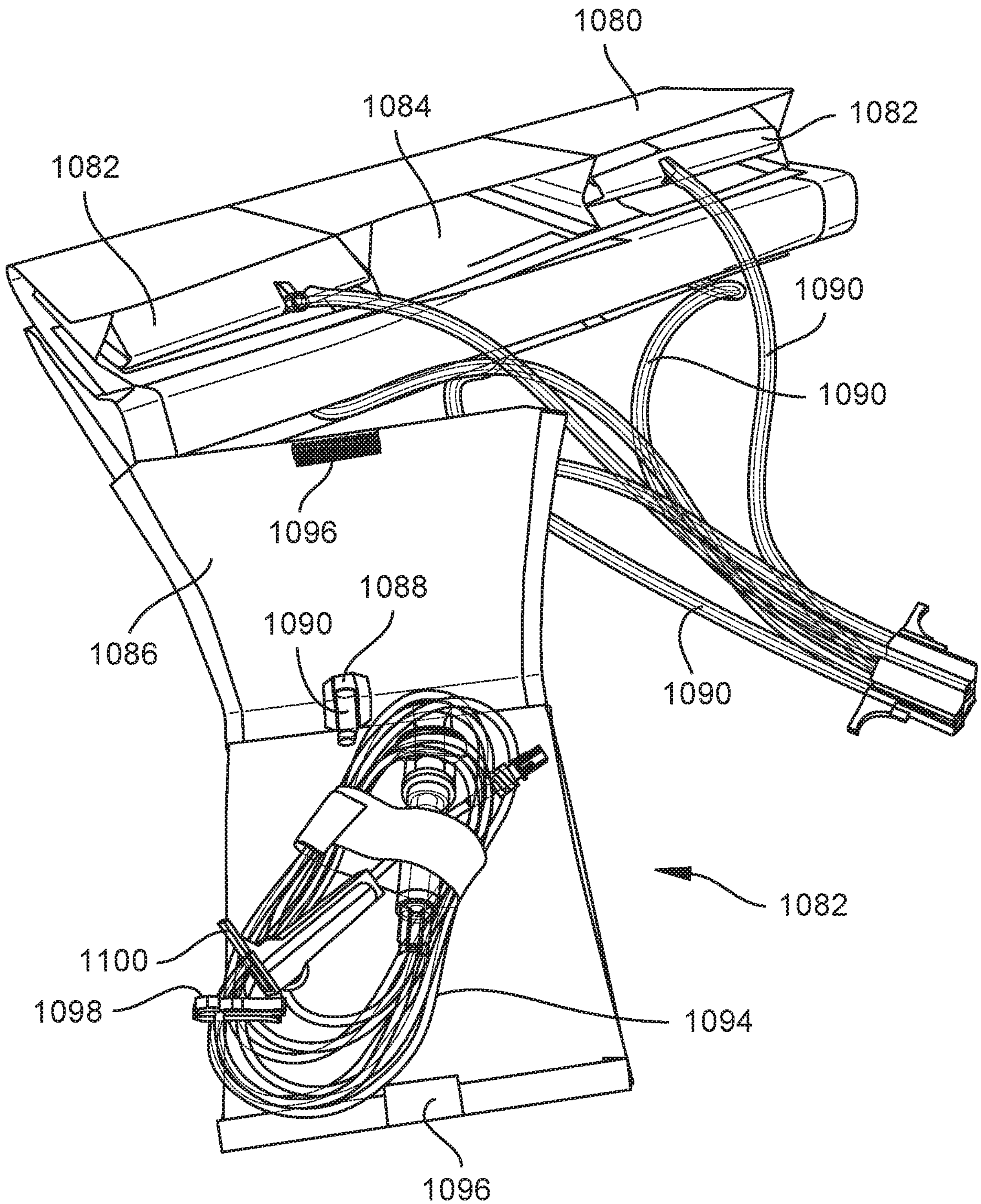
Figure 130:
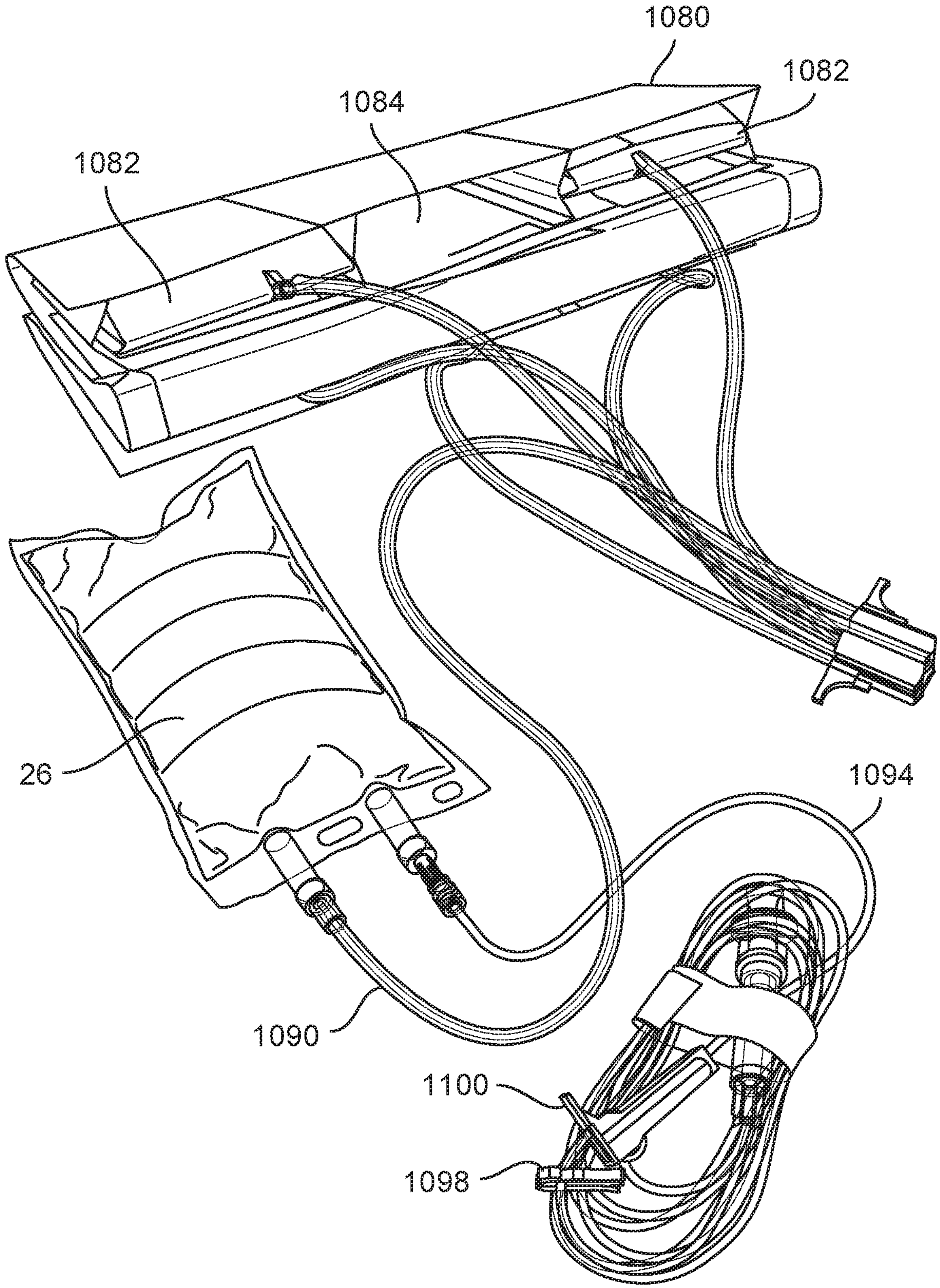
Figure 131:
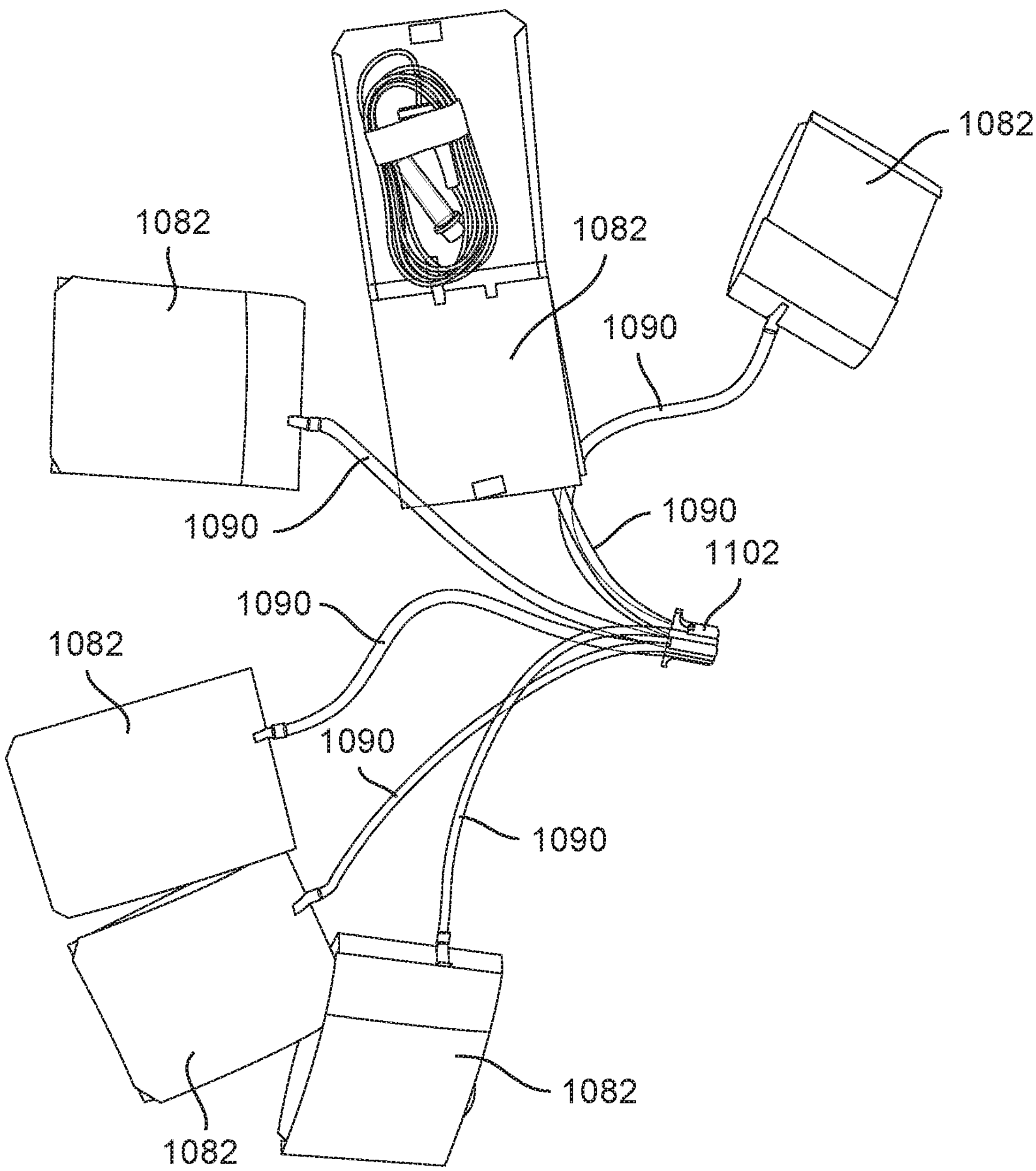
Figure 132:
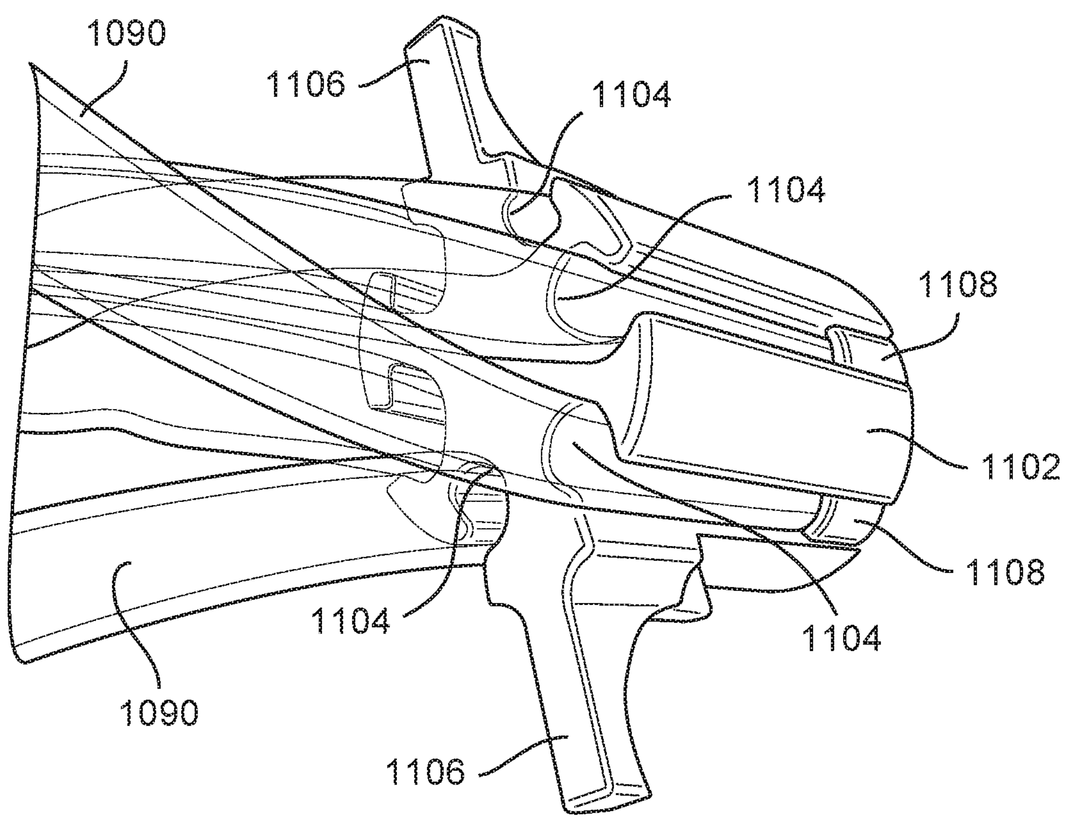
Figure 133A:
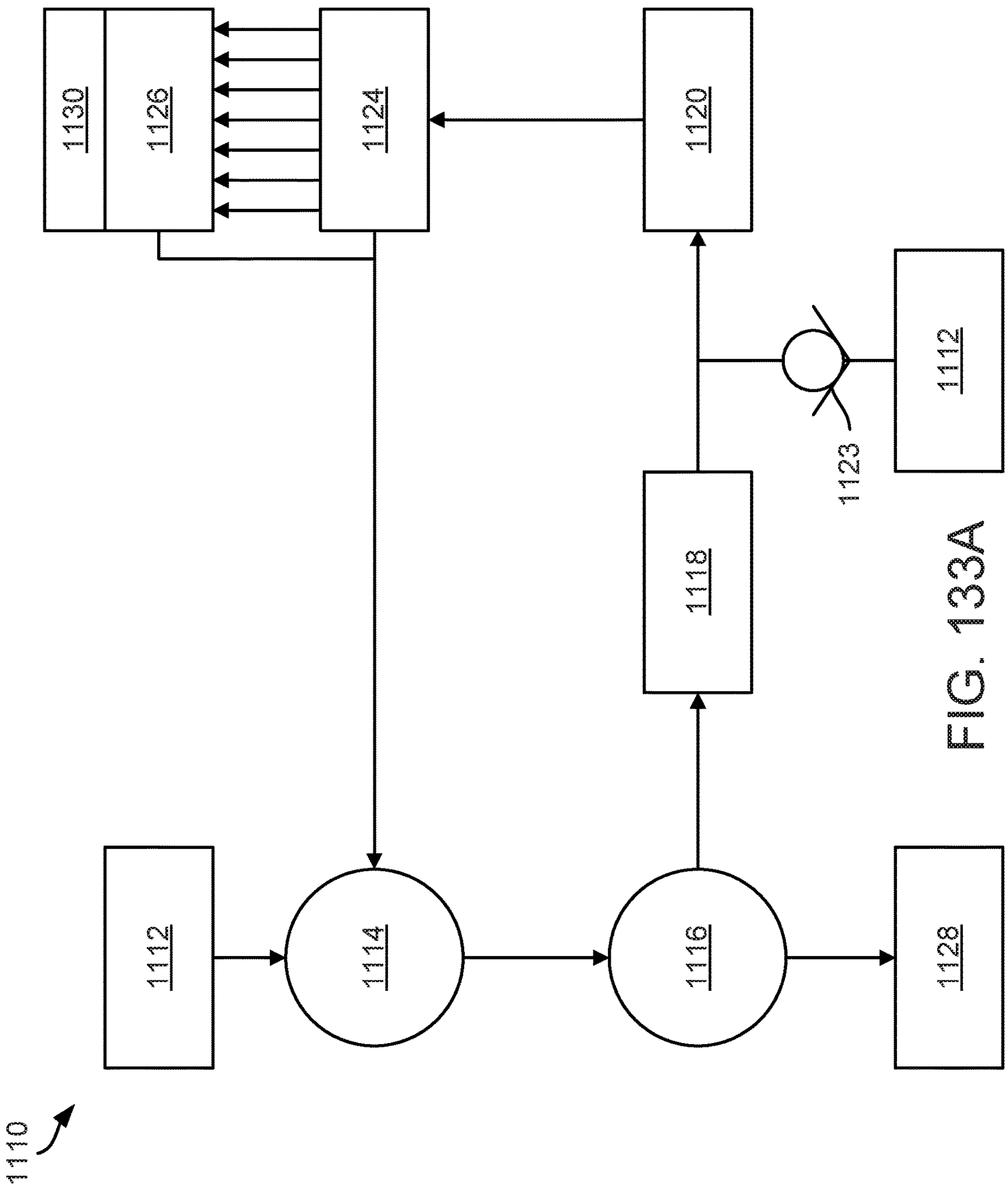
Figure 133B:
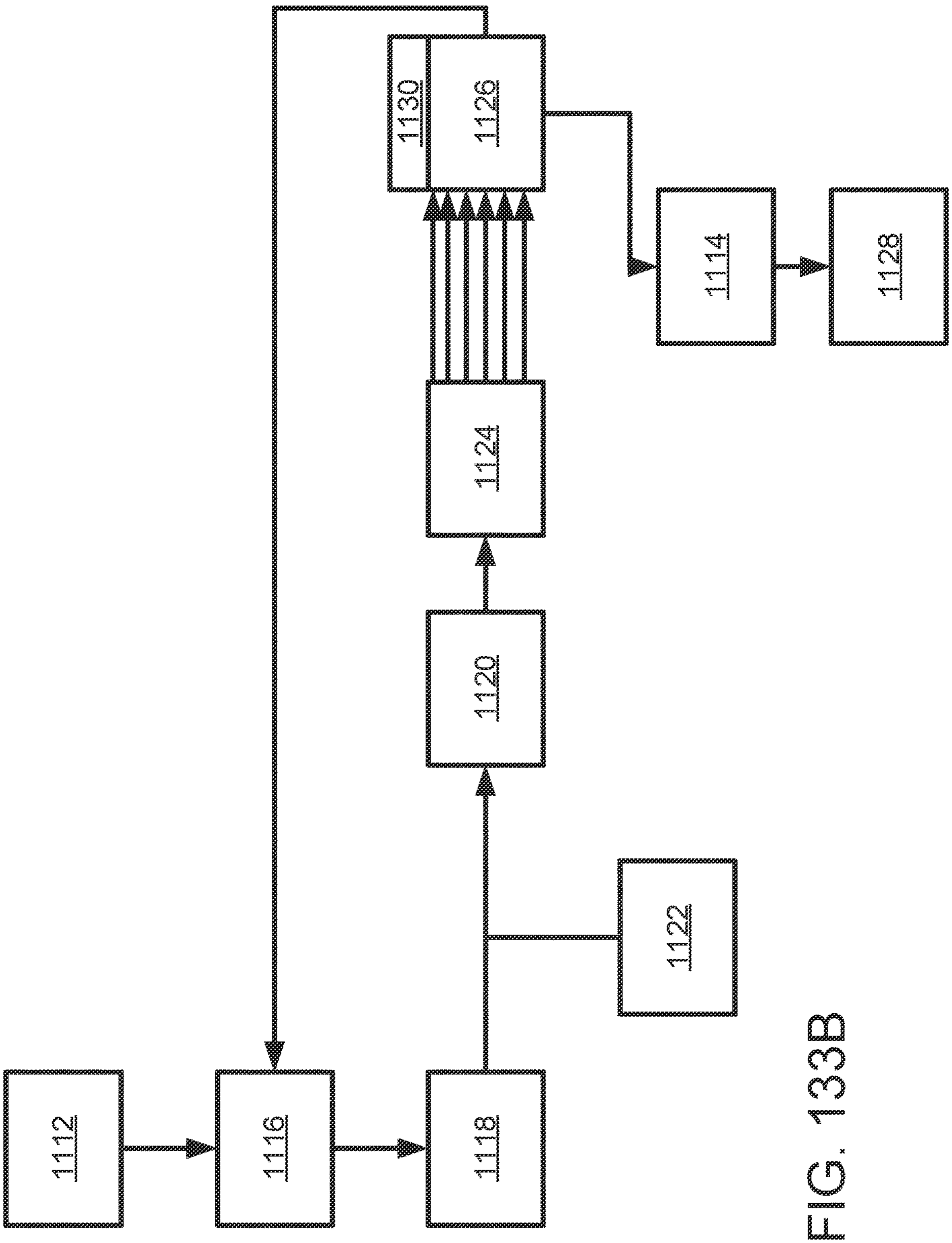

FIGS. 114A-B depicts top down view of an example bag retainer;

FIG. 115 depicts a front view of an example packaging assembly with a grasper grasping a bag which is docked at an example bag retainer of the packing assembly;

FIG. 116 depicts a front view of an example packaging assembly with a grasper holding a bag which has been freed from the example bag retainer of the packaging assembly;

FIG. 117 depicts a front view of an example packaging assembly with an example robotic manipulator which as advanced a bag held by a grasper of the robotic manipulator into alignment with an example fill nozzle of the packaging assembly;

FIG. 118A depicts a front view of an example packaging assembly with an example fill nozzle of the packing assembly in a port of a bag;

FIG. 118B depicts an exploded view of an example filling nozzle and biasing assembly;

FIG. 119 depicts a front view of an example packaging assembly with a filled bag held by an example grasper of an example robotic manipulator of the packaging assembly;

FIG. 120 depicts a front view of an example packaging assembly with a filled bag displaced to an example sealing station of the packaging assembly;

FIG. 121 depicts a front view of an example packaging assembly with a filled bag displaced to an example sealing station of the packaging assembly;

FIG. 122 depicts a front view of an example packaging assembly with a filled bag displaced so as to insert a port of the bag into an example support cradle of an example sealing station of the packaging assembly;

FIG. 123 depicts a perspective view of an example support cradle;

FIG. 124 depicts a front view of an example packaging assembly with an example ram of the example sealing station actuated to drive a stopper into a port of a bag disposed within an example support cradle of the packaging assembly;

FIG. 125 depicts a front view of an example packaging assembly with a filled and sealed bag held by an example grasper of an example robotic manipulator of the packaging assembly;

FIG. 126 depicts a front view of an example packaging assembly with a directing chute;

FIG. 127 depicts a perspective view of an example carrier which may contain packets each holding at least one bag and administration set;

FIG. 128 depicts a perspective view of an example carrier having an example packet removed from a compartment of the carrier;

FIG. 129 depicts a perspective view of an example carrier having an example packet removed from a compartment of the carrier, the packet having a cover flap opened;

FIG. 130 depicts a perspective view of an example carrier with an example bag and example administration set removed from a packet;

FIG. 131 depicts a perspective view of a plurality of example packets which may be placed within compartments of a carrier;

FIG. 132 depicts a perspective view of a spiking adapter which may be included with a carrier;

FIG. 133A depicts a block diagram of an example filling station;

FIG. 133B depicts a block diagram of another example filling station

Figure 134:
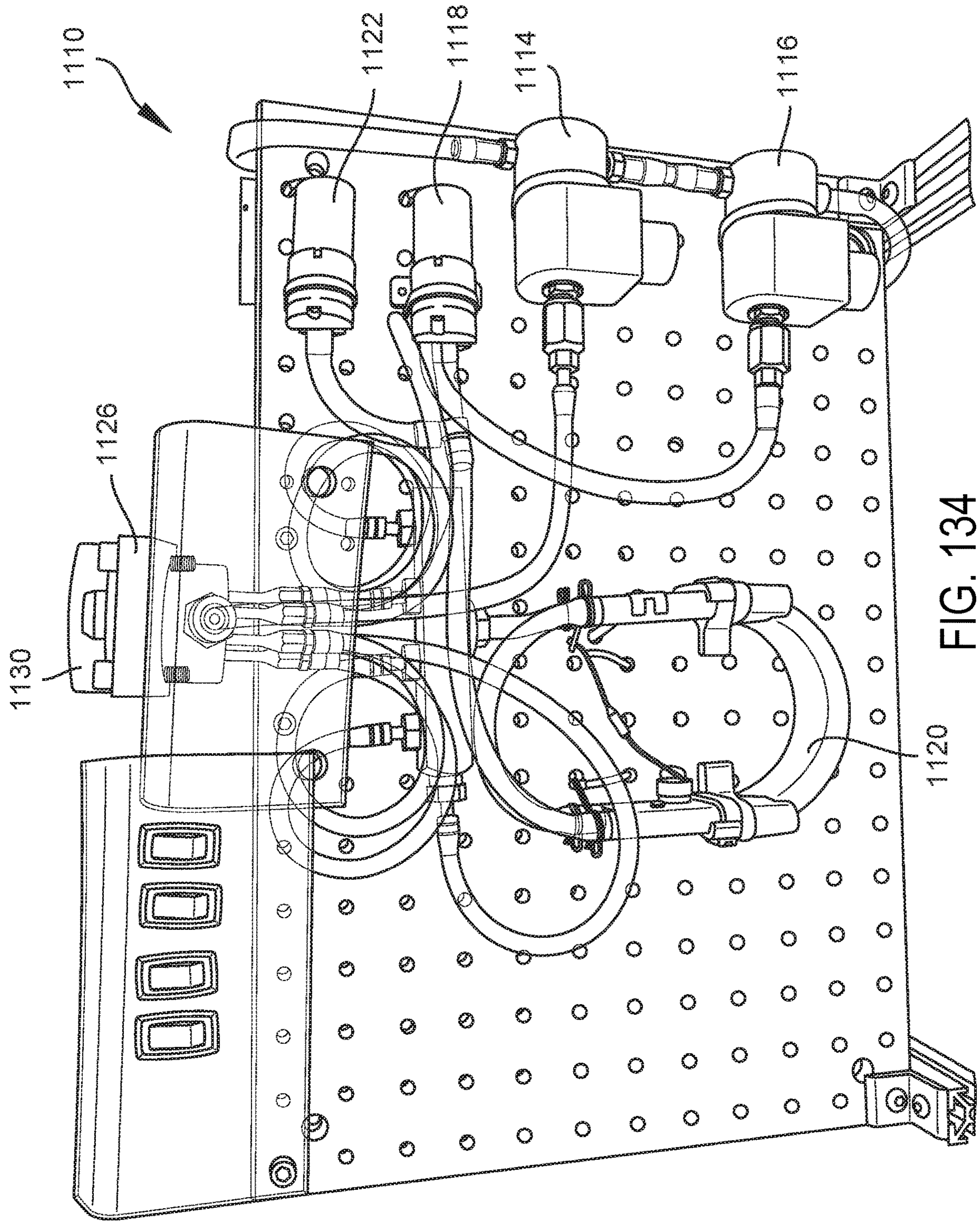
Figure 135:
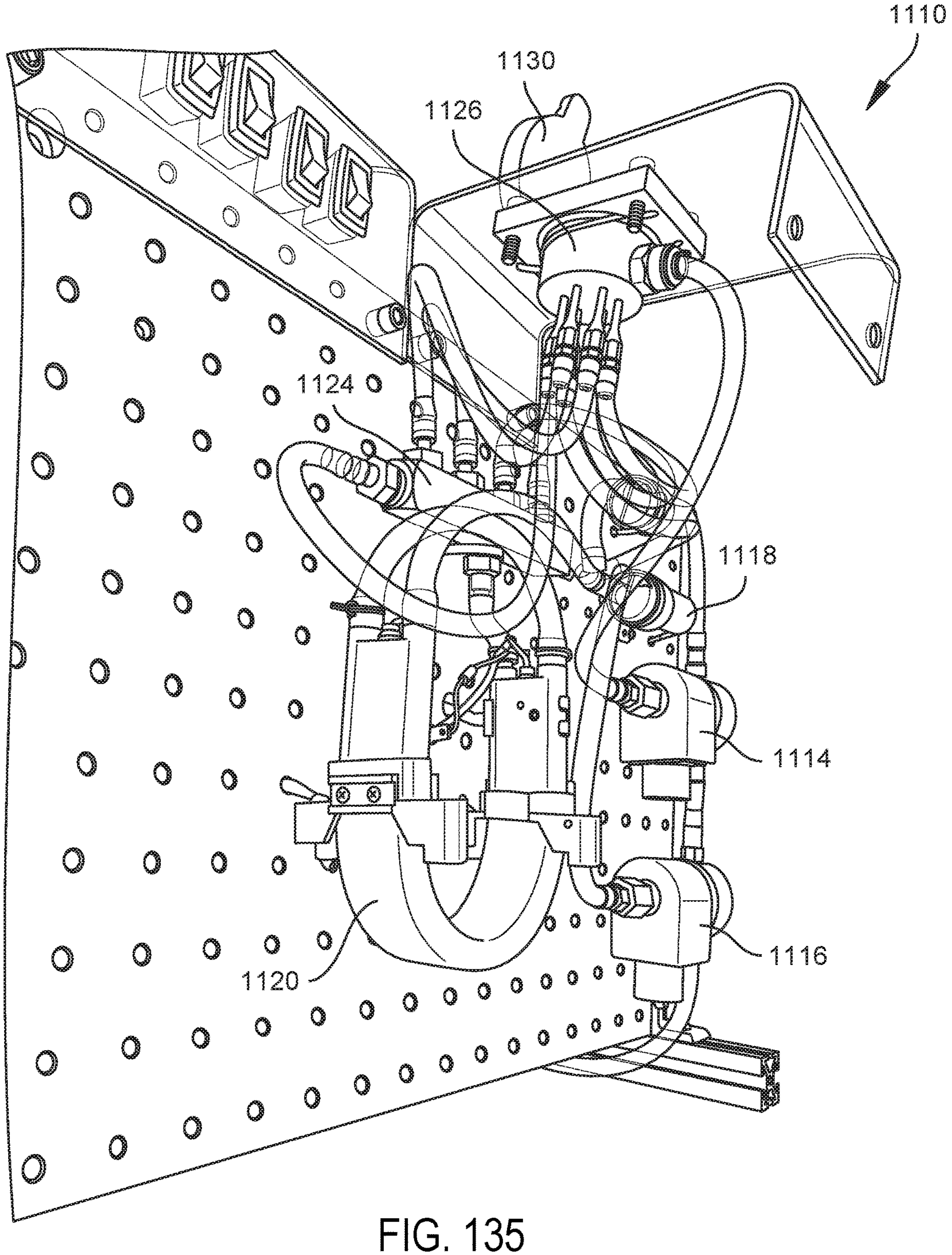
Figure 136:
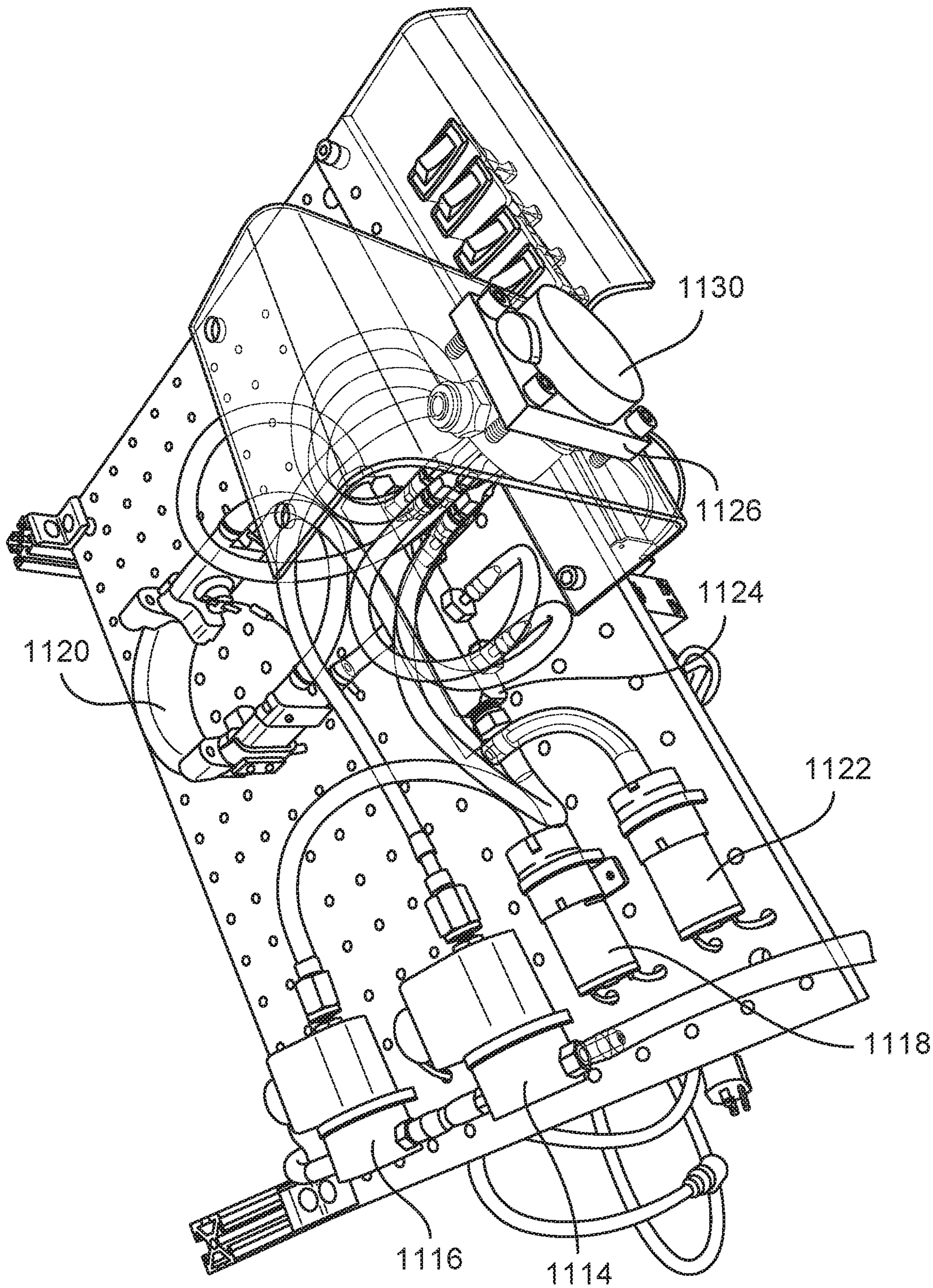
Figure 137:
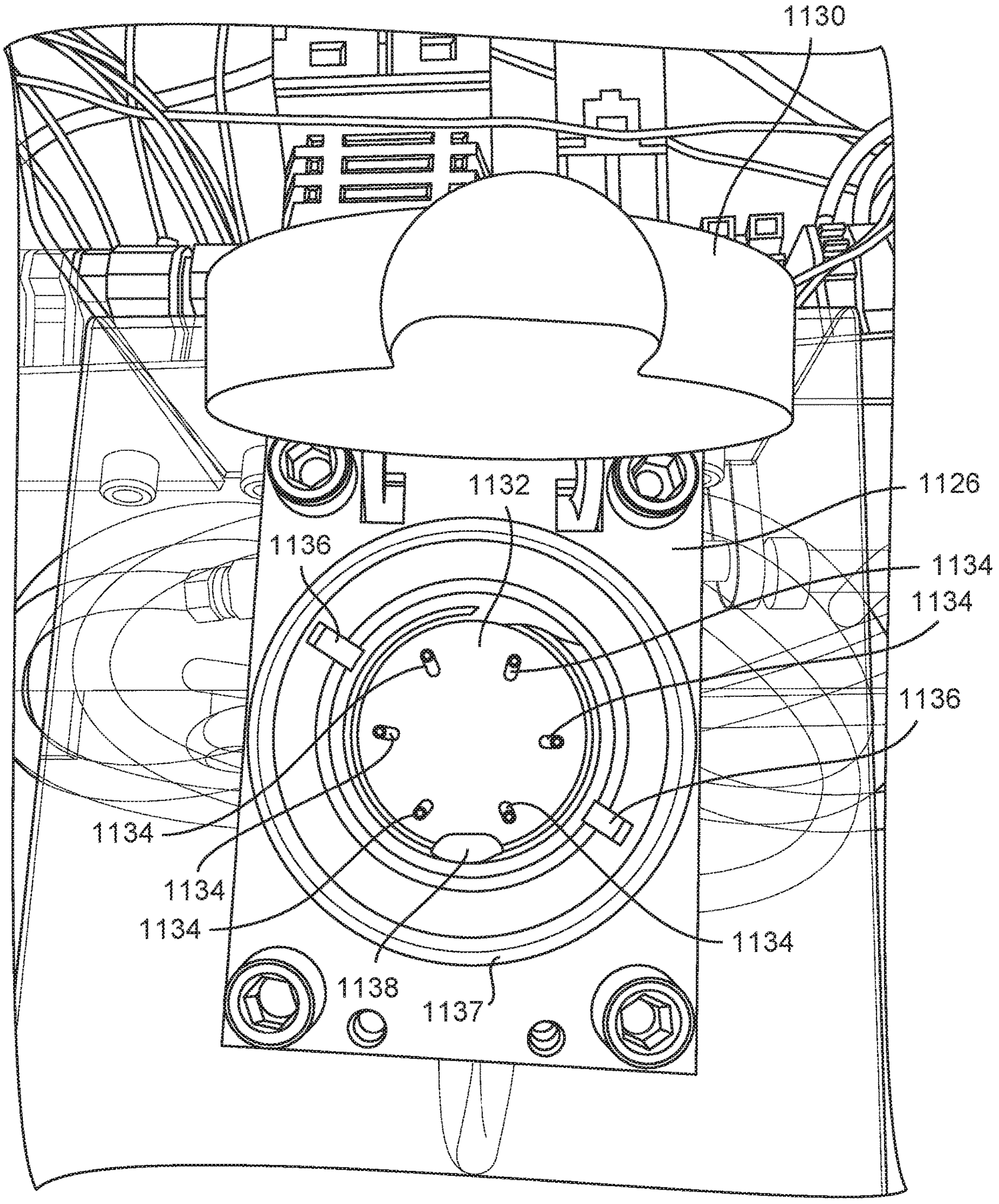
Figure 138:
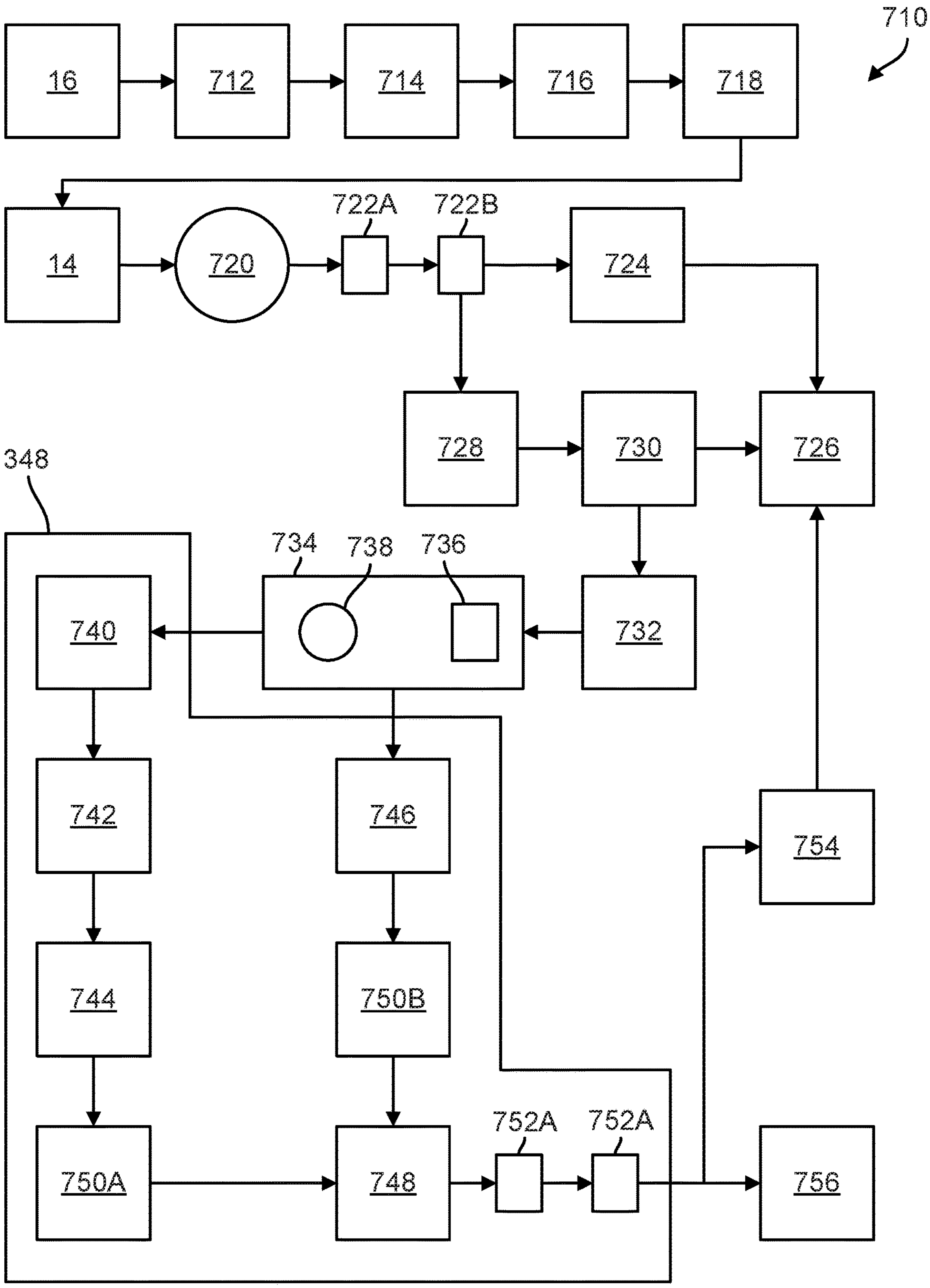
Figure 139:
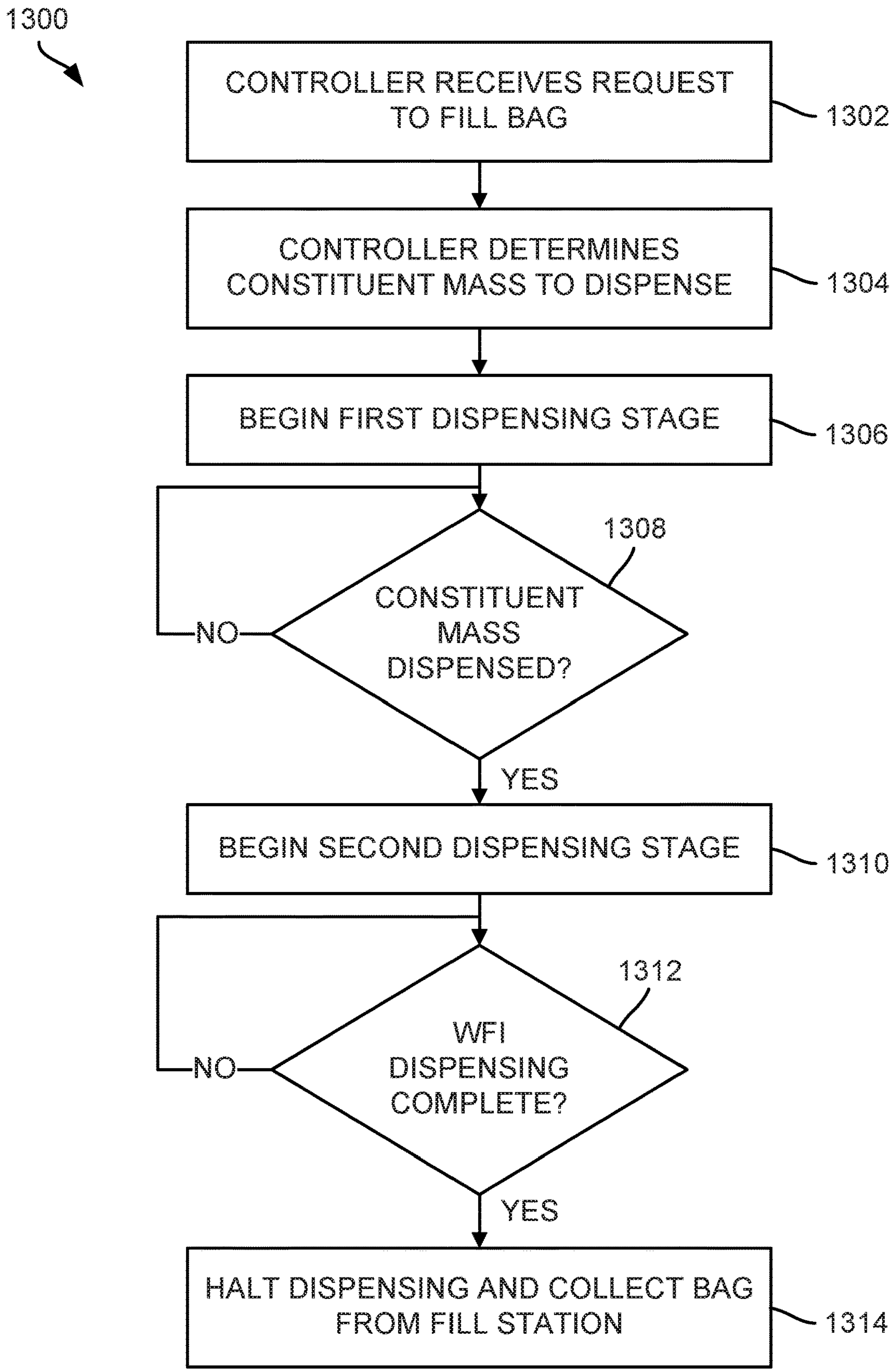
Figure 140:
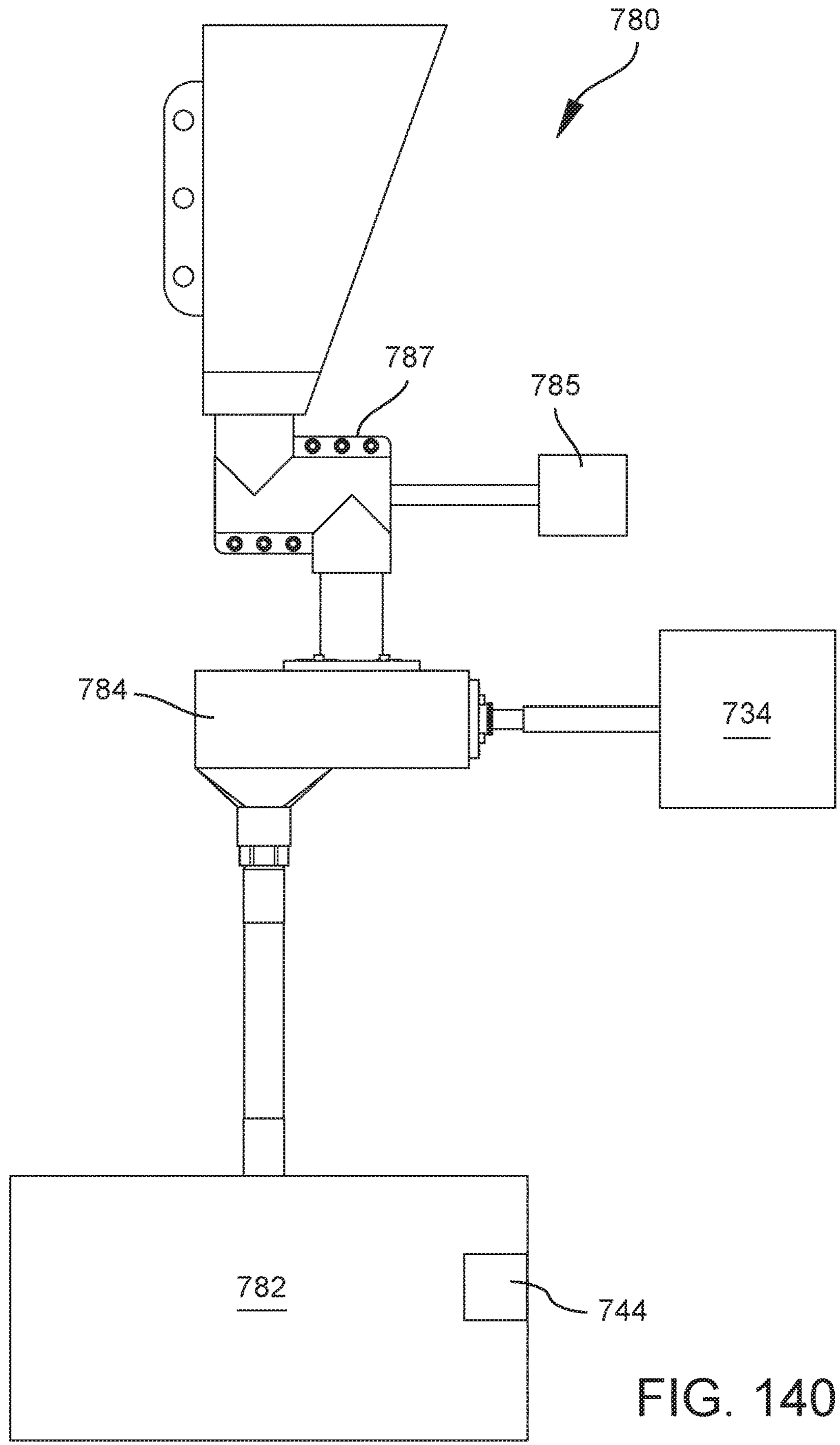
Figure 141:
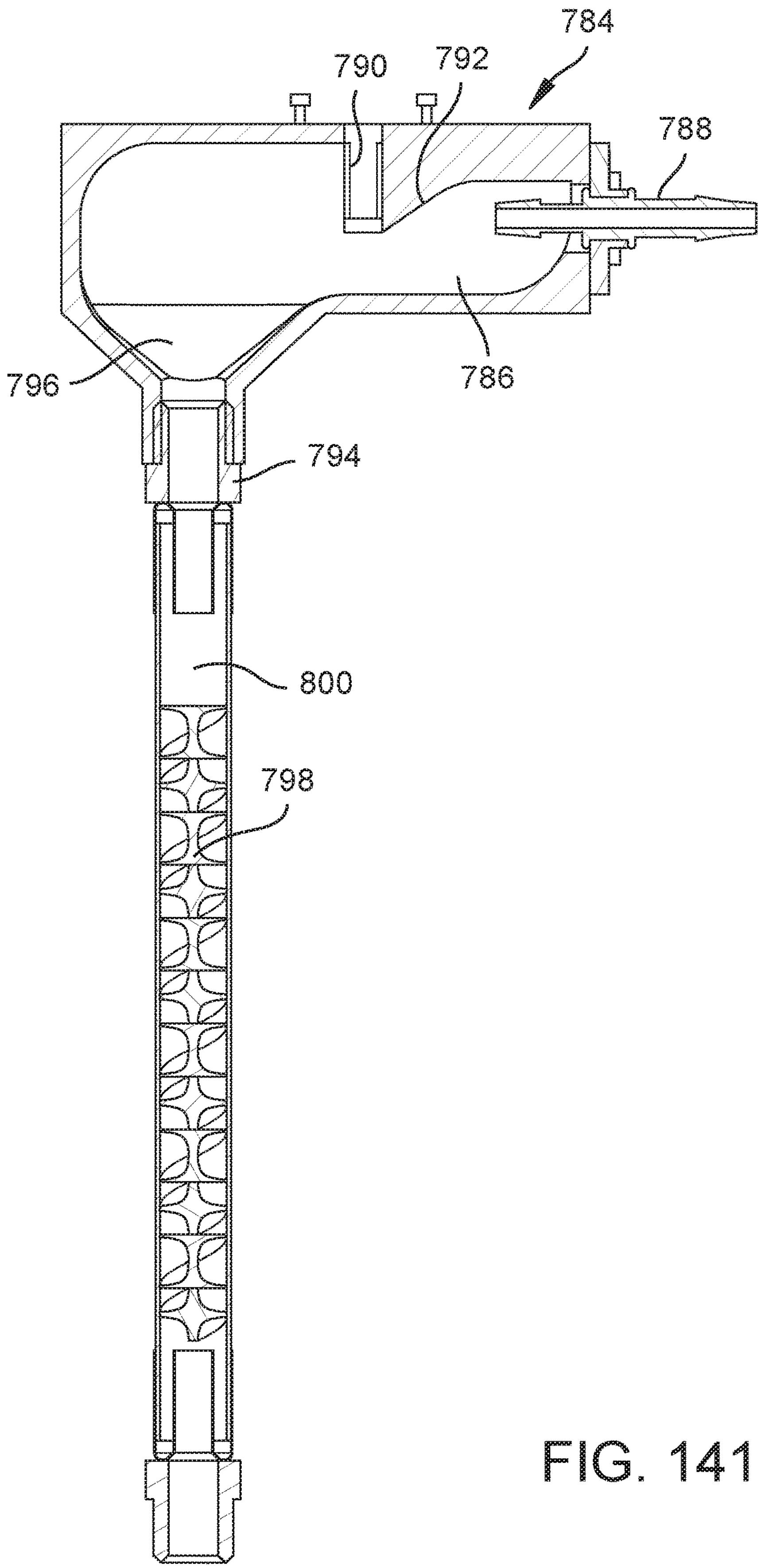
Figure 142:
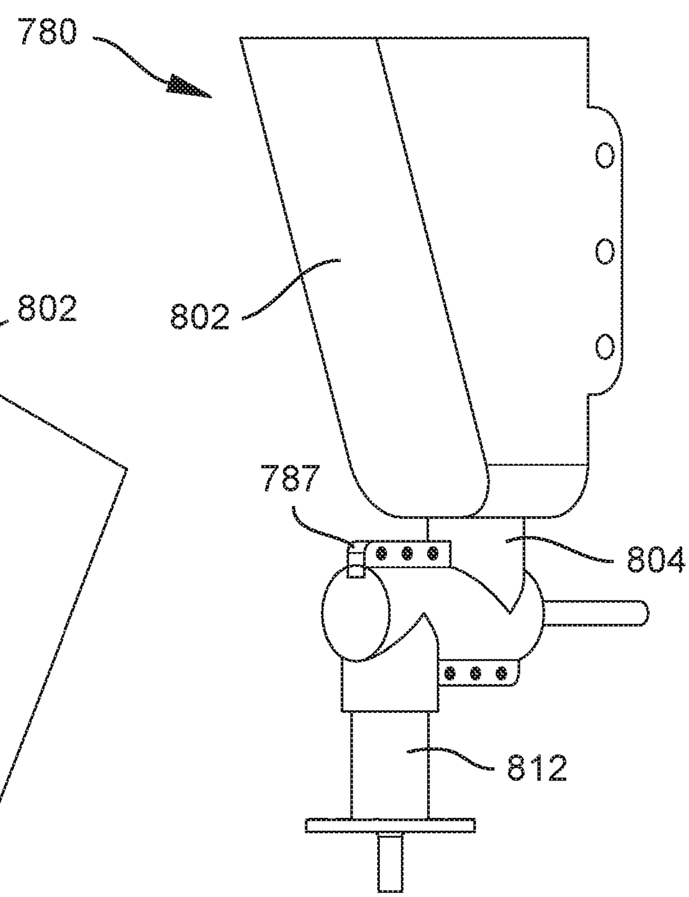
Figure 143:
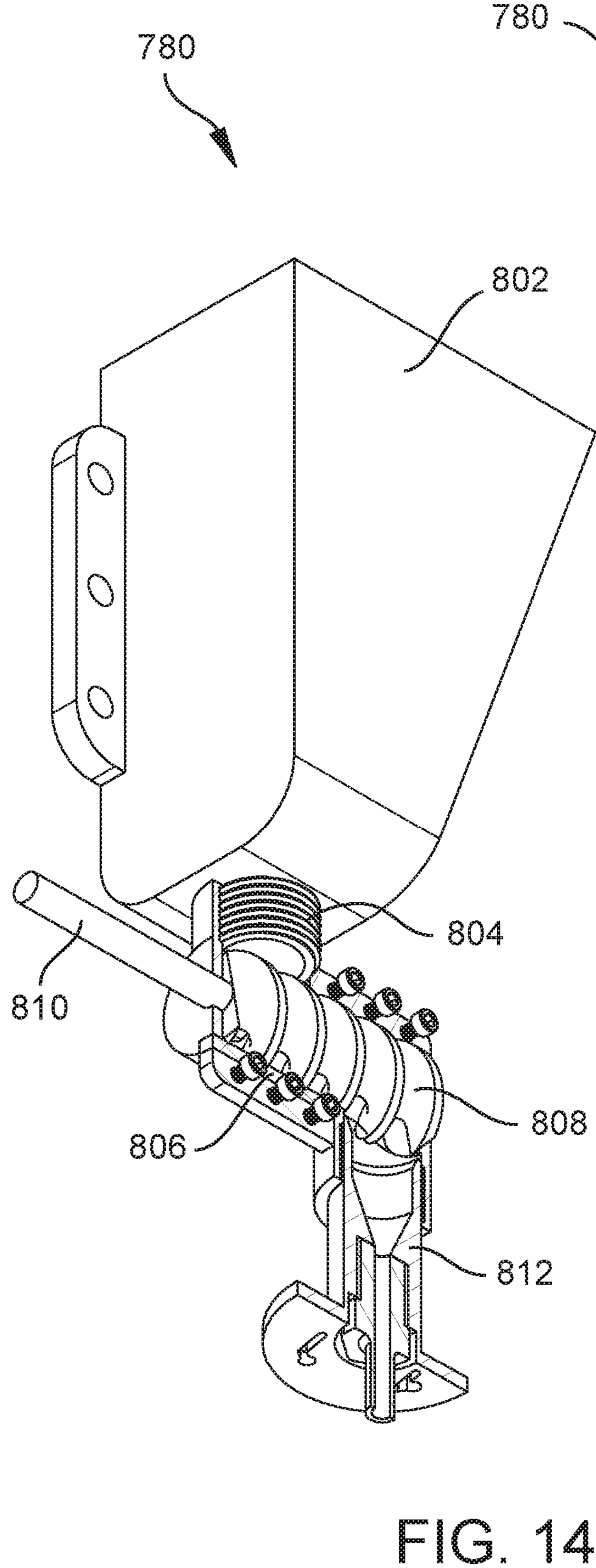
Figure 144:
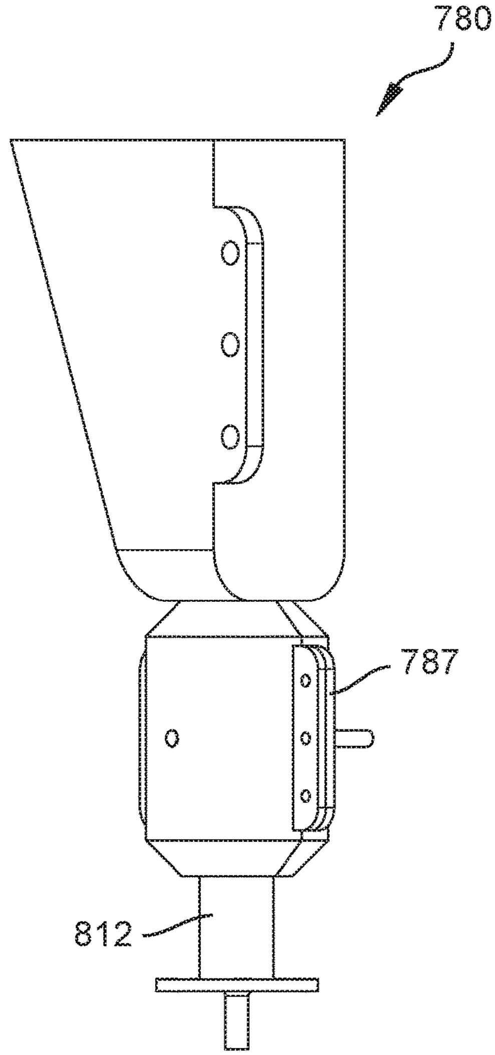
Figure 145:
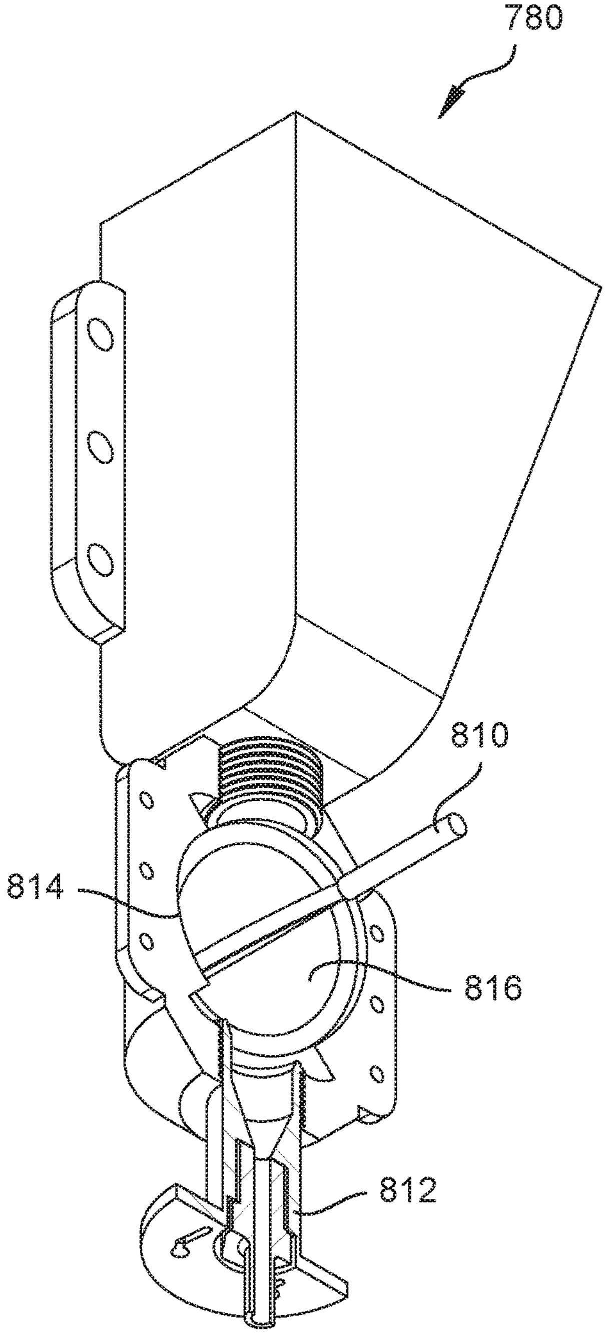
Figure 146:
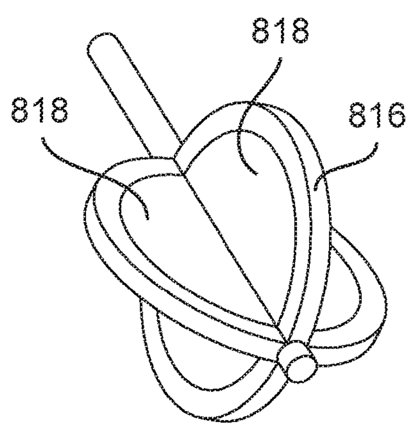
Figure 147:
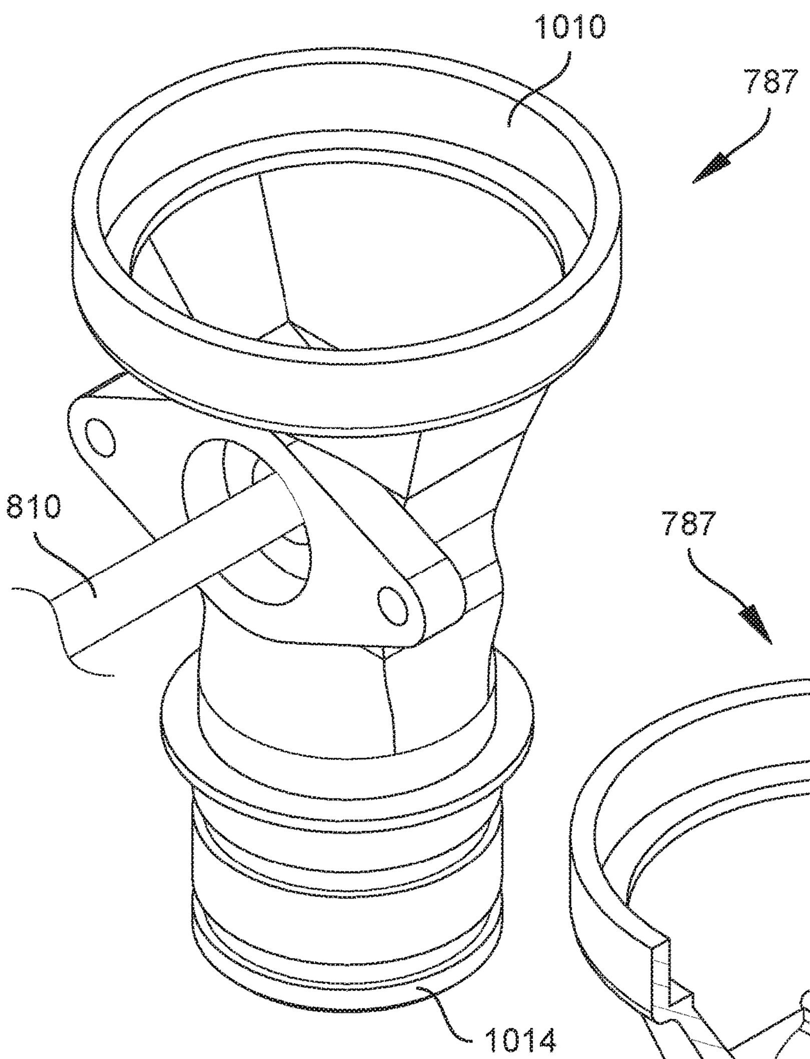
Figure 148:
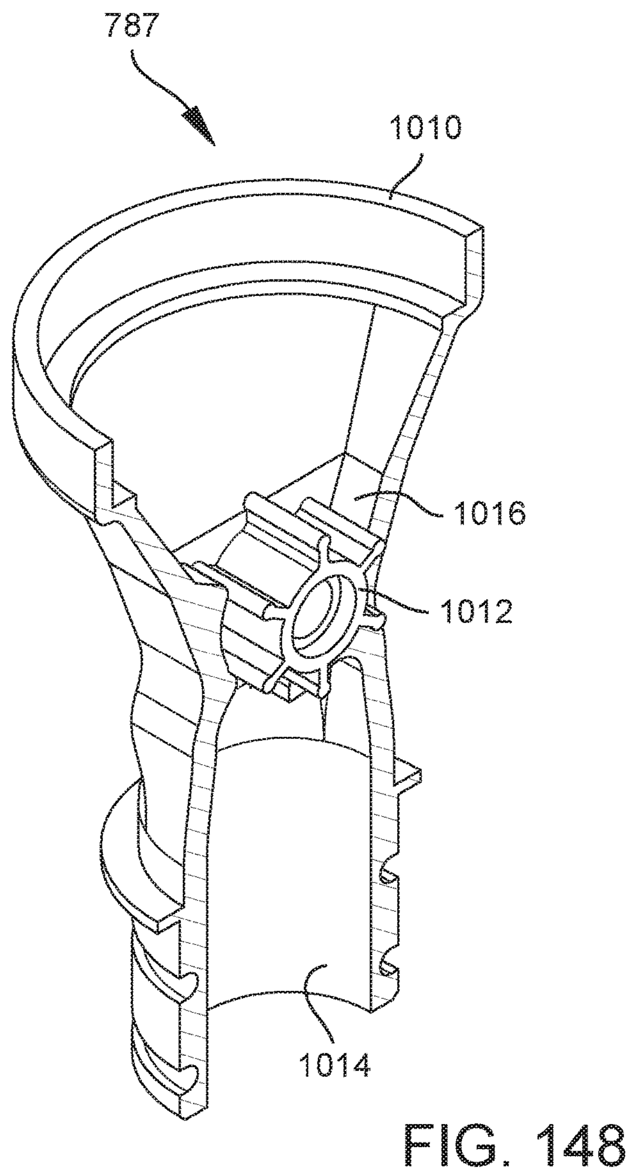
Figure 149:
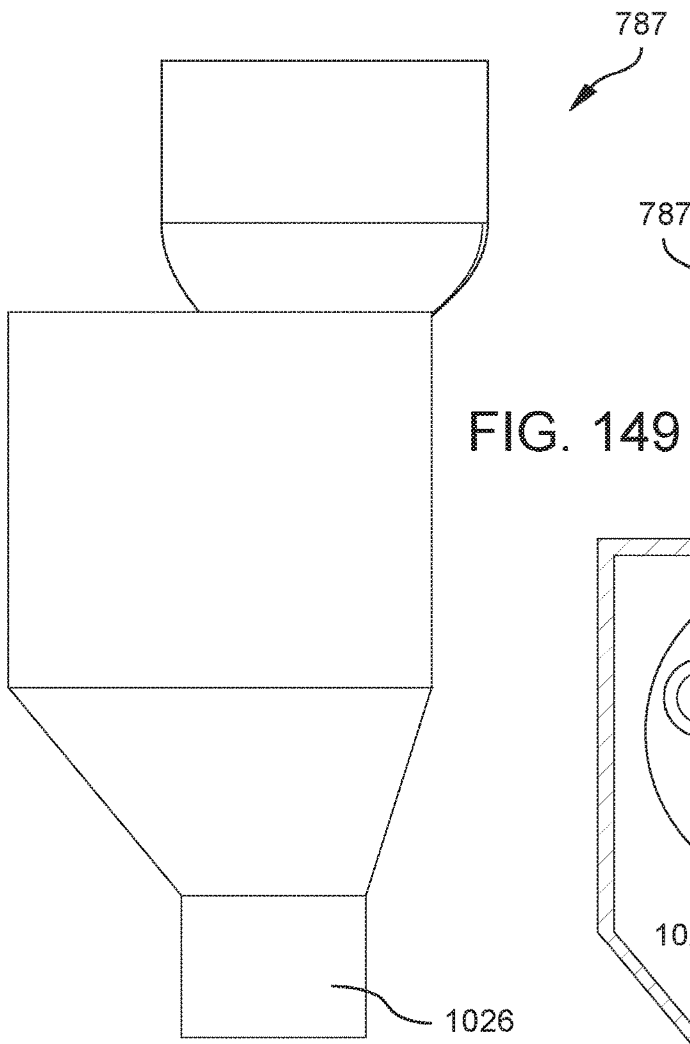
Figure 150:
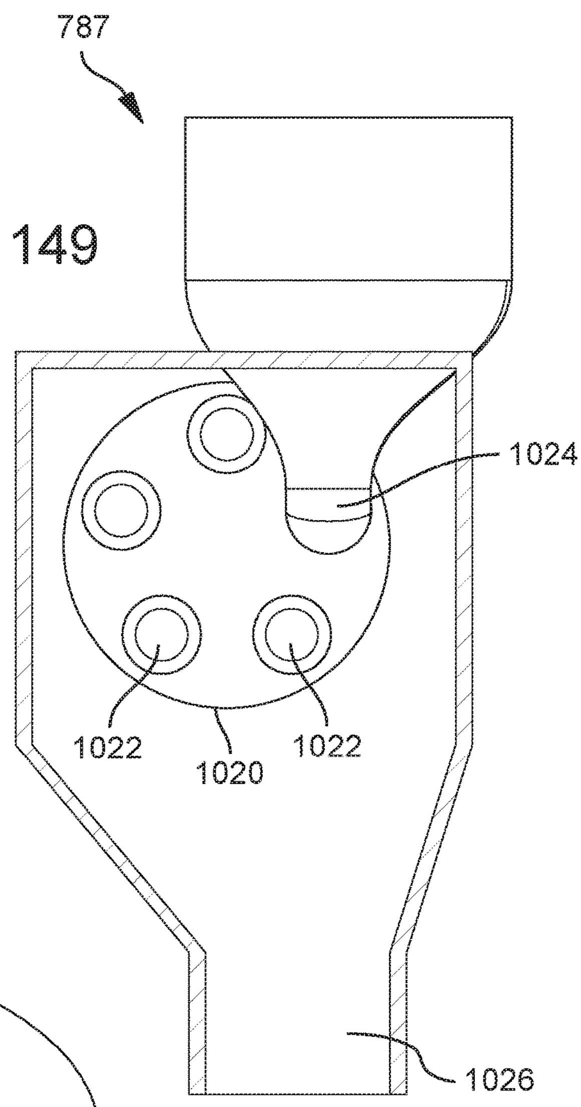
Figure 151:
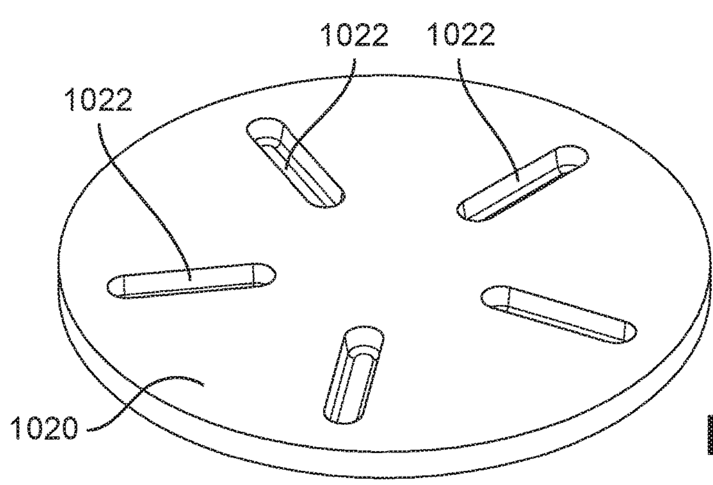
Figure 152A:
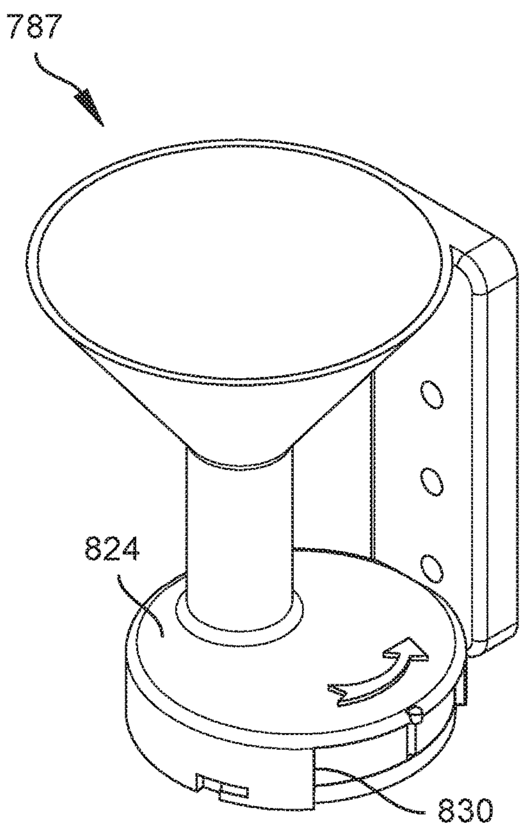
Figure 152B:
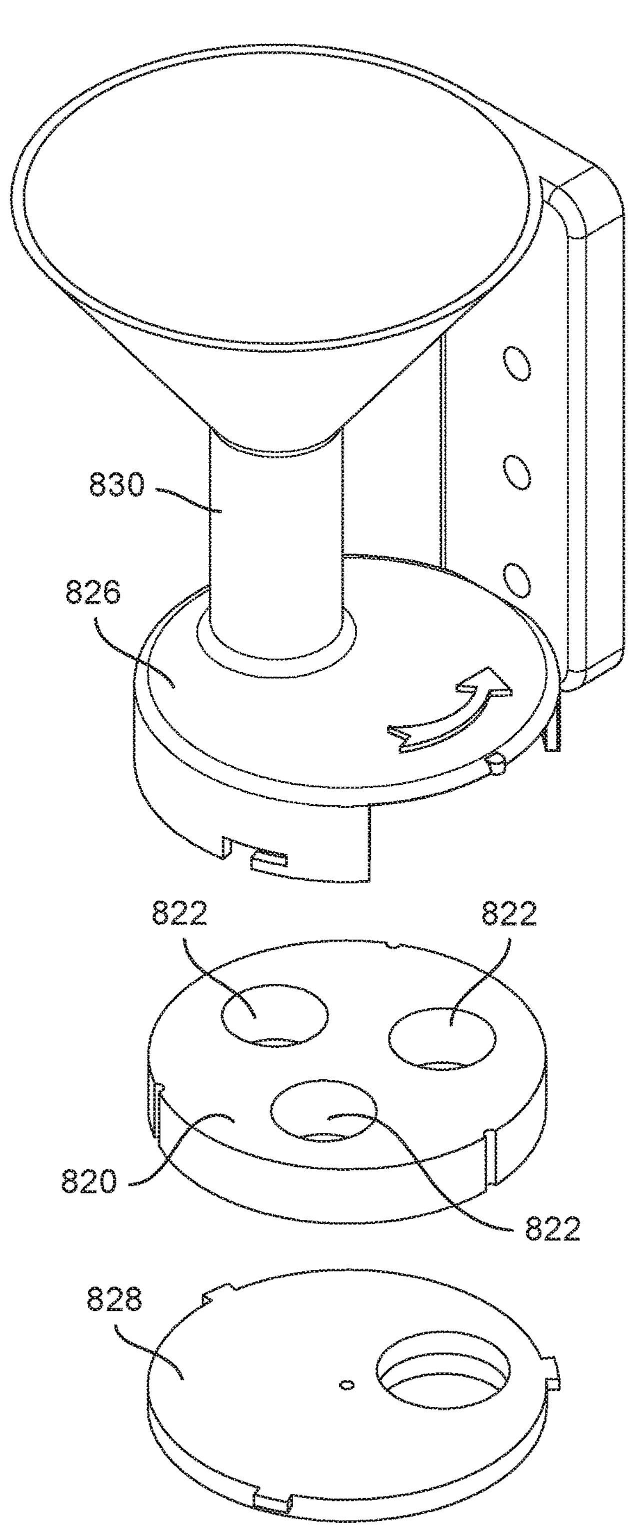
Figure 153A:
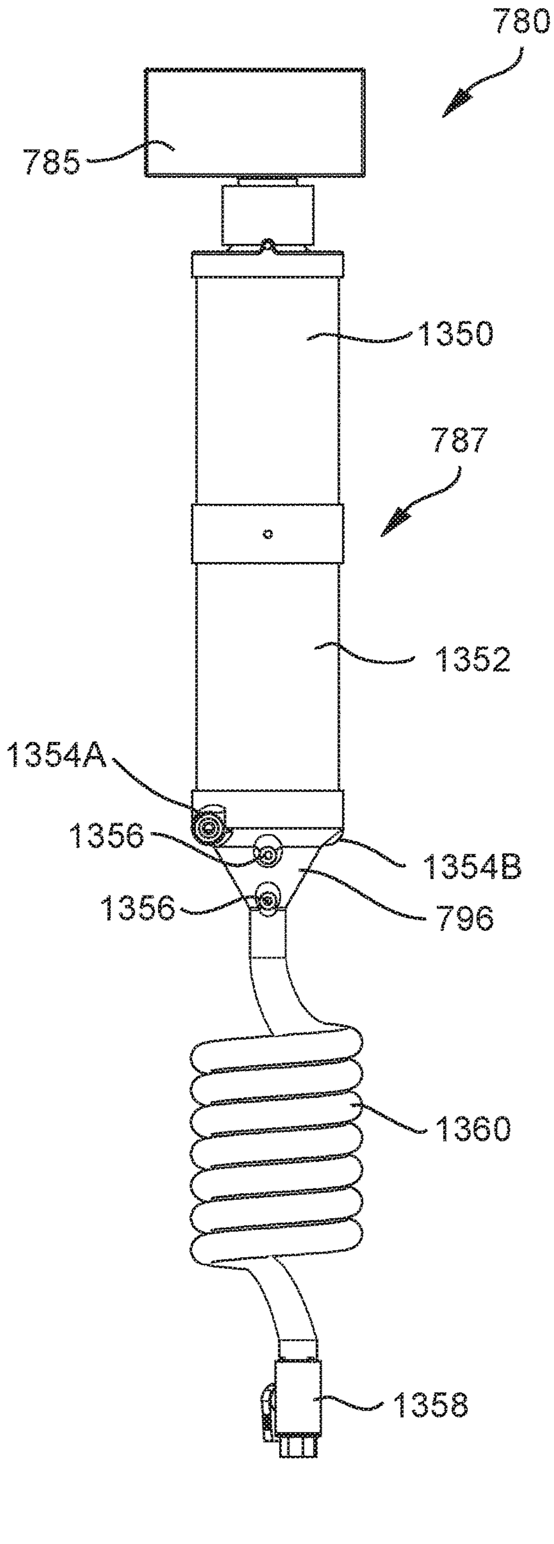
Figure 153B:
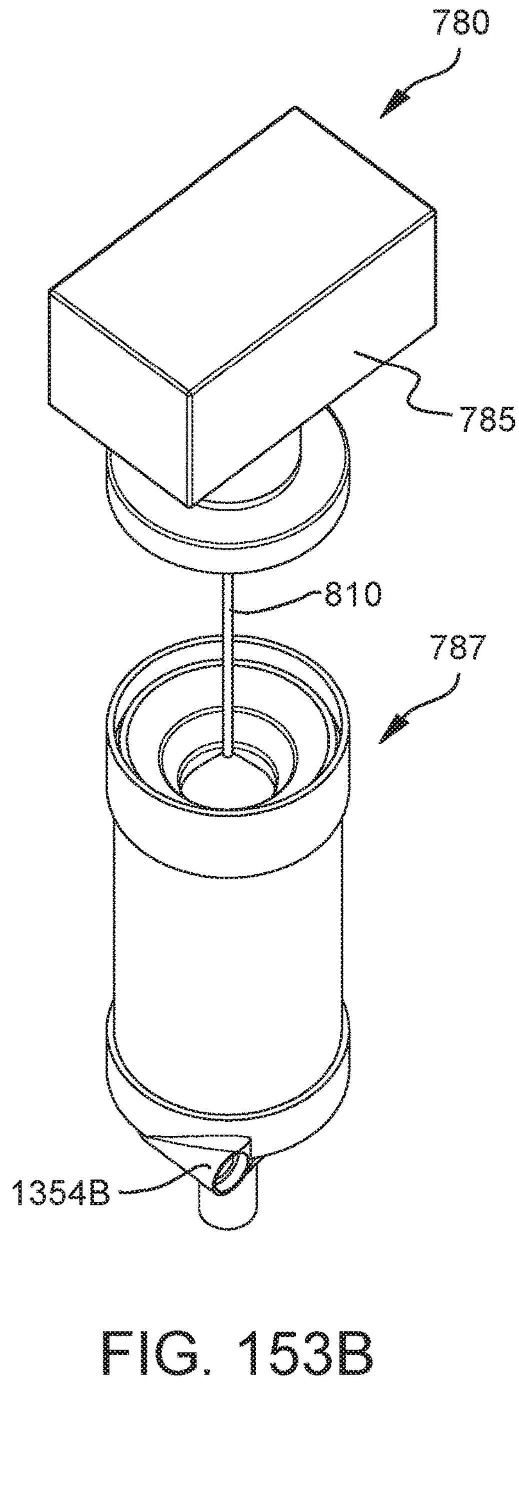
Figure 154:
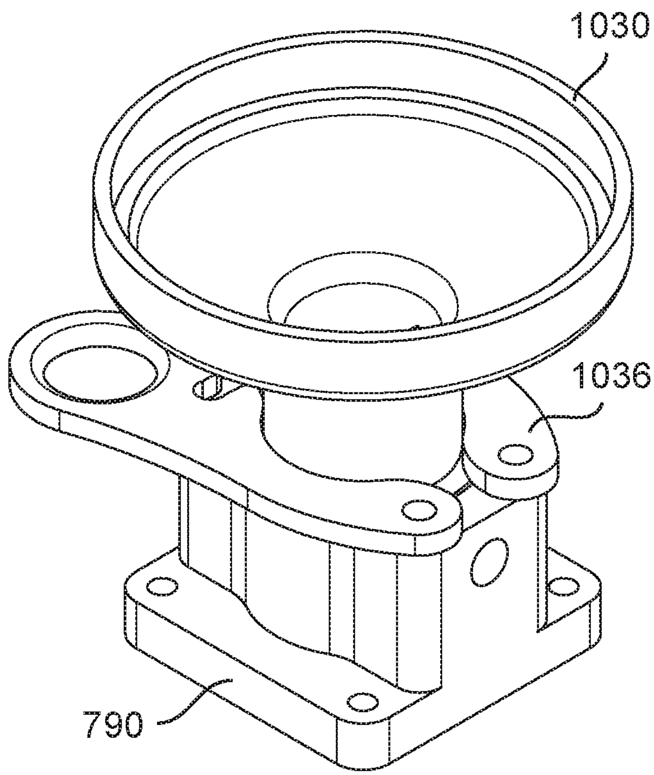
Figure 155:
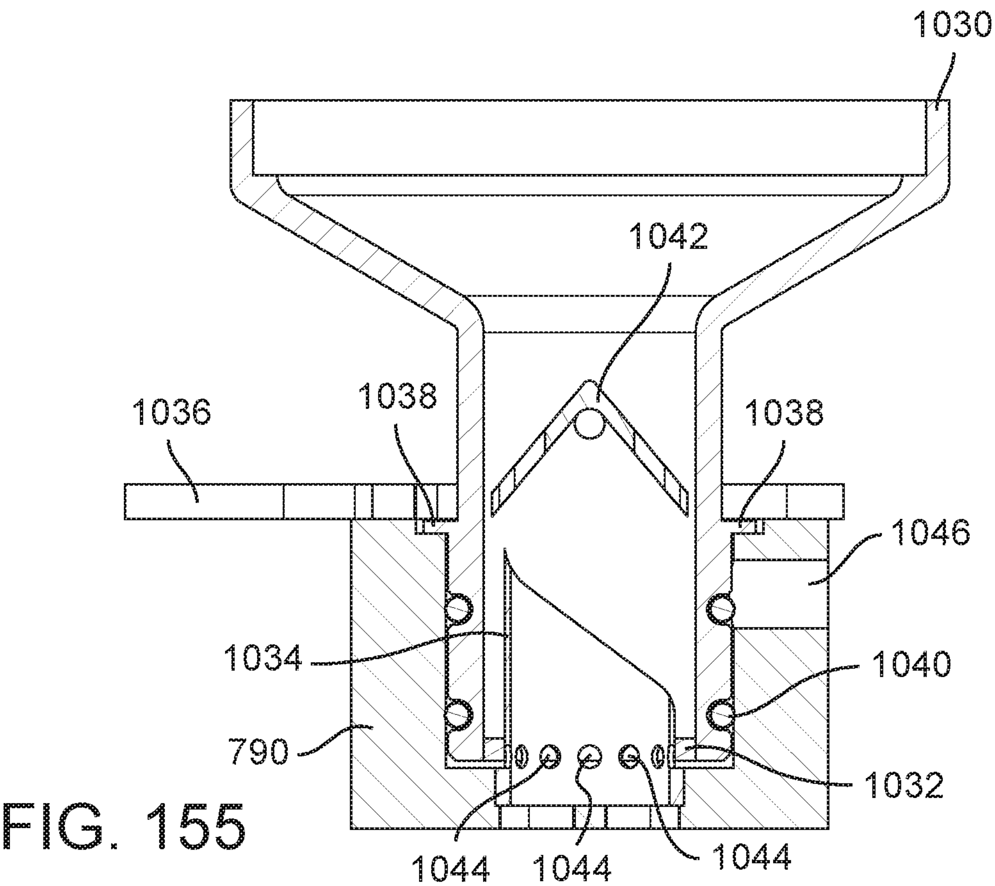
Figure 156:
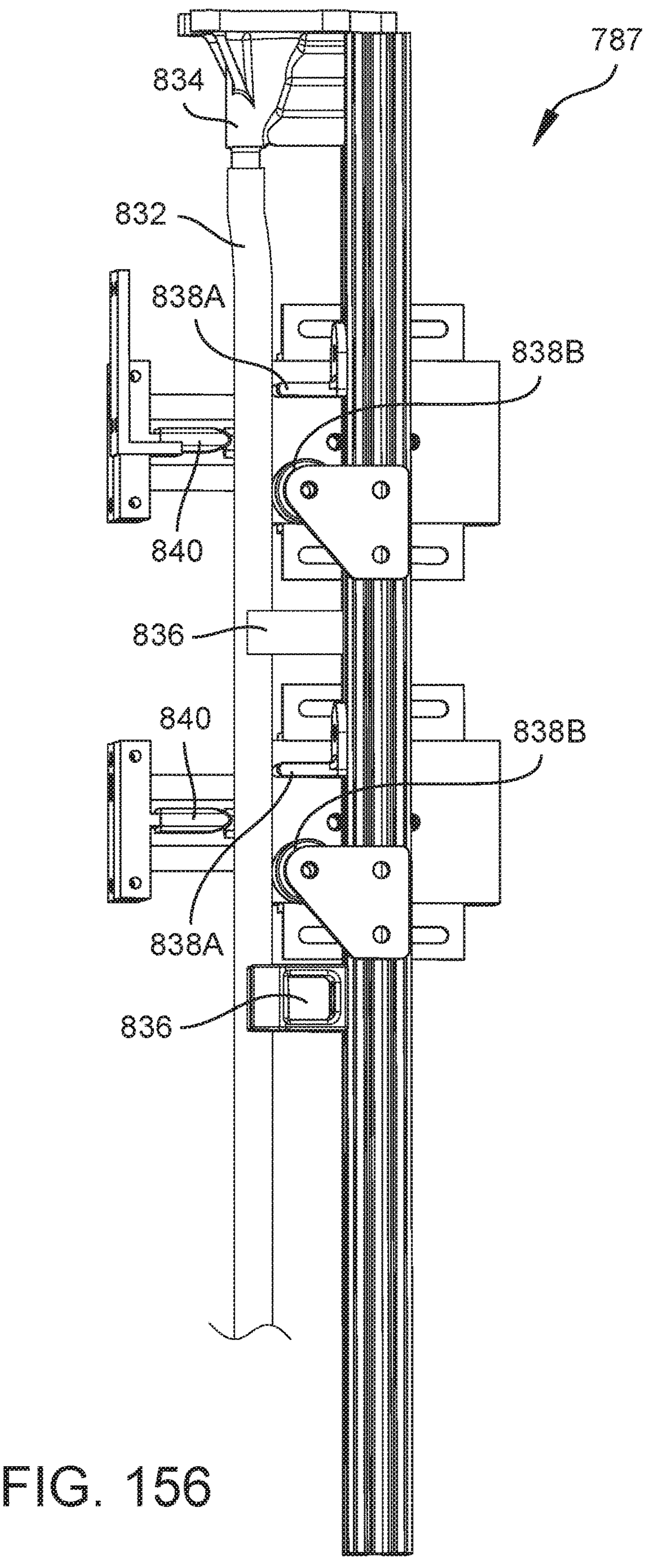
Figure 157:
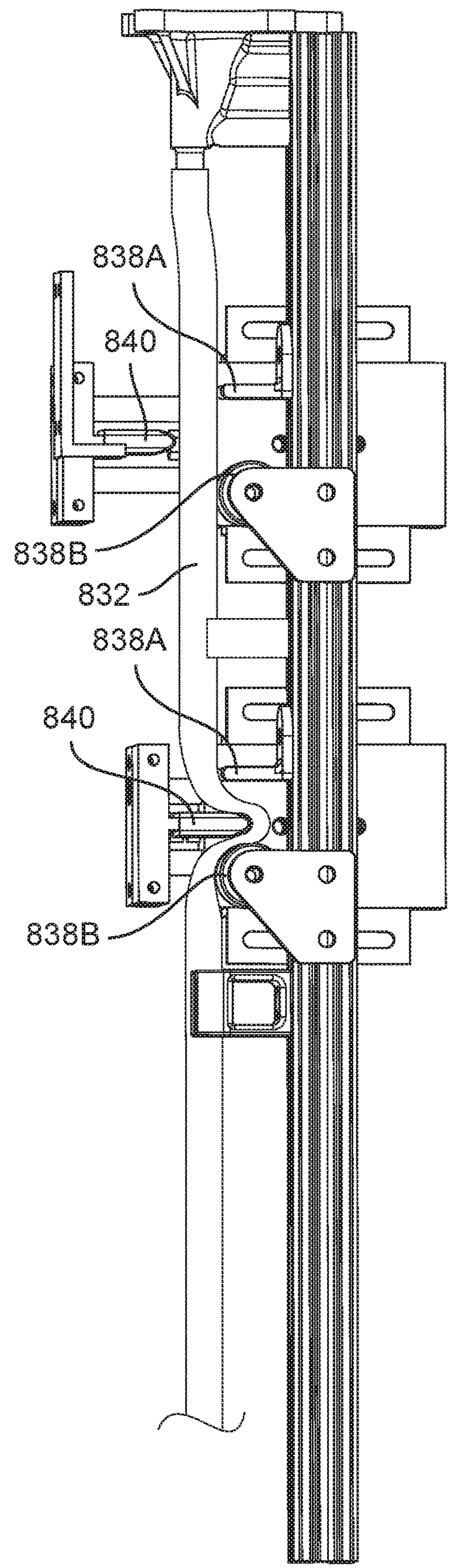
Figure 158:
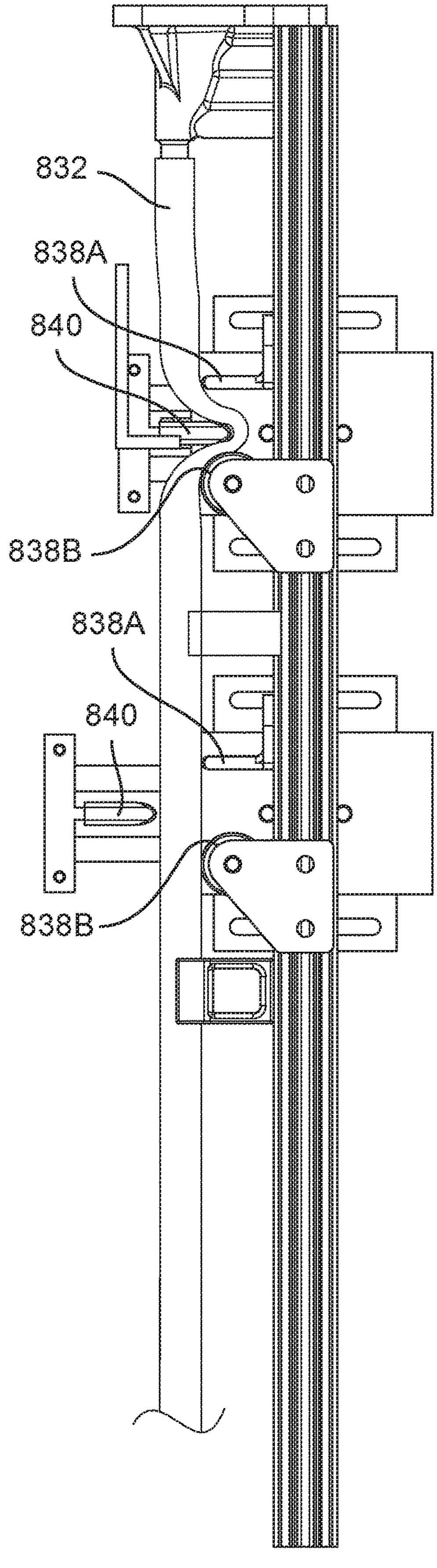
Figure 159:
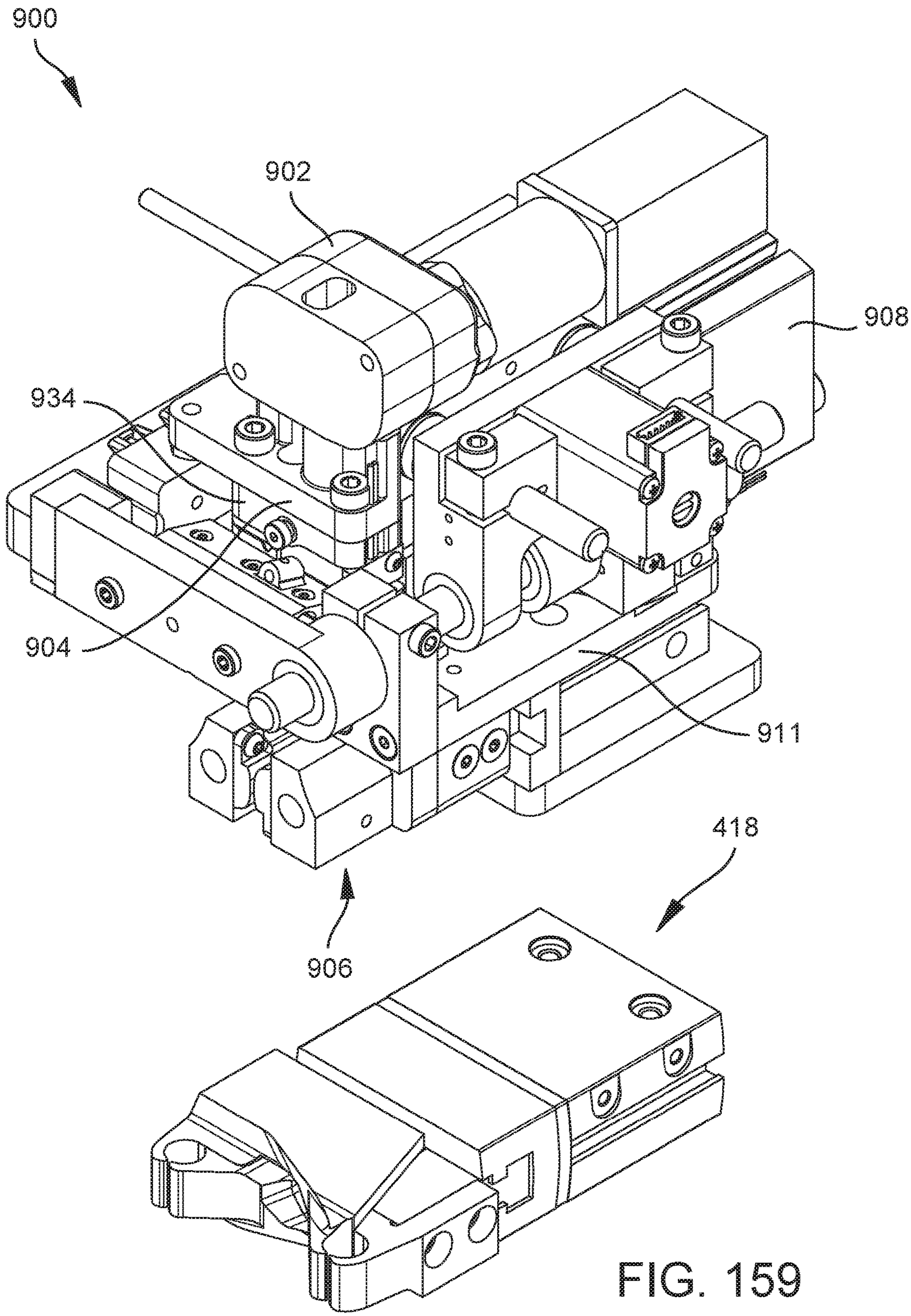
Figure 160:
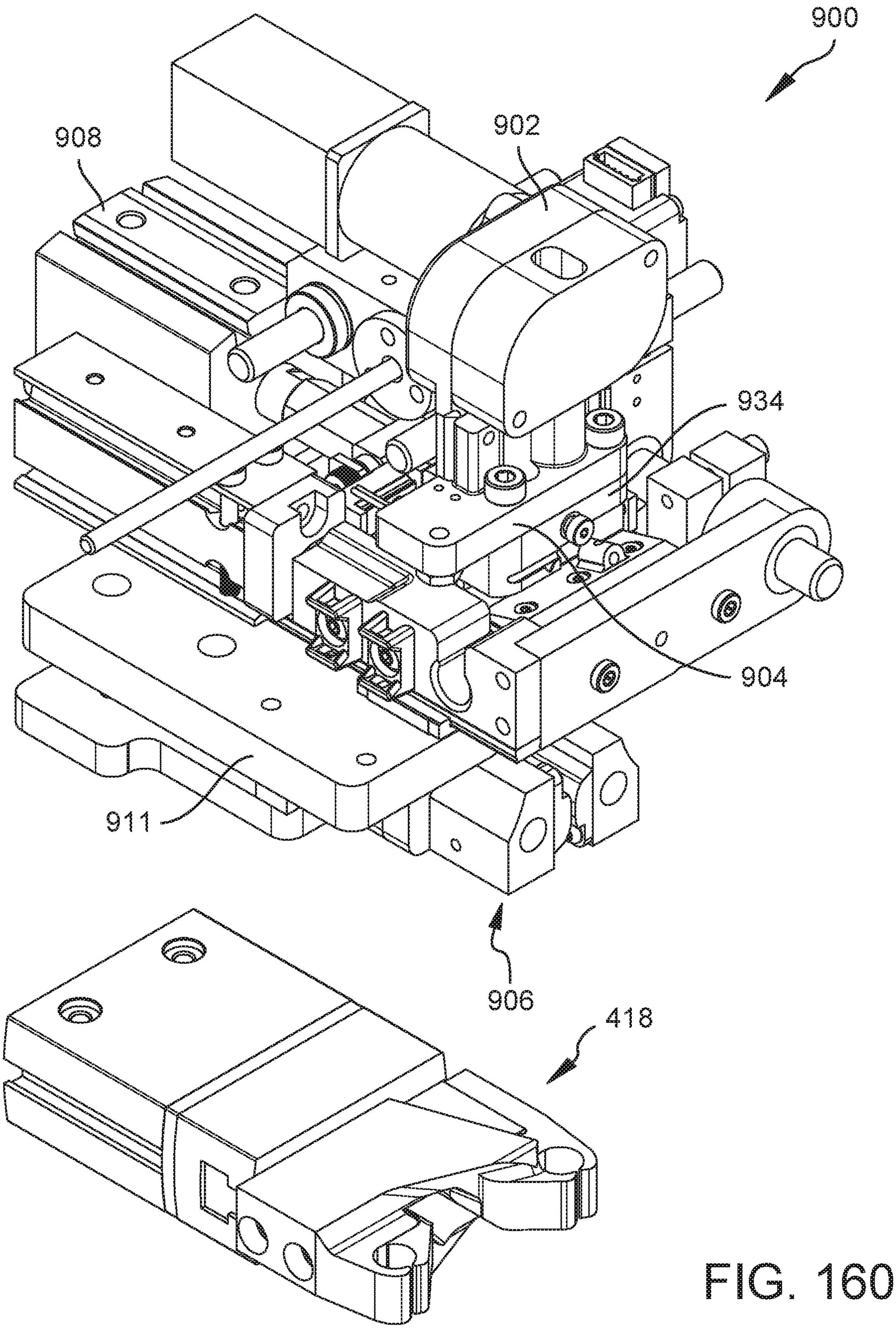
Figure 161:
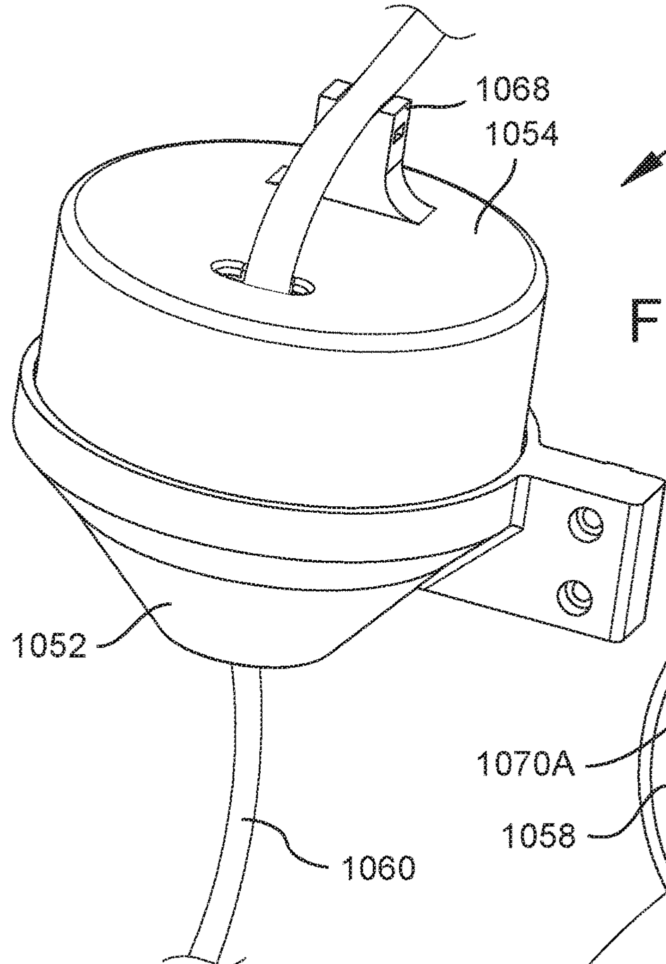
Figure 162:
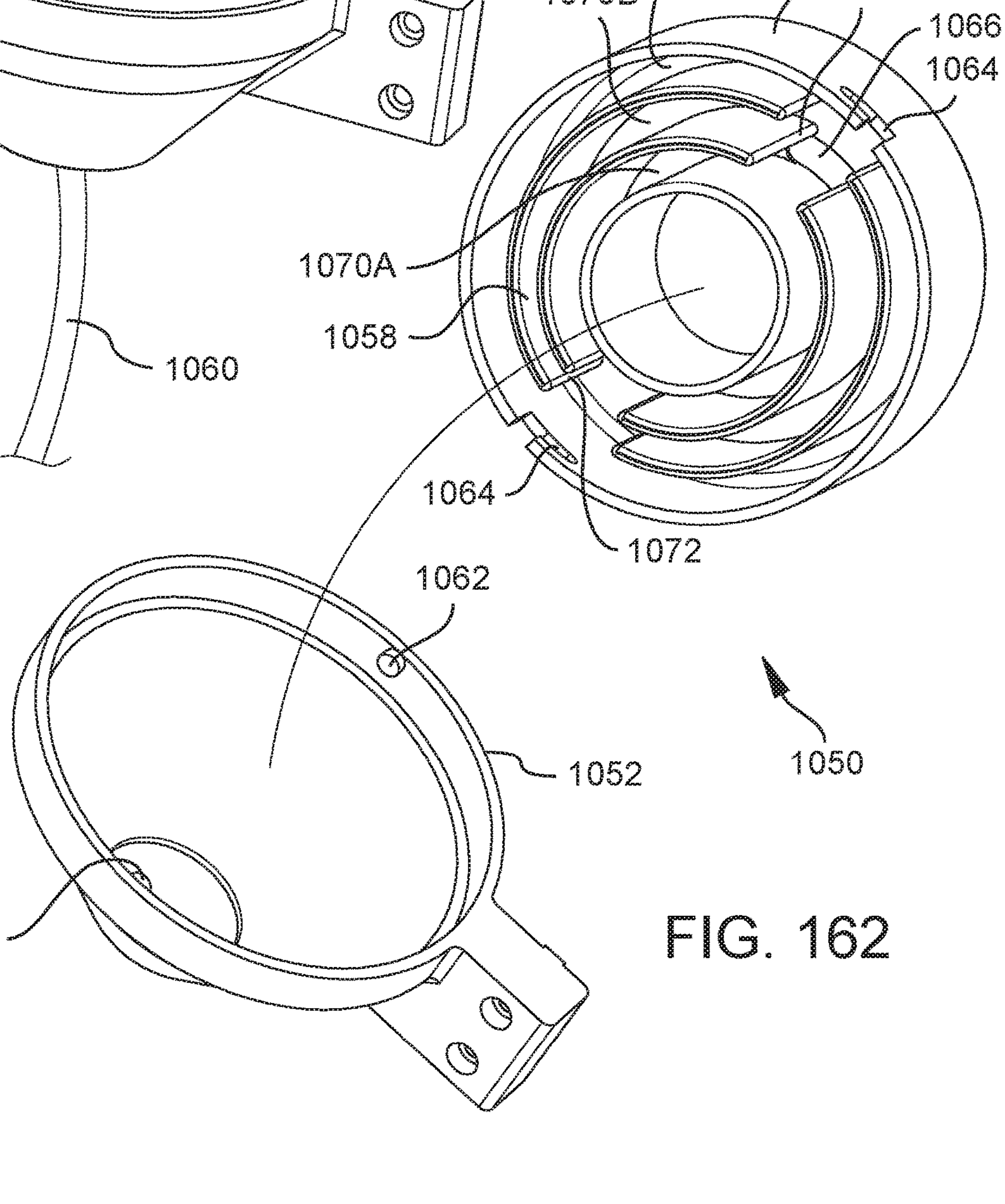
Figure 163:
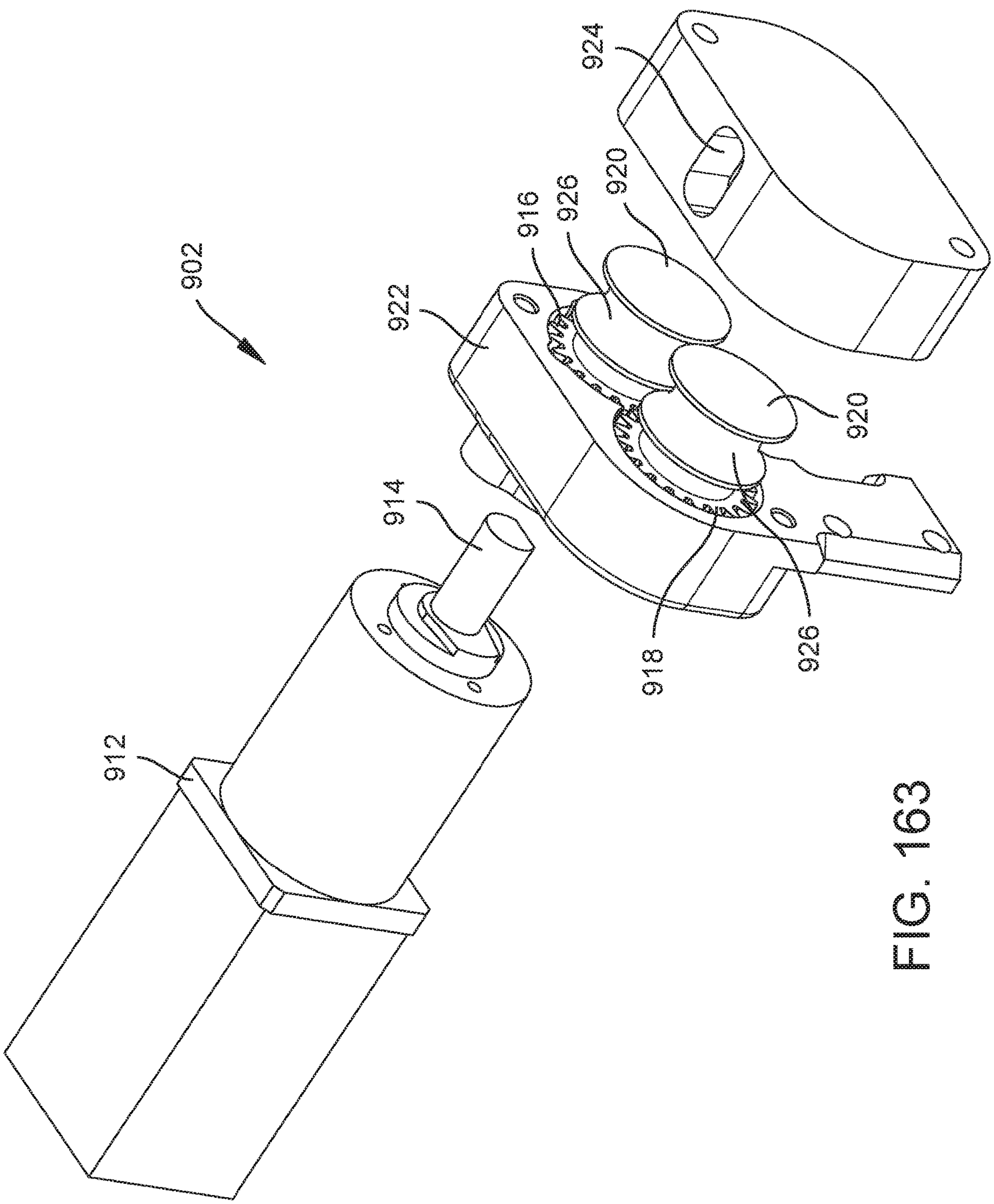
Figure 164:
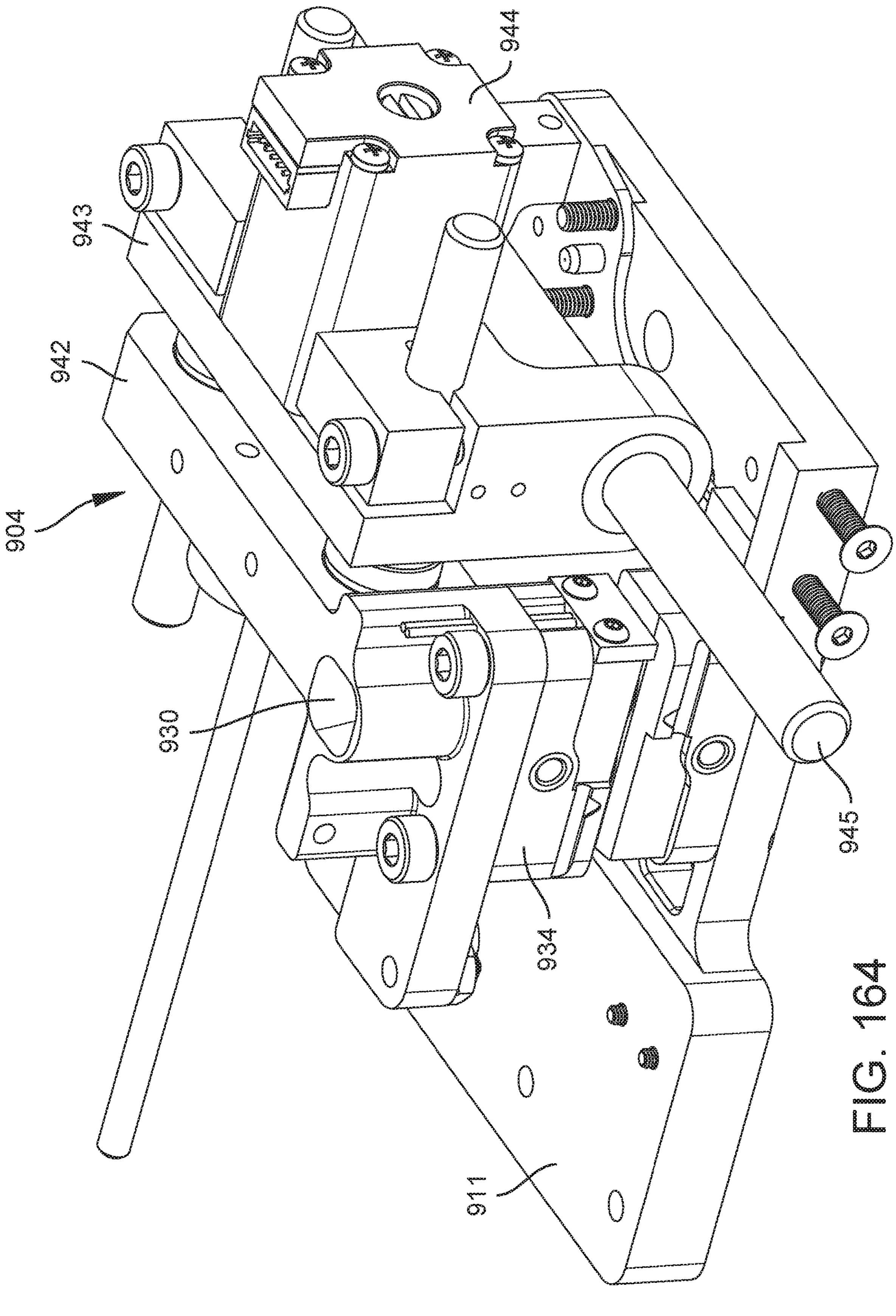
Figure 165:
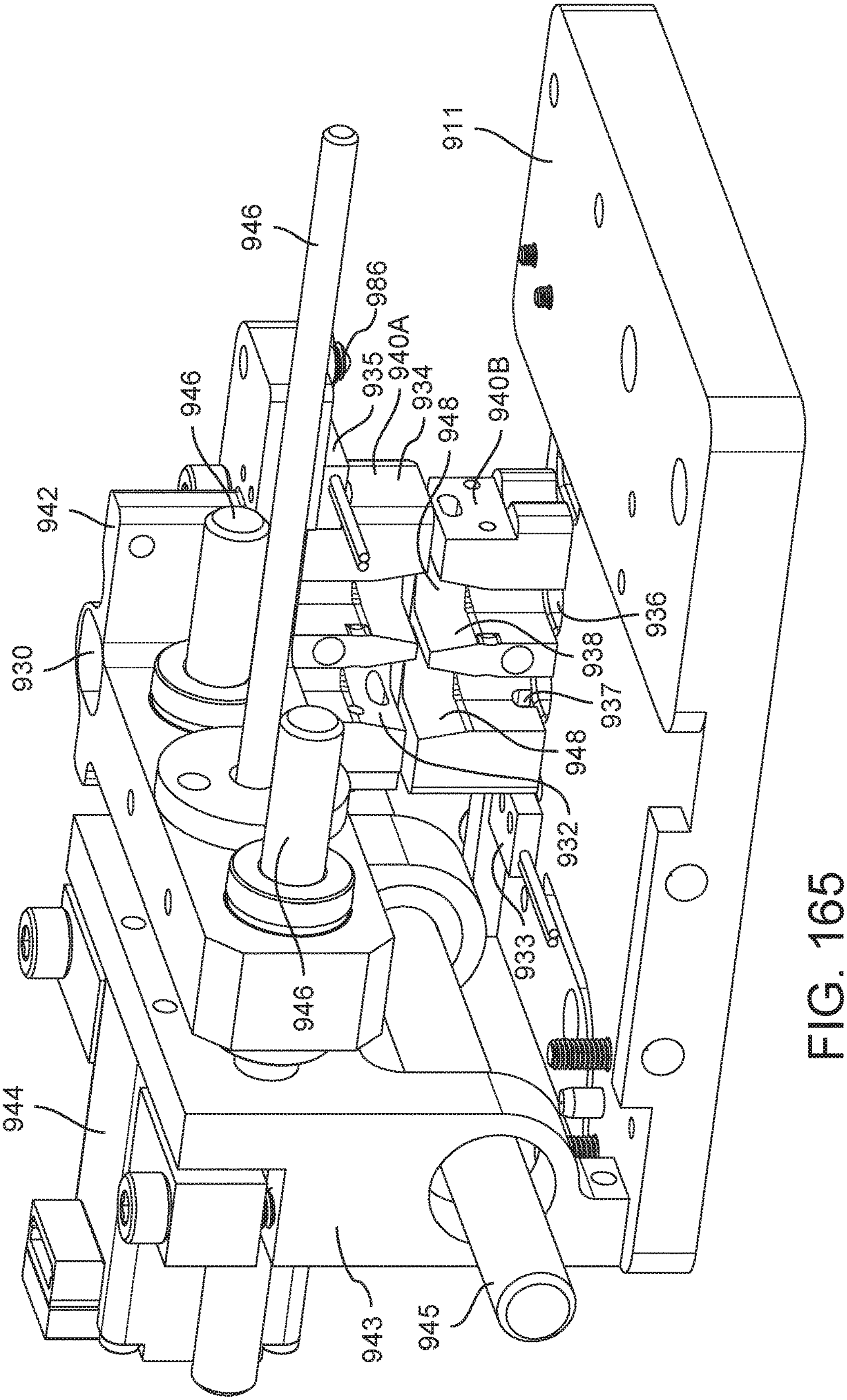
Figure 166:
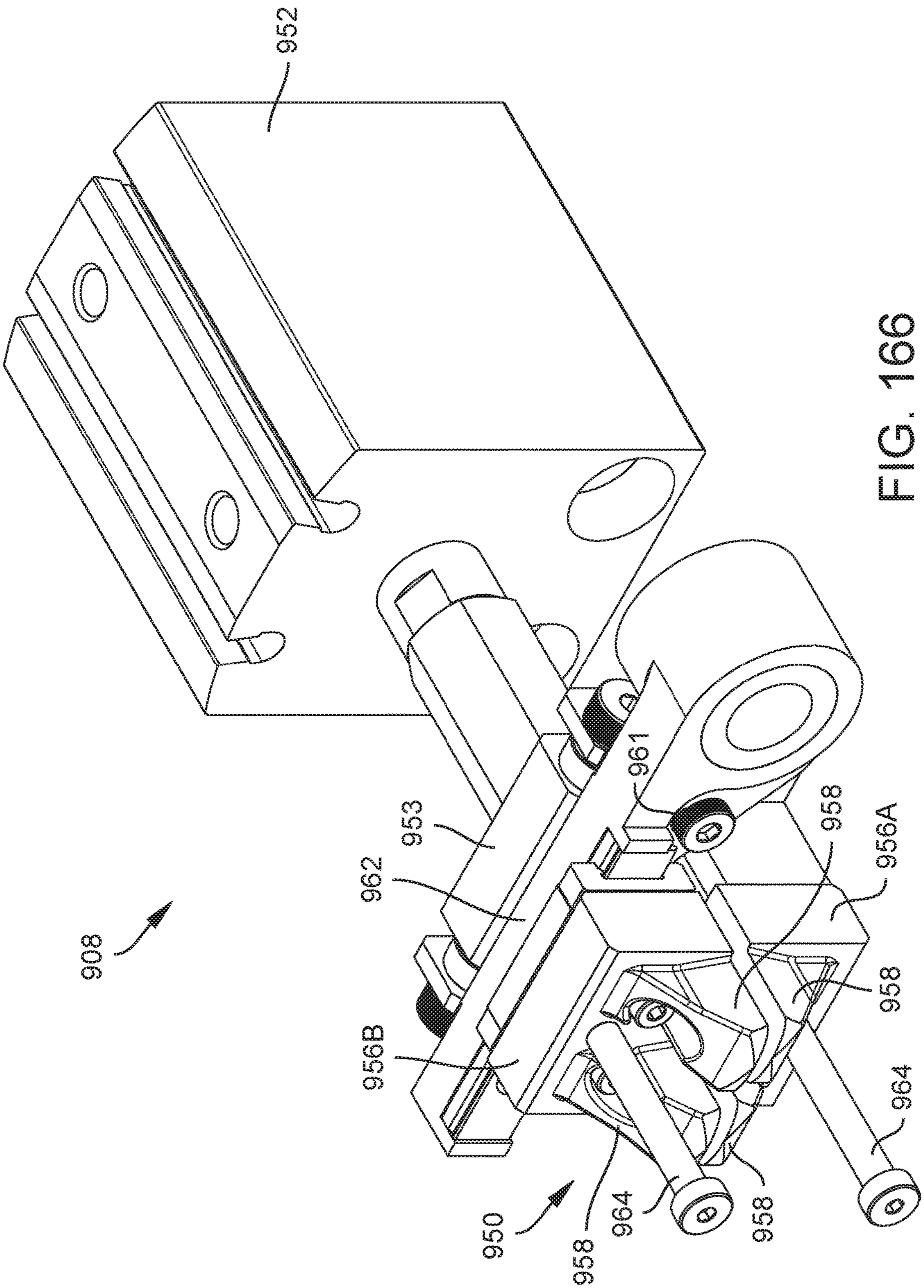
Figure 167:
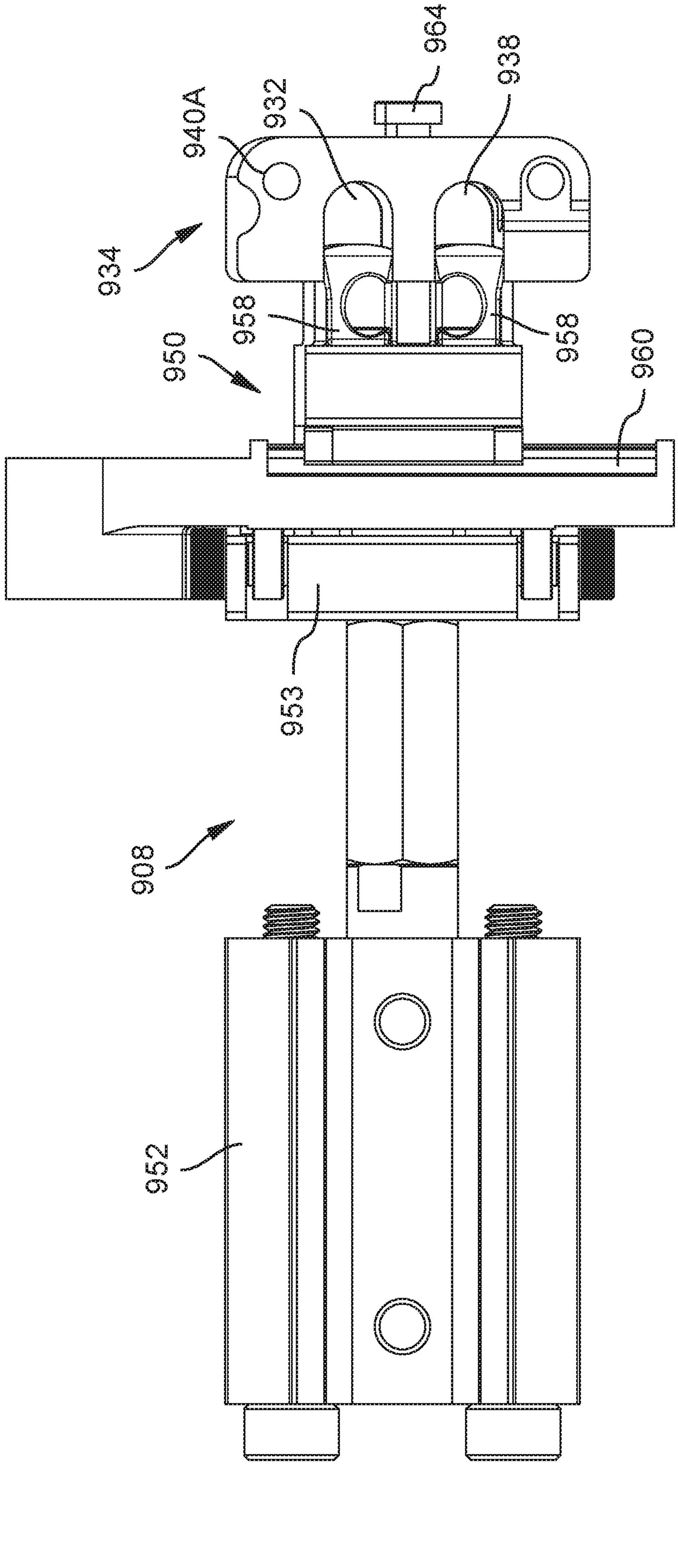
Figure 168:
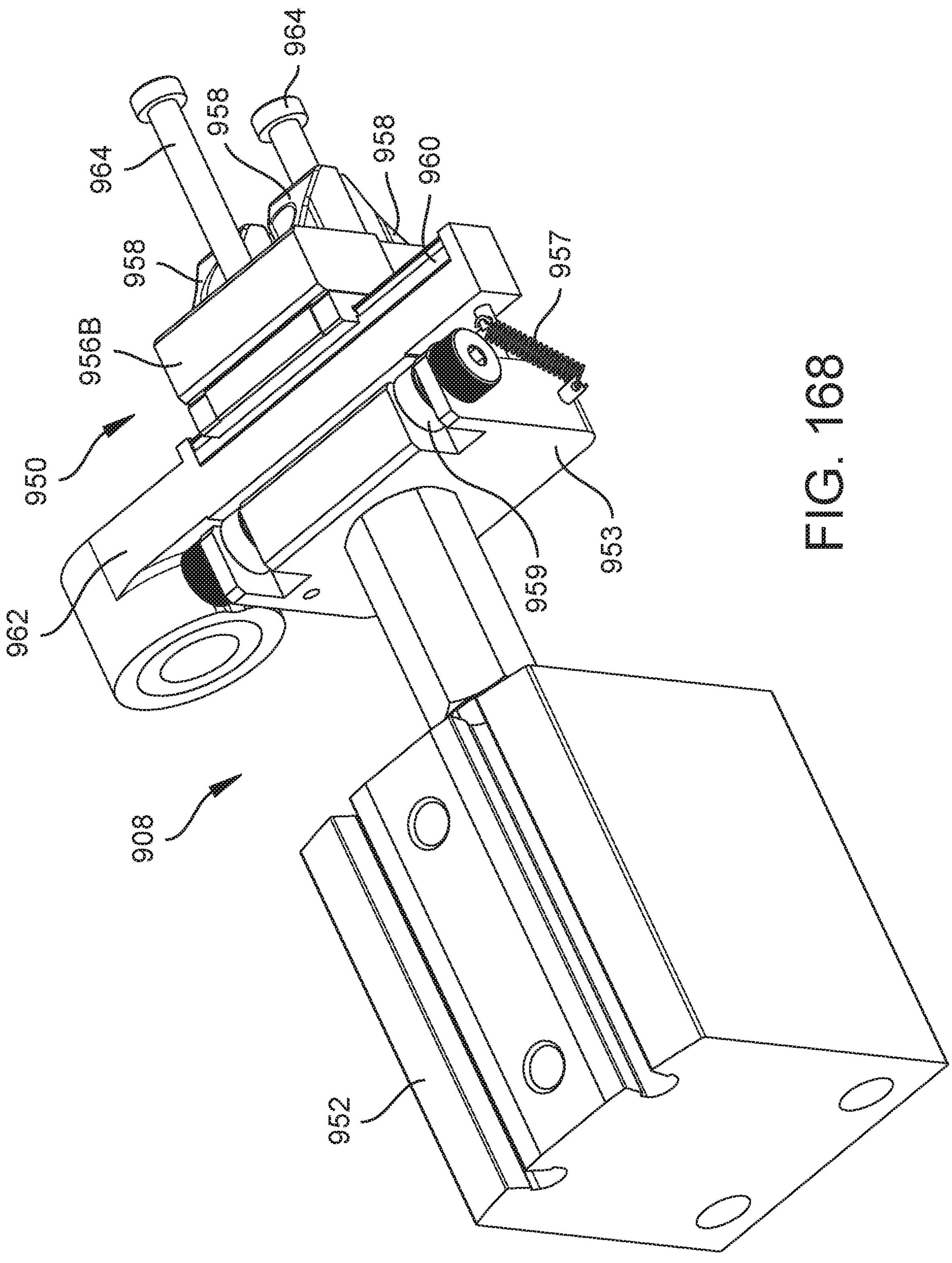
Figure 169:
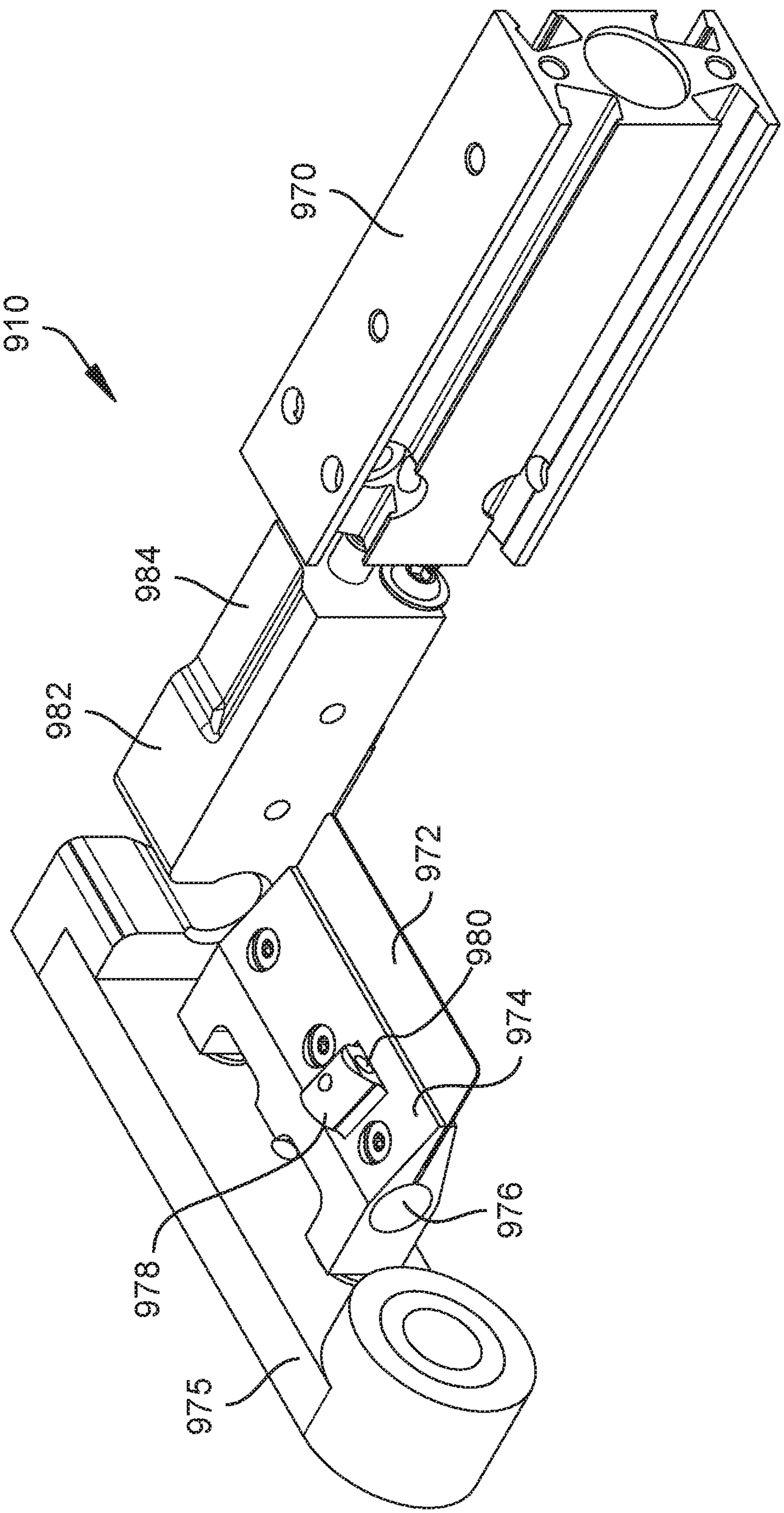
Figure 170:
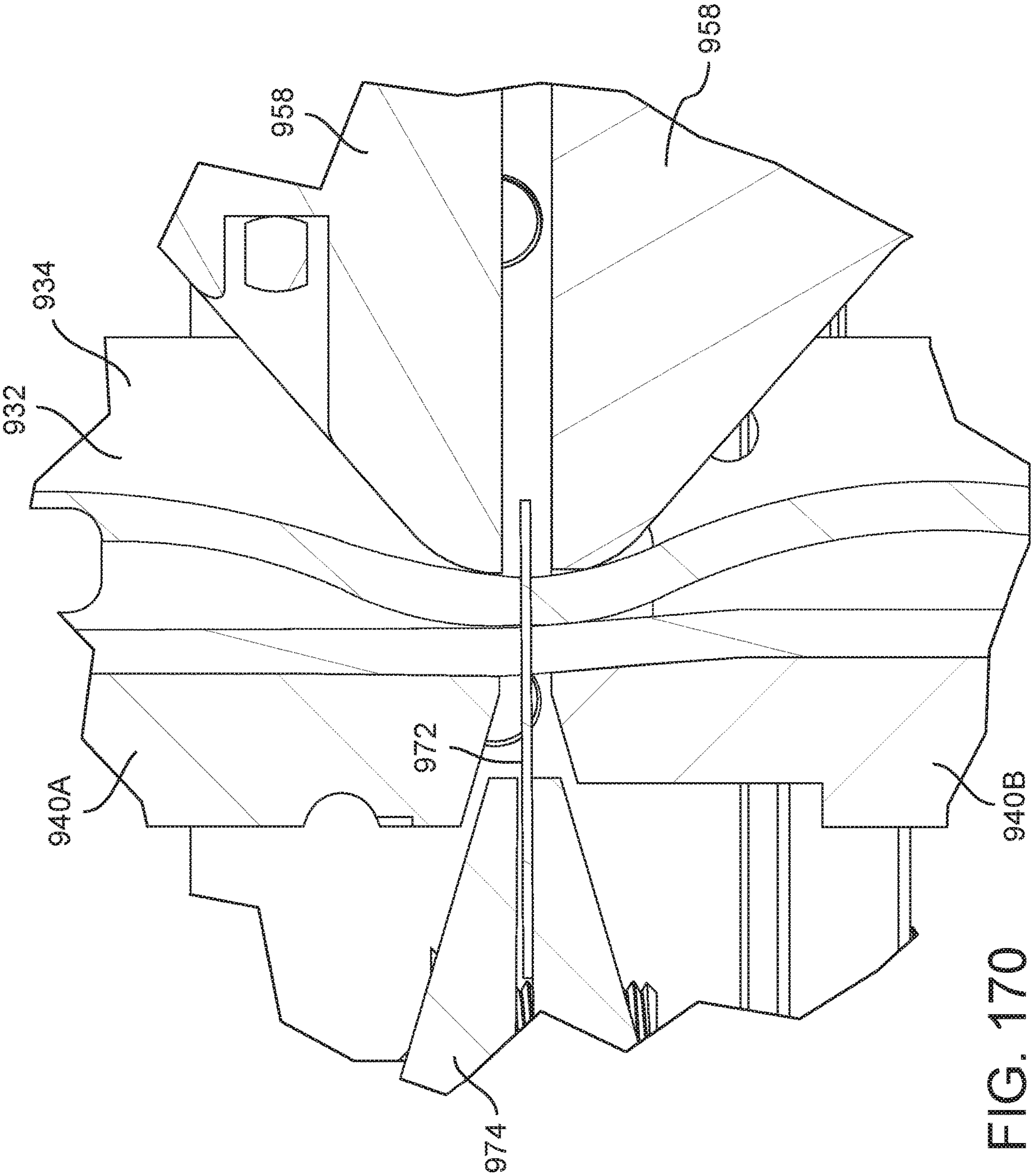
Figure 171:
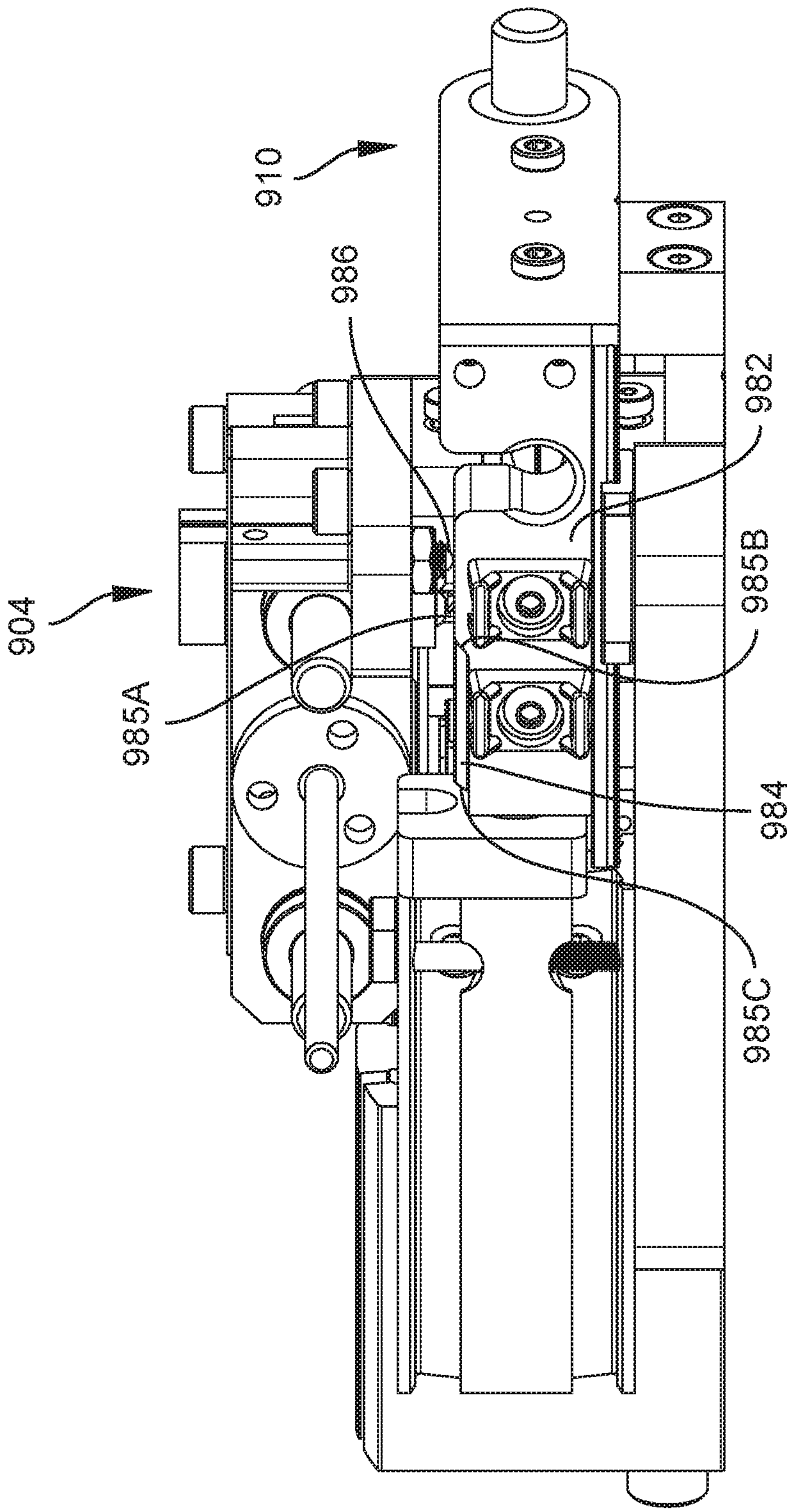
Figure 172:
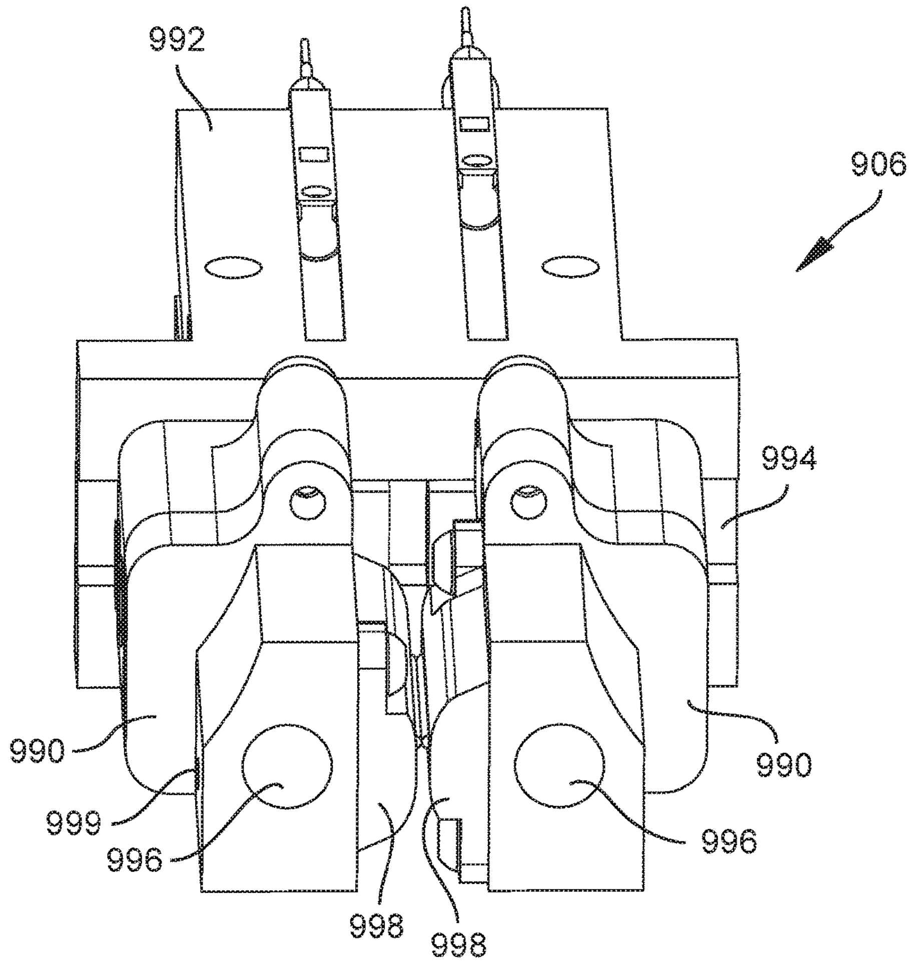
Figure 173:
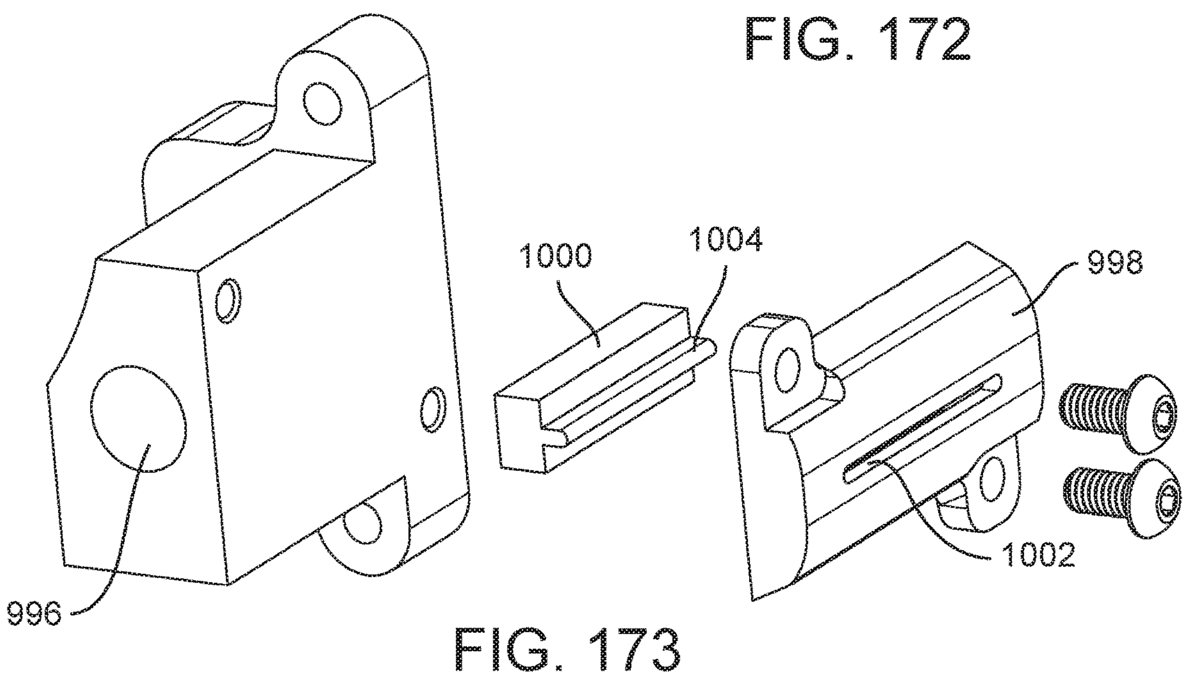
Figure 174:
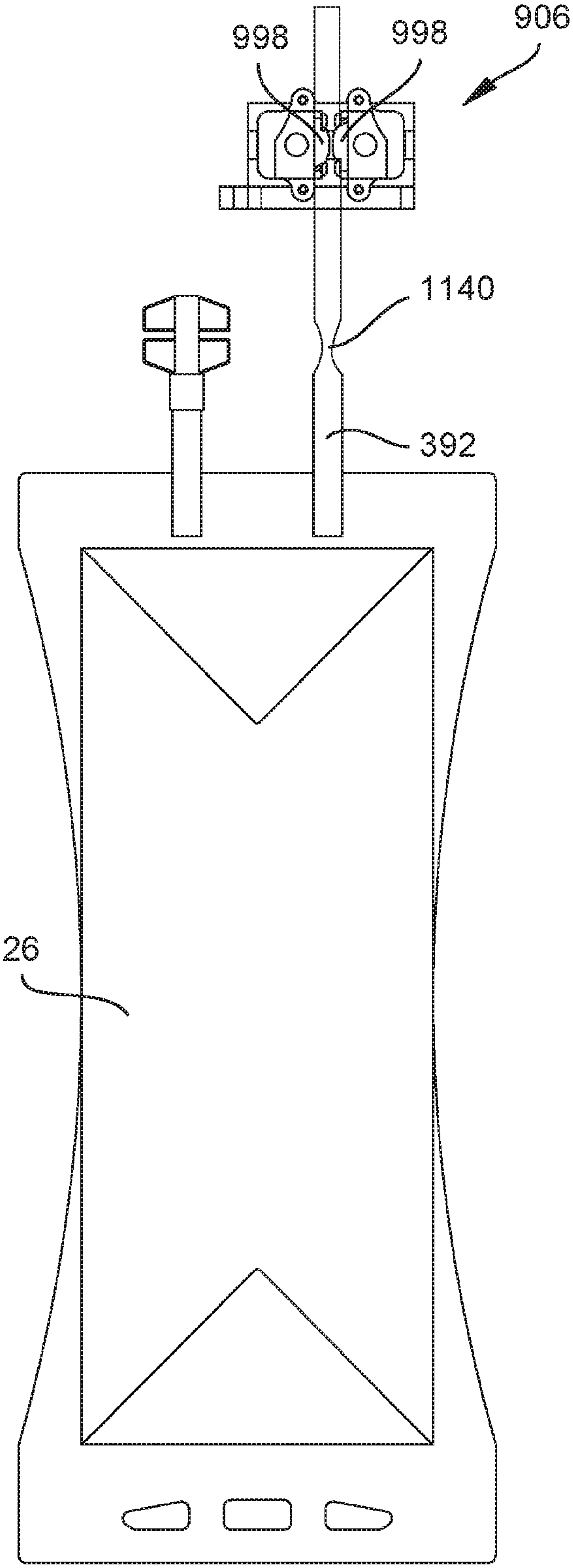
Figure 175:
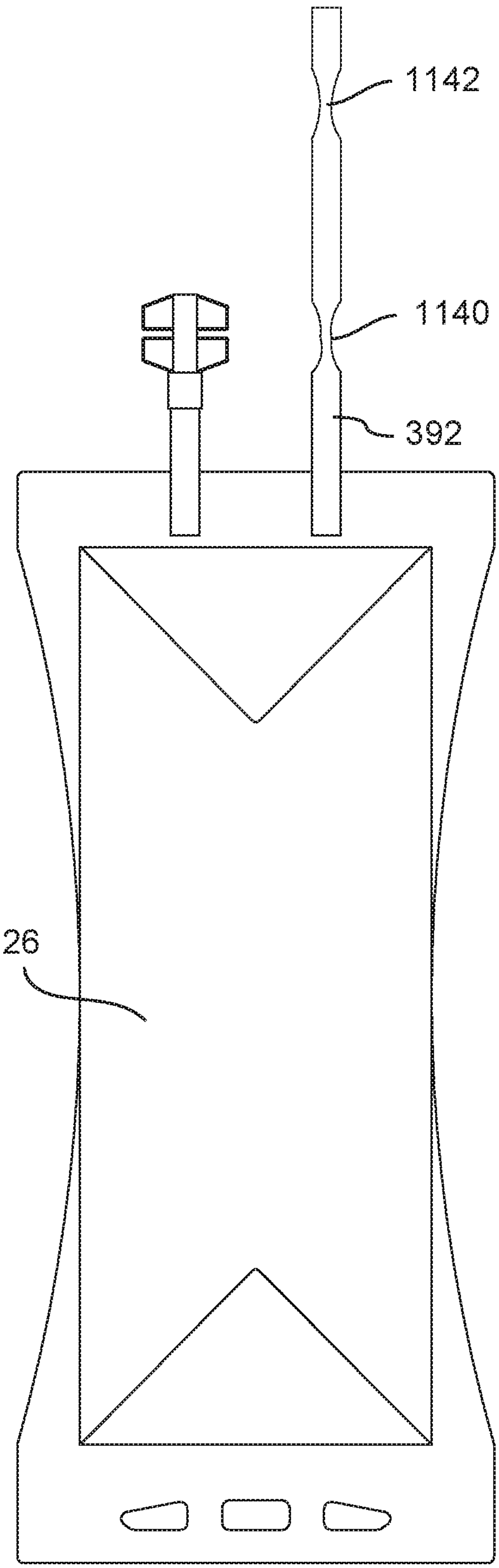

FIG. 134 depicts a perspective view of an example filling station;

FIG. 135 depicts another perspective view of an example filling station;

FIG. 136 depicts another perspective view of an example filling station;

FIG. 137 depicts a top down view of an example spike port which may be included in a filling station;

FIG. 138 depicts a block diagram of an example fluid circuit which may be included in an example system for producing and packaging a medical fluid;

FIG. 139 depicts a flowchart detailing a number of example action which may be executed to generate a desired fluid;

FIG. 140 depicts a portion of an example mixing circuit including an example crystalline constituent dispenser;

FIG. 141 depicts a dosing manifold of which may be included in an example mixing circuit;

FIG. 142 depicts a perspective view of an example crystalline constituent dispenser;

FIG. 143 depicts the example crystalline constituent dispenser of FIG. 142 with a portion broken away to shown internal components of the crystalline constituent dispenser;

FIG. 144 depicts a perspective view of an example crystalline constituent dispenser;

FIG. 145 depicts the example crystalline constituent dispenser of FIG. 144 with a portion broken away to shown internal components of the crystalline constituent dispenser;

FIG. 146 depicts a perspective view of an exemplary paddle wheel which may be included an example crystalline constituent dispenser;

FIG. 147 depicts a perspective view of an example crystalline constituent dispenser;

FIG. 148 depicts the example crystalline constituent dispenser of FIG. 147 with a portion broken away to shown internal components of the crystalline constituent dispenser;

FIG. 149 depicts a side view of an example dispensing assembly which may be included in an example crystalline constituent dispenser;

FIG. 150 depicts a cross sectional view of the example dispensing assembly of FIG. 149;

FIG. 151 depicts a perspective view of an example dispensing disc which may be included within an example dispensing assembly of an example crystalline constituent dispenser;

FIG. 152A depicts a perspective view of an example dispensing assembly which may be included in an example crystalline constituent dispenser;

FIG. 152B depicts an exploded view of the example dispensing assembly shown in FIG. 152A;

FIG. 153A depicts a front view of another example crystalline constituent dispenser;

FIG. 153B depicts a perspective view of the example crystalline constituent dispenser of FIG. 153A with certain components removed;

FIG. 154 depicts a perspective view of an example port of a dosing manifold with an example outlet which may be included in a crystalline constituent dispenser docked thereon;

FIG. 155 depicts a cross sectional view of the example port and example outlet shown in FIG. 154;

FIG. 156 depicts a side view of another example dispensing assembly which may be included in a crystalline constituent dispenser;

FIG. 157 depicts a side view of an example dispensing assembly which may be included in a crystalline constituent dispenser;

FIG. 158 depicts a side view of an example dispensing assembly which may be included in a crystalline constituent dispenser;

FIG. 159 depicts a perspective view of an example tube welding assembly;

FIG. 160 depicts another perspective view of an example tube welding assembly;

FIG. 161 depicts a perspective view of an example conduit dispenser which may be included in a tube welding assembly;

FIG. 162 depicts an exploded view of an example conduit dispenser;

FIG. 163 depicts an exploded view of an example conduit feed assembly which may be included in a tube welding assembly;

FIG. 164 depicts a perspective view of components of an example tube welding assembly;

FIG. 165 depicts a perspective view of components of an example tube welding assembly;

FIG. 166 depicts a perspective view of an example occluder assembly which may be included in an example tube welding assembly;

FIG. 167 depicts a top down view of an example occluder assembly which may be included in an example tube welding assembly;

FIG. 168 depicts a perspective view of an example occluder assembly which may be included in an example tube welding assembly;

FIG. 169 depicts a perspective view of an example cutter assembly which may be included in an example tube welding assembly;

FIG. 170 depicts a cross sectional view of a piece of tubing being occluded by an example occluder assembly and an example cutter assembly;

FIG. 171 depicts a perspective view of components of an example tube welding assembly;

FIG. 172 depicts a perspective view of an example bag sealing assembly which may be included in a tube welding assembly;

FIG. 173 depicts an exploded view of an example jaw of an example bag sealing assembly;

FIG. 174 depicts a front view of an example bag having a fill port in which a sample aliquot is being isolated by a bag sealing assembly; and FIG. 175 depicts a front view of an example bag having a sample aliquot sealed within a fill port of the bag.

These and other aspects will become more apparent from the following detailed description of the various embodiments of the present disclosure with reference to the drawings wherein:

DETAILED DESCRIPTION

Figure 1:
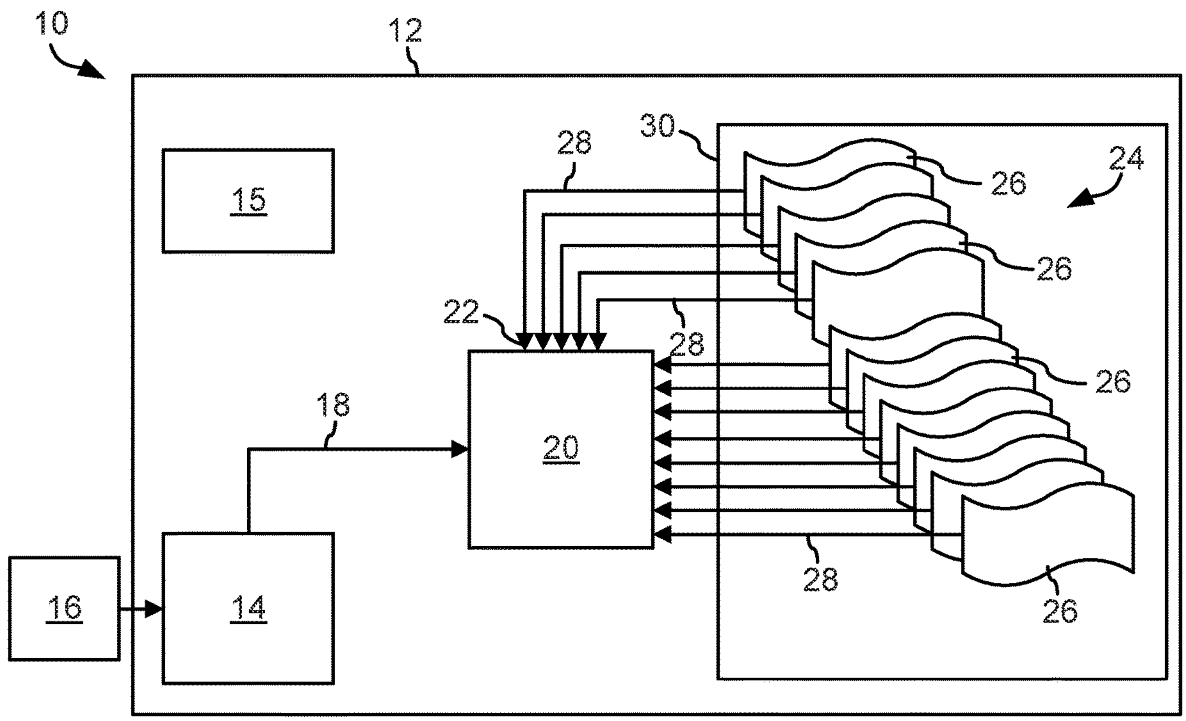
FIG. 1 depicts a diagrammatic example embodiment of a system for producing and packaging medical fluids.

Referring now to FIG. 1, a system 10 for producing and packaging medical fluids is shown. The system 10 includes an enclosure 12. The enclosure 12 may be a clean room of any suitable certification level. The enclosure 12 may also be a housing which may be placed inside of a clean room. In such embodiments, the enclosure 12 or a compartment thereof may be constructed to conform to a higher certification level than the surrounding environment. Additionally, within the enclosure 12 there may be compartments which conform to different clean room level standards.

Within the enclosure 12, a number of system 10 components may be housed. For example, a medical water production device 14 may be included within the enclosure 12 of the system 10. The medical water production device 14 may be or include any suitable water production device such as a filtration device (charcoal, ultrafilter, endotoxin removal filter, reverse osmosis, microfilter, depth filter, etc.), distillation device, deaeration device (distillation devices may double as such), UV light source, chemical treatment device, exchange resin, electrodeionization unit, etc. or combination thereof. In certain embodiments, the medical water production device 14 may be a distillation device such as that described in U.S. Pat. No. 9,308,467, entitled Water Vapor Distillation Apparatus, Method, and System, issued Apr. 12, 2016 which is incorporated by reference herein in its entirety. Alternatively, the medical water production device 14 may be a distillation device such as that described in application Ser. No. 16/370,038, entitled Water Distillation Apparatus, Method, and System, filed Mar. 29, 2019, which is incorporated by reference herein in its entirety. The medical water production device 14 may generate water which conforms to various compendial specifications or may generate water adhering to some non-compendial specification. The medical water production device 14 may, for example, produce USP (or another pharmacopeia) water for injection (WFI), highly purified water, low pyrogen water, etc.

In alternative embodiments, the medical water production device 14 may not be included in the enclosure 12. Instead, the medical water production device 14 may be in a separate enclosure within a clean room, or may in some embodiments be located in a non-clean room environment or a lower certification clean room environment then the rest of the system 10. The output of the medical water production device 14 may be plumbed from the outlet of the medical water production device 14 to the rest of the system 10. The medical water production device 14 may receive input water from any suitable source 16. In some examples, this source 16 may be a municipal water supply line. In alternative embodiments, the source 16 may be a reservoir of pretreated (e.g. via filtration, UV, softened) water which the medical water production device 14 draws from. In some embodiments, the source 16 may be a large container or bladder. Where the system 10 produces a compendial fluid, the source 16 may conform to any requirements specified for acceptable sources which may be used to generate that compendial fluid. For example, the source may be EPA acceptable drinking water.

As the medical water production device 14 generates purified water, the water may be output to an outlet line 18 after being subjected to various quality testing. If any output water fails quality testing, the output water may be diverted to a discard location or recirculated to the input of the medical water production device 14 for further purification. The output line 18 of the system 10 may connect to a manifold 20. The manifold 20 may include fluid channels and one or more valve or actuator which selectively split or direct the purified water input flow into a plurality of separate outlet fluid channels. In some embodiments, the manifold 20 may be devoid of valves and instead passively furcate the incoming purified water. The manifold 20 may include a number of couplings. These couplings may couple to manifold interface elements 22 of a fill receiving set 24. The fill receiving set 24 may include at least one IV bag 26 and administration set 28. The manifold interface elements 22 may be luer fittings in some embodiments. In alternative embodiments, the manifold interface elements 22 may be quick connect fitting. In some embodiments, administration sets 28 may be bonded or fixedly attached to the manifold 20 (which may include port projections extending from the manifold 20). Manifolds 20 may also include barbed fittings over which the administration set 28 tubing is secured.

In the exemplary embodiment shown in FIG. 1, the fill receiving set 24 includes a plurality of IV bags 26 and administration sets 28. In such embodiments, the plurality of IV bags 26 and administration sets 28 may be bundled in a parcel or package 30 which facilitates their installation into the system 10. In some embodiments, the package 30 may act as a dispenser which, for example, allows the topmost bag 26 and administration set 28 to be collected by a robotic grasper of the system 10. Each fill receiving set 24 may include up to or above 50-100 bag 26 administration set 28 pairs (though anywhere from 1-50 pairs or greater than 100 pairs is also possible). The administration set 28 lengths may be chosen so as to be clinically useful, but not long enough to present an excessive impedance issue when filling in the event that the bags 26 are filled via the administration sets 28 attached thereto. In some embodiments, the administration set 28 may be about 0.75-2.5 meters (e.g. one meter). The manifold interface elements 22 may be connectors which are capable of interfacing with coupling elements on accessory tubing sets as well as the manifold 20. Such accessory tubing sets may include extension lines, multi-way connectors such as Y-sets, V-sets, and T-sets, or potentially various access ports.

As purified water is produced by the medical water production device 14, the water may be routed via the manifold 20 to each IV bag 26 of the fill receiving set 24. Each IV bag 26 may be filled to capacity (or a desired, preset, or prescribed amount below capacity) and then removed from the system 10. The administration set 28 attached to each bag 26 may be left in a primed state by the system 10 (e.g. where the bag 26 is filled through the administration set 28). In certain embodiments, the manifold interface elements 22 may be decoupled from the manifold 20 and capped by the system 10 via a multi-axis robotic manipulator. In some embodiments, a clamp may be applied to the administration set 28 or displaced to an actuating position on the set 28 before decoupling or during the decoupling operation. Alternatively, a seal may be generated in the administration set 28 tubing or other fill conduit and the tubing may be severed from the manifold 20. This seal may be generated via heat, dielectric or RF welding, or any other suitable process. In such embodiments, the administration set 28 may include a branch upstream of the seal location to allow access to contents in the bag 26. In alternative embodiments, a user may manually decouple the bags 26 and administration sets 28 from the rest of the fill receiving set 24.

The system 10 may also include a control system 15 including one or more controller. The control system 15 may govern operation of manifold actuators or valves, the medical water production device 14, any robotic graspers and manipulators, and may use sensor data to fill bags 26 to their desired volumes. Controllers which may be used in the control system 15 may include microprocessors, FPGAs, PLCs, etc. The control system 15 may be in data communication (wired or wireless) with various sensors, manipulators, and other hardware of the system 10.

Figure 2A:
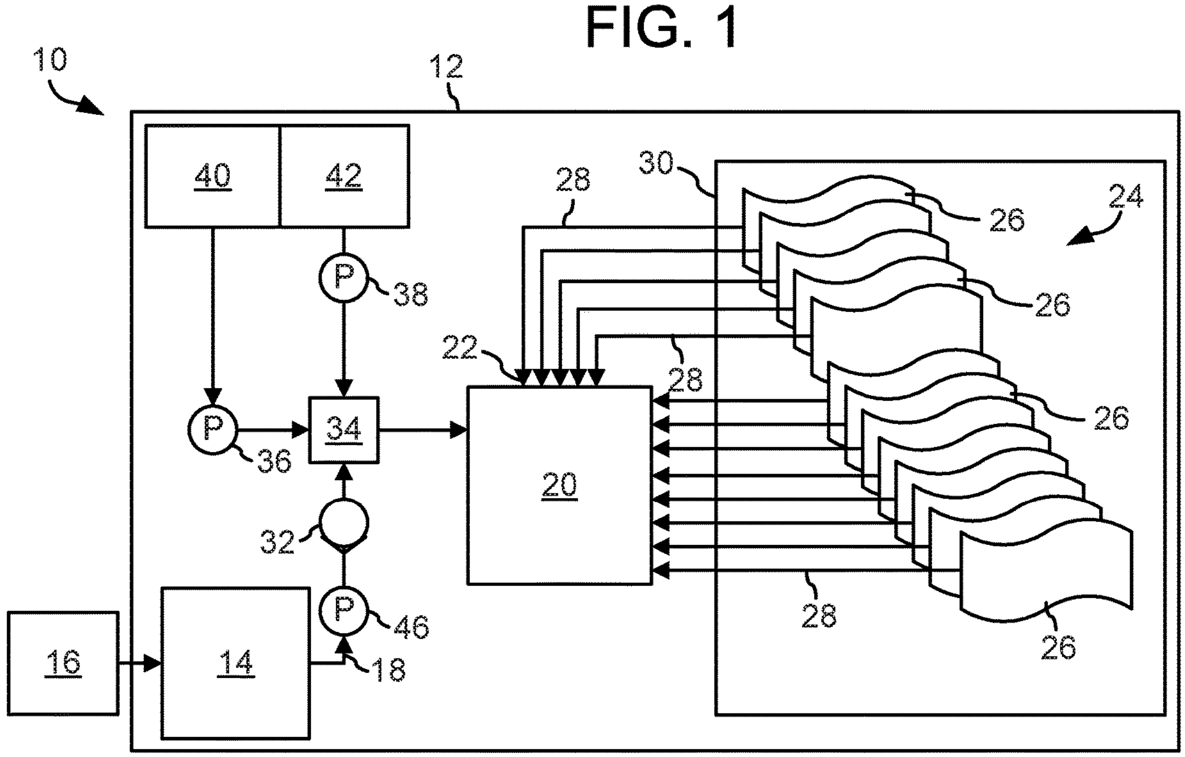
FIG. 2A depicts a diagrammatic example embodiment of a system for producing and packaging medical fluids.

Referring now to FIG. 2A, the system 10 may, in some embodiments, be configured to generate bags 26 having various types of solutions. The solutions may be colloid solutions or crystalloid solutions. Solutions produced may be isotonic, hypotonic, or hypertonic in relation to physiological norms. For example, solutions may include various salt solutions such as normal saline, half normal saline, or saline of any other concentration. Solutions may also include Ringer's solution, Hartmann's solution, sugar solutions (e.g. D5W), sugar saline solutions (e.g. DSNS, ⅔ D5W & ⅓ NS), Gelofusine, Dextran, Hetastarch, albumin, Ionosteril, Sterofundin ISO, Plasma-lyte, etc. In such embodiments, the system 10 may include receptacles for one or more bulk cartridges or reservoirs 40, 42 of concentrate or crystalline precursor. These bulk cartridges 40, 42 may communicate with fluid lines which lead to pumps 38, 36. The pumps 38, 36 may meter specific volumes of concentrates into the output of the medical water production device 14.

The medical water production device 14 output stream may also be pumped by a pump 46 to monitor the amount of fluid being mixed with any concentrate introduced from the bulk reservoir(s) 40, 42. In some examples, an accumulator or storage volume (not shown) may be included to maintain a supply of medical grade water such that solution may be produced at a rate faster than the output rate of the medical water production device 14 if commanded. This accumulator volume could be maintained within the medical water production device 14 in certain embodiments.

A mixing volume 34 may be included in the system 10 to ensure any concentrate and water are evenly mixed before progressing to the fill receiving set 24. This mixing volume 34 may have an interior including various baffles or obstacles which break up incoming flow and promote mixing of fluid within the mixing volume 34. The mixing volume 34 may also include an expanse of tubing which may present a long/and or tortuous path that encourages even mixing. A check valve 32 may also be included on the output line 18 from the medical water production device 14 to prevent any back flow of mixed solution to the medical water production device 14. Control of various valves 36, 38, 46 and pumps of the system 10 may be orchestrated via the control system 15.

Figure 2B:
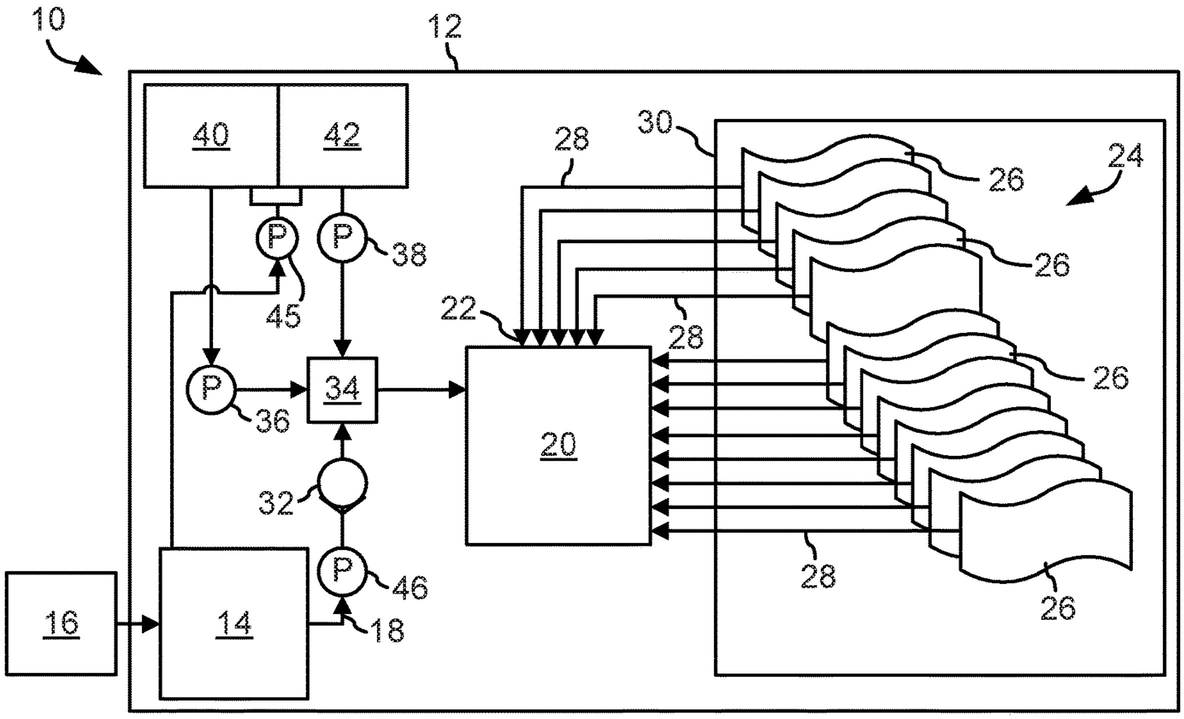
FIG. 2B depicts a diagrammatic example embodiment of a system for producing and packaging medical fluids.

In some embodiments, and as shown in FIG. 2B, the medical water production device 14 may have an output which may communicate with bulk cartridges 40, 42 containing concentrate in a crystalline form. The output of the medical water production device 14 may pass through the bulk cartridges 40, 42 and exit as a saturated or nearly saturated solution. A pump 45 may be provided to aid in delivery of the output stream of the medical water production device 14 through the bulk cartridges 40, 42. Fluid exiting the bulk cartridges 40, 42 may be subjected to composition monitoring (e.g. conductivity sensing, temperature sensing, polarimetry sensing, etc.) which may inform the control system 15 determined downstream mixing ratios effected by pumps 38, 36.

Figure 3:
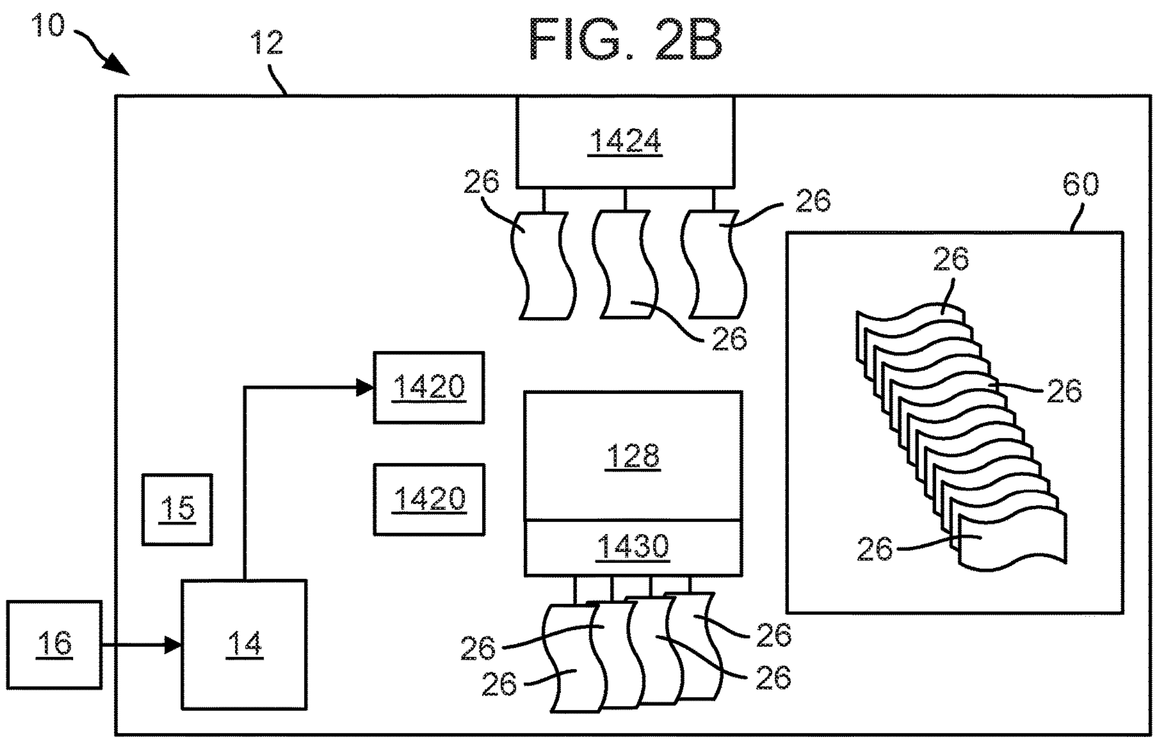
FIG. 3 depicts a diagrammatic example embodiment of a system for producing and packaging medical fluids.

Referring now to FIG. 3, a system 10 for producing and packaging medical fluids is shown. The system 10 is configured to fill individual bags 26 as opposed to filling through a fill receiving set 24. As the medical water production device 14 in FIG. 3 generates purified water, the water may be output to an outlet line 18 after being subjected to various quality testing. The output line 18 of the system 10 may connect to a filling nozzle or dispenser 1420. The dispenser 1420 may include a tapered outlet which may be introduced into an inlet of a bag 26 or other destination container. Alternatively, the dispenser 1420 may include a fitting (e.g. luer lock, quick connect, etc.) which mates with a fitting on a destination container.

In the exemplary embodiment shown in FIG. 3, the system 10 includes a plurality of IV bags 26 which may be included in a bag feeder 128. In such embodiments, the plurality of IV bags 26 may be included in a cartridge or dispenser such as a magazine 1430 which facilitates their installation into the system 10. In some embodiments, the magazine 1430 may act as a dispenser which, for example, allows the foremost bag 26 to be collected by a robotic manipulator 1422 of the system 10. Any suitable robotic manipulator 1422 may be included, for example, one or more multi-axis robotic arm may be included. Each magazine 1430 may hold, for example, 10-50 bags 26 though magazines 1430 having a capacity for a greater or lesser number of bag 26 may also be used.

In some embodiments, bags 26 may be provided in an over pack 60 which may be a sealed bag, pouch, or blister pack in certain embodiments. The over pack 60 may be cleaned (e.g. with 70% isopropyl alcohol or another suitable agent) and introduced into the enclosure 12. Individual bags 26 may then be withdrawn from the over pack 60 manually or in an automated fashion (via a robotic manipulator 1422) and installed in a magazine 1430 included in the system 10. One or more pre-loaded magazine 1430 full of bags 26 may also be provided in an over pack 60. Pre-loaded magazines 30 may be removed from the over pack 60 and installed in the bag feeder 128 as needed.

In some embodiments, various protective caps or films may be included over some components of the bags 26. For example, a film or cap may be included on ports of the bags 26. This may facilitate establishment of aseptic connections if manipulation of the bags 26 after being removed from the over pack 60 is needed to install bags 26 into the system 10. The caps or film may be removed shortly before connection or installation to the system 10. Alternatively, the film or cap may be pierced through during filling.

As purified water is produced by the medical water production device 14, the water may be output by the dispenser 1420 to each IV bag 26. The robotic manipulator 1422 may collect bags 26 from the bag feeder 128 and displace them to the dispenser 1420 for filling. Each IV bag 26 may be filled to capacity or some other desired volume and then removed from the system 10 or placed in a quarantine 1424 while various testing on fluid output from the dispenser 20 is completed. In some embodiments, a seal may be generated in the fill conduit leading to the bag 26. This seal may be generated via heat, dielectric or RF welding, installation of a stopper or other sealing member, or any other suitable process.

Figure 4A:
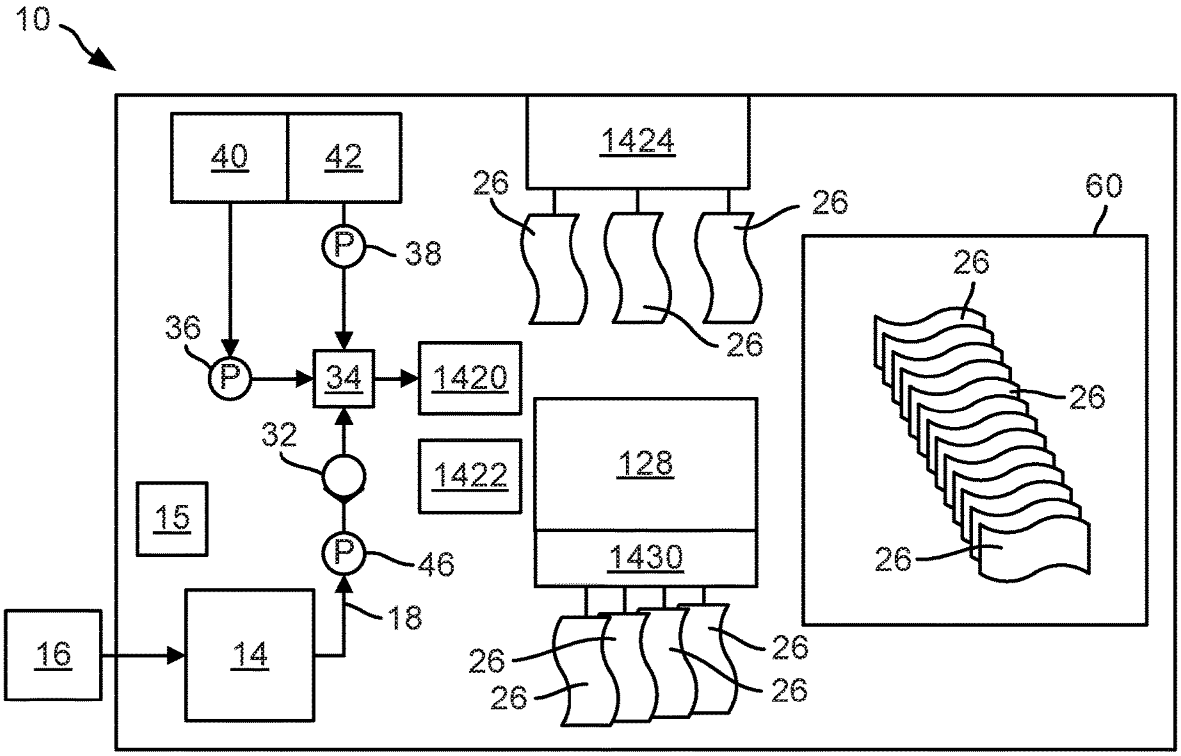
FIG. 4A depicts another diagrammatic example embodiment of a system for producing and packaging medical fluids.
Figure 4B:
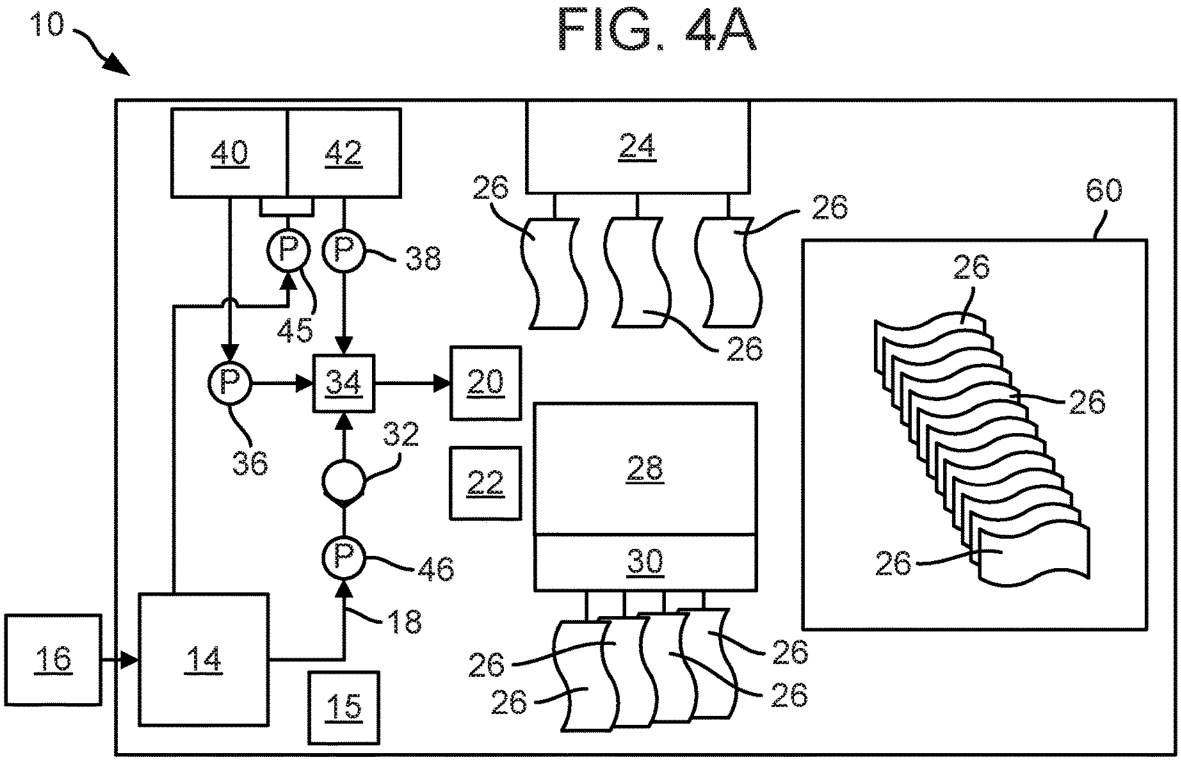
FIG. 4B diagrammatic example embodiment of a system for producing and packaging medical fluids.

Referring now to FIG. 4A, another system 10 for producing and packaging medical fluids is shown. As described in relation to FIG. 3, the system 10 is configured to fill individual bags 26 as opposed to filling through a fill receiving set 24. The example system 10 in FIG. 4A is configured to generate bags 26 having various types of solutions. The system 10 in FIG. 4A includes components described in relation to FIG. 2A to accomplish mixing operations in order to generate the solution. FIG. 4B depicts another system 10 for producing and packing medical fluids which is configured to fill individual bags 26. This system 10 includes components described above in relation to FIG. 2B in order to generate various types of solutions to fill the bags 26 with.

Figure 5A:
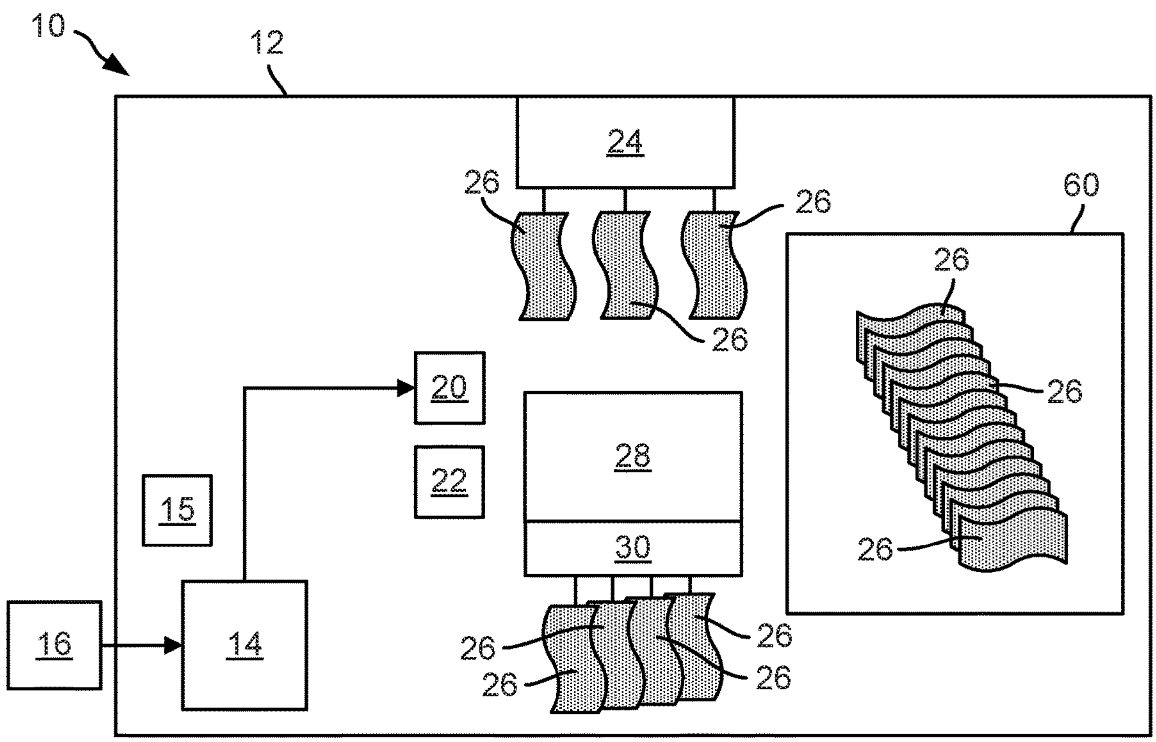
FIG. 5A diagrammatic example embodiment of a system for producing and packaging medical fluids.
Figure 5B:
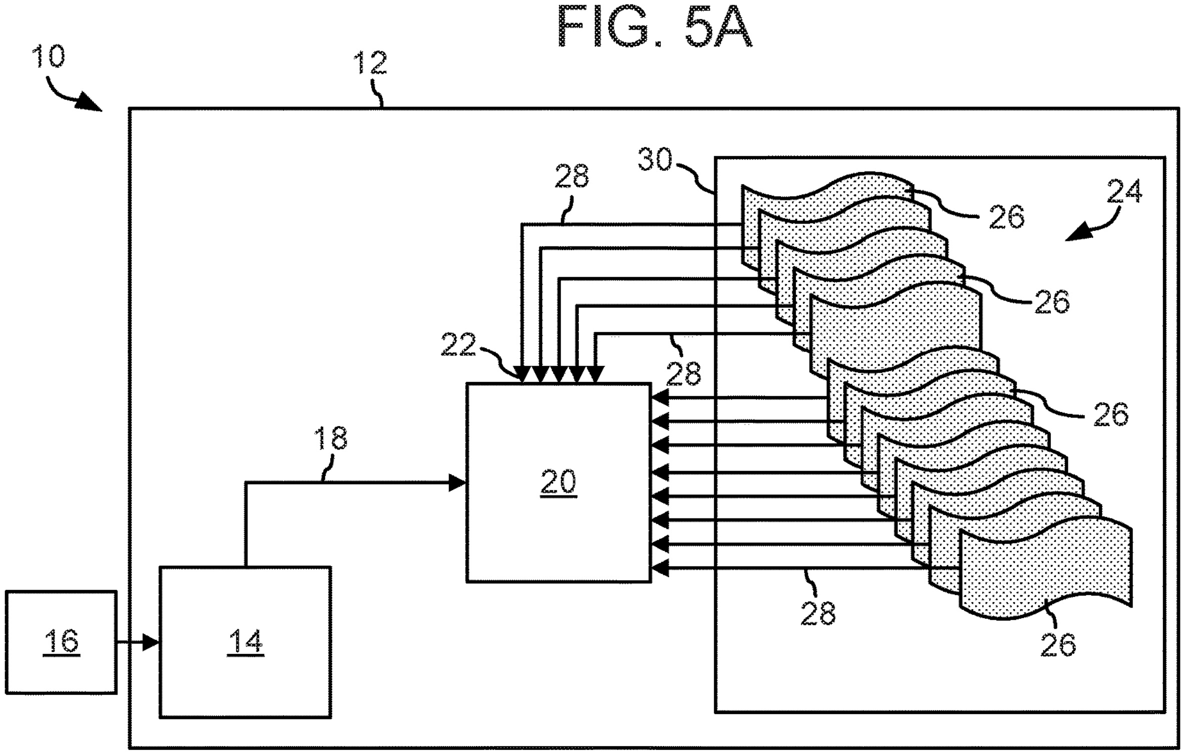
FIG. 5B depicts a diagrammatic example embodiment of a system for producing and packaging medical fluids.

In other embodiments and referring now to FIGS. 5A and 5B, bulk reservoirs 40, 42 may not be used. Instead, the bags 26 may enclose an appropriate amount of concentrate (depicted as a stipple pattern in each bag 26). This concentrate may be prepackaged into the bags 26. As fluid from the medical water production device 14 flows into the bags 26, the amount of concentrate may be sufficient to generate the desired final solution concentration. The concentrate may be provided in the form of a liquid in some embodiments. In alternative embodiments, the concentrate may be a powder or lyophilized drug. In still other embodiments, the concentrate may be included in an ampoule or similar structure provided within each bag 26. Where ampoules are used, the ampoule may be interruptible or frangible so as to allow access to the material contained within the ampoule. The ampoule may be mechanically breakable by the system 10 or shattered by ultrasonic waves produced by the system 10 in some embodiments. Lighter and/or less bulky concentrate forms may be used when possible. For example, a crystalline solid may be used instead of a saturated solution, though both are possible.

Figure 6:
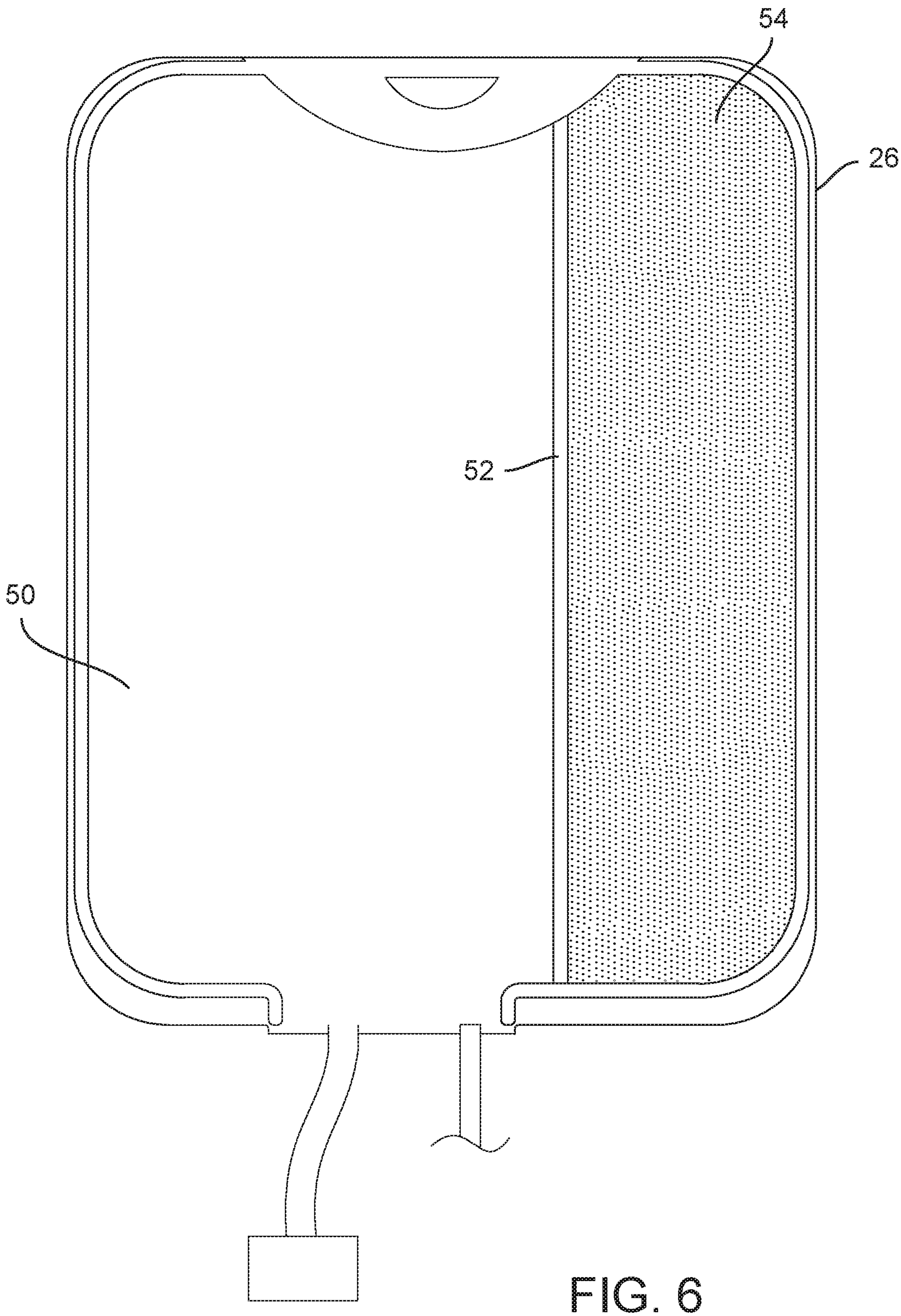
FIG. 6 depicts a top down view of a multi-compartment bag containing a concentrate contained therein.

Referring now also to FIG. 6, in certain embodiments the bag 26 may be a multi-chamber bag 26. One chamber 50 may be empty and may be adjacent at least one concentrate chamber 54 containing liquid, lyophilized, crystalline, or otherwise powdered, concentrate (depicted as stipple pattern in chamber 54). The chambers 50, 54 may be separated from communication with one another via a seal 52 or seals 52. The seal(s) 52 may be user or machine interruptible. For example, the seal(s) 52 may include a frangible or the seal(s) 52 may be peelable. Depending on the embodiment, the seal(s) 52 between chambers 50, 54 may be defeated by a user or by the system 10 during production of the bag 26. In some examples, the seal(s) 52 may be maintained after production of the bag 26 until a point more temporally proximate usage of the bag 26. This may be done, for example, in cases where the mixed solution has a relatively short shelf life. Where a seal 52 is broken by a component of the system 10, the seal 54 may be broken before or after filling of the bag 26 with water from the medical water production device 14. The system 10 may include a shaker, vibrator, mechanical agitator, or other component which aids in mixing the concentrate with any water introduced to the bag 26. In some embodiment, the entry port to the bag 26 may include a structure which encourages water entering the bag 26 to swirl or turbulently mix any concentrate included in the bag 26. Where a seal is peelable, it may be generated by altering a process characteristic during seal formation. For example, a lower heat, power, welding time, etc. than that used to form the peripheral seal of the bag 26 may be employed to make the peelable seal. In certain examples, the system 10 may include a set of rollers or similar pressure applicators which may operate on the bag 26 to disrupt any peelable seals.

Where bags 26 are provided with some form of concentrate therein, the bags 26 may be coded so as to be easily identifiable by human, machine, or both. Bags 26, may for example be color coded (color A=saline, color B=ringer's, color C=sugar solution, and so on). Color coding may not be applied to the entirety of the bag 26. A seam of the bag 26 may be color coded or the bag 26 may include a stripe, block, or zone of color coding. Locations of the color coding or the shape of a zone of color coding may also differ across bags 26. The bags 26 may also include a machine readable indicia such as a bar code, data matrix, wirelessly interrogatable tag, etc. In some embodiments, the bags 26 may also be color coded by volume or color coded by various set characteristics. For example, administration set 28 having a burette, injection port, etc. may have different color coding than those without.

In some embodiments, the bags 26 may be differentiated on the basis of a human or machine observable feature other than color. For example, in some embodiments, the bags 26 or a portion thereof may additionally or instead have different geometries such as an elongate shape, square, cylindrical, etc. Any shape having a round or polygonal cross-section may be used. Locations of compartments within the bag 26 may also differ in a visually differentiable way and compartment locations may depend on the concentrate held therein. For example, a first concentrate may be located in a corner compartment or the bag 26. A seal defining such a compartment may run from a side of the bag 26 and extend to another side of the bag 26 which extends at an angle which is substantially perpendicular thereto. A second concentrate may be stored in a compartment 54 running along a side of the bag 26 defined by a seal 52 extending the length or width of the bag 26 parallel to an edge of the bag 26 (see e.g. FIG. 6). Any bags 26 of the type described in U.S. application Ser. No. 16/384,082, filed Apr. 15, 2019, entitled Medical Treatment System and Methods Using a Plurality of Fluid Line, which is hereby incorporated by reference herein it its entirety may be used.

Figure 7:
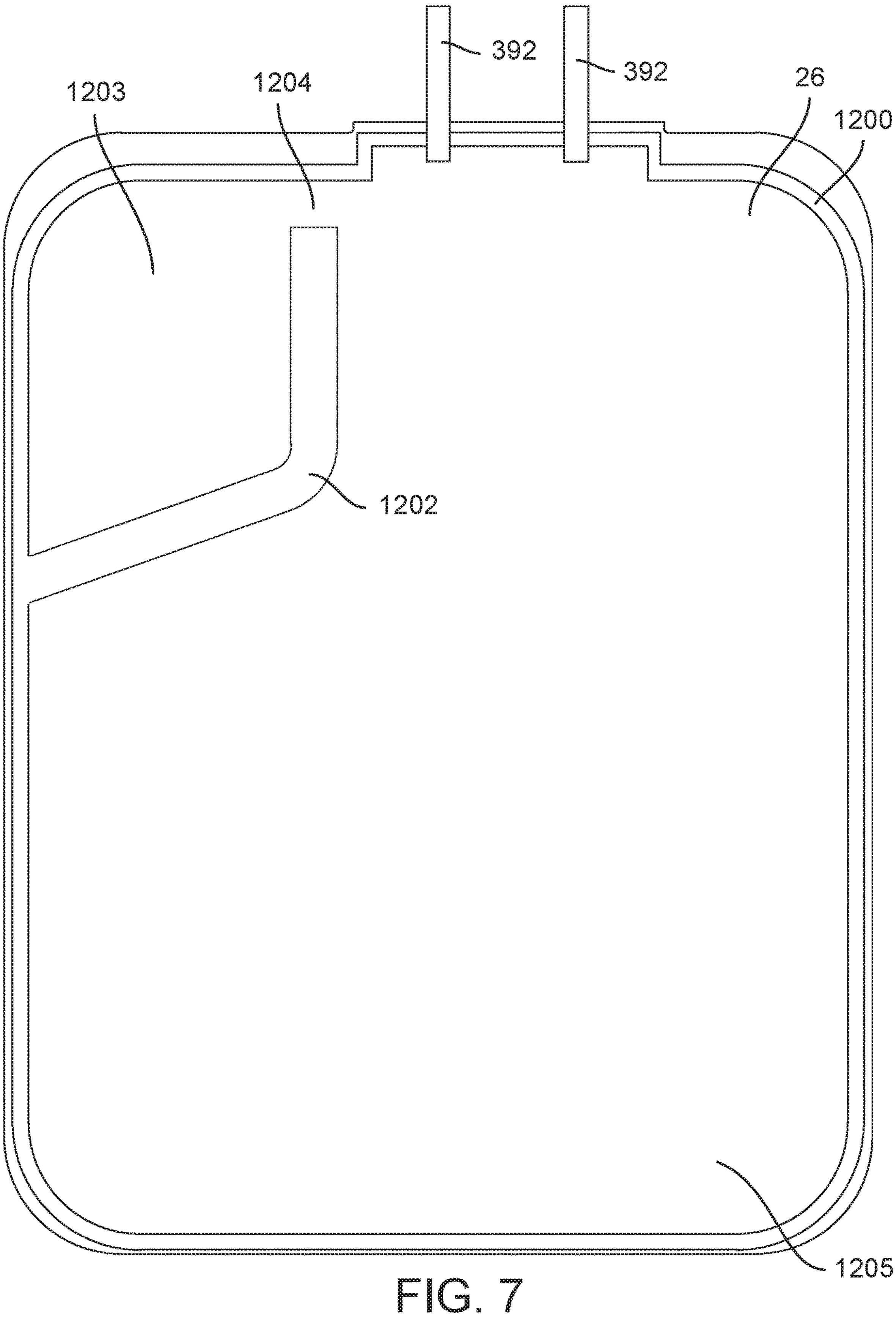
FIG. 7 depicts an exemplary bag having a partial barrier wall in its interior volume.

Referring now to FIG. 7, an exemplary bag 26 is depicted. The bag 26 may be filled with any of the fluids described herein by any of the systems 10 described herein. Any of a wide range of medical fluids may be contained within the bag 26. Though the example bag 26 may be used in any of a variety of scenarios, the bag 26 shown in FIG. 7 includes features which may be well suited to applications where the fluid contained the bag 26 is mixed and packaged on site at or near the intended point of use. For example, the bag 26 may be filled by a system 10 within a hospital, clinic, dialysis clinic, surgery center, or other medical practice institution where the solution is to be used. Alternatively, the bag 26 may be filled by a system 10 in a military field hospital or at a site of a disaster relief operation. The example bag 26 includes features which may allow an aliquot of fluid to be isolated therein from a volume of fluid filled into the bag 26 for delivery to a patient. This aliquot may be created from or be representative of the fluid which was filled into the bag 26. Such bags 26 may be used in embodiments where the system 10 fills bags 26 individually. Alternatively, such bags 26 may be included in a fill receiving set 24.

As the aliquot associated with the bag 26 is isolated from all other fluid filled into the bag 26, the aliquot may be accessed discretely without also accessing the main volume which may be filled with fluid intended for administration to a patient. This may allow a sample of fluid which is compositionally representative of fluid in the main volume to be extracted from the isolated aliquot for testing. The main volume of fluid filled into the bag 26 may remain undisturbed by the sampling conducted on the aliquot. Thus, the aliquot may allow for sampling of fluid in the bag 26 without the need for the entire bag 26 to be compromised or discarded. As a result, it may be possible to test each bag 26 before the bags 26 are cleared for use. Additionally, this may allow for certain testing which is difficult or not feasible to conduct as the bag 26 is filled to be performed after the bags 26 are filled. Testing which requires an incubation or wait period, for example, may be performed on fluid sampled from the aliquot isolated within the bag 26. After filling, bags 26 may be held in a quarantine until this testing is completed. Once testing indicates that the fluid in the bags 26 meets predefined acceptability criteria, the bag 26 may be released for use.

As shown in FIG. 7, the example bag 26 includes two ports 392. These ports 392 may be sealed into a peripheral seal 1200 which defines the interior volume of the bag 26. The ports 392 may provide fluid communication into and out of the bag 26 for filling and delivery of fluid in the bag 26. One may, for example, be a filling access which is sealed after filling. The other may be a delivery port which can be spiked to access the fluid in the bag 26 when it is needed for delivery to a patient. Where the bag 26 is included as part of a fill receiving set 24, the filling port 392 may be connected to a manifold 20.

As shown, the bag 26 includes a partial barrier wall 1202. The partial barrier wall 1202 may substantially section off a portion 1203 the interior volume of the bag 26 from the remainder of the interior volume or main volume 1205 of the bag 26. The partial barrier wall 1202 may, however, be broken by at least one gap or interrupt region 1204. The gap region 1204 may provide a fluid pathway between the sectioned off portion 1203 of the bag 26 and the remainder of the interior volume 1205 of the bag 26. As the bag 26 is filled, both main volume 1205 of the bag 26 and the sectioned off portion 1203 may receive fluid. As the gap region 1204 keeps the sectioned off portion 1203 in fluid communication with the main volume 1205, the fluid which fills into the sectioned off portion 1203 and the main volume 1205 should be compositionally the same.

Figure 8:
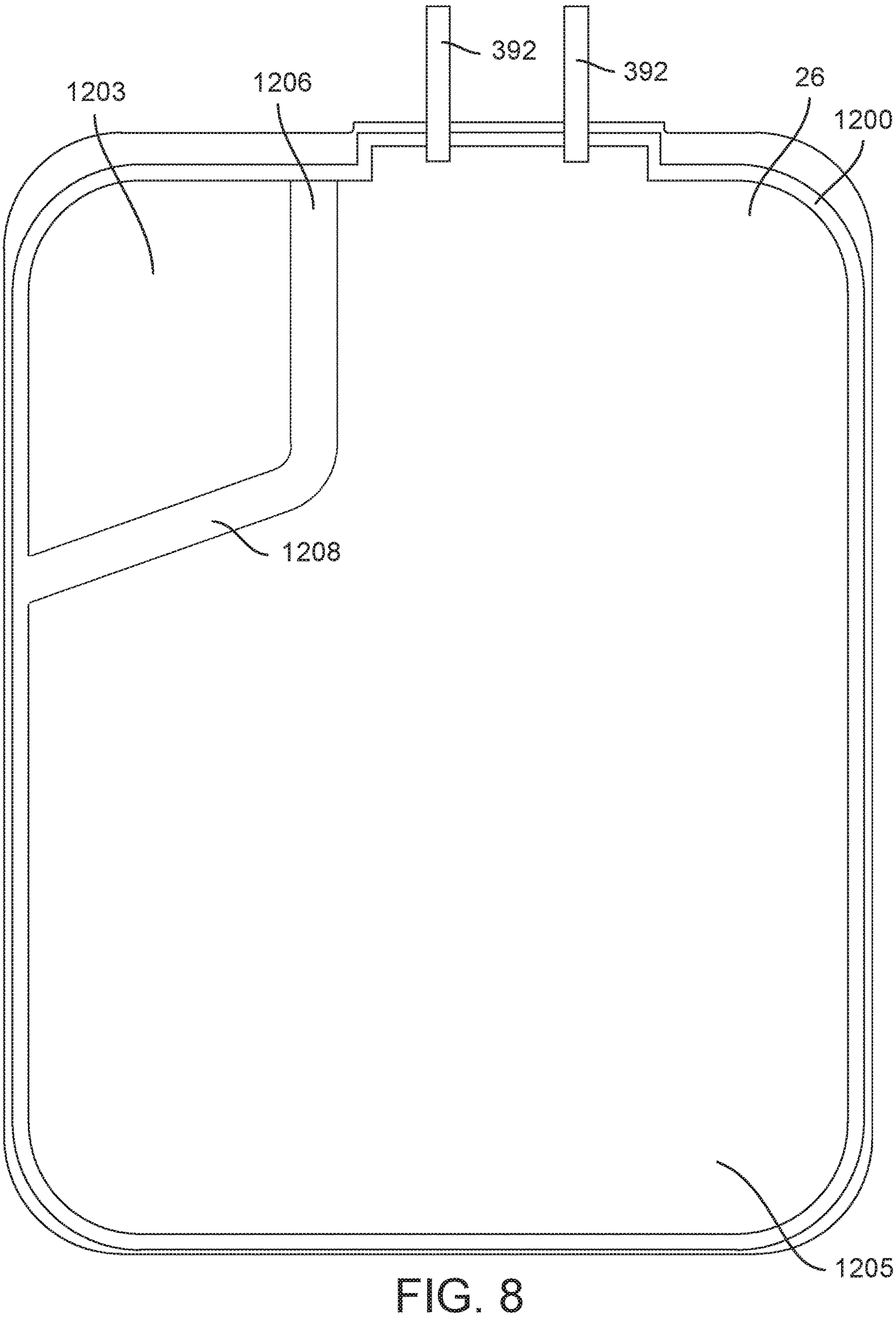
FIG. 8 depicts an exemplary bag having an isolated aliquot of fluid sectioned off from its main volume by a seal.

Referring now also to FIG. 8, once the bag 26 has been filled, a seal may be created in any gap regions 1204 breaking up the partial barrier wall 1202. This may generate a complete barrier wall 1206 which totally isolates the main volume 1205 of the bag 26 from the sectioned off portion 1203. This may be accomplished by heat sealing (or otherwise sealing) the bag 26 material together at the at least one gap region 1204. Thus an aliquot of fluid may be segregated from the main volume 1205 of the bag 26. As this aliquot is generated from the same initial interior volume of the bag 26 as the main volume 1205, the aliquot may be referred to as an internal aliquot.

The partial barrier wall 1202 may be generated within the bag 26 such that when the bag 26 is filled and at least one interrupt or gap region 1204 is sealed, the internal aliquot will have a desired nominal volume of fluid contained therein. Likewise, the partial barrier wall 1202 may be disposed such that the main volume 1205 within the bag 26 has a nominal capacity volume when the bag 26 is filled and the gap region 1204 is sealed. The internal aliquot may be sized to contain a volume of fluid sufficient for any intended sampling.

As shown in FIG. 8, the completed barrier wall 1206 may be positioned and shaped so as to encourage fluid contained in the main volume 1205 of the bag 26 to be directed toward the ports 392 when fluid in the bag 26 is delivered. In the example, the sectioned off portion 1203 of the bag 26 is located in a corner of the bag 26 on a side of the bag 26 proximate the ports 392. The completed barrier wall 1206 includes a sloped segment 1208 which slants towards the ports 392. Thus, when the bag 26 is hung (e.g. for gravity feed based delivery), fluid may be inhibited from being trapped or pocketed along regions of the complete barrier wall 1206. This may help to ensure that all of the fluid filled into the main volume 1205 of the bag 26 is able to be delivered without requiring user intervention to reposition the bag 26. In other embodiments, the completed barrier wall 1206 may include rounded features which aid in directing fluid toward the ports 392. In alternative embodiments, the interior aliquot may be generated at a side of the bag 26 opposing that which includes the ports 392 or in a corner of the bag 26 distal to those adjacent the ports 392.

Figure 9:
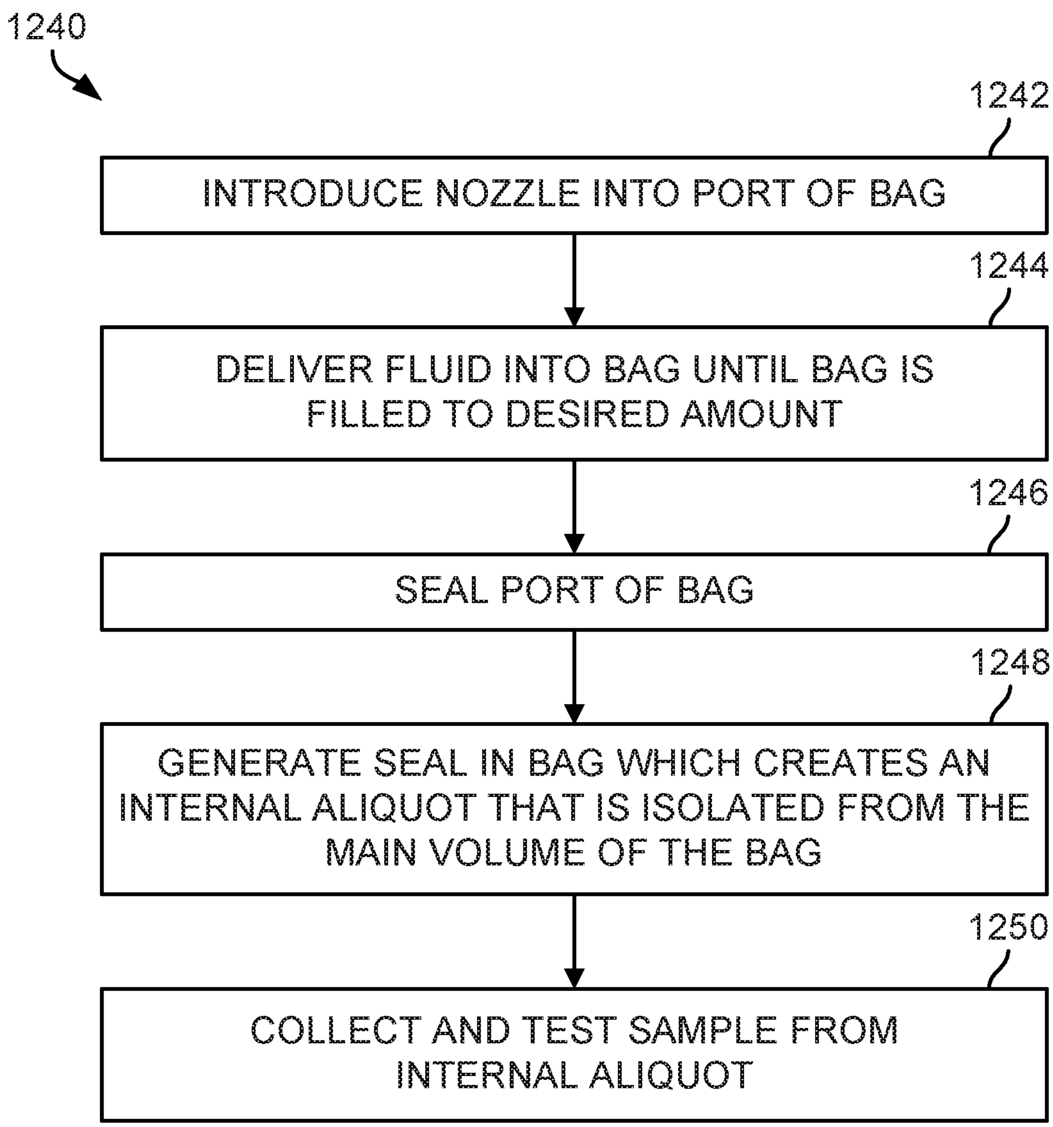
FIG. 9 depicts a flowchart detailing a number of example actions which may be executed to package fluid within a bag.

Referring now to FIG. 9, a flowchart 1240 depicting a number of example actions which may be executed to package fluid within a bag 26 is shown. In block 1242, a filling nozzle may be introduced into a port 392 of a bag 26. Fluid may be delivered through the filling nozzle into the interior volume of the bag 26 in block 1244. The bag 26 may be filled until a desired volume of fluid has been transferred into the interior of the bag 26. In block 1246, the nozzle may be removed from the port 392 and the port 392 may be sealed. Where the bag 26 is included as part of a fill receiving set 24, a nozzle may not be used. Instead, the port 392 of the bag 26 may be receive fluid from a manifold 20. When the desired amount has been filled into the bag 26, the port 392 may be sealed and the bag 26 may be served from the manifold as described elsewhere herein.

In block 1248, a seal may be generated within the bag 26. This seal may create an internal aliquot within the interior volume of the bag 26 that is isolated from the main volume of the bag 26. In block 1250, a sample of fluid from the internal aliquot may be collected and tested. Where the bag 26 is included as part of a fill receiving set 24, a nozzle may not be used. Instead, the port 392 of the bag 26 may be filled through a manifold 20. When the desired amount has been filled into the bag 26, the port 392 may be sealed and the bag 26 may be served from the manifold as described elsewhere herein.

Figure 10:
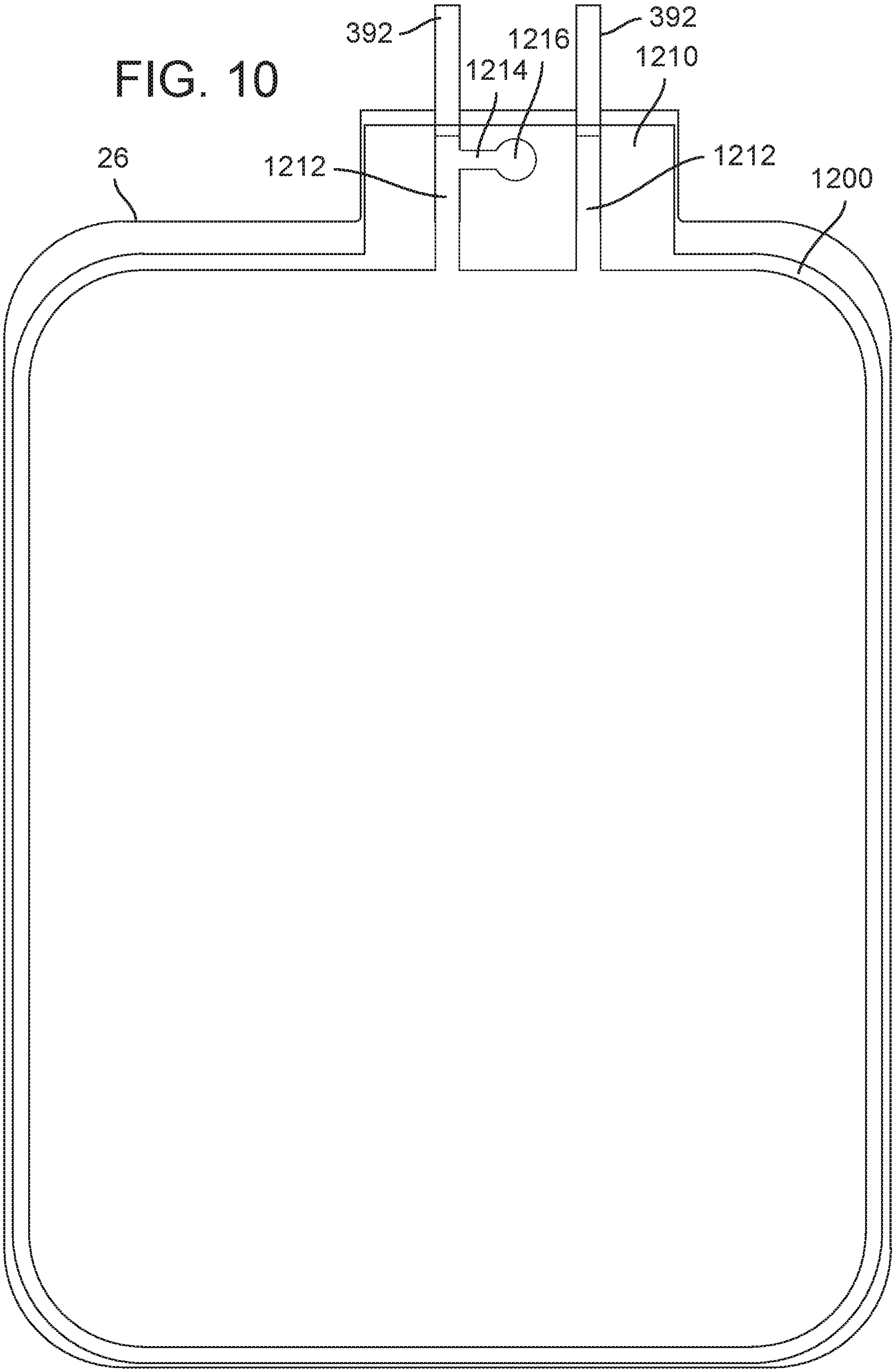
FIG. 10 depicts another example bag having a sampling reservoir disposed in an open region of its peripheral seal.

Referring now to FIG. 10, another exemplary bag 26 is depicted. As shown, the bag 26 includes two ports 392. These ports 392 may be sealed into a peripheral seal 1200 which defines the interior volume of the bag 26. In the example embodiment, the peripheral seal 1200 includes an enlarged section 1210 where the ports 392 are coupled into the bag 26. The enlarged section 1210 may have a width which is greater than the rest of the peripheral seal 1200 and may have one or more features defined therein. These features may be defined by leaving select areas open or unsealed when the enlarged section 1210 of the peripheral seal 1200 is formed.

In the example embodiment, the ports 392 may not extend all the way through the enlarged section 1210. As shown, the ports 392 extend partially into the enlarged section 1210 and are aligned with channels 1212. The channels 1212 may be unsealed regions which are defined during the formation of the enlarged portion 1210 of the peripheral seal 1200. The channels 1212 may extend from the terminal end of the ports 392 to the interior volume of the bag 26. Thus, the ports 392 in combination with their respective channels 1212 may provide fluid communication into and out of the bag 26 for filling and delivery of fluid in the bag 26. One pair may, for example, be a filling access which is sealed after filling and receives fluid from a filling nozzle 1420 or manifold 20. The other may be a delivery flow path which can, for instance, be spiked to access the fluid in the bag 26 when it is needed for delivery to a patient.

Figure 11:
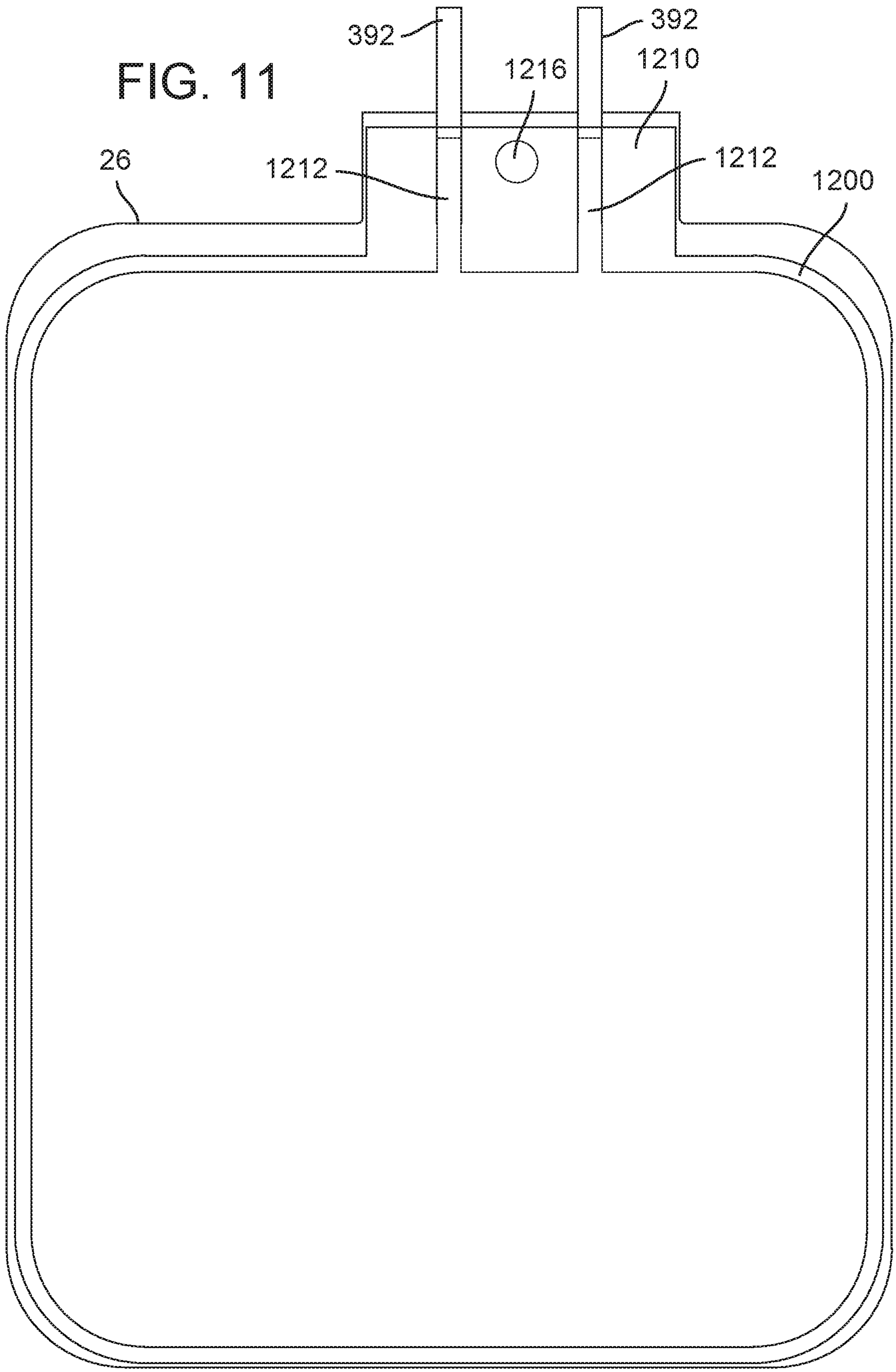
FIG. 11 depicts the example bag of FIG. 4 with the sampling reservoir isolated out of fluidic communication with the remainder of the bag.

As shown, one of the channels 1212 includes a branch 1214. The branch 1214 may extend to a sampling reservoir 1216 which is included within the enlarged portion 1210 of the peripheral seal 1200. The sampling reservoir 1216 and branch 1214 may again be defined as open regions during the formation of the enlarged portion 1210 of the peripheral seal. As the bag 26 is filled, the branch 1214 and the sampling reservoir 1216 may be in communication with the interior volume of the bag 26. Thus, when the bag 26 has been filled, fluid within the sampling reservoir 1216 and the interior volume of the bag 26 may be in communication and should be compositionally the same. Once the bag 26 is full, and referring now to FIG. 11, the sampling reservoir 1216 may be isolated from the interior volume of the bag 26. In certain examples, this may be accomplished by heat sealing (or otherwise sealing) the branch 1214 or a portion thereof closed. Thus, as above, an internal aliquot of fluid may be segregated within the bag 26.

Figure 12:
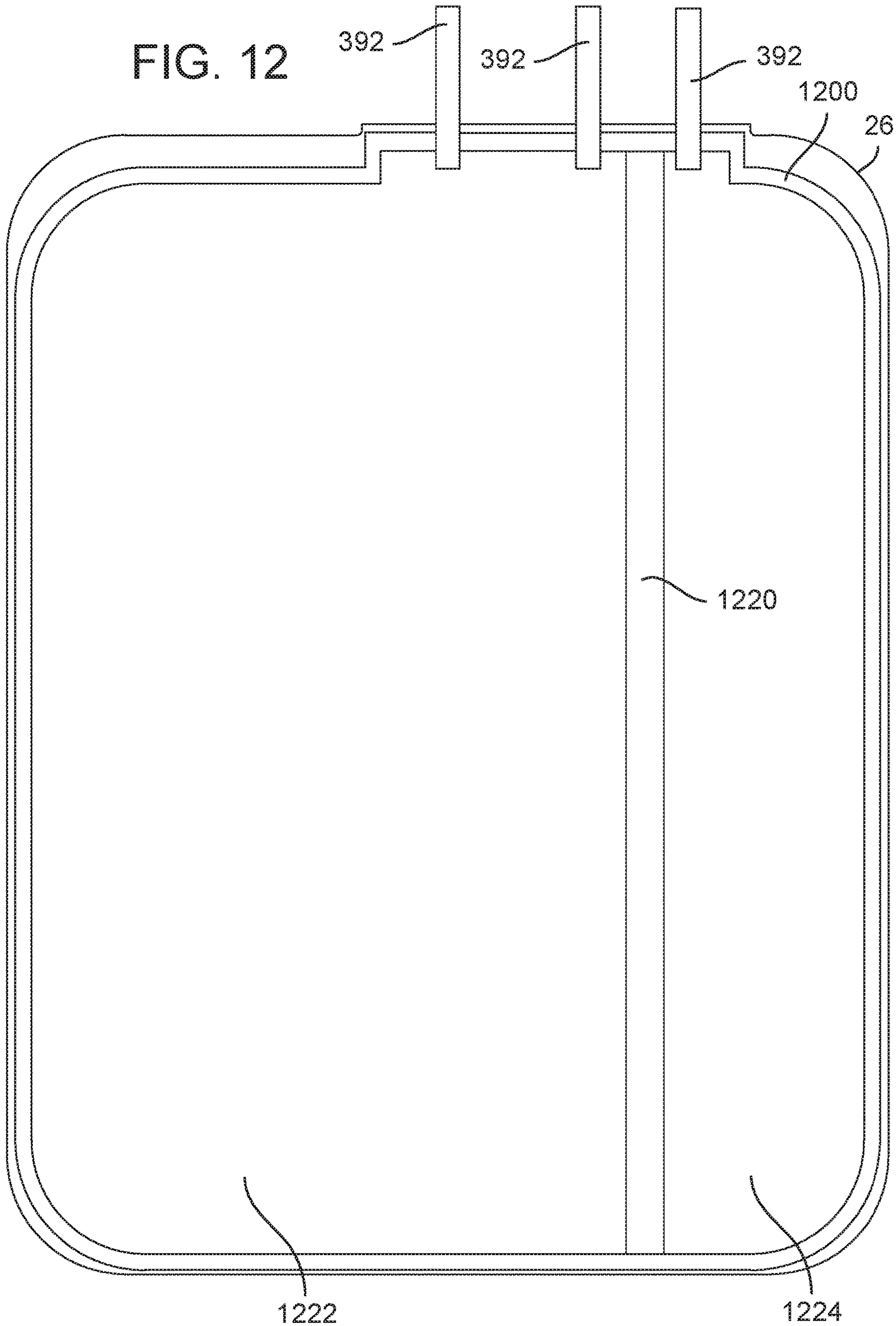
FIG. 12 depicts an exemplary bag with a first compartment and a second compartment.

Referring now to FIG. 12, another exemplary bag 26 is depicted. As shown, the bag 26 includes three ports 392. These ports 392 may be sealed into a peripheral seal 1200 of the bag 26. The bag 26 may also include an interior seal 1220. The interior seal 1220 in conjunction with the peripheral seal 1200 may define to a first interior compartment 1222 and a second interior compartment 1224. The compartments 1222, 1224 may have different volume capacities. The interior seal 1220 may extend between two of the ports 392 such that one of the compartments 1222, 1224 is accessible via a single port 392 and the other of the compartments 1222, 1224 is accessible via the remaining two ports 392. The compartment 1222, 1224 accessible via only one port 392 may be, but need not necessarily be, the smaller of the compartments 1222, 1224. In the example embodiment, the second compartment 1224 has a smaller capacity than the first compartment 1222.

The smaller volume compartment 1224 may be filled through the port 392. The port 392 leading to the small volume compartment 1224 may then be sealed. The smaller compartment 1224 may thus be filled to contain an isolated sample aliquot which may be drawn from to conduct various testing. The larger compartment 1222 may contain the medical fluid preparation that is intended for delivery to a patient. The larger compartment 1222 may be filled through one of the ports 392 which is then sealed. The other port 392 communicating with the larger compartment 1222 may be used for delivery of fluid. As the sampling aliquot in the small compartment is filled into a compartment which is fluidically isolated from the fluid to be delivered to the patient, the aliquot may be referred to as an external aliquot. Both compartments 1222, 1224 may be filled at the same time from a filling line which is branched. Thus the fluid in the external aliquot should be compositionally representative of the fluid in the larger compartment 1222.

The interior seal 1220 may be positioned and shaped so as to inhibit fluid contained in the larger compartment 1222 of the bag 26 to from being pocketed away from the ports 392 when fluid in the larger compartment 1222 is administered via a gravity feed. In the example, the internal seal 1220 is a vertical seal which extends along the length of the bag 26 in a direction substantially parallel to the axes of the ports 392. In alternative embodiments, the interior seal 1220 may include slanted portions similar to those shown in FIG. 8. Rounded contours which aid in directing fluid toward the ports 392 may also be used in other embodiments.

Figure 13:
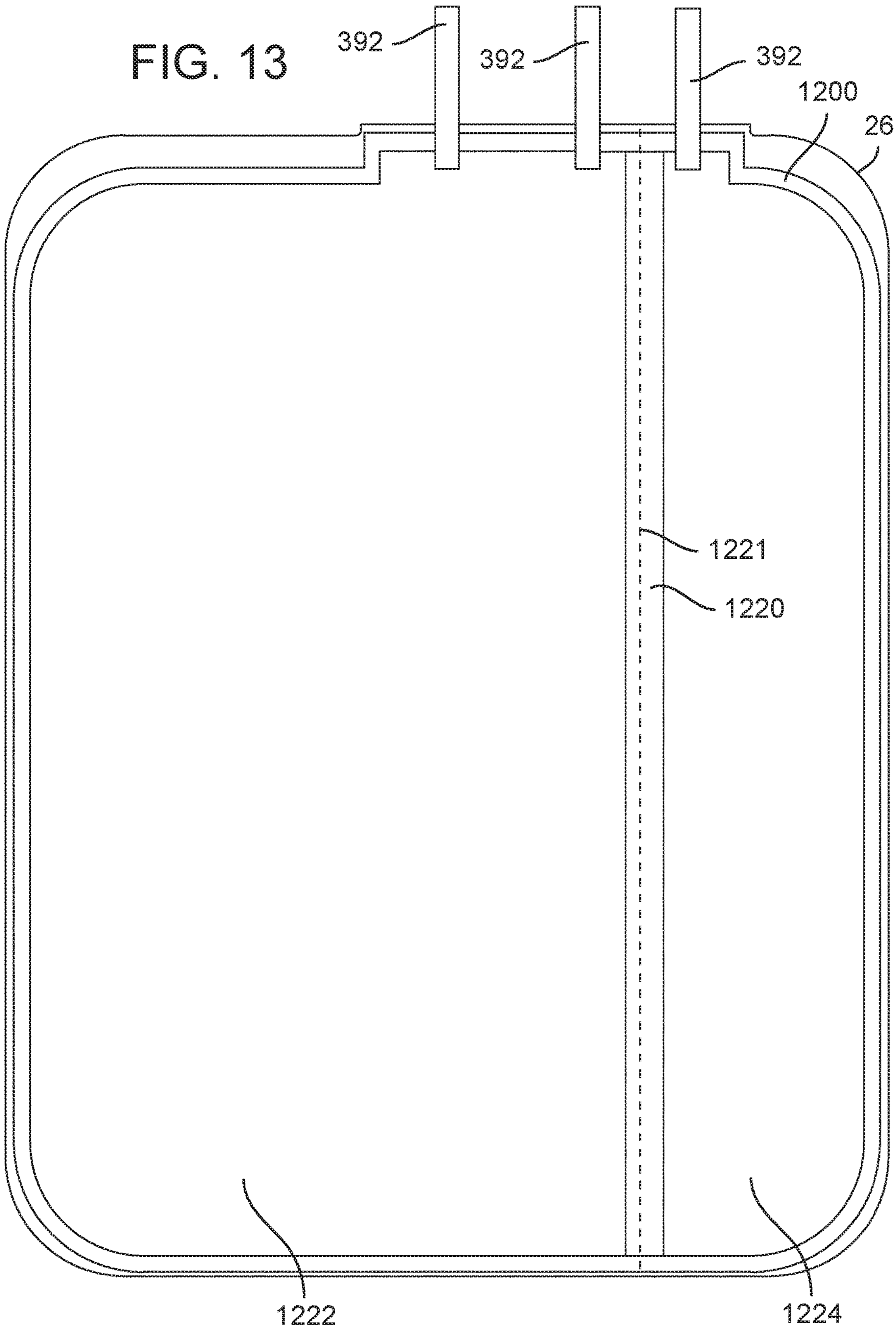
FIG. 13 depicts an exemplary bag with a seal having a perforation therein.

In certain examples, and referring now primarily to FIG. 13, the internal seal 1220 may be constructed with a perforation 1221 therein. The perforation 1221 may extend along the entire length of the internal seal 1220 and all for the external aliquot filled into the bag 26 to be separated from the bag 26 after filling. In bags 26 where a perforation is present, each compartment 1222, 1224 of the bag 26 may include corresponding (e.g. matching) unique identifiers which may be machine and/or human readable. Any suitable identifier may be used such as any of those described herein. This may allow any testing done on the external aliquot which was separated from the bag 26 to be associated with the remaining, but now separate portion of the bag 26. Perforations 1221 which allow isolated aliquots to be separated from a bag 26 may be included in other bag 26 embodiments. For example, the partial barrier wall 1202 described in relation to FIGS. 7 and 8 may include a perforation 1221. Additionally, the seal generated when the gap regions 1204 in the partial barrier wall 1202 are filled in to generate the complete barrier wall 1206 may include perforations 1221. This may allow the internal aliquot to be separated from the remaining portion of the bag 26 are isolation.

Figure 14:
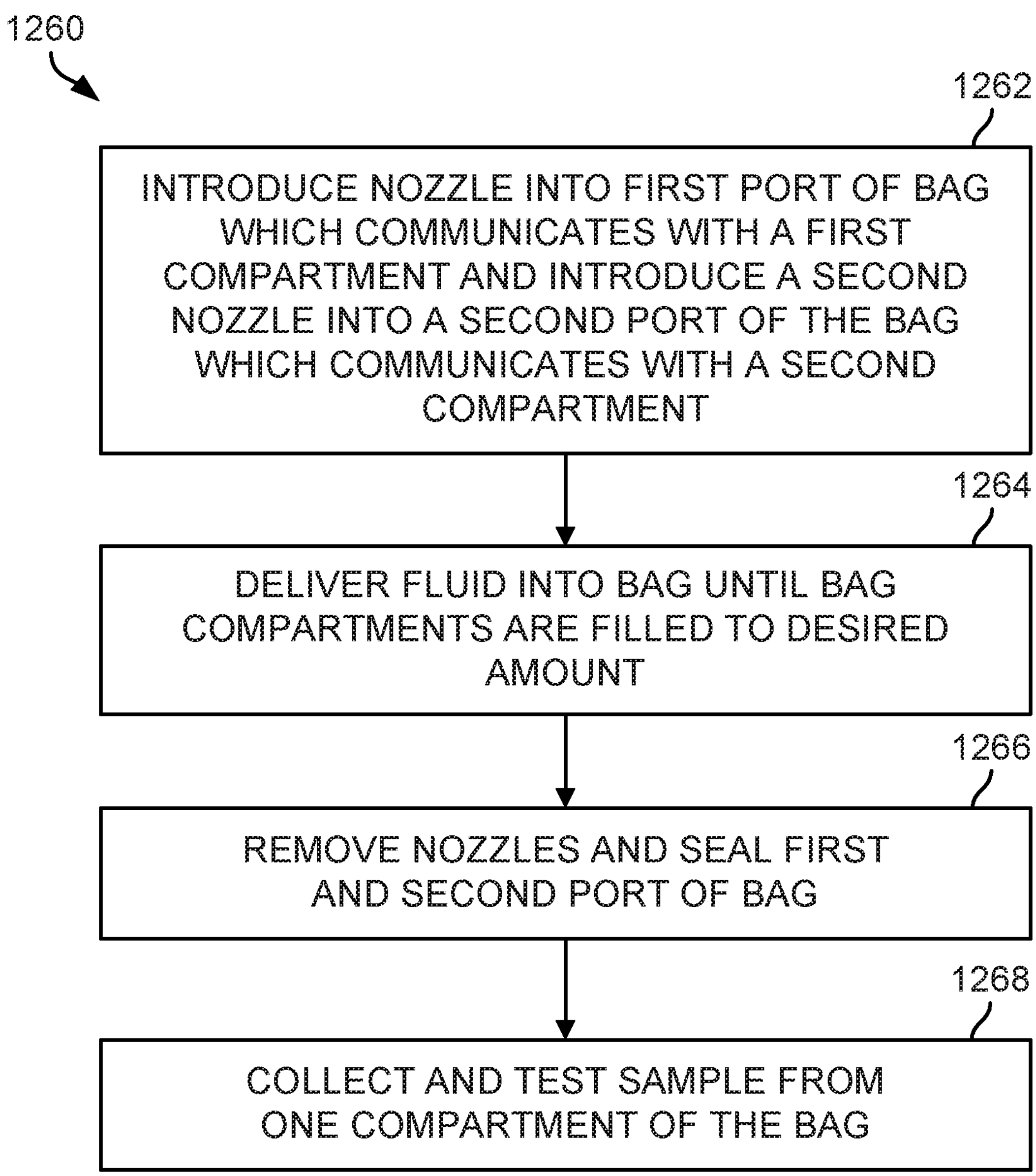
FIG. 14 depicts another flowchart detailing a number of example actions which may be executed to package fluid within a bag.

Referring now to FIG. 14, a flowchart 1260 detailing a number of example actions which may be executed to package fluid within a bag 26 is shown. In block 1262, a nozzle may be introduced into a first port 392 of a bag 26 which may communicate with a first compartment in the bag 26. A second nozzle may also be introduced into a second port 392 of the bag 26 which communicates with another compartment of the bag 26 in block 1262. Fluid may be delivered into the bag 26 until the bag 26 compartments are filled to a desired amount in block 1264. In block 1266, the nozzles may be removed from the first and second ports 392 and the first and second port of the bag 26 may be sealed. This may create a first compartment which may be in communication with a third port through which the contents of the first compartment may be administered. This may also create an external aliquot of fluid in the second compartment (e.g. the smaller compartment) which may be used for testing. In block 1268, a sample from the external aliquot may be collected and tested. Where the bag 26 is included as part of a fill receiving set 24, nozzles may not be used. Instead, the ports 392 of the bag 26 may receive fluid through a manifold 20. When the desired amount has been filled into the bag 26, the port 392 may be sealed and the bag 26 may be served from the manifold 20 as described elsewhere herein.

Figure 15:
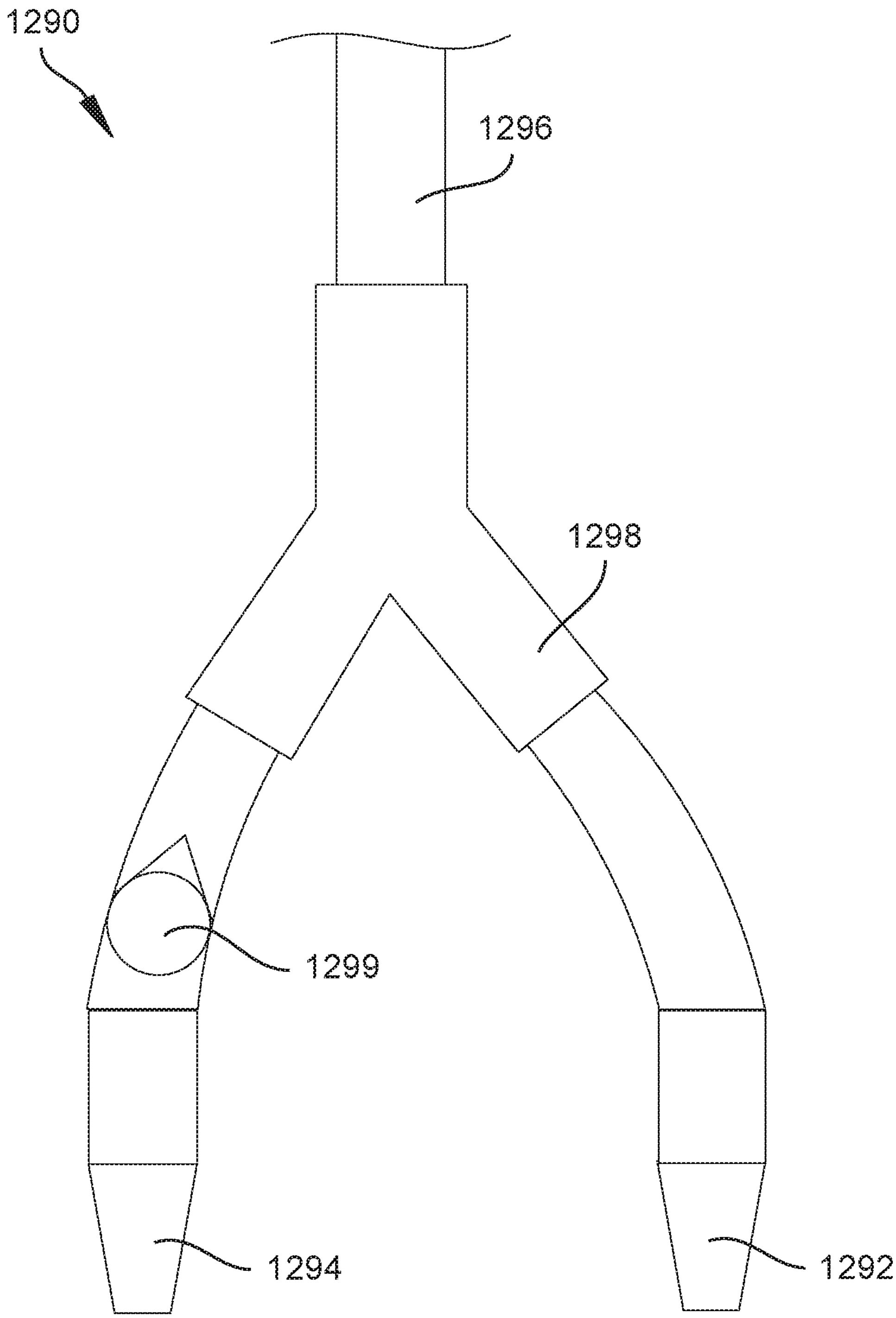
FIG. 15 depicts an example filling nozzle.

Referring now also to FIG. 15, an example filling implement 1290 is depicted. As shown, the filling implement 1290 includes a first filling nozzle 1292 and a second filling nozzle 1294. Such a filling implement 1290 may be utilized to fill a bag 26 such as that shown in FIG. 12. The filling implement 1290 includes a common line 1296 and a furcation 1298 which branches fluid flowing in the common line 1296 to each of the first and second nozzles 1292, 1294. Each of these nozzles 1292, 1294 may deliver fluid into separate compartments included in a bag 26. The second nozzle 1294 may be associated with an unpowered valve which halts flow into the associated compartment when that compartment reaches capacity. In the example embodiment a check valve 1299 is depicted. As the compartments of the bag 26 may be of differing sizes, one compartment may completely fill prior to the large compartment. Once the smaller of the compartments has filled, the pressure in that compartment may begin to build (relevant seals in the bag 26 may be constructed sufficiently soundly to withstand this pressure). The check valve 1299 may then actuate and prevent further flow into the smaller compartment after it is filled to capacity.

Figure 16:
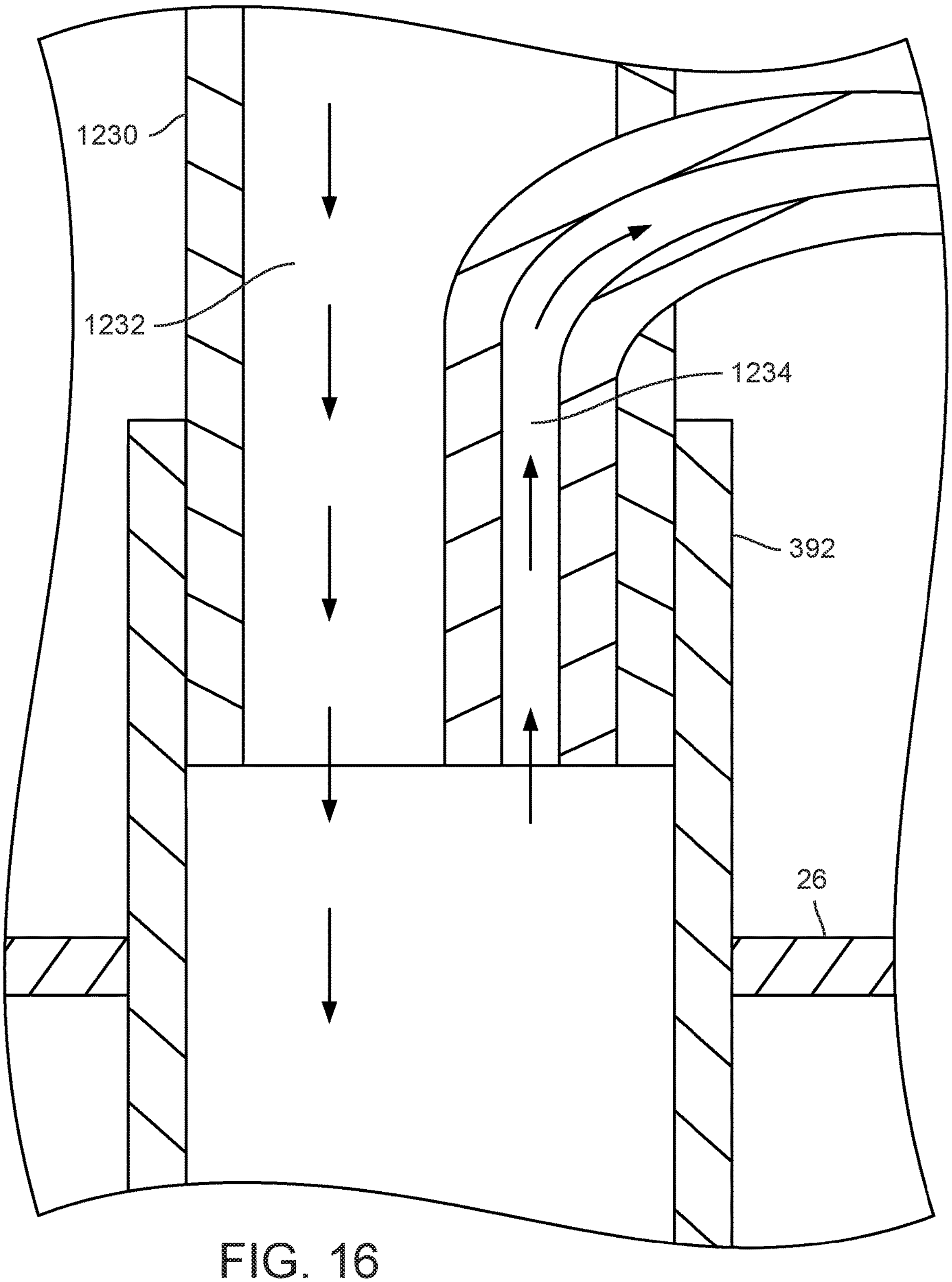
FIG. 16 depicts an example multi-lumen filling nozzle which may be used to fill a bag and collect an aliquot of fluid for sampling.

Referring now to FIG. 16, in some embodiments the filling nozzle 1230 may include features which may allow an aliquot of fluid to be isolated from the fluid filled into the bag 26. This aliquot may be created as fluid is filled into the bag 26. In certain examples, the aliquot may be collected by overfilling the bag 26 and collecting fluid which flows out of the bag 26 after the bag 26 has been filled to its capacity during the filling operation.

As shown, a filling nozzle 1230 may be inserted into a port 392 of a bag 26. The filling nozzle 1230 may include a first lumen 1232 and a second lumen 1234. The first lumen 1232 may be in fluid communication with a fluid source and may receive fluid which is pumped or otherwise delivered from the fluid source. Fluid from the fluid source may exit the first lumen 1232 and fill the bag 26. The second lumen 1234 may extend out of the filling nozzle 1230 and may be in communication with an aliquot collection reservoir. As fluid in excess of the capacity of the bag 26 is ejected out of the first lumen 1234, this overfilling may cause fluid in the bag 26 to be pushed out through the second lumen 1234. The fluid pushed out of the bag 26 through the second lumen 1234 should be compositionally the same as the rest of the fluid in the bag 26. Thus, the fluid passing to the aliquot collection reservoir during the period of overfilling may be representative of the contents of the bag 26 when tested.

In an alternative embodiment, the bag 26 may include two ports 392. The bag 26 may be overfilled through a first of the ports 392 and the second of the ports 392 may be in communication with an aliquot collection reservoir. After the bag 26 is filled to its capacity, additional fluid may cause fluid within the bag 26 to be force out of the bag 26 through the second port 392 and into the aliquot collection reservoir.

The aliquot collection reservoir may be separated from the bag 26 and the second port 392 may be closed with a spikeable access or septum. The filling nozzle may be removed from the first port 392 and the first port 392 may be sealed. As the fluid pushed into the aliquot collection reservoir was displaced from the interior volume of the bag 26, the fluid should be compositionally the same as the rest of the fluid in the bag 26 and testing performed on a sample from the aliquot should be representative of the bag 26 contents.

Figure 17:
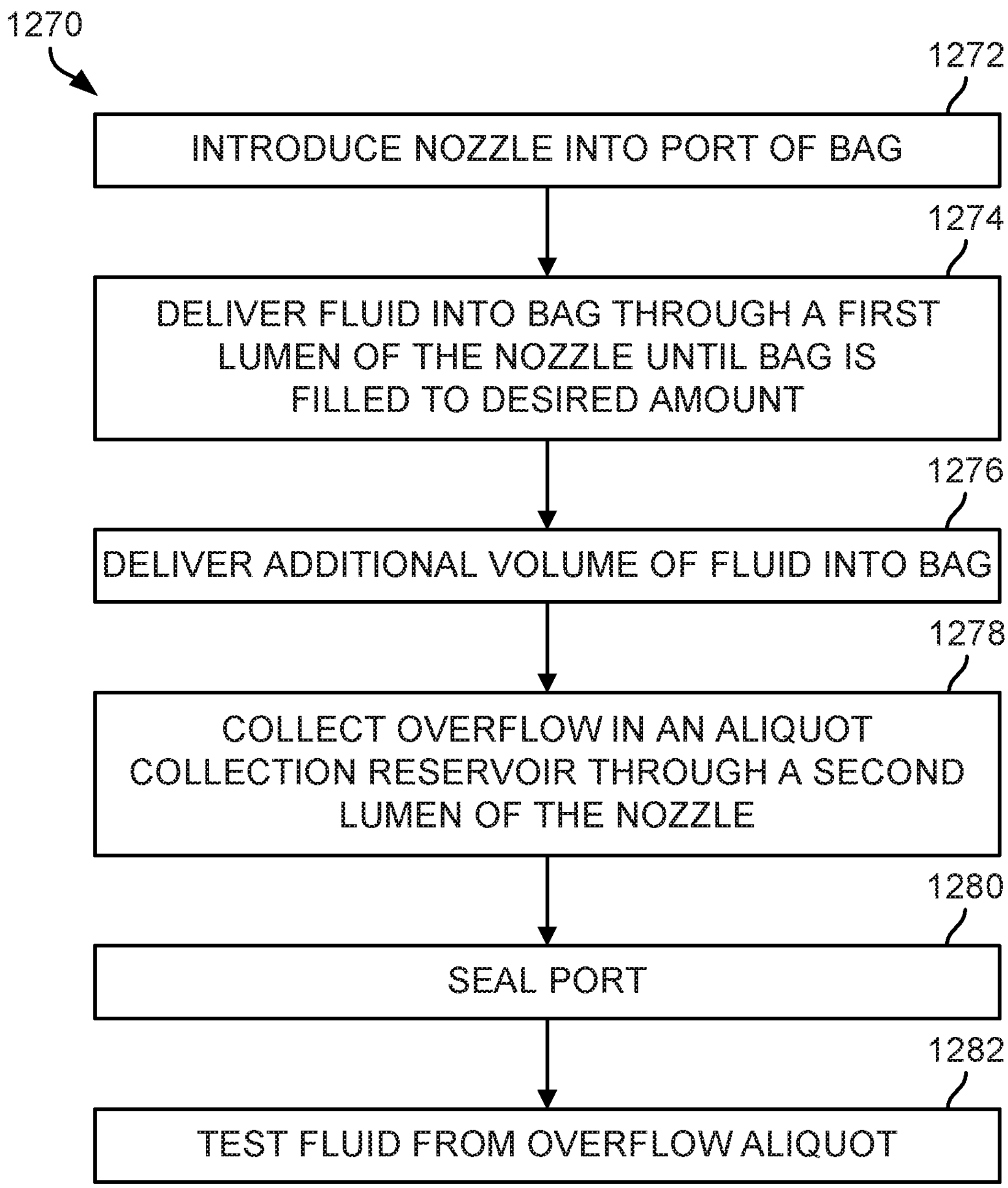
FIG. 17 depicts another flowchart detailing a number of example actions which may be executed to package fluid within a bag.

Referring now to FIG. 17, a flowchart 1270 detailing a number of exemplary steps which may be executed to package fluid within a bag 26 is shown. As shown, in block 1272, a nozzle 1230 may be introduced into a port 392 of the bag 26. In block 1274, fluid may be delivered into the bag 26 through a first lumen 1232 of the fill nozzle 1230 until the bag is filled to a desired amount. In block 1276, an additional volume of fluid may be delivered to the bag 26 through the first lumen 1232 of the nozzle 1230. In block 1278, the overflow out of the bag 26 may be collected in an aliquot collection reservoir through a second lumen 1234 in the nozzle 1230. In block 1280, the nozzle 1230 may be removed from the port 392 and the port 392 may be sealed closed. In block 1282, fluid from the overflow aliquot may be tested.

Figure 18:
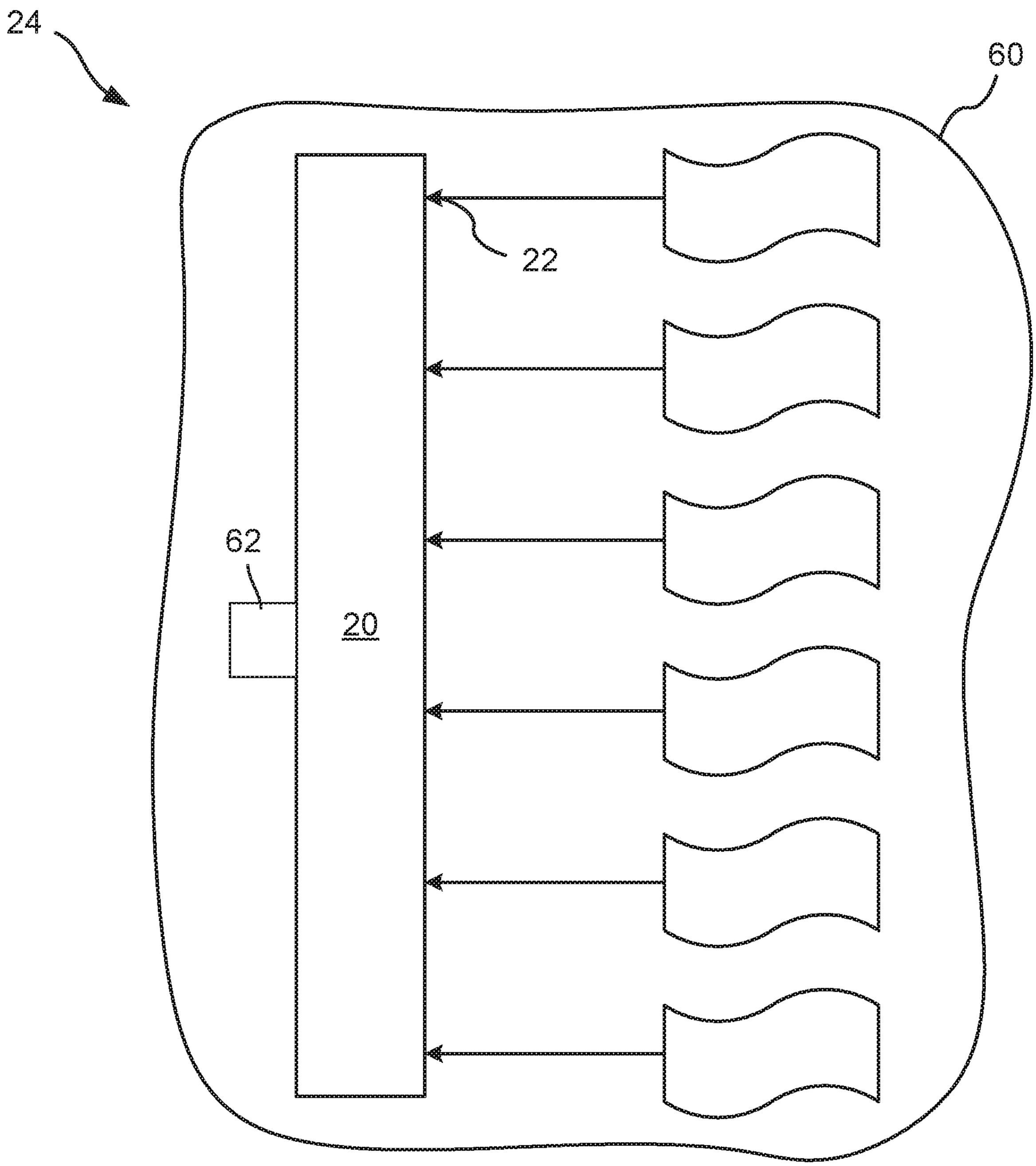
FIG. 18 depicts a diagrammatic example of a fill receiving set.

Referring now to FIG. 18, an example fill receiving set 24 is depicted. As shown, the fill receiving set 24 includes a plurality of bags 26 and administration sets 28. The manifold interface elements 22 of each administration set 28 are attached to a manifold 20 which is included as part of the fill receiving set 24. This attachment may be performed in a controlled sterile environment before placement of the bags 26, administration sets 28 and manifold 20 into an over pack 60. The over pack 60 may be a sealed bag or blister pack in certain embodiments. The entirety of the bags 26, administration sets 28 and manifold 20 may all be sterilized via an appropriate method perhaps after packaging within the over pack 60. Gamma sterilization, ethylene oxide, and/or electron beam sterilization may, for example be used. The over pack 60 may maintain a sterile environment which protects the fill receiving set 24 from contamination during storage. Any fill receiving set 24 described herein may be sterilized as outlined above. Embodiments which fill bags 26 individually may also receive bags 26 and perhaps a dispenser (e.g. bag magazine) within an over pack 60 sterilized as described above. Stopper dispensers described elsewhere herein may be similarly sterilized and provided in an over pack 60. Any other consumables described herein which replaced during operation of the system 10 may be provided sterilized in an over pack 60.

In some embodiments, various protective caps or films may be included over some components of the fill receiving set 24. For example, a film or cap may be included on any couplers on the manifold 20 that are not pre-connected to another component. This may facilitate establishment of aseptic connections if manipulation of the bags 26 and administration sets 28 after being removed from the over pack 60 is needed to install fill receiving set 24 into the system 10. The cap or film may be removed shortly before connection or installation to the system 10.

In some embodiments, the manifold interface elements 22 of the administration sets 28 may not be pre-connected to the manifold 20. The system 10 may make any necessary connections in an automated manner. This may be accomplished as described in U.S. application Ser. No. 16/384,082, filed Apr. 15, 2019, entitled Medical Treatment System and Methods Using a Plurality of Fluid Line, which is hereby incorporated by reference herein it its entirety.

In embodiments where the system 10 makes connections in an automated fashion, each of the manifold interface elements 22 may include a cap which may be removed by the system 10. In such embodiments, the system 10 may include a drivable sled upon which the manifold interface elements 22 may be installed. A second sled which includes cap retainers or graspers may also be included. The second sled may displace toward the first sled to couple with the caps. The second sled may then be displaced from the first sled to remove the caps from the administration sets 28. The second sled may then retract out of a displacement path of the first sled. The first sled may be advanced toward the manifold 20 to seat the manifold interface elements 22 on couplers of the manifold 20. In some embodiments, the administration sets 28 or another filling conduit may include a piercable septum which maintains a sterile barrier for the interior volume of the associated bag 26 and administration set 28. In such embodiments, the manifold 20 couplers may include piercing members such as spikes or needles and the action of the first sled may result in the piercing members being driven through and into sealing engagement with the piercable septums to facilitate filling.

The manifold 20 may also include a coupler 62 for establishing fluid communication with the output of a medical water production device 14. In some embodiments, this coupler 62 may include a cap and may be driven into a piercing member (e.g. spike or needle) communicating with the output from the medical water production device 14 in the manner described above. In other embodiments, the coupler 62 may be a luer fitting. By providing the manifold 20 within the over pack 60 with the manifold interface elements 22 pre-connected to the manifold 20, only a single connection may be made to place the bags 26 and administration sets 28 in communication with the output stream of the medical water production device 14. This eliminates a need to make a number of aseptic connections. This may be particularly desirable in embodiments where a fill receiving set 24 includes a large amount of bags 26 and administration set 28.

Each of the bags 26 may be the same volume bag 26 in certain embodiments. The bags 26 may, however, be filled to a volume that is smaller than capacity if desired. This may allow for uniformity and simplicity in the system 10. There would not be a need to stock many different fill receiving sets 24 (mini-bag, 250 ml, 500 ml, 1 liter, and so on). In some embodiments, there may be two types of sets 24. One type of set 24 may include bags 26 which are a largest volume size bag of bags 26 intended to be used for relatively small fluid volumes. These bags may accommodate any fill volume from very small volumes up to some first maximum volume (e.g. 500 ml). Other maximum capacity cutoffs may be used. The other type of set 24 may include large volume size bags which can accommodate any fill volume in a range of high volume preparations up to a second maximum volume higher than the first maximum volume. The volume in a particular bag 26 as the bag 26 is filling may be determined by at least one of a scale, flow meter, and/or a fluid transfer monitoring system such as that described in in U.S. application Ser. No. 16/384,082, filed Apr. 15, 2019, entitled Medical Treatment System and Methods Using a Plurality of Fluid Line, which is hereby incorporated by reference herein it its entirety.

In some embodiments, the system 10 may include a printer or labeling component which may provide an indication of the fill volume of the bag 26 directly on the bag 26 or administration set 28. Alternatively, where the bag 26 may include a unique identifier, the system 10 may communicate with a database which associates the fill volume with that unique identifier. Through a communications network, the unique identifier may be looked up (e.g. via a barcode or data matrix scanner) to query the database for the bag's 26 fill volume. Where a printer or labeling component is included, the printer or labeler may also document any information which may be required by law or regulation on the bag 26.

The bag 26 may be filled to a specific amount less than the intended total administration volume in certain instances. One instance where this may be done is when there is an intention to inject a volume of drug into the bag 26. In such instances, the bag 26 may be filled so as to contain an appropriate amount of diluent to generate a solution at administration concentration. For example, if a patient is prescribed one liter of drug preparation at a certain concentration, the bag 26 may be deliberately under filled by an amount equal to the volume of concentrated drug to be injected in order to generate the correct concentration solution for that patient. The system 10 may communicate with a physician order entry system and the control system 15 may determine the proper fill volume based on the prescription the bag 26 is being generated for.

Fill receiving sets 24 may also exist for certain types of drugs. For example, a fill receiving set 24 constructed with or outfitted for use with light sensitive drugs (e.g. amphotericin B, nitroglycerin, etc.). In such embodiments, the administration sets 28 and bags 26 may be made of a light blocking material or may be fitted with light blocking covers or sleeves. In some instances, material used to form the lines or bags 26 may include a light blocking layer (e.g. of amber or green material).

In certain examples, a plurality of fill receiving sets 24 having different characteristics (e.g. bag size) may be concurrently installed in the system 10. The system 10 may fill a bag 26 from an appropriately sized fill receiving set 24 depending on the order that the system 10 is fulfilling. In such embodiments, the fill receiving set 24 may include an indicium (e.g. barcode, data-matrix, RFID, etc.) which may be read by the system 10 to allow the system 10 to determine the type of set 24 installed.

Figure 19A:
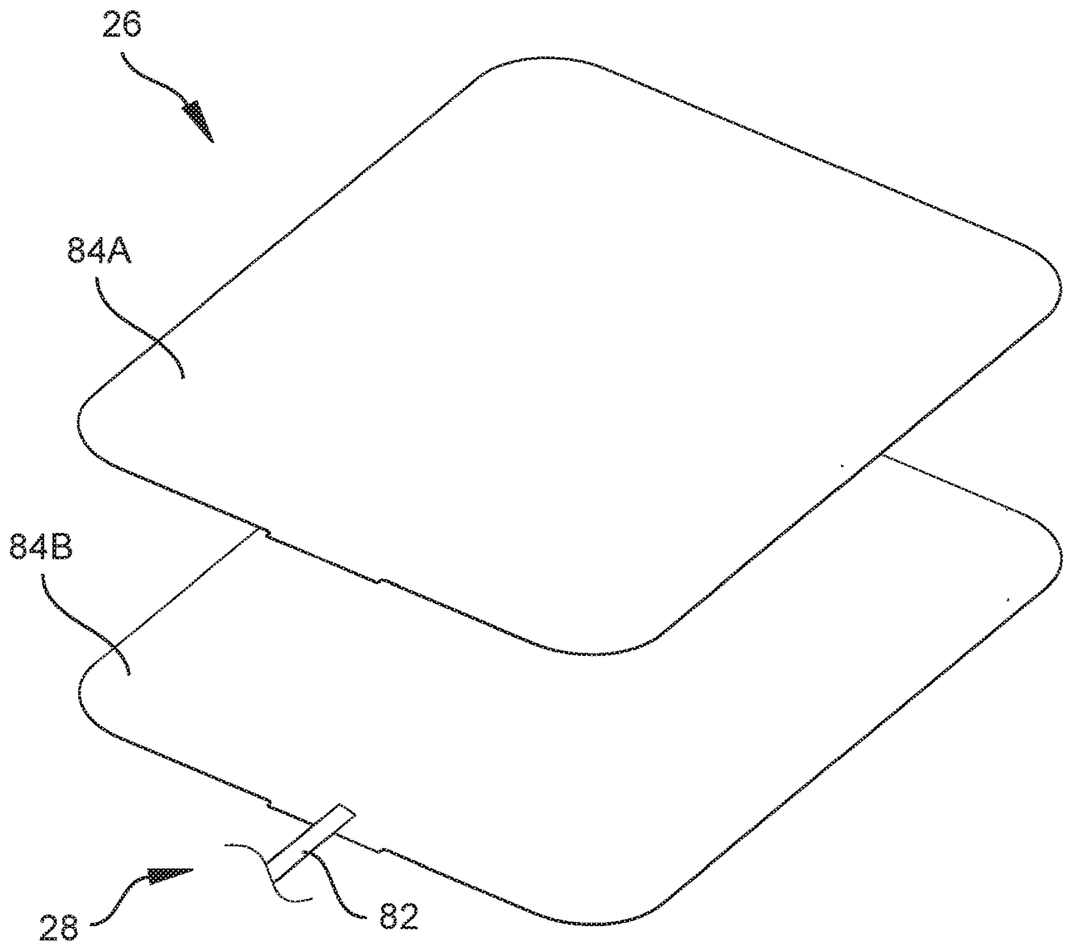
FIG. 19A depicts an exploded view of an example bag having an administration set.
Figure 19B:
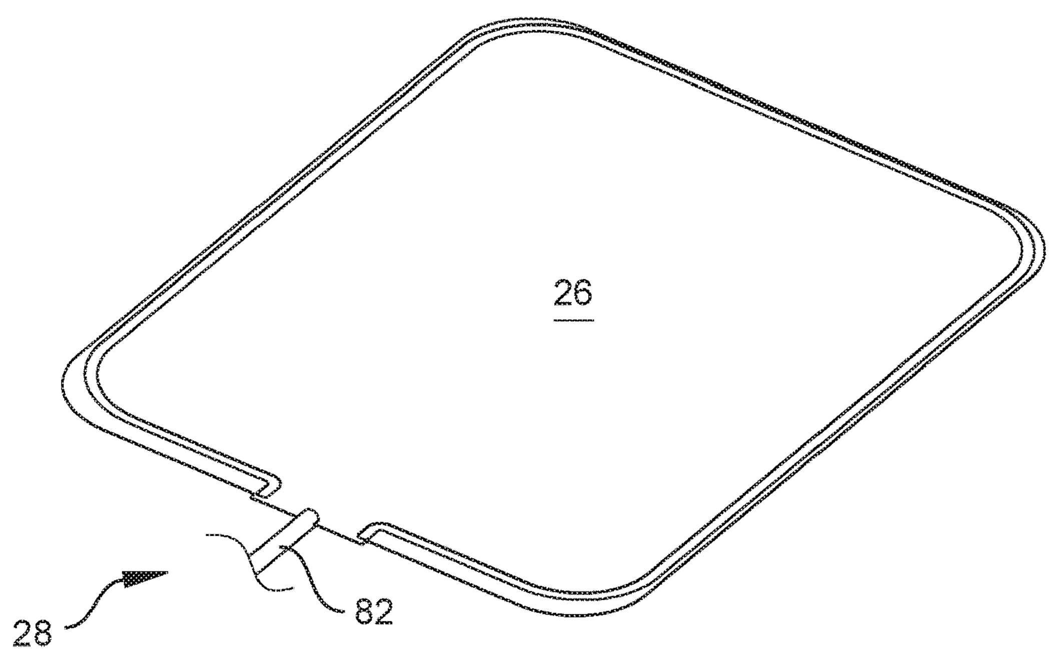
FIG. 19B depicts a top down view of an example bag having an administration set.

Referring now to FIGS. 19A-19B, the bags 26 and administration sets 28 included in a fill receiving set 24 may be integrated with one another. This may be desirable as it may allow for the administration set 28 to come pre-primed in certain embodiments. Additionally, it would remove the need to spike a bag 26. As a typical bag 26 can be difficult to hold and spike, an integrated set could make bags 26 more user friendly and remove an aseptic connection procedure that is performed during set up. The administration set 28 may be integrated into the bag 26 in a manner similar to that used to incorporate spike ports, injection ports, etc. into the peripheral seal of IV bags.

A bag 26 may, for example, be constructed of two separate sheets 84A, B of flexible material. The sheets 84A, B may be joined at their periphery via any suitable type of sealing method including solvent bonding, rf welding, heat sealing, adhesive, ultrasonic welding, etc. The sheets 84A, B may be made of any suitable material or laminate of materials. Tubing 82 may be similarly constructed. Layers of the laminate may be chosen and ordered to achieve desired objectives. For example, vapor or gas impermeable layer(s) or other barrier layer(s), bonding layer(s), solution compatible layer(s), and reinforcing or durability increasing layer(s) may be included. The materials chosen may be informed by intended sterilization method, weight, optical clarity, durometer, flexibility, heat resistance, lubriciousness, elastic modulus, required materials thicknesses, ease of molding (e.g. molding fittings to end of tubing), strength, propensity to kink, light blocking ability, dielectric/polar properties, etc. Materials which may be used to construct the bags and tubing are provided in Table 1 below:

| | | |
|---|---|---|
| Polymers | Homopolymers | Hydrocarbon copolymers |
| Polyesters | Polybutadiene | Polyamides |
| Styrene | Polyvinylchloride | polyolefins |
| Polypropylene | Propylene ethylene copolymer | Polyethylene copolymers |
| LDPE, VLDPE, ULDPE | MDPE | HDPE |
| Silicone | Cross-linked polyethylene | Synthetic Rubber |
| Thermoplastic Rubbers | Rubber | Latex |
| Fluoropolymers | Nylon | Plastics free of phthalate plasticizers or free of DEHP |
| Ethylene vinyl acetate | Polyether block amide | Thermoplastic Polyurethane |
| Plastics containing polar molecules | RF weldable polyolefin | |

Where the sheets 84A, B are of a multilayer construction they may be formed in extrusion lamination or co-extrusion processes for example. The tubing 82 of the administration set 28 may be made as a multi-layer construction (e.g. extrusion) of different materials. Where dissimilar materials are used an adhesive layer may be present in certain embodiments. The outer layer of the tubing 82 may have a lower melting point range than at least the inner layer(s) of the tubing 82. The melting point range of the outer layer of the tubing 82 may overlap with that of the bag 26 material. During construction, the tubing 82 may be compressed between the sheets 84A, B and heated in a welding process. The outer layer of the tubing 82 may be joined to the bag 26 and the inner layer may maintain a patent lumen which allows flow in and out of the bag 26 as shown in FIG. 19B. In alternative embodiments, the bag 26 may be blow molded. In such embodiments, the tubing 82 may be attached at the periphery in a similar welding process.

Figure 20:
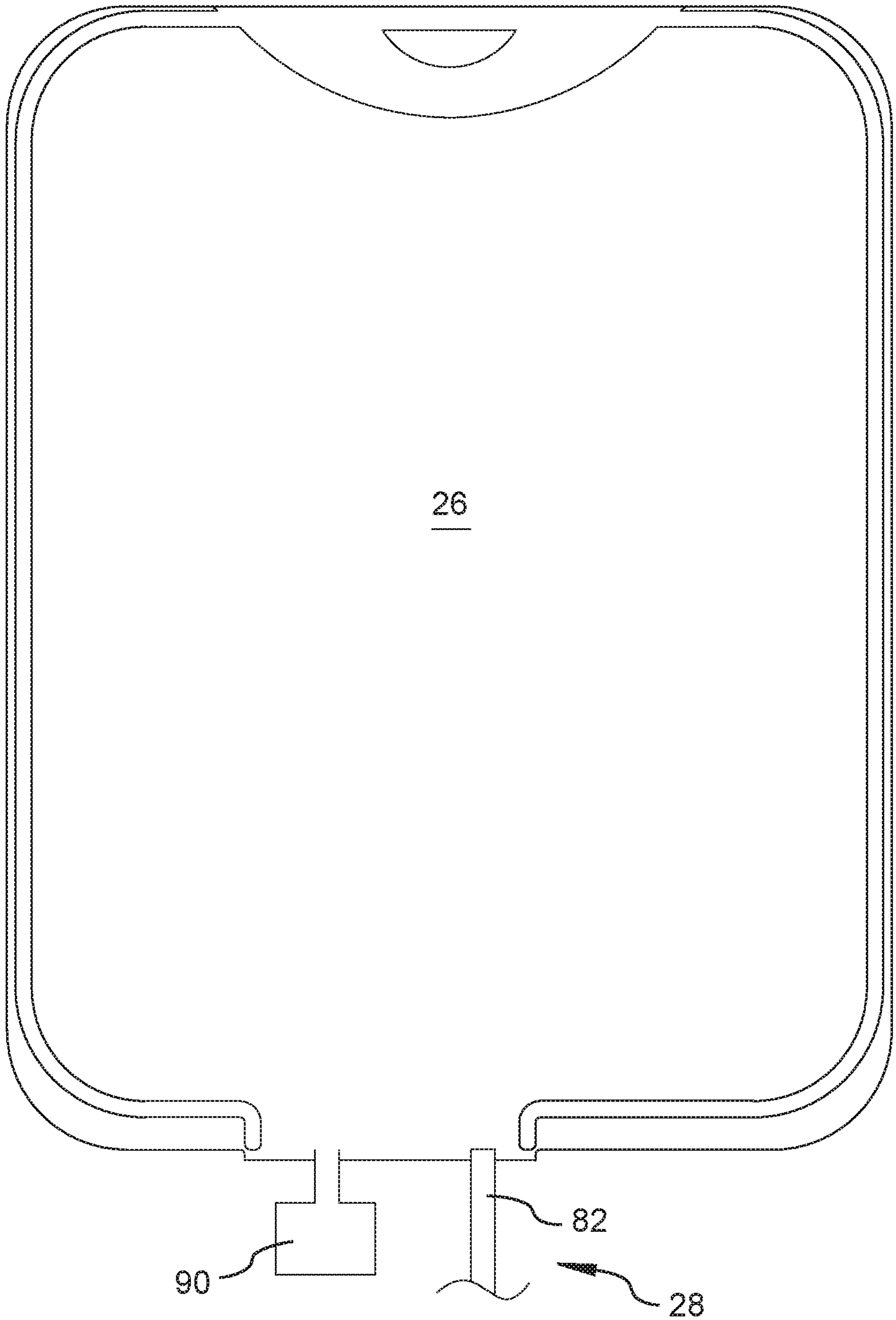
FIG. 20 depicts a top down view of another example bag.
Figure 21:
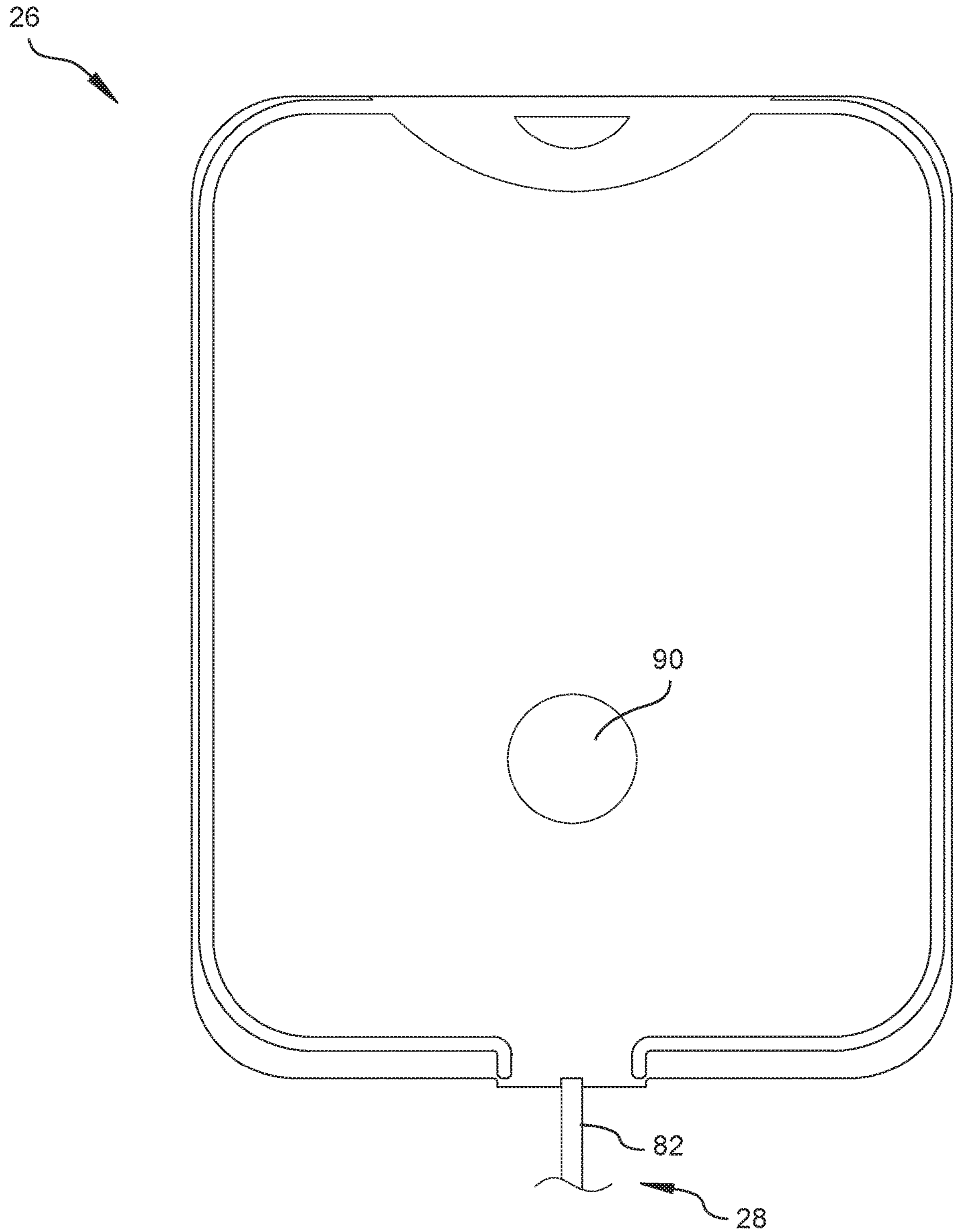
FIG. 21 depicts a top down view of another example bag.

FIG. 20 depicts another example bag 26. The exemplary bag 26 in FIG. 20 includes an administration set 28. The bag 26 also includes an example filling port 90. The example filling port 90 may interface with either a manifold 20 or may directly interface with an output of a medical water production device 14. The filling port 90 may be integrated into the bag 26 as described above for the tubing 82 and may include a self sealing septum, plug, cap, or similar sealing arrangement. This sealing member may be installed after the filling process has completed. Alternatively, a sealing member may not be used and a welded seal may be formed instead. The filling port 90 may also be used as an injection port which may allow for addition of medication into the bag 26 as desired. In other embodiments, the fill port 90 may be located in a side of the bag 26 where the administration set 28 is not attached. The fill port 90 may also be included in a face of one of the panels which are joined together to form the bag 26 as shown in FIG. 21.

Figure 22A:
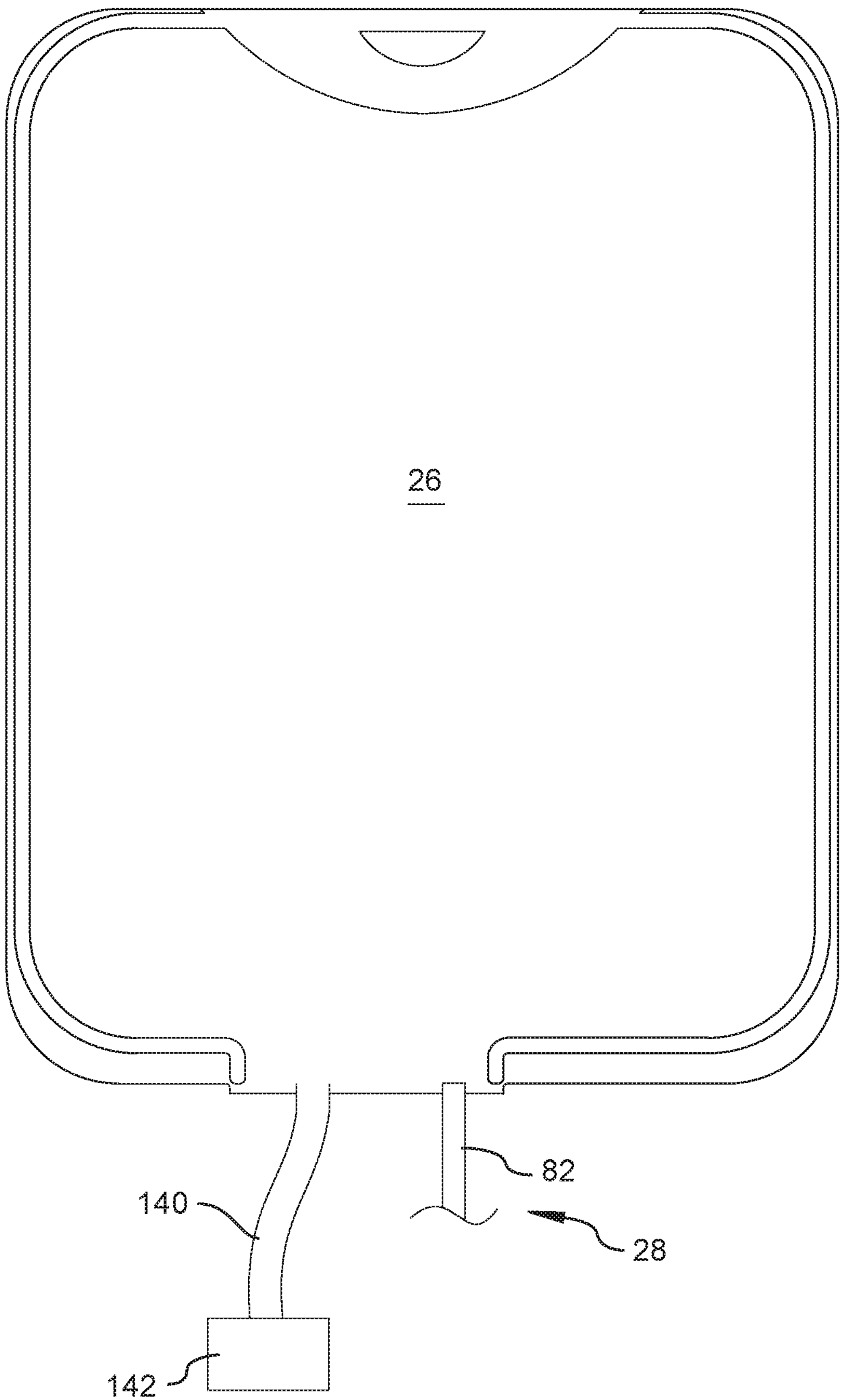
FIGS. 22A-22F depict views of a bag including an administration set and a filling line which is in various stages of being sealed closed.

FIG. 22A depicts an alternative bag 26 design in which the administration set 28 is integrated into the bag 26 as discussed elsewhere herein, but is accompanied by a separate filling line 140. The filling line 140 may be integrated into the bag 26 similarly to the administration set 28. The filling line 140 may include a coupler 142 which interfaces with the system 10 to receive a fluid stream during filling.

The coupler 142 may be located on a portion of the filling line 140 which is sacrificial and removed after filling. In some embodiments, the coupler 142 may be molded into and form part of this portion of the line. The coupler 142 may be a luer fitting in some examples. In other embodiments, a piercable septum as described above may be included.

Figure 22B:
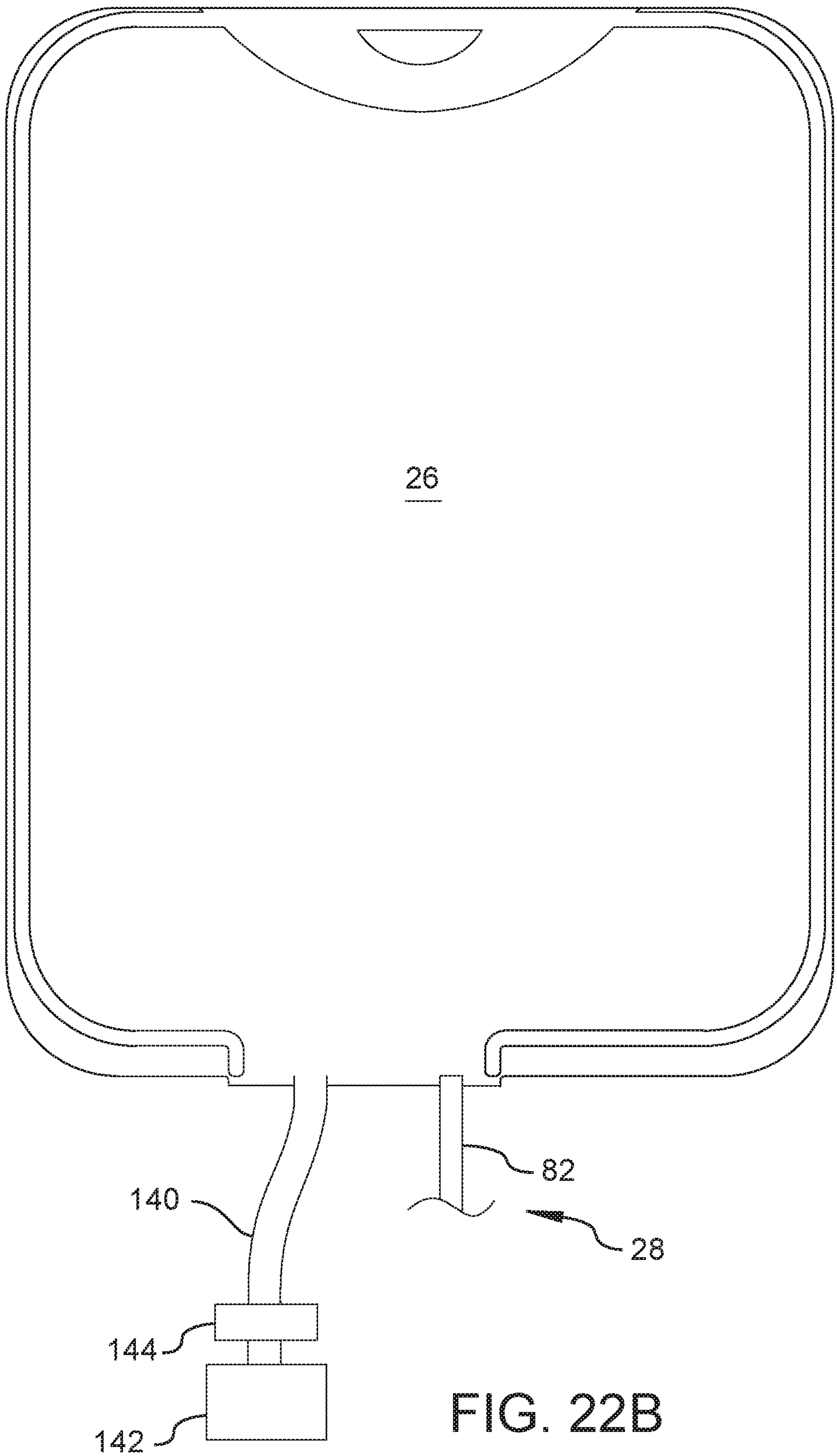
Figure 22C:
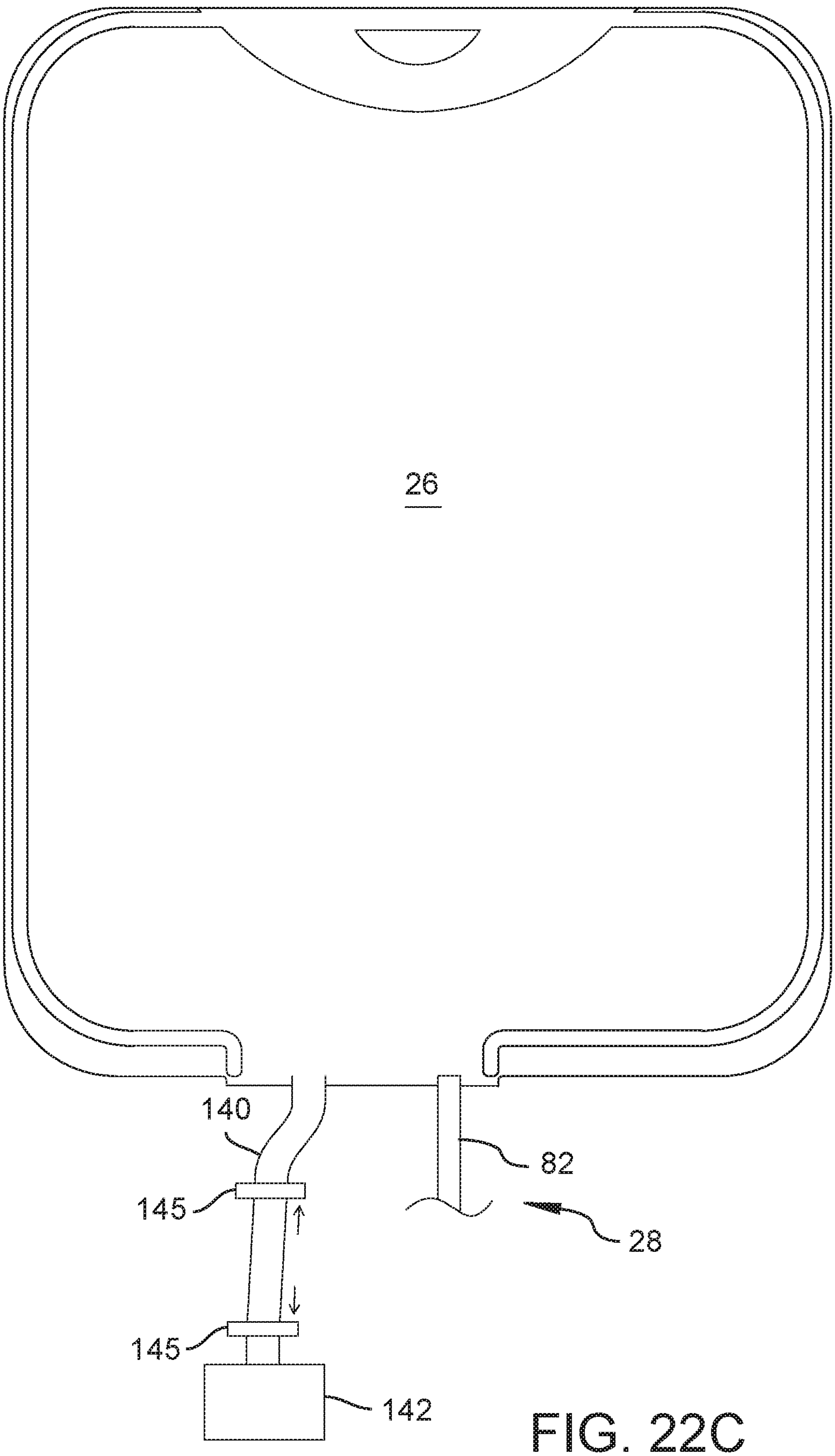
Figure 22D:
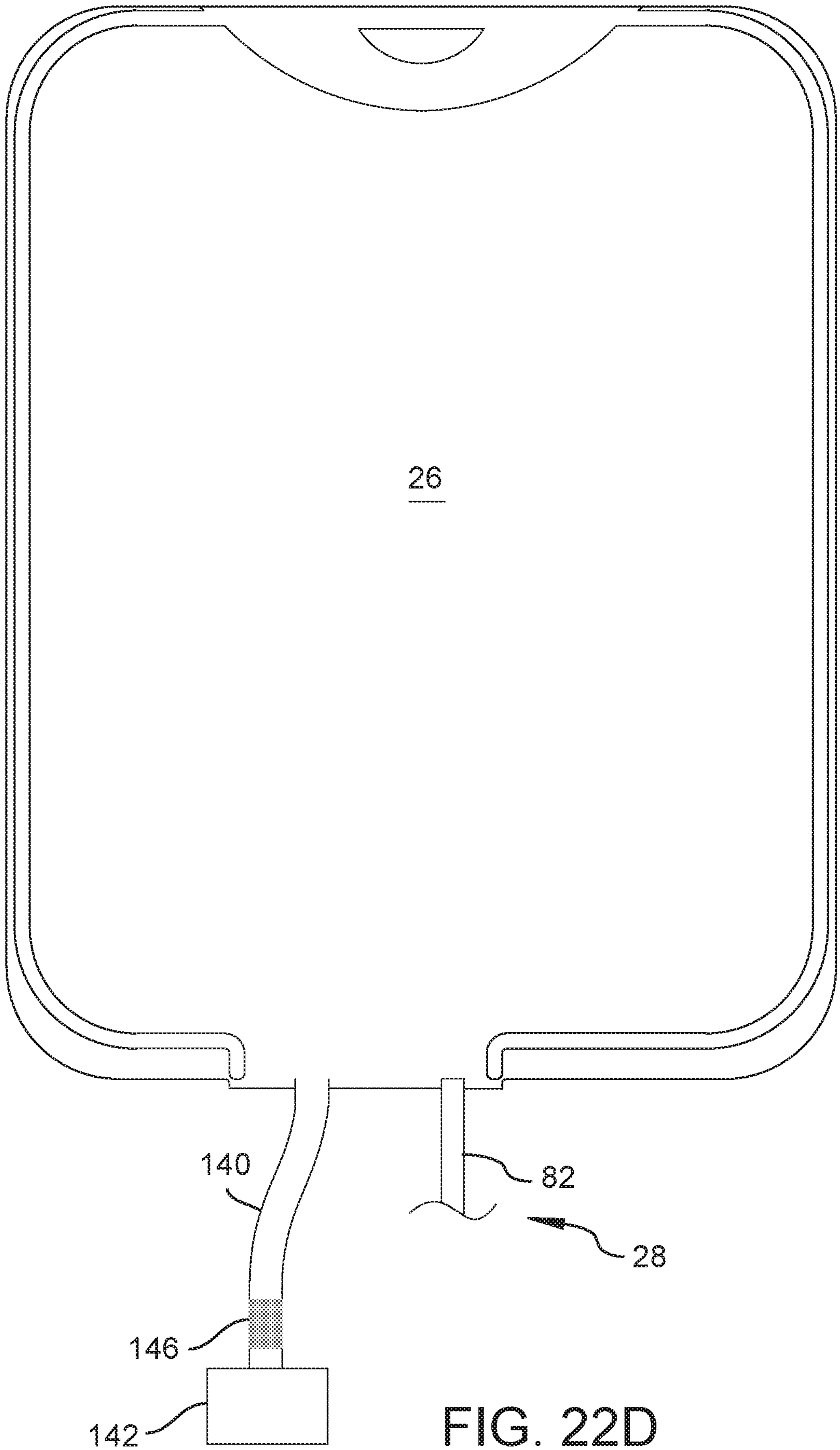
Figure 22E:
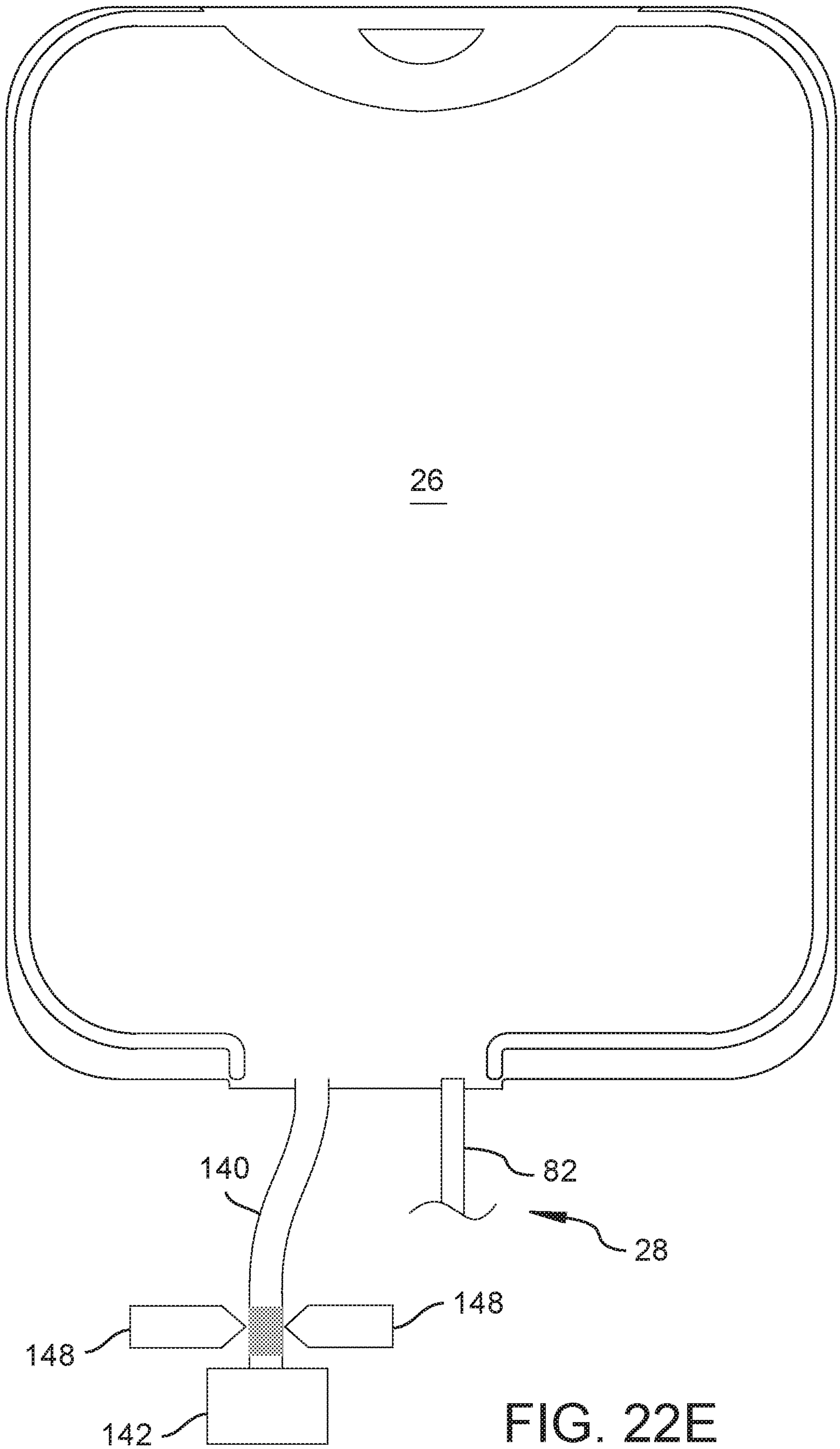
Figure 22F:
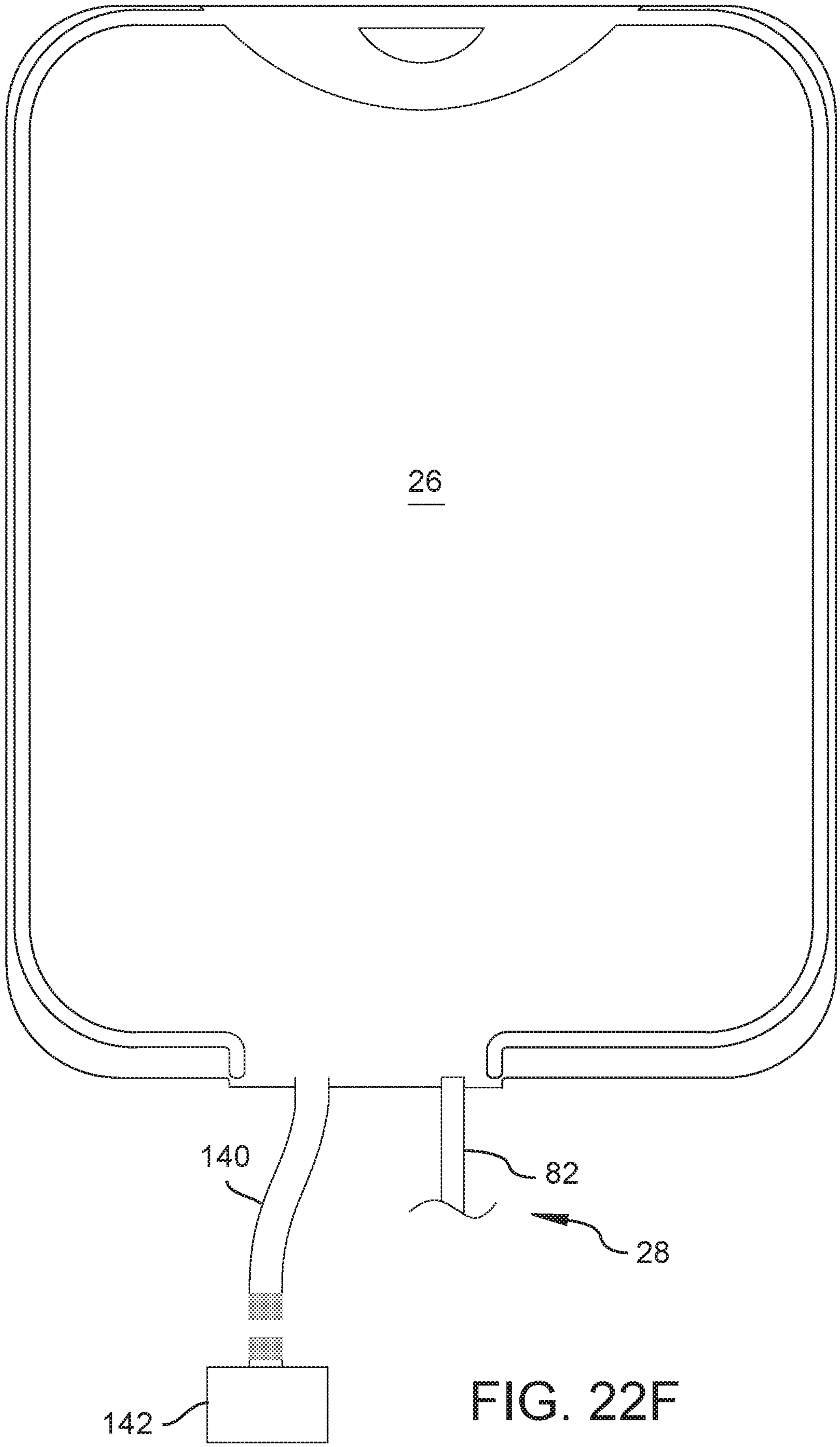

As shown in FIGS. 22B-D, after filling the bag 26 through the filling line 140, the system 10 may generate a seal 146 (indicated by shading in FIG. 22D) in a segment of the filling line 140. This may be produced via an rf weld or similar process or a tube sealer assembly 906 such as that shown and described in relation to FIG. 172 may be used. The seal 146 may be formed via a rf welding dies/bars 144 of the system 10. In some embodiments a roller or squeegee assembly 145 may be used prior to introduction of the welding dies 144. The roller or squeegee assembly 145 may press against the filling line 140 and a pair or rollers or squeegees of the assembly 145 may be displaced in opposing directions to push liquid out of the weld area 145 as shown in FIG. 22C. The welding dies 144 may then be introduced to form the seal in the filling line 140. The roller or squeegee assembly 145 may or may not remain present as the seal is generated. Once the seal 146 has been formed, a cutting element 148 (see, FIG. 22E) may separate the sacrificial end of the filling line 140 from the rest of the rest of the filling line 140. This may result in a sealed portion of filling line 140 extending from the bag 26 as shown in FIG. 22F. Preferably, the sealed portion of the filling line 140 may be kept to a minimal length in order to limit the volume of fluid which may become isolated from the administration set 28 as the bag empties. In certain examples, the seal 146 may be extended to the peripheral edge of the bag 26.

Figure 23:
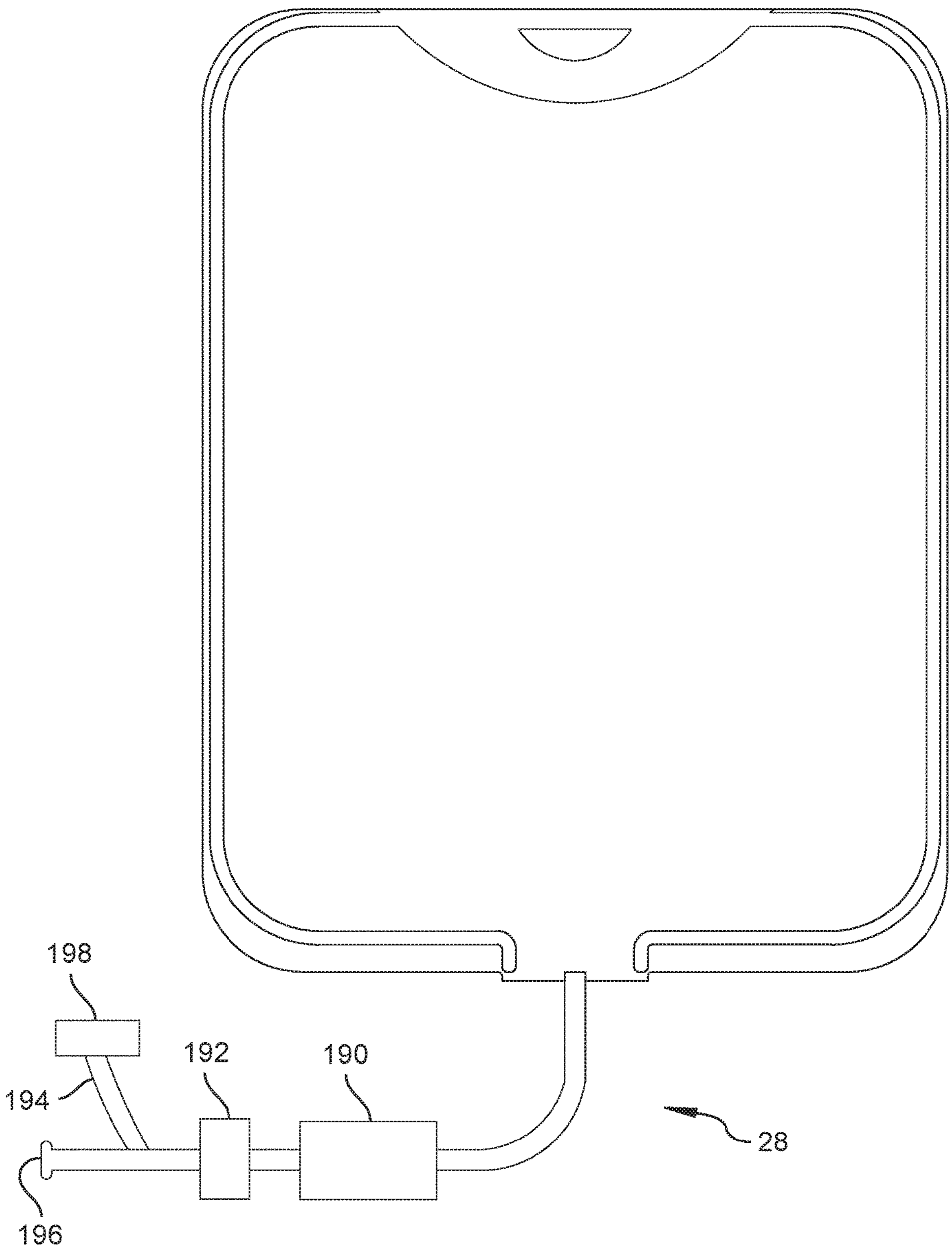
FIG. 23 depicts a top down view of another example bag.

Referring now to FIG. 23, another bag 26 design is depicted. As shown, the bag 26 includes an administration set 28 which is integrated to the bag 26 as described elsewhere herein. The administration set 28 includes a drip chamber 190, a roller clamp 192 (though another type of clamp or no clamp may be included), and a Y-site 194 (or other type of furcation). The bag 26 may be filled through a fill port 196 attached to the Y-site 194. Once the bag 26 has been filled, the portion of the branch from the Y-site 194 leading to the fill port 196 may be sealed (e.g. by high frequency weld) and the fill port 196 may be cut off the administration set 28 as described elsewhere herein. During administration, the remaining branch of the Y-site 194 may include an administration port 198 which includes a lumen that remains patent after sealing and removal of the other branch off the Y-site 194. This administration port 198 may be connected to a cannula line or the like to administer the contents of the bag 26. In such embodiments, the cannula line may include a check valve to prevent backflow. The ports 196, 198 may include luer fittings in some embodiments. This type of bag 26 and administration set 28 may come pre-primed. Before use, a user may hold the bag 26 and set 28 such that the administration set 28 is vertically above bag 26. The drip chamber 190 may be squeezed as needed to displace fluid in the drip chamber 190 into the bag 26. Air within the bag 26 may then be sucked into the drip chamber 190 as the drip chamber 190 restores to its normal shape. This may create the air space in the drip chamber 190 used to operate the drip chamber 190 and visualize drop formation during flow rate setting.

Figure 24:
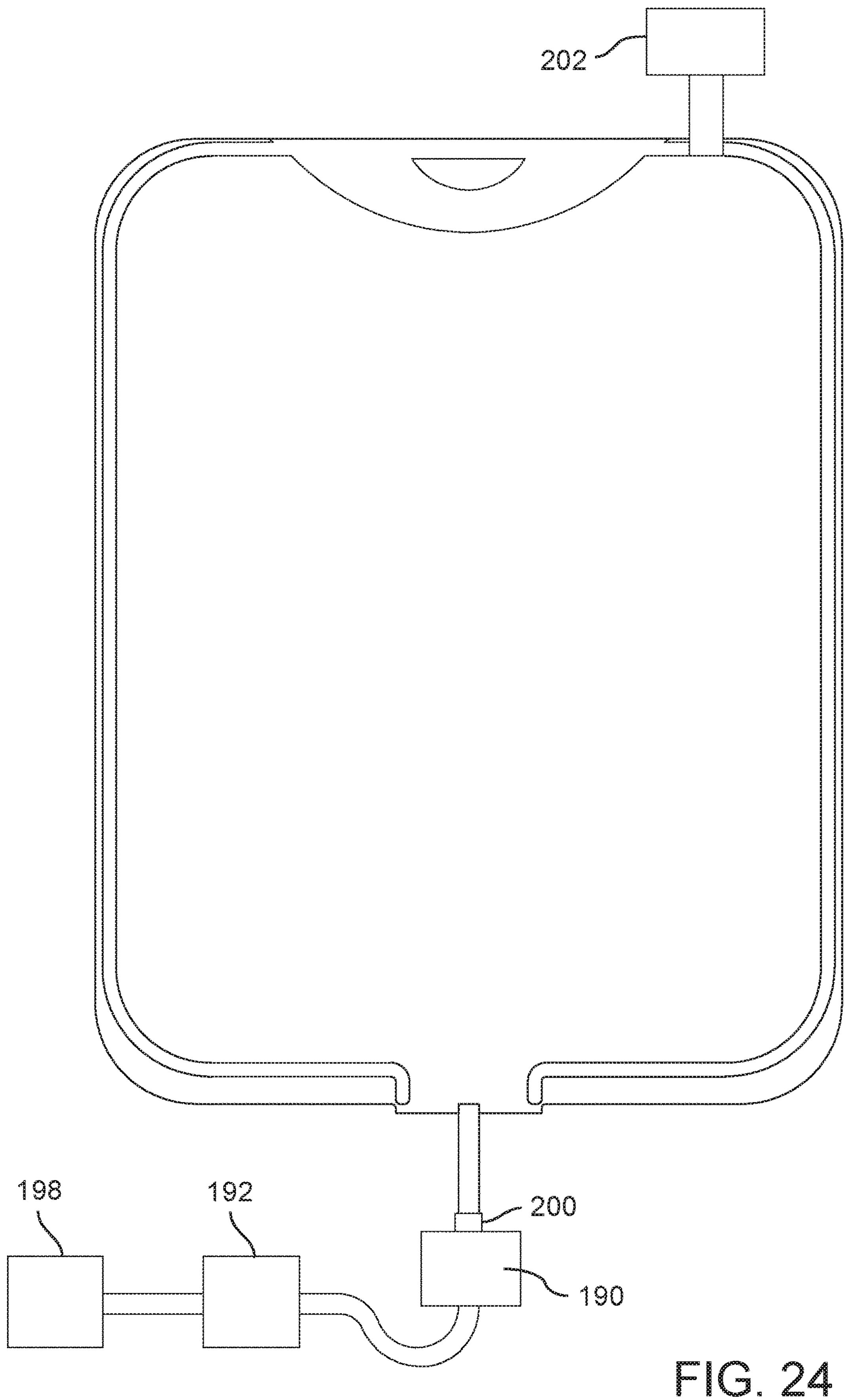
FIG. 24 depicts a top down view of yet another example bag.

Referring now to FIG. 24, another example bag 26 and administration set 28 are shown. As shown, this bag 26 and administration set 28 do not include the Y-site 194 (see, e.g., FIG. 23). Instead, the administration set 28 includes the administration port 198. The drip chamber 190 is attached to a frangible or breakable barrier 200 which may be broken by a user prior to administration such that the user may prime the administration set 28. The bag 26 may include a fill access 202 on another portion of the bag 26 which interfaces with the output of the medical water production device 14 or a manifold 20. Once filled, this access may be welded closed and a portion of it may be cut from the bag 26. This process may be similar to that shown for the bag 26 shown in FIGS. 22A-22F. Alternatively, a fill access 202 may be provided in a form of a Y-site 194 (see, e.g., FIG. 23) which is disposed upstream of the drip chamber 190. In some embodiments, an injection port may also be included in the bag 26. Such an injection port may be included in a side panel of the bag 26 or may attach at an edge of the bag 26 (e.g. adjacent the attachment point of the administration set 28).

Figure 25A:
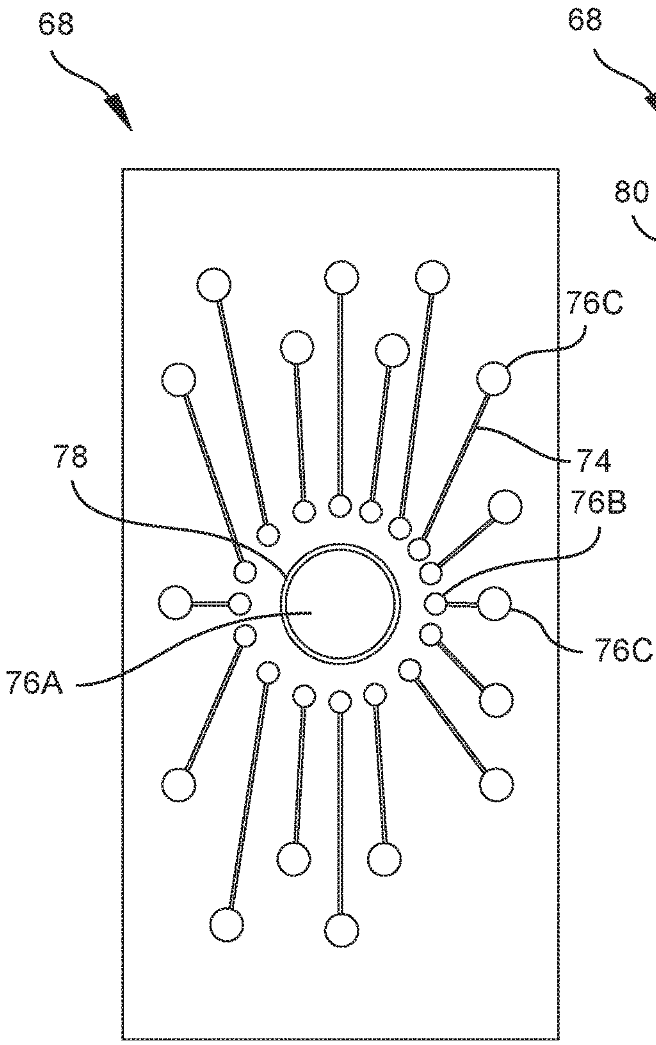
FIGS. 25A-C depict views of an example manifold.
Figure 25B:
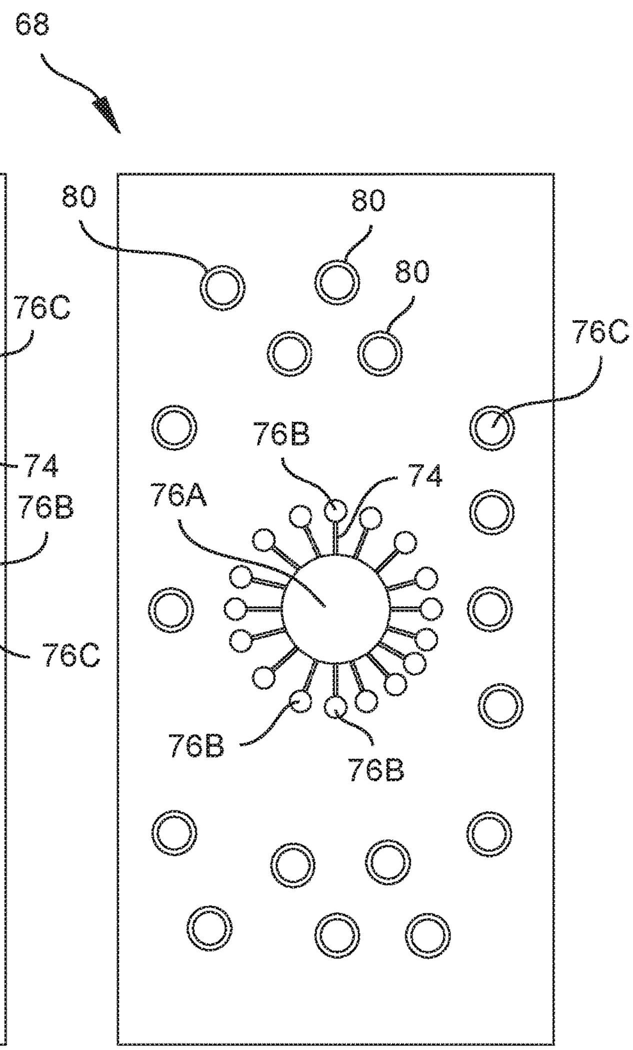
Figure 25C:
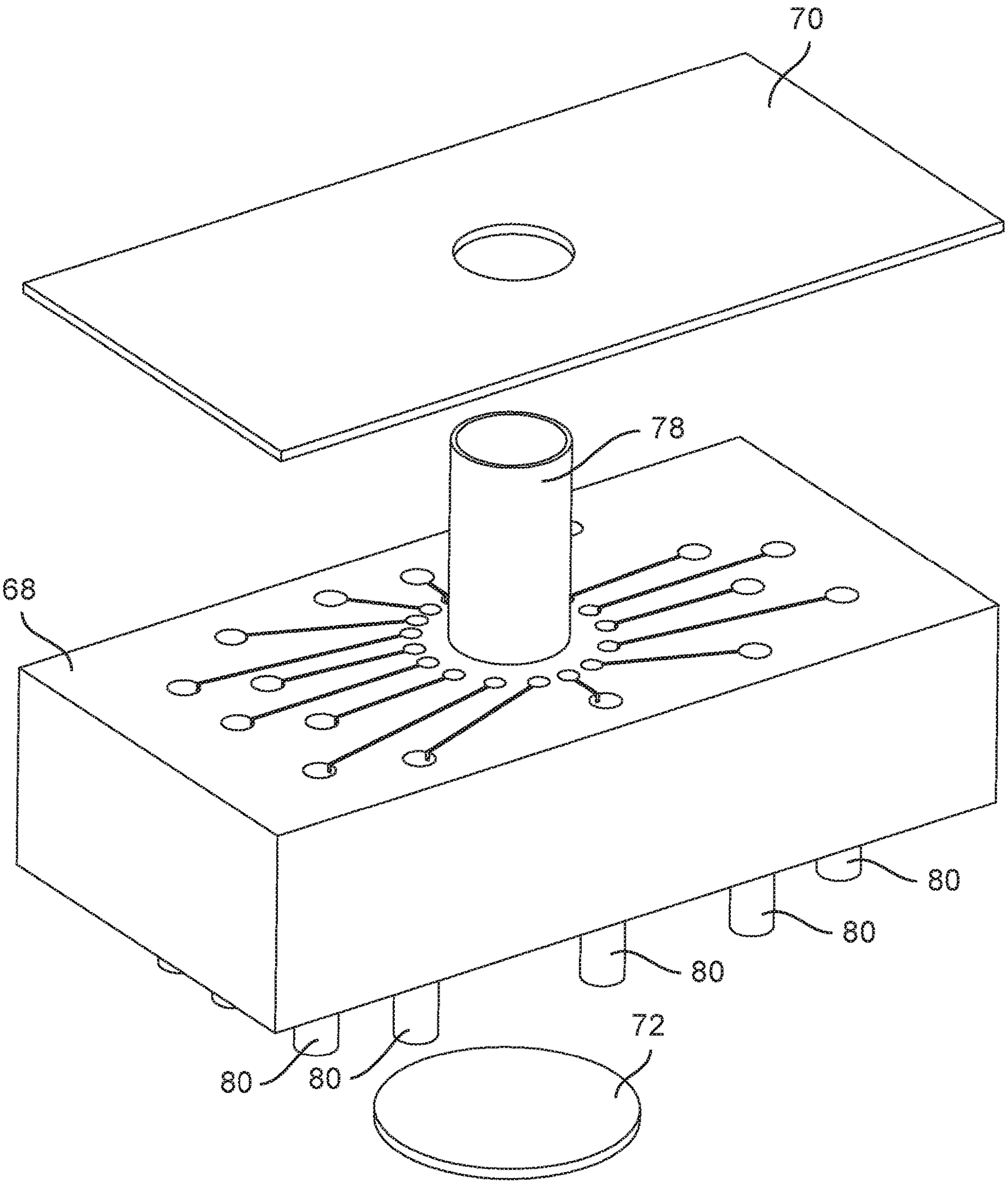

Referring now to FIGS. 25A-C, an exemplary manifold 20 is shown. A manifold 20 included in the fill receiving set 24 may be a single use component. Alternatively, the manifold 20 may be returned to a manufacturer or brought to another location after use and cleaned to allow it to be used in another fill receiving set 24. In embodiments where the manifold 20 is a single use component, it may be designed to be simple to manufacture and not unnecessarily expensive. For example, the manifold 20 may be constructed of an injection molded block 68 of material including a number of flow paths 74. These flow paths 74 may be open on one side. As best shown in FIG. 25C, a plate or plates 70, 72 may then be attached to the block 68 to cover any open portions of the flow paths 74. These plates may be attached in any suitable manner including via heat, solvent bonding, welding, fasteners (and perhaps gaskets), adhesives, etc. In certain embodiments, the plates 70, 72 may be laser welded onto the block 68 and the block 68 may be made of a material selected at least in part for its ability to absorb a laser welding wavelength (e.g. may be black). The plates 70, 72 in this embodiment may be clear to allow the laser to pass through to the block 68. The laser weld may seal around the peripheries of any flow paths 74 included in the manifold 20. Though described as plates 70, 72 use of flexible film covers in place of at least one of the plates 70, 72 is also conceived in some examples.

Referring primarily to FIGS. 25A and 25B which depict opposing faces of a block 68 of an example manifold 20, the block 68 may include a number of pass-throughs 76A-C in communication with the fluid paths 74. The block 68 may also include a number of fittings or couplers 78, 80. The couplers 78, 80 may be luer fittings in some example embodiments. If necessary, plates 70, 72 may include orifices through which the couplers 78, 80 may extend (see, e.g. FIG. 25C). In other embodiments, the plates 70, 72 may include the couplers 78, 80. Coupler 78 may be used to form a connection to the output of the medical water production device 14. The coupler 78 may surround a pass through 76A which leads to the opposing side of the block 68. The pass-through 76A associated with the coupler 78 may be in fluid communication with a number of flow path 74 segments on the opposing side of the block 68. These flow path 74 segments may each extend to their own pass-through 76B. In the example, the flow paths 74 extend radially from pass-through 76A. Any desired routing scheme may be used in alternative embodiments. The pass-throughs 76B each extend through the block 68 to a flow path 74 segment on the side of the block including coupler 78. These flow path segments 74 in turn extend to another pass through 76C which extends through the block 68. Each pass-through 76C extends to a coupler 80 on the opposing side of the block 68. Each of the couplers 80 may couple with a manifold interface element 22 of an administration set 28 included in the fill receiving set 24. Alternatively, any manifold interface elements 22 described herein may be included on another filling access such as fill access 202 of FIG. 24 or filling line 140 of FIG. 22A-F.

Figure 26:
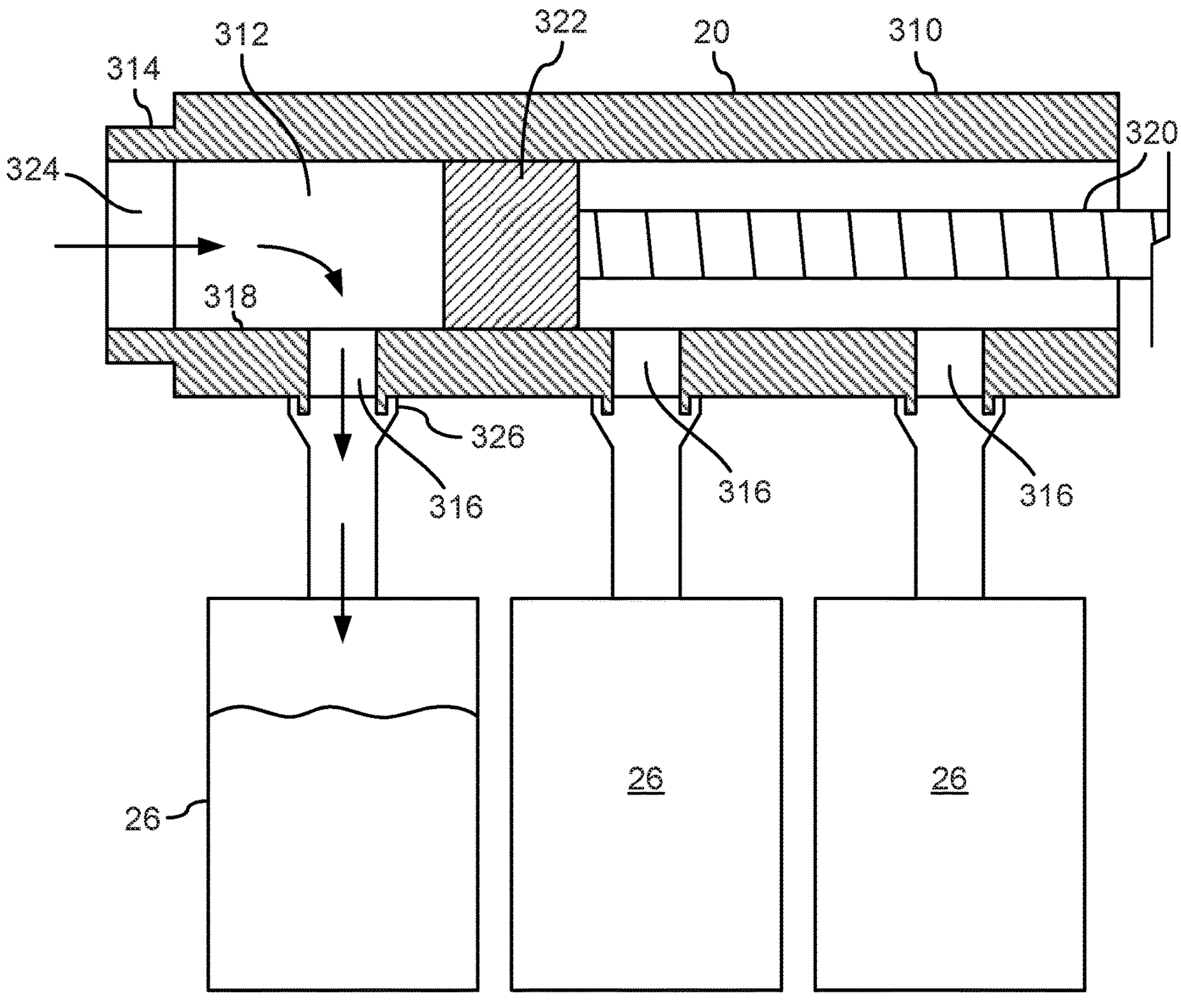
FIG. 26 depicts a view of an example fill receiving set including another example manifold.

A fill receiving set 24 including another example of a manifold 20 is depicted in FIG. 26. The manifold 20 may include a block 310. The block 310 may include a flow channel 312 therethrough. The block 310 may also include a connector interface 314 for coupling an inlet 324 of the manifold 20 with a dispenser for medical water or a medical fluid mixture (e.g. the output of medical water production device 14 or mixing volume 34). The flow channel 312 may include a number of branches 316 which extend from the fluid channel 312 wall 318 to ports 326 on a face of the block 310. A displaceable seal may be included within the fluid channel 312. In certain examples a displaceable rod 320 may be provided within the fluid channel 312. The displaceable rod 320 may include a sealing section 322 which may be made of or clad with a complaint material (rubber, silicon, various elastomers, etc.). Alternatively, the sealing section 322 may include one or more o-rings or raised complaint sections. The sealing section 322 may press against the wall 318 of the fluid channel and form a seal between the wall 318 and the displaceable rod 320 such that fluid on one side of the sealing section 322 may not pass to the other side of the sealing section 322. The displaceable rod 320 may be a plunger 330 (see, e.g. FIG. 27) in some embodiments. The displaceable rod 320 may also be a threaded rod or lead screw 332 (see, e.g., FIG. 29) in various examples. The actuator used to govern displacement of the displaceable rod 320 may be selected based on the type of displaceable rod 320 used.

The displaceable rod 320 may be actuated along the extent of the flow channel 312 to place various branches 316 into communication with the inlet 324. This may allow for bags 26 to be filled serially (one, two, or three, and so on at a time). In the example shown in FIG. 26, a bag 26 is in fluid communication with the inlet 324 such that fluid entering the manifold 20 may be directed to that bag 26. The sealing section 322 of the displaceable rod 320 prevents flow of incoming fluid to any other bags 26 coupled to ports 326 of the manifold 20. After the first bag 26 has been filled, the bag 26 may be sealed from the fluid channel 312 and removed from the manifold 20. This may be accomplished with welding dies 144 and perhaps a roller or squeegee assembly 145 similarly to as described in relation to FIGS. 22A-F. The displaceable rod 320 may then be displaced along the fluid channel 312 to place a next bag 26 or bags 26 into fluid communication with the inlet 324 for filling and the process may be repeated. Though only three bags are shown, any number of bags 26 may be included on a manifold 20.

Additionally, in certain embodiments, a manifold 20 may include multiple flow channels 312 each associated with a displaceable rod 320 (e.g. all extending parallel or generally parallel to one another). This may allow filling of bags 26 in communication with different flow channels 312 in a parallel manner or independently from one another. Where bags 26 associated with different flow channels 312 are filled in parallel, the displaceable rods 320 of the various flow channels 312 may be coupled so as to move in a coordinated manner with one another (perhaps in a 1:1 ratio for example). A system 10 may also fill bags 26 of multiple manifolds 20 where multiple manifolds 20 may be installed in the system 10 at the same time.

Figure 27:
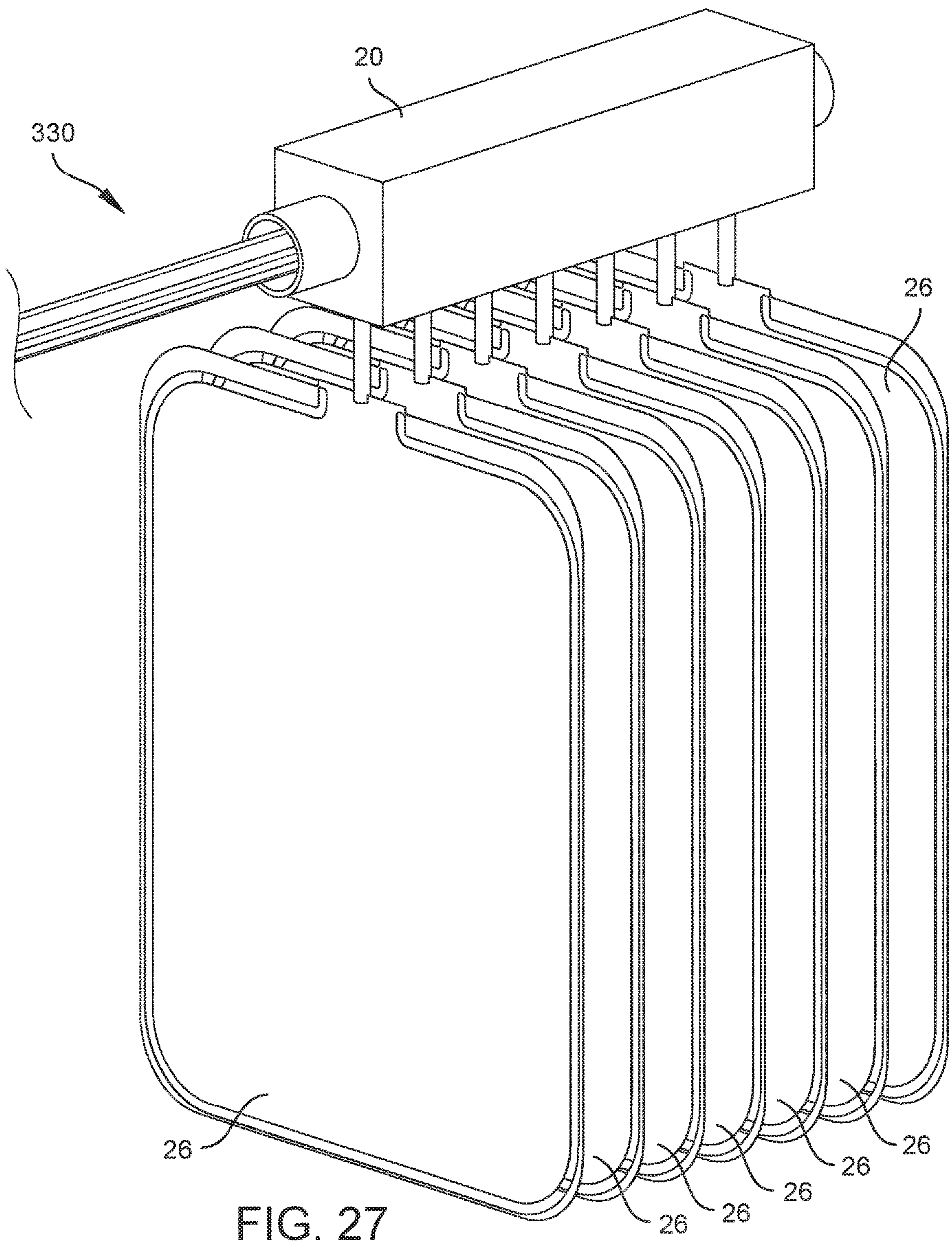
FIG. 27 depicts a perspective view of an example fill receiving set.
Figure 28:
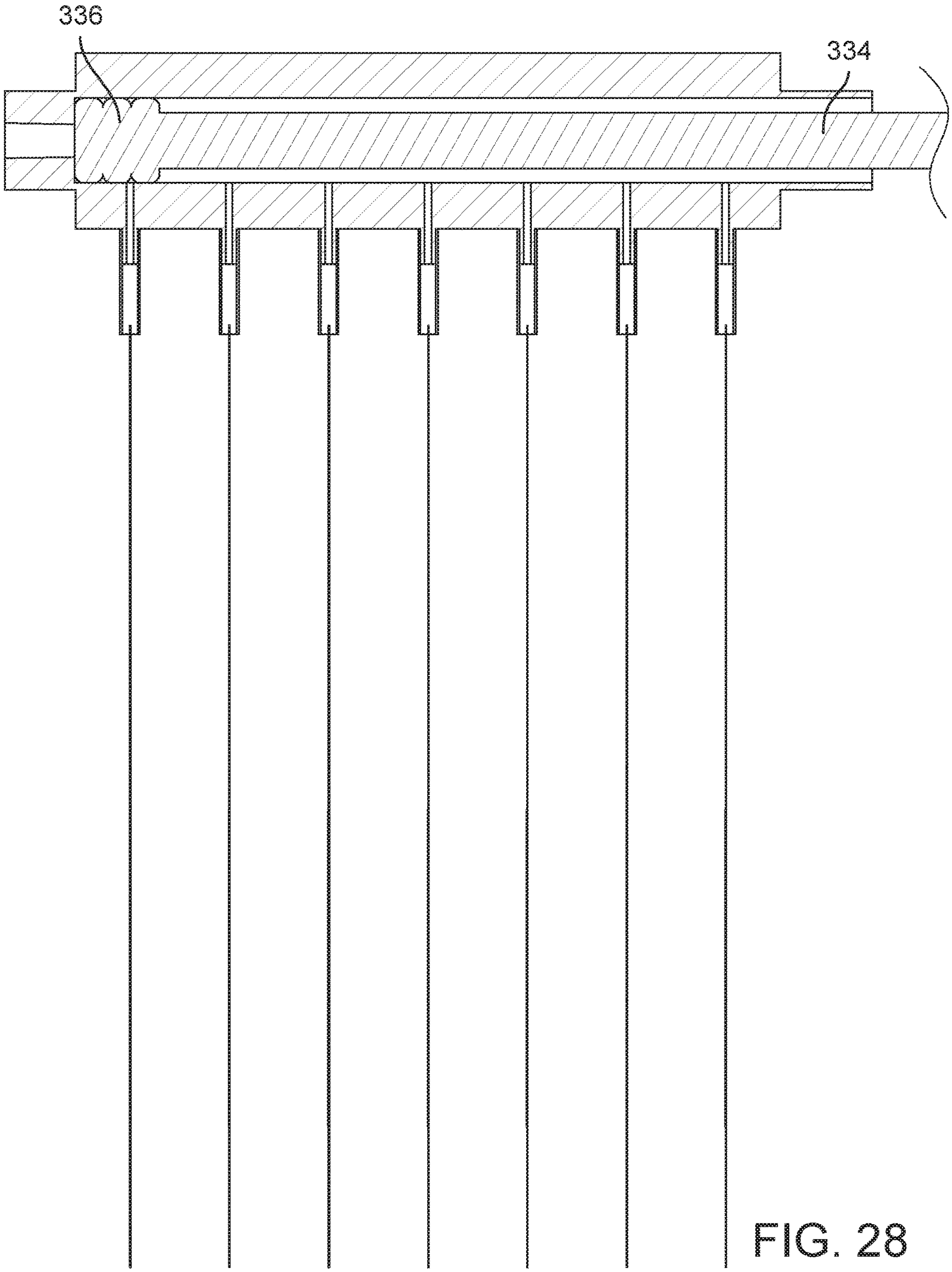
FIG. 28 depicts a cross sectional view of an example fill receiving set.
Figure 29:
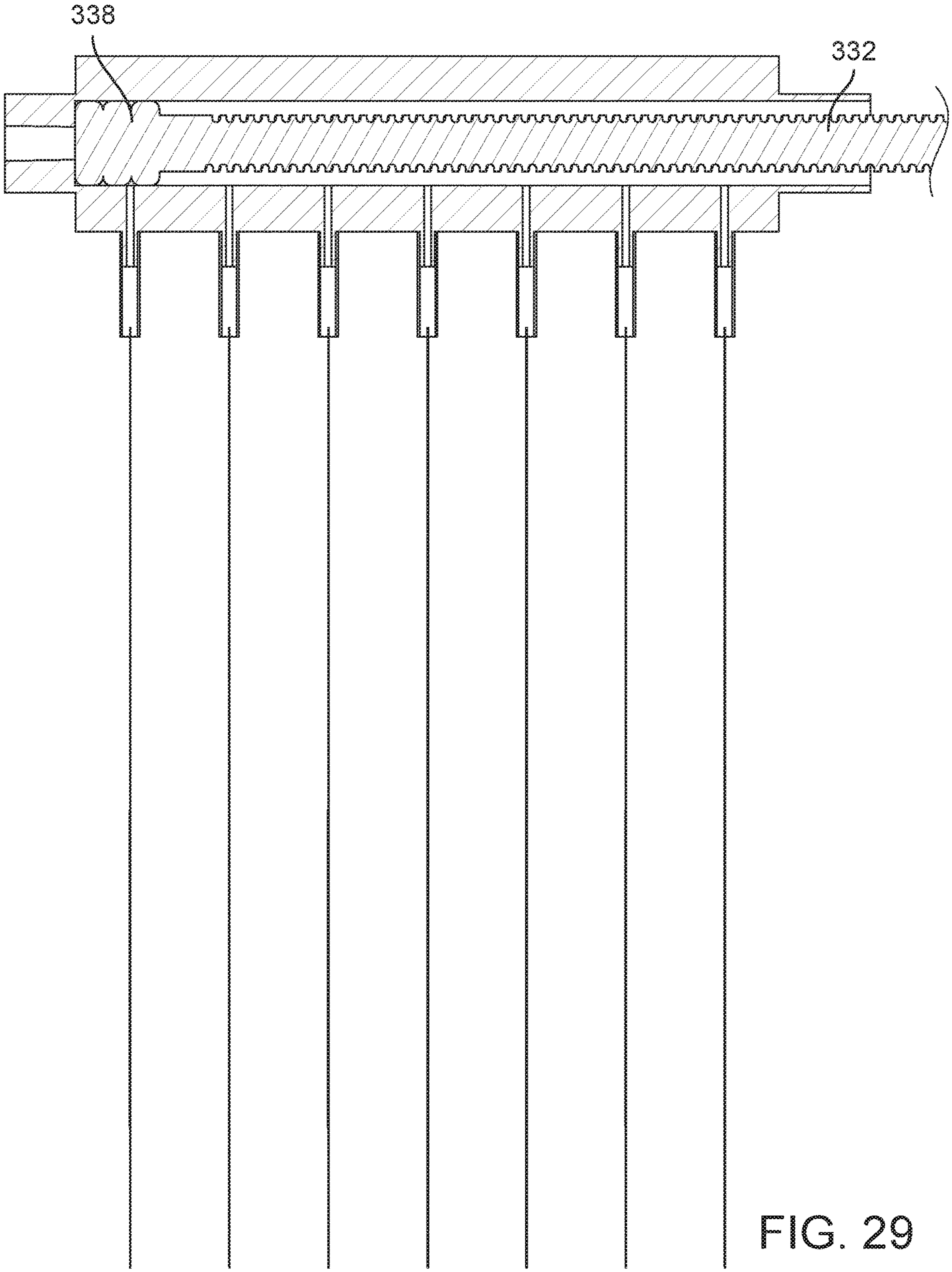
FIG. 29 depicts a cross sectional view of another example fill receiving set.
Figure 30:
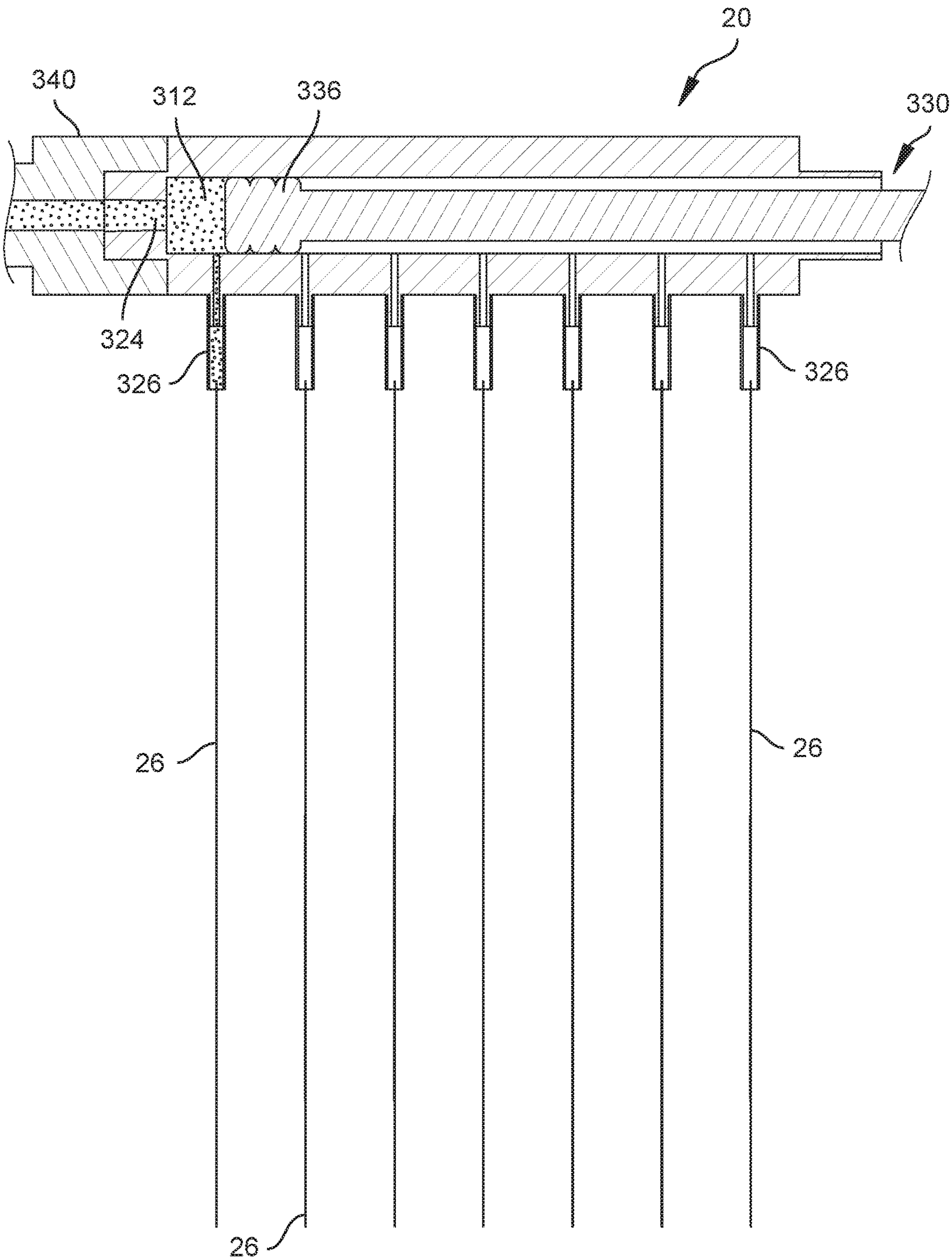
FIG. 30 depicts a cross sectional view of a bag of an example fill receiving set being filled with fluid.

With reference to FIGS. 27 and 28, an example manifold 20 is shown. In the example manifold 20 the displaceable rod 320 is depicted as a plunger 330. The plunger 330 includes a plunger stem 334 and a plunger head 336 which acts as a sealing section 336. An example including a lead screw 332 as the displaceable rod 320 is shown in FIG. 29. The lead screw 332 may also include a sealing head section 338 at a terminal end thereof which is disposed within the manifold 20. Though not shown, the bags 26 associated with the port 326 of the manifold 20 may include various accesses. In addition to the line extending from each bag 26 to the manifold 20, each bag 26 may also include one or more of an administration set 28, spike ports, injection ports, or any other accesses shown herein. Though it may be the case in some examples, not all bags 26 attached to the manifold 20 need be identical. Some bags 26 may include different accesses or have different maximum fill volumes for example. Where a variety of different manifolds 20 may be used with a system 10, the manifolds 20 may include an identifier which includes information as to the type of manifold 20 being installed or information regarding the bags 26 included on the manifold 20. This identifier may be machine readable such as a barcode, data matrix, RFID, or any other suitable identifier. Information collected from this identifier may be used by the control system 15 in order to control filling of the bags 26 included on the manifold 20.

Referring now to the progression of FIGS. 30-33, an exemplary filling sequence is depicted. Though the manifold 20 shown includes a plunger 330, other displaceable rods 320 (e.g. lead screws, plunger with rack and pinion arrangement) may be similarly displaced through such a filling sequence. The plunger 330 may be provided with its plunger head 336 disposed within the interior of the flow channel 312 of the manifold 20. The plunger 330 may be initialized in a position against or proximal to the inlet 324 of the manifold 20 (see, e.g. FIG. 28). The manifold 20 may be coupled to a dispenser 340 to place the flow channel 312 in fluid communication with a medical fluid supply. The coupling may be made aseptically and via a threaded fitting (such as a luer lock), barbed fitting, quick connect, magnetic coupling, or any other suitable method. In some embodiments, steam may be ejected to cleanse the connector interface 314 before coupling occurs.

Figure 31:
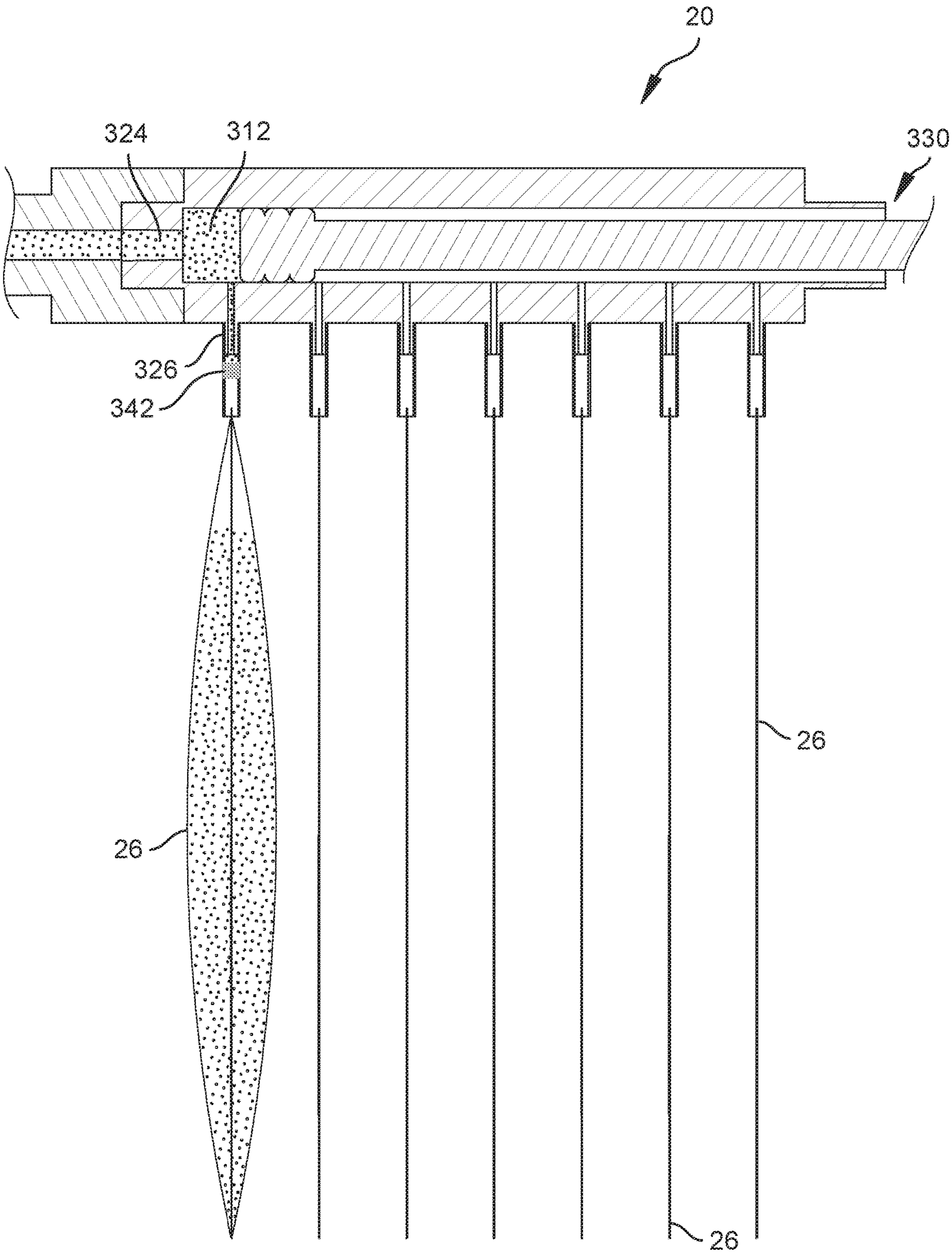
FIG. 31 depicts a cross sectional view of an example fill receiving set with a filled bag which has been sealed out of fluid communication with the fill receiving set.

An actuator (not shown) may withdraw the plunger 330 a distance out of the fluid channel 312. By displacing the plunger 330 away from the inlet 324, a port 326 or selected plurality of ports 326 may be placed into communication with the inlet 324. In the example shown in FIG. 30 only a single port 326 is placed into communication with the inlet 324. Fluid may then be transferred through the flow channel 312 into the bag(s) 26 in communication with the port or ports 326. This is depicted representationally via stippling in FIG. 30. Fluid transfer may be halted once the bag 26 or bags 26 have been filled to the desired amount as shown in FIG. 31.

As shown, each bag 26 may be connected to a port 326 via a flow path. The ports 326 in this example include projecting fittings (e.g. barbed fittings) onto which tubing providing the flow path is coupled. The flow path may include a sealable region which may, for example, be welded to close the flow path to fluid flow. Thus a seal 342 may be generated at the sealable regions to isolate the bag 26 from the rest of the manifold 20. The seal 342 may be created as described elsewhere herein (see, e.g. FIGS. 22A-F). The displacement of the plunger 330 may be tracked by a sensing arrangement to ensure the correct port 326 or ports 326 are in communication with the inlet 324 at a given time. Sensing arrangements may include or include combinations of linear potentiometers, encoders, hall effect sensor arrays monitoring the location of a magnet on the plunger 330, etc. The fill level of each bag 26 may be monitored via a scale upon which the bags 26 rest.

Figure 32:
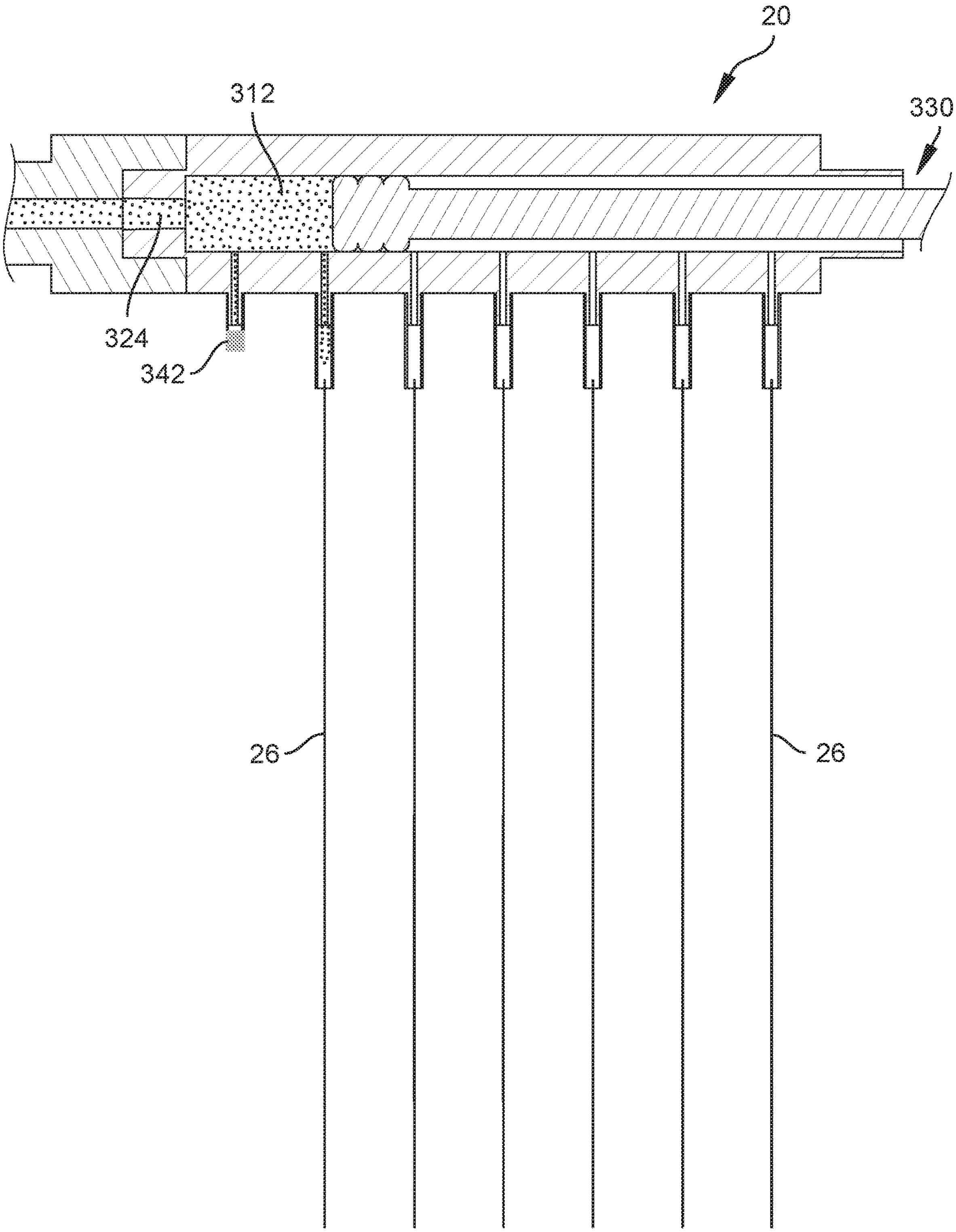
FIG. 32 depicts a cross sectional view of an example fill receiving set with a bag having been cut from the fill receiving set.
Figure 33:
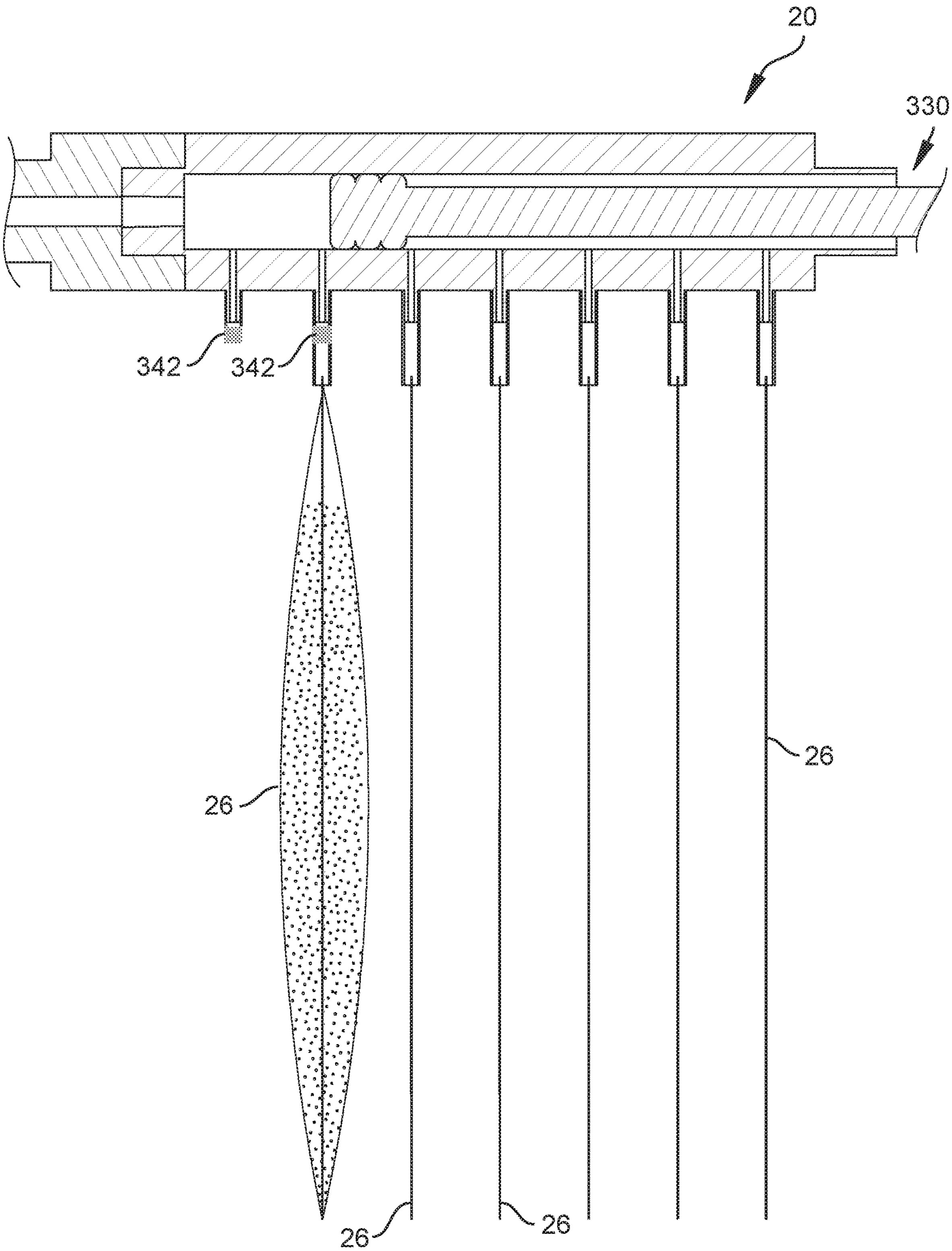
FIG. 33 depicts a cross sectional view of an example fill receiving set with a bag of the fill receiving set being filled with fluid.

Filled bags 26 may be removed from the manifold 20 after a seal 342 has been created. As shown in FIG. 32, a bag 26 has been removed from the manifold 20. A portion of the seal 342 may serve to close the port 326 from which the bag 26 was removed. As shown in FIG. 32, the plunger 330 may be withdrawn to a location more distal to the inlet 324 to place an additional bag 26 or bags 26 in communication with the inlet 324. Fluid may be transferred to fill the bag 26 or bags 26 until filled to a desired amount and a seal 342 may be formed as shown in FIG. 33. This may repeat until each bag 26 on the manifold 20 has been filled and removed from the manifold 20.

Figure 34:
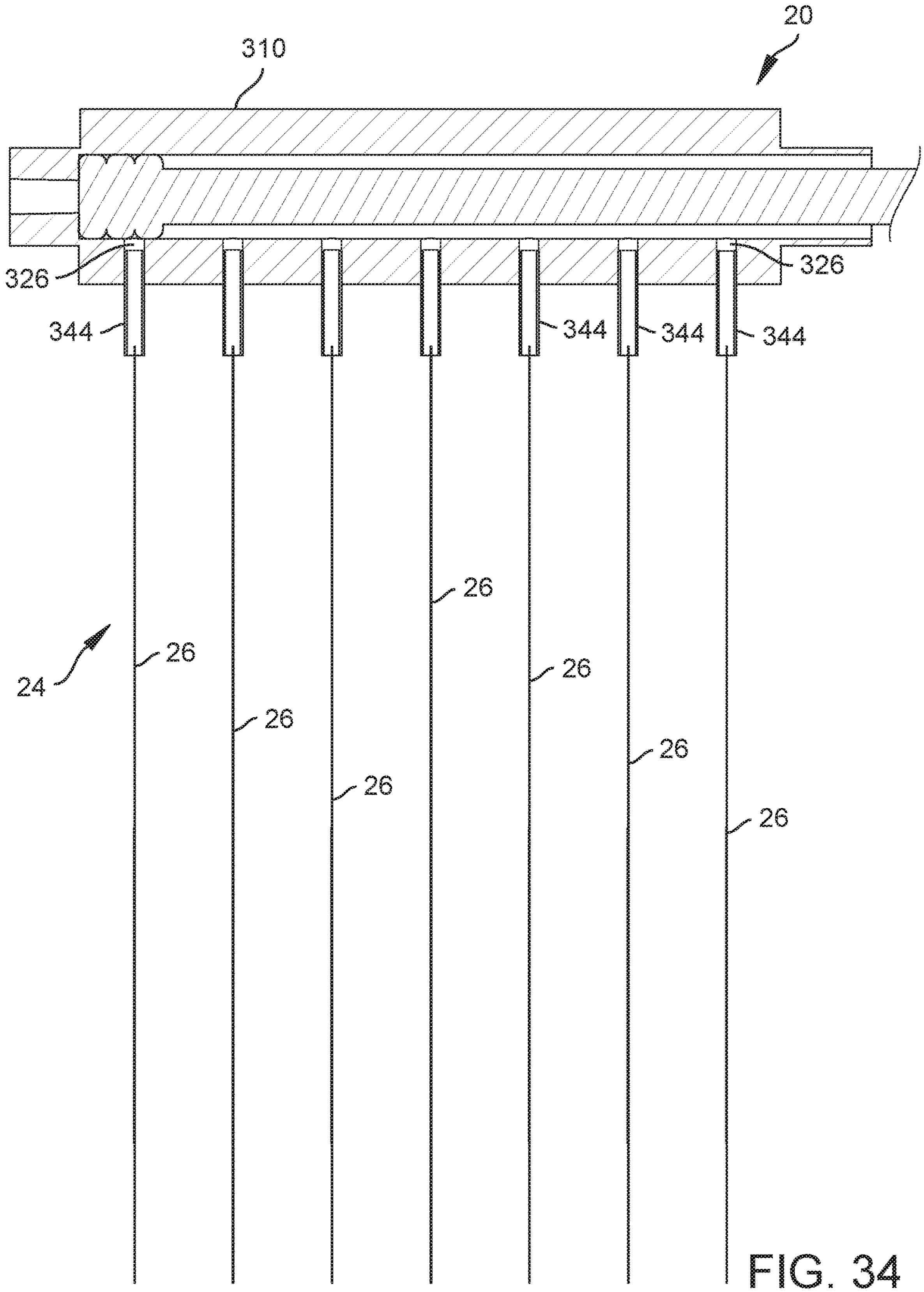
FIG. 34 depicts a cross section view of an example fill receiving set.

Referring now to FIG. 34, a fill receiving set 24 including another manifold 20 is shown. The manifold 20 is similar to that depicted and described in relation to FIGS. 28-33, however, the bags 26 are coupled to the manifold 20 in an alternative manner. As shown, the ports 326 include no fitting or projection extending away from the manifold 20 to which the flow path to each bag 26 couples. Instead, the fluid lines 344 providing the flow path to the bags 26 are inserted into the orifices in the block 310 forming the ports 326. The fluid lines 344 may be retained in the ports 326 via solvent bonding, adhesive, threaded coupling, or via any other suitable manner.

Figure 35:
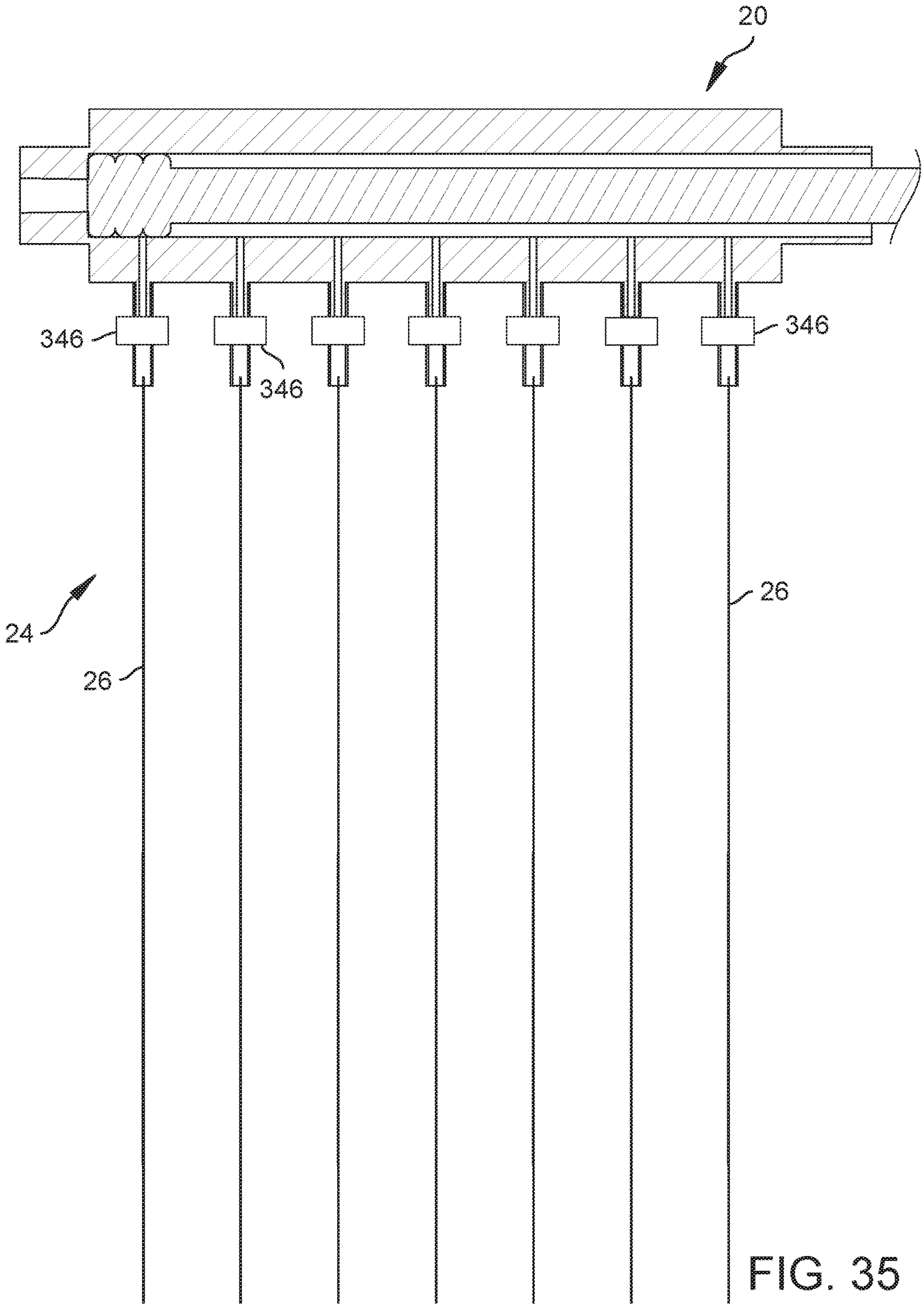
FIG. 35 depicts a cross sectional view of an example fill receiving set.

In other embodiments, the flow path between the manifold 20 and each bag 26 may include a disconnect fitting 346 as shown in FIG. 35. The disconnect fitting 346 may allow for a bag 26 to be removed from the fill receiving set 24 without the need for a separate sealing operation. In some embodiments, self sealing aseptic disconnect fittings may be used. In such embodiments, the fittings may be selected so as to allow for the manifold 20 to be sterilized after all bags 26 thereon have been filled. This may allow the manifold 20 to be reused.

Figure 36:
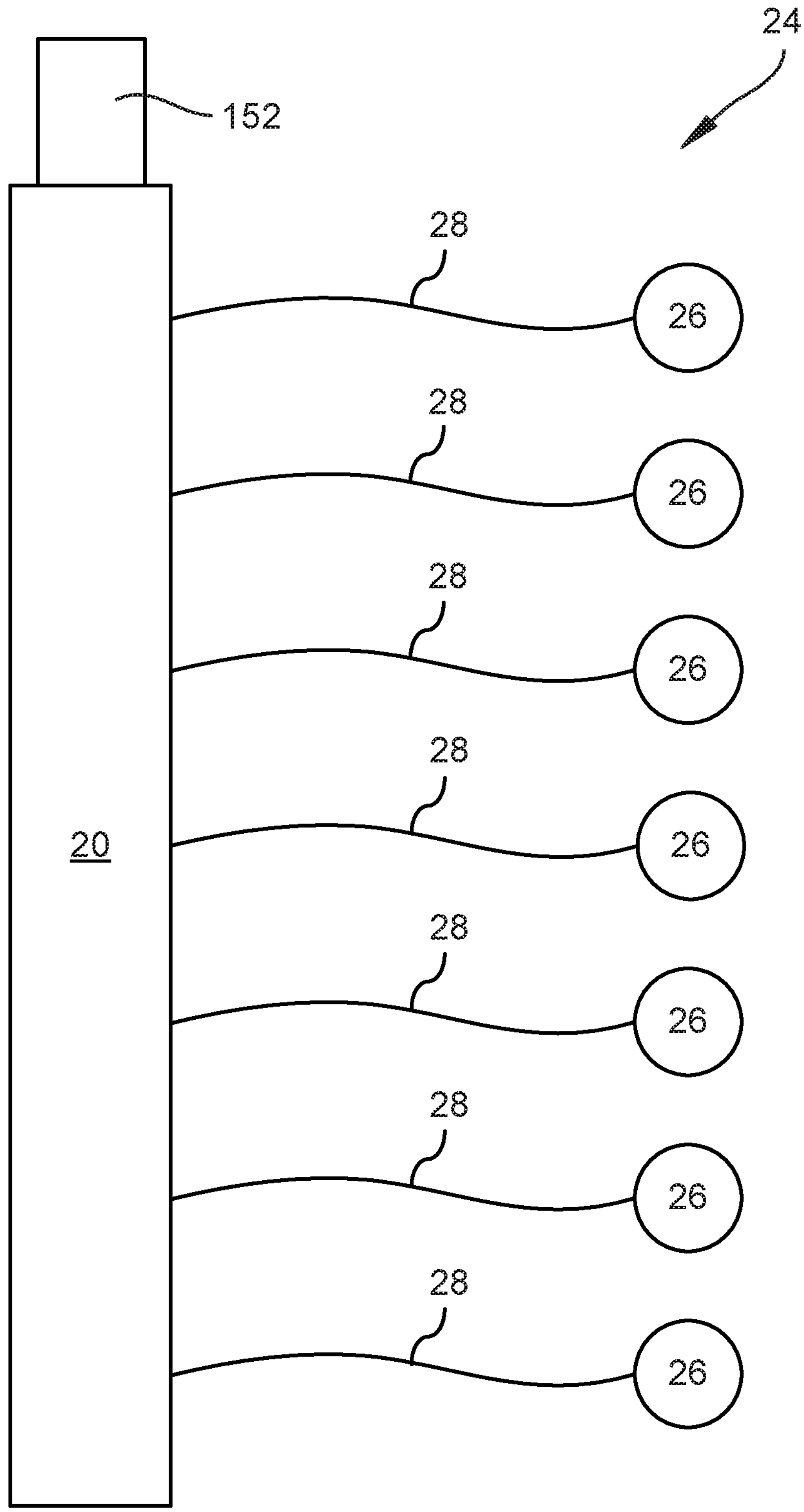
FIG. 36 depicts a diagrammatic view of an example fill receiving set.
Figure 37:
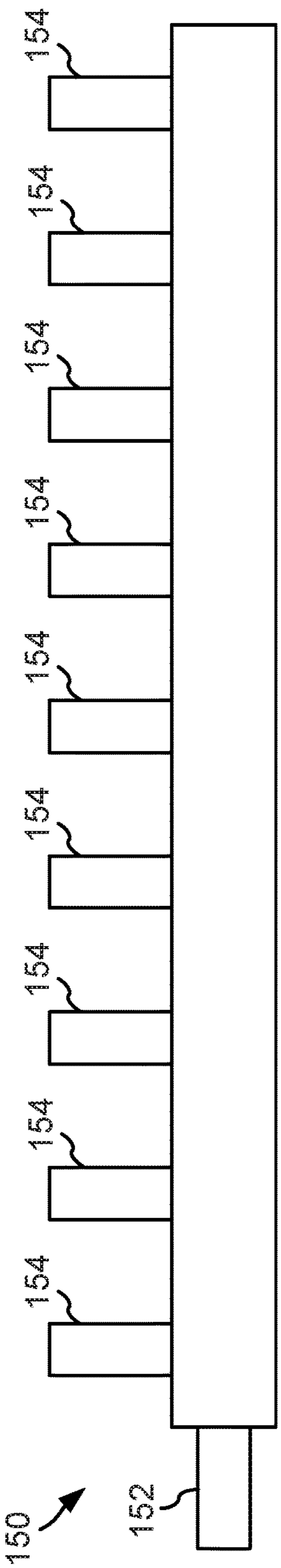
FIG. 37 depicts a top down view of an example manifold of an example fill receiving set.
Figure 38:
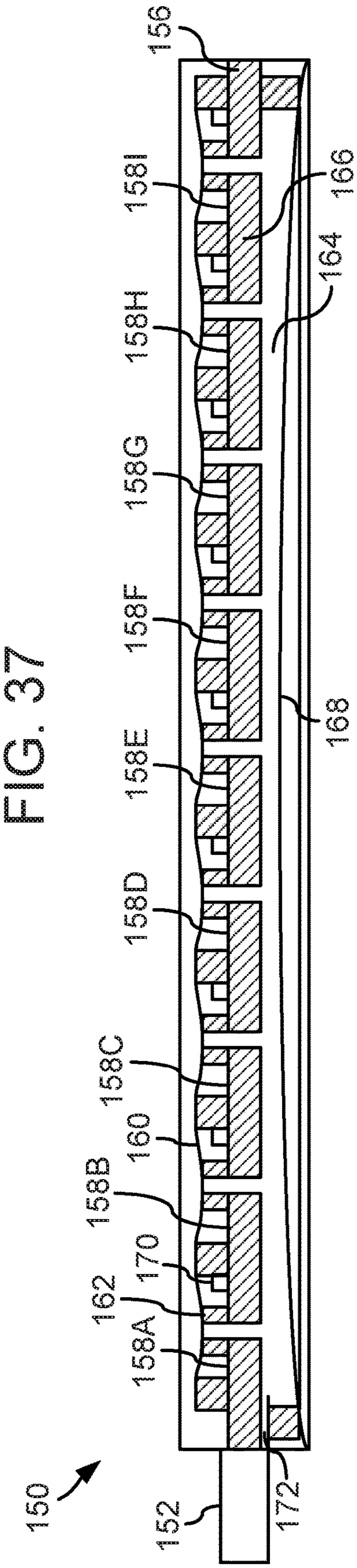
FIG. 38 depicts a cross sectional view of an example manifold of an example fill receiving set.

Referring now to FIG. 36-38, aspects of another example fill receiving set 24 are shown. As shown in FIG. 36, the fill receiving set 24 may include a manifold 20 which is pre-connected to a number of administration sets 28 which have been integrated into individual bags 26. As with other embodiments described herein, other filling conduits may be coupled to the manifold 20 in place of the illustrative administration sets 28. The manifold 20 in the example embodiment may be a cassette 150 which is installed into the system 10. The cassette 150 may include a fluid introduction port 152 which may connect to the fluid output stream from the medical water production device 14. The cassette 150 may also include a number of couplers 154 (e.g. luer fittings) which may couple to manifold interface elements 22 on each of the sets 28 (or fill lines 140, accesses 202, or other filling conduits).

As best shown in the cassette 150 cross-section depicted in FIG. 38, the cassette 150 may include a rigid body 156 which may be injection molded in certain examples. The rigid body 156 may include a number of valve stations 158A-I which may be overlaid by a flexible membrane 160. In alternative embodiments, multiple flexible membranes may be included. For example, each valve station 158A-I may be covered by a dedicated flexible membrane. The flexible membrane 160 shown may be actuated (typically pneumatically, though mechanically or hydraulically are also feasible) against and away from the valve seats 162 of each valve station 158A-I in order to open and close the valves 158A-I. In the example illustration, all of the valves stations 158A-I are shown in a closed configuration. The cassette 150 also includes a fluid bus 164 on the opposing side of the cassette 150 mid body 166. The fluid bus 164 is in communication with the fluid introduction port 152 through a pass-through 172 in the sidewall of the cassette 150. A second flexible membrane 168 is included on this side of the cassette 150 to seal the fluid bus 166. This second flexible membrane 168 may be replaced by a plate such as the laser welded plates described elsewhere herein. The fluid bus 164 may be placed into communication with desired valve stations 158A-I by displacing the first flexible membrane 160 away from the valve seat 162 of the desired valve station(s) 158A-I. As shown, each valve station includes a pass-through 174 which leads from the valve station 158A-I to the fluid bus 164. This may establish a flow path from the fluid bus 164 to the valve station 158A-I. The valve station 158A-I may also include an opening to the coupler 154 of the cassette 150 allowing for fluid to flow from the fluid bus 164 through the valve station 158A-I and out of the cassette 150 to a bag 26 and administration set 28 attached to the associated coupler 154. This may allow for bags 26 to be filled one by one (or two by two and so on). In some embodiments, each valve station 158A-I may be associated with more than one coupler 154. This may be desirable where bags 26 are filled in multiples at a time.

Figure 39A:
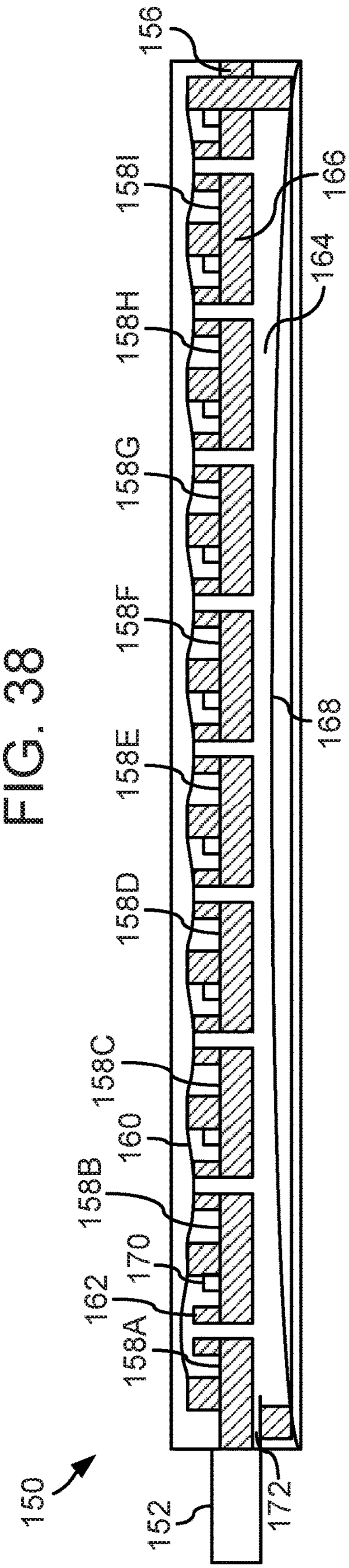
FIG. 39A-C show a progression of valve actuations of an example manifold which may be used to fill bags of an example fill receiving set.
Figure 39B:
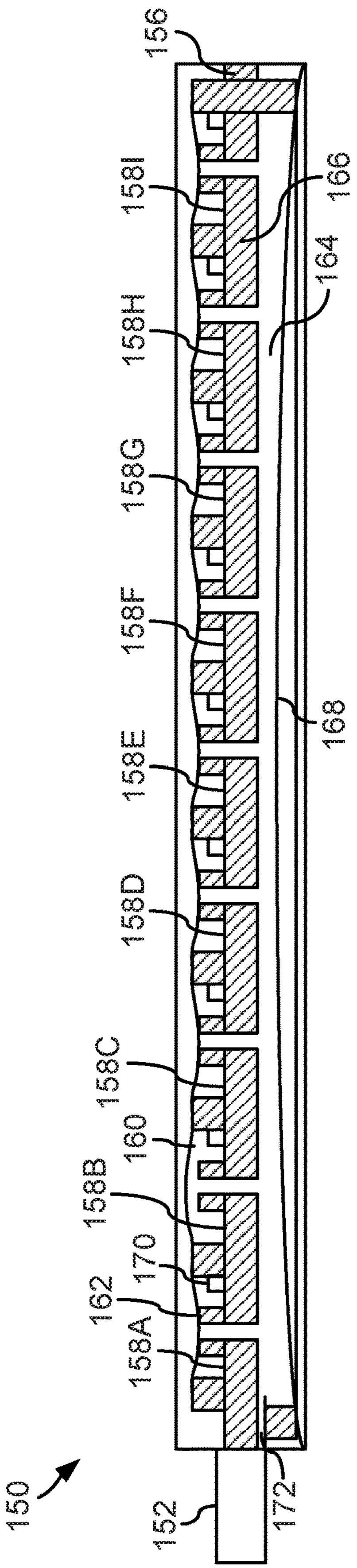
Figure 39C:
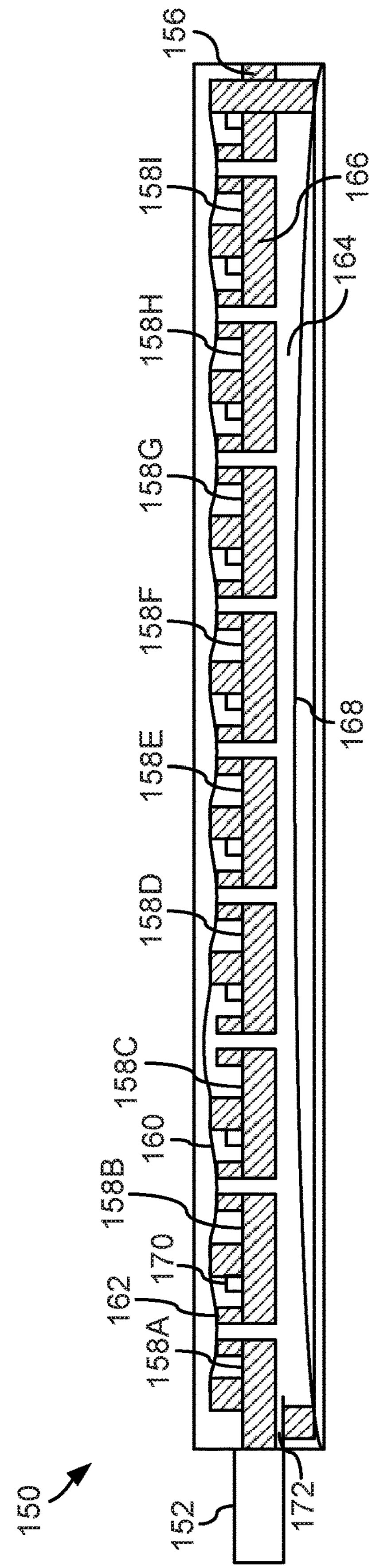

FIGS. 39A-C show a progression of valve actuations which may be used to fill bags 26 attached to the cassette 150. The bags 26 may be filled in any order, but are shown here as being filled in sequence by opening valve stations 158A-I in a left to right manner. As shown, the leftmost valve station 158A may be opened to fill the associated bag 26. Once full, the bag 26 may be removed from the cassette 150 as described elsewhere herein. The valve station 158A may then be closed. The adjacent valve station 158B may then be opened to fill its attached bag 26. That bag 26 and the attached administration set 28 (or other filling access) may be removed (e.g. sealed and cut, disengaged from a cooperating quick connect, etc.) from the cassette 150. Valve station 158B may then be closed. Then the next valve station 158C may be opened, and its associated bag 26 may be filled and removed. The process may continue until all bags 26 have been filled. The number of bags 26 being filled and thus the number of valve stations 158A-I open at a given time may be determined by the flow rate output of the medical water production device 14. It may be desirable that the system 10 output a certain number of bags per unit time. If the system 10 were to fill, for example, fifty bags 26 at a time with a low flow rate output there would be a certain downtime before bags 26 become available. By filling bags 26 one by one (or some appropriate number of multiples at a time), the system 10 may provide a steady output of bags 26 at the same flow rate output.

Figure 40:
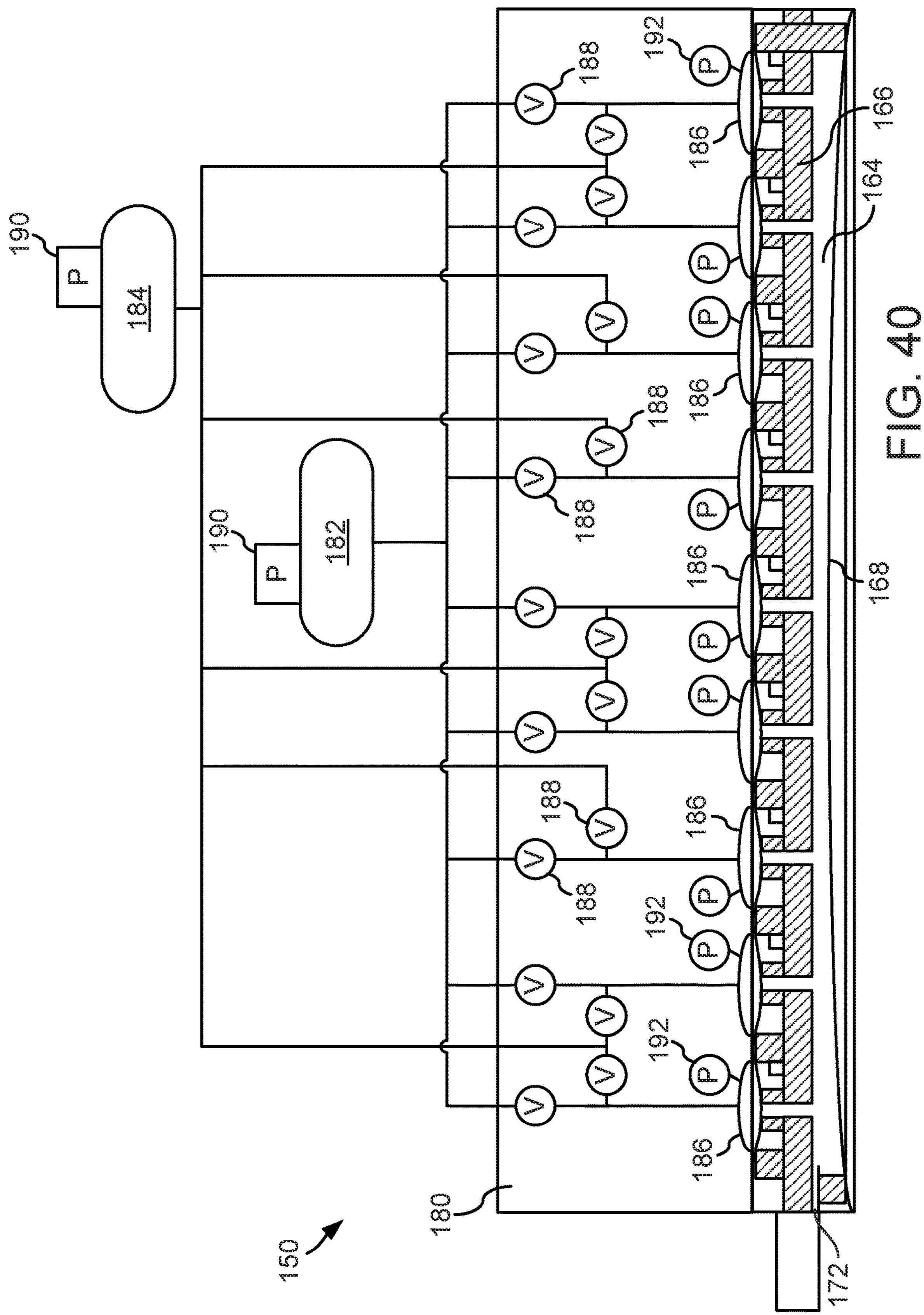
FIG. 40 depicts an actuation block of for a manifold of an example fill receiving set.

As shown in FIG. 40, the cassette 150 may interface with an actuation block 180 included in the system 10. The actuation block 180 may be made of metal (or another material which is robust, dimensionally stable, heat stable, and/or non-porous) and be subjected to a hot steam or venting stream from the medical water production device 14 before the cassette 150 is placed against the actuation block 180. The flexible membrane 160 on the cassette 150 may be covered by an overlay which keeps the surface of the flexible membrane 160 sterile prior to application against the actuation block 180. This overlay may be removed by the system 10 or an operator. In some embodiments, the cassette 150 may be pressed against the actuation block 180 by closure and latching of a door of the system 10. In other embodiments, a piston or plate may be pressed against the side of the cassette 150 including the fluid bus 164 to force the cassette 150 against the actuation block 180 and ensure good seals are made by the flexible membrane 160 around the valve stations 158A-I. This may be done via inflation of a bladder, rotation of a leadscrew or cam, actuation of a scissor jack, linear actuator, or any other actuator which can apply a sufficient force.

As shown, the actuation block 180 includes a number of pressure pathways. These pressure pathways may individually be placed into selective communication with either a positive pressure source 182 or negative pressure source 184 (pneumatic for example) to open and close the valve stations 158A-I of the cassette 150. Each control chamber 186 may be selectively placed into fluid communication with the positive pressure source 182 or negative pressure source 184 by operation of valves 188 associated with each control chamber 186. In the example embodiment, each control chamber 186 is associated with a valve controlling application of positive pressure and a valve controlling application of negative pressure. In alternative embodiments a single valve may be utilized to toggle between positive of negative pressure application. In such embodiments, the valve may be designed to apply positive pressure in a fail state. The positive and negative pressure sources 182, 184 may be reservoirs which are maintained to a particular pressure set point by a pump (not shown). The pressure sources 182, 184 may be monitored by one or more pressure sensors 191 which may inform operation of the pumps maintaining the pressure sources 191 at the pressure set point. In some embodiments, each control chamber 188 may also be in fluid communication with a pressure sensor 192. This pressure sensor 192 may be monitored as a check that pressure is being applied to a valve chamber 158A-I of the cassette 150 as expected. In some embodiments, the medical water production device 14 may output product at a pressure above ambient. In such embodiments, negative pressure may not be used. Instead, the pressure of the product water may be used to displace the flexible member 160 to open the valve stations 158A-I. The positive pressure used to close the valve stations 158A-I may be chosen so as to be sufficiently higher than the medical water production device 14 output pressure so as to maintain robust closure of the valve stations 158A-I.

Figure 41A:
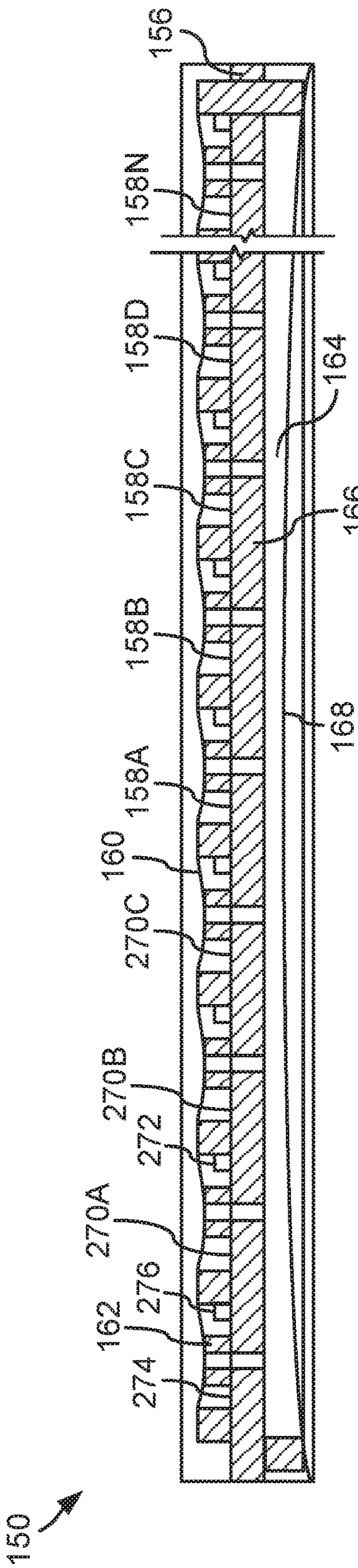
FIG. 41A-41F depict a progression of valve actuations which may be executed to pump fluid from a concentrate supply inlet through an example manifold.
Figure 41B:
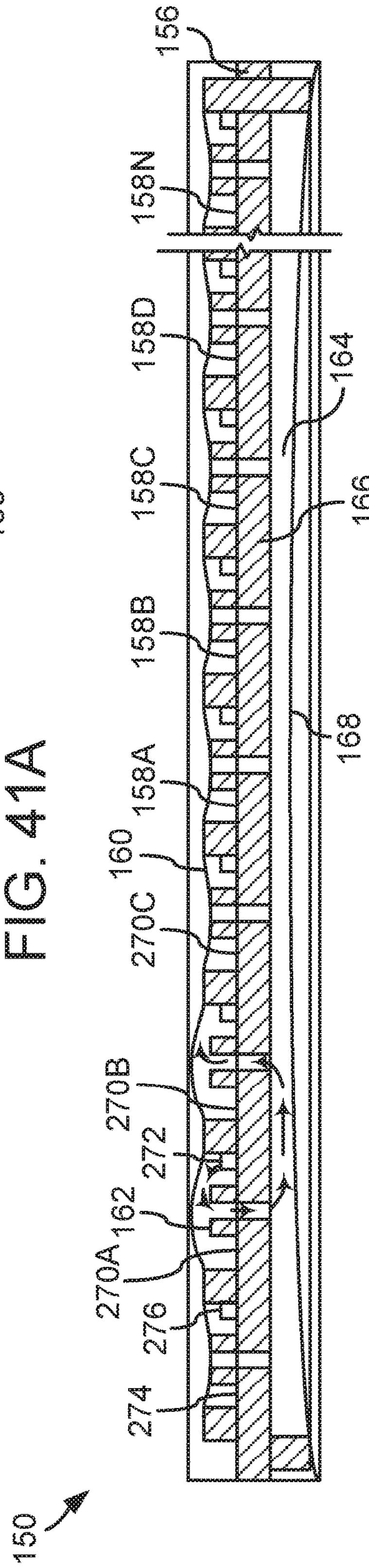
Figure 41C:
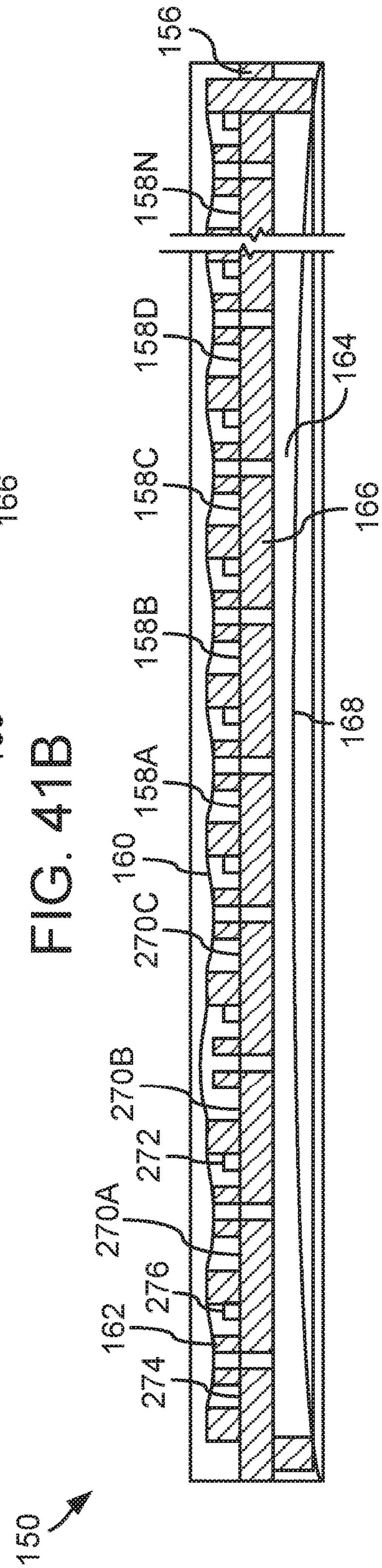
Figure 41D:
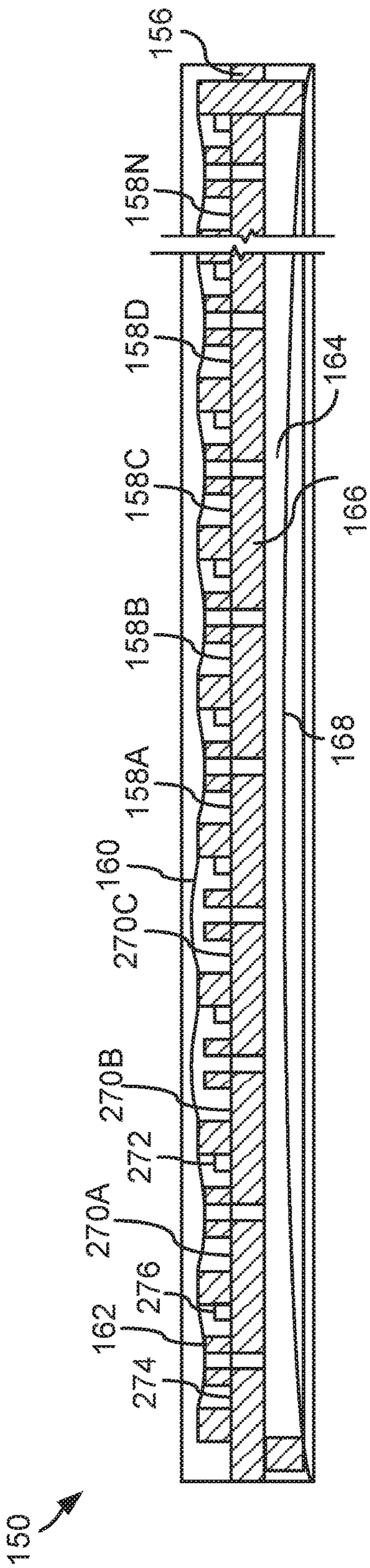
Figure 41E:
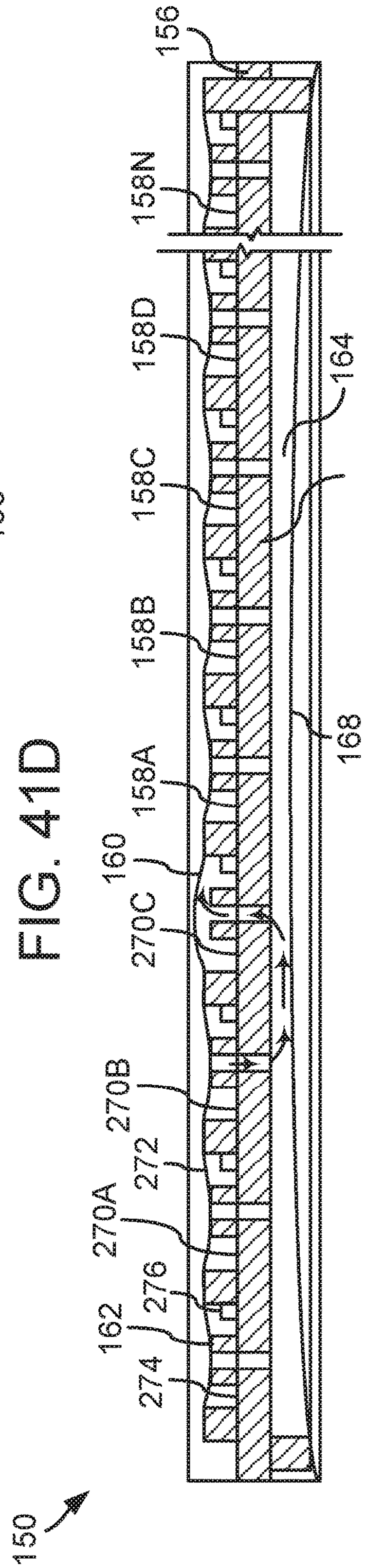
Figure 41F:
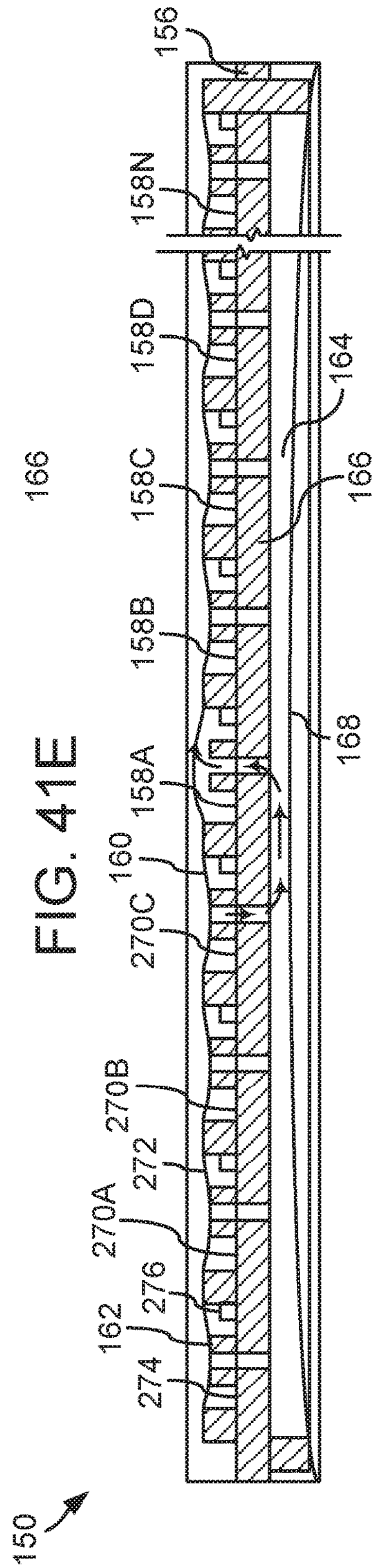
Figure 42:
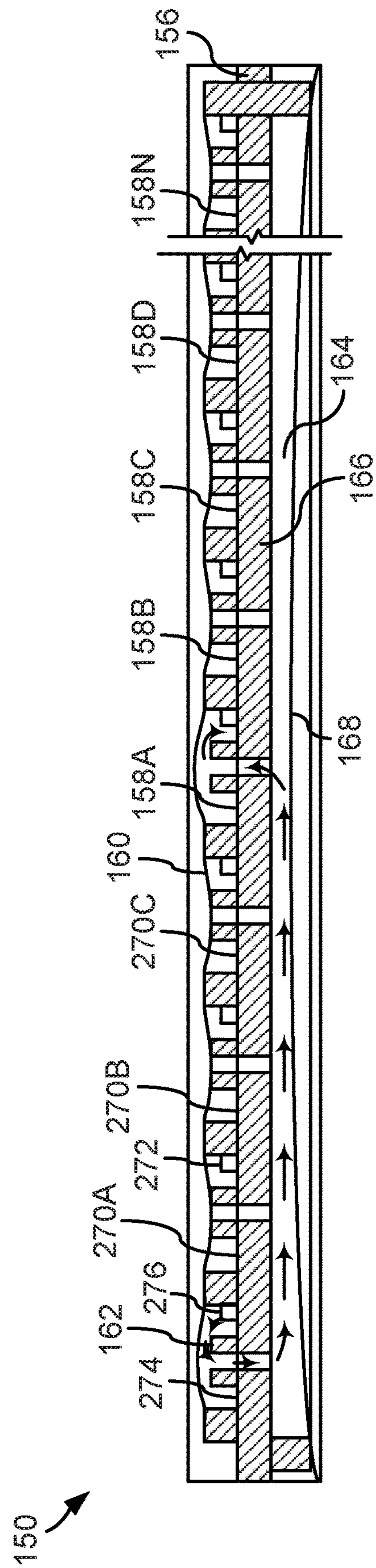
FIG. 42 depicts a volume of fluid being transferred to a bag through an example manifold.

Once a bag 26 has been filled it may be removed from the cassette 150 (or any other manifold 20) in a variety of ways. For example, a welded seal may be made on the tubing of the administration set 28 (or a filling port 140 or access 202). The bag 26 and a portion of the administration set 28 may then be cut from the manifold 20. This may be similar to as described above in relation to FIG. 22A-F. Alternatively, the tubing of the administration set 28 may be pinched or otherwise occluded and the administration set 28 decoupled from the cassette 150. The administration set 28 may then be plugged by a cap or similar element. In some examples, each administration set 28 may include a slide clamp. When installed in the system 10, the slide clamp may interface with an actuator which is commanded to displace once a bag 26 attached to the administration set 28 has been filled to the appropriate amount. Displacement of the actuator may drive a narrow section of the slide clamp toward the tubing such that the narrow section of the slide clamp occludes the tubing of the administration set 28.

Where the system 10 is configured to mix various fluids, and referring now to FIGS. 41A-42, a cassette 150 may include a number of valve type pumping stations 270A-C. Via coordinated actuation of valve type pumping stations 270A-C, small volumes of fluid can be pumped through the cassette 150. Referring to the progression of FIGS. 41A-41F, three valve type pumping stations 270A-C of the cassette 150 may be actuated to pump fluid from a concentrate supply inlet 272 included in the cassette 150 in small volumes. Though the three valve type pumping stations 270A-C are shown as adjacent to one another, this is done to provide a streamlined example. Other configurations with additional and/or non-adjacent valve type pumping stations 270A-C may be constructed.

As shown in FIG. 41B, a first and second valve station 270A and 270B may be opened to perform a fill operation of a valve type pumping station. These valve stations 270A-B may be opened in sequence or at substantially the same time. This may cause fluid flow 278 into these valve stations 270A-B from the concentrate supply inlet 272. Once the valve fill is complete, the filled valve station 270B may be isolated by closing the first valve station 270A as shown in FIG. 41C. Thus the second valve station 270*b* may serve as an intermediary holding volume during valve based fluid pumping.

The third valve station 270C may then be opened to establish fluid communication between the second and third valve station 270B, 270C as shown in FIG. 41D. A valve pump stroke may then be executed by closing the second valve station 270B as shown in FIG. 41E. This will transfer a valve pump stroke volume to the third valve station 270C from the intermediary holding volume. The third valve station 270C may then be closed, as shown in FIG. 41F, to pump the valve pump stroke volume toward a valve station 158A-N associated with a bag 26 attached to the cassette 150. Alternatively, the third valve station 270C may be omitted and fluid may be transferred to the desired valve station 158A-N as the second valve station is closed. This may be repeated as is desired until a target volume of concentrate has been transferred. Greater volumes per valve pumping sequence may be achieved by utilizing a plurality of valve stations as an intermediary holding volume. Further description of such an arrangement is provided in U.S. application Ser. No. 16/384,082, filed Apr. 15, 2019, entitled Medical Treatment System and Methods Using a Plurality of Fluid Line, which is hereby incorporated by reference herein it its entirety.

Once a desired volume of concentrate has been transferred via valve based pumping strokes, and referring now primarily to FIG. 42, a volume of water may be transferred to a bag 26 to dilute the concentrate to a final concentration. The final concentration may be a concentration which is ready be administered to a patient. The final concentration may also be defined so as to allow for addition of a volume of another medication to make a final medicament preparation which is then administered to the patient. In the example embodiment, a water inflow valve station 274 is included at an extreme end of the cassette 150. The water inflow valve station 274 may communicate with a water inlet 276 and when open may establish a flow path from the water inlet 276 through the fluid bus 164 to a desired valve station 158A-N and the associated bag 26. By positioning the water inflow valve station 274 at the end of the cassette 150, the water flow through the bus 164 may also serve to flush any concentrate remaining in the bus 164 to the desired bag 26. In some embodiments, a number of valve pumping strokes using water may be performed by any valve stations (e.g. intermediate holding volume stations) which are not dedicated to a particular concentrate to flush these station.

The volume of concentrate to be flushed from the valve station(s) and/or fluid bus 164 may be accounted for in any volume targets when pumping concentrate into the bag 26 via valve pump strokes. The full volume of concentrate defined for a particular bag 26, may thus not be transferred into that bag 26 until after the flush has concluded.

Figure 43:
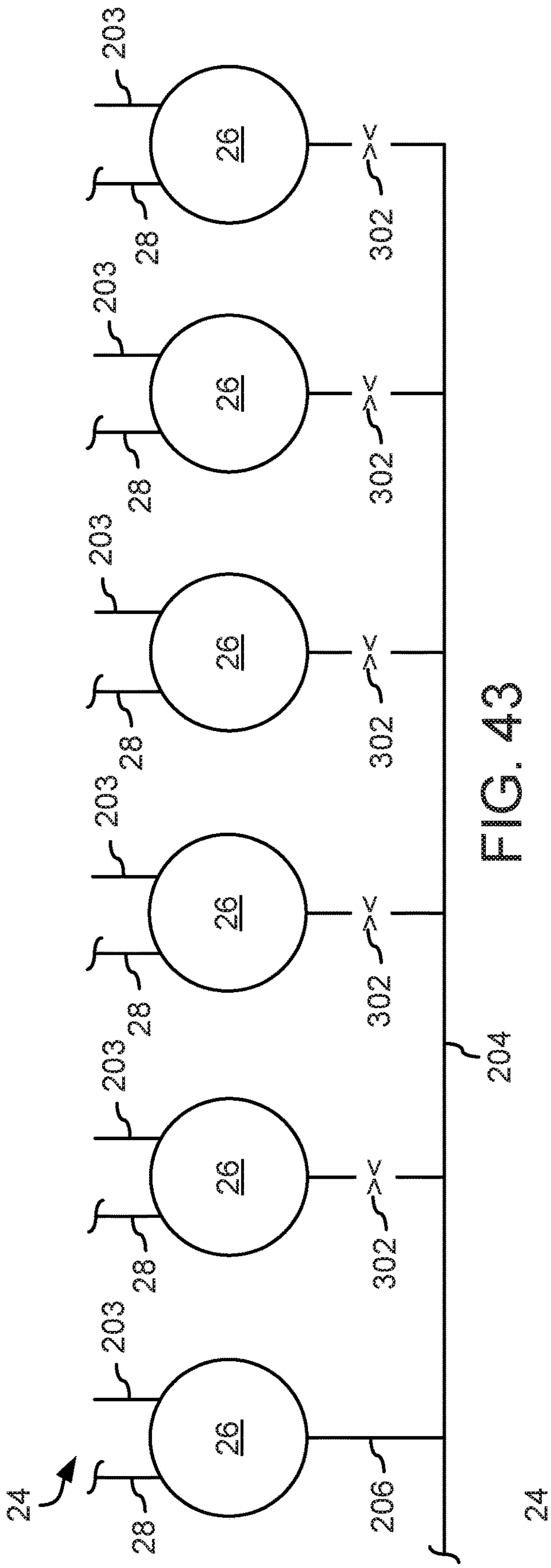
FIG. 43 depicts a diagrammatic example of another exemplary fill receiving set.

FIG. 43 depicts another alternative fill receiving set 24. As shown, there is a main line 204 which may interface with the output of the medical water production device 14. Bags 26 may branch off the main line 204 in series via a number of lines 206. The lines 206 may be attached to the main line 204 at T-junctions in some embodiments. Alternatively, the main line 204 may include a number of coupler fittings to which a cooperating element of a line 206 may couple to. The fill receiving set 24 may be arranged so as to act as the manifold 20. The lines 206 to the bags 26 may be kept closed by an occluder arrangement acting on the lines. Alternatively, the main line 204 may be occluded upstream of each branch point to a line 206 leading to one of the bags 26. In certain examples the lines 206 may be closed off via a pinch clamp 302 which may be mechanically actuated at the command of the control system 15. Bags 26 may be filled one by one and cut from the main line 204 after sealing as described elsewhere herein (see, e.g., FIGS. 22A-F). Once a bag 26 has been filled and severed from the fill receiving set 24, the pinch clamp 302 on the another bag 26 (e.g. the adjacent bag) may be opened to allow for filling of that bag 26. This may repeat until all bags 26 in a fill receiving set 24 have been filled and severed from the main line 204. In some embodiments, more than one bag 26 may be filled at a time. The lines 206 to the bags 26 may be constructed in the same manner as any of the lines or accesses described above and may include any of the features described elsewhere herein. For example, the bags 26 may include an additional administration line (not shown) similar to FIGS. 22A-F and FIG. 24 or Y-site similar to FIG. 23. Drip chambers 190 may also be included. In the example shown in FIG. 43, the lines 206 are included as filling lines and the bags 26 include additional attached accesses to their interior volumes such as an administration set 28 and injection port 203.

Figure 44:
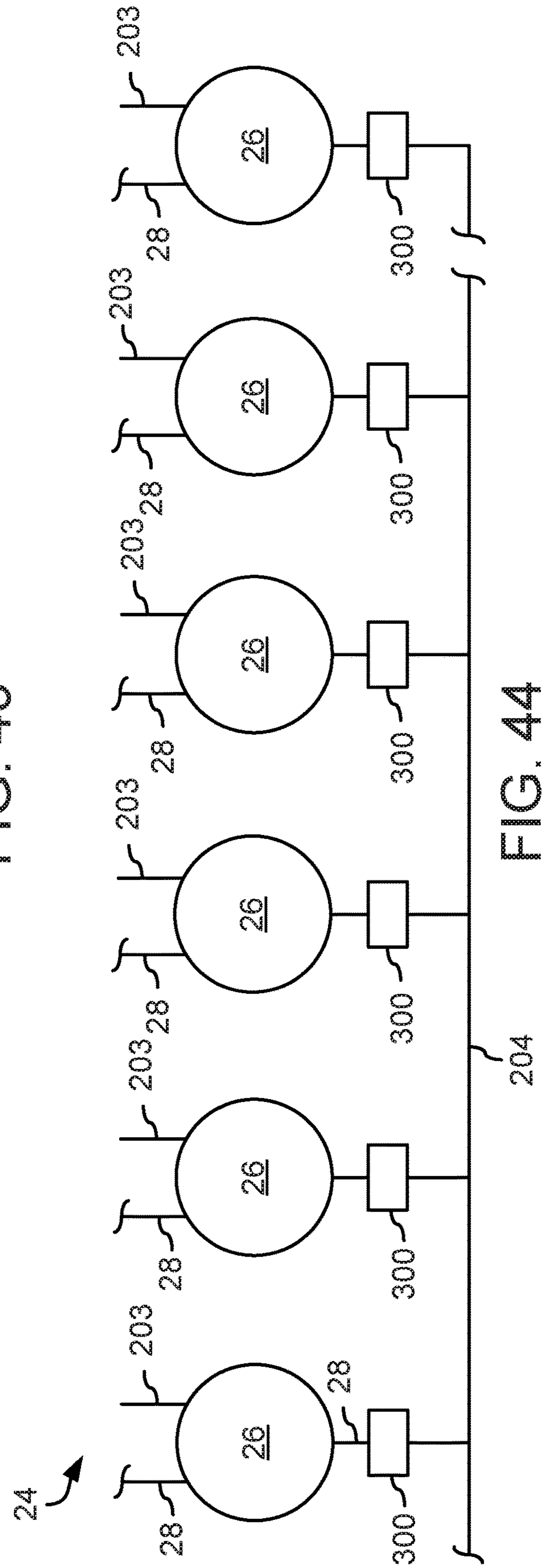
FIG. 44 depicts another diagrammatic example of an exemplary fill receiving set.

In some embodiments and referring now primarily to FIG. 44, pinch clamps 302 may not be used. Instead, each line 206 extending from the main line 204 may have a slide clamp 300 which, when installed in the system 10, is in an occluding position on the line 206 or upstream the point at which each line 206 branches from the main line 204. The slide clamps 300 may be displaced to a flow permitting position on the line to allow for filling of each bag 26. In some embodiments, the slide clamps 300 may be held stationary in a block and the lines 206 may instead be displaced to bring the lines 206 into a flow permitting segment of the slide clamps 300. After filling, the lines 206 may then be occluded by displacing either the line 206 or slide clamp 300 to bring the line 206 into a flow prohibiting portion of the slide clamp 300 to occlude the line 206. The same process may be used where the slide clamps 300 are in place on the main line 204. Once a bag 26 has been filled to the desired amount, the lines 206 may be decoupled from the main line 204 and capped or sealed.

Figure 45:
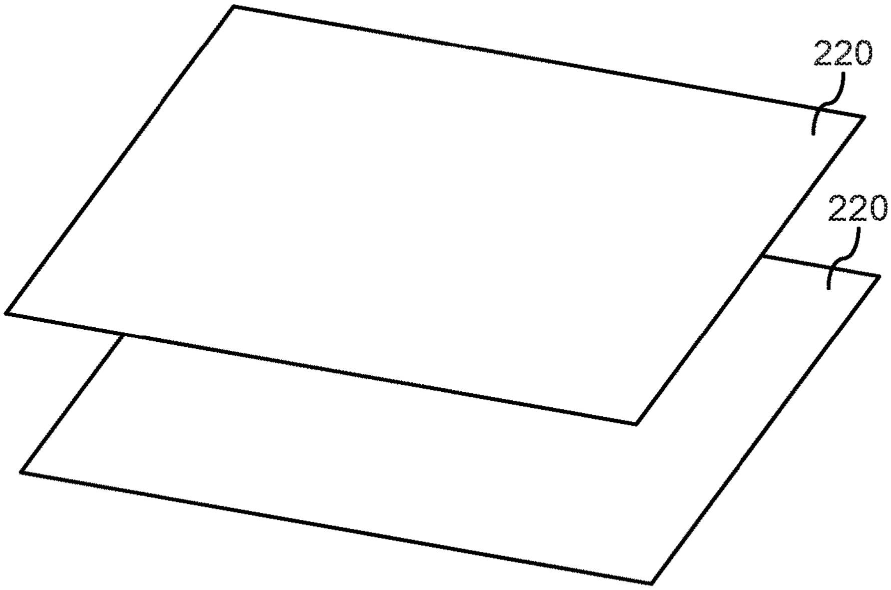
FIG. 45 depicts a number of layers of material which may be used to construct a fill receiving set.
Figure 46:
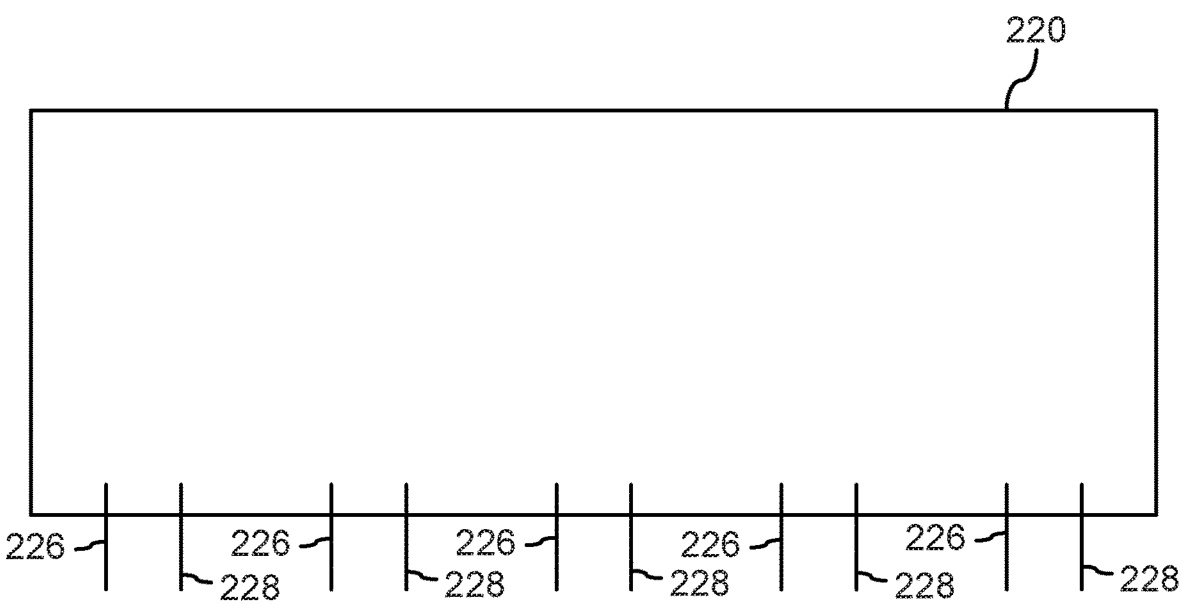
FIG. 46 depicts access elements of a fill receiving set placed between layers of fill receiving set material.

Referring now to FIG. 45, in certain embodiments, a fill receiving set 24 may be constructed from two layers of material. For example, the fill receiving set 24 may be constructed from a bonded sheet 220 or sheets of material. Where multiple sheets 220 are used, they may be laid atop one another. Where a single sheet 220 is used, the sheet 220 may be a continuous sheet of material folded upon itself to create a multi-layer starting material. As shown in FIG. 46, access elements 226, 228 may be placed between the sheets 220 or between layers of the folded over sheet 220 at regular intervals. For example, access elements 226 may be an injection port and access element 228 may be an administration set 28. In the example embodiment, there are only four sets (pairs in this example) of access element shown, however, the number of access element 226, 228 sets may be selected to match the number of bags 26 in the fill receiving set 24. In some embodiments each set of access elements 226, 228 may include more than two access elements. In other embodiments only a single access element may be included for each bag 26.

Figure 47:
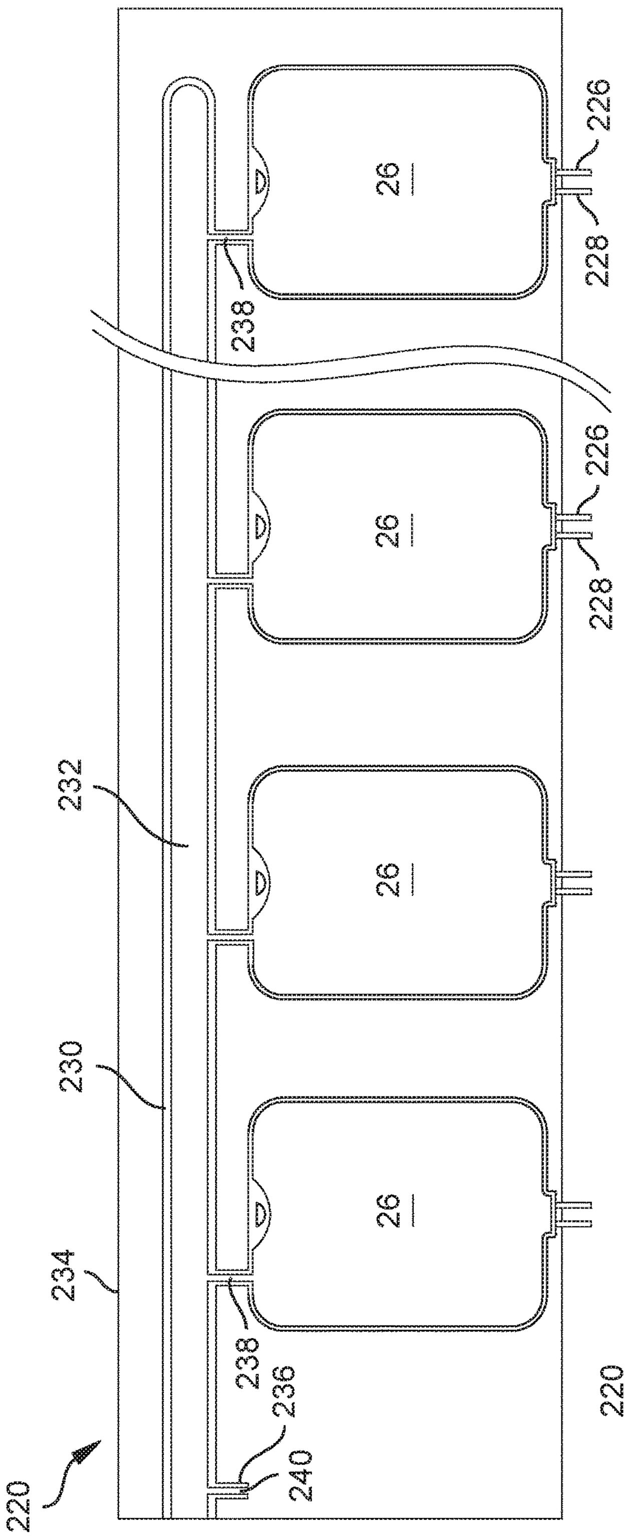
FIG. 47 depicts a seal formed between layers of material which defines an example fill receiving set.

Referring now to FIG. 47, a seal 230 may be formed to attach the sheets 220 or portions of the folded over sheet 220 to one another and form the fill receiving set 24. This may be done via a welding process such as an rf welding process. The materials selected for each sheet may include rf weldable materials and may be polar plastics such as PVC. For example, layers of the sheets 220 or folded over sheet 220 which are adjacent one another prior to welding may be made of such material. During construction of the fill receiving set 24, a portion of the sheets 220 or sheet 220 may be welded and the sheet material may be indexed to a next portion of the sheet 220. This portion may be welded and indexed and so on. The number of bags 26 formed in each welding operation may be less than the total number for bags 26 in a fill receiving set 24. In some embodiments, 1-4 or more bags 26 may be formed at a time. It may be preferable that the number of bags 26 in the fill receiving set 24 is an even multiple of the number of bags 26 formed per welding operation. As shown, the seal 230 may be formed so as to create a flow path 232 in a bus portion 234 of the fill receiving set 24 as well. The interior volume of each bag 26 may be in fluid communication with the bus portion 234 via an offshoot 238 from the flow path 232 to each bag 26. In the example, offshoots 238 all extend off the bus portions 234 in the same direction. In some embodiments, offshoots 238 may extend from opposing sides of the bus portion 234 such that bags 26 are disposed on each side of the bus portion 234.

When formed, the bags 26, bus portion 234, and offshoots 238 may all be flat with substantially little to no interior volume. During filling, the sheet material may displace so as to allow the bags 26 to fill and to provide lumens at the bus portion 234 and offshoots 238. As a result, a hold up volume of air should not be present in the bus portion 234 and offshoots 238 and thus is not transferred into the bags 26 during filling. In some embodiments, a vacuum may be pulled on the flow path to ensure a minimal amount of air is present in within the features formed by the seal 230.

The welding and indexing process may repeat until the whole sheet 220 has been welded to form the fill receiving set 24. When the sheet or sheets 220 is/are indexed, the welding die may extend over at least a portion of an overlap region in the previously created weld. This may assure that the seal 230 is formed hermetically over entire length of the fill receiving set 24. In some embodiments, the access element 226, 228 pairs may be introduced between the sheet 220 or sheets 220 each time an indexing occurs. As shown in FIG. 47, bags 26 may be formed close to one another so as to minimize waste of sheet 220 material.

Figure 48:
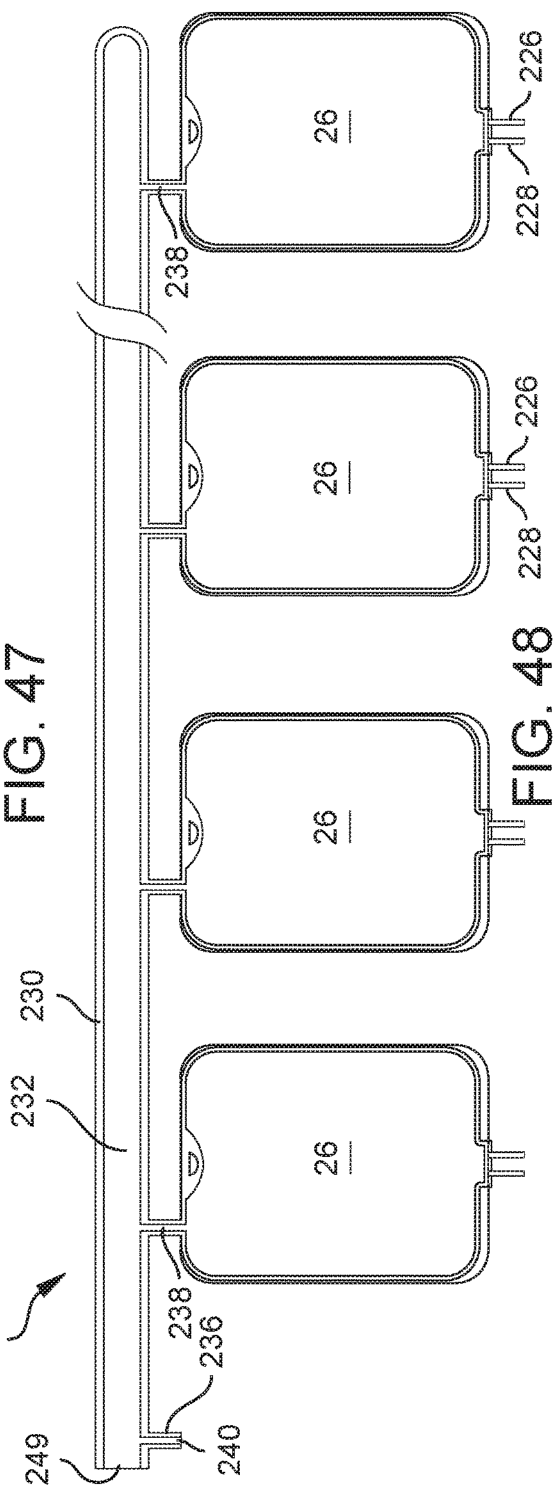
FIG. 48 depicts an example fill receiving set.

After being indexed from a welding station, the sheet 220 or sheets 220 may be cut as shown in FIG. 48 at a cutting station. A section of the sheet 220 or sheets 220 may be cut at the same time another section is welded. The cutting station may include a cutting die which is advanced into the folded sheet 220 or sheets 220 to cut out the bags 26. The excess material may be separated from the fill receiving set 24. A port 236 may be included in a terminal end of the fill receiving set 24. An offshoot 240 from the flow path 232 may extend through the port 236 to the environment. The port 236 may be located adjacent an inlet opening 249 to the flow path 232 in the fluid bus 234. In certain embodiments, a fitting may be coupled to the opening 249 to facilitate connection to a dispensing member.

Figure 49:
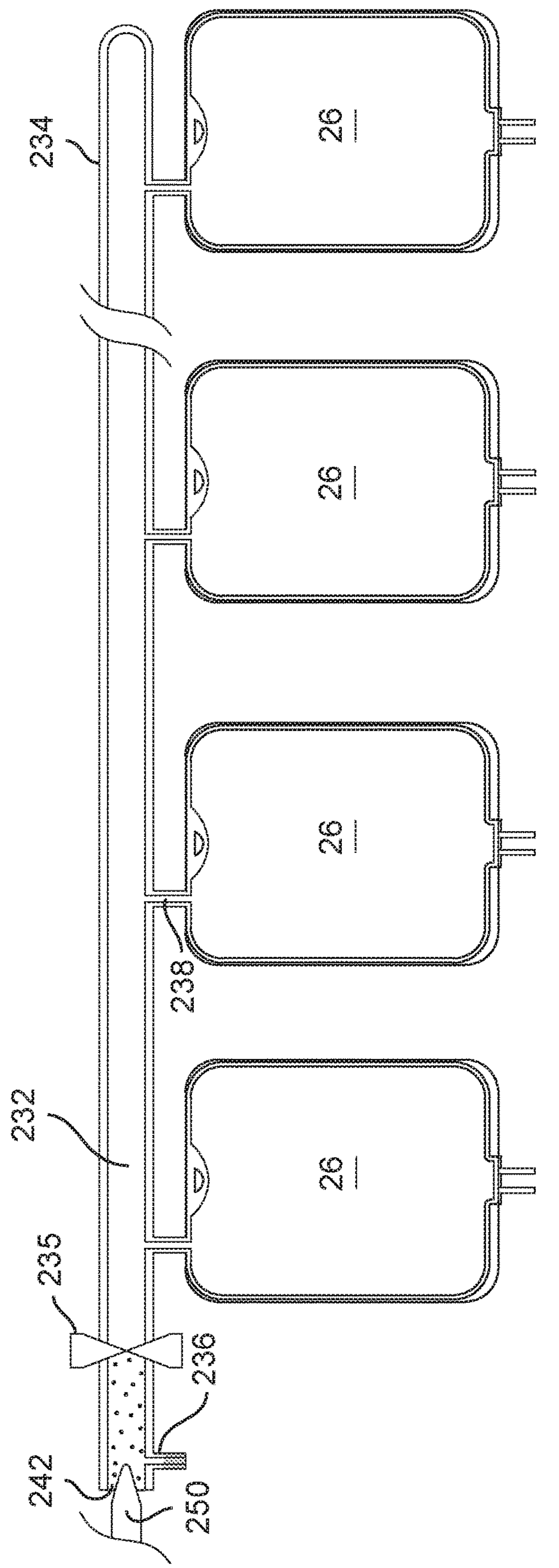
FIG. 49 depicts an example fill receiving set having with steam being supplied to a portion of the fill receiving set.

Referring now to FIG. 49, when installed in the system 10 a dispensing member 250 may be received in opening 249 or a fitting affixed thereto. This may be done by user manipulation of the bus portion 234 of the fill receiving set 24, though this coupling may also be made in automated fashion. Where manual user manipulation is utilized, the interaction between the user and the fill receiving set 24 may occur through a glovebox arrangement. Additionally, an occluder 252 may close the flow path 232 upstream of the first offshoot 238 to a bag 26. The dispensing member 250 may initially output a steam stream into the flow path 232. This may cleanse the flow path. The steam may be provided by venting a stream (e.g. purified, but yet uncondensed water vapor, perhaps a compendial steam such as pure steam) from the medical water production device 14 where the medical water production device 14 is a distillation device. The steam may exit the flow path 232 through the offshoot 240 leading through port 236. After a suitable amount of steam cleansing, the port 236 may be sealed by, for example, an RF seal 254 as shown in FIG. 50.

Figure 50:
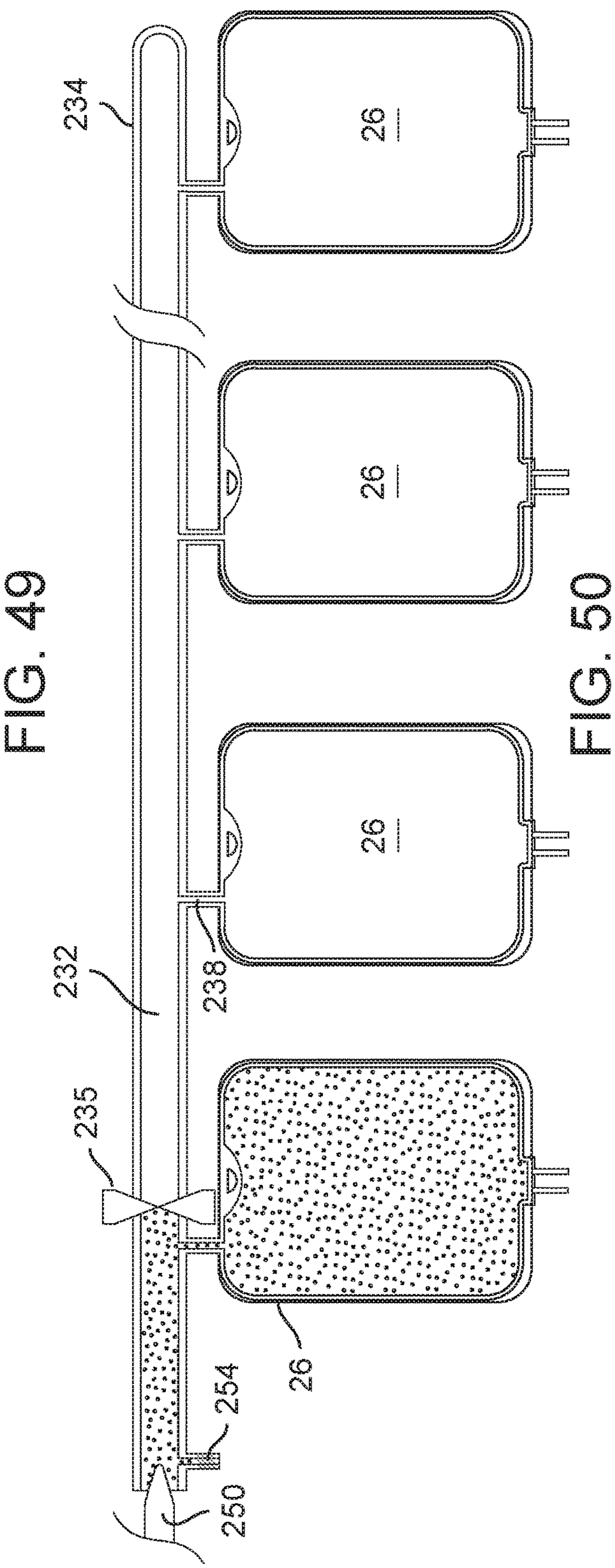
FIG. 50 depicts a bag being filled through an example fill receiving set.

As shown in FIG. 50, the dispensing member 250 (or in some embodiments, a second dispensing member which has been coupled to the opening 249 after removal of the steam dispenser) may output a medical water flow to the flow path 232 of the bus portion 234. Where a mixture of fluid is provided to the bag 26, the mixture may be output by the dispensing member 250. The occluder 252 may be advanced downstream of the first offshoot 238 to a bag 26. This may place the interior volume of at least one bag 26 into fluid communication with the opening 249. In some embodiments, the occluder 252 may be displaced to a location on the flow path 232 intermediate the first and second offshoots 238 to bags 26 as is shown in FIG. 50. In other embodiments, the occluder 252 may be displaced so as to place multiple bags 26 into fluid communication with the opening 249. An output of medical water or a mixture from the dispensing member 250 may fill the bag 26 to an appropriate amount (e.g. as sensed by a scale or volume displacement sensing arrangement) and the dispensing may be halted. The volume dispensed to a given bag 26 may be order specific and chosen based on an amount of diluent needed for a particular medication order. This may be computed by the control system 15 which may be in communication with a pharmacy order entry system and receives orders therefrom.

Figure 51:
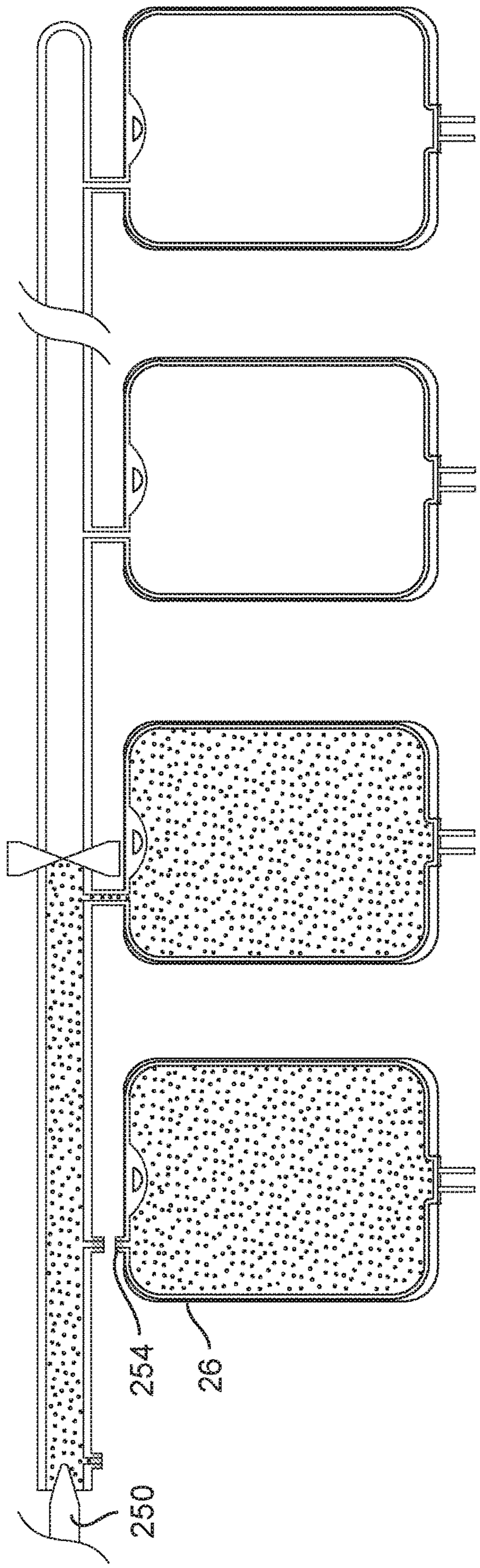
FIG. 51 depicts an example fill receiving set with a first bag of the set being filled and severed from the set and a second bag of the set being filled with fluid.
Figure 52:
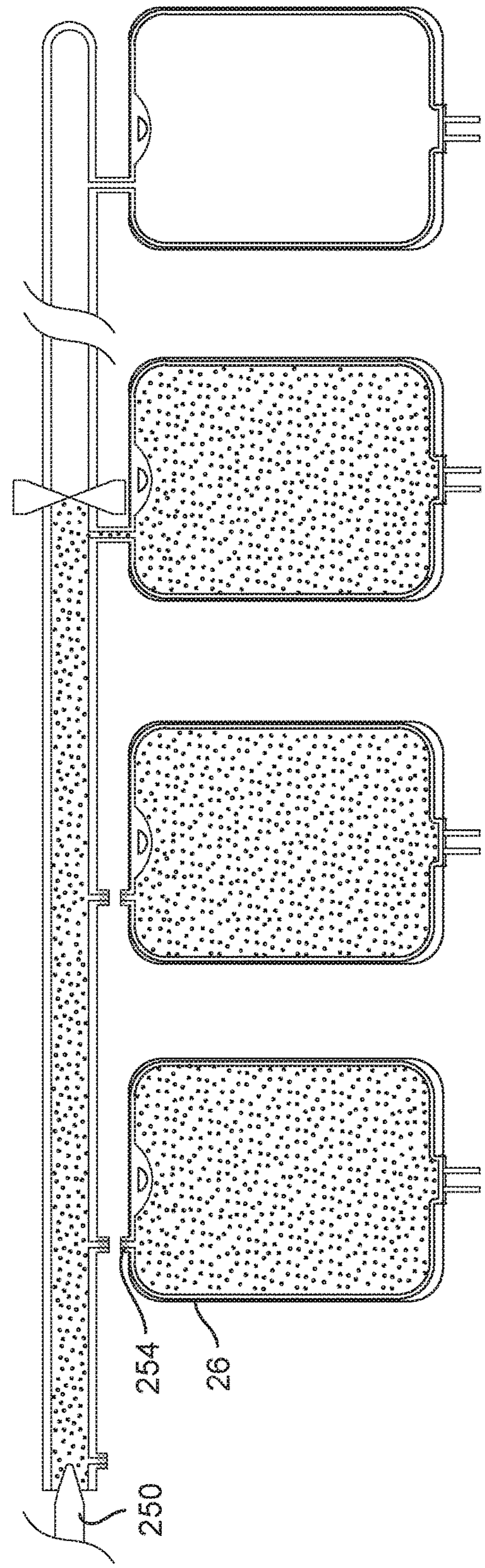
FIG. 52 depicts an example fill receiving set with a first and second bag of the set being filled and severed from the set and a third bag of the set being filled with fluid.

As shown in FIG. 51, a seal 254 may be generated to close the offshoot(s) 238 to any filled bag(s) 26 and the filled bag(s) 26 may be cut from the bus portion 234. The seal may be created via an RF weld and the sealing process may, for example, be performed as described in FIG. 22A-22F or similarly to as described in relation to FIGS. 159-175. The occluder 252 may be advanced so as to place the interior volume of an additional bag 26 or bags 26 into fluid communication with the opening 249. The dispensing member 250 may then output medical water or a medical fluid mixture as described above to fill the bag 26 or bags 26. As shown in FIG. 52, this may continue until all bags 26 included in a fill receiving set 24 have been filled. As mentioned elsewhere herein, the fill receiving set 24 may include several dozen bags 26 (e.g. 50-100).

Figure 53:
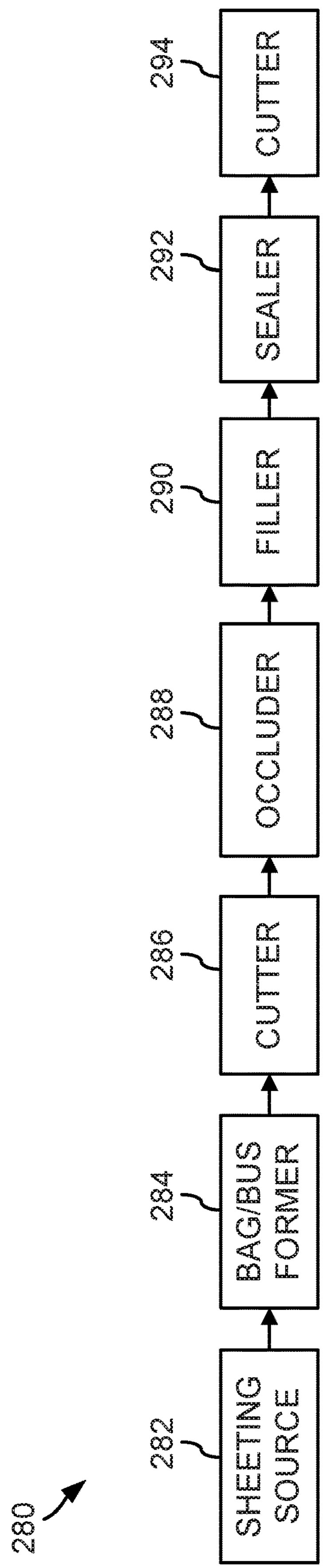
FIG. 53 depicts a block diagram of an example fill receiving set production and filling system.

Referring now also to FIG. 53, the welding, cutting and filling of bags 26 may be a continuous process on a production line 280 in certain embodiments. In such examples, a sheet or sheeting 220 may be drawn from a sheeting source 282 in a continuous manner. The sheeting source 282 may be a large roll, spool, carton, or the like. The sheeting 220 may first be drawn into a bag/bus former component 284 of the production line 280. As mentioned elsewhere, the bag/bus former 284 may be a plastic welder such as an RF welder. Sheeting 220 may be indexed through the bag/bus former 284 such that one or more bag is formed in the sheeting 220 at a time. The formed portion of the bag 26 and bus 234 may be cut from the sheeting 220 at a cutter station 286 of the production line 280. As mentioned elsewhere, this cutter station may include a die cutter. A filling station 290 may fill one or more of the cut out bags 26 with an occluder 288 of the production line 280 blocking off any downstream bags 26 and unformed sections of the sheeting 220. Filled bags 26 may be sealed off from the bus 234 at a sealing station 292 of the production line 280. The sealing station 292 may include an RF welder and may include rollers or squeegees as mentioned elsewhere herein. After sealing a bag 26 from the bus 234, the bag 26 may be cut from the bus 234 by a bag severing station 294 of the production line 280.

In alternative examples, the production line 280 may form and cut the bags 26 and bus 234 from an amount of sheeting 220. The production line 280 may not, however, fill the bags 26 and cut them from the bus 234. In such examples, unfilled bags 26 still attached to the bus 234 may be provided as a fill receiving set 24 to an institution or medical facility having filling, occluding, sealing, and bag severing components. This may help to minimize the amount of floor space needed at the medical facility. In such embodiments, the production line 280 may include a packaging station which applies an over pack around the fill receiving set 24.

Figure 54:
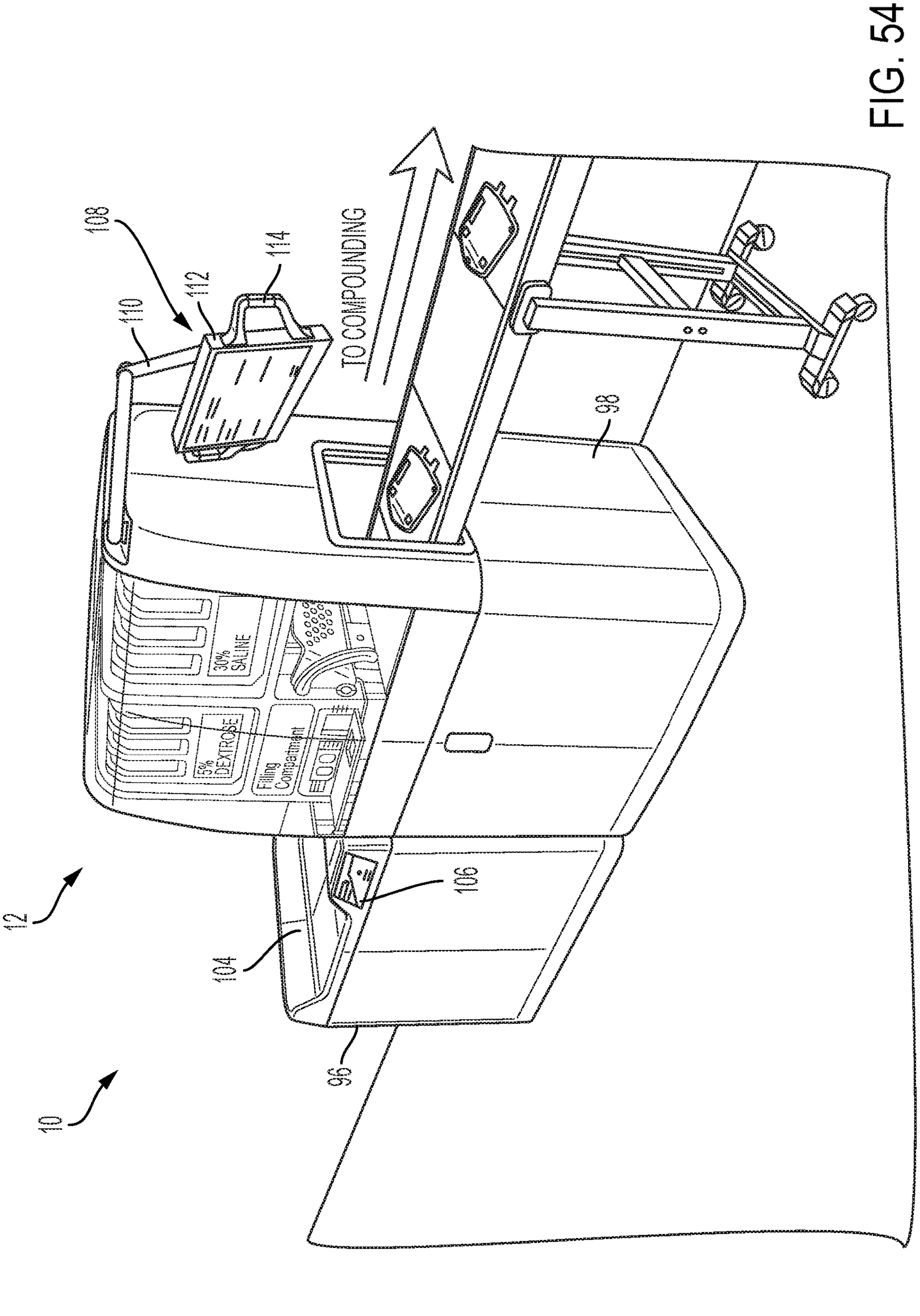
FIG. 54 depicts a perspective view of an example system for producing and packaging medical fluids.
Figure 55:
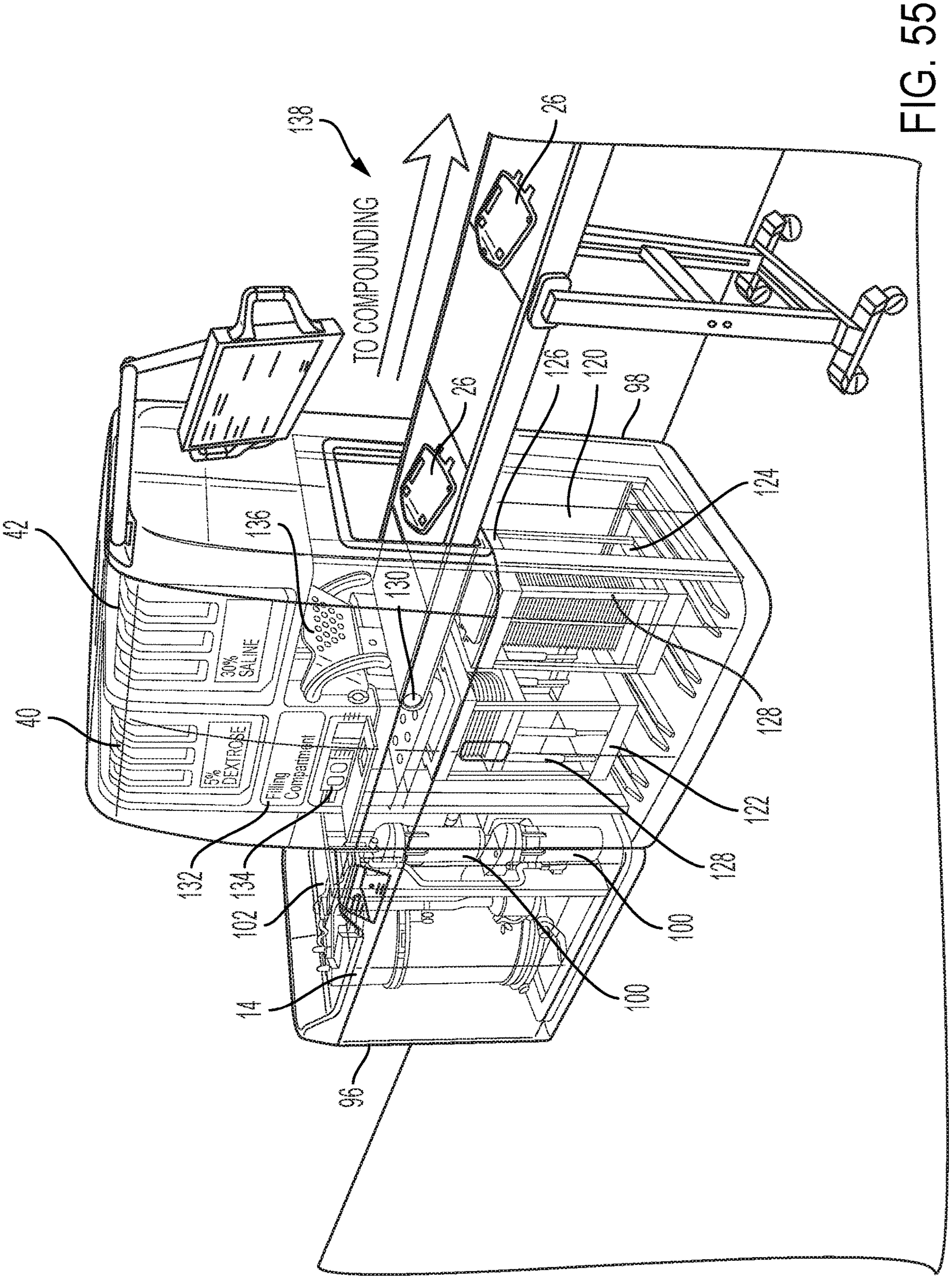
FIG. 55 depicts a perspective view of the example system in FIG. 54 with portions of the enclosure depicted as transparent to reveal various internal components of the system.

Referring now to FIGS. 54-55, an example system 10 for producing and packaging medical fluids is shown. As shown, the system 10 is placed in a clean room environment. The system 10 includes an enclosure 12. In the example embodiment, the enclosure is partitioned into a first section 96 and a second section 98. As is best shown in FIG. 55 (which depicts the system 10 of FIG. 54 with portions of the enclosure 12 being transparent), the first section 96 may house a medical water production device 14. In alternative embodiments, the medical water production device 14 may be in a non-clean room (or less stringent clean room) environment with its output plumbed to the clean room. In the example embodiment, the medical water production device 14 is shown as a distillation device which receives water that has been pretreated by a number of filters 100 (e.g. charcoal filters and/or reverse osmosis filters). The first section 96 may include a partition 102 which serves to divide the first section into a hot compartment and a cool compartment. The partition 102 and walls of the first section 96 of the enclosure 12 may include insulation as appropriate to prevent electronics and surfaces elsewhere in the system 10 from being subjected to high temperatures during distillation. The first section 96 may also be topped with a work surface 104 designed to be easily cleanable. For example, the work surface shown in FIG. 54 has rounded corners which minimize the possibility that areas may get missed during cleaning. The work surface 104 may be used to open fill receiving sets 24 or packages of individual bags 26 and manipulate them as needed to get them ready for installation into the system 10 for filling. The first portion 96 of the enclosure 12 may also include a user interface 106 such as a touch screen GUI. This user interface 106 may be used to interact with the medical water production device 14. The user interface 106 may also provide visual guidance in the form of tutorials (e.g. for wipe down and cleaning of the work surface 104 or other system 10 components or for preparation of a fill receiving set 24). The user interface 106 may also be used for interacting with the medical water production device 14 and allow for changing of settings and/or display of notifications, alerts, alarms, and other messages related to operation of the medical water production device 14.

The second portion 98 of the enclosure also includes a user interface 108. In the example embodiment, the user interface 108 is included on an articulated boom 110. The boom 110 may include a number of joints which may allow for the user interface 108 to be displaced by a user to a convenient location. The bezel 112 of the user interface 108 may include easily graspable handles which may facilitate displacement of the user interface 108. The user interface 108 may, for example, be a touch screen GUI.

The user interface(s) 106, 108 may be used to interact with the components of the system 10 which fill a fill receiving set 24 or, in the example shown, individual bags 26. The user interface(s) 106, 108 may also be used to interact with various medical systems of a hospital, urgent care center, surgery center, or similar institution. Such systems 10 may include a physician order input system, pharmacy order entry system, medical record system, continuous quality improvement system, drug error reduction system, inventory systems, laboratory systems, drug administration libraries, etc. Certain example medical systems which may interface with the system 10 are described in further detail in U.S. application Ser. No. 14/137,421, entitled Computer-Implemented Method, System, and Apparatus for Electronic Patient Care, filed Dec. 20, 2013 which is hereby incorporated by reference herein in its entirety. Such systems may track usage of the system 10 for producing and packaging medical fluids and manage orders sent to the system 10. These other medical systems may also monitor production from the system 10 and perform analysis against actual bag 26 usage within an institution (bag storage time, solution usage by care area, demand per day of week, etc.). Bags 26 may include or be associated with unique identifiers to facilitate data collection for this purpose. These identifiers may be read before or during administration to indicate that the fluid has been used and perhaps where within an institution the fluid is being used. This may allow for better inventory management and minimize storage cost and storage space demand. It may help to allow the system 10 to run as a part of a "just in time" inventory management system. Additionally, it may allow for an additional check to make sure that the fluid being used is the correct fluid (correct volume, concentration, dose, no contraindications, etc.) for a particular patient. Software updates for the system 10 may be provided via these other medical systems as well.

In some instances, the user interface 108 may be used for user credentialing; ensuring only trained or qualified users may operate the system 10 for producing and packaging medical fluids. This may be accomplished via biometrics, face recognition, pass code input, etc. which is checked against a database of approved users or pass-codes. Where biometrics are used, the user interface 106, 108 or another portion of the system 10 may be equipped with appropriate sensors (e.g. a camera, fingerprint scanner, etc.)

As best shown in FIG. 55, the second portion 98 of the enclosure 12 may include a storage volume or bay 120. The storage bay 120 may house at least one bag feeder 128 which is ready to be filled. In the example embodiment, two bag feeders 128 are stowed within the bay 120. The bag feeders 128 are installed into the system 10 via roll carts 122. The bag feeders 128 may include a biased platform 124. The bags 26 may be placed on the platform 124 in a stack. In alternative embodiments, the bags 26 may be included in a fill receiving set 24 and may be filled via a manifold 20 such as those described elsewhere herein. The bag feeders 128 may also include a top face 126 which may include an orifice through which the bags 26 may be pushed. As a bag 26 is removed from the stack (e.g. by a robotic manipulator, robotic flipper, or vacuum grasper) the biased platform may advance toward the top face of the bag feeder 128. This may ensure that another bag 26 is available for retrieval from the stack until bag feeder 128 has been completely depleted. As shown, the bias members for the platform 124 are depicted as springs, however, pneumatic, hydraulic or other means of displacing the platform 124 may be used in alternative embodiments.

In the example embodiment, a vacuum grasper 130 is included to pick up the bags 26 and displace them to a filling station or dispenser. In other embodiments, a filling nozzle assembly may be displaced to the topmost bag 26 and coupled to a fill port on the bag 26. In embodiments where the bags 26 are filled through the administration set 28, the filling nozzle may couple with an access included on the administration set 28. The bags 26 may be transferred to a filling compartment 132 of the system 10 for filling. In other embodiments, particularly those in which the administration set 28 or other conduit is integrated into the bag 26, a flipper may be used. The flipper may include a paddle member which follows underneath the path of the administration set 28 tubing or other conduit to easily get under and separate the bag 26 from the adjacent bag 26. The flipper may then transport the bag 26 to the filling station. Any suitable vision or sensing system may additionally or alternatively be used to aid in collection and transport of bags 26 off of the stack.

When the connection between the fill nozzle and bag 26 or administration set 28 is made the coupling members may be cleaned. For example, a venting port from a distillation device serving as the medical water production device 14 may be positioned to eject hot vapor on the coupling on the coupling surfaces. Alternatively, the vented hot vapor may pass through the filling nozzle and be ejected at the bag 26 or set's 28 coupling.

Where it is desired to fill the bags 26 with a compendial fluid such as WFI, the fluid may be provided from the medical water production device 14. In embodiments where the system 10 is arranged to fill the bags 26 with mixed fluid (if desired) the system 10 may include bulk reservoirs 40, 42. For purposes of example, the bulk reservoirs 40, 42 are respectively labeled as 5% Dextrose and 30% Saline. Any other suitable bulk reservoirs 40, 42 may be utilized and the contents of the reservoirs 40, 42 would depend on the solutions one desires to produce. Where the solution is a multi-component solution (e.g. Ringer's) bulk reservoirs 40, 42 for various constituents of the solution may be used. Alternatively, a single bulk reservoir 40, 42 containing concentrate of a mixture of all of the necessary components for that solution may be used. The system 10 may include a pumping apparatus 134 which meters fluid to send to the bag 26. The fluids may be metered so as to achieve a desired end concentration of fluid in a given bag 26. In certain examples, the pumping apparatus 134 may be a cassette based pumping apparatus. One such example apparatus is described in U.S. application Ser. No. 16/384,082, filed Apr. 15, 2019, entitled Medical Treatment System and Methods Using a Plurality of Fluid Line, which is hereby incorporated by reference herein it its entirety. Where the system 10 fills bags 26 with mixed fluid, the system 10 may include a sensing manifold. The sensing manifold may include conductivity and temperature probes which monitor the composition. Other types of composition sensors may also be used. For example, the system 10 may include spectrometers, turbidity meters, pH probes, sensors such as polarimeters for monitoring chiral properties of fluid components, dissolved ion sensors, dissolved oxygen sensors, Redox potential sensors, refractometers, TOC sensors, etc. Similar sensors may also monitor the output from the medical water production device 14 or be integrated therein. Other sensors such as bioburden sensors may also be included. Data from any mixture quality sensors may be sent to the control system 15 of the system 10 for analysis. Data may be compared to predetermined acceptable limits or thresholds for a given fluid type. Such sensors may also be used as a redundant check in addition to water quality testing done by the medical water production device 14. In embodiments where the system 10 is equipped to mix various fluids, it may be desirable to take a quality reading before expending concentrates into the fluid stream from the medical water production device 14. The sensors described above, or sensors in another sensing manifold, may check the quality of WFI water output from the medical water production device 14.

Once a bag 26 has been filled, it may be sealed and then exit the filling compartment 132 to be passed along to a bucket 136 or similar holder which places the bag 26 onto a conveyer assembly 138. The conveyer assembly 138 may pass bags 26 to a bin or similar storage location which may serve to hold the bags 26 until they are needed for administration. Alternatively, the conveyer assembly 138 may convey the bags 26 to a compounding area where additional medications are introduced to the bag 26 in an automated or manual fashion. In some embodiments, the conveyer assembly 138 may pass bags 26 to one or more automated and/or human inspection stations. Bags 26 may be conveyed to a quarantine station in which they reside until cleared for use in certain embodiments.

In some examples, a sensing assembly may be included to monitor bags 26 which are produced by the system 10. This sensing assembly may include visual sensors, for example, which image the bag 26. A processor may perform an image analysis and screen out bags 26 which may have defects. For example, the processor may flag bags 26 which have visible particulate, have an improper color, leaks, excessive air, and other concerns of interest.

Figure 56:
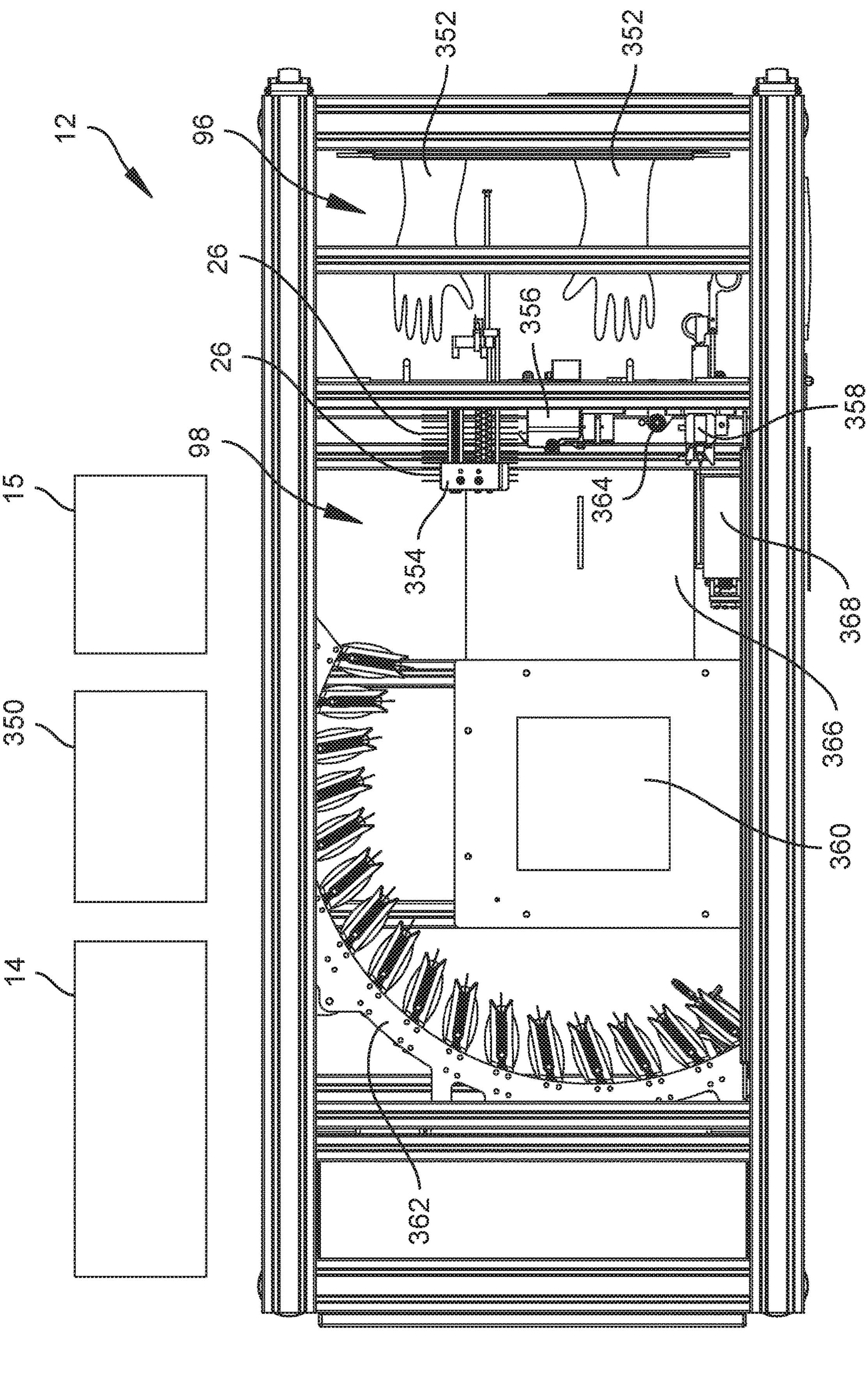
FIG. 56 depicts a top down view of another example system for producing and packaging medical fluids.

Referring now to FIG. 56, a top down view of another example system 10 for producing and packaging medical fluids is shown. The system 10 may include a medical water production device 14 such as any of those described herein. The system 10 may also include a mixing circuit 348 and a sensor suite 350 which may monitor the quality of purified water produced by the medical water production device 14 as well as mixed fluid generated in the mixing circuit 348. The sensor suite 350 may include any number of different types of water quality sensors. Any water quality sensors described herein may be included. The mixing circuit 348 and sensor suite 350 may be the example mixing circuit 348 and sensor suite 350 described in relation to FIG. 138.

The system 10 also includes an enclosure 12. The enclosure 12 may provide a clean room environment for the components of the system 10 contained therein. The enclosure 12 itself may also be contained within a clean room environment. In such embodiments, the enclosure 12 may be maintained at a higher clean room standard than the room in which it is located. In some embodiments, the enclosure 12 may be held at positive pressure by a blower system (not shown in FIG. 56). In the example embodiment, the enclosure 12 is partitioned into a first section 96 and a second section 98. Each of these sections may be held at slightly different positive pressures. For example, the first section 96 may be held at a first pressure which is positive with respect to the surrounding environment. The second section 98 may be held at a pressure higher than the first pressure. Filling of bags 26 may occur in the most stringently controlled environment of the system 10. Various filters such as HEPA filters may be included to help ensure any air blown into the enclosure 12 to maintain positive pressure is clean.

The first section 96 may be an antechamber which may be utilized for preparing various consumables used by the system 10. For example, a stock of bags 26 or magazines 30 preloaded with bags 26 may be kept in the antechamber during use. Stopper magazines 466 (see, e.g. FIG. 74A) may also be stocked within the antechamber. Sampling vials 532 (see, e.g., FIG. 103) may also be kept in stock within the antechamber. This may help to minimize the need to access the interior of the enclosure 12 during operation of the system 10. Various racks, shelving, hangers, compartments, or holders may be included to aid in organizing component stocks. The first section 96 may also include certain testing equipment that may be used to verify bags 26 have been filled according to predefined criteria. For example, the first section 96 may include an endotoxin or pyrogen tester such as an Endosafe nexgen-PTS available form Charles River Laboratories, Inc. of Wilmington Massachusetts Additionally, any sampling ports in the fluid circuit may be accessible via the antechamber. The first section 96 may be constructed as a glove box and include at least one pair of glove interfaces 352 which may be used to interact with components in the antechamber.

The second section 98 may include a bag feeder 354, filling station 356, and a sealing station 358. Bags 26 may be loaded into the bag feeder 354 by a user via the gloved interfaces 352. Alternatively, fill receiving sets 24 may be used. In the example shown, a bulk container or cartridge of individual bags 26 or preloaded bag dispensers (e.g. magazines) may be held in the antechamber and bags 26 may individually be installed in the bag feeder 354. In certain embodiments, a plurality of bag feeders 354 each holding different bag 26 types having different fill capacities may be included. A robotic arm 360 including a grasper may collect a bag 26 from the bag feeder 354 and displace the bag 26 to the filling station 356. Fluid may be dispensed into the bag 26 at the filling station 356. This fluid may be purified water such as WFI water, or a mixture of fluid generated at a mixing subsystem similar to those described in relation to FIG. 2A and FIG. 2B. Bags 26 may also include a concentrate as described above in relation to FIGS. 5A-6 for example. From the filling station 356, the robotic arm 360 may displace the filled bag 26 to a sealing station 358. An access to the interior volume of the bag 26 may be sealed closed at the sealing station 358 (e.g. via stoppering, RF welding, etc.).

From the sealing station 358, the bag 26 may be moved to a quarantine repository 362 included within the second section 98 of the enclosure 12. As bags 26 are filled and sealed they may remain in the quarantine repository 362 for some period of time. For example, prior to the first bag 26 being stored within the quarantine repository 362, a sampling vial 364 may be brought to the filling station 356. A volume of fluid may be dispensed to the vial 364. The vial 364 may then be brought to a tester such as the pyrogen (e.g. endotoxin) tester described above. Once the quarantine repository 362 is full or after a certain number of bags 26 have been placed in the quarantine repository 362, another vial 364 of fluid may be collected at the filling station 356 and a second test at the tester may be run. Both the pre and post quarantining tests may be required to pass in order for the control system 15 to allow release of the bags 26 from the quarantine repository 362.

Once the bags 26 have been released from quarantine, the bags 26 may be labeled. In the example embodiment, the second section 98 of the enclosure 12 includes a labeler 366. The labeler 366 may be any suitable labeler 366 such as a thermal printer. A thermal ribbon transfer type printer may be particularly desirable in certain embodiments. The labeler 366 may generate and facilitate application of a label to each of the bags 26 produced by the system 10. The labels may be adhered to the bag 26 via an adhesive backing. The label may include information required by any relevant statues or regulations as well as identifying characteristics, tracking information, computer readable indicia, corresponding patient information, instructions for use, etc. Bags 26 may then be expelled from the enclosure 12 through an output 368 which may include a chute which has a gated or doored entry. Bags 26 may exit the enclosure 12 through the output and be ejected into a container or conveyer (neither shown in FIG. 56) disposed at the outlet of the output 368.

Figure 57:
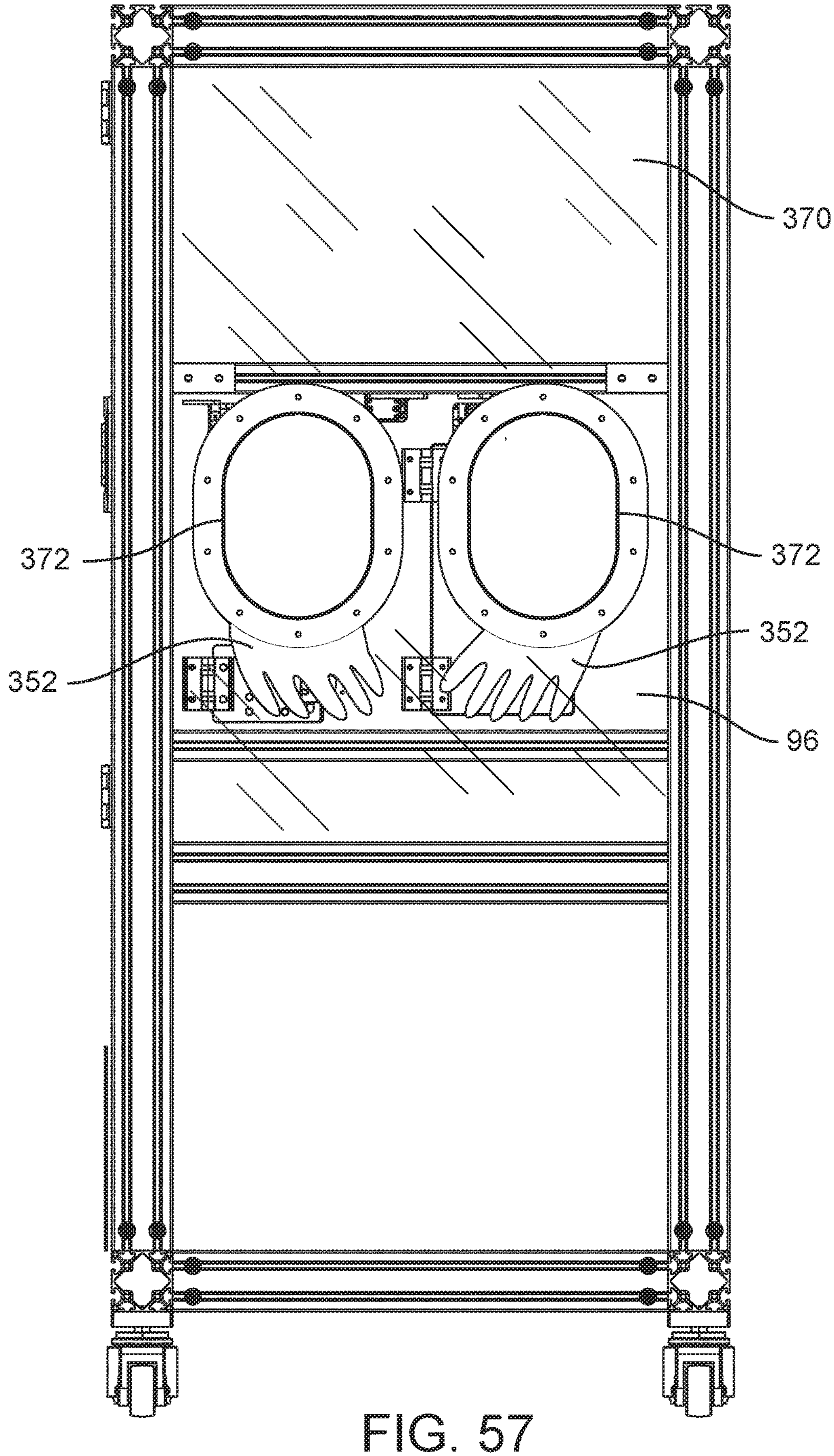
FIG. 57 depicts a side view of the example system shown in FIG. 56.

Referring now to FIG. 57, a side view of the enclosure 12 depicted in FIG. 56 is shown. As shown, a side panel 370 of the first section 96 of the enclosure 12 is depicted as transparent to allow for viewing of the interior of the antechamber. As shown, the side panel 370 may include ports 372. The glove interfaces 352 may be mounted into the ports 372 in a fluid tight manner. The glove interfaces 352 may be mounted at a height which is comfortable for an average standing or seated user. The glove interfaces 352 may provide a sterility barrier through which a user may manipulate various components of the system 10 within the enclosure 12.

Figure 58:
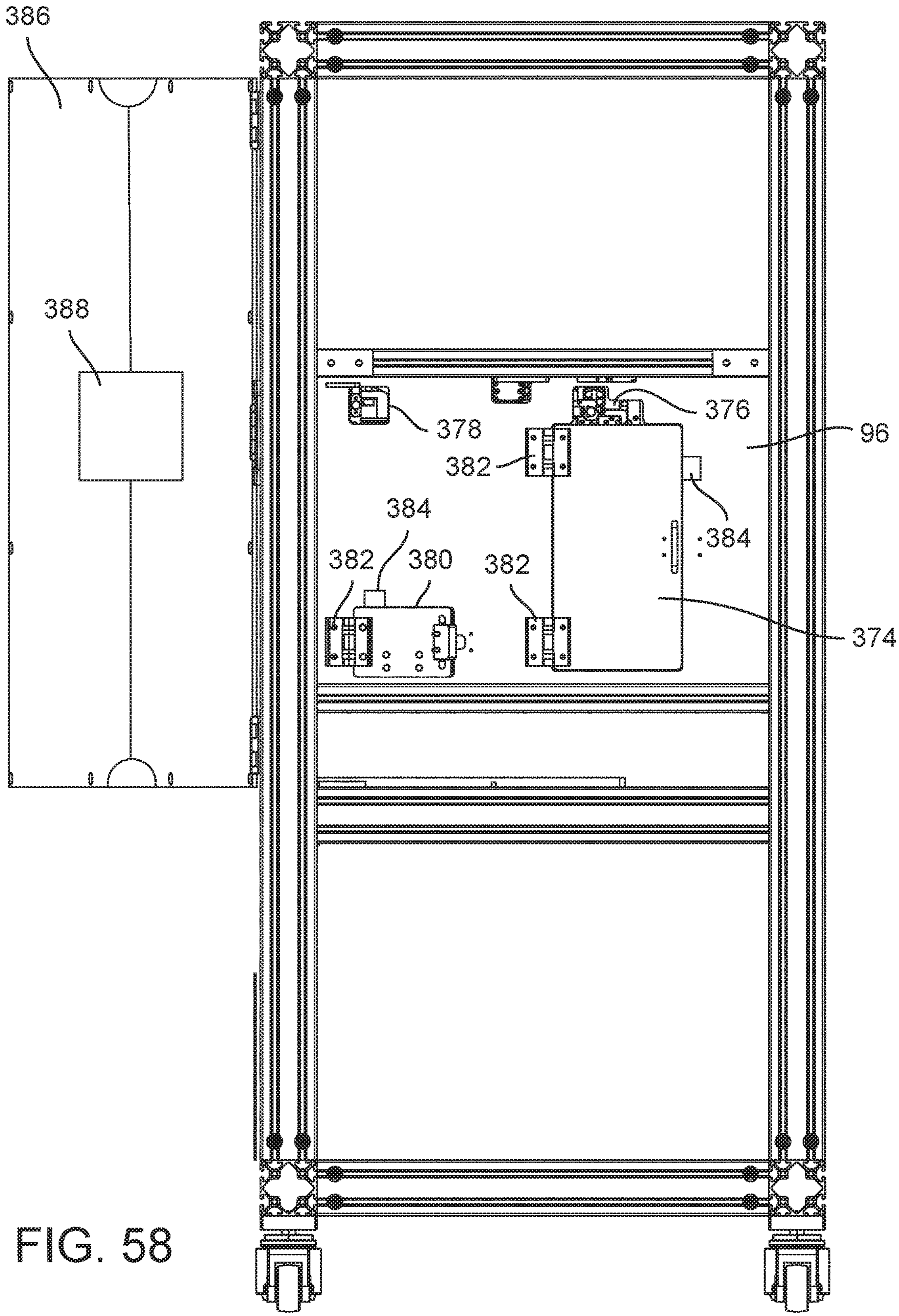
FIG. 58 depicts another side view of the example system shown in FIG. 56.

Referring now also to FIG. 58, a side view of the example enclosure with the side panel 370 and glove interfaces 352 removed is depicted. A number of access openings from the first section 96 to second section 98 of the housing 12 may be included. These access openings may include a bag loading door 374, a bag feeder port 376, a sealing station port 378 and a vial access door 380. The bag feeder port 376 may allow access to a portion of the bag feeder 354 to allow the bag feeder 354 to be opened such that bags 26 or a preloaded dispenser of bags 26 such as a magazine may be loaded into the bag feeder 354. The bag feeder door 374 may be opened so as to allow bags 26 to be passed from the first section 96 to the second section 98 of the enclosure 12 as they are loaded into the bag feeder 354 The sealing station port 378 may provide an opening through which a magazine (e.g. containing a supply of stoppers) may be installed in the sealing station 358. The vial access door 380 may allow for vials to be introduced and withdrawn from the second section 98 of the enclosure 12 for sample collection and testing. All interaction with these components may be via the glove interfaces 352. Any doors may include clean room appropriate hinges 382. In certain embodiments, hinges 382 may be detent hinges which tend to hold the attached door in a prescribed position and resist inadvertent displacement therefrom. Such hinges may also assist the attached door in reaching the prescribed position once the door has been rotated to within a range of the prescribed position. For example, detent hinges which tend to hold the attached door closed may be used. Any door may be paired with at least one respective position sensor 384. The position sensors 384 may detect whether the doors are in an open or closed state. Any suitable type of sensor may be used, however, inductive or magnetic sensors 384 may be preferred in certain embodiments. An antechamber door 386 may also be provided and may include a lockable latch mechanism 388 which may be used to hold the antechamber door 386 in a closed position. The antechamber door 386 may be paired with at least one position sensor 384 similar to those described above. A control system 15 of the system 10 may monitor the output from the door position sensors 384 and may generate a user interface notification when a door is open. The control system 15 may also prohibit certain actions in the event that a door is open. For example, filling of bags 26 may be prohibited in the event that a door is left open.

Figure 59:
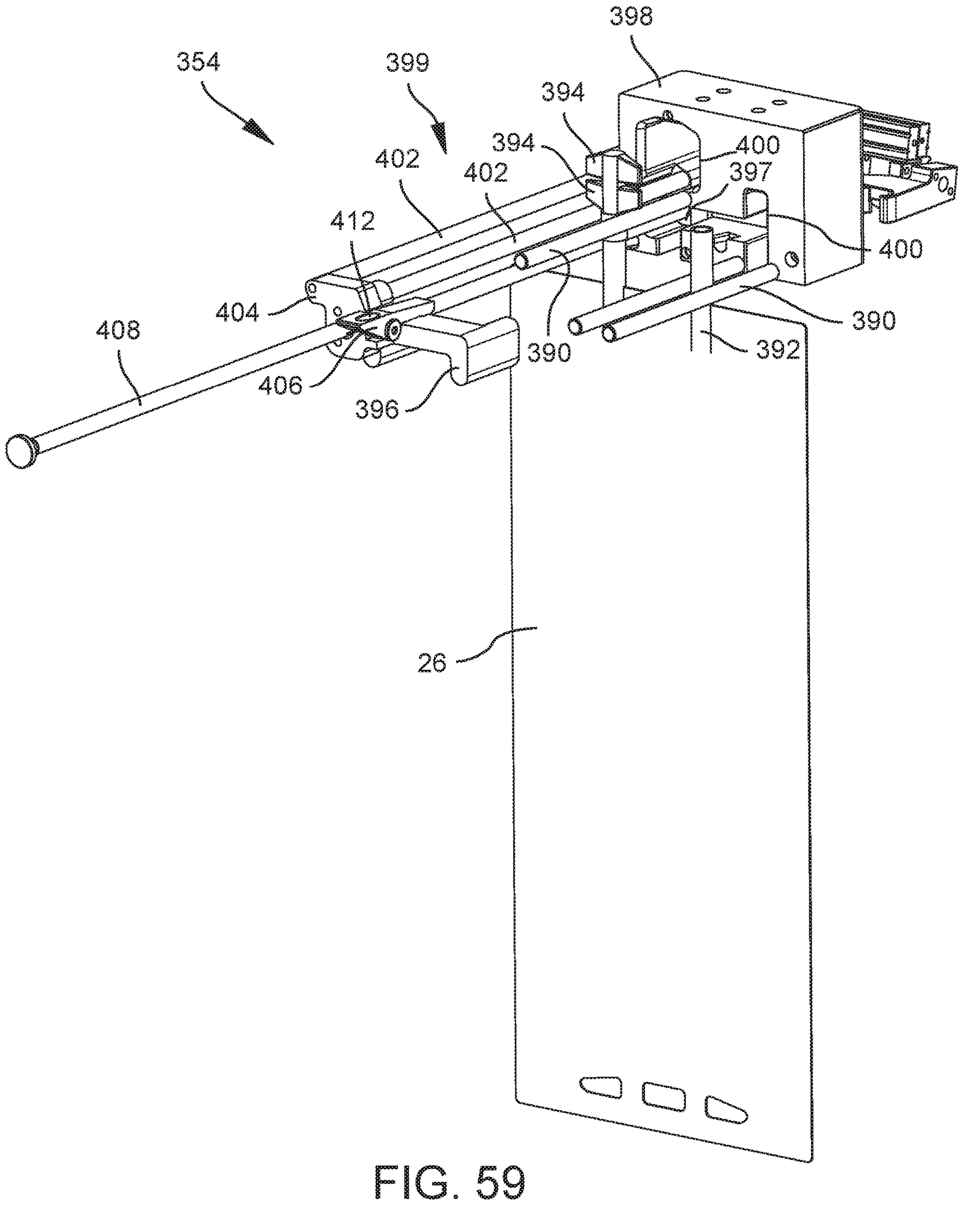
FIG. 59 depicts a perspective view of an example bag feeder.

Referring now to FIG. 59, an example embodiment of a reservoir dispenser is depicted. The reservoir dispenser in the example embodiment is depicted as a bag feeder 354 is depicted. As shown, the bag feeder 354 may include a magazine portion 399 and a housing block 398 which may from an outlet end of the bag feeder 354. In some embodiments, the magazine portion 399 may be separable from the housing block 398. In such embodiments, the magazine portion 399 may be provided in a pre-loaded state and coupled to the housing block 398 to ready the bag feeder 354 for use. In the example embodiment, the magazine portion 399 is integrated with and fixed to the housing block 398. The magazine portion 399 may be opened and loaded with bags 26 by a user and may advance bags 26 through the bag feeder 354 as system 10 consumes bags 26. In some embodiments, stripper clips or magazine chargers may be provided so as to facilitate loading of the magazine portion 399. Where preloaded magazine portions 399 or stripper clips are used, these items may come clean and sterilized within an over pack 60 which is doffed once the magazine or stripper clip has entered the antechamber and is ready for use.

The magazine portion 399, in the example embodiment, includes a number of guides 390. The guides 390 may be sized to accept tubing or ports 392 extending from the bags 26. In the example embodiments, one of the ports 392 includes fins 394 which may rest atop one of the guides 390 so as to allow the bag to hang from the guides 390. In the example, the guides 390 are constructed as pairs of rails which extend parallel to one another. A slot may be present between the rails making up each of the guides 390 and may have a width sufficient to accept the port 392 of the bag 26. The exemplary guides 390 extend from the housing block 398. The housing block 398 may include channels 400 for the ports 392 to pass through as bags 26 are fed into the second section 98 of the enclosure 12 from the antechamber.

In some embodiments, a blocking plate 405 (see the embodiment in FIG. 64) may be included between the guides 390. This may aid in preventing a user from mis-loading bags 26 in the bag feeder 354 by preventing ports 392 from being displaced into the space between the guides 390. In some embodiments a straightener member 407 (see the embodiment in FIG. 64) may also be included. The straightener member 407 may extend parallel to the guides 390 and be positioned so as to block bags 26 from hanging in the guides 390 in a crooked orientation. The straightener member 407 may be spaced from a guide 390 a distance which is at least equal to the distance from a port 392 of the bag 26 to the nearest side edge of that bag 26.

The magazine portion 399 of the bag feeder 354 may also include a follower which in the example embodiment is shown as a feed plate 396. The feed plate 396 may be coupled to the housing block 398 via a bias member 401 (best shown in FIG. 64) which urges the feed plate 396 toward the housing block 398. The bias member 401 may be constant force spring in various examples. Any other suitable actuator may be used to drive the feed plate 396 toward the housing block 398. A pair of standoffs 402 may also extend from the housing block 398. The standoffs 402 may be coupled to a feed plate retainer 403. In the example embodiment a latch plate 404 which may include a latch 406 is shown. The feed plate 396 may be coupled to a plunger 408 which may be pulled via the glove interfaces 352 to retract the feed plate 396. The latch 406 may interface with the feed plate 396 to retain the feed plate 396 in a retracted position where it is spaced a distance from the guides 390. This may allow a user to load bags 26 into the magazine portion 399. In alternative embodiments, a magnetic latching arrangement similar to that described in relation to FIG. 73 may be used in place of the latch 406.

Figure 61:
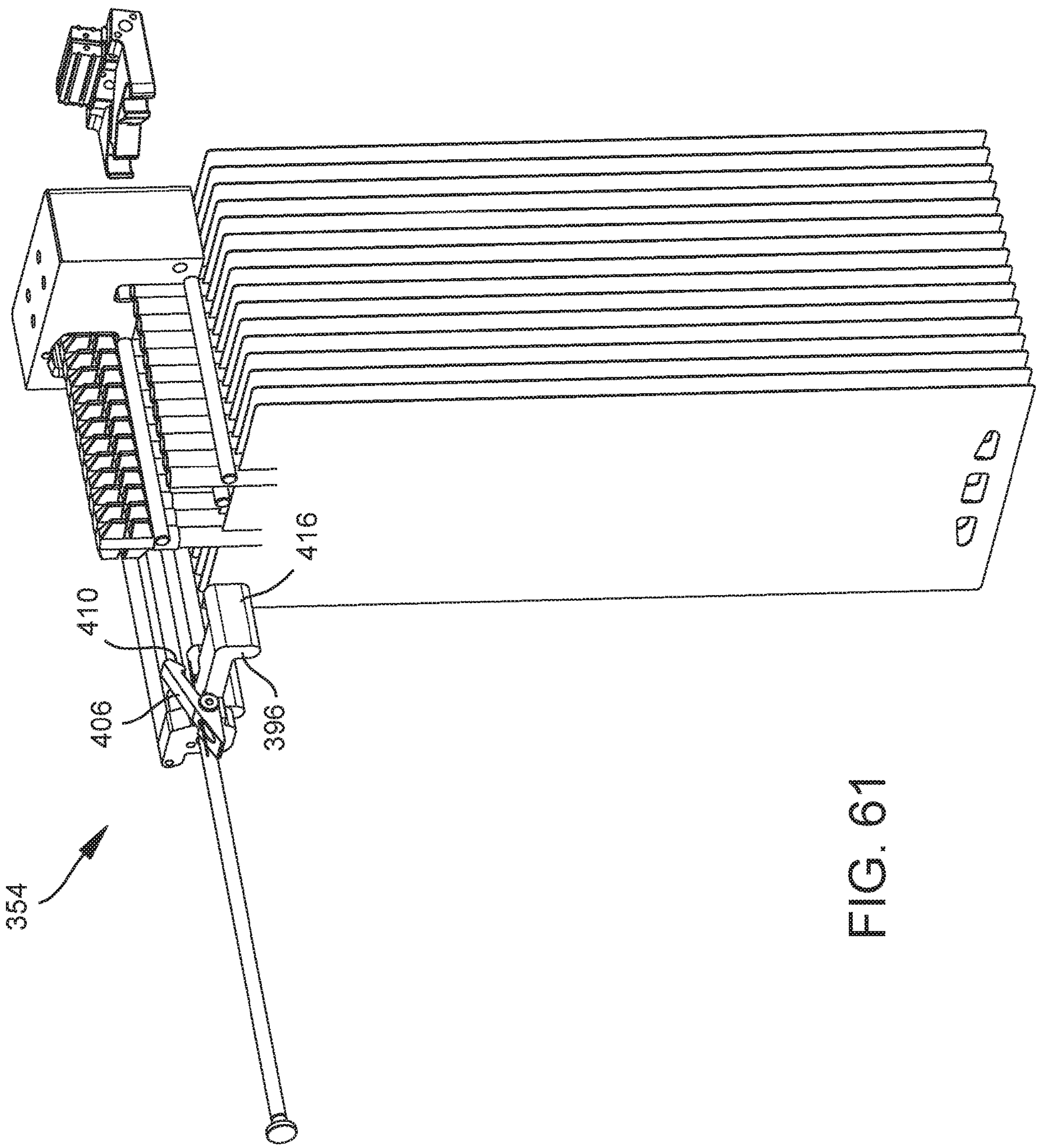
FIG. 61 depicts a perspective view of an example bag feeder with a feed plate being released from a loading position.

In some embodiments, the latch 406 may be biased toward a latching position (e.g. via a torsion spring). When the feed plate 396 is withdrawn via the plunger 408 the latch 406 may be pushed out of the way and automatically displace into a latching engagement with the feed plate 396 when the feed plate 396 has been withdrawn to a predefined open position. The latch 406 may include a sloped or ramped face 410 (see, e.g. FIG. 61) which may facilitate movement of the latch 406 out of an obstructing orientation as the feed plate 396 is withdrawn into contact with the latch 406. The latch 406 may also include a depression 412 which may aid in operation of the latch 406 through the glove interface 352.

Figure 60:
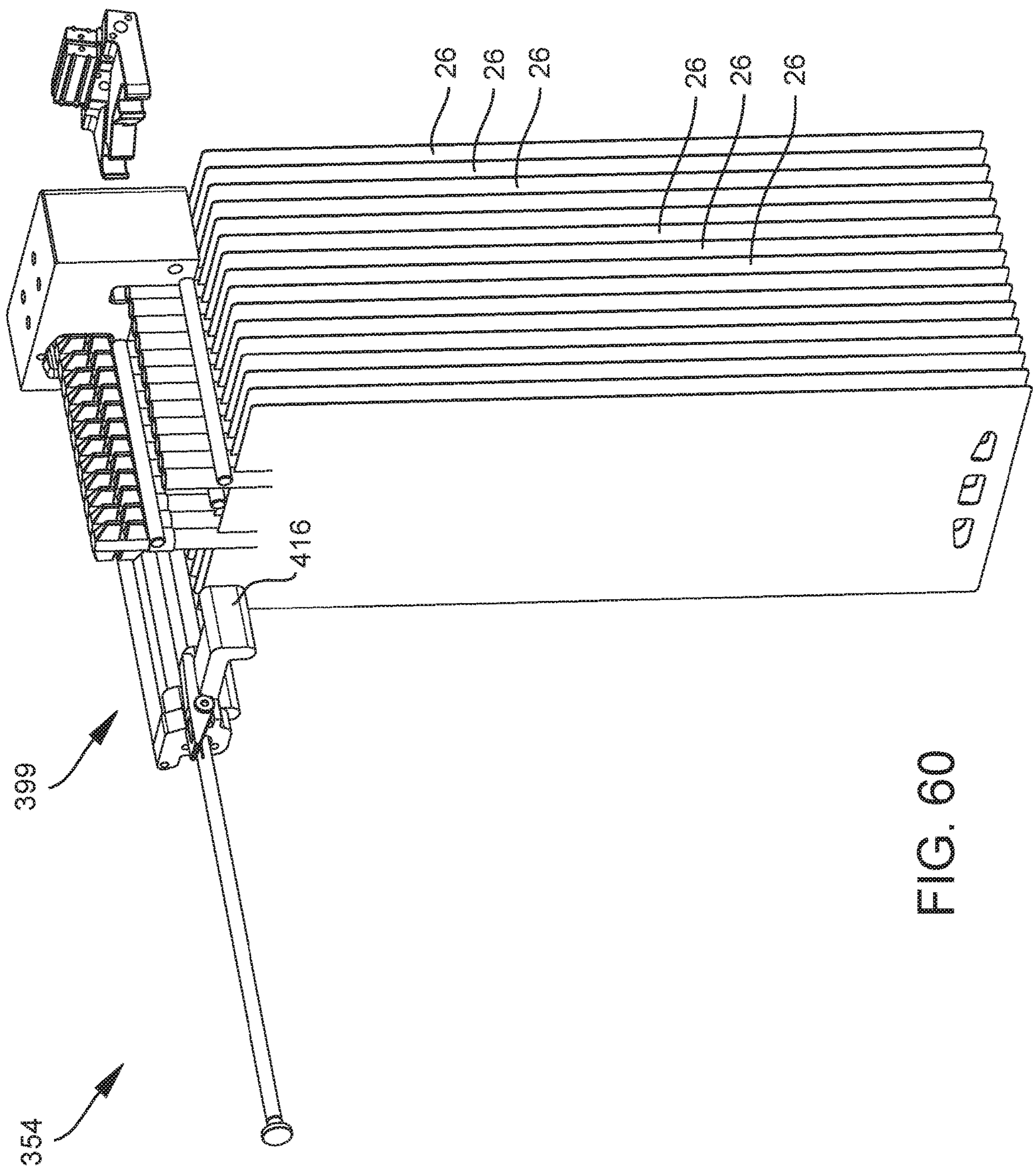
FIG. 60 depicts a perspective view of an example bag feeder fully loaded with bags.

Referring now to FIG. 60, the exemplary bag feeder 354 of FIG. 59 is shown fully loaded with bags 26. In the example embodiments, the bag feeder 354 has a capacity of sixteen bags 26, however, a greater or lesser number of bags 26 may be capable of being installed in alternative embodiments. Once full, and referring now also to FIG. 61, the latch 406 may be displaced out of engagement with the feed plate 396. The exemplary feed plate 396 may then, under force exerted by a bias member 401 (best shown in FIG. 64) connecting the feed plate 396 to the housing block 398, displace into contact with the last bag 26 in the bag feeder 354.

Figure 62:
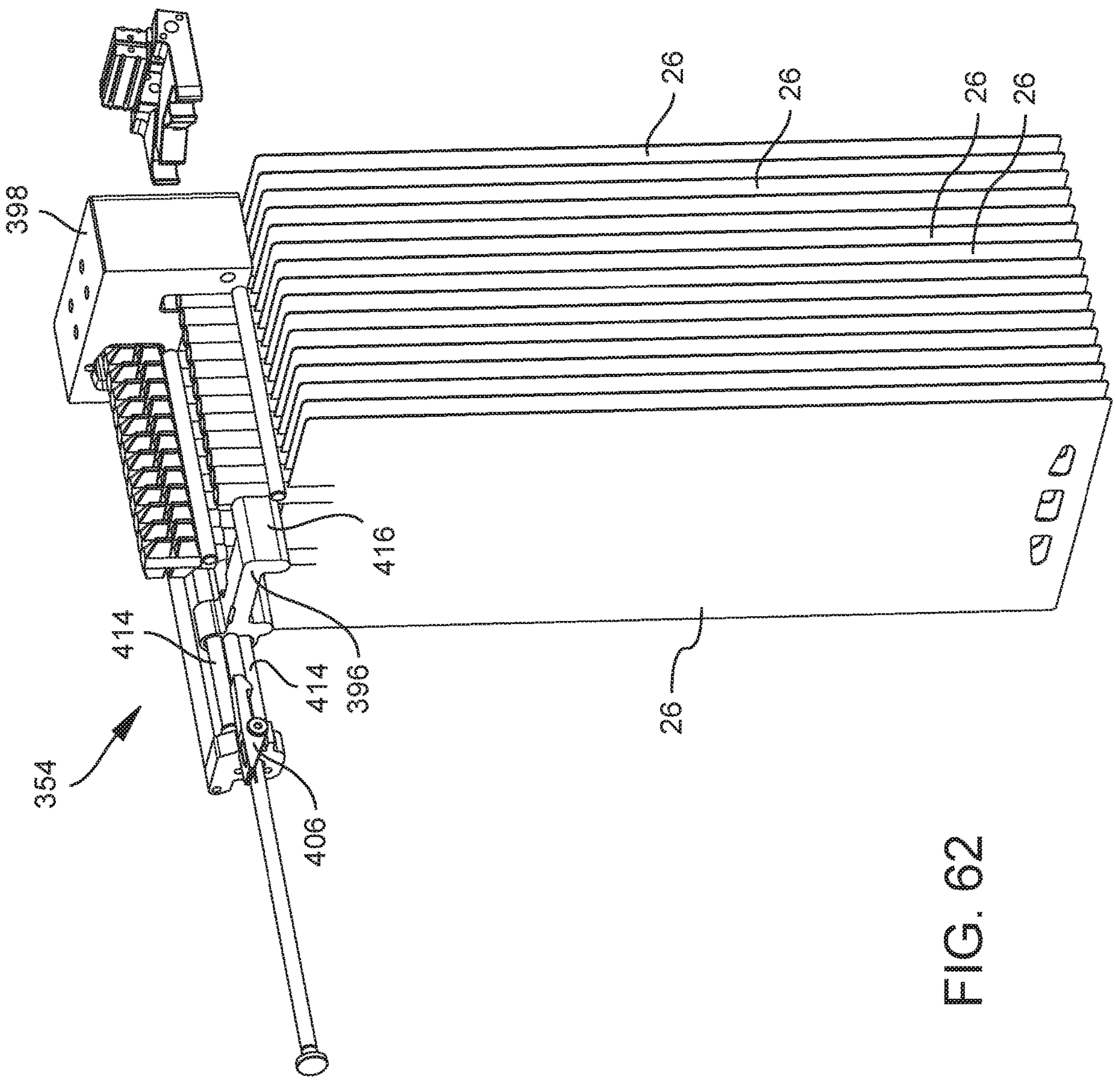
FIG. 62 depicts a perspective view of an example bag feeder with a feed plate of the bag feeder biased against ports of bags installed in the bag feeder.

Referring now to FIG. 62, the feed plate 396 is shown in position against the last bag 26 installed in the bag feeder 354. As shown, the feed plate 396 may slide along two elongate members 414. At least one of the elongate members 414 may also act as one of the rods forming one of the guides 390. The feed plate 396 may also include projections 416 which may be spaced so as to press against the ports 392 of the bags 26. This may help to ensure that the bags 26 are held in a compact and space efficient manner within the bag feeder 354. The projections 416 may be sized so as to fit within the slots of each guide 390. Additionally, the projections 416 may ensure that the last bag 26 loaded into the magazine portion 399 can advance an appropriate distance through the channels 400 in the housing block 398 when the feed plate 396 is displaced to the end of its displacement range along the elongate members 414. The feed plate 396 may be at an end of its displacement range when it is drawn up against a stop face 397 (see FIG. 59) of the housing block 398. The projections 416 may extend a distance which is at least equal to a distance from the stop face 397 to the retention pins 420 in some examples. In other examples the projections 416 may extend a distance which is equal to a distance from the stop face 397 to the retention pins 420 minus a percentage of the diameter of a port 392.

Figure 63:
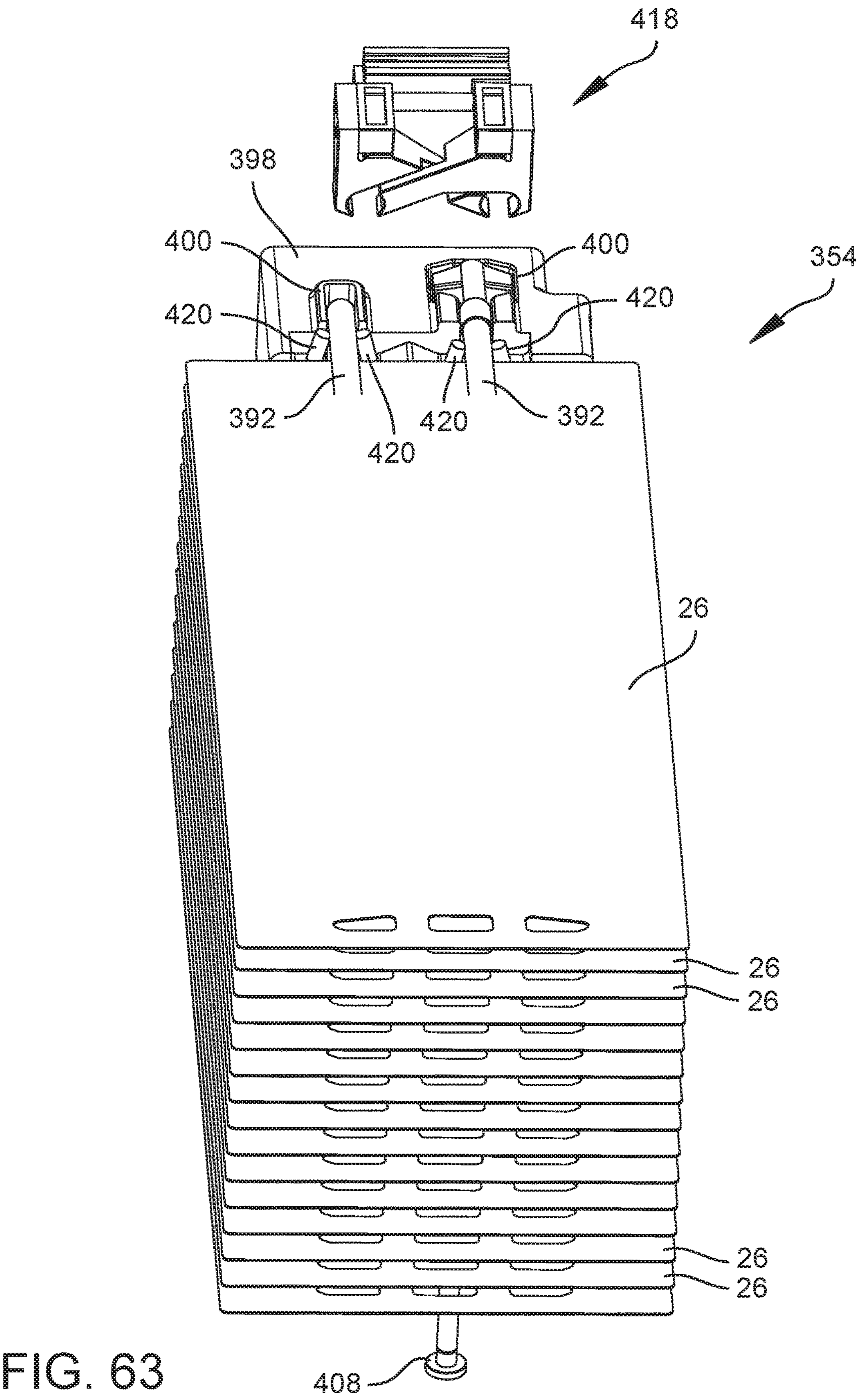
FIG. 63 depicts a bottom front perspective view of an example bag feeder having retention pins which hold bags in place within the bag feeder.

Referring primarily to FIG. 63, a gripper or grasper 418 attached to the robotic arm 360 (not shown for sake of illustration, see, e.g., FIG. 56) of the system 10 may collect bags 26 from the bag feeder 354 as needed. As shown, each of the guides 390 may be associated with one or more retention pins 420. The retention pins 420 may hold the foremost bag 26 in the bag feeder 354 against the force exerted by the feed plate 396. In the example embodiments, two retentions pins 420 on opposing sides of each channel 400 are included. The example retention pins 420 may be disposed to protrude into the path of bags 26 transiting through the channels 400 of the housing block 398 and obstruct passage of the ports 392 attached to each bag 26. In some embodiments, the retention pins 420 may be disposed at a 10-20° (e.g. 15°) angle with respect to the axis of the guides 390.

Figure 64:
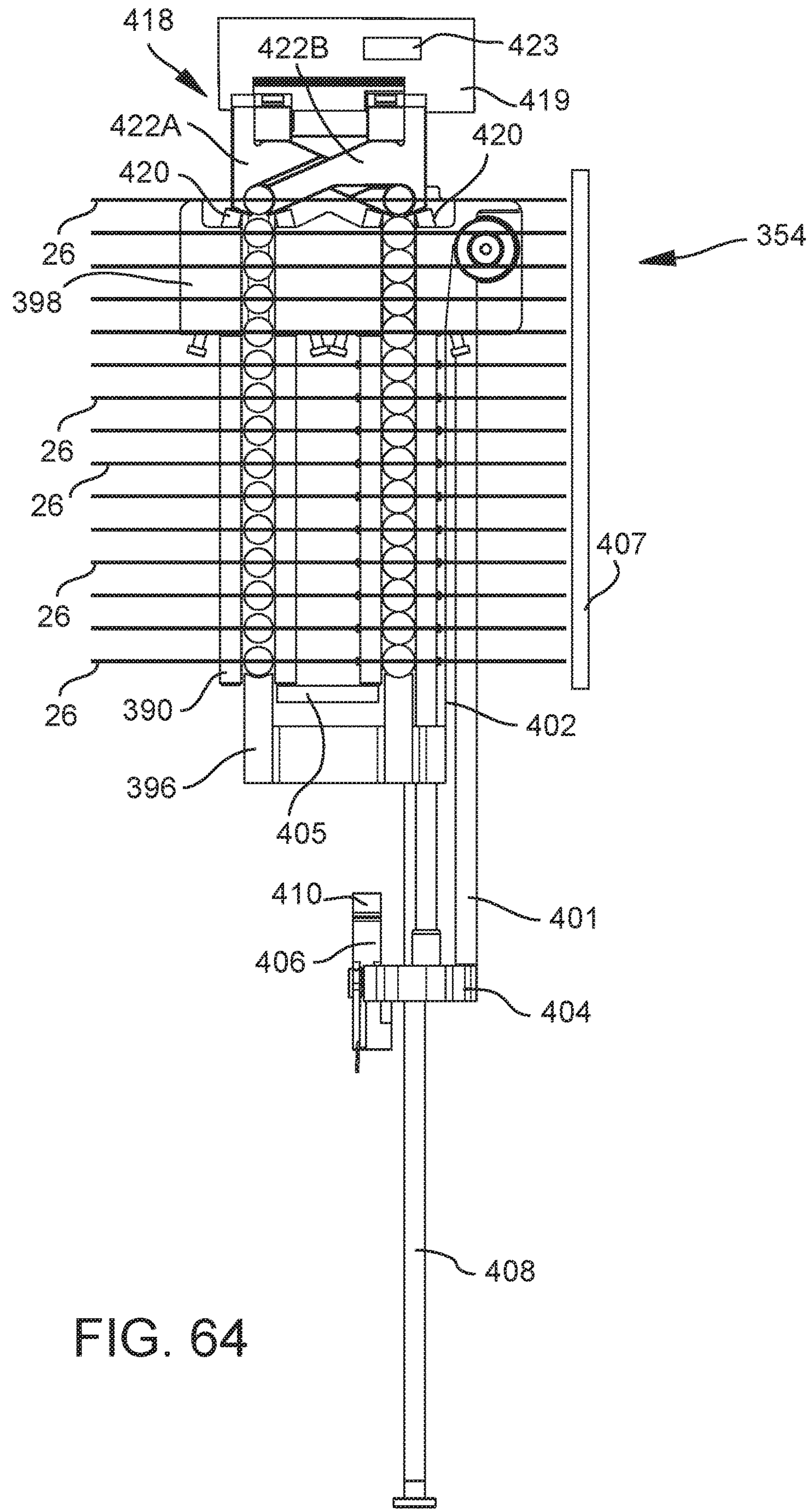
FIG. 64 depicts a bottom up view of an example bag feeder and an example grasper which has advanced to the bag feeder to retract retention pins of the bag feeder and collect a bag.

The retention pins 420 may be biased to an obstructing position, but may be displaceable to a withdrawn position where the retention pins 420 are at least partially pressed into the housing block 398 and out of interference with the transit path of the bags 26. In certain embodiments and as shown in FIG. 64, the grasper 418 may be configured such that, when open, the jaws 422A, B of the grasper 418 may be appropriately spaced so as to actuate the retention pins 420 from the obstructing position to the withdrawn position when the grasper 418 is advanced toward the bag feeder 354. When the grasper 418 is displaced to the bag feeder 354, the jaws 422A, B may press the retention pins 420 into a retracted state. The jaws 422A, B may support the fin 394 of the port 392 on the bag 26 such that the bag 26 does not fall when the retention pins 420 are retracted. The force exerted by the feed plate 396 may aid in pushing the foremost bag 26 into the grasper 418 jaws A, B. The coefficient of friction of the grasper 418 material and the ports 392 under the force exerted by the feed plate 396 may be sufficient to hold the bag 26 in place prior to closure of the jaws 422A, B. Similar retention pins 420 may be incorporated into the bag feeder 28 described in relation to FIGS. 54-55.

Figure 65:
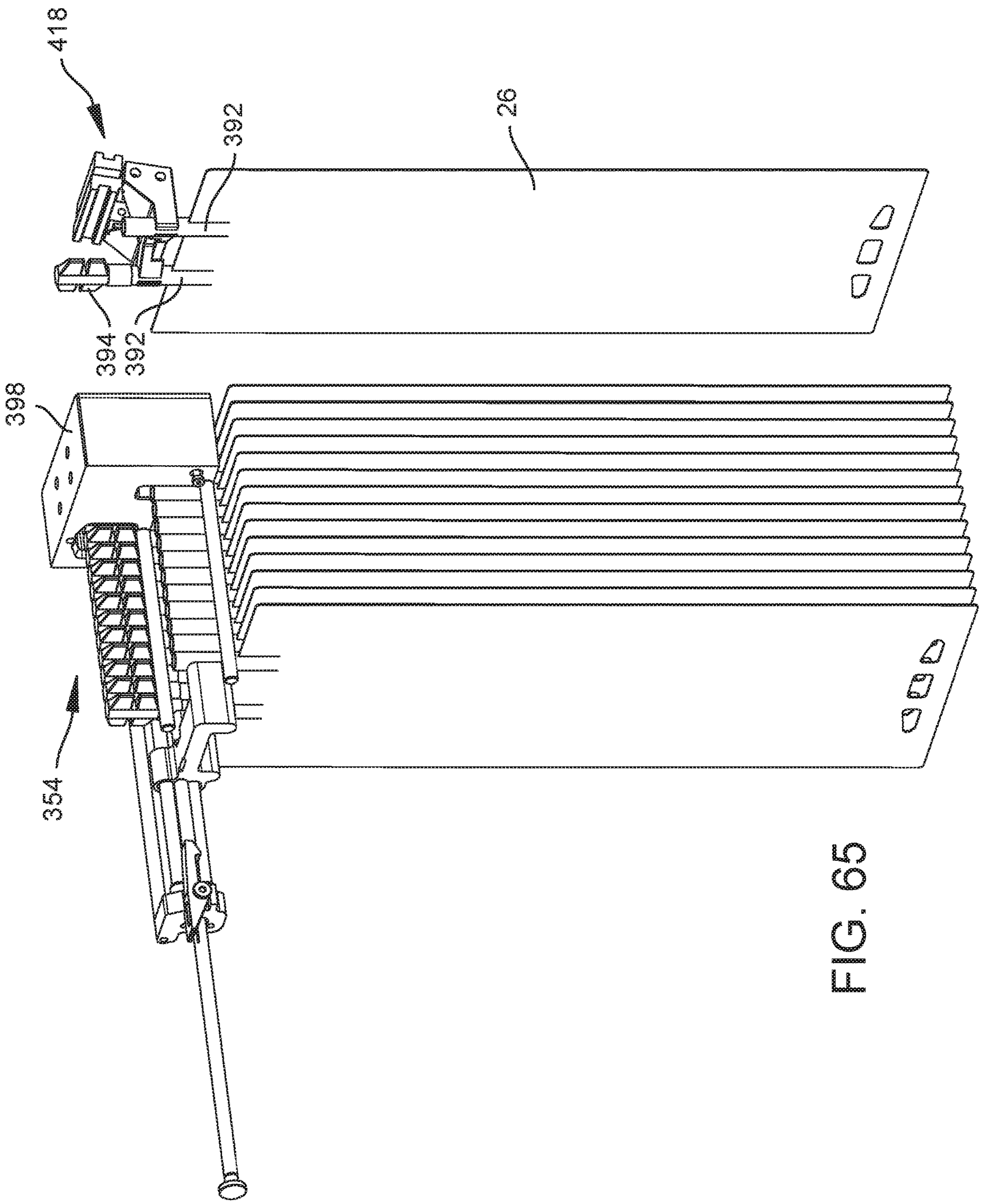
FIG. 65 depicts a perspective view of an example bag feed and an example grasper which is holding a bag collected from the bag feeder.

The grasper 418 may include a driver 419 which includes one or more actuator for displacing the jaws 422A, B. Additionally, a jaw position sensor 423 may be included. The jaw position sensor 423 may monitor the location of the jaws 422A, B via a magnetic field based sensor such as an inductive or hall effect sensor. The control system 15 of the system 10 may check the output of the jaw position sensor 423 to determine whether a bag 26 has been properly grasped by the grasper 418. In some embodiments, control system 15 may compare the position output of the jaw position sensor 423 to a predefined range of acceptable positions. In the event that the jaws 422A, B are displaced to an extreme of their displacement range (e.g. have fully closed) the control system 15 may deduce that the grasper 418 has missed the bag 26. If the jaws 422A, B displace outside of the predefined range, but not to an extreme of the displacement range, the control system 15 may deduce that the grasper has improperly grasped (e.g. only partially grasped a segment of a port 392 as opposed to closing around the port 392 as shown in FIG. 65). When the control system 15 determines that the position output of the jaw position sensor 423 is out the predefined range, the control system 15 may command the grasper 418 to retry. There may be a cap on the number of allowed retries before the control system 15 may generate an error. Though the jaw position sensor 423 may be monitored when a bag 26 is retrieved from a bag feeder 354, the control system 15 may also perform this check any other time a bag 26 is grasped 418 within the system 10.

Referring now primarily to FIG. 65, once the jaws 422A, B are closed around the ports 392, the foremost bag 26 may be removed from the bag feeder 354 and displaced to, for example, a filling station 356 by the robotic arm 360 (only the gripper 418 of the robotic arm 360 is shown for ease of illustration). The feed plate 396 may advance under the force of the bias member 401 (best shown in FIG. 64) attaching it to the housing block 398. Additionally, the retention pins 420 may be urged back to an obstructing position as the gripper 418 is displaced away from the bag feeder 354. Thus the next bag 26 in the bag feeder 354 may be advanced and ready for collection by the gripper 418.

Figure 66:
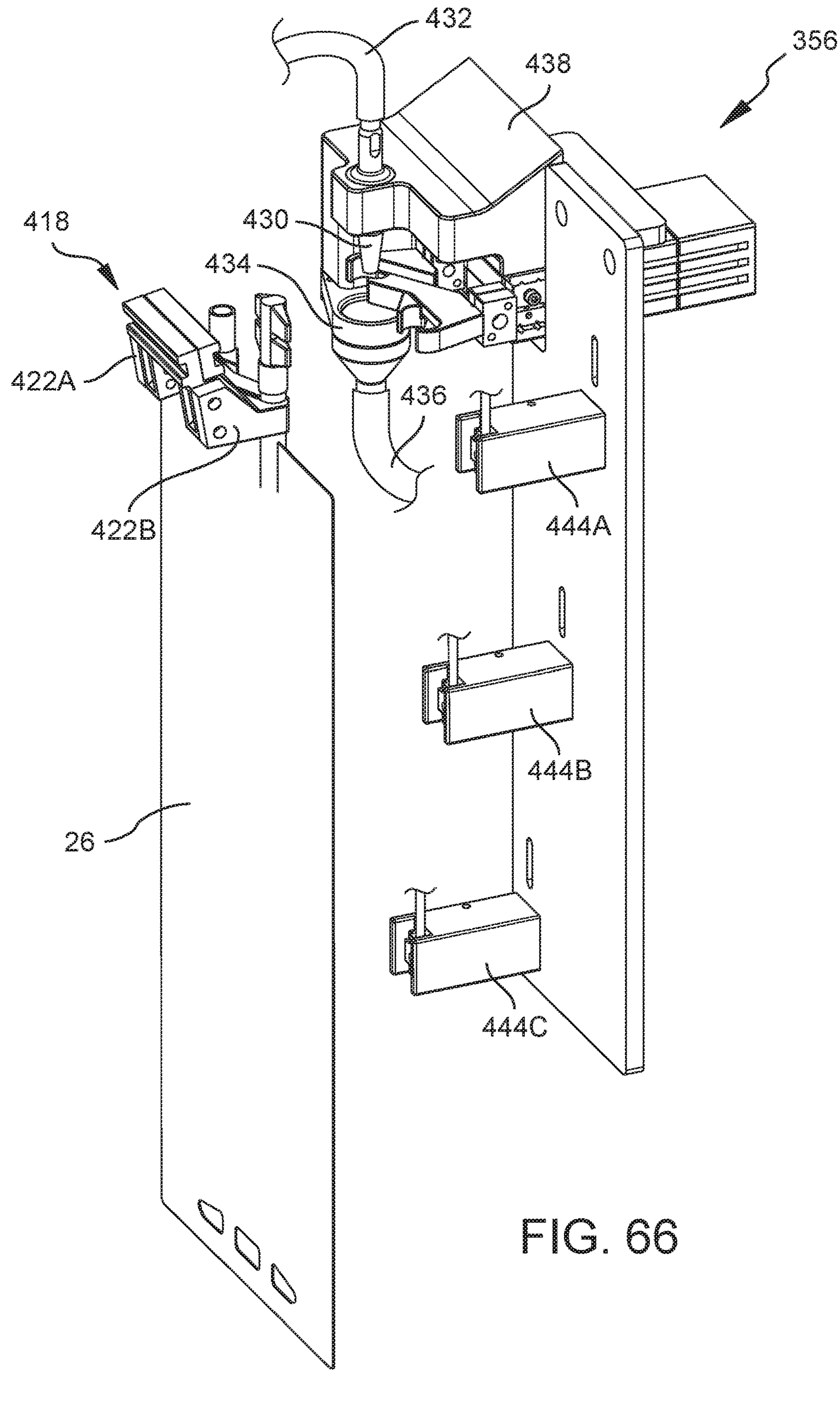
FIG. 66 depicts a perspective view of an exemplary bag filling station.

Referring now to FIG. 66, an exemplary filling station 356 is depicted. As shown, a filling station 356 may include a fill nozzle 430 which may be connected to a fluid input line 432. The fluid input line 432 may carry purified water or a mixed fluid (e.g. saline) that has passed through the sensor suite 350 and deemed to be acceptable. The fill nozzle 430 may be disposed above and in alignment with a drain 434. The drain inlet 434 may include a tapered funnel like opening which leads to a drain conduit 436. As shown, the drain conduit 436 has a larger diameter than the fluid input line 432. In the example, the drain conduit 436 diameter may be three times that of the fluid input line 432. This may help to ensure that the drain conduit 436 has the capacity to carry undesired flow or drips from the fill nozzle 430.

The fill station 354 may also include a back plate 442 which extends from a fill station housing block 438. The back plate 442 may include a number of mounting points for bag characteristic sensors 444A, B, C. The bag characteristic sensors 444A-C may be any suitable sensor capable of collecting data on differentiating traits of various bags which may be utilized with the system 10. The bag characteristic sensors 444A-C may sense presence or absence of bag 26 material, color, shape, size, etc. Preferably, the bag characteristic sensors 444A-C are sufficient to identify at least the volume of the bag 26 in place at the filling station 356. Thus the bag characteristic sensors 444A, B, C may form a reservoir volume sensing assembly in some examples.

In the exemplary embodiment, the bag characteristic sensors 444A-C are positioned so as collect information sufficient to determine the type of bag 26 being docked on the filling station 356. The exemplary bag characteristic sensors 444A-C may, for instance, be beam break or reflection based sensors which can determine the presence or absence of bag material in their vicinity. In the example embodiments, a bag presence detector 444B is included and may determine whether a bag 26 has been docked in the fill station 354. The bag presence detector 444B may be mounted on the back plate 442 in a position where it may detect any of a variety of types of bags 26 (e.g. mini-bag to a liter or more capacity) which may be used in the system 10. The filling station 356 may be inhibited from dispensing liquid via the control system 15 in the event that the bag presence detector 444B does not detect a bag 26 is in place at the fill station 356. A bag width detector 444A may be included and mounted at a location on the back plate 442 where it may detect whether the width of a bag 26 is greater than a certain value. The width detector 444A may be placed more proximal the filling nozzle 430 so as to ensure any bag 26 with a width greater than a threshold width value (regardless of its length) will be picked up by the width detector 444A. A bag length detector 444C may be mounted on the back plate 442 in a location where it may detect whether the bag 26 is longer than a certain value. The bag length detector 444C may be disposed most distal to the fill nozzle 430. Based on the data collected by the bag characteristic sensors 444A-C, the control system 15 may determine the type of bag 26 docked in the filling station 356. The control system 15 may, for example, determine the intended fill volume of the bag 26 based on data collected from the bag characteristic sensors 444A-C and ensure that the bag 26 is not overfilled. A look-up table or the like may be used to determine the intended bag 26 fill volume based on the output of each of the bag characteristic sensors 444A-C. Other embodiments may include additional bag characteristic sensors 444A-C. For example, certain embodiments may include additional width or length detectors 444A, C to provide additional data related to bag 26 dimensions. In some embodiments each bag characteristic sensor 444A-C may be accompanied by a redundant sensor.

Figure 67:
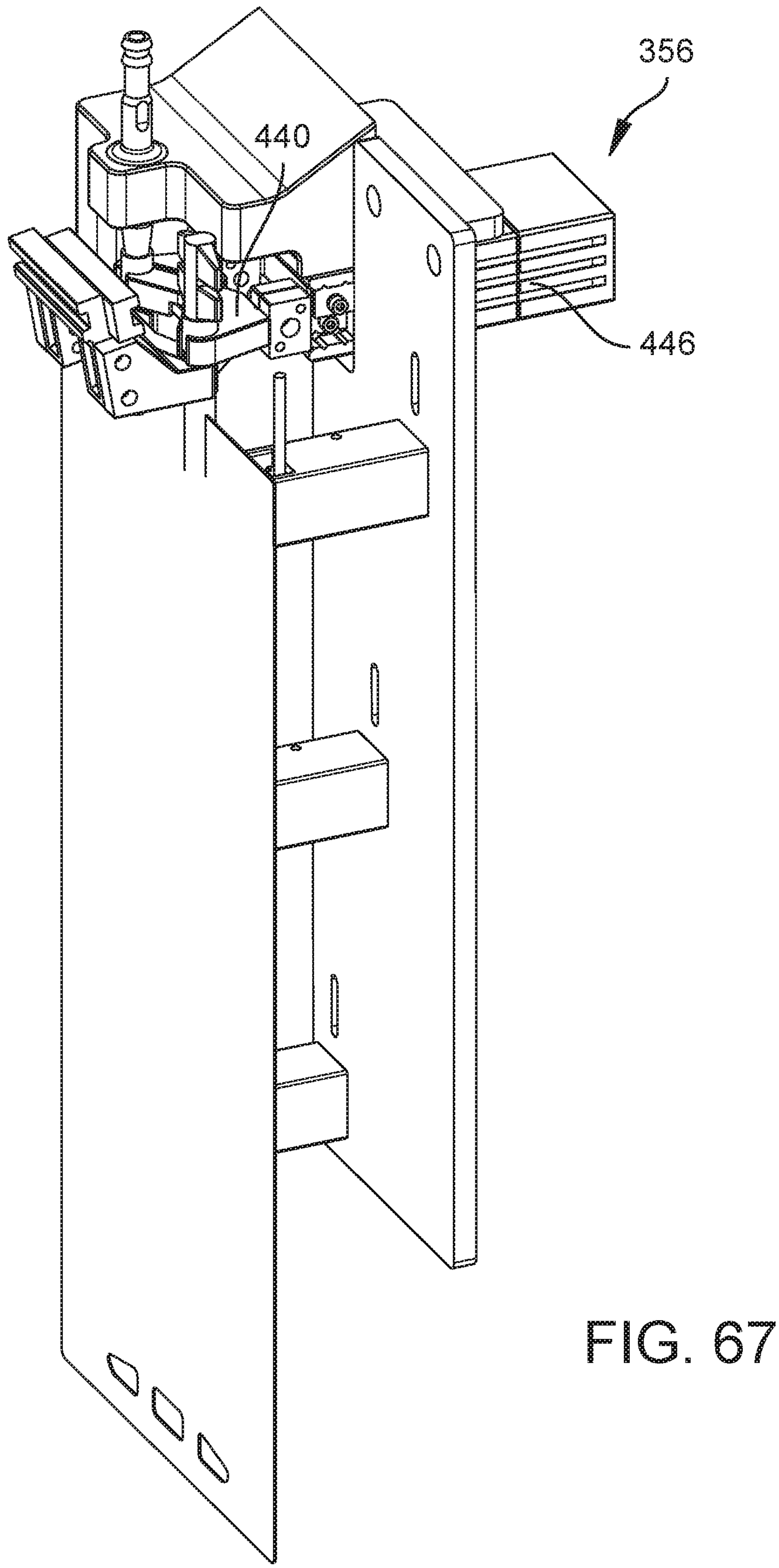
FIG. 67 depicts perspective view of an exemplary bag filling station with an unfilled bag being docked at the filling station.

In the example embodiment, the drain inlet 434 and attached drain conduit 436 may be pivotally or otherwise displaceably coupled to the fill station housing block 438. As a bag 26 is introduced to the filling station 356 with the grasper 418, the jaws 422A, B of the grasper 418 may drive the drain inlet 434 and drain conduit 436 to a retracted position. As shown in FIG. 67, the filling station 356 may include a fill station grasper 440. The fill station grasper 440 may be opened by a grasper driver 446 to accept the ports 392 of the bag 26 and driven closed once the robotic arm 360 (see, e.g., FIG. 56) has displaced to preprogrammed bag 26 docking coordinates. Coordination of the fill station grasper 440 and the robotic arm 360 may be orchestrated by the control system 15.

Figure 68:
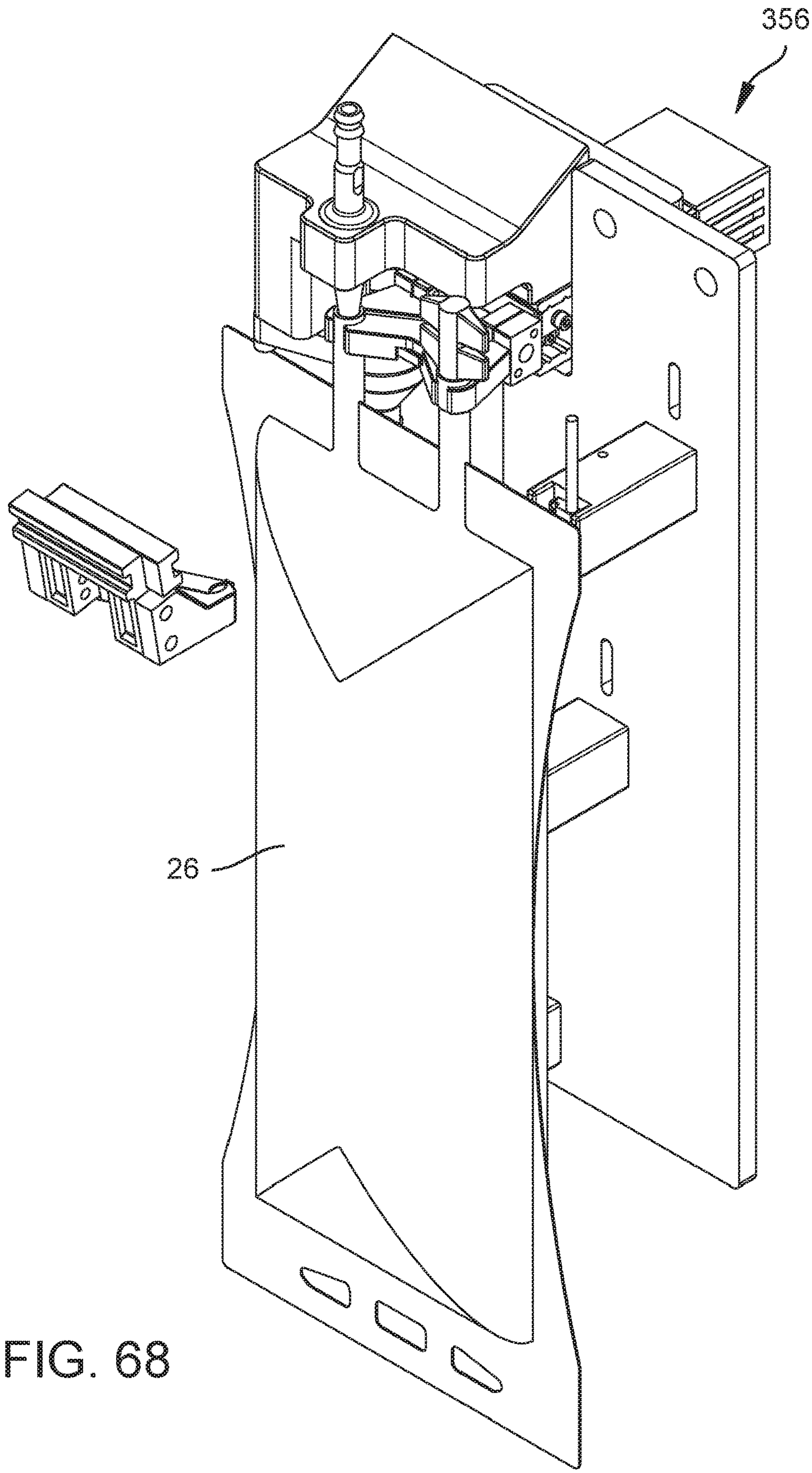
FIG. 68 depicts a perspective view of an exemplary bag filling station having a filled bag docked at the filling station.
Figure 69:
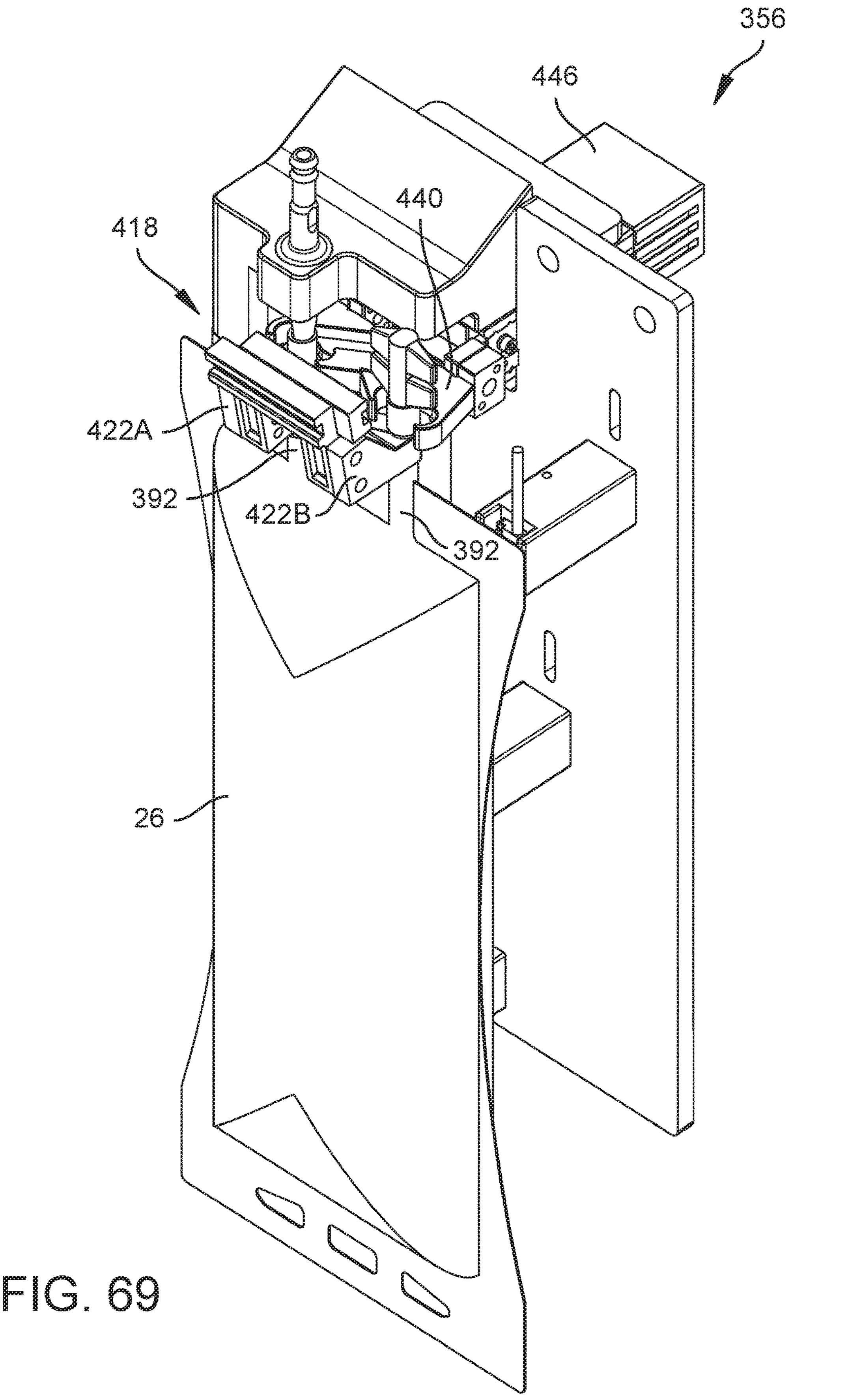
FIG. 69 depicts a perspective view of an exemplary bag filling station and an example grasper which has been advanced to the filling station to collect a filled bag from the filling station.

As shown in FIG. 68, the grasper 418 attached to the robotic arm 360 (see, e.g., FIG. 56) may be displaced away from the filling station 356 during filling of a bag 26. The grasper 418 may be used to perform other operations within the enclosure 12 as the bag 26 docked on the filling station 356 is filled. For example, the grasper 418 may be used to retrieve, label, and dispense finished bags 26 from the quarantine repository 362 while a bag 26 is being filled at the filling station 356. Once a bag 26 has been filled to the desired amount (e.g. as indicated by one or more flow meter in the sensor suite 350), the grasper 418 may return and collect the filled bag 26 from the fill station 354. As shown in FIG. 69, the jaws 422A, B of the grasper 418 may be actuated closed around the ports 392 of the filled bag 26 and the fill station grasper 440 may be driven open by the grasper driver 446. In certain embodiments, the robotic arm 360 may not be displaced away from the fill station 356 under various circumstances. For example, where a small 100 mL bag 26 is to be filled, the robotic arm 360 may stay in place as the fill time for the bag 26 should be miniscule. Where a large bag 26 (e.g. a few liters) is filled, the grasper 418 may be displaced away from the fill station 356 as the fill time may have a duration which would allow the robotic arm 360 to complete one or more other task.

Figure 70:
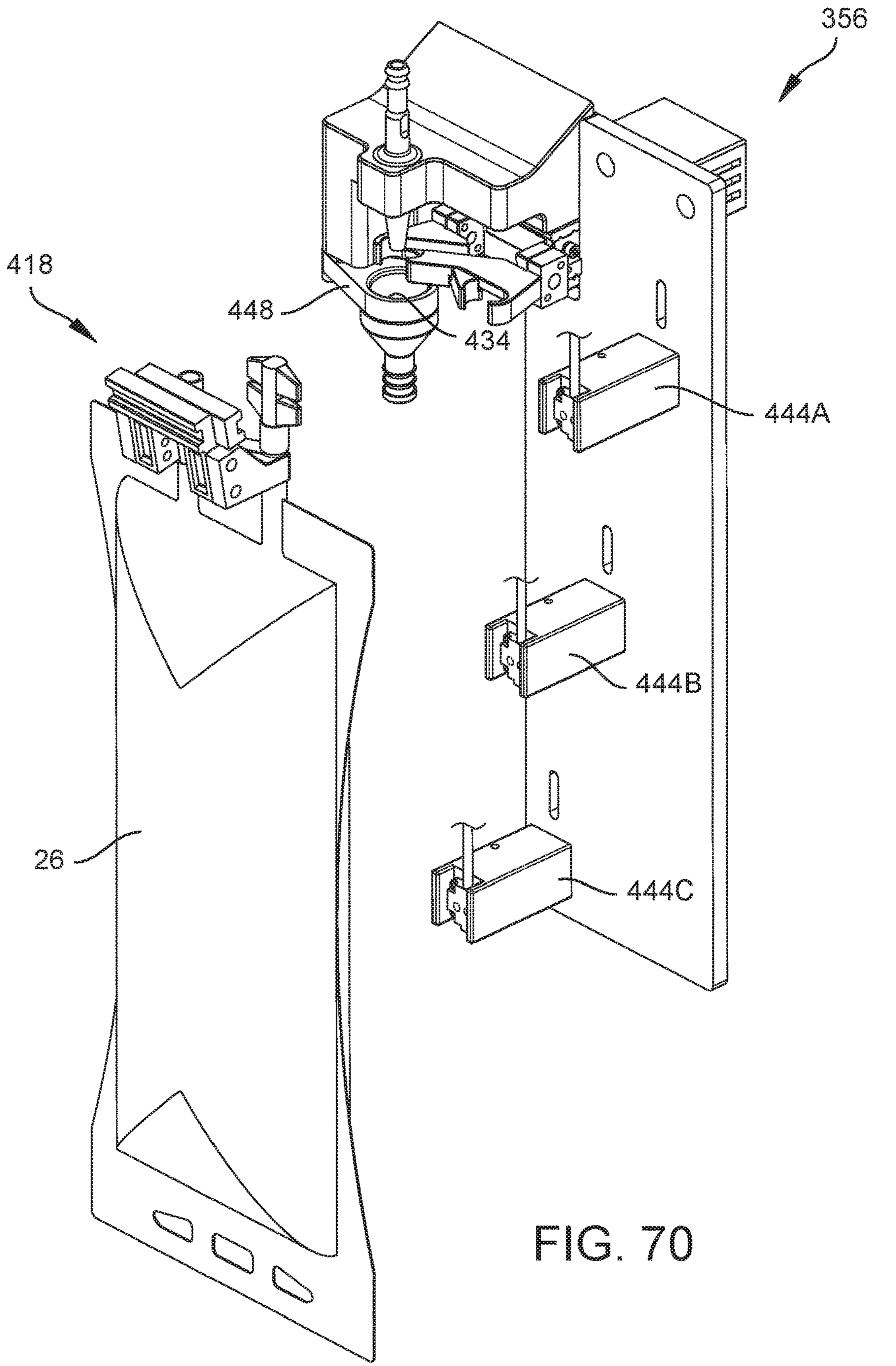
FIG. 70 depicts a perspective view of an example grasper holding a filled bag as well as a filling station with a pivotal drain inlet which is aligned with a filling nozzle of the filling station.

Referring now to FIG. 70, the grasper 418 may remove the filled bag 26 from the filling station 356. The filled bag 26 may be brought to the sealing station 358 after retrieval from the filling station 356. As shown, the drain inlet 434 may automatically return into alignment with the filling nozzle 430 when the bag 26 is collected from the filling station 356. A bias member (see. e.g., bias member 454 of FIG. 71B) may be included to facilitate this automatic return of the drain inlet 434 to the aligned position.

Figure 71A:
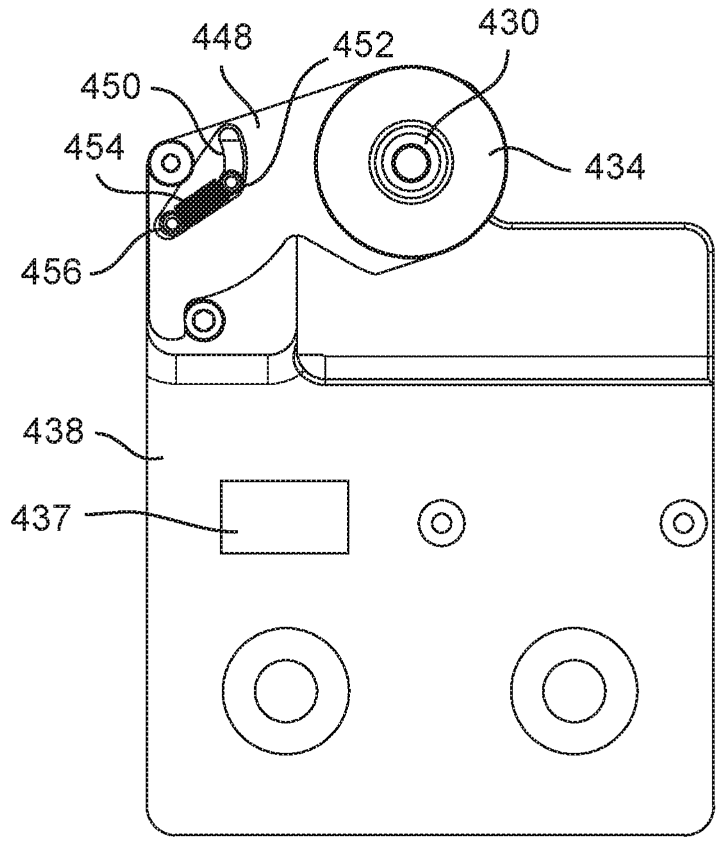
FIGS. 71A-B depict top down views of a portion of a filling station have a biased drain inlet.
Figure 71B:
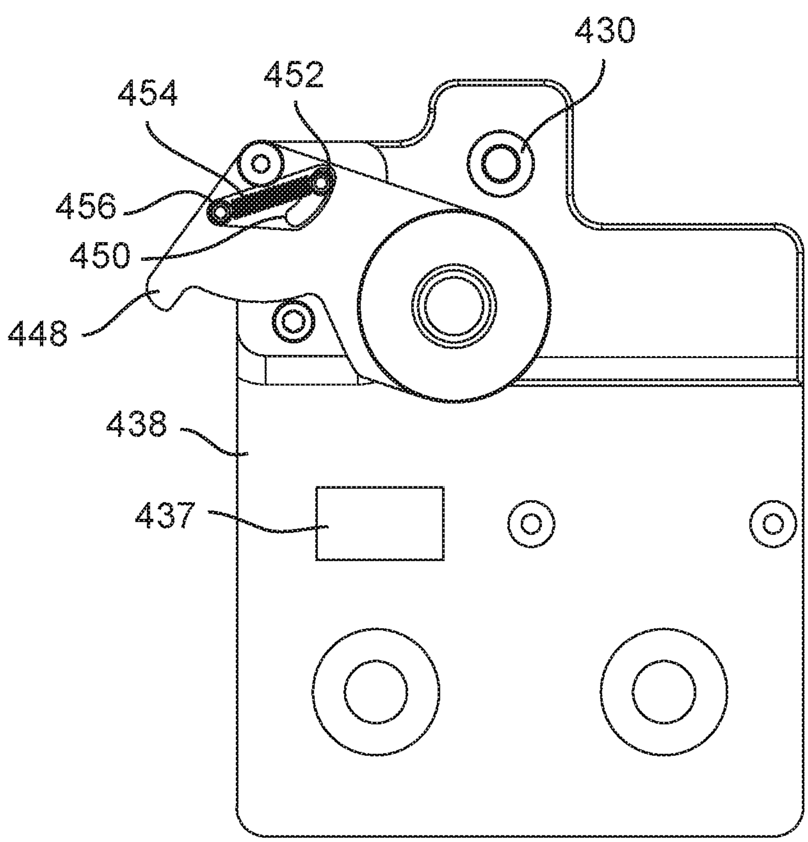

Referring now also to FIGS. 71A and 71B, the drain inlet 434 may be attached to a flange 448 which may pivotally mount the drain inlet 434 to the filling station housing block 438. The flange 448 may include a track 450 within which a pin 452 extending from the filling station housing block 438 is disposed. As the pin 452 within the track 450 is attached to the filling station housing block 438, the pin 452 may remain stationary. At least one bias member 454 may be coupled to the pin 452 as well as to a mount pin 456 included on the flange 448. The mount pin 456 may be displaceable with the flange 448 and drain inlet 434. In the example, one bias member 454 is depicted and is shown as an extension spring, though other types of bias members 454 may be used in alternative embodiments. As shown, when the drain inlet 434 is displaced, the track 450 may ride along the stationary pin 452. The distance between the mount pin 456 and the stationary pin 452 may increase and the bias member 454 may be extended (see, e.g., FIG. 71B). As the bias member 454 restores (e.g. after the bag 26 has been filled and removed, the track 450 may ride along the pin 452 until the distance between the two pins 452, 456 is minimized or the bias member 454 returns to a resting state. As shown, this may automatically pivot the drain inlet 434 back to an aligned state with respect to the fill nozzle 430 (see, e.g., FIG. 71A).

As shown, the filling station 356 may include a drain inlet sensor 437. The drain inlet sensor 437 may monitor the location of the drain inlet 434. The drain inlet sensor 437 may be any suitable sensor, for example a magnetic field sensor such as an inductive sensor or hall effect sensor. In some embodiments, the drain inlet 434 or flange may include a magnetic or metallic body which is monitored by the drain inlet sensor 437. The drain inlet sensor 437 may alternatively be an optical sensor. The control system 15 may receive an output signal from the drain inlet sensor 437 and ensure that the drain inlet 434 is disposed in an expected position. For example, the control system 15 may verify that the drain inlet 434 returns to an aligned state with respect to the filling nozzle 430 after a bag 26 has been filled and removed. Additionally, the control system 15 may check the output of the drain inlet sensor 437 to ensure that the drain inlet 434 is in the aligned state under the filling nozzle 430 prior to commanding a flush of the filling nozzle 430 or a disinfect of the fluid circuit. During disinfection, hot purified water may be delivered through the fluid circuit and discarded through the filling nozzle 430 into the drain inlet 434.

Figure 72:
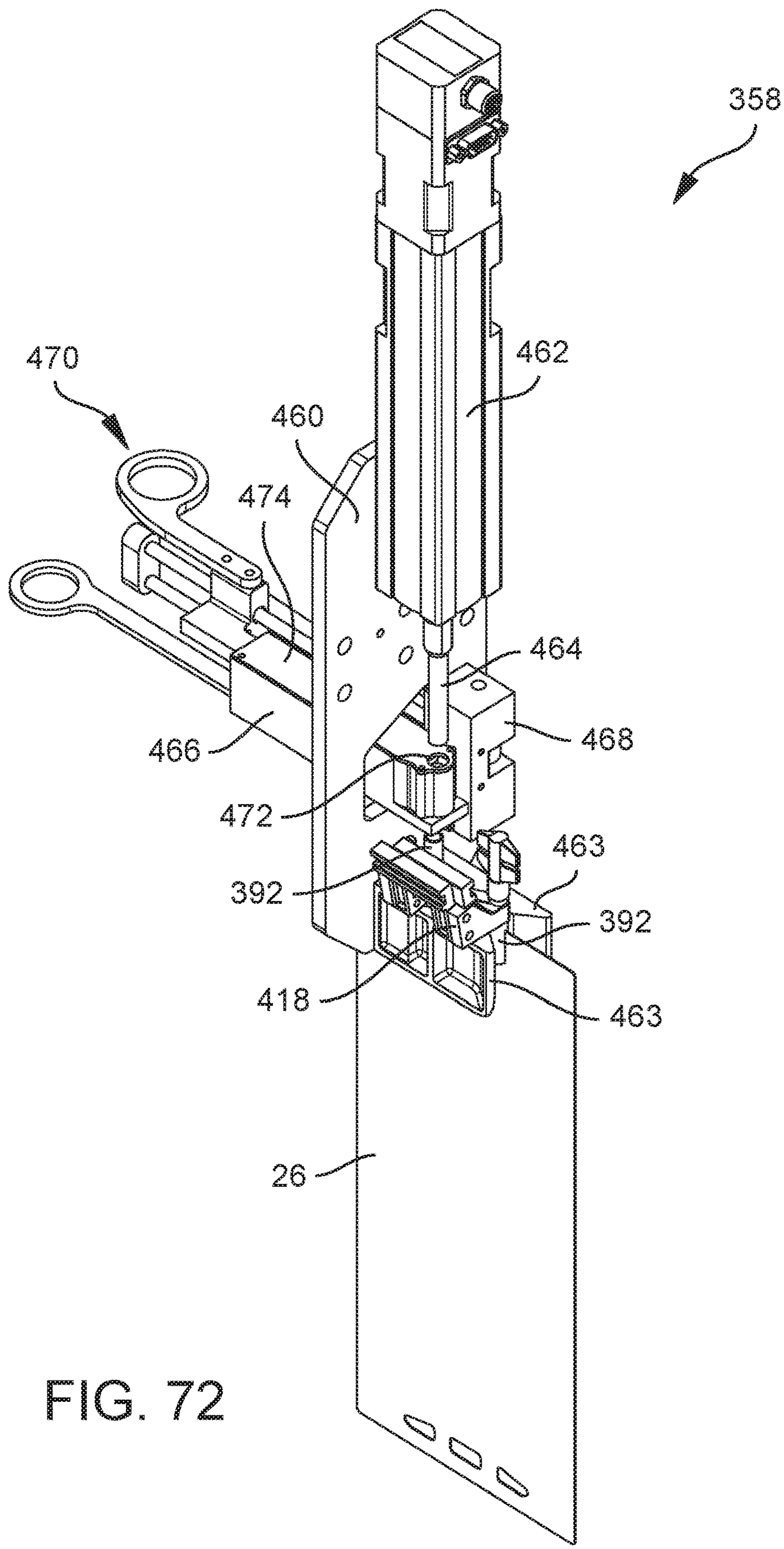
FIG. 72 depicts a perspective view of an example sealing station having a stopper dispenser installed therein.

Referring now to FIG. 72, an example embodiment of a sealing station 358 is shown. As shown, the sealing station 358 may include a base plate 460. A ram driver 462 may be mounted to the base plate 460. The ram driver 462 may effect displacement of a ram 464 which may drive a stopper into a port 392 of a bag 26. In some embodiments, the ram driver 464 may be capable of exerting at least 100 lbs of force against a stopper 476 during stoppering of bags 26. A rest 463 may be attached to the base plate 460. A grasper 418 holding a bag 26 may be docked on a docking face (e.g. top face) of the rest 463 during sealing of the bag 26 so as to buttress the grasper 418 against the force exerted by the ram driver 462. In the example embodiment, the rest 463 is depicted as a metal shelf though any suitable material may be used. In the example, two rests 463 are shown. The rests 463 may also act as guides. As shown, the two rests 463 may be spaced apart by a gap which may allow a bag 26 to be positioned between the rests 463. A bag 26 may be displaced into this gap to aid in positioning of the bag 26 port 392 in alignment with the axis of displacement of the ram 464.

A stopper dispenser which in the example embodiment which is depicted as a stopper magazine 466 is also included in the example sealing station 358. The stopper magazine 466 may dock into a magazine receptacle 468 in the sealing station 358. The stopper magazine 466 may include an opening 472 which is aligned and sized to allow passage of the ram 464 when the stopper magazine 466 is in place at the magazine receptacle 468. A follower assembly 470 may be included to automatically advance stoppers through the stopper magazine 466 as stoppers are dispensed.

Figure 73:
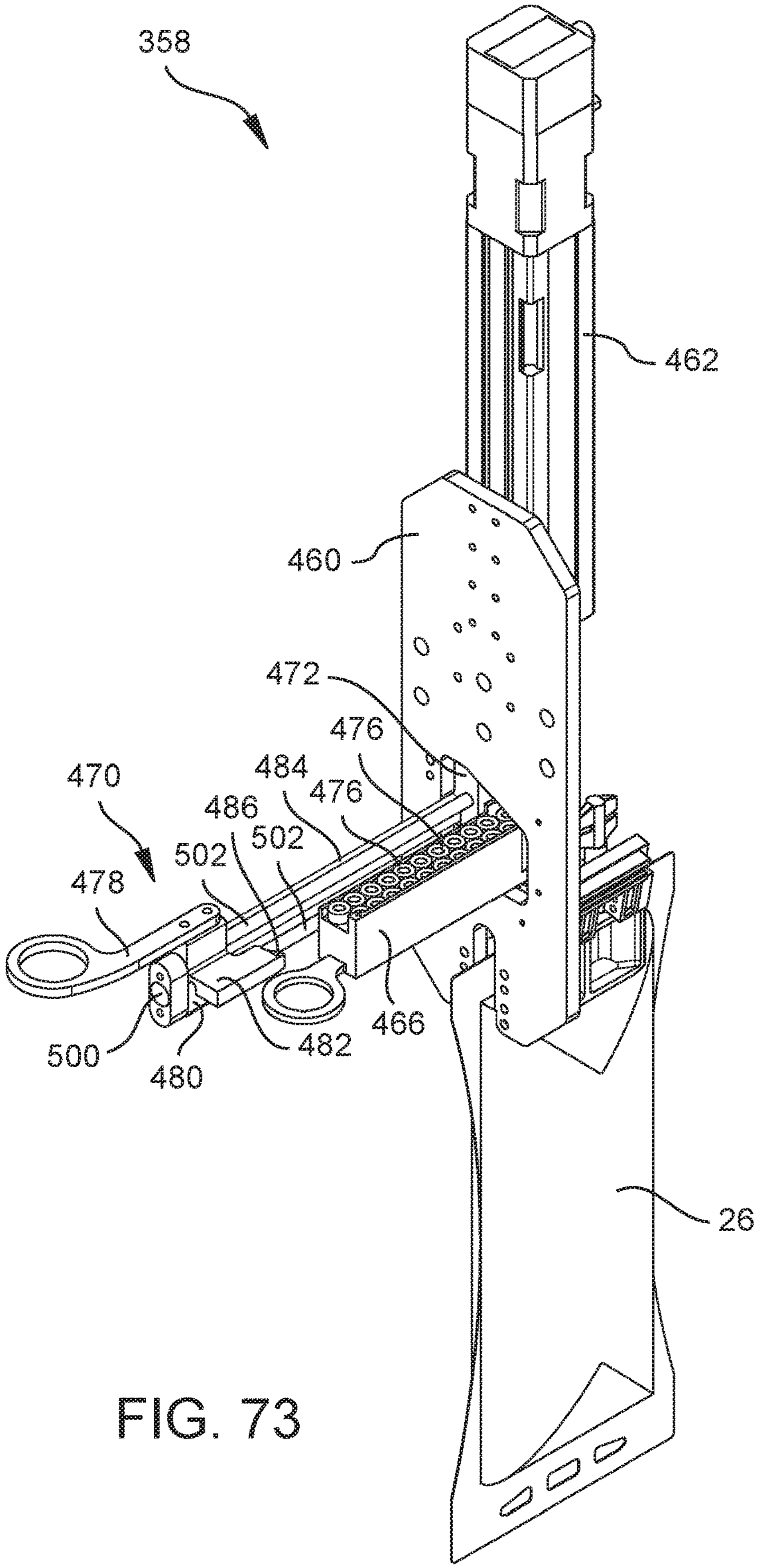
FIG. 73 depicts a perspective view of an example sealing station having an example follower assembly which is disposed in a retracted position.

Referring now to FIG. 73, in the example embodiment, the stopper magazine 466 may be provided in a preloaded state. The stopper magazine 466 may be packaged clean and sterile within an over pack 60 which is opened in the antechamber of the system 10. In the example embodiment, the stopper magazine 466 has a capacity of 22 stoppers 476, however, in other embodiments, the capacity of the stopper magazine 466 may be less or may be greater. In the example embodiment, a cover plate 474 (see, e.g. FIG. 72) has been removed so as to shown the stoppers 476. After removing the stopper magazine 466 from its over pack 60, the stopper magazine 466 may be docked onto the magazine receptacle 472. In certain embodiments, the magazine receptacle 472 may accept a variety of different stopper magazine 466 varieties. For example, certain embodiments may have a magazine receptacle 472 capable of accepting any of the stopper magazines 466 shown and described herein. This may allow a user to use stopper magazines 466 of differing capacities as desired. In some embodiments, the stopper magazine 466 may not be a removable magazine. Instead, a fixed magazine may be included which is loaded manually or with the assistance of a speed loader while in place on the base plate 460 by an operator of the system 10.

To load the example stopper magazine 466 into the sealing station 358, the follower assembly 470 may be retracted by the user. As shown, the follower assembly 470 may include a handle 478. The handle 478 may allow a user to easily pull the follower 482 of the follower assembly 470 into a loading state via the gloved interface 352. In some embodiments, a latch similar to that shown in FIG. 59 may be included to retain the follower assembly 470 in the open state. When the follower assembly 470 is in a loading state, the follower 482 may be displaced to a point where sufficient clearance is present to mate the stopper magazine 466 in place on the magazine receptacle 472.

The handle 478 may be coupled to a follower block 480. The follower block 480 may include a follower 482. The follower block 480 may be coupled to the magazine receptacle 472 via a bias member 484. In the example embodiment, the bias member 484 is depicted as a constant force spring, however, in other embodiments, other types of bias members 484 may be used. The bias member 484 may exert a force against the follower block 480 which maintains the follower 482 in intimate contact with the last stopper or stoppers 476 in the stopper magazine 466. The follower block 480 may displace along one or more follower guides 502 which constrain movement of the follower 482 along a prescribed path. In the example embodiment an end block 504 is included on the end of the guides 502 most distal to the magazine receptacle 472. The end block may include a magnet 500. The magnet 500 may interact with a metallic portion of the follower block 480 so as to retain the follower assembly 470 in an open position while loading of the stopper magazine 466 occurs.

The example stopper magazine 466 is shown as a multi-column magazine. The follower 482 includes a staggering projection 486 which extends from the stopper contacting portion of the follower 482. The staggering projection 486 may aid in ensuring orderly feeding of stoppers 476 as the stopper magazine 466 depletes. The staggering projection 486 may encourage stoppers 476 in one column to be offset from stoppers 476 in an adjacent column. This may aid in preventing jamming and facilitate movement of a single stopper 466 from the multiple columns to the opening 472 (see, e.g., FIG. 72) in the stopper magazine 466.

Figure 74A:
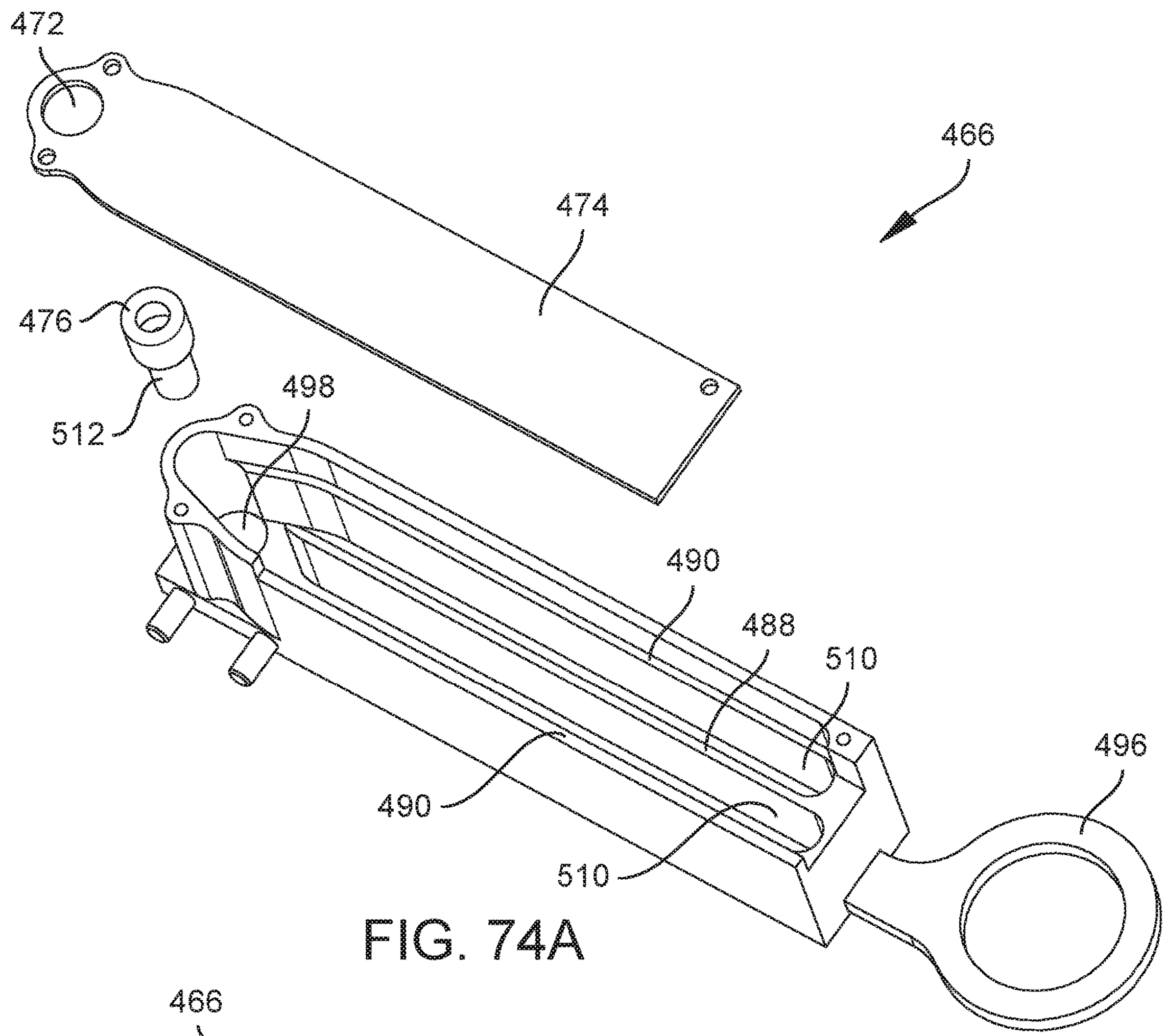
FIGS. 74A-B depict perspective views of an example stopper dispenser.
Figure 74B:
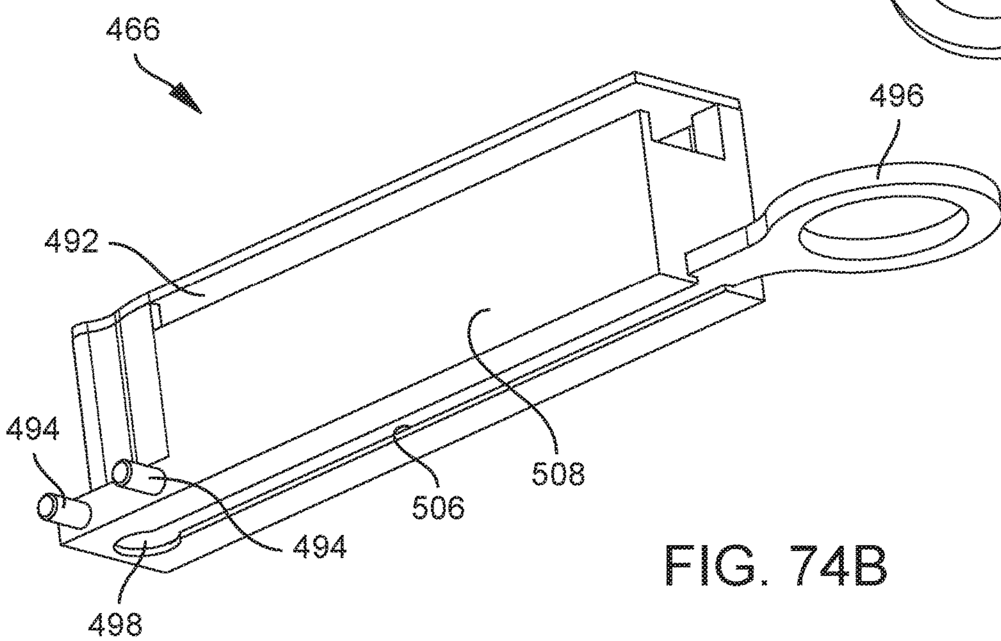

Referring now also to FIGS. 74A and 74B, views of the example stopper magazine 466 are shown. As shown, the stopper magazine 466 may include a magazine body 508. The magazine body 508 may include a number of stopper troughs 510 recessed therein. A divider wall 488 may separate and partially define each trough 510. The stopper magazine 466 may also include ridges 490 which flank each trough 510. Any divider wall(s) 488 and the ridges 490 may be at an even height with one another. In some examples, the stoppers 476 may include sections of varying diameter. The ridges 490 and dividing wall 488 may have a height which is selected such that a step region 512 on the stopper 476 where the stopper 476 transitions to a larger diameter may ride along the top face of the ridges 490 and the dividing wall 488. As shown, the stopper magazine 466 may also include a slit 492. The slit 492 may allow for passage of a portion of the follower assembly 470 including the follower 482 to pass into the stopper magazine 466 and displace within the stopper magazine 466.

In the example embodiment, the stopper magazine 466 includes mating features which may facilitate mounting of the stopper magazine 466 onto the magazine receptacle 472. In the example embodiment, two mounting or mating pins 494 are included in the stopper magazine 466. These mating pins 494 may be received in alignment holes within the magazine receptacle 472. In certain embodiments, the mating pins 494, a portion of the alignment holes, or both may be magnetic. This may allow a stopper magazine 466 to be magnetically coupled into place in the magazine receptacle 472. The magazine receptacle 472 may also include a magazine sensor 473 (see, e.g., FIG. 77B). A hall effect or inductive sensor which may register proper mating of the stopper magazine 466 in the magazine receptacle 472 may be used in some examples. Other types of sensors such as micro switches, optical sensors, button type sensors, etc. may also be used to monitor whether a stopper magazine 466 is mounted in the magazine receptacle 472. In some embodiments, a magnetic body for sensing by a magnetic magazine sensor 473 may be include elsewhere in a stopper magazine 466. In some embodiments, the control system 15 of the system 10 may not allow displacement of the ram 464 unless the magazine sensor 473 indicates a stopper magazine 466 is mounted in the magazine receptacle 472.

Referring now also to FIGS. 75-77B, a stopper magazine 466 may include a blocking element which inhibits premature release of stoppers 476 from the stopper magazine 466. The example stopper magazine 466 includes a displaceable handle 496. The displaceable handle 496 may include a loop, flange, or similar feature which allows a user to easily pull on the displaceable handle 496 through the glove interfaces 352 of the system 10. The displaceable handle 496 may be coupled to an outlet cover 498 (see, e.g. FIG. 74A). The outlet cover 498 may block exit of stoppers 476 from the stopper magazine 466. The displaceable handle 496 may be integral with the outlet cover 498 (best shown in FIG. 74B) or may be coupled thereto via a linkage. When the user displaces the displaceable handle 496, the outlet cover 498 may be displaced or withdrawn away from a blocking position allowing passage of stoppers 476 out of the stopper magazine 466. The displaceable handle 496 may be displaced along a guide slot 506 included in the body 508 of the stopper magazine 466. In some embodiments, the displaceable handle 496 may be completely removed from the stopper magazine 466 before use.

Figure 75:
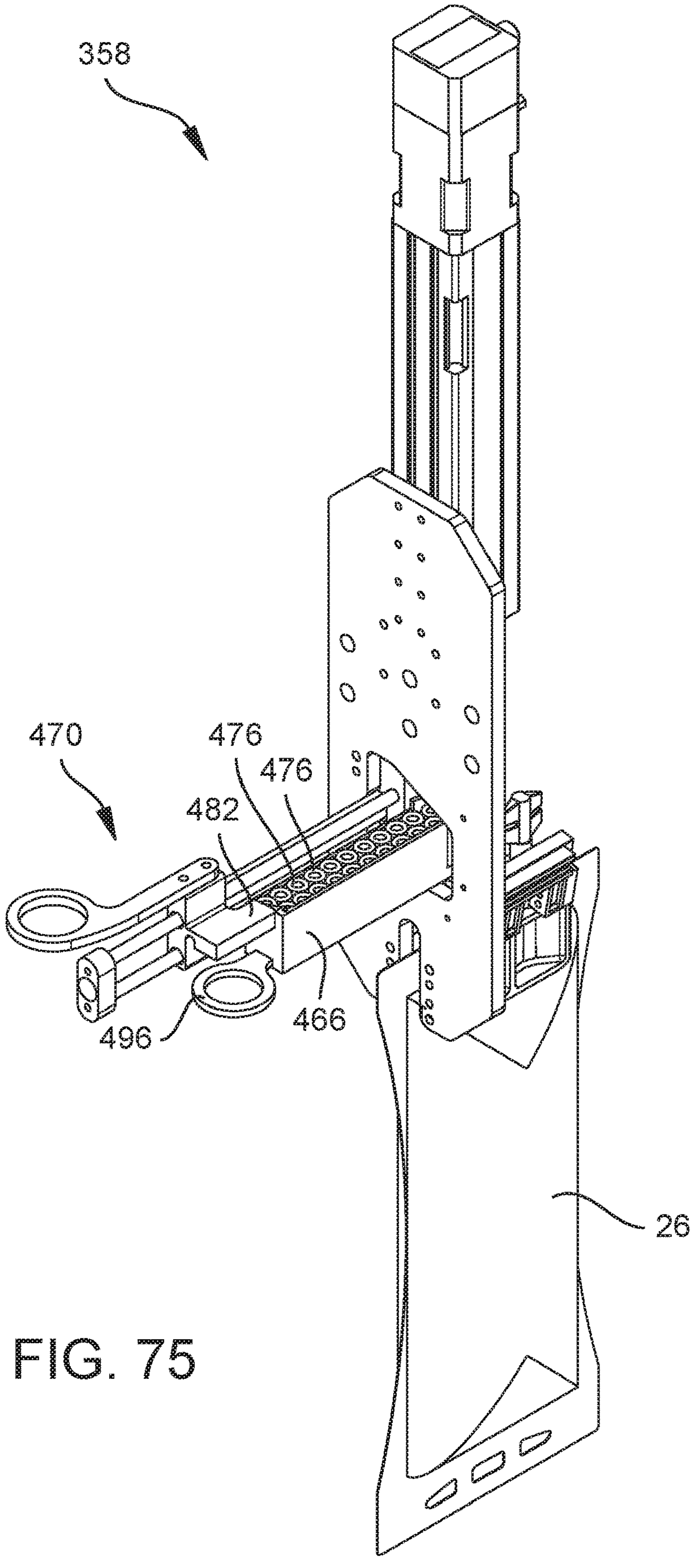
FIG. 75 depicts a perspective view of an example sealing station having an example follower assembly which is biased into contact with stoppers in an example stopper magazine.
Figure 76:
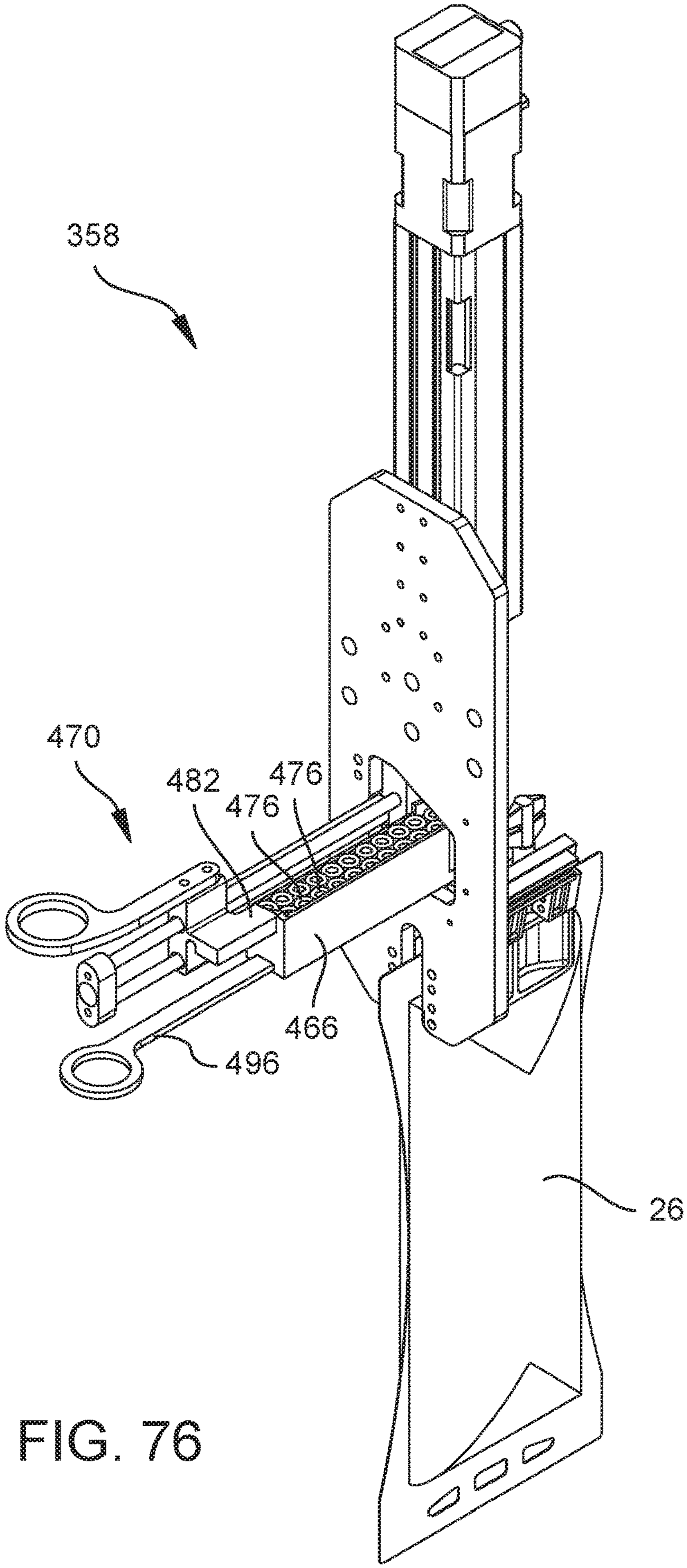
FIG. 76 depicts a perspective view of an example sealing station having an example stopper dispenser installed therein with a cover of the dispenser displaced to expose an exit port of the stopper dispenser.
Figure 77A:
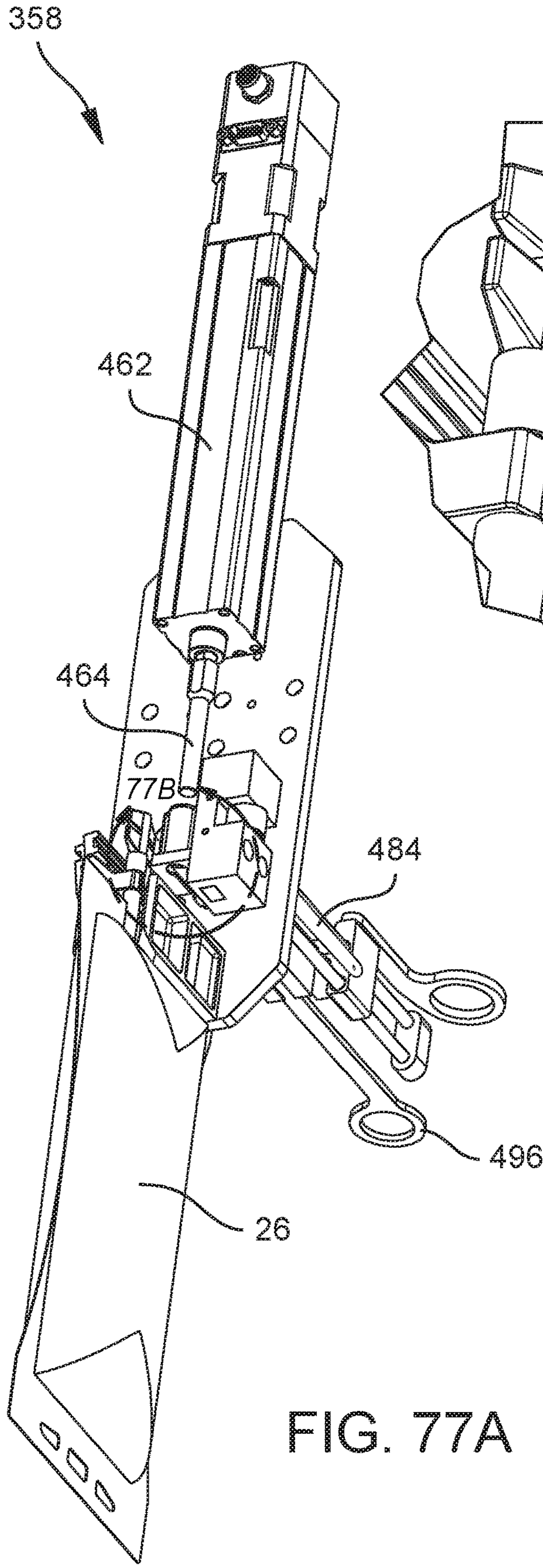
FIG. 77A depicts a perspective view of an example sealing station having an example stopper dispenser installed in a dispenser receptacle of the sealing station.
Figure 77B:
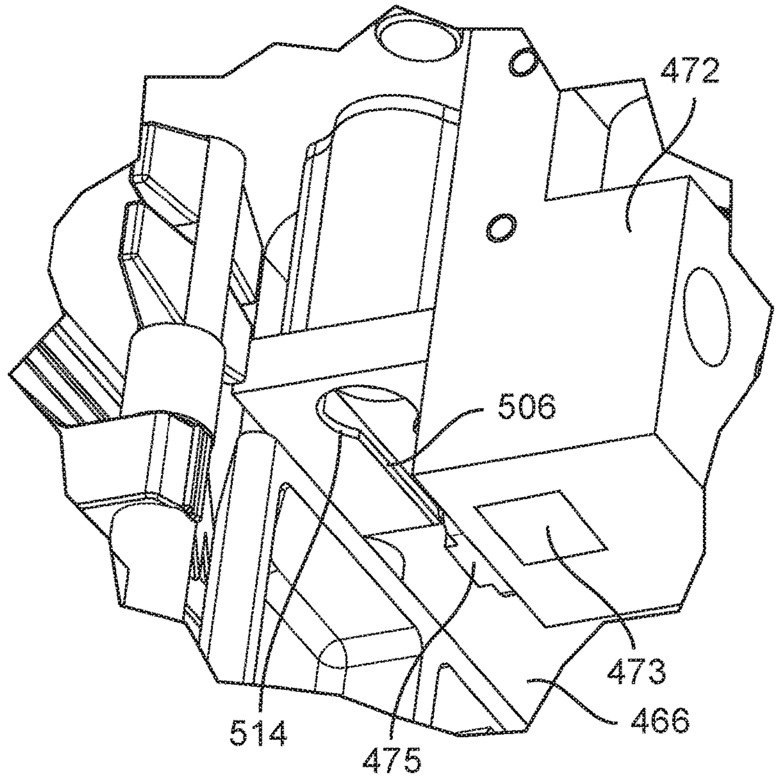
FIG. 77B depict a detailed view of the indicated region of the FIG. 77A.

In operation, and as shown in FIG. 75, the user may position the follower 482 against the stoppers 476 within the stopper magazine 466 prior to actuation of the outlet cover 498 to the withdrawn state. Thus, when the outlet cover 498 and displaceable handle 496 are displaced as depicted in FIG. 76-77A, the stopper 476 aligned with the exit port 514 from the stopper magazine 466 may be frictionally retained within the stopper magazine 466 via the application of force exerted through the follower 482 via the bias member 484. Only the head portion of this stopper 476 may be frictionally held in place against the stopper magazine 466. The stem portion of the stopper 476 may be out of contact with the stopper magazine 466. With the follower 482 deployed against the stoppers 476 and the outlet cover 498 withdrawn, the sealing station 358 may be considered to be in a ready state.

Figure 78:
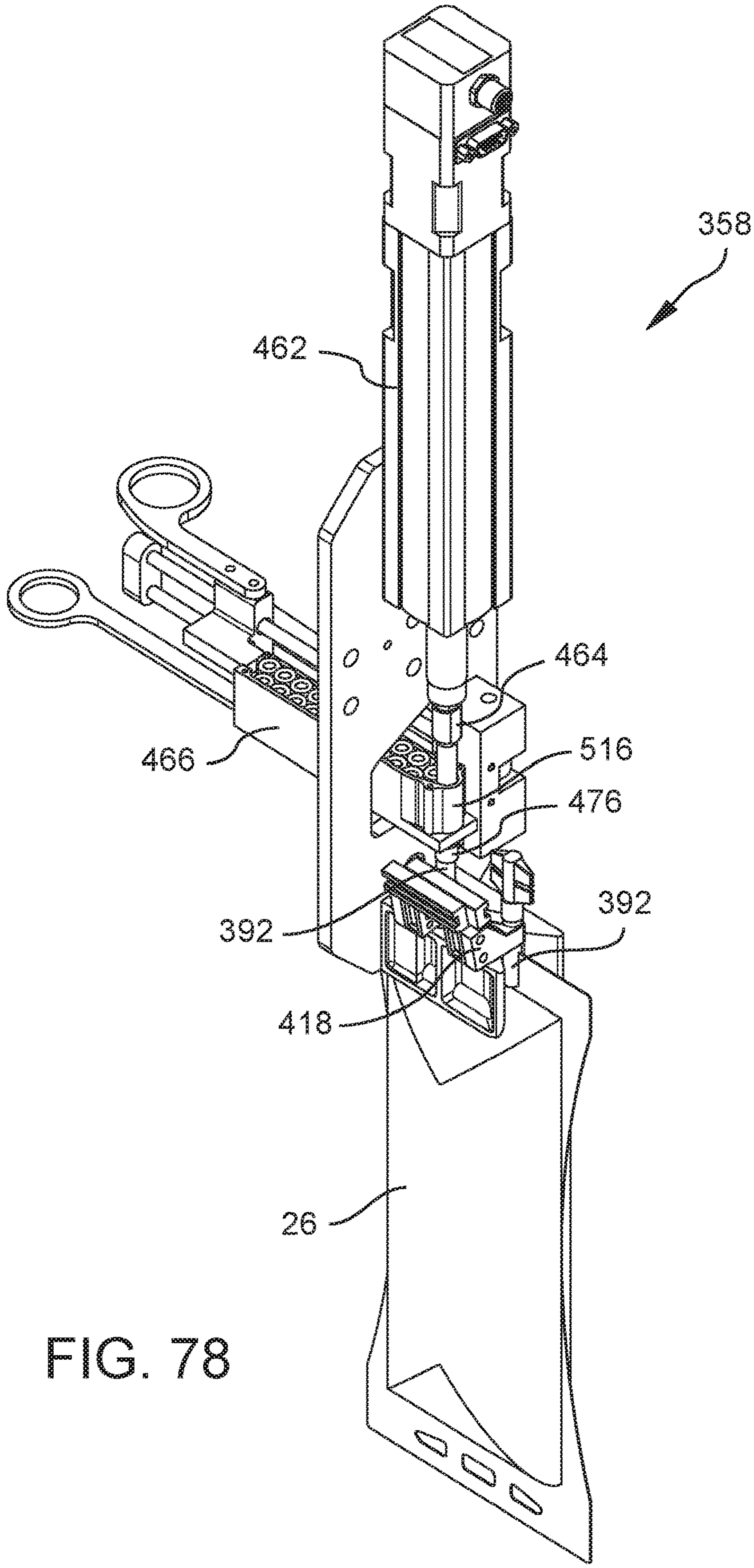
FIG. 78 depicts a perspective view of an example sealing station with an example ram of the sealing station advanced into an example stopper dispenser to drive a stopper from the dispenser into a port of a bag in place at the sealing station.

Referring now to FIG. 78, when the sealing station 358 is in a ready state, the robotic arm 360 may displace a bag 26 to the sealing station 358 via the gripper 410. The gripper 410 may align the port 392 of the bag 26 to be sealed under the exit port 514 of the stopper magazine 466. The control system 15 may command the ram driver 462 to displace the ram 464 through the opening 472 of the stopper magazine 466. The ram 464 may contact the head portion of the stopper 476 and the stopper 476 may begin to displace along with the ram 464. In the example embodiment, the driven stopper 476 may travel along a guide portion 516 of the stopper magazine 466 as it is displaced toward the port 392 of the bag 26. This guide portion 516 may ensure that the stopper 476 displaces substantially in line with the axis of the port 392. The stem or smaller diameter portion of the stopper 476 may enter the port 392 of the bag 26 prior to the stopper 476 displacing beyond the guide portion 516 of the stopper magazine 466. The ram 464 may continue to be driven by the ram driver 462 until the step 512 of the stopper 476 is against the top of the port 392. In certain embodiments, the ram 464 may be displaced until at least a threshold amount of the stem or small diameter portion stopper 476 is within the port 392. For example, the stopper 476 may be driven until at least 75% of the stem is within the port 392. The control system 15 may monitor position feedback from the ram driver 462 to determine the travel distance of the stem portion of the stopper 476 into the port 392.

As mentioned above, in some examples, the control system 15 may prohibit displacement of the ram 464 unless a magazine sensor 473 (see, e.g., FIG. 77B) registers a stopper magazine 466 is properly loaded into the sealing station 358. In certain embodiments, the control system 15 may also monitor data from a bag detection sensor. In some embodiments a port detection sensor 475 which monitors for the presence of a port 392 of a bag 26 may, for example be used. The port detection sensor 475 may be an optical sensor such as a reflectivity based sensor. Such a sensor may for example monitor an intensity of reflection of light emitted from the sensor. The port detection sensor 475 may detect whether a port 392 of a bag 26 is in a proper location for stoppering. The control system 15 may prohibit displacement of the ram 464 unless the port detection sensor 475 indicates that a port 392 is in proper position.

Figure 79:
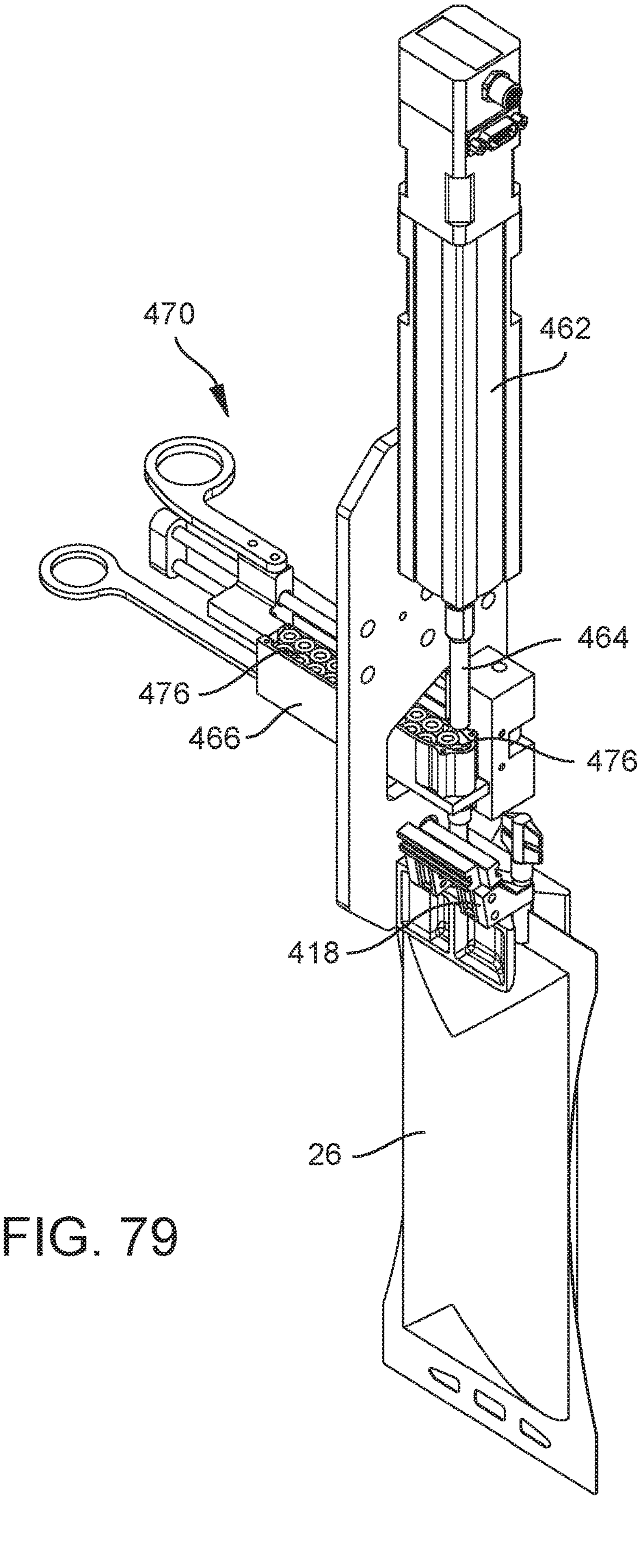
FIG. 79 depicts a perspective view of an example sealing station with an example ram of the sealing station in a retracted position and a stopper advanced into alignment with the exit port of an example stopper dispenser via an example follower assembly.
Figure 80:
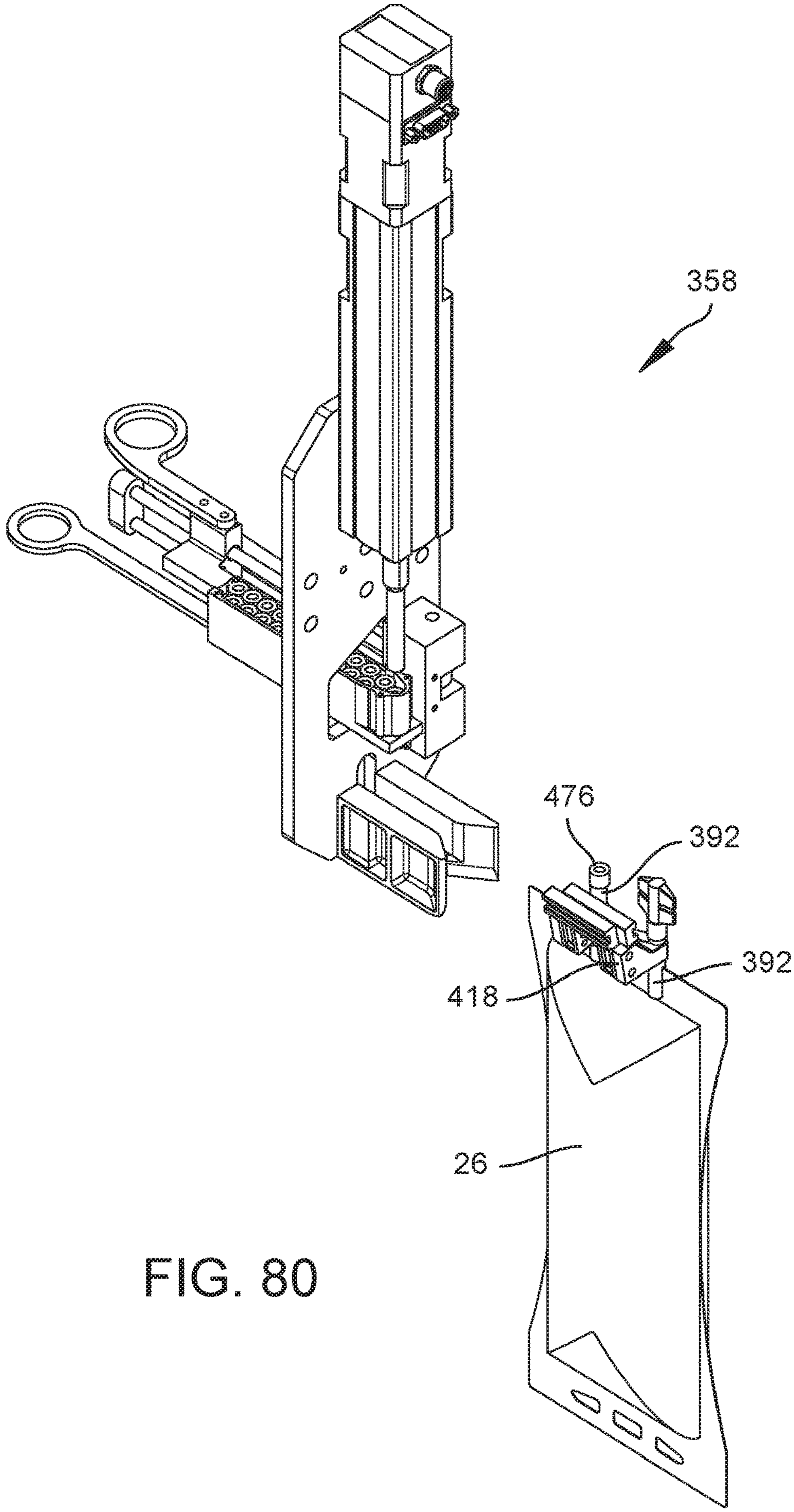
FIG. 80 depicts a perspective view of an example sealing station and an example grasper which has collected a sealed bag from the sealing station.

Referring now to FIG. 79, once the stopper 476 is in sealing engagement with the port 392, the ram 464 may be withdrawn. The control system 15 may command the ram driver 462 to withdraw the ram 464 and the follower assembly 470 may automatically advance stoppers 476 in the stopper magazine 466 such that the next stopper 476 in the stopper magazine 466 is aligned with the exit port 514 of the stopper magazine 466. As shown in FIG. 80, the sealed bag 26 may then be displaced from the sealing station 358 to a quarantine repository 362.

Figure 81A:
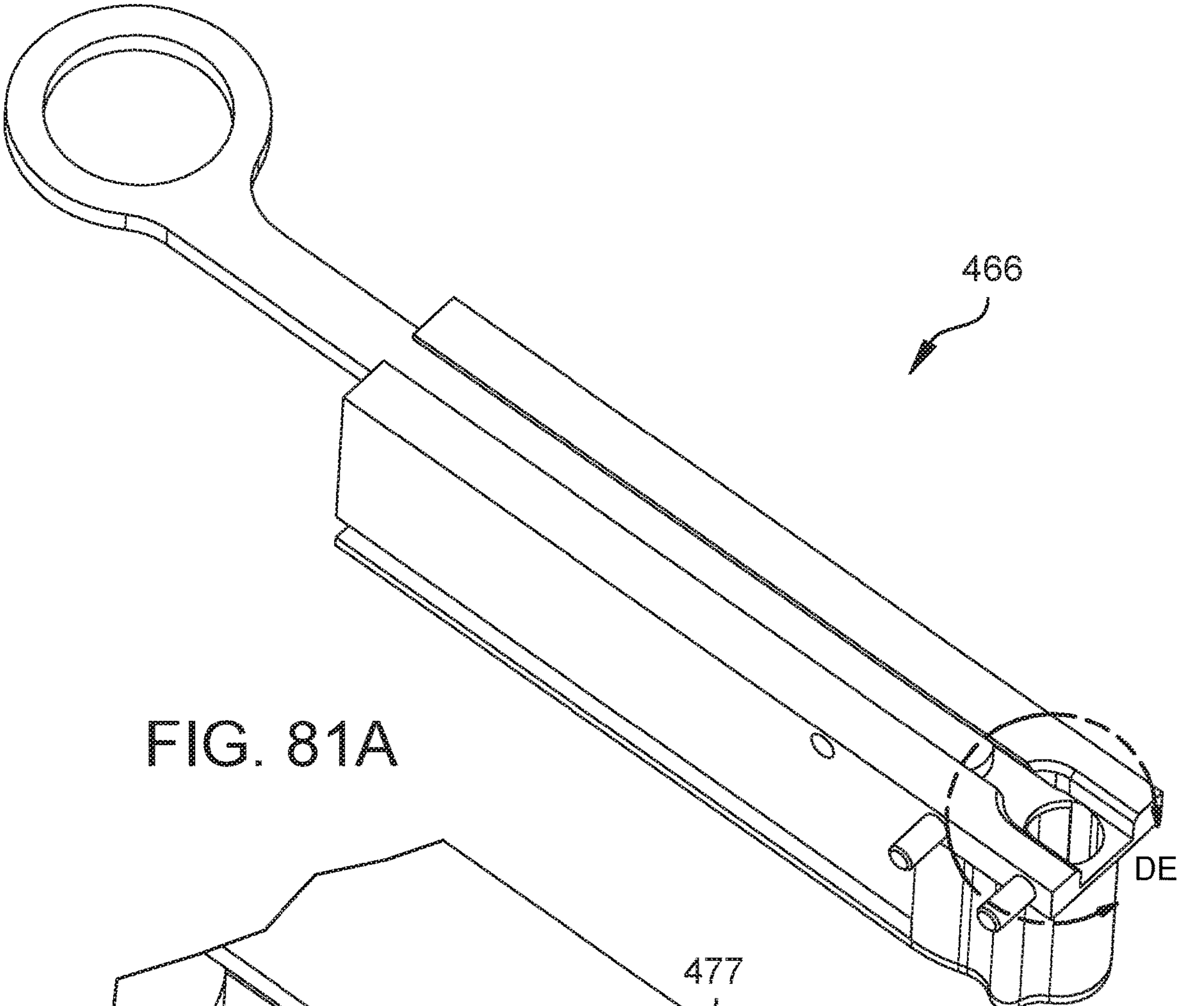
FIG. 81A depicts a perspective view of an example stopper dispenser having an exit port with a chamfered port opening.
Figure 81B:
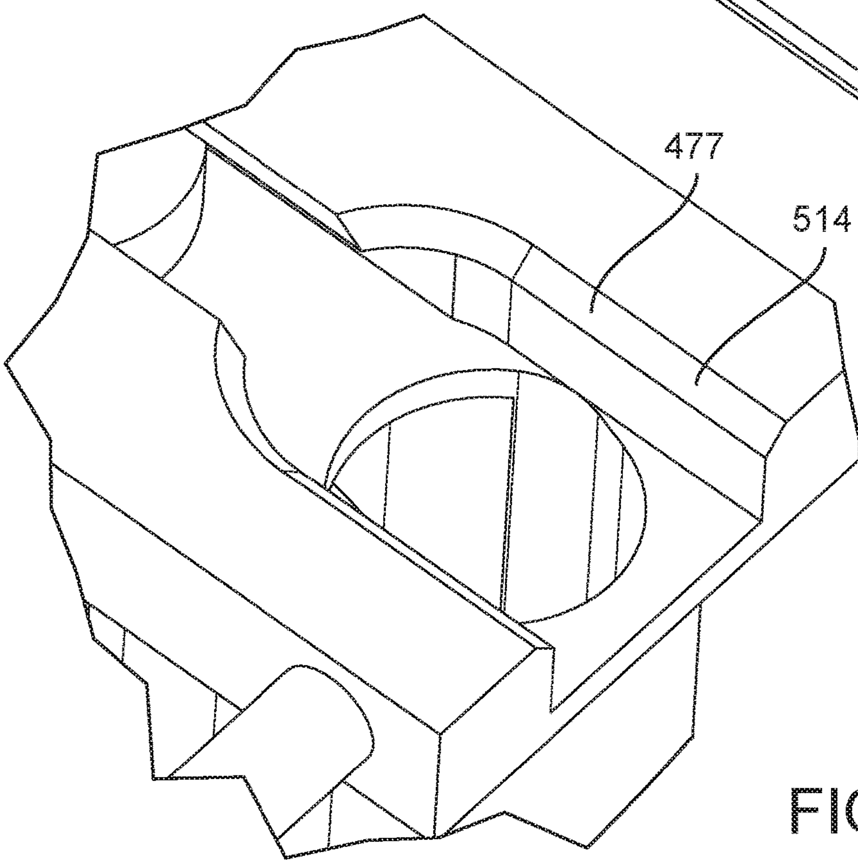
FIG. 81B depicts a detailed view of the indicated portion of FIG. 81A.

Referring now to FIGS. 81A-81B, in some embodiments, a sealing station 358 may accept a different stopper magazine 466 or may be designed to accept a variety of stopper magazines 466 having different styles, capacities, or containing different stopper 476 types and sizes. Single column magazines, drum type magazines, or any other suitable type of stopper magazine 466 may for example be used. A modified version of the stopper magazine 466 shown in FIGS. 74A and 74B is depicted in FIGS. 81A-81B. As shown, the exit port 514 of stopper magazine 466 is an elongate shape which extends all the way to the front end of the stopper magazine 466. The elongate shape may allow for greater alignment tolerances as stoppers 476 are displaced out of the exit port 514. Additionally, the walls of the exit port 514 may include a guide portion disposed at a portion of the exit port 514 wall adjacent the exterior face of the magazine body 506. The guide portion may include chamfer 477 or fillet in some embodiments which is applied to the edge where the exit port 514 and exterior face of the magazine body 506 meet. Such a chamfered exit port 514 may be included on any of the stopper magazines 466 described herein.

Figure 81C:
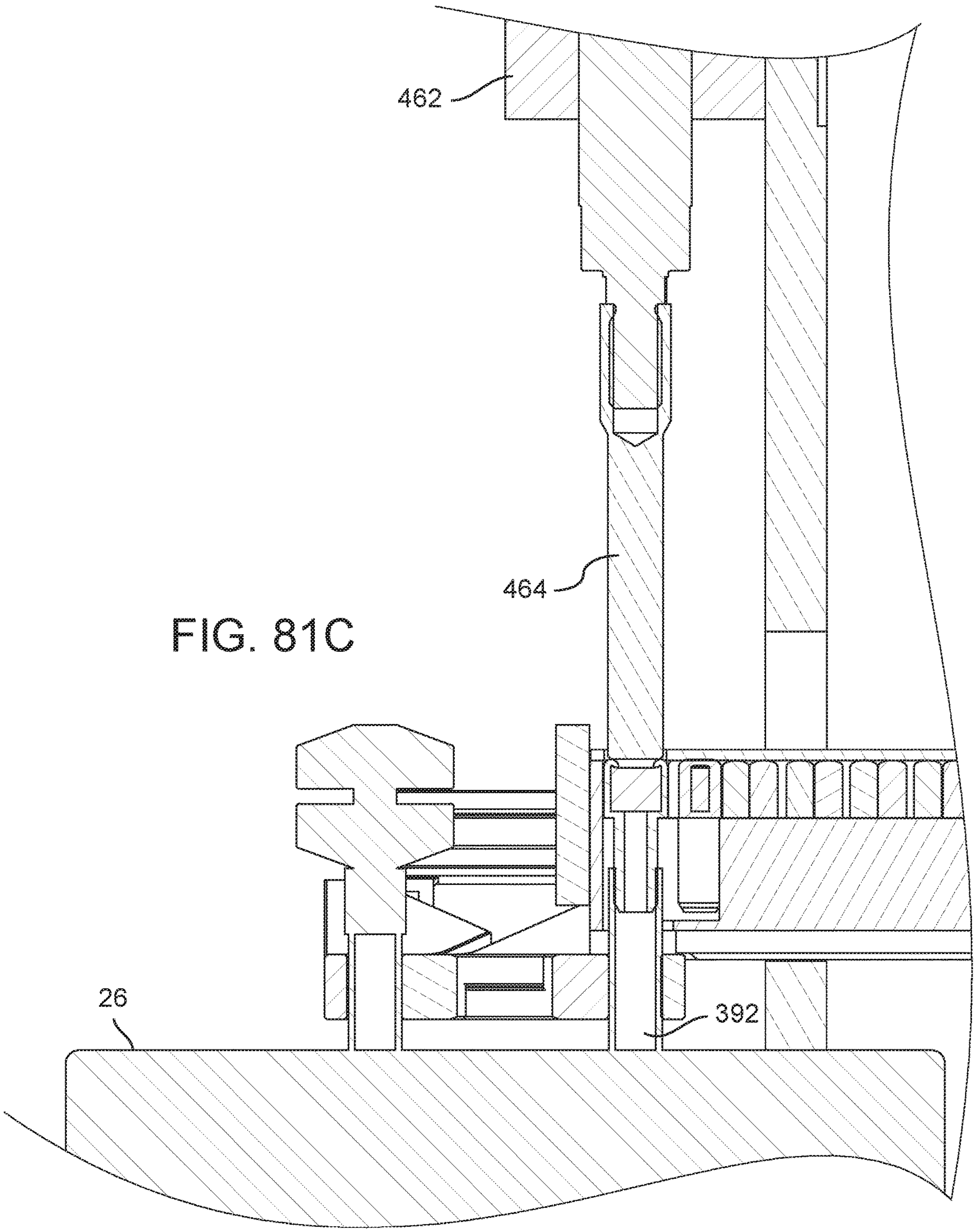
FIG. 81C depicts a cross sectional view of an example sealing station with the stopper dispenser of FIGS. 81A-B installed therein and a port of a bag advanced partially over a portion of a stopper held in the dispenser.

Referring now to FIG. 81C, in certain embodiments, the port 392 of the bag 26 may be displaced into the stopper magazine 466 exit port 514 prior to sealing of the port 392. The chamfer 477 on the exit port 514 of the stopper magazine 466 may be designed to facilitate this action. As shown in FIG. 81C, the ram 464 may be driven into the stopper magazine 466 until the ram 464 contacts the stopper 476 which is in line with the exit port 514. The ram 464 may be parked in this position and the grasper 418 may raise the bag 26 such that the stopper 476 is partially installed (e.g. no more than 25-35%) into the port 392. The ram 464 may block the stopper 476 from being pushed upward as this occurs. The chamfer 477 on the exit port 514 of the stopper magazine 466 may funnel or direct the port 392 of the bag 26 into alignment with the stem or smaller diameter section of the stopper 476. Once the stopper 476 is partially installed in the port 392, the ram 464 may then be actuated by the ram driver 462 to complete installation of the stopper 476 into the port 392 to seal the bag 26.

Figure 82A:
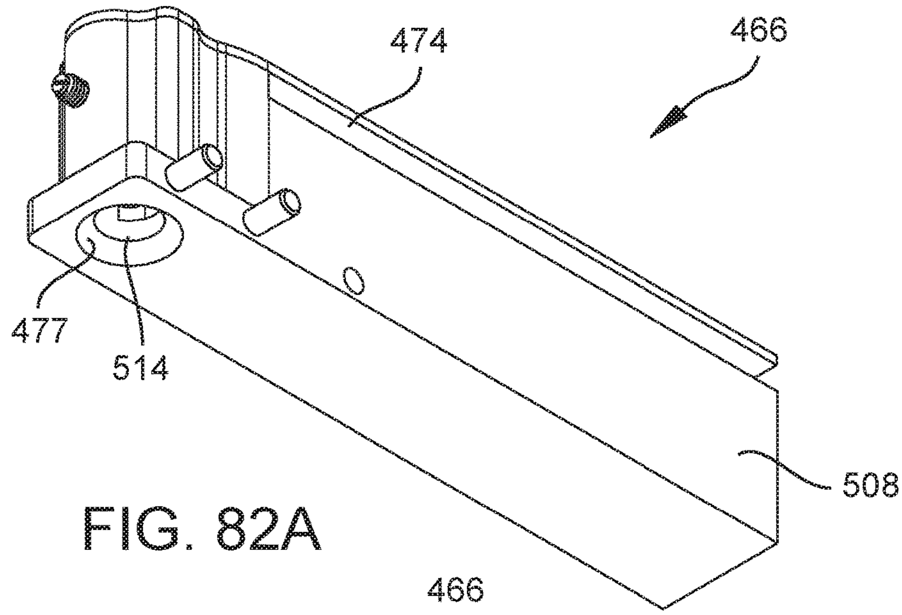
FIGS. 82A-C depict views of another example stopper dispenser having an exit port with a chamfered port opening and an exit port detent member.
Figure 82B:
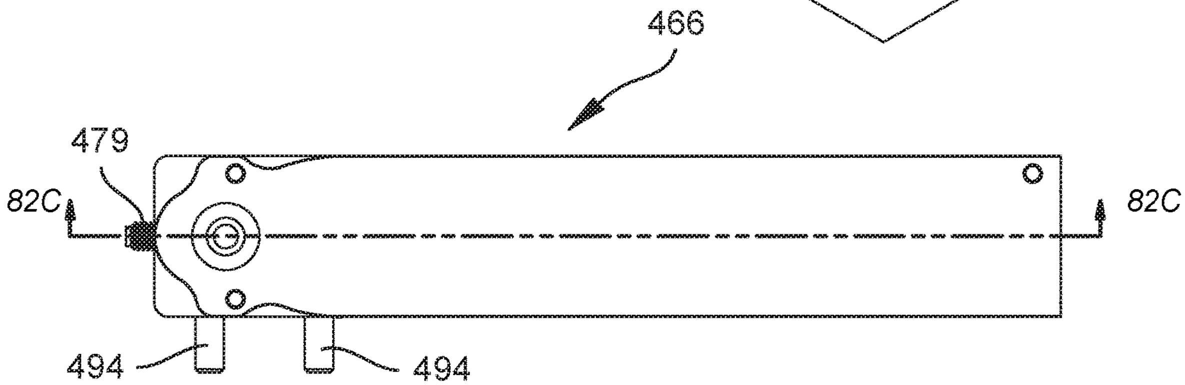
Figure 82C:
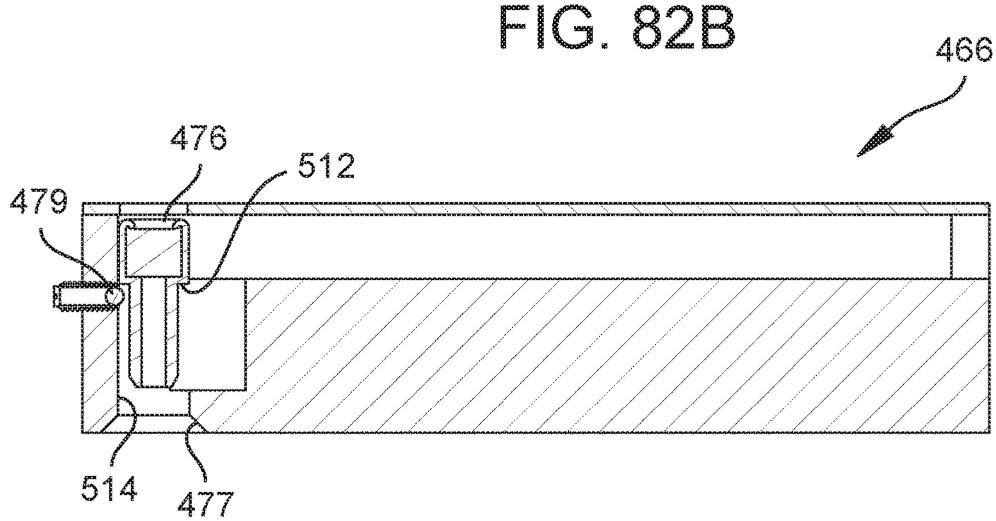

Referring now to FIGS. 82A-C views of another exemplary stopper magazine 466 are shown. As shown, the example stopper magazine 466 includes an exit port 514 with a chamfer 477. As above, the chamfer 477 may funnel or direct the port 392 of the bag 26 into alignment with the stem or smaller diameter section of the stopper 476. Additionally, as best shown in FIG. 82C, a detent member 479 may be included in the wall of the exit port 514. Such detent members 479 may be included in any of the stopper magazines 466 described herein. The detent member 479 in the example embodiment include a ball type detent. The detent member 479 may be a barb, bump, or other protuberance in alternative embodiments. The detent member 479 may project into the exit path of a stopper 476 traveling through the exit port 514. The step region 512 of a stopper 476 may catch on the detent member 479 aiding in retaining the stopper 476 within the stopper magazine 466. As shown best in FIG. 82A, embodiments including a detent member 479 may omit a displaceable handle 496 coupled to an outlet cover 498 (see, e.g. FIG. 74B) and the accompanying guide track 506 (see, e.g. FIG. 74B).

Figure 83:
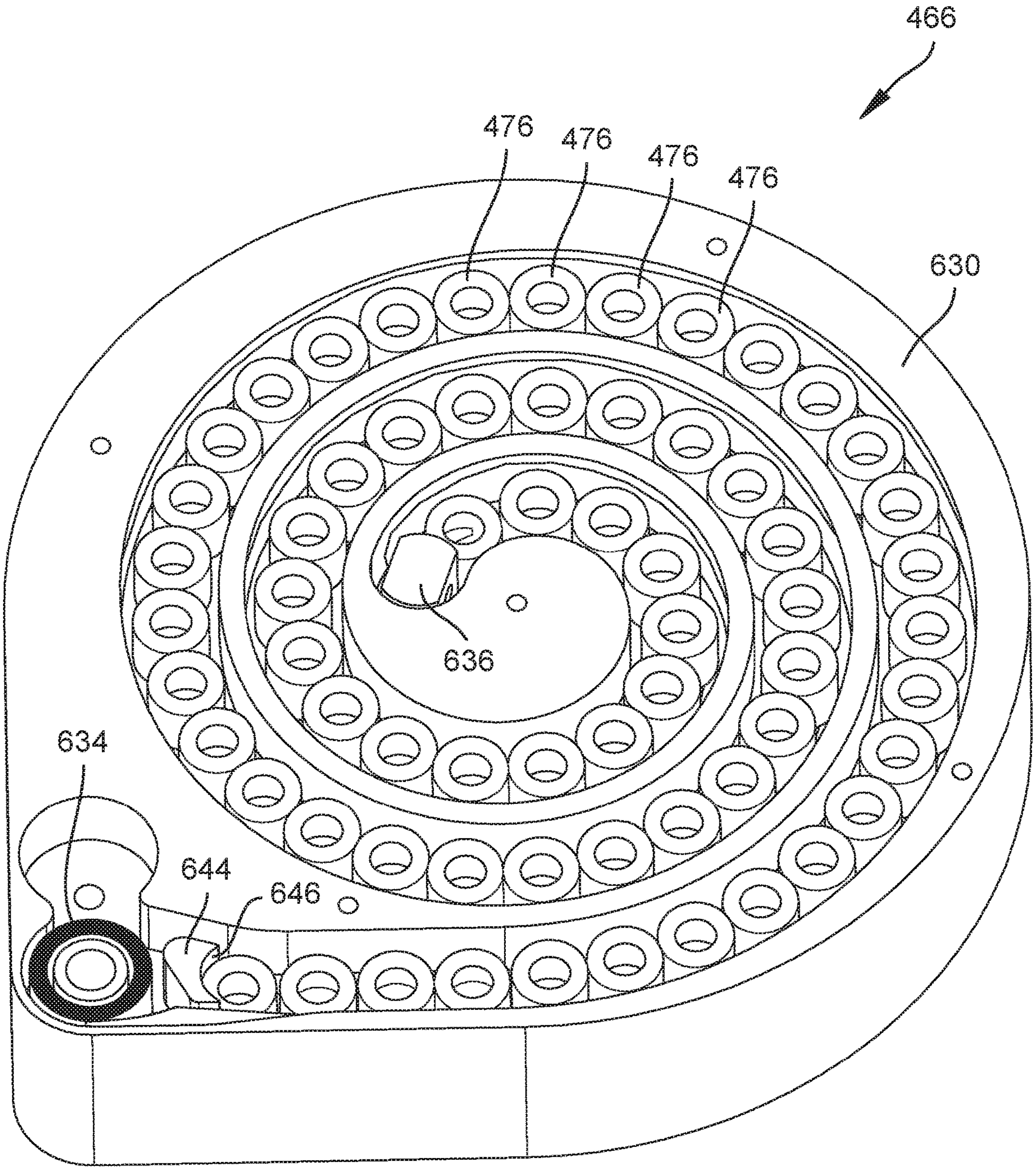
FIG. 83 depicts a perspective view of another example stopper dispenser with a cover plate of the example stopper dispenser removed.

Referring now to FIG. 83, an exemplary drum type stopper magazine 466 is depicted. The stopper magazine 466 may include a drum body 630. The drum body 630 may include a spiral trough or track 632 which may have a depth sufficient to accept stoppers 476 therein. The stopper magazine 466 may also include a bias member such as a constant force spring 634. The constant force spring 634 may be connected to a follower 636 that may be placed behind the last stopper 476 in the stopper magazine 466. The stopper magazine 466 may also include a removable cover member (not shown) which may be placed on the stopper magazine 466 to enclose the stoppers 476 within the stopper magazine 466. The example drum type stopper magazine 466 has a capacity of 64 stoppers 476. In other embodiments, the capacity may be higher (e.g. up to 100 or more) or lower (e.g. 50 or less).

Figure 84:
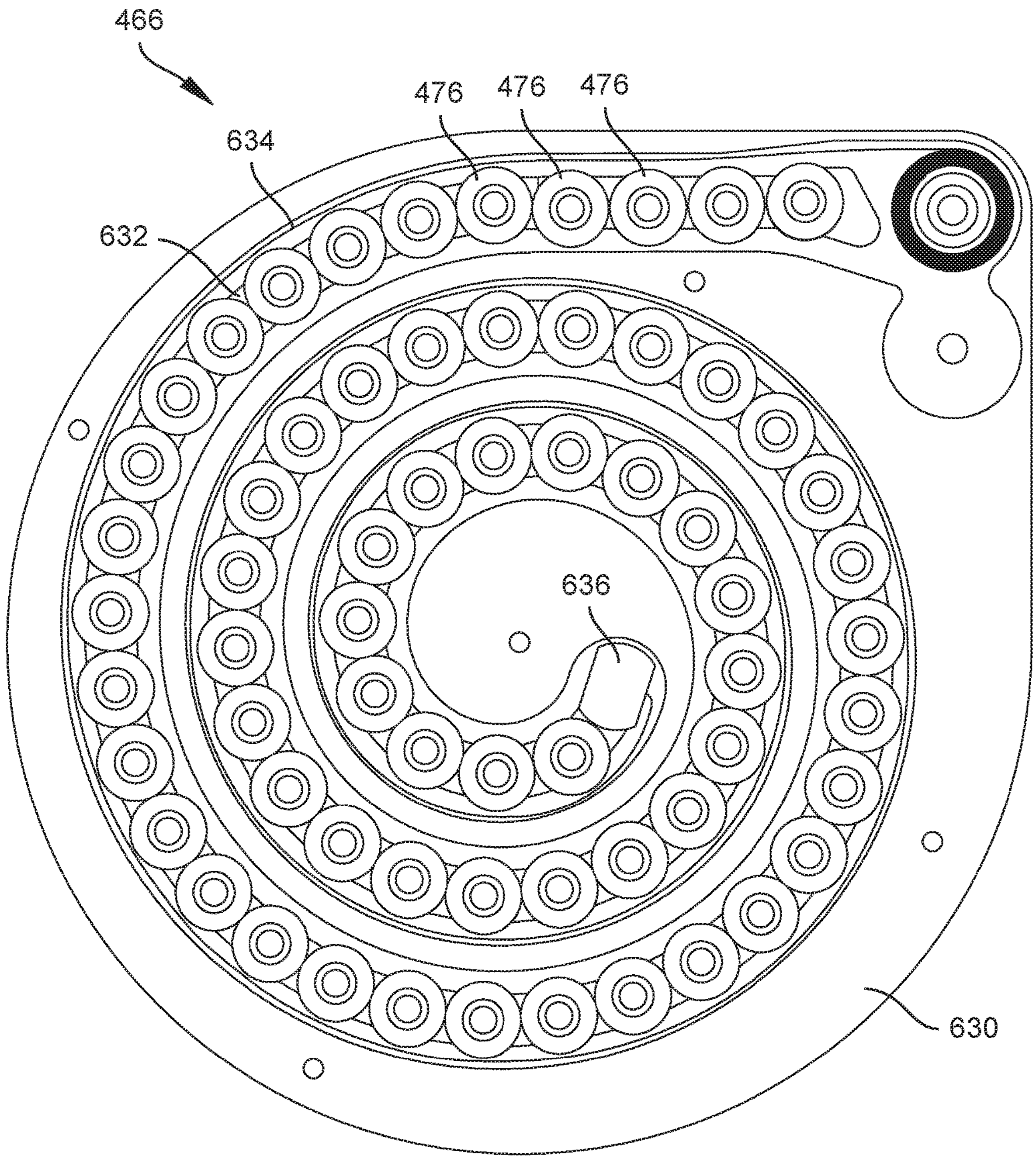
FIG. 84 depicts a top down view of an example stopper dispenser which is filled with stoppers.
Figure 85:
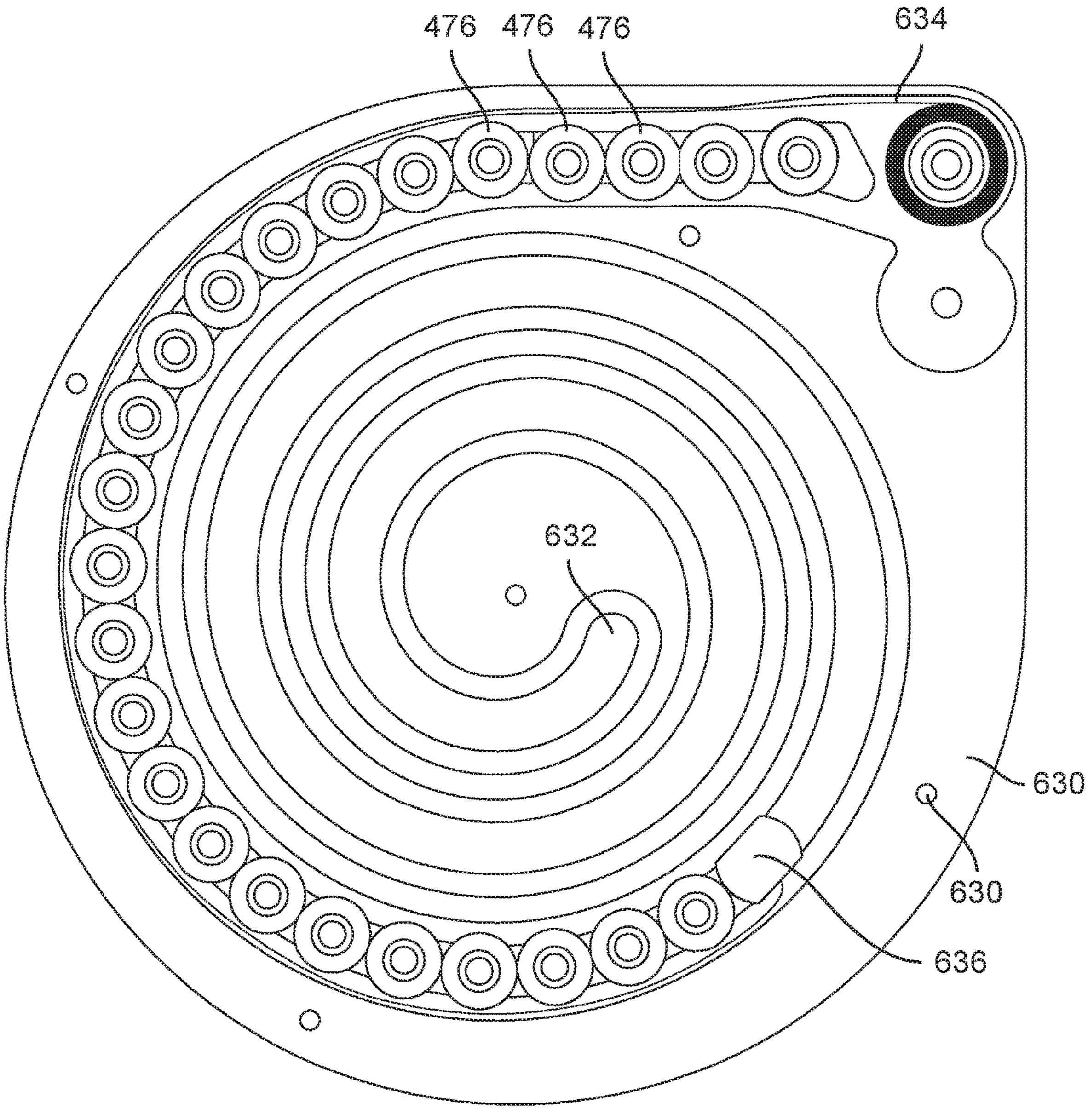
FIG. 85 depicts a top down view of an example stopper dispenser which has been partially emptied of stoppers.
Figure 86:
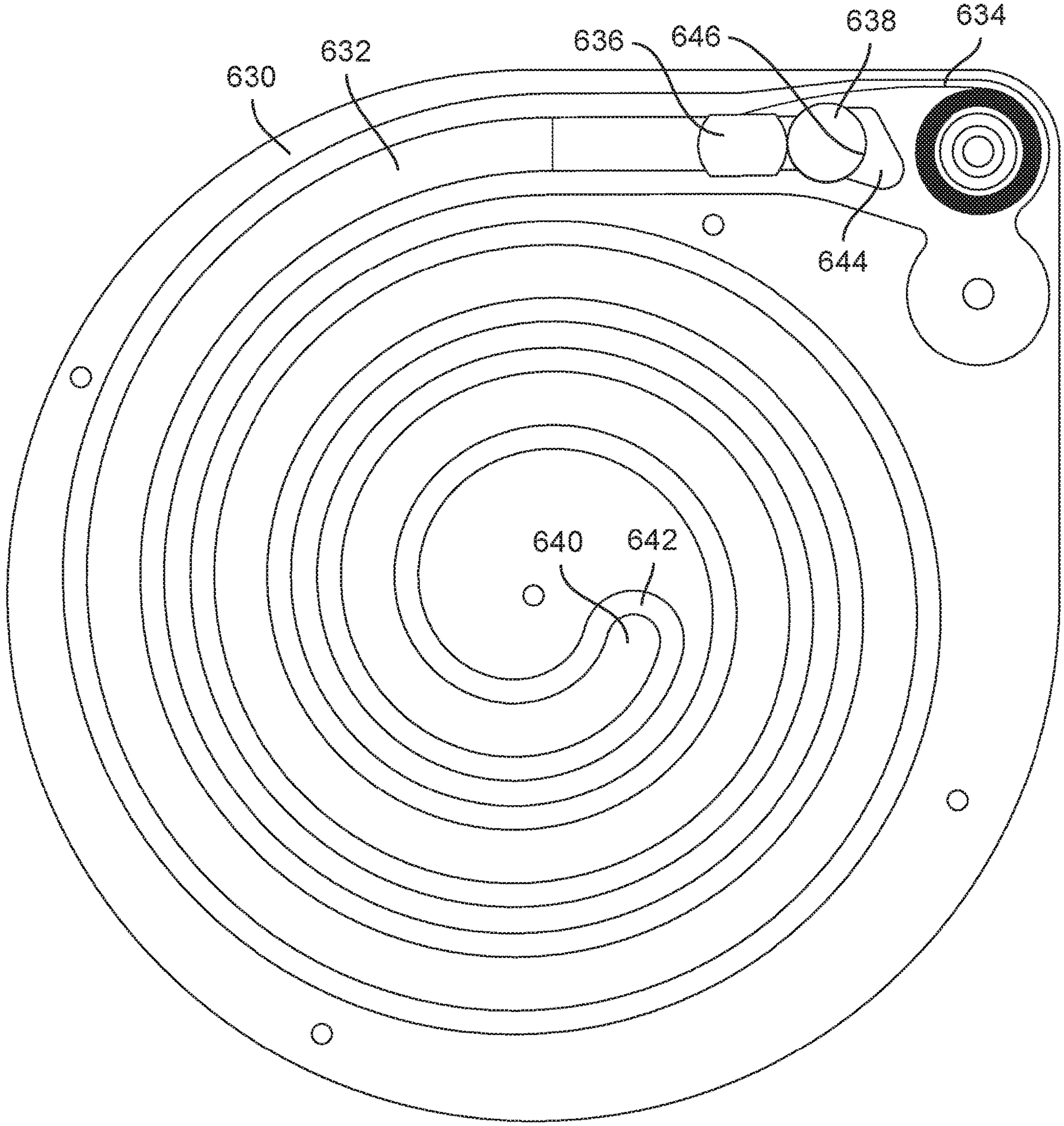
FIG. 86 depicts a top down view of an example stopper dispenser which is emptied of stoppers.

Referring now to FIGS. 84-86, as the stopper magazine 466 is depleted, the constant force spring 634 may pull the follower 636 along the spiral path 632 of in the drum body 630. This may in turn advance the remaining stoppers 476 in the stopper magazine 466. As shown, the spiral path 632 may include a trough portion 640. The trough portion 640 may accept the stem or small diameter section of each of the stoppers 476. Thus the trough portion 640 may act as a guide for the stoppers 476 as they are displaced along the spiral path 632. The follower 636 may be sized to ride along the trough 640 in certain embodiments and thus the trough portion 640 may also act as a follower guide during operation. The trough portion 640 may be flanked on each side by a ledge 642 upon which the step region 512 of the stoppers 476 may rest.

The stopper magazine 466 is shown empty in FIG. 86. As shown, the exit port 638 for the stoppers 476 may be sized to substantially match the dimensions of the head or larger diameter portion of the stoppers 476. Additionally, the exit port 638 may be at least partially surrounded by a guide wall 644. The guide wall 644 may be positioned in front of the exit port 638 so as to prevent the constant force spring 634 from advancing stoppers 476 beyond the exit portion 638. The guide wall 644 may also have a guide face 646 with a curvature which helps to position the head portion of the stoppers 476 in alignment with the exit port 638.

Though not shown in FIG. 86, mating pins 492 (see, e.g., FIG. 74A) may be included. The mating pins 492 may aid in mounting of the stopper magazine 466 in the magazine receptacle 472. The mating pins 492 may also allow for a magazine sensor 473 to detect the presence of the stopper magazine 466 at the magazine receptacle 472.

Figure 87:
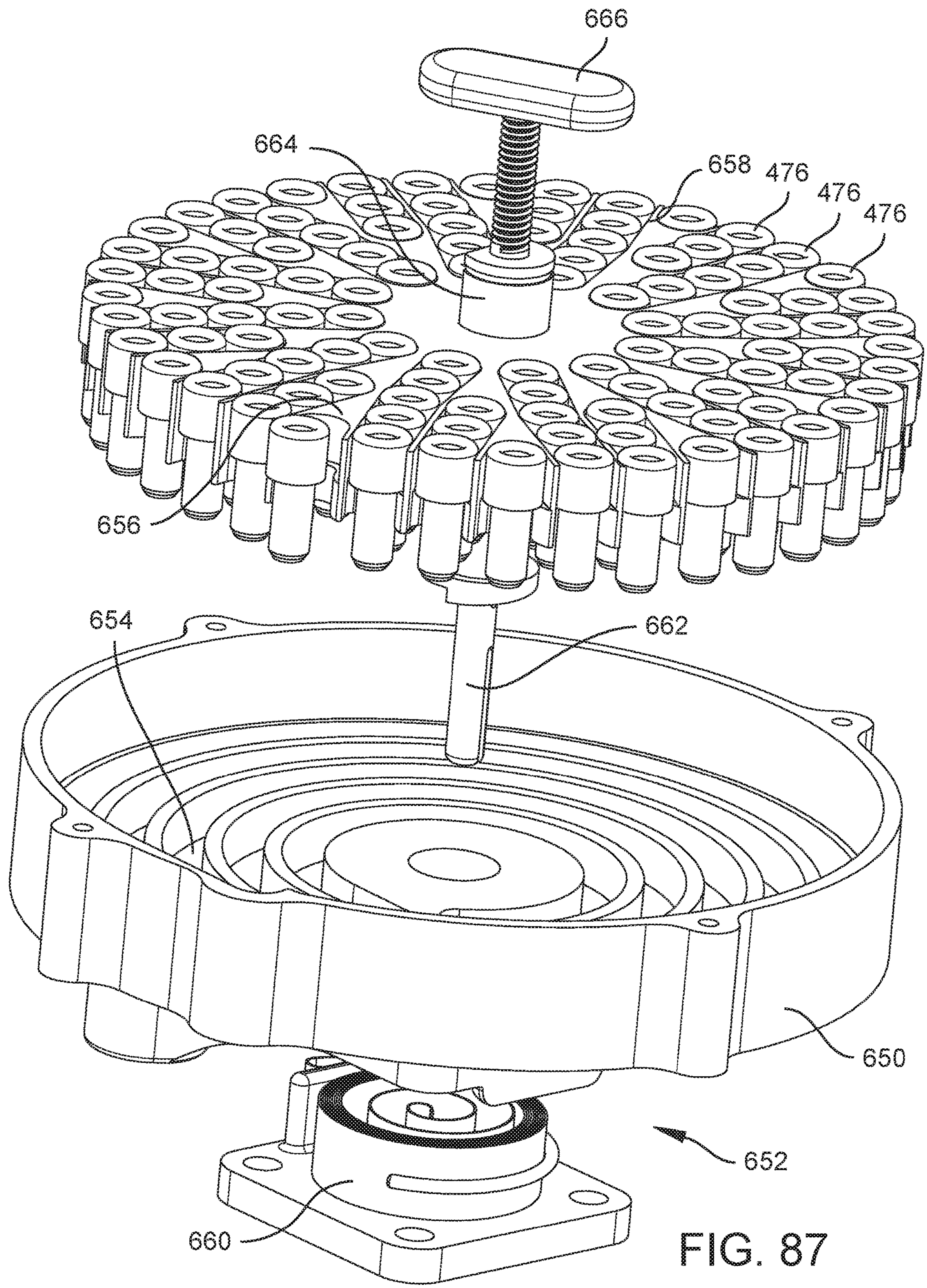
FIG. 87 depicts an exploded view of another example stopper dispenser.

Referring now to FIG. 87, an exploded view of another example stopper magazine 466 is depicted. As shown, the stopper magazine 466 in FIG. 87 is a drum type magazine. The stopper magazine 466 may include a drum body 650 with a spiral trough or track 654 formed therein. A rotor element 656 may also be included and may include a number of flutes 658 which extend therethrough. The flutes 658 may be sized to accept stoppers 476 therein. A bias assembly 652 may also be included in the example stopper magazine 466. In the example embodiment, the biasing assembly 652 may include a torsion spring or a wound spring 660 as in the example embodiment. A portion of the wound spring 660 may be attached to a spindle 662 included in the bias assembly 652 which extends through the drum body 650 and the rotor 656. Typically, the wound spring 660 may be included within a housing which is not depicted in FIG. 87 to better show the wound spring 660. The spindle 662 may include a keyed segment 664 which interfaces with the rotor 656. In the example embodiment, the keyed segment 664 is "D" shaped and may ensure that the rotor 656 rotates in tandem with the spindle 662. In other embodiments, the keyed segment 664 may have a different cross sectional shape such as a square shape or star shape. In operation, a user may grasp a knob 666 attached to the spindle to rotate the spindle 662. This may cause the wound spring 660 to store energy which may be used to turn the rotor 656 and advance stoppers 476 along the spiral track 654. The stopper magazine 466 may also include a removable cover member (not shown) which may be placed on the stopper magazine 466 to enclose the stoppers 476 and rotor 656 within the stopper magazine 466. As in other stopper magazine 466 embodiments, mating pins 492 (see, e.g., FIG. 74B) may be included to aid in mounting and detection of the stopper magazine 466 in the magazine receptacle 473.

Figure 88:
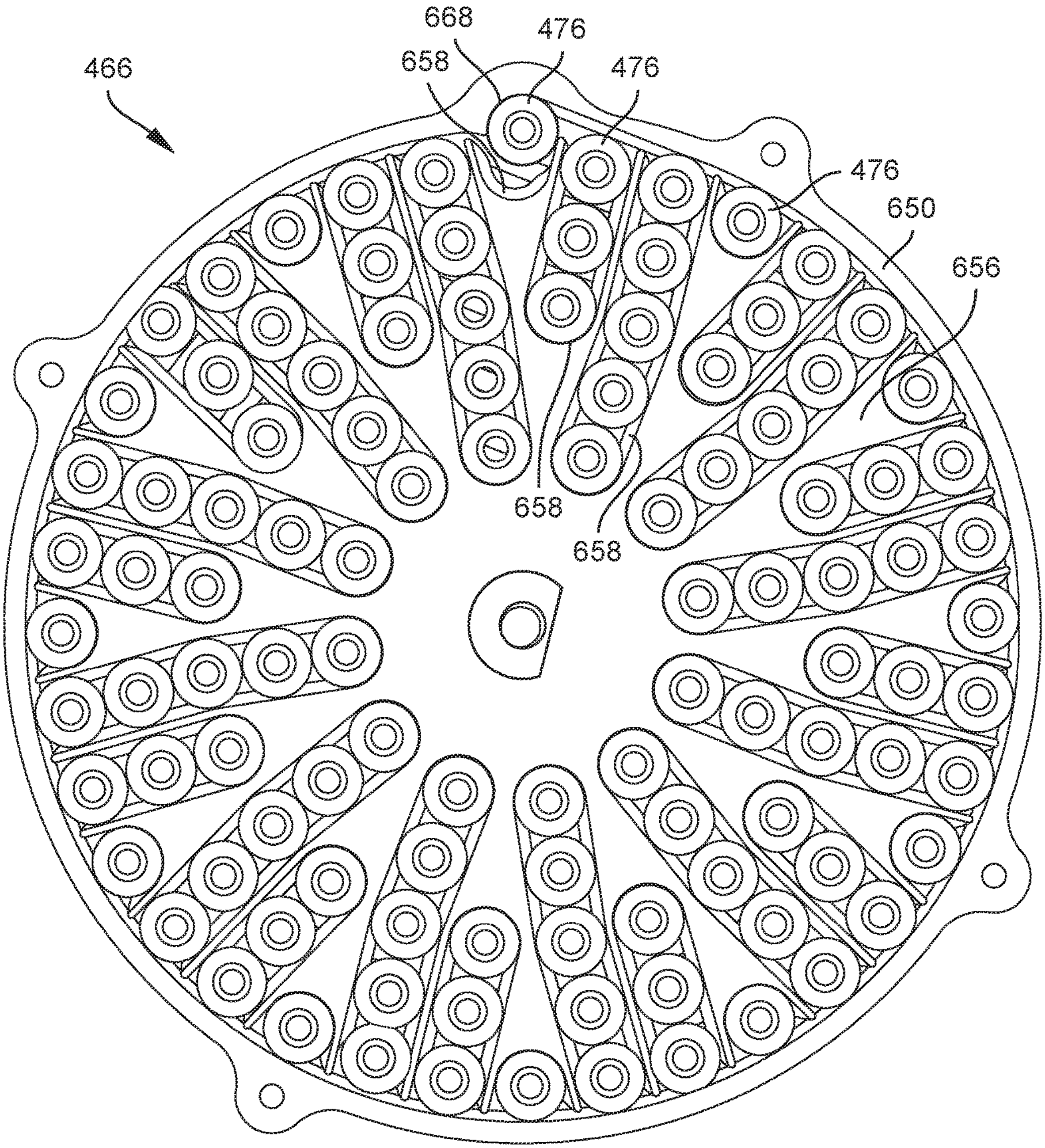
FIG. 88 depicts a top down view of an example stopper dispenser which is filled with stoppers.

Referring now to FIG. 88, top down view of the example stopper magazine 466 of FIG. 87 is depicted. As shown, the stopper magazine 466 is fully loaded with stoppers 476. The example stopper magazine 466 has a capacity of 108 stoppers 476 in the example embodiment, though as with other stopper magazines 466 described herein, the capacity may be lower or greater depending on the embodiment. As shown, the flutes 658 are of different lengths and extend toward the center of the rotor 656 from the periphery of the rotor 656. This variety of different length flutes 658 may increase the space efficiency of the stopper magazine 466 and allow for a large number of stoppers 476 to be loaded into the stopper magazine 466.

Figure 89:
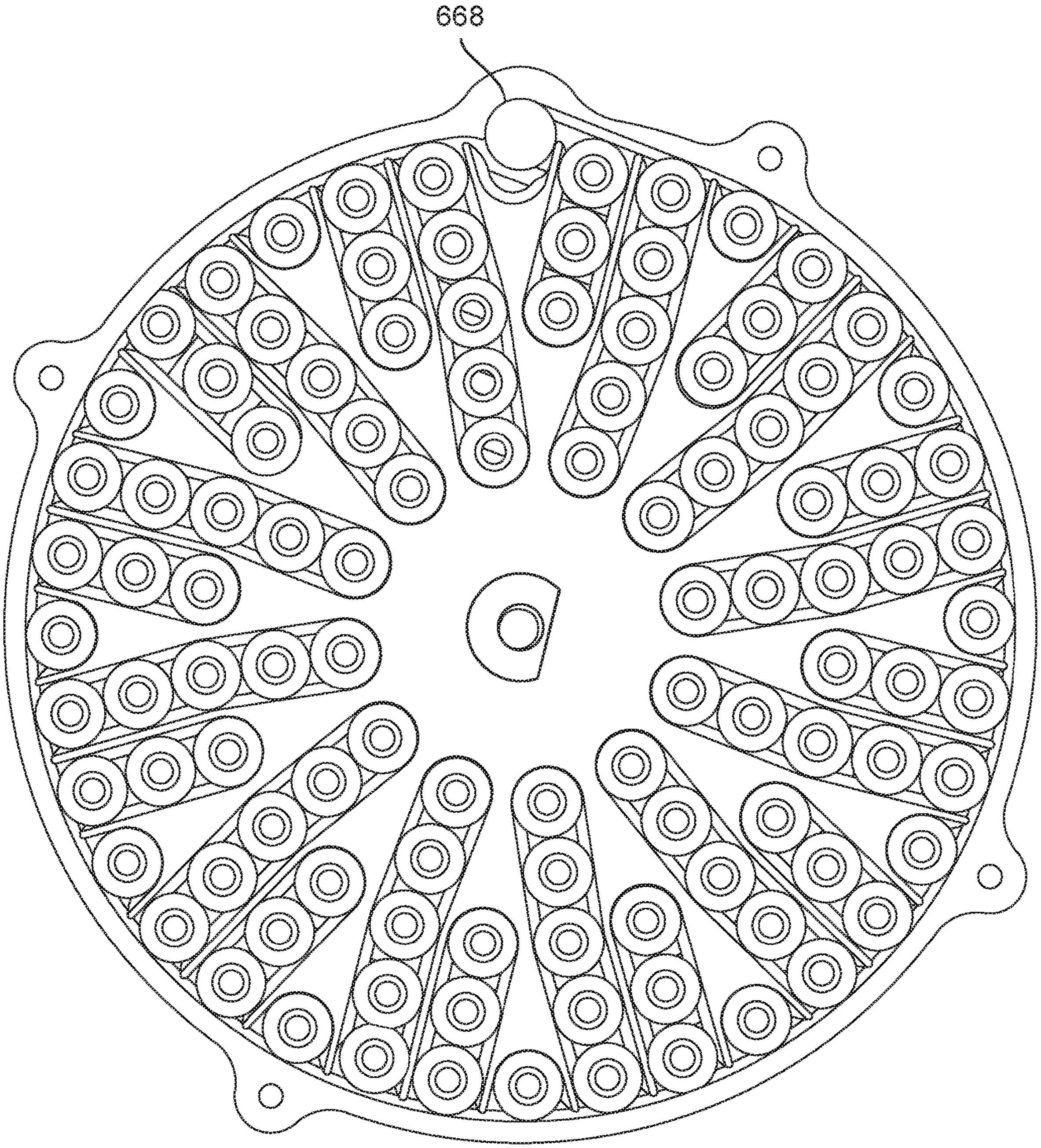
FIG. 89 depicts a top down view of an example stopper dispenser with the stopper in line with the exit port of the dispenser having been dispensed.
Figure 90:
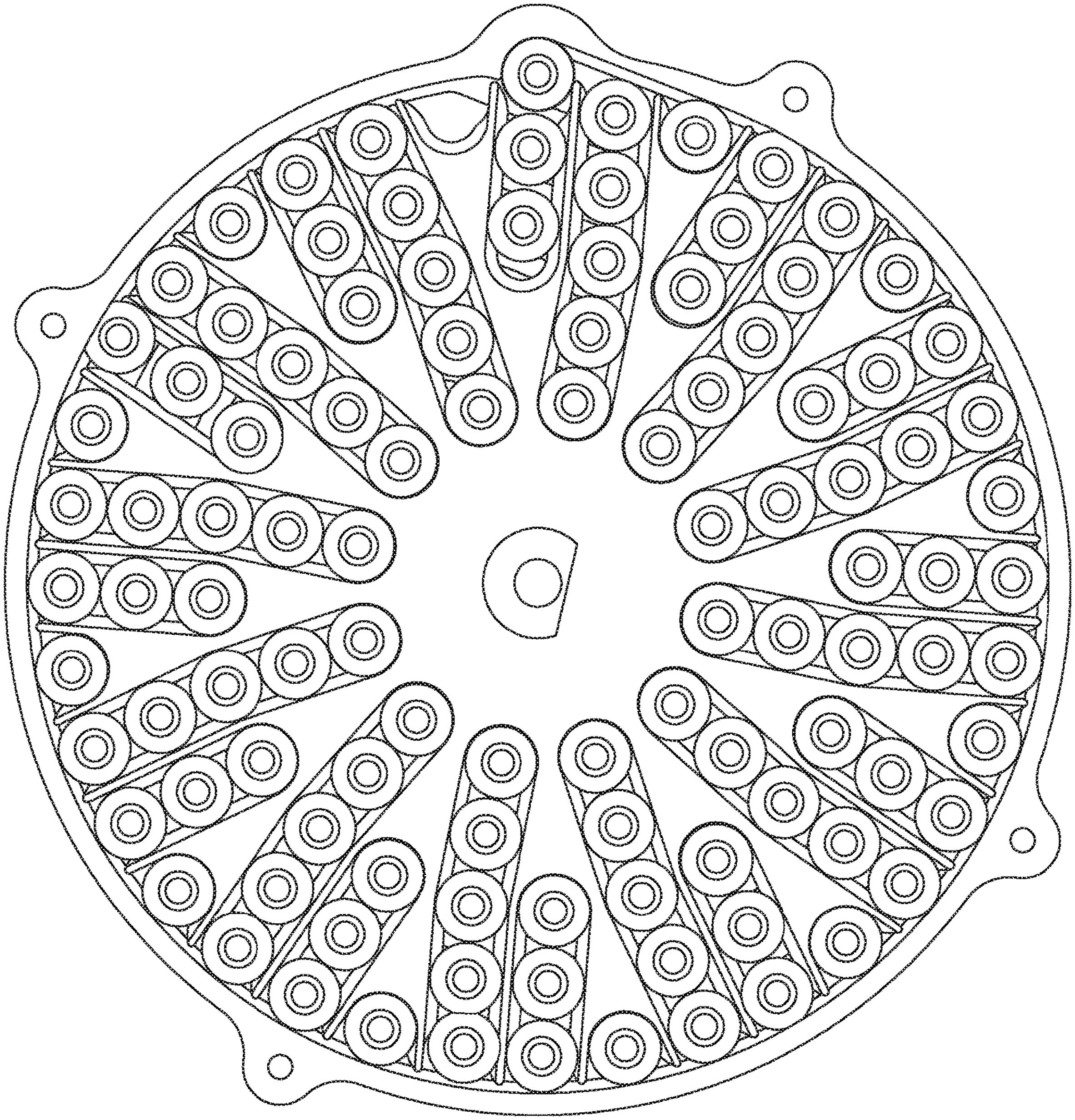
FIG. 90 depicts a top down view of an example stopper dispenser which has been rotated under force of a bias member to advance a stopper into alignment with the exit port of the dispenser.

Still referring to FIG. 88, a stopper 476 is depicted at the exit port 668 of the stopper magazine 466. The edge of the flute 658 in which the stopper 476 was disposed may press against the head portion of the stopper 476. As the bias assembly 652 of the stopper magazine 466 may be preloaded as the stopper magazine 466 is operated, the flute 658 may exert a force against the stopper 476 which is sufficient to frictionally retain the stopper 476 against the wall of the exit port 668. Additionally, the stopper 476 at the exit port 668 may present an interference to the wall of the flute 658 which inhibits the rotor 656 from displacing under the force of the bias assembly 652. When the stopper 476 is driven out of the stopper magazine 466 by a ram 464 or the like (see, FIG. 89), the interference may be removed and the rotor 656 may be free to rotate. The rotor 656 may displace pushing the stoppers 476 along the spiral track 654 of the drum body 650 as shown in FIG. 90. This may advance a next stopper 476 into the exit port 668 which may again present an interference to further displacement of the rotor 656.

Figure 91:
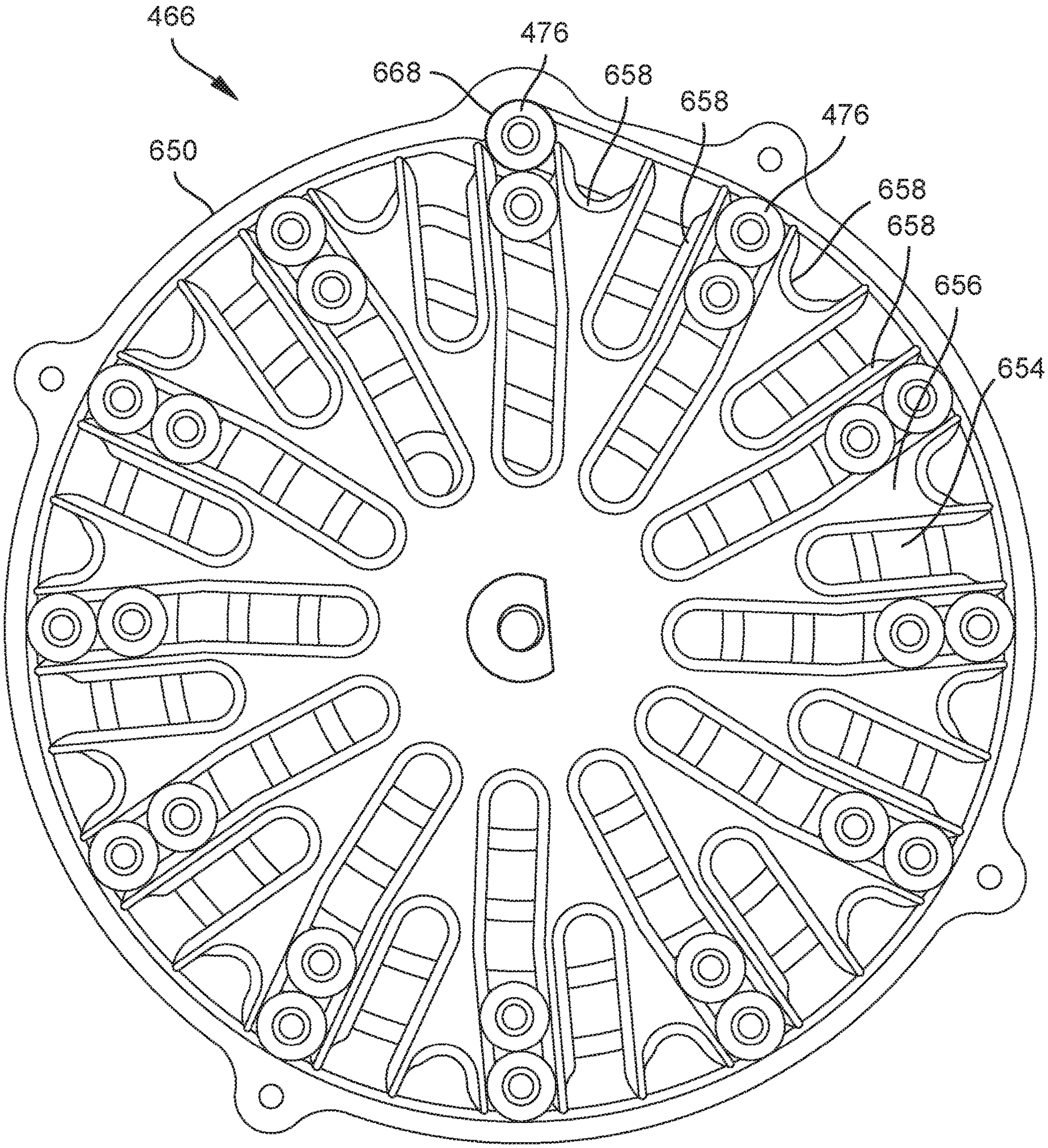
FIG. 91 depicts a top down view of an example stopper dispenser which is partially emptied of stoppers.
Figure 92:
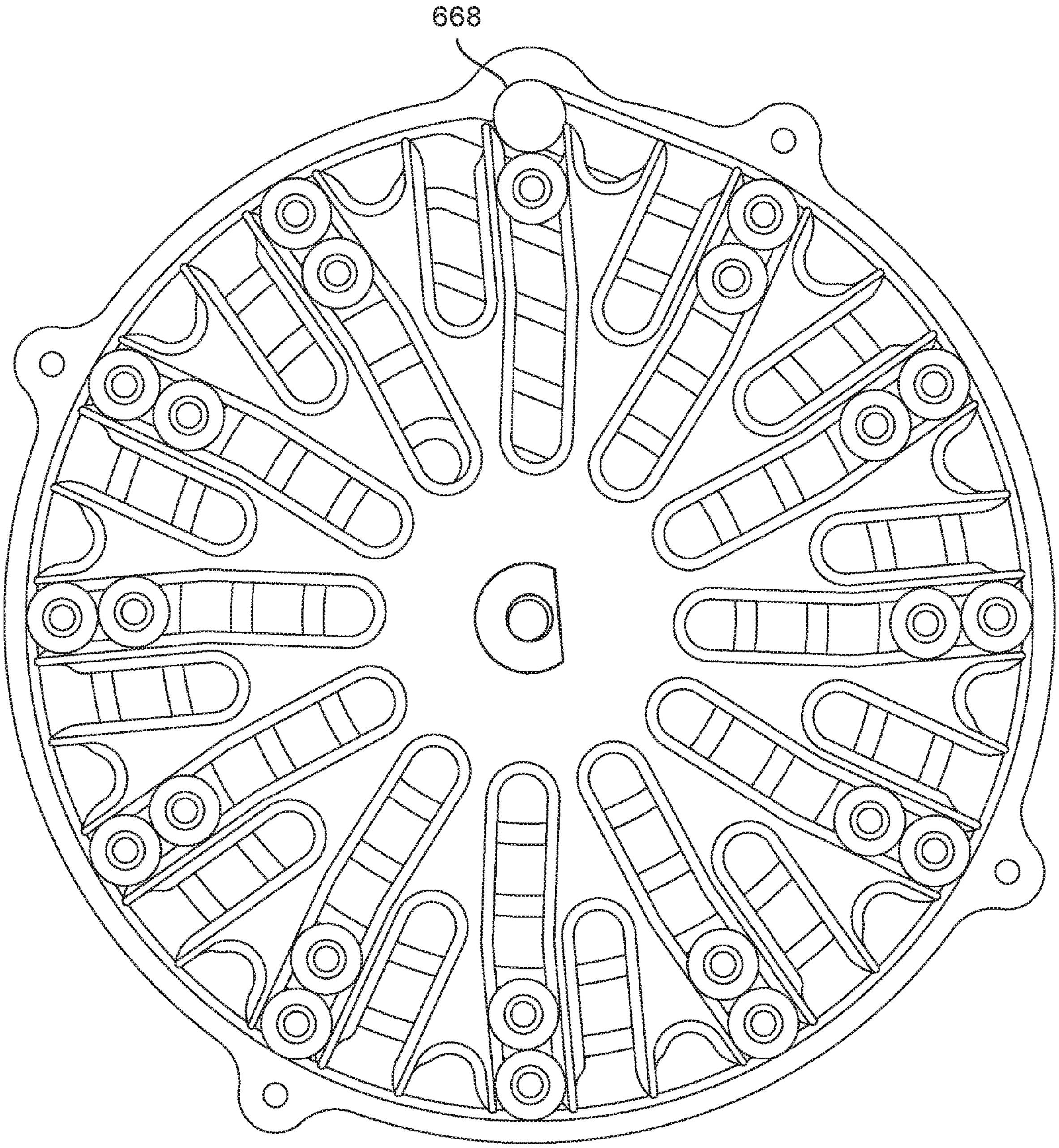
FIG. 92 depicts a top down view of an example stopper dispenser with the stopper in line with the exit port of the dispenser having been dispensed.
Figure 93:
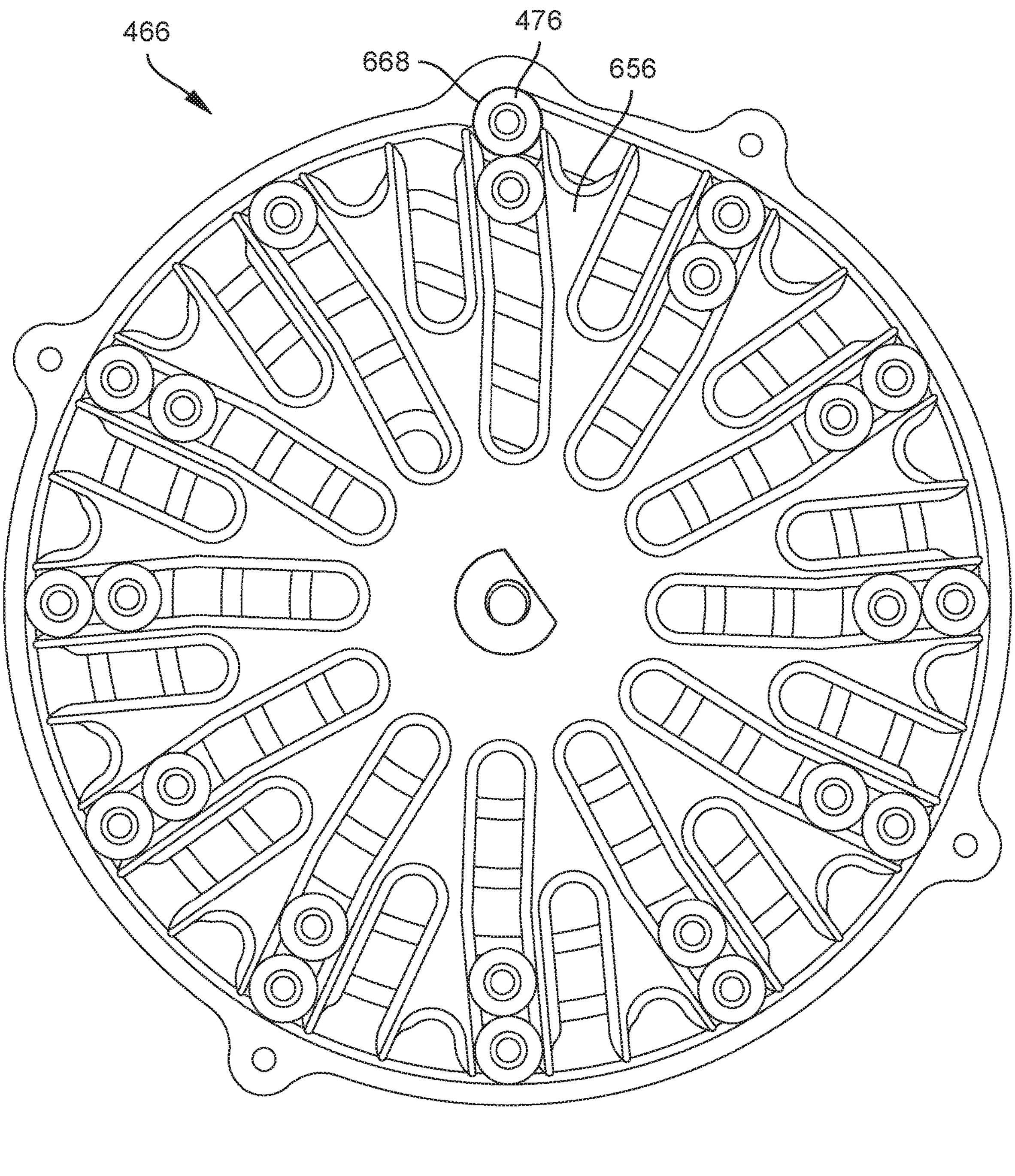
FIG. 93 depicts a top down view of an example stopper dispenser which has been indexed to advance a next available stopper into alignment with the exit port of the dispenser under force of a bias member.

Referring now to FIG. 91, as the stopper magazine 466 depletes, smaller flutes 658 of the rotor 656 may be emptied of stoppers 476. The exemplary stopper magazine 466 is arranged to automatically index to the next available stopper 476 and will automatically skip any empty flutes 658. In the example shown in FIG. 91, the stopper 476 at the exit port 668 is separated from the next available stopper 476 by two empty flutes 658. When the stopper 476 is discharged from the exit port 668 (see FIG. 92), the rotor 656 may be free to advance until the next stopper 476 enters into alignment with the exit port 668 and presents an interference to further movement of the rotor 656 as shown in FIG. 93. Thus the stopper magazine 466 may automatically index to the next stopper 476 even when the rotational displacement needed is variable. It should be noted that in other embodiments, other rotor drive assemblies in additional to the bias assembly 652 shown may be utilized. For example, a motorized displacement assembly may be included in place of the bias assembly 652. In such examples, the control system 15 may track the number of stoppers 476 dispensed from the magazine 466 and use this count to ensure that the motorized displacement assembly drives the rotor 656 an amount appropriate to advance the next stopper 476 to the exit port 668.

Figure 94:
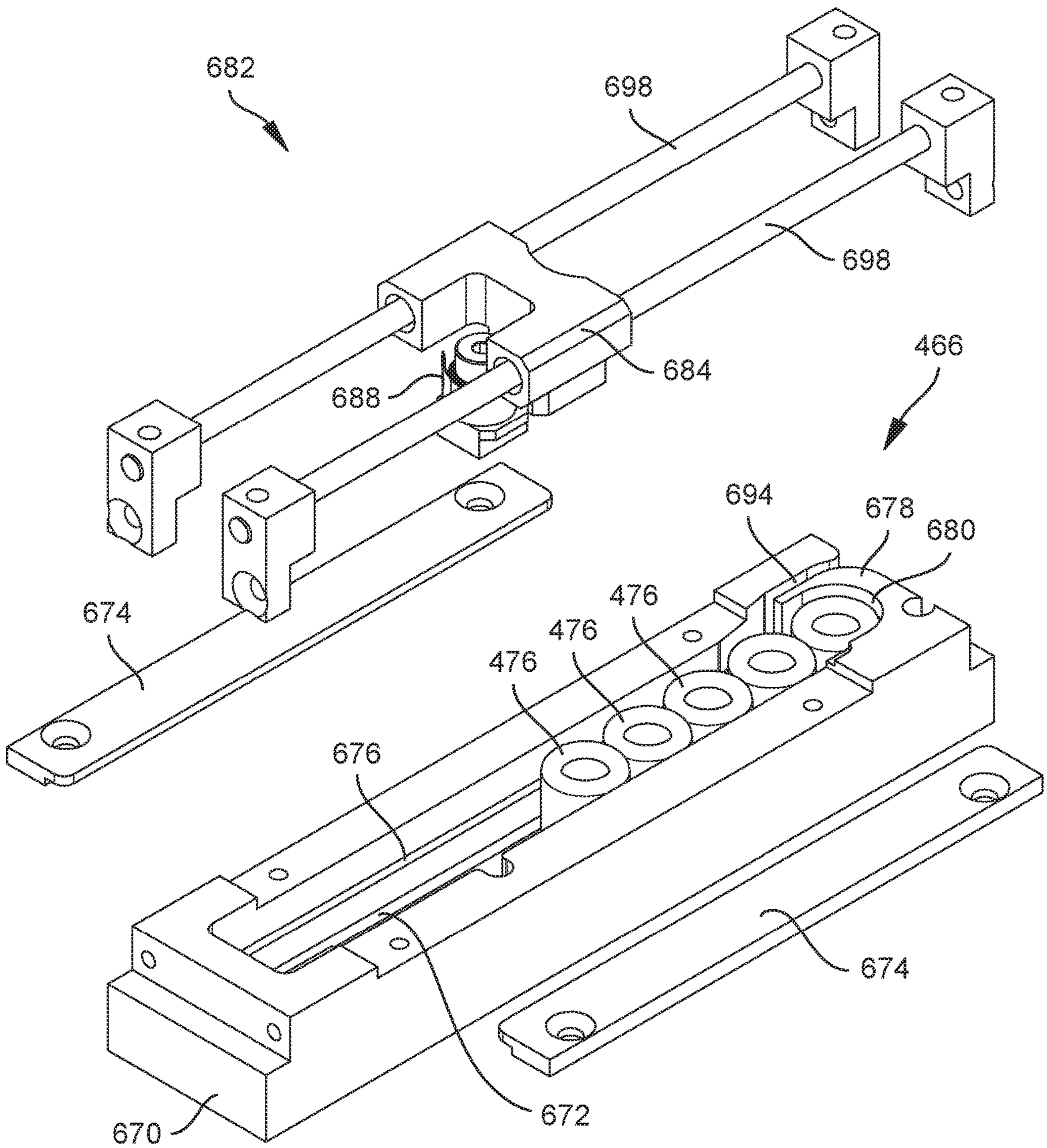
FIG. 94 depicts an exploded view of another example stopper dispenser.

Referring now to FIG. 94, an exploded view of another stopper magazine 466 is shown. As shown, the stopper magazine 466 may include a magazine body 670. The magazine body 670 may include a trough 672. The trough 672 may accept the stem or smaller diameter section of each of the stoppers 476. Thus the trough portion 672 may act as a guide for the stoppers 476 as they are displaced toward the exit port 690 (see, e.g., FIG. 95) of the stopper magazine 466. The trough portion 672 may be flanked on each side by a ledge 676 upon which the step region 512 of the stoppers 476 may rest. In the example embodiment, the stopper magazine 466 may also include two plates 674 which may attach to the magazine body 670 on opposite sides of the trough 672. The plates 674 may partially overhang the trough 672. The overhanging portion of these plates 674 may ensure that stoppers 476 do not fall out of the stopper magazine 466 during shipment or as the stopper magazine 466 is handled. Additionally, the exit port 690 may be at least partially surrounded by a guide wall 678. The guide wall 678 may be positioned in front of the exit port 690 so as to prevent stoppers 476 from advancing beyond the exit port 690. The guide wall 644 may also have a guide face 680 with a curvature which helps to position the head portion of the stoppers 476 in alignment with the exit port 690.

Figure 95:
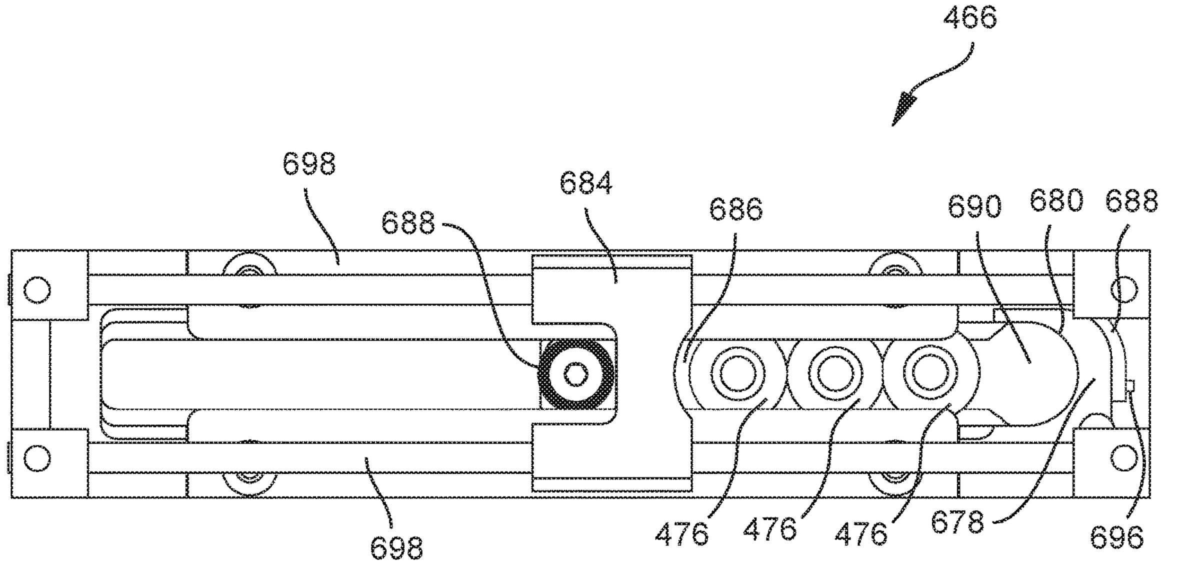
FIG. 95 depicts a top down view an example stopper dispenser with the stopper in line with the exit port of the dispenser having been dispensed.
Figure 96:
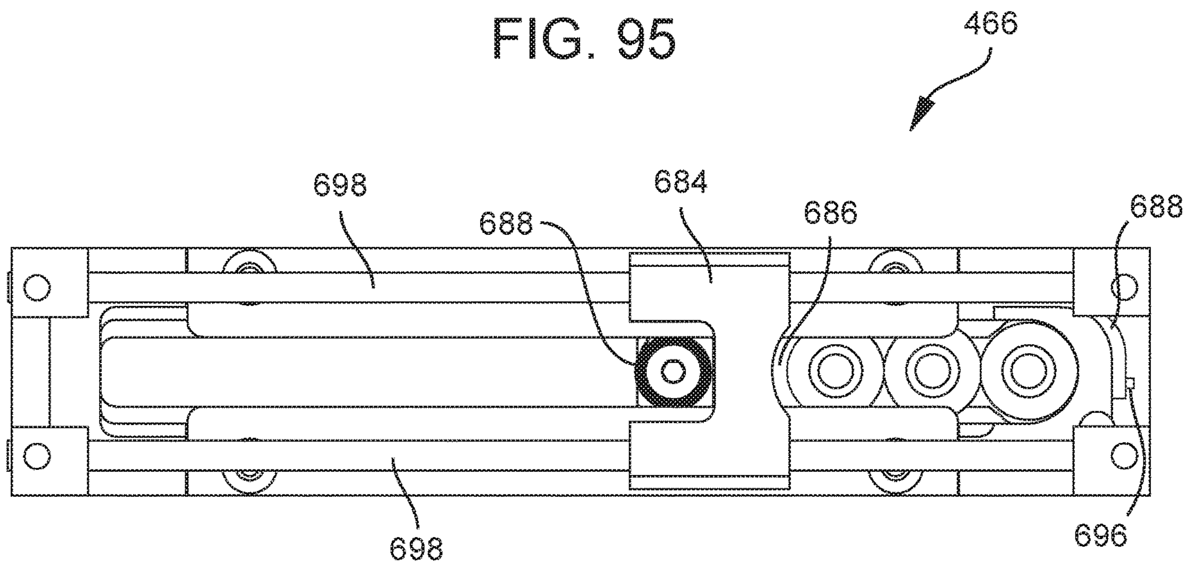
FIG. 96 depicts a top down view of an example stopper dispenser with a stopper advanced into alignment with an exit port of the dispenser via a bias force exerted on an example follower block of the dispenser.

Referring now also to FIGS. 95 and 96, the stopper magazine 466 may also include a follower assembly 682. The follower assembly 682 may include a follower block 684 which includes a follower 686. The follower 686 may include a stopper contacting face which has an arcuate shape that cradles the head or larger diameter portion of the stoppers 476. A bias member 688 may also be included in the follower assembly 682. In the example embodiment, the bias member 688 is shown as a constant force spring which is mounted to a mounting block 692 attached to the follower block 684. As shown best in FIG. 94, the magazine body 670 may include a routing channel 694 which allows an end of the constant force spring to be feed through the magazine body 670 to a mounting point on an external face of the guide wall 678. As shown in FIG. 95, for example, the end of the constant force spring may be coupled to the external face of the guide wall via a fastener 696. When a stopper 476 is dispensed out the exit port 690 of the magazine body 670, the bias member 688 may exert a force on the follower block 684 that displaces the follower block 684, follower 686, and any remaining stoppers 476 in the stopper magazine 466 toward the exit port 690. This may advance the next stopper 476 into alignment with the exit port 690. The follower assembly 682 in the example embodiment also includes two guide rails 698. The guide rails 698 may extend parallel to one another on opposing sides of the trough portion 672. These guide rails 698 may extend through the follower block 684 and guide displacement of the follower block 684 as stoppers 476 are dispensed from the stopper magazine 466. As in other stopper magazine 466 embodiments, mating pins 492 may be included to aid in mounting and detection of the stopper magazine 466 in the magazine receptacle 473.

Figure 97:
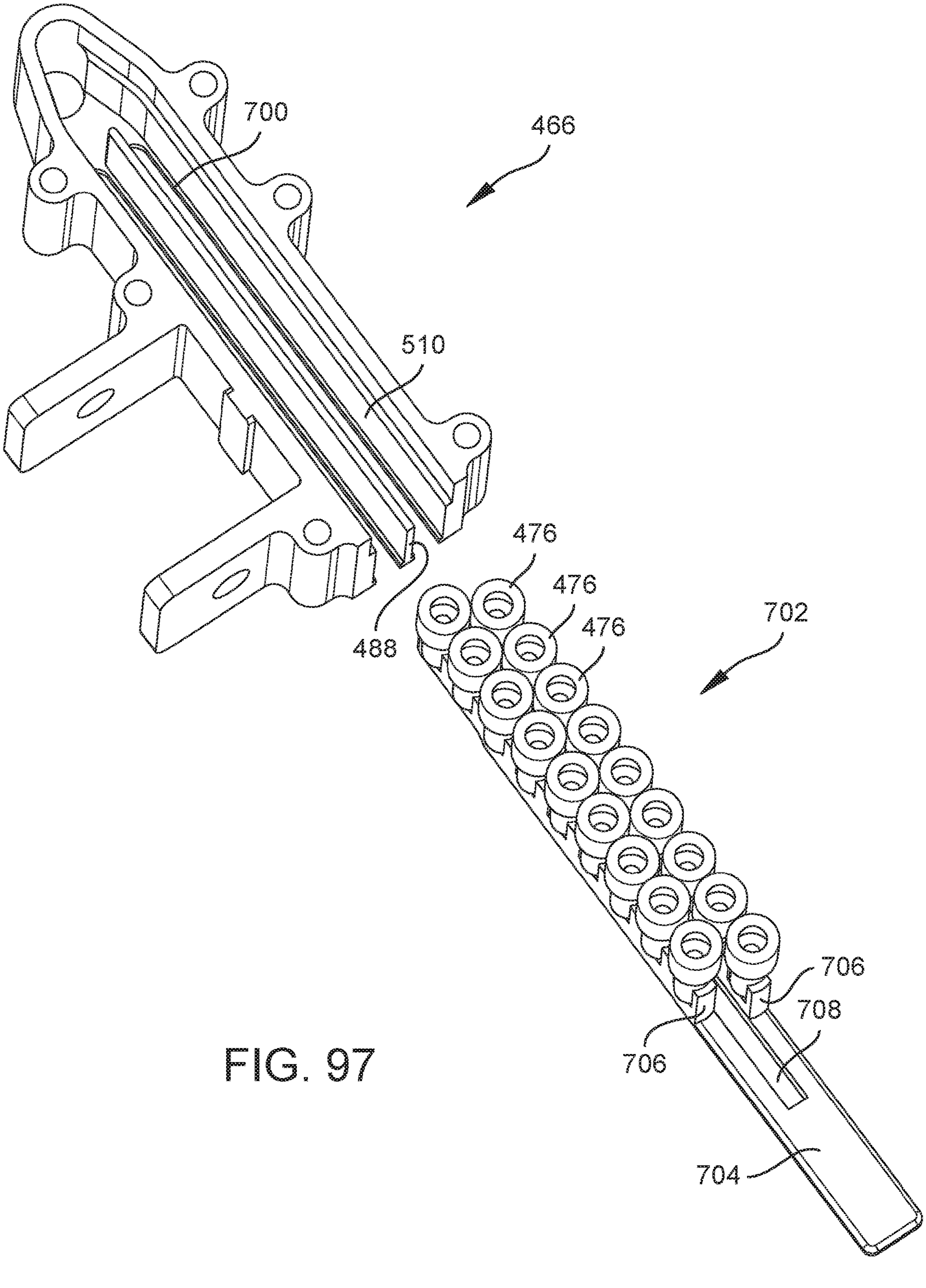
FIG. 97 depicts a perspective view of an example stopper dispenser and example speed loader.
Figure 98:
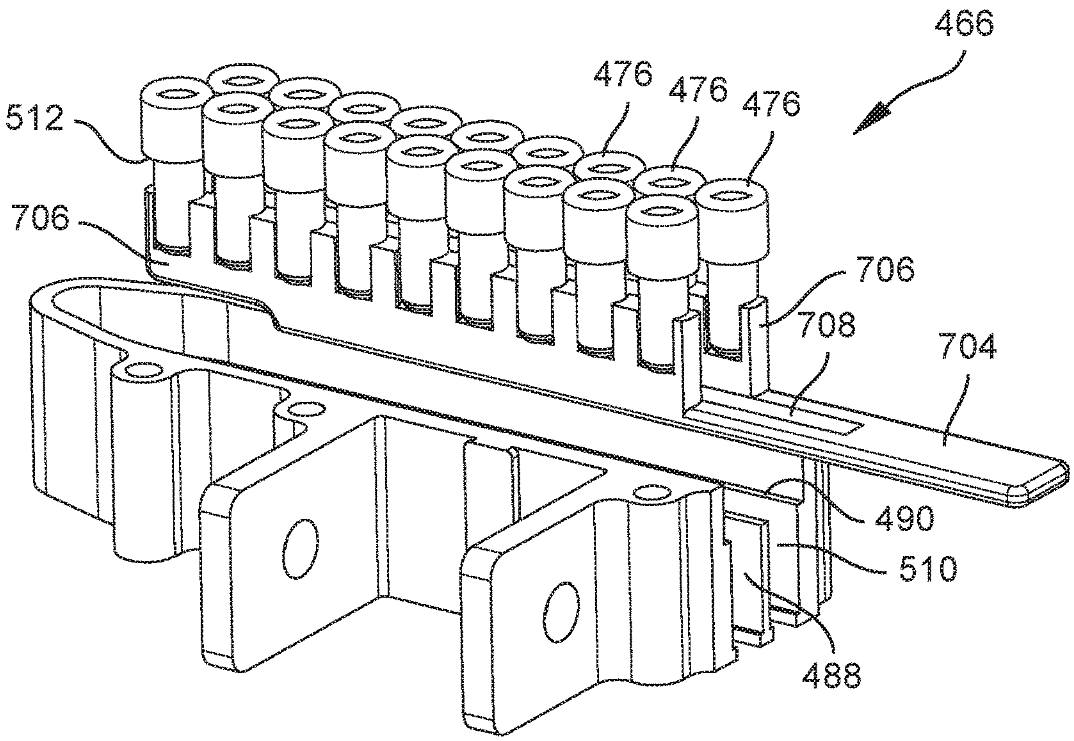
FIG. 98 depicts a perspective view of an example stopper dispenser and example speed loader.
Figure 99:
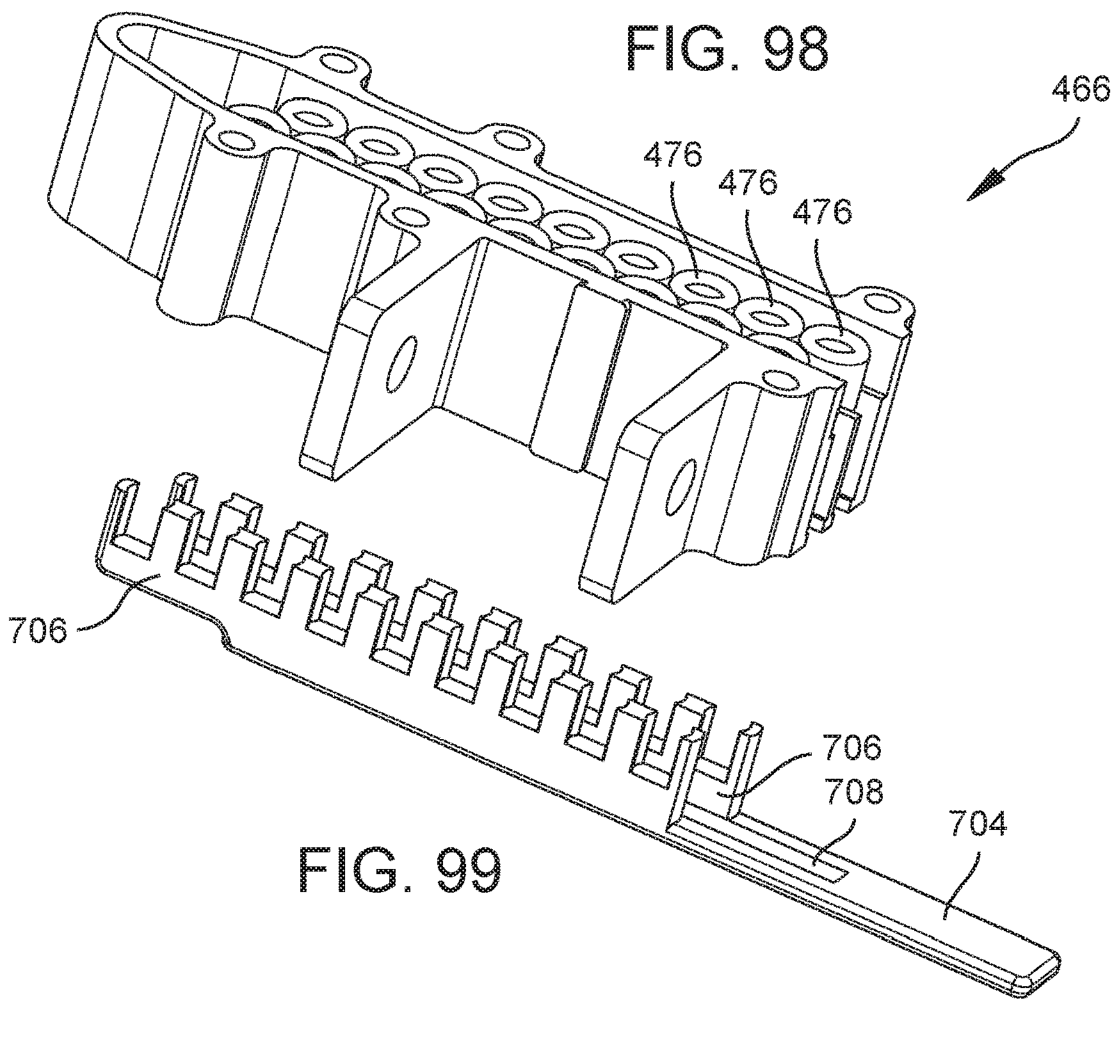
FIG. 99 depicts a perspective view of an example stopper dispenser which has been filled with stoppers by an example speed loader.

Referring now to FIGS. 97-99, yet another exemplary stopper magazine 466 is depicted. As shown, the stopper magazine 466 is similar to that shown in FIG. 74A, however, the stopper magazine 466 includes a slot 700 which extends through the bottom of each of the stopper troughs 510. These slots 700 may allow the stopper magazine 466 to be loaded with a speed loader 702. The speed loader 702 may include a plate 704 having stopper rack 706 which may hold a number of stoppers 476. The stopper rack 706 may define the spacing of the stoppers 476 on the speed loader 702. In the example embodiment, when stoppers 476 are placed into the stopper rack 706, the stoppers 476 may be arranged in a staggered double column type configuration appropriate for the stopper magazine 466. The speed loader 702 may be provided clean and sterile within an over pack. A user may maintain a stock of speed loaders 702 within the antechamber of the system 10 and the stopper magazine 466 may remain in place or may be integrated into the sealing station 358. As needed, speed loaders 702 may be opened and used to refill the stopper magazine 466 during bag 26 sealing operations.

Referring now primarily to FIGS. 98 and 99, to load stoppers 476 into the stopper magazine 466, the speed loader 702 may be positioned in alignment with an opening in the stopper magazine 466 and introduced into the stopper magazine 466. As in FIG. 74A, the magazine may include divider wall 488 which may separate and partially define each trough 510. The stopper magazine 466 may also include ridges 490 which flank each trough 510. The divider wall 488 and the ridges 490 may be at an even height with one another. The height may be selected such that a step region 512 on the stopper 476 where the stopper 476 may catch on the top face of the ridges 490 and dividing wall 488 so as to allow each stopper 476 to hang in its respective stopper trough 510. The plate 704 of the speed loader 702 may include a slit 708 which may allow the dividing wall 488 to pass through the plate 704 as the speed loader 702 is lowered. As the plate 704 is lowered, the top face of the ridges 490 and dividing wall 488 may begin to support the stoppers 476. At this point, the plate 704 may displace relative to the stoppers 476. The plate 704 may continue to be lowered until the stopper rack 706 portion of the plate 704 passes through the slots 700 in the stopper troughs 510 and the stoppers 476 are completely separated from the rack 706. The plate 704 may then be discarded and a follower assembly (e.g. follower assembly 470 of FIG. 72) may be displaced into contact with the stoppers 476 so as to allow stoppers 476 in the stopper magazine 466 to automatically advance as they are dispensed from the stopper magazine 466.

Figure 100:
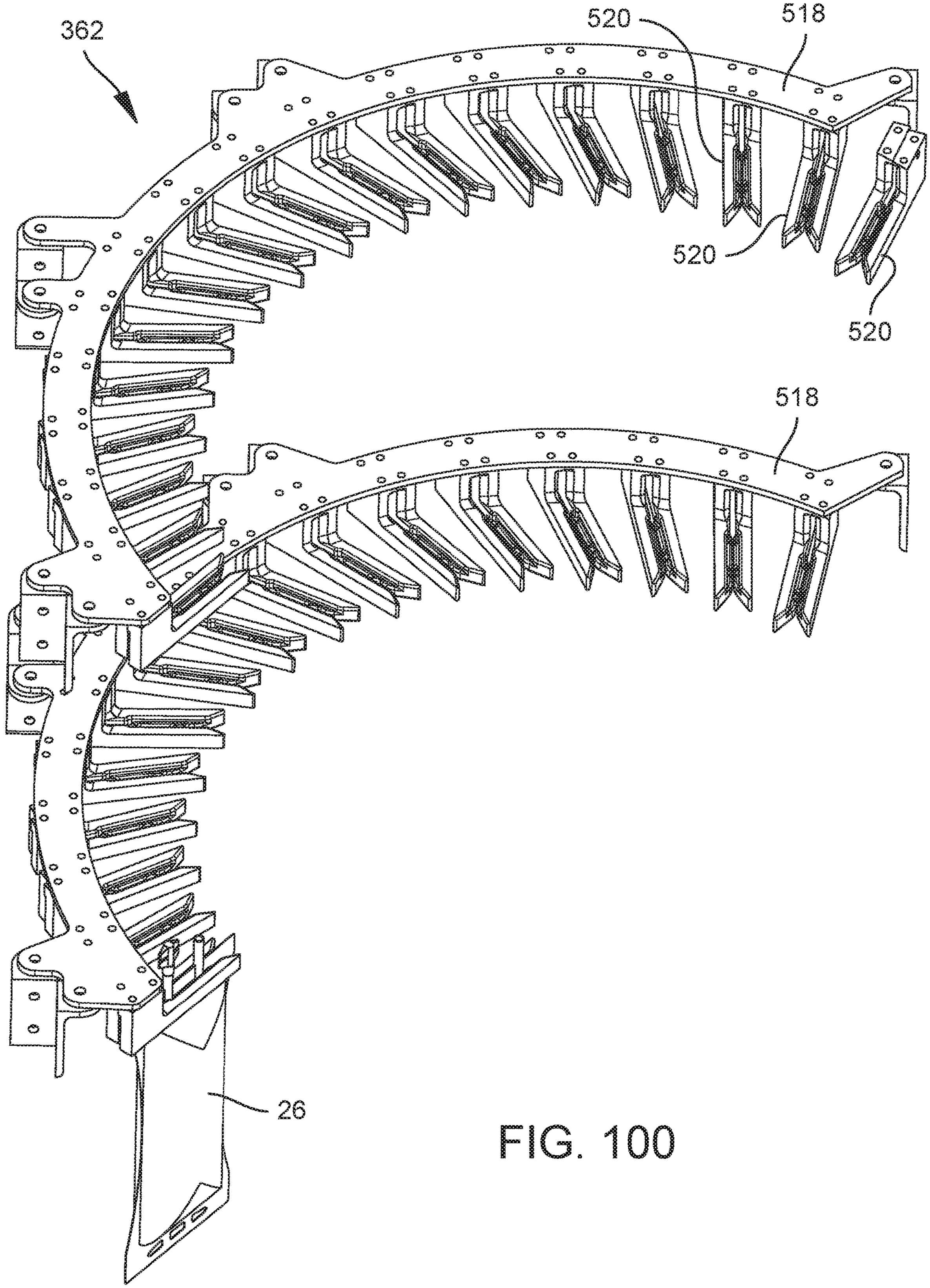
FIG. 100 depicts a perspective view of an example quarantine repository.

Referring now to FIG. 100, an exemplary quarantine repository 362 is depicted. As shown, a quarantine repository 362 may include a number of racks 518. In the example embodiment two racks 518 are shown. In other embodiments a greater number of racks 518 or only a single rack 518 may be included. Each rack 518 may include a number of holders 520 which may support a filled and sealed bag 26. The holders may be reservoir hangers from which a filled bag 26 may be hung. Only one bag 26 is depicted in place on a holder 520 in FIG. 100. In the example embodiment, 17 holders 520 are included on each rack 518. Other embodiments may include less holders 520 on each rack 520 or may include a greater number of holders on each rack 520.

Figure 101:
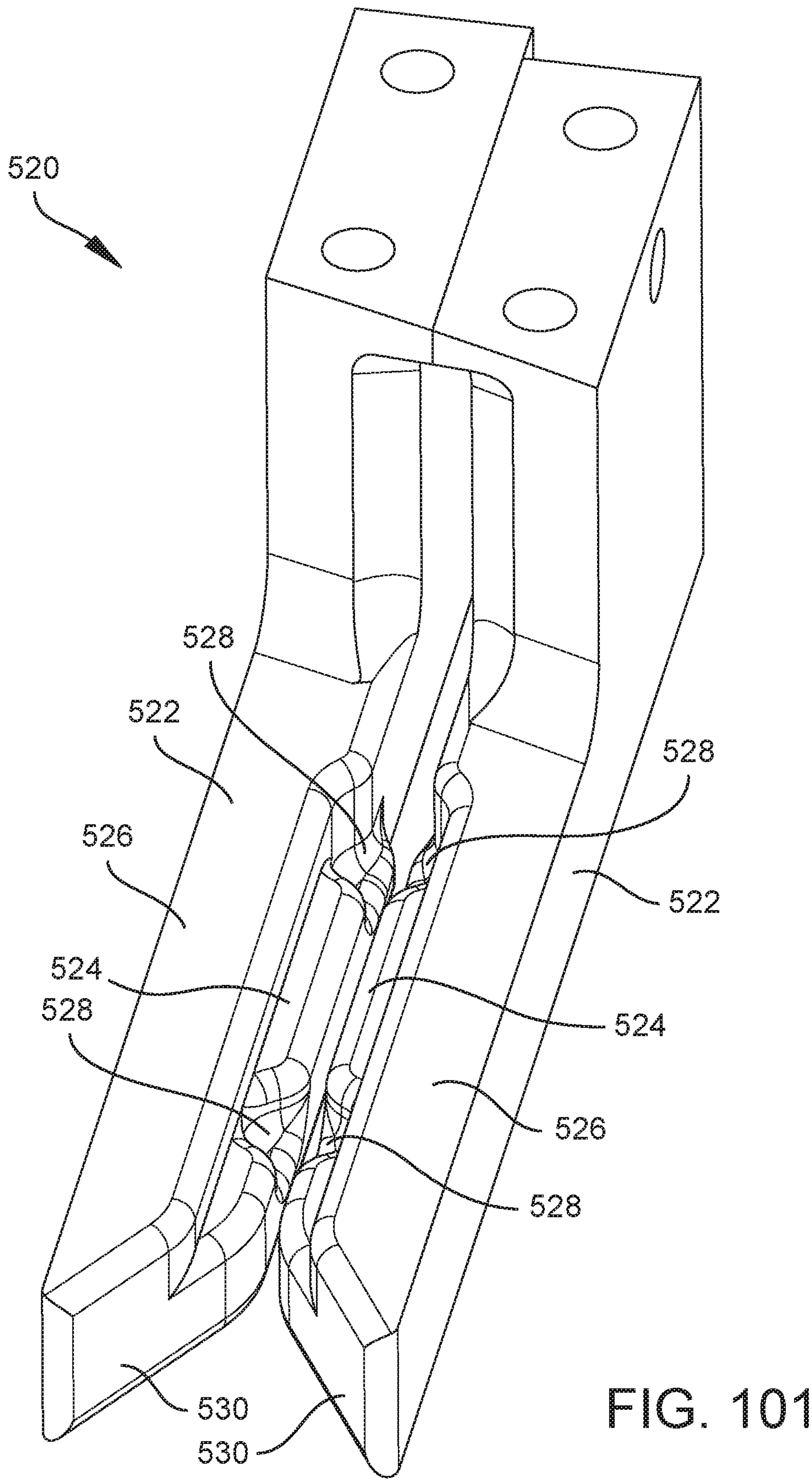
FIG. 101 depicts a perspective view of an example holder which may be included in a quarantine repository.

FIG. 101 depicts an example holder 520. The holder 520 may include a set of arms 522. Each of the arms 522 may substantially be a mirror image of the other. As shown, the arms 522 each include a ledge 524 which is recessed with respect to the top face 526 of that arm 522. As shown, each of the ledges 524 also includes a set of depressions 528. The depressions 528 may be spaced from one another a distance equivalent to the spacing of the ports 392 of the bags 26. Each arm 522 also includes a ramped face 530 at the terminus of the arm 522 most distal to the mounting portion of the arm 522 to the rack 518. The ramped faces 530 may act as a guide which helps direct the bag 26 into a small gap which may be present between each of the arms 522. The robotic arm 360 may advance a bag 26 to each of the holders 520. As the bag 26 is displaced into the holder 520, the two arms 522 may resiliently splay apart to aid in accepting the bag 26. The bag 26 may be guided into the holder 520 such that the ports 392 rest in the depressions 528 in each arm 522. As the ports 392 have a diameter which is larger than the gap between the arms 522, the bag 26 may be unable to slip through the holder 520. Thus, the two arms 522 may form a cradle for the bag 26. As shown, edges of the ledges 524 and depressions 528 may be rounded so as to prevent contact of the bag 26 with any sharp faces.

Figure 102:
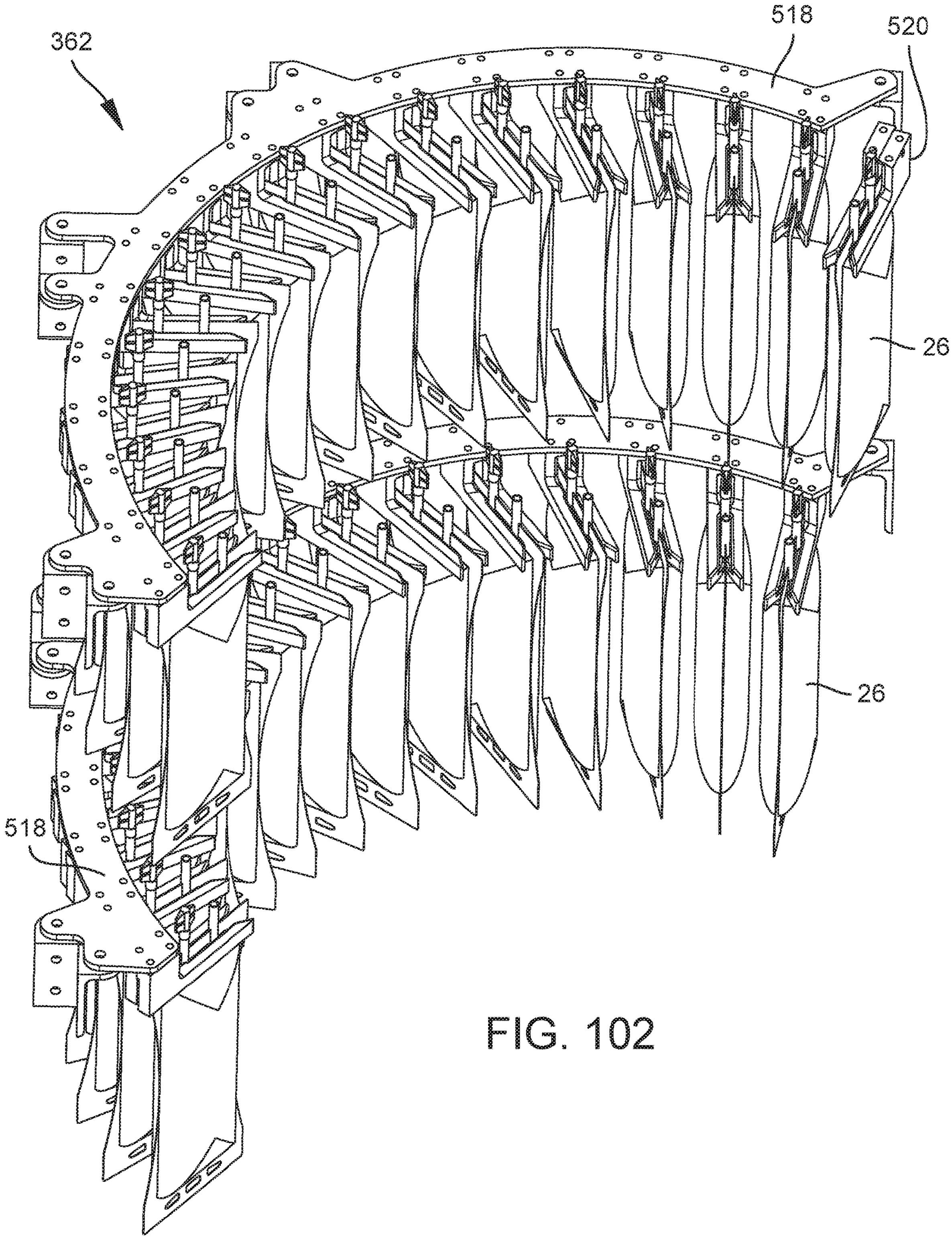
FIG. 102 depicts a perspective view of an example quarantine repository which has been filled to capacity with bags.

Referring now to FIG. 102, the quarantine repository 362 may be completely filled with bags 26 in certain embodiments. In other embodiments, the quarantine repository 362 may be stocked with bags 26 in a manner which depends on the type of bags 26 being used. For example, when bags 26 filled to greater than some predetermined volume are being generated, the control system 15 may command the robotic arm 360 to place bags 26 at every other holder 520. This may mitigate the potential for the quarantine repository to become overcrowded and make hanging of additional bags 26 problematic. Where bags 26 filled to a lesser volume than the predetermined volume are being generated, every holder 520 may be populated with a filled bag 26.

Figure 103:
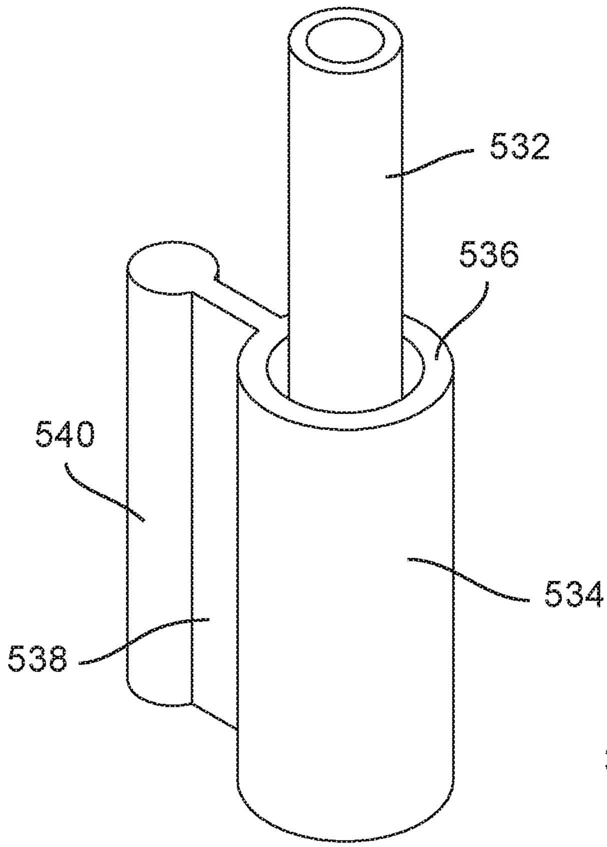
FIG. 103 depicts a perspective view of an example sampling fixture having a vial installed therein.
Figure 104:
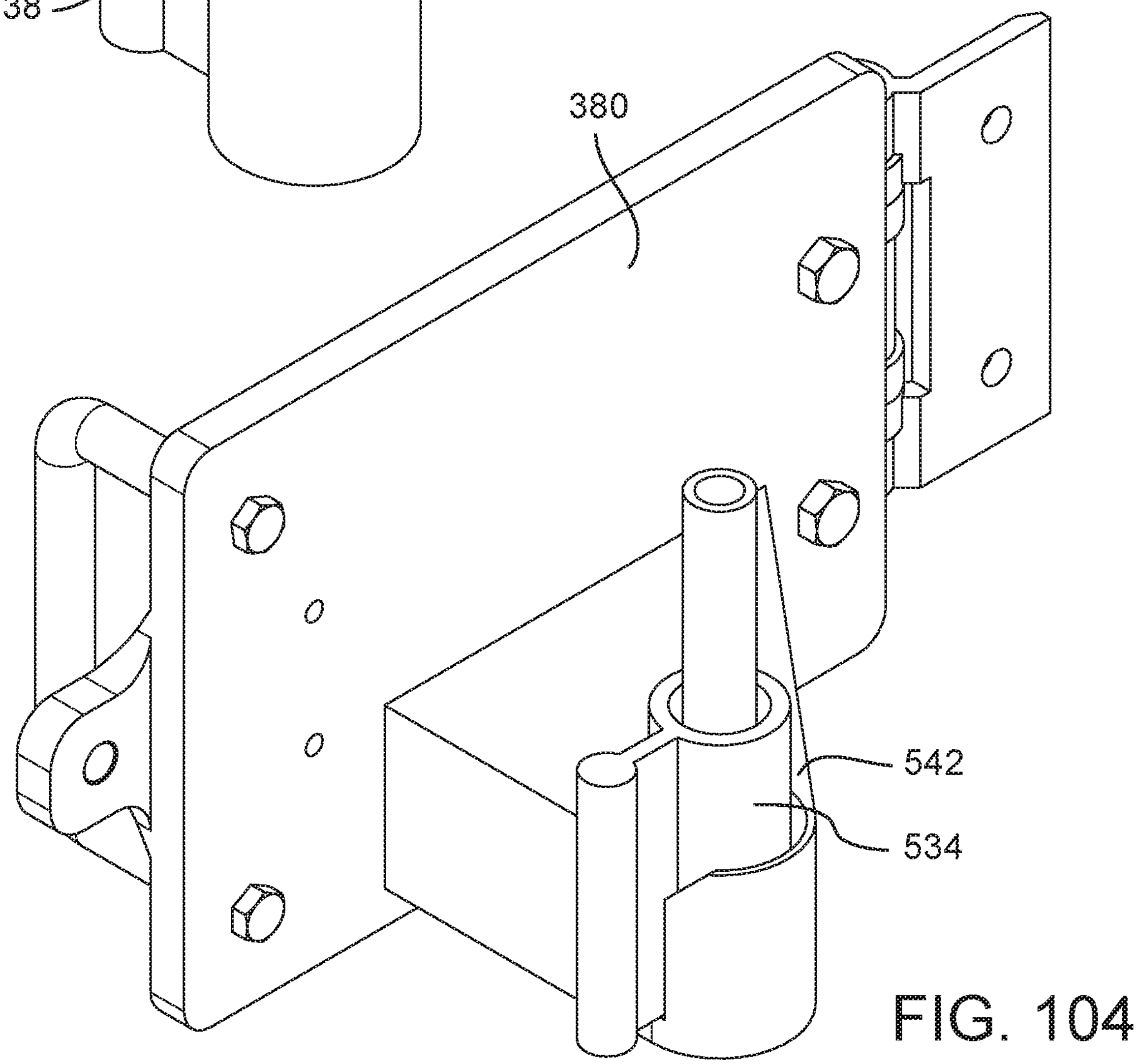
FIG. 104 depicts a perspective view of an example vial access door and example sampling fixture with a vial installed therein.

Referring now also to FIGS. 103 and 104, the bags 26 may remain in the quarantine repository 362 while one or more test is completed. In certain embodiments, a test which monitors for pyrogens may be conducted prior to release of the bags 26 from the quarantine repository 362. For example, the control system 15 may generate a notification on its user interface that a test is due. A user may place a vial 532 in a sampling fixture 534 which may then be passed into the second section 98 of the enclosure 12 via a vial access door 380. The vial 532 may be treated in a depyrogenation oven prior to use and may be provided in an over pack 60 which is only to be opened within the antechamber of the enclosure 12. The sampling fixture 534 may include a cupped portion 536 within which the vial 532 may be placed. To introduce the vial 532 into the second section 98 of the enclosure 12, the vial access door 380 may be opened such that the user may access a receptacle 542 attached to the side of the vial access door 380 which faces the second section 98 of the enclosure 12. The sampling fixture 534 may be docked into the receptacle 542 and the vial access door 380 may again be closed.

The sampling fixture 534 may have an offshoot 538 which includes an enlarged segment 540. The enlarged segment 540 may be shaped so as to mimic the dimensions of a port 392 of a bag 26. This may allow the grasper 418 on a robotic arm 360 to collect the sampling fixture 534 and displace it around the second section 98 of the enclosure 12. The robotic arm 360 may displace the sampling fixture 534 and vial 532 to the filling station 356 and the control system 15 may command an aliquot of fluid to be dispensed into the vial 532. The robotic arm 360 may then return the sampling fixture 534 and vial 532 to the receptacle 542 of the vial access door 380. The vial access door 380 may again be opened by the user and the vial 532 may be removed and installed in a pyrogen testing apparatus such as an endotoxin monitor.

Typically, the bags 26 may be held in the quarantine repository 362 until at least a first and second pyrogen test are completed and indicate a pyrogen content below a predefined amount (e.g. some predefined EU/mL threshold). The first pyrogen test may be a pyrogen test on a fluid sample collected before any bags 26 currently in the quarantine repository 362 had been filled. The second test may be a pyrogen test on a sample of fluid collected after all of the bags 26 in the quarantine repository 362 have been filled. In some embodiments, this second test may double as the first test for a next grouping of bags 26 to be filled by the system 10. In some embodiments, additional pyrogen testing may be conducted.

In alternative embodiments, a pyrogen test may be made after each rack 518 of the quarantine repository 362 is filled to capacity. This may be desirable as the pyrogen test may take some time (e.g. ~15 minutes) to complete. This may allow the system 10 to continue filling bags 26 as pyrogen testing is completed. One rack 518 may be tested while a second rack 518 is filled. By the time the second rack 518 is filled with bags 26, the pyrogen testing for the first rack 518 may have completed and the bags 26 may be ready for labeling and dispensing from the system 10. This may help to increase efficiency of the system 10 as there may not be a down time while the pyrogen test is completed where filling of bags 26 must be halted in order to free up space in the quarantine repository 362.

Figure 105:
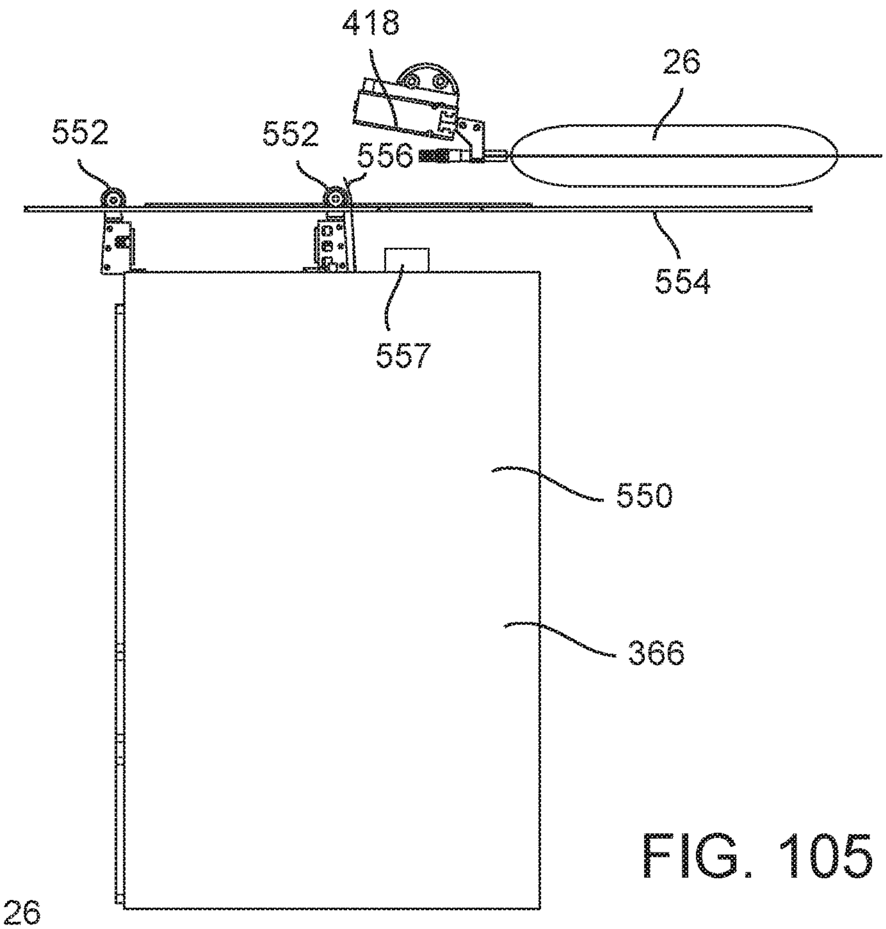
FIG. 105 depicts a side view of an example labeling assembly and a bag being displaced to the labeling assembly by a robotic grasper.
Figure 106:
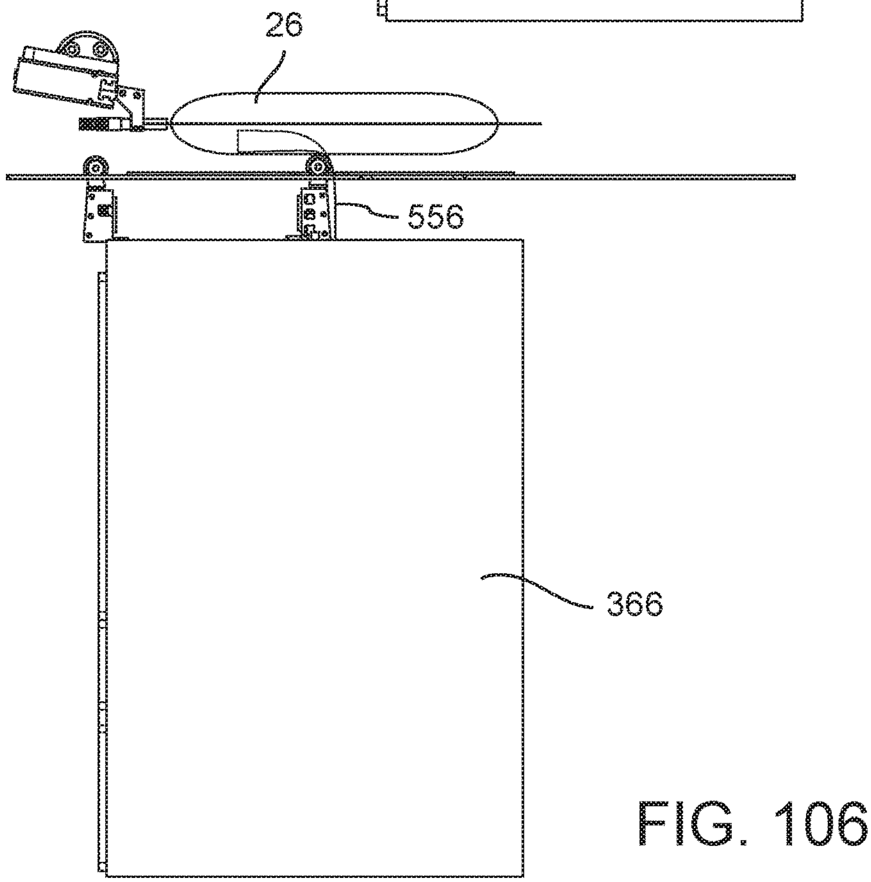
FIG. 106 depicts a side view of an example labeling assembly with a bag in the process of being labeled.
Figure 107:
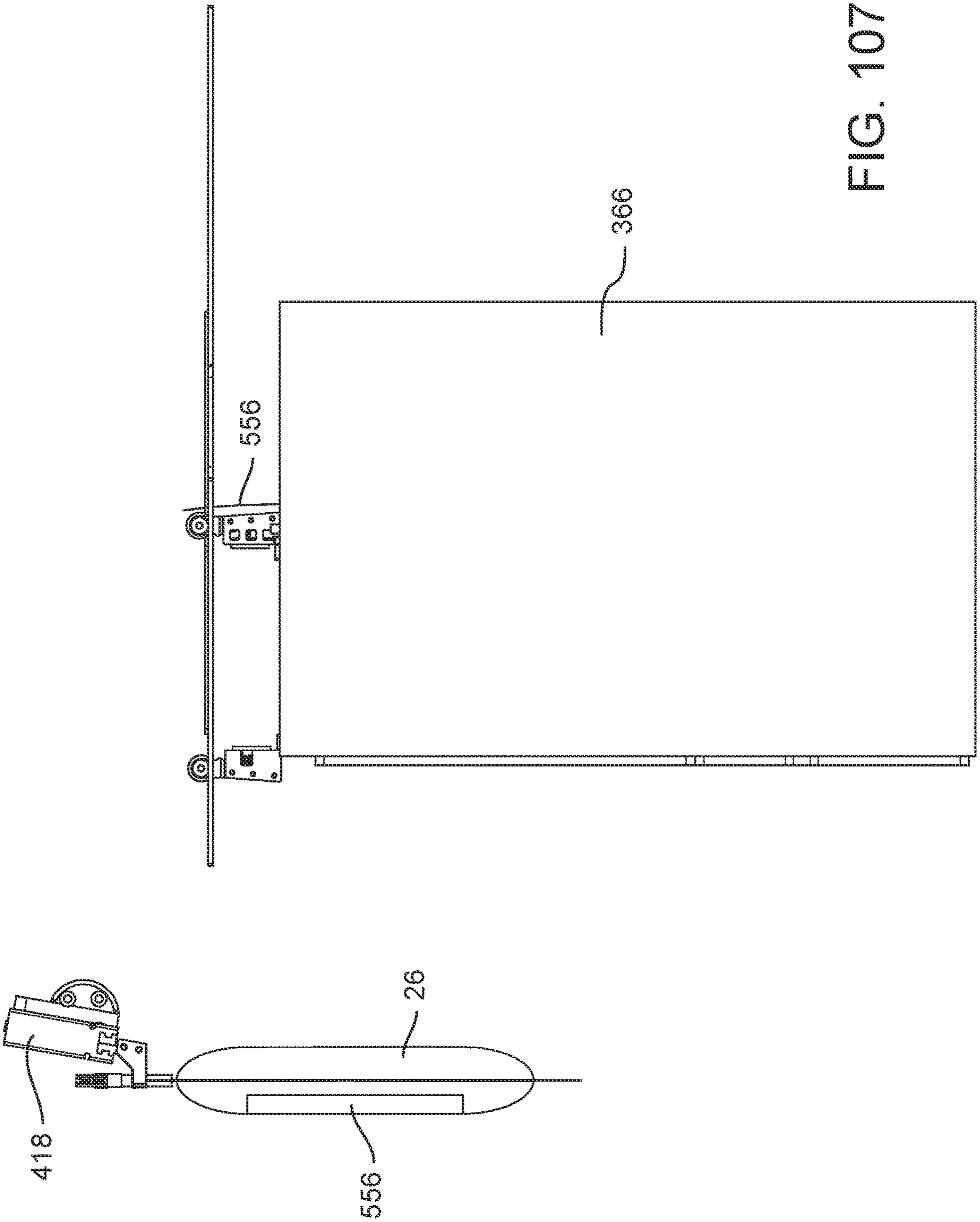
FIG. 107 depicts a side view of an example labeling assembly with a grasper holding a bag which has been labeled at the labeling assembly.

Referring now to FIGS. 105-107, before bags 26 are dispensed from the system 10, the bags 26 may be labeled. FIG. 105 depicts an example labeler 366. The labeler 366 may generate labels which may be adhered to each bag 26 by via adhesive. The labeler 366 may be a thermal transfer ribbon type labeler in certain embodiments. As shown, the labeler 366 may include a housing 550 which may enclose a supply of blank labels and the various printing components of the labeler 366. The labeler 366 may also include one or more roller 552. The robotic arm 360 (only the gripper 418 of the robotic arm 360 is shown in FIG. 105 for ease of illustration) may displace a bag 26 to the labeler 366 once, for example, a lot of bags 26 in the quarantine repository 362 have passed testing. The bag 26 may be pulled across a plate 554 including a feed slot through which a label 556 extends. The label 556 may adhere to the surface of the bag 26 and the bag 26 may be pulled across the rollers 552. The weight of the bag 26 and its contents may help to couple the label 556 securely to the bag 26 as the bag 26 displaces over the rollers 552.

A label sensor 557 (see FIG. 56) may be included to monitor for the presence of a label 556. The control system 15 may receive an output signal from the label sensor 557 and analyze the signal to determine whether a label 556 was applied to the bag 26. Additionally, the control system 15 may analyze the signal to ensure that a label 556 is present before displacing the bag 26 to the labeler 336 for application a label 556. Thus the control system 15 may analyze the label sensor 557 to determine whether a label supply in the labeler 366 is empty or an error state is present. The control system 15 may generate a label supply empty notification or labelling error based on data received from the label sensor 557

Figure 108:
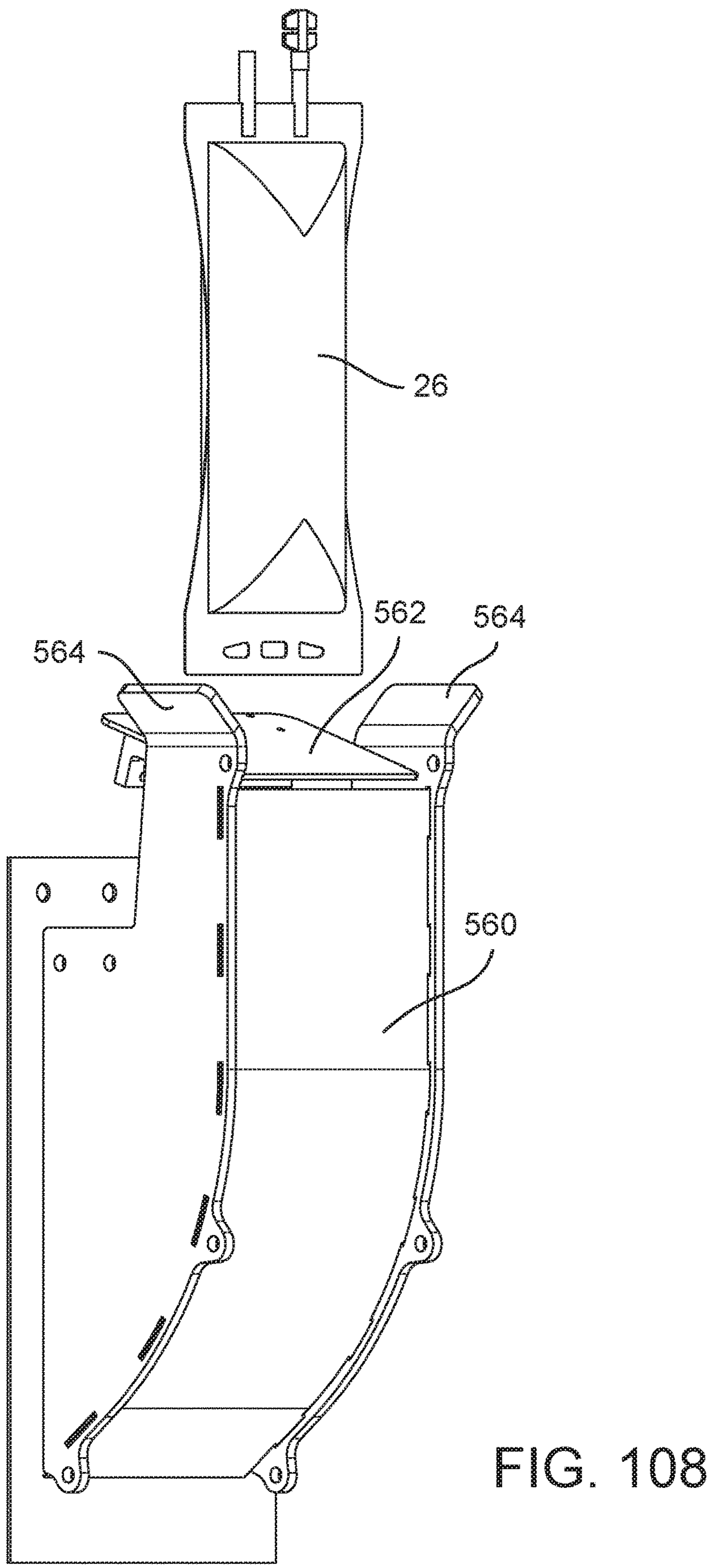
FIG. 108 depicts a perspective view of an example output chute which may be included in a system.
Figure 109:
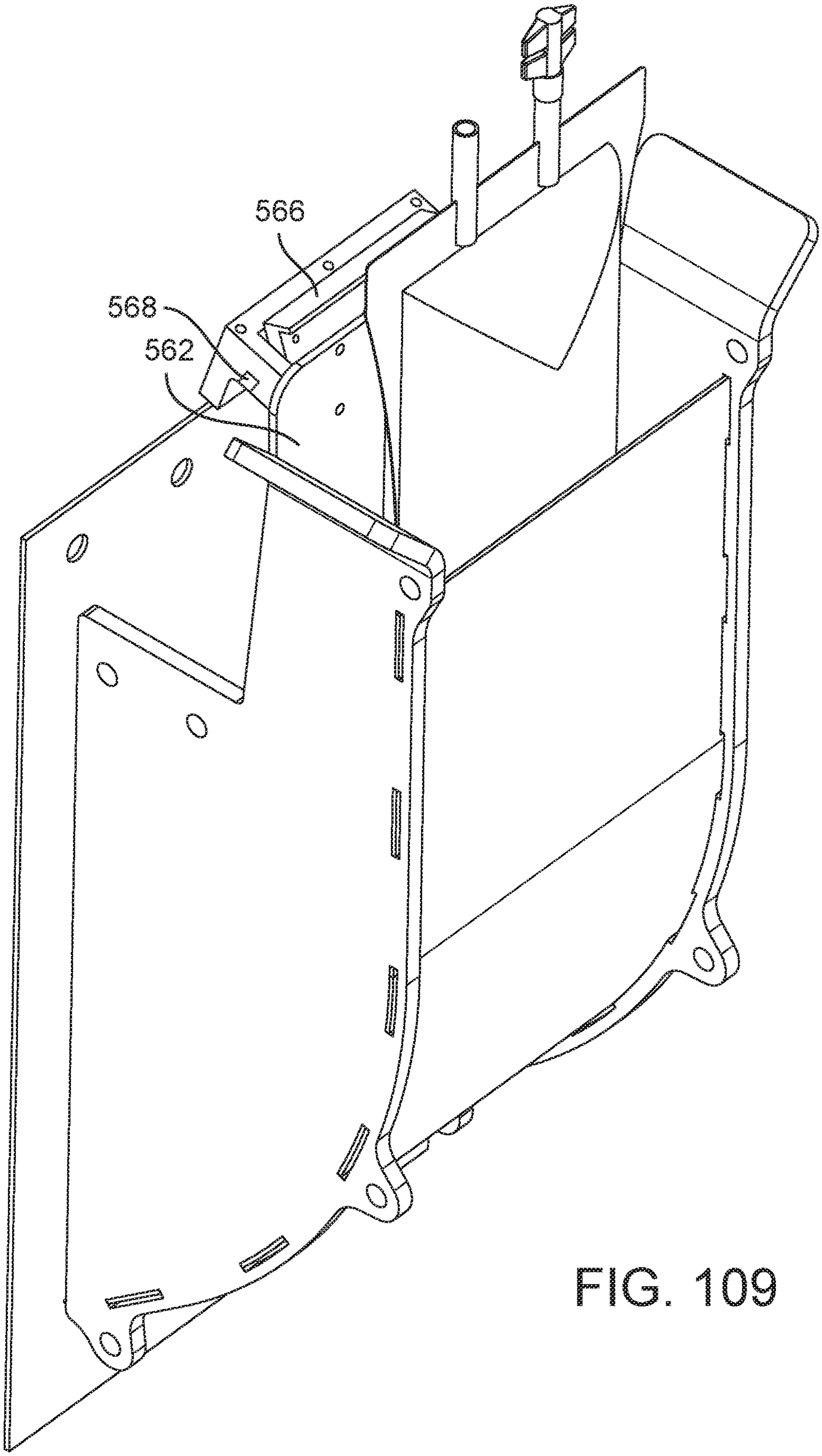
FIG. 109 depicts a perspective view of a bag being deposited in an example output chute.
Figure 110:
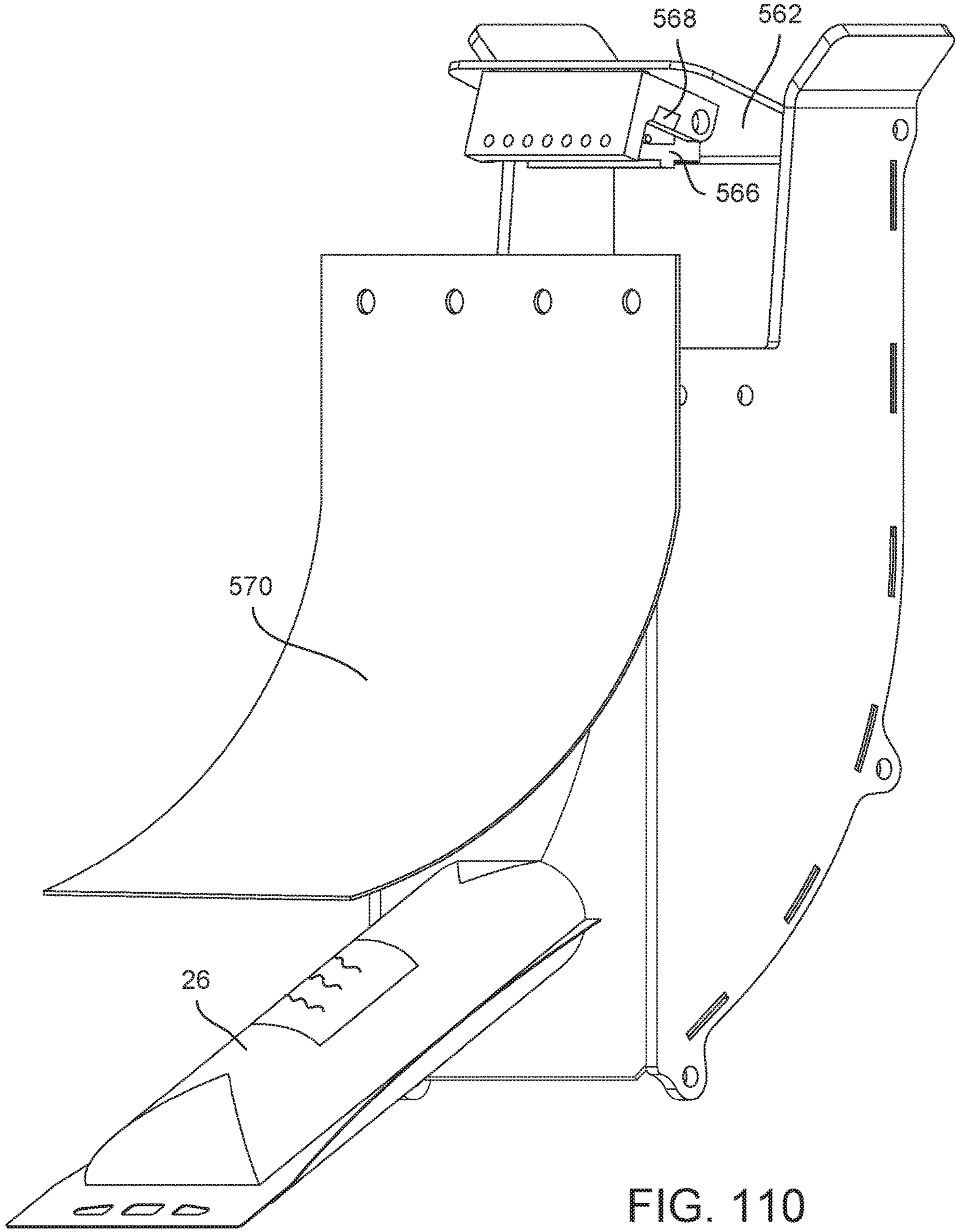
FIG. 110 depicts a perspective view of a bag exiting an example output chute.

Once labeled, and referring now to FIGS. 108-110, the robotic arm 360 may displace the bag 26 to an outlet of the enclosure 12. In the example shown in FIGS. 108-110 the outlet is shown as a chute 560. The chute 560 may include a top opening which is cover by a door flap 562. Additionally, the chute 560 may include funneling arms 564 which may help direct bags 26 into the chute 560 as they are dropped by the grasper 418 of the robotic arm 360. When bags 26 are dropped into the chute 560, the door flap 562 may be rotated out of the way by the weight of the bag 26. A bias member such as a torsion spring may be included to return the door flap 562 to a closed orientation. As best shown in FIGS. 109 and 110, the door flap 562 may be attached to a sensing projection. As the door flap 562 is displaced, the sensing projection 566 may displace so as to allow a door sensor 568 to pick up the movement of the door. Any suitable sensor may be used. For example, the door sensor 568 may be an optical sensor such as a beam interrupt sensor or reflection based sensor. The door sensor 568 may alternatively be a magnetic based sensor such as a hall effect sensor. The door flap 562 may include a magnet in such embodiments. A micro switch or button which is mechanically actuated by displacement of the sensing projection 566 as the door flap 562 is displaced may also be used in certain examples. An encoder may monitor displacement of the pivot pin on which the door flap 562 is mounted. Other types of sensing arrangements are also possible. As the bag 26 travels along the chute 560, the bag 26 may push open an exit flap 570 as it is delivered out of the enclosure 12. The exit flap 570 may be a rigid hinged door or may be a flexible piece of material as depicted in FIG. 110.

The control system 15 of the system 10 may monitor the door sensor 568 to ensure that the system 10 is operating as expected. For example, when the control system 15 commands the robotic arm 360 to release a bag 26 into the chute 560, the control system 15 may check to ensure that the door sensor 568 registers that the door flap 562 has opened. The control system 15 may also check to ensure that the door sensor 568 indicates that the door flap 562 has returned to a closed state. In the event that the door sensor 568 does not indicate that the door flap 562 has opened when a bag 26 is released, the control system 15 may generate a notification or alert on a user interface of the system 10. The control system 15 may also generate a notification in the event that the door flap 562 does not close. The notification may indicate to the user to check that there are no items blocking the exit flap 570 and causing bags 26 to back up in the chute 560 for example.

In the event that a bag 26 is deemed to be unacceptable, the bag 26 may be dispensed from the enclosure 12 without a label 556. For example, where the bag 26 is in the quarantine repository 362, the bag 26 may be retrieved from the quarantine repository 362 and dispensed unlabeled 556. During filling of the bag 26 at the filling station 356, when composition sensors indicate that the fluid filled into the bag 26 does not conform to a predefined target composition range, the bag 26 may be sealed and dispensed from the enclosure 12 outlet. No label 556 may be applied. In alternative embodiments, a label 556 may be generated from the bag 26 which conspicuously indicates that the bag 26 is not to be used. For example, a label 556 reading "NOT FOR HUMAN USE" or the like may be generated and applied to the bag 26 before dispensing.

Figure 111:
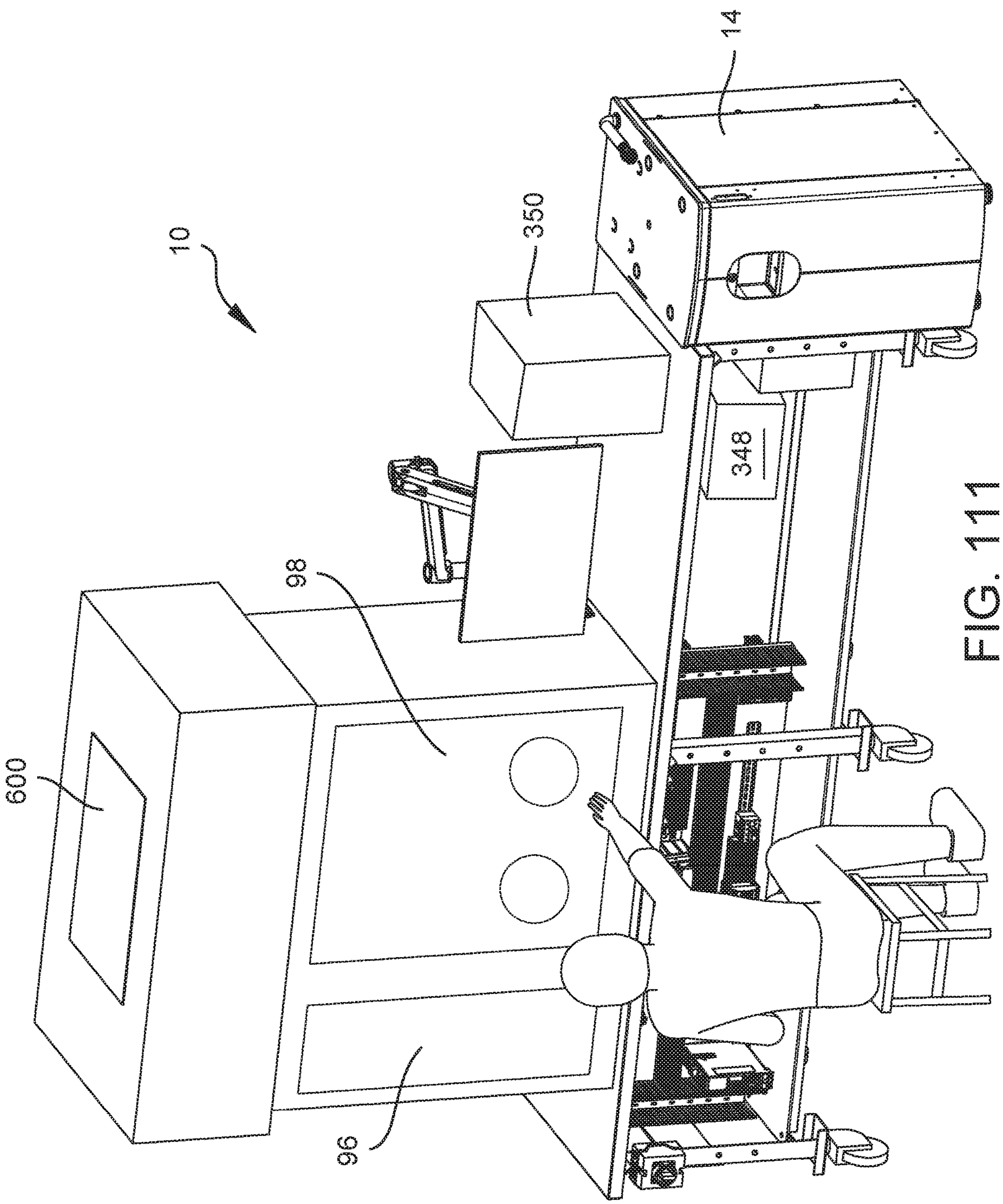
FIG. 111 depicts a perspective view of another example system for producing and packaging medical fluids.

Referring now to FIG. 111, another exemplary system 10 for producing and packaging medical fluids is depicted. As shown, the system 10 may include a medical water production device 14 such as any of those depicted herein. The system 10 may also include a mixing circuit 348 for generating a specified solution (e.g. 0.9% saline). The system 10 may include a sensor suite 350 which may monitor the quality of purified water produced by the medical water production device 14 and may monitor the solution generated by the mixing circuit 348. The sensor suite 350 may include any number of different types of water quality sensors. Any water quality sensors described herein may be included. An example mixing circuit 348 and an example sensor suite 350 are described later in the specification.

The system 10 also includes an enclosure 12. The enclosure 12 may provide a clean room environment for the components of the system 10 contained therein. The enclosure 12 itself may also be contained within a clean room environment. In such embodiments, the enclosure 12 may be maintained at a higher clean room standard than the room in which it is located. In some embodiments, the enclosure 12 may be held at positive pressure by a blower system 600.

In the example embodiment, the enclosure 12 is partitioned into a first section 96 and a second section 98. Each of these sections may be held at slightly different positive pressures. For example, the first section 96 may be held at a first pressure which is positive with respect to the surrounding environment. The second section 98 may be held at a pressure higher than the first pressure. Filling of bags 26 may occur in the most stringently controlled environment of the system 10. Various filters such as HEPA filters may be included to help ensure any air blown into the enclosure 12 to maintain positive pressure is clean.

Figure 112:
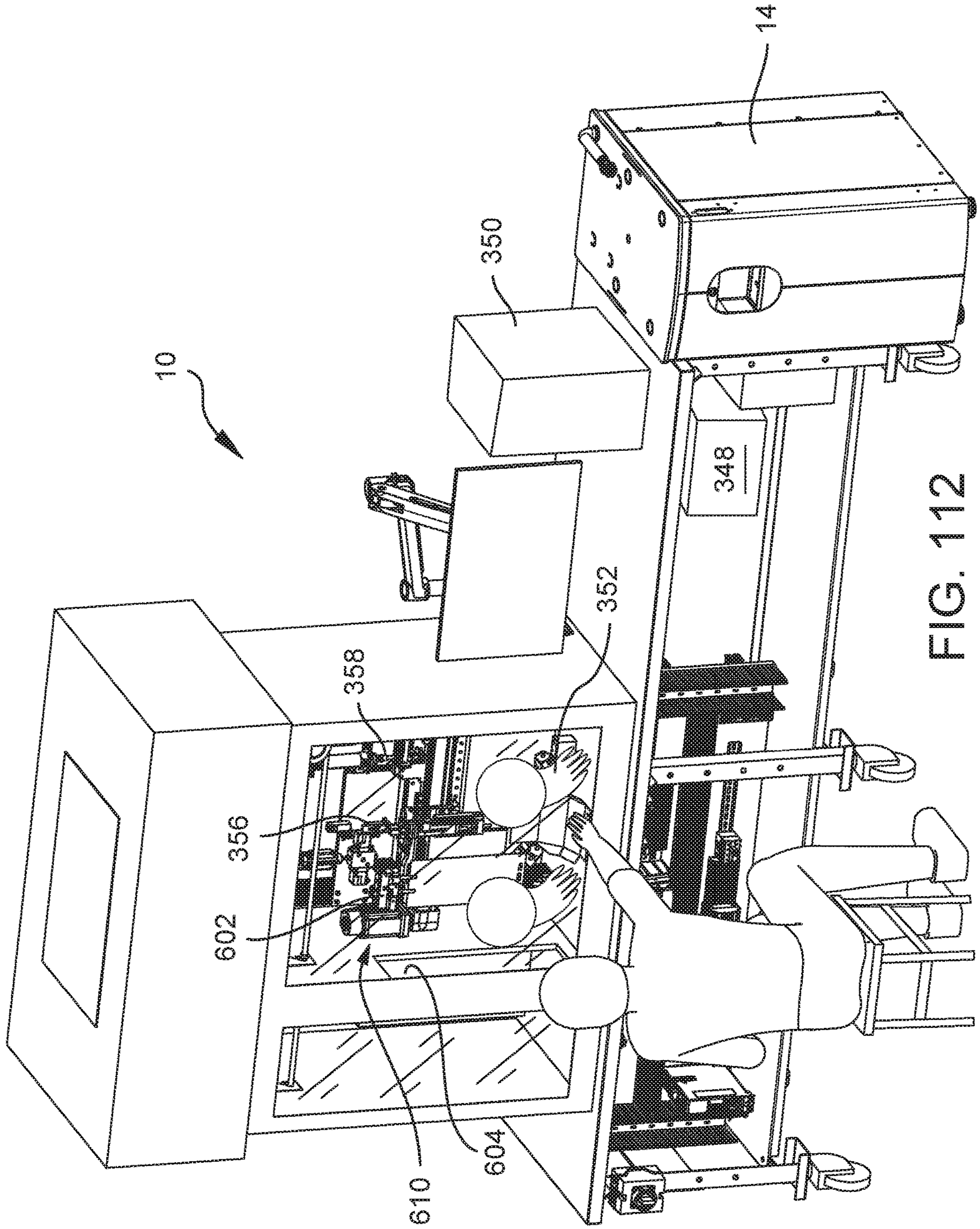
FIG. 112 depicts another perspective view of the system for producing and packaging medical fluids of FIG. 111 with portions of the enclosure of the system depicted as transparent.

Referring now also to FIG. 112, the first section 96 may be an antechamber which may be utilized for preparing various consumables used by the system 10. For example, a stock of bags 26 may be placed in the antechamber. Stopper magazines 466 (such as any of those described herein) may also be stocked within the antechamber. Sampling vials 532 (see, e.g., FIG. 103) may also be kept in stock within the antechamber. This may help to minimize the need to access the interior of the enclosure 12 during operation of the system 10. The first section 96 may also include certain testing equipment that may be used to verify bags 26 have been filled according to predefined criteria. Sampling ports in the fluid circuit may be accessible via the antechamber as well.

The second section 98 may be constructed as a glove box type enclosure with gloved interfaces 352 which may be used to manipulate certain components of the system 10 within the enclosure 12. The second section 98 may include a filling subsystem 610 of the system. A filling subsystem 610 may include a bag retainer 602, filling station 356, and a sealing station 358. A bag 26 may be collected from the antechamber through a door 604 between the first section 96 and second section 98 of the enclosure 12 via the gloved interfaces 352. This bag 26 may be placed at the bag retainer 602. A robotic manipulator 606 including a grasper may collect the bag 26 from the bag retainer 602 and displace the bag 26 to the filling station 356. Fluid may be dispensed into the bag 26 at the filling station 356. This fluid may be purified water (e.g. WFI water), or a mixture of fluid generated at a mixing subsystem similar to those described in relation to FIG. 2A and FIG. 2B. Bags 26 may also include a concentrate as described above in relation to FIGS. 5A-6 for example. From the filling station 356, the robotic manipulator 606 may displace the filled bag 26 to a sealing station 358. An access to the interior volume of the bag 26 may be sealed closed at the sealing station 358 (e.g. via stoppering, RF welding, etc.).

As shown, the example embodiment includes a bag retainer 602 which may hold a single bag 26 at a time. In alternative embodiments, the bag retainer 602 may be replaced by a bag feeder 354 similar to that described above in relation to FIGS. 59-65 for example. Similarly, the bag feeder 354 shown in the example system 10 in FIG. 58 may be replaced by a bag retainer 602. A bag retainer 602 may be useful in implementations where only a small amount of bags 26 need to be produced or where a system 10 with a smaller footprint may be desired. A bag retainer 602 may further be useful in scenarios where the type of bag 26 filled by the system 10 is frequently changed.

Figure 113:
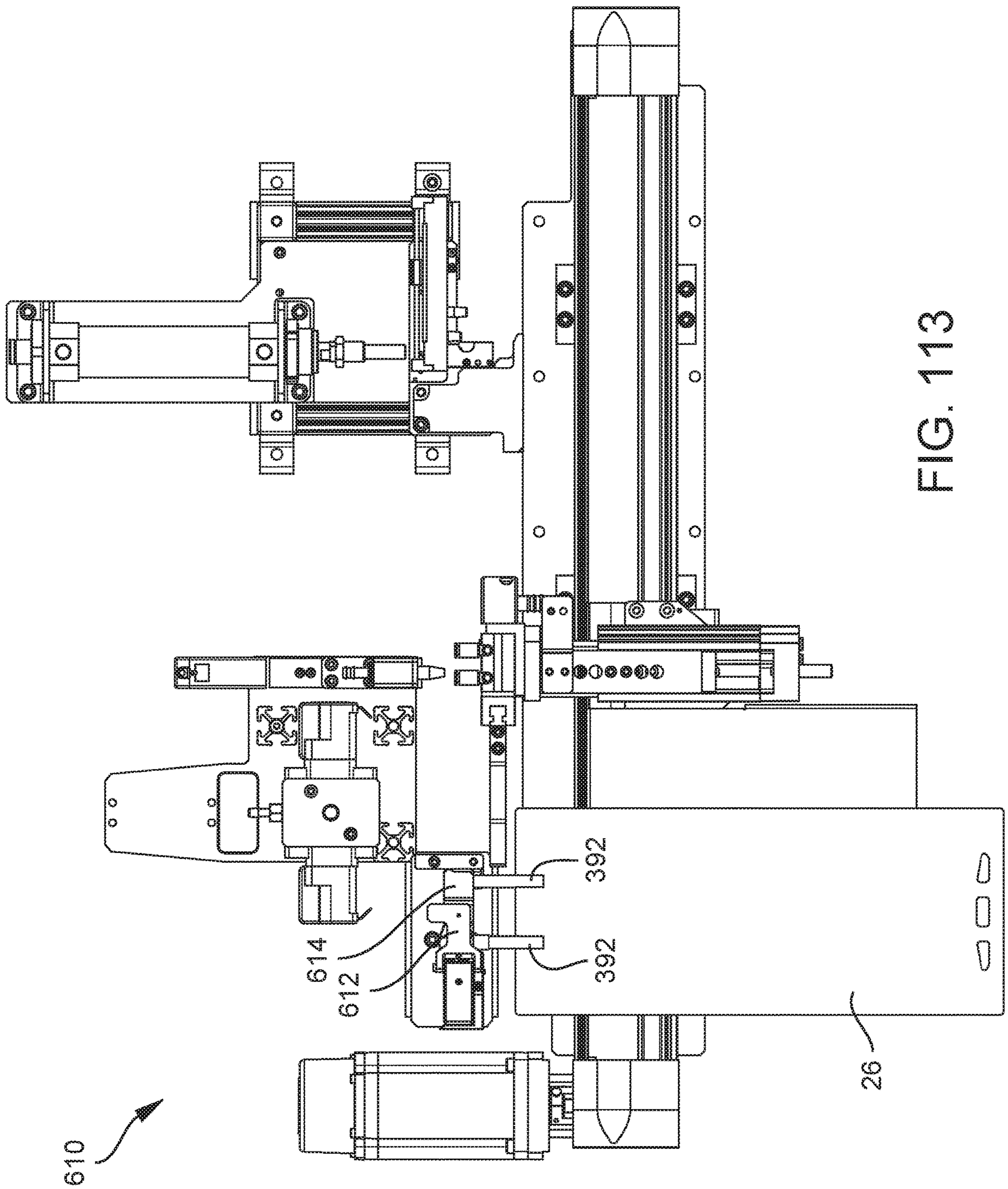

Referring now to FIG. 113-114B, the bag retainer 602 may include a clasp 612 that may be pivotally attached to a base plate 614. The clasp 612 may be opened and a user may, via the gloved interfaces 352, hold a bag 26 in place at the bag retainer 602. The clasp 612 may then be closed against the base plate 614. The clasp 612 may frictionally retain a port 392 of the bag 26. In some embodiments, the clasp 612, base plate 614 or both the clasp 612 and base plate 614 may include a receptacle 616 which accepts a member 618 included on the port 392 to aid in retaining the bag 26 in place in the bag retainer 602. The clasp 612 may latch in place when in the closed position. This latching may be accomplished via a mechanical latch or may be accomplished via a magnet in one of the base plate 614 and clasp 612 and a metallic and/or magnetic body in the other of the base plate 614 and clasp 612. The bag retainer 602 may also aid in locating a port 392 of the bag 26 through which the bag 26 is to be filled in a fixed and known location. As shown, the bag retainer includes a locating pin 615 (see also FIG. 116). The bag 26 may be loaded into the bag retainer 602 such that the locating pin 615 is seated into the filling port 392. As the locating pin 615 is fixed, locating pin 615 may ensure that the filling port 392 is in a known location prior to retrieval of the bag 26.

Referring now to FIG. 115, with a bag 26 in place in the bag retainer 602, the control system 15 of the system 10 may displace a robotic manipulator 606 to the bag retainer 602. In the example embodiment, the robotic manipulator 606 may be displaceable about a number of axes. In the example embodiment, a first rail 622 defining a first axis along which the robotic manipulator 606 may be displaced is included. The robotic manipulator 606 may include a grasper 620 which may close around the ports 392 of the bag 26 to grasp the bag 26. The grasper 620 may be included on a second rail 624 defining a second axis along which the grasper 620 of the robotic manipulator 606 may be displaced. The second axis is substantially perpendicular to the first axis in the example embodiment.

As shown in FIG. 116, once the bag 26 has been grasped, the robotic manipulator 606 may displace the grasper 620 downward along the second rail 624 to pull the bag 26 free of the bag retainer 602. In some embodiments, the downward force exerted by the robotic manipulator 606 cause the clasp 612 of the bag retainer 602 to open. In other embodiments, the force may not open the clasp 612, but be sufficient to overcome any frictional forces holding the bag 26 in place within the bag retainer 602. The robotic manipulator 606 may then displace along the first rail 622 to move the bag 26 toward the filling station 356 as shown in FIG. 117.

Referring now to FIG. 118A, once the robotic manipulator 606 has displaced the bag 26 such that a port 392 of the bag 26 is in alignment with a filling nozzle 430, the control system 15 may command the robotic manipulator 606 to raise the grasper 620 toward the filling station 356. In the example shown, the fill nozzle 430 is also displaceable and the fill nozzle 430 may be displaced toward the port 392 while the grasper 620 of the robotic manipulator 606 is raised. The fill nozzle 430 may be tapered so as to help the fill nozzle 430 enter into the port 392 of the bag 26 as shown in FIG. 118A. Once the fill nozzle 430 is located within the port 392 the control system 15 may command the filling station 356 to dispense fluid into the bag 26. Though not shown in FIG. 118A, in some embodiments, the filling station 356 may include a set of bag characteristic sensors 444A-C such as those shown and described in relation to FIG. 66 for example. As described elsewhere herein, the control system 15 may determine a fill volume for the bag 26 based on data collected from the bag characteristic sensors 444A-C.

Referring now to FIG. 118B, the filling nozzle 430 may be included in a bias assembly 611 including a bias member 613 which exerts a force against the filling nozzle 430 that tends to press the filling nozzle 430 firmly into the port 392 of the bag 26. A bias assembly 611 may also be included in other filling stations 356 described herein such as that shown and described in relation to FIG. 66. As shown, the filling nozzle 430 is coupled (integral with in the example) an inlet fitting 617. In the example, a section of conduit 619 connects the inlet fitting 617 and filling nozzle 430. The conduit 619 may include a flange 621. A housing 623 (see FIG. 118A) including a main body 627 and an end cap 625 is also shown. The end cap 625 may include a passage through which the filling nozzle 430 may project, but too small for the flange 621 to pass through. When the conduit 619 and bias member 613 are housed within the housing 623, the bias member 613 may be loaded between an interior face of the housing 623 and the flange 621. The port 392 of the bag 26 may press the filling nozzle 430 into the housing 623 against the force exerted by the bias member 613 during filling. The restoring force of the bias member 613 may consequentially push the filling nozzle 430 robustly into the port 392. In the example, the bias member 613 is shown as a compression spring. In alternative embodiments, any suitable bias member 613 may be used.

Referring now to FIGS. 119-122, once the bag 26 has been filled, the bag 26 may be lowered away from the fill nozzle 430 by displacing the grasper 620 along the second rail 624. The fill nozzle 430 may also be raised. The robotic manipulator 606 may be displaced along the first rail 622 toward the sealing station 358. The sealing station 358 may include a support cradle 626. The support cradle 626 may help to locate and hold the port 392 of bag 26 during a sealing operation. In the example embodiment, the robotic manipulator 606 is displaced such that the bag 26 is moved slightly passed a position in which the port 392 to be sealed would be aligned with the ram 464 (FIG. 120). The grasper 620 may be displaced along the second rail 624 to raise the bag 26 toward the sealing station 358 (FIG. 121). The robotic manipulator 606 may then be displaced so as back track along the rail 622 and bring the port 392 into the support cradle 626. This may guide the port 392 into alignment with the ram 464.

Referring now to FIG. 123, an example support cradle 626 is depicted. As shown, the support cradle 626 may include a trough 760. The trough 760 may include a first portion 762A and a second portion 762B. The first portion 762A of the trough 760 may extend to a funneled opening 764 in a top face 766 of the support cradle 626. The funneled opening 764 may aid in directing stoppers 476 into the trough and into alignment with the axis of the port 392 of the bag 26 which is to be sealed. The first portion 762A may also be referred to as a stopper guide portion of the trough 760 and may be sized so surround the majority of the stopper 476 so as to guide the stopper 476 as the ram 464 translationally displaces the stopper 476 into the port 392. The second portion 762B of the trough 760 may locate the port 392 during the sealing process. As shown in FIG. 122, the port 392 may be displaced into the trough 760 in a direction which is generally perpendicular to the axis of the trough 760. The second portion 762B of the trough 760 may be flanked by contoured walls 768. The contoured walls 768 may aid in channeling the port 392 into the second portion 762B of the trough 760 as this perpendicular displacement occurs. The trough 760 of the example support cradle 626 may also include a ledge 770. The ledge 770 may form a stop surface which may catch on the step 516 of the stopper 476 as the stopper 476 is displaced into the port 392 of the bag 26. Two removal notches 772 flanking the trough 760 above the ledge 770 are also recessed into the support cradle 626. These notches 772 may allow the port 392 to easily displace out of the support cradle 626 once the stopper 476 is in place in the port 392.

Referring now also to FIG. 124, to seal the port 392 the control system 15 may command a ram driver 462 of the sealing station 358 to advance the ram 464 toward the port 392 of the bag 26 which is to be sealed. The ram 464 may drive a stopper 476 from the stopper magazine 466 into the port 392 to seal the port 392. As mentioned above, the funneled opening 764 and stopper guide portion 762A of the support cradle 626 may aid in ensuring that the stopper 476 cleanly enters into the port 392. The control system 15 may then command the ram driver 462 to retract the ram 464 and the robotic manipulator 606 may be actuated to remove the bag 26 from the sealing station 358. The control system 15 may then displace the robotic manipulator 606 to a drop off location for the bag 26 as shown in FIG. 125.

Referring now to FIG. 126, the filling subsystem 610 may include a directing chute 628 which aids in directing the bag 26 once released from the grasper 620. The robotic manipulator 606 may also include a guide plate 630. The guide plate 630 may ensure that as the bag 26 is released from the grasper 620, the bag 26 is directed onto the directing chute 628. Once the bag 26 has reached the bottom of the directing chute 628, the bag 26 may be manually labeled via the gloved interfaces 352 or placed in a quarantine repository 362 while various testing (e.g. the endotoxin testing described above) is completed.

Referring now to FIGS. 127-128, in certain embodiments, a system 10 may fill a plurality of bags 26 in parallel at the same time. The bags 26 may be provided in packets 1082 within a carrier 1080. The carrier 1080 may include a number of a number of compartments 1084 in which the packets 1082 may be held. In the example embodiment, the carrier 1080 includes six compartments 1084 and holds six packets 1082. In other embodiments, the number of compartments 1084 may differ. Preferably, the number of compartments 1084 may be selected such that a user may comfortably transport the carrier 1080 when all the bags 26 in the carrier are full. Different carriers 1080 for bags 26 of different volumes may be provided with carriers 1080 for smaller volume bags 26 having a greater number of compartments 1084. The carrier 1080 may, for example, be constructed of a plastic sheeting or a medical grade wax paper product. Such materials may be preferable where the carrier or packets 1082 may be filled within an enclosure 12 such as those described elsewhere herein. In other embodiments, cardstock may be used. The carrier 1080 may include a handle 1087 which may facilitate carrying by a user or grasping by a grasper 418 of a robotic arm 360.

Referring now primarily to FIGS. 129 and 130, each packet 1082 may include a cover flap 1086. The cover flap 1086 may include a passage 1088 through which a fill line 1090 may extend. The cover flap 1086 may be secured to a pouch portion 1092 of the packet 1082. A bag 26 may be provided in the pouch portion 1092. The pouch portion 1092 may be expandable so as to accommodate the increase in volume of the bag 26 as the bag 26 is filled. For instance, the side walls of the pouch portion may include bellows features. The packet 1082 is removed in FIG. 130 to reveal an exemplary bag 26. In the example embodiment, sections of hook and loop tape 1096 may be used to couple the cover flap 1086 to the pouch portion 1092 when the cover flap 1086 is in a closed position. Any other suitable coupling may be used. When retained to the pouch portion 1092, the cover flap 1086 may hold an administration set 1094 attached to the bag 26 in place with the packet 1082. A slide clamp 1098, roller clamp 1100, other occluding arrangement may be placed in an occluding state on the line of the administration set 1094 to prevent flow through the administration set 1094 when the bag 26 is filled. Alternatively, the administration set 1094 may include a frangible which prevents flow therethrough until broken by a user. The administration set 1094 may be any desired administration set 1094 and may include one or more of a drip chamber, burette, furcation (Y-site, T-site, etc.), luer locks, septum, etc.

Referring now to FIGS. 131 and 132, each of the fill lines 1090 extending from the packets 1082 may be coupled to a spiking adapter 1102. As best shown in FIG. 132, the spiking adapter 1102 may include a number of radial recesses 1104. The recesses 1104 may be recessed into the exterior side wall of the spiking adapter 1102. The number of recesses 1104 may be equal to the number of packets 1082 held by the carrier 1080. The recesses 1104 may be sized to accept and retain the terminal ends of the fill lines 1090 leading to each bag 26. The openings of the recesses may be sized to be smaller than the outer diameter of the fill lines 1090. Thus, the fill lines 1090 may be deformed as they are inserted into the recesses 1104 and resist inadvertent removal once contained therein. The spiking adapter 1102 may also include a number of projections 1106. The projections 1106 may facilitate grasping by a robotic grasper 418 or by the hand of a user. The recesses 1104 are spaced at regular angular intervals from one another on each side of the projections 1106. As shown, the terminal ends of the fill lines 1090 may include a seal member 1108. The seal member 1108 may be a septum which may be pierced to gain access to the lumen of the fill line 1090 and may self-seal once the piercing member is withdrawn. As shown, the radial recesses 1104 of the spiking adapter 1102 may ensure that the fill lines 1090 are straight immediately upstream of the sealing member 1108.

Referring now to FIGS. 133A and 134-136, a number of views of an example filling station 1110 which may accept a spiking adapter 1102 to fill bags 26 is depicted. A diagrammatic example of a filling station 1110 is shown in FIG. 133A. As shown, the fill station 1110 may include a source 1112. The source 1112 may communicate with a recirculation valve 1114 and an inlet valve 1116. The inlet valve 1116 may gate flow to a fluid pump 1118 which may be a diaphragm pump in certain examples. The fluid pump 1118 may deliver fluid from the source to a heater 1120 which may be an in line heater. An air pump 1122 may also be plumbed into the line leading from the fluid pump 1118 to the heater 1120. A check valve 1123 may be included to ensure liquid does not back flow into the air pump 1122. From the heater 1120, fluid may flow to a manifold 1124. The manifold 1124 may split flow into a number of different flow pathways leading to a spike port 1126. The spike port 1126 may also be connected to the recirculation valve 1114.

Fluid flowing from the source 1112 may be routed to the spike port 1126 to be delivered into fill lines 1090 of bags 26 which are disposed within a spiking adapter 1102. After a filling operation has completed, a cap 1130 of the spike port 1126 may be sealed closed and fluid enter the filling station 1110 may be recirculated while being heated by the heater 1120. The heater 1120 may maintain the temperature of recirculating fluid within a range of a predefined temperature set point. A control system 15 of the system 10 may continue to recirculate water within the filling station 1110 for a period of time sufficient to cause disinfection at the predefined temperature set point. This water may then be diverted to a drain destination 1128 through the inlet valve 1116. In certain embodiments, the heater 1120 may maintain the fluid at a temperature of 75-80° C. or higher during disinfection. Thus each time a connection to the spike port 1126 is formed, the spike port 1126 may have been freshly sterilized.

In an alternative embodiment, and referring now to FIG. 133B, an example filling station 1110 may include a source 1112 which communicates directly with an inlet valve 1116 which may double as a recirculation valve. The spike port 1126 may include connections which may allow for fluid to be recirculated through the spike port 1126 as described above or may allow flow through of fluid to the drain 1128. During disinfection, fluid may be directed through the heater 1120 and heated to within a range of a temperature set point. This water may be passed to the drain 1128 via a drain valve 1115 without recirculation.

Referring now also to FIG. 137, a top down view of an example spike port 1126 is depicted. As shown, the spike port 1126 may include a cup like recess 1132. The recess 1132 may include a number of spikes 1134. Each of the spikes 1134 may communicate with a line extending from the manifold 1124. The recess 1132 may be sized to accept a spiking adapter 1102. As shown, the spike port 1126 may include alignment channels 1136. The alignment channels 1136 may accept the projections 1106 of the spiking adapter 1102. The projections 1106 on the spiking adapter 1102 may be position such that when they are within the alignment channels 1136, the sealing members 1108 of the fill lines 1090 may be in line with respective spikes 1134 in the recess 1132. Other keying elements may also be used to aid in ensuring proper alignment. Pressing the spiking adapter 1102 into the recess 1132 may cause each of the spikes 1134 to penetrate a respective sealing member 1108 such that fluid may be delivered through the fill lines 1090 into the bags 26. As the radial recesses 1104 of the spiking adapter 1102 ensure that the fill line 1090 immediately upstream of each sealing member 1108 is straight, the spikes 1134 may be prevented from piercing into the side wall of the fill lines 1090. The spiking adapter 1102 and sealing members 1108 may be wiped down with a sanitizing agent prior to pressing of the spiking adapter 1102 into the recess 1132. For example, 70% isopropyl alcohol may be used. Additionally, the cap 1130 of the spike port 1126 may be maintained closed until a time directly prior to formation of the connection. This cap 1130 may also be cleaned with sanitizing agent prior to opening. Materials used to construct the fill conduits 1090 sealing members 1108, spiking adapter 1102 and spike port 1126 may be selected to be appropriate for the sanitizing agent used and temperatures present during disinfection of the filling station 1110.

As shown, the spike port 1126 may include a gasket member 1136 which surrounds the recess 1132. The gasket member 1136 may form a seal against the cap 1130 when the cap 1130 is in a closed position over the recess 1132. In some embodiments, a latch (not shown) may be included to maintain the cap 1130 in the closed orientation and ensure that a small amount of pressure is exerted between the cap 1130 and the gasket member 1136 and inhibit inadvertent opening of the spike port 1126. A recirculation port 1138 is also shown in FIG. 137. With the cap 1130 closed, the recirculation port 1138 may allow for fluid pumped into the recess 1132 via the spikes 1134 to be removed from the spike port 1126 and circulated back through the heater 1120. This may help to ensure that the fluid in the spike port 1126 is maintained at a desired temperature during a disinfection process. In certain embodiments, both a recirculation port 1138 and a drain port (not shown) may be included in the spike port 1126.

Referring now to FIG. 138, a schematic of an example fluid circuit 710 which may be utilized with any of the systems 10 shown herein is depicted. The mixing circuit 348 and sensor suite 350 (e.g. those mentioned with respect to FIG. 56 and FIG. 111) may be included in the fluid circuit 710. As shown, the fluid circuit 710 may draw water from a water source 16. The water source 16 may be any water source described herein. Fluid from the source 16 may be subjected to any of a variety of pre-treatment operations in certain embodiments. For example, filtration or chemical treatments may be performed prior to water passing to a medical water production device 14. In the example fluid circuit 710, fluid from the water source 16 may pass through a water softener 712. Fluid may be filtered through one or more carbon filter 714 (e.g. two identical carbon filters in series) after passing through the water softener 712. In some examples a coarse filter or sediment filter may be included upstream of the carbon filters 714. The filtered water passing out of the one or more carbon filter 714 may then be filtered through a reverse osmosis assembly 716. Depending on the source water 16, one or more of the water softener 712, carbon filter 714, and reverse osmosis assembly 716 may be optional or may be omitted.

In the example fluid circuit 710, fluid may pass from the reverse osmosis assembly 716 to a temperature regulator 718. The temperature regulator 718 may include at least one of a chiller and a heater. For certain applications, the temperature regulator 718 may be omitted. The temperature regulator 718 may lower the temperature of incoming water or may be operated to lower the temperature of incoming water in the event that a temperature sensor (not shown) upstream of the temperature regulator 718 indicates that the incoming water temperature is above a predefined threshold. In some examples, the temperature regulator 718 may be bypassed when the incoming water temperature is below the predefined threshold. The incoming water may then flow to a medical water production device 14. The medical water production device 14 may be any of those described herein. For example, the medical water production device 14 may be a vapor compression distillation device is certain examples.

In the example embodiment, the output of the medical water production device 14 may include a quick connect fitting 720 which may be used to connect to a remainder of the flow circuit. As shown, fluid passing form the medical water production device 14 may be tested for one or more characteristic of interest. In the example embodiment, two conductivity sensors 722A, B may be used to collect redundant measurement of the conductivity of water produced by the medical water production device 14. The control system 15 of the system 10 may monitor the output of the conductivity sensors 722A, B to ensure that the water is suitable for the intended application. For example, the control system 15 may check to ensure that the water has a conductivity within the allowed range for water for injection (WFI) quality water. Acceptability threshold values for the conductivity sensors 722A, B (or other sensors in the fluid circuit 710) may be defined in a compendial standard or water monograph. In certain examples, the conductivity sensors 722A, B may be selected to have high resolution, accuracy, and reliability at low conductivity values. In certain embodiments, ultra pure water conductivity sensors optimized for sensing low conductivity fluids may be used. The fluid circuit 710 may also include a total organic carbon (TOC) monitor 724. In the example embodiment, the TOC monitor 724 is shown as a receiving a slip stream of fluid which then flows to a drain 726. In other embodiments, the TOC monitor may be in line and may not be located on a slip stream.

After initial sensing, fluid may pass to an inlet pressure sensor 728. The inlet pressure sensor 728 may include at least one pressure sensor which may sense a pressure of incoming water. In some embodiments, the inlet pressure sensor 728 may be paired with a sampling port or septum from which fluid may be extracted from the fluid circuit 710 for testing. From the inlet pressure sensor 728, water may flow to a divert manifold 730. The divert manifold 730 may allow the system 10 to divert water to the drain 726 in the event that water production at the medical water production device 14 exceeds current system 10 demand. Additionally, the divert manifold 730 may allow water which is measured to be outside of predefined sensing thresholds to be directed to drain 726. Water exiting the divert manifold 730 may flow to a pump 732 which may be operated to adjust the pressure of the water if needed. The control system 15 may check the reading from the inlet pressure sensor 728 prior to running the pump 732. For example, the control system 15 may verify that the inlet pressure is positive or positive beyond some threshold before running the pump 732. This may ensure that the pump 732 has water to pump before powering the pump 732. From the pump 732 water may proceed to an inlet manifold 734. In some embodiments, the pump 732 may include a bypass which allows fluid to recirculate to the pump 732 in the event that pressure downstream of the pump 732 is at a desired value. The inlet manifold 734 may include an additional conductivity sensor 736 which may again check that the conductivity of the water is within predefined limits. A pressure sensor 738 may also be included in the inlet manifold 734 and may provide feedback for a control loop used by the control system 15 to inform operation of the pump 732. The inlet manifold 734 may include a sampling port or septum in some examples.

From the inlet manifold 734, water may pass to a mixing circuit 348 of the fluid circuit 710. The mixing circuit 348 may include a number of flow pathways. For example, the mixing circuit 348 may include a WFI water pathway and at least one constituent pathway. The number of flow pathways in the mixing circuit 348 may depend on the type of solution being mixed or the types of solutions which the system 10 supports generation of. In certain embodiments, a flow path may be included for each constituent component of the solution. The exemplary system 10 is shown as a saline generating circuit and includes a saline flow path and a WFI water flow path.

With respect to the saline flow path, in the example embodiment, the mixing circuit 348 may include a crystalline constituent container 740. The crystalline constituent container 740 may be filled with sodium chloride. Other crystalline constituents may be used in other embodiments (e.g. sugar where DSNS or dialysate is produced). Fluid may enter the crystalline constituent container and pass through the sodium chloride contained therein to dissolve an amount of the sodium chloride. In various examples, fluid leaving the crystalline constituent container 740 may be saturated or near saturated. In some embodiments, the crystalline constituent container may also act as a reservoir 740 which may maintain a volume of solution therein. This may allow the system 10 to easily accommodate periods of high fluid demand. Fluid exiting the crystalline constituent container 740 may then pass through at least one filter. For example, a coarse filter may be included to help ensure the granular constituent does not exit the crystalline constituent container 740. In the example an ultrafilter 742 is also shown downstream of the crystalline constituent container 740. At least one conductivity sensor 744 may collect data on the concentration of sodium chloride in the fluid leaving the ultrafilter 742.

As shown, fluid leaving the inlet manifold 734 may also flow along a second WFI water flow path in FIG. 138. The second path may include a second ultrafilter 746. The saline fluid and water from the second path may be combined together in a mixing manifold 748. To generate a solution of the appropriate concentration, flow controllers 750A, B may be included in the fluid circuit 710. The flow controller 750A, B may meter volumes of fluid and control flow rates of fluid passing therethrough. The control system 15 of the system 10 may use data from the conductivity sensor 744 in the saline flow path to determine mixing ratios that may be executed via commands to the flow controllers 750A, B. Thus, the control system 15 may combine fluid from the saline flow path and WFI water flow path to achieve a solution of a target concentration such as 0.9% saline. In some embodiments, the mixing manifold 748 may be replaced by a mixing tank which may maintain a volume of fluid to help accommodate periods of increased demand.

The fluid may exit the mixing manifold 748 and travel along a tortuous and/or relatively long flow path to encourage mixing. The fluid may then pass a set of redundant conductivity sensors 752A, 752B. These conductivity sensors 752A, B may collect data on the conductivity of the solution leaving the mixing circuit 348 and the control system 15 may ensure that the conductivity is as expected for the solution that the system 10 is generating. From the conductivity sensors 752A, B the solution may pass to a particulate sensor 754 and a dispensing nozzle 756. The particulate sensor 754 is shown as feeding from a slip stream in FIG. 138, however in other embodiments, the particular sensor 754 may be in line and upstream of the dispensing nozzle 756. The control system 15 may monitor data from the particulate counter to check that the generated fluid conforms to a predefined particulate limit. Fluid leaving the particulate counter may pass to the drain 726. If fluid is deemed to be acceptable, fluid may pass to the dispensing nozzle 756 and may be used to fill bags 26. Alternatively, if fluid is found unacceptable, fluid may be dispensed from the dispensing nozzle 756 into a drain (see, e.g. drain inlet 434 of FIG. 71A) and may be followed by a flush volume of solution.

Referring now to FIG. 139, a flowchart 1300 detailing a number of example actions which may be executed to generate and package a desired fluid is shown. As shown, in block 1302 a control system 15 of the system 10 may receive a request to fill a bag 26. The control system 15 may determine a constituent mass (e.g. sodium chloride) to dispense for that bag 26. This mass may be a mass needed to generate a solution of a requested percent constituent by weight per unit volume (e.g. 0.9% saline). In block 1304, bag 26 information may be collected from a set of bag characteristic sensors 444A-C (see, e.g., FIG. 66). In block 1306, a first dispensing stage may commence. In this stage, the fluid delivered to the bag 26 may be entirely or predominately constituent concentrate. The constituent mass dispensed into the bag 26 may be tracked by reading from at least one conductivity sensor and a flowmeter or flow controller. Once, in block 1308, the desired constituent mass is dispensed into the bag 26, a second dispensing stage may commence in block 1310. In the second stage, WFI may be dispensed into the bag 26. The volume of WFI dispensed may be tracked by a flowmeter or flow controller. Once, in block 1312, the volume of WFI needed to generate the desired solution has been dispensed, dispensing may halt in block 1314. Also in block 1314, the bag 26 may be collected from the fill station 356. By delivering the constituent in the first stage, the second stage may be leveraged as a flush of the line leading to the filling nozzle. This may ensure that substantially all constituent concentrate in the line is dispensed into the bag 26. Thus, the control system 15 may not have to account for a hold up volume in the line when attempting to pump constituent concentrate in order to generate a fluid with a desired concentration. Additionally, after the bag 26 has been filled, a subsequent bag 26 may be filled with a different type of solution or may be filled with a solution of a differing concentration. This may be done without having waste and constituent concentrate in a purge of fluid in the line between bags 26.

Referring now to FIG. 140, in certain embodiments, a crystalline constituent container 740 which fluid flows through may not be included. Instead, a crystalline constituent dispenser 780 may be used. As shown, fluid may exit the inlet manifold 734 and pass to a dosing manifold 784. The dosing manifold 784 may also be in communication with a crystalline constituent dispenser 780. The crystalline constituent dispenser 780 may dispense the crystalline constituent into the dosing manifold 784 via a dispensing assembly 787. A motor 785 may be included to drive the dispensing assembly 878. From the dosing manifold 784, fluid may flow to a concentrate reservoir 782. Where a concentrate reservoir 782 is included, at least one conductivity sensor (e.g. conductivity sensor 744) of the constituent flow path of the mixing circuit 348 may be included in or be in communication with the interior volume of the concentrate reservoir 782.

Referring now also to FIG. 141, a cross sectional view of the example dosing manifold 784 in FIG. 140 is depicted. As shown, the dosing manifold 784 may include an interior cavity 786. The interior cavity 786 may be in communication with the inlet manifold 734 via a first port 788. The crystalline constituent dispenser 780 may be in communication with the interior cavity 786 via a second port 790. The axis of the second port 790 may be arranged to allow of gravity feed of constituent from the crystalline constituent dispenser 780 into the interior cavity 786. The interior cavity 786 may be constructed to generate specific flow patterns which may aid in encouraging vigorous mixing within the dosing manifold 784. In the example embodiment, the interior cavity 786 includes a baffle 792 which is in line with the axis of the first port 788. The baffle 792 may cause turbulent flow directly upstream of the second port 790 so as to encourage the crystalline constituent to quickly mix and dissolve upon introduction. The baffle 792 may also narrow the cross section of the flow path from the first port 788 to the outlet 794 of the dosing manifold 784. This may generate a venturi effect which may cause flow where the second port 790 opens into the interior cavity 786 to be more rapid than elsewhere in the interior cavity 786. Thus, as constituent enters the dosing manifold 784 it may be inhibited from piling up at the entry point. In other embodiments, the interior cavity 786 may include a plurality of baffles 792. The interior cavity 786 may also include a funnel region 796 directly upstream of the outlet 794. The funnel region 796 may encourage the generation of a vortex in the interior cavity 786 which may further aid in dissolving the crystalline constituent dispensed from the crystalline constituent dispenser 780. In the example embodiment, a turbulence generator 798 is also disposed within the outflow conduit 800 from the dosing manifold 784. The turbulence generator 798 may provide an additional aid which may help to dissolve the crystalline constituent. In the example embodiment the turbulence generator 798 is an insert with helicoid flighting, though any insert which may encourage mixing may be used. In alternative embodiments, the outflow conduit 800 from the dosing manifold 784 may be a coil of tubing which increases the transit time of fluid in the outflow conduit 800 as it travels to a downstream component in the fluid circuit 710 (e.g. conductivity sensor 744.

Referring now to FIGS. 142 and 143, an example crystalline constituent dispenser 780 is depicted. A portion of the crystalline constituent dispenser 780 is broken away to reveal components of the dispensing assembly 787 in FIG. 143. As shown, the crystalline constituent dispenser 780 may include a constituent storage compartment 802. The storage compartment 802 may have an outlet 804 which may feed into the dispensing assembly 787. In the example embodiment, the dispensing assembly 787 includes a bore 806 within which an auger 808 is disposed. The auger 808 may be attached to a drive shaft 810. The drive shaft 810 may extend to a motor 785 which may be operated to cause rotation of the auger 808. As the auger 808 rotates, constituent may be advanced through the bore 806 toward an outlet 812 of the dispensing assembly 787. The outlet may communicate with the interior volume of a dosing manifold 784 via the second port 790 of the dosing manifold 784. The control system 15 may command rotation of the auger 808 based on data collected from the conductivity sensor (e.g. conductivity sensor 744 of FIG. 138) in order to generate a solution of a desired concentration.

Referring now to FIGS. 144-146, another embodiment of an example crystalline constituent dispenser 780 is depicted. Again, in FIG. 145 a portion of the crystalline constituent dispenser 780 is broken away to reveal components of the dispensing assembly 787. As shown, the crystalline constituent dispenser 780 may include a constituent storage compartment 802. The storage compartment 802 may have an outlet 804 which may feed into the dispensing assembly 787. In the example embodiment, the dispensing assembly 787 includes an interior void 814 within which a paddle wheel 816 is disposed. The paddle wheel 816 may be attached to a drive shaft 810 which may extend to a motor 785 that may be operated to cause rotation of the paddle wheel 816. Rotation of the paddle wheel 816 may cause volumes of constituent to be advanced from the storage compartment 802 to the outlet 812 of the dispensing assembly 787. The outlet may communicate with the interior volume of a dosing manifold 784 via the second port 790 of the dosing manifold 784. The control system 15 may command rotation of the paddle wheel 816 based on data collected from the conductivity sensor (e.g. conductivity sensor 744 of FIG. 138) in order to generate a solution of a desired concentration.

Referring specifically to FIG. 146, the exemplary paddle wheel 816 is shown in isolation. As shown, the paddle wheel 816 includes a number of circular members 818 which are disposed orthogonal to one another. Though two circular members 818 are shown in FIG. 146, other embodiments may include a greater number. In the example embodiment, the two circular members 818 are disposed substantially perpendicular to one another.

Referring now to FIG. 147 and FIG. 148, another example dispensing assembly 787 is depicted. Again, in FIG. 148 a portion of the housing 1018 of assembly 787 is broken away to reveal components of the dispensing assembly 787. Though not shown, the dispensing assembly 787 may typically be attached to a constituent storage compartment 802 such as those shown and described above. The storage compartment 802 may feed into an inlet 1010 of the dispensing assembly 787. In the example embodiment, the dispensing assembly 787 includes an interior passage 1016 within which an impeller 1012 is disposed. The passage 1016 may be sized such that the impeller 1012 prevents constituent from displacing through the passage 1016 without rotation of the impeller 1012. The impeller 1012 may be attached to a drive shaft 810 which may extend to a motor 785 that may be operated to cause rotation of the impeller 1012. Rotation of the impeller 1012 may cause volumes of constituent to be advanced from the storage compartment 802 to the outlet 1014 of the dispensing assembly 787. The outlet 1014 may communicate with the interior volume of a dosing manifold 784 via the second port 790 of the dosing manifold 784. The control system 15 may command rotation of the impeller 1012 based on data collected from the conductivity sensor (e.g. conductivity sensor 744 of FIG. 138) in order to generate a solution of a desired concentration.

Referring now to FIGS. 149 and 150, in some embodiments, a disc 1020 with a number of spaced apart depressions 1022 may be used in place of an impeller 1012. The depressions 1022 may be evenly spaced about the disc 1020. In the example embodiment, the depressions 1022 are spaced at even angular increments of 72°. The depressions 1022 may be the same shape. In the example, the depressions 1022 are bowl like. In other embodiments, the depressions 1022 may be obround (see FIG. 151) or any other desired shape. As the disc 1020 is rotated (the disc 1020 may be coupled to a motor 785 driven drive shaft 810 similar to FIG. 147 for example), the depressions 1022 may be brought into alignment with an inlet 1024 of the dispensing assembly 787. Constituent may fill the depression 1022. As the disc 1020 is further rotated, the depression 1022 may pass the inlet 1024 and come into communication with the outlet 1026 of the dispensing assembly 787. The constituent may fall from the depression 1022. The outlet 1014 may communicate with the interior volume of a dosing manifold 784 via the second port 790 of the dosing manifold 784. The flat, depression 1022 free areas of the disc 1020 may close off the inlet 1024 and prevent any passage of constituent to the outlet 1026 when aligned over the inlet 1024.

Referring now to FIG. 152A and FIG. 152B, another example dispensing assembly 787 is depicted. This dispensing assembly 787 may be used in place of the dispensing assemblies described above. As best shown in FIG. 152B, the dispensing assembly 787 may include a rotatable disc 820. The rotatable disc 820 may include a number of apertures 822 which extend through the disc 820. The rotatable disc 820 may be installed within a housing 824. In the example embodiment, the housing 824 may include a first housing portion 826 and a second housing portion 828. The first housing portion 826 may include an inlet 830 which may extend from a storage compartment 802 of a crystalline constituent dispenser 780. The second housing portion 828 may include an outlet 832 which may be in communication with the interior volume 786 of a dosing manifold 784. The inlet 830 and the outlet 832 may be offset from one another. As the rotatable disc 820 is rotated, an aperture 822 of the disc 820 may come into alignment with the inlet 830 from the storage compartment 802. Constituent may fall into the aperture 822. The disc 820 may then be rotated toward the outlet 832. As the aperture 822 begins to rotate over the outlet 832, the constituent may exit the dispenser assembly 787.

In the example embodiment, the housing 824 includes an opening 830 which provides access to the edge of the rotatable disc 820. A driven wheel may be in contact with the edge of the disc 820 through the opening and may allow the rotatable disc 820 to be rotated as needed to form a desired solution. In alternative embodiments, the disc 820 may include a drive shaft 810 (see, e.g., FIG. 145) which may be driven by a motor to rotate the rotatable disc 820. In still other embodiments, the edge of the disc may be teethed and a drive wheel may be included to cause rotation of the rotatable disc 820.

Referring now to FIGS. 153A and 153B another exemplary crystalline constituent dispenser 780 is shown. As shown, the crystalline constituent dispenser 780 may include a first compartment 1350 and a second compartment 1352. The first compartment 1350 may be a constituent storage compartment 802 which contains a supply of crystalline constituent. The first compartment 1350 and second compartment 1352 may be separated by a dispensing assembly 787. In the example embodiment, the dispensing assembly 787 is driven through a drive shaft 810 by a motor 785. Any dispensing assembly 787 described herein may be used. The second compartment 1352 may be a mixing compartment which may be used in place of a dosing manifold 784. The second compartment 1352 may include a funnel region 796. As shown, the funnel region 796 includes a plurality of inlet ports 1354A, B. The inlet port 1354A, B may be quick connect fittings (e.g. push to connect) which couple to lines from a WFI water source. As shown, the inlets 1354A, B are positioned on opposite sides of the funnel region 796. The inlets 1354A, B are also oriented such that water entering the second compartment enters substantially tangentially with respect to the curve of the funnel region 796. Thus, as water is delivered into the second compartment 1352 under pressure, the tangential inflow of water may encourage formation of a vortex of fluid within the second compartment 1352. Additionally, the funnel region 792 may include a pair of conductivity sensors 1356 which may monitor the conductivity of fluid in the second compartment 1352.

In certain examples, water may be delivered through the inlets 1354A, B and into the second compartment 1352 in a first stage of a reservoir filling operation. This may establish a vortex of fluid in the second compartment. Filling of the second compartment may be halted in a second stage of a reservoir filling operation. The dispenser assembly 787 may be driven to begin to displace a desired amount of constituent from the first compartment 1350 into the second compartment 1352 during the second stage of the filling operation. The vortex may cause the crystalline constituent to rapidly dissolve. In a third stage of a reservoir filling operation, an outlet valve 1358 of the crystalline constituent dispenser 780 may be actuated open to allow fluid in the second compartment 1352 to begin exiting the crystalline constituent dispenser and flowing towards a reservoir such as a bag 26. As shown, a tortuous flow path 1360 is included between the funnel region 792 and the outlet valve 1358 to further encourage robust dissolution of the constituent. Also in the third stage an additional volume of fluid may be delivered into the second compartment 1352. The fluid delivered to the second compartment 1352 in the first and third stage may be desired fill volume of the reservoir. Preferably, the dispensing assembly 787 may be driven at a rate sufficient to dispense the desired amount of constituent into the second compartment 1352 prior to the end of the third stage. This may allow the additional volume of water delivered into the second compartment 1352 in the third stage to flush any constituent containing solution out of the second compartment 1352. In a fourth stage, a wait period may elapse with the outlet valve 1358 open to allow any fluid in the second compartment to pass out of the crystalline constituent dispenser 780 and into the reservoir.

Referring now to FIGS. 154 and 155, in some embodiments, the crystalline constituent dispenser 780 may be at least partially disposable (the motor 785 may typically be reused). This may be desirable as the crystalline constituent dispenser 780 may be a dead end within the fluid path which may be hard to disinfect by circulation of hot water through the fluid circuit 710 (see, FIG. 138). Additionally, it may be difficult to back flow hot water through a crystalline constituent dispenser 780 as the dispensing assembly 787 may block communication from the outlet to the inlet of the crystalline constituent dispenser 780 when not being powered. The crystalline constituent dispenser 780 may come with its disposable components as part of a consumable sealed cartridge which is replaced by the user as a prior cartridge is depleted. FIGS. 154 and 155 depict an outlet 1030 portion of a dispensing assembly 787. A similar arrangement may be included as the outlet of any of the dispensing assemblies described herein. As best shown in FIG. 155, the outlet portion may include a seal member 1032. The seal member 1032 may be a film seal or similar pierceable barrier which seals the end of the crystalline constituent dispenser 780 which is coupled to the second port 790 of the dosing manifold 784. The opposite end of the crystalline constituent dispenser 780 may be attached to a closed storage compartment 802. Thus, the crystalline constituent dispenser 780 may be in a sealed state prior to use.

As shown, the second port 790 may include a retainer clip 1036. The outlet portion 1030 may include a flange 1038. The second port 790 may also include a puncturing member 1034. As the crystalline constituent dispenser 780 is mated to the second port 790, the clip 1036 may spread apart to allow passage of the flange 1038. The clip 1036 may be biased so as to close over the flange 1038 after the flange 1038 has been advanced passed the clip 1036. This may retain the crystalline constituent dispenser 780 on the dosing manifold 784. The puncturing member 1034 may puncture the sealing member 1032 as the outlet 1030 is coupled into the second port 790. Gasketing members 1040 such as o-rings may be included to ensure that a seal to the surrounding environment is generated. As shown, the outlet 1030 includes a baffle 1042 which may direct or limit the flow of constituent into the dosing manifold 784. Additionally, the puncturing member 1034 may include a number of perforations 1044. The perforations 1044 may limit the flow of constituent into the dosing manifold 784. This may help to ensure that a constant flow of constituent is provided to the dosing manifold 784 as opposed to discrete boluses which may be output by certain dispensing assemblies 787.

As shown, the second port 790 may also include a recirculation port 1046. The recirculation port 1046 may allow for a fluid line to be connected to the second port 790 during a disinfect with hot water. When it is desired to run a disinfect, the crystalline constituent dispenser 780 may be removed and a cap (not shown) may be installed on the second port 790 to seal the opening. Hot water may then be circulated through the second port 790 via the line attached to the recirculation port 1046.

Referring now to FIG. 156-158, yet another example dispenser assembly 787 is depicted. This dispensing assembly 787 may be used in place of the dispensing assemblies described above. As shown, the dispensing assembly 787 may include a section of flexible tubing 832. The tubing 832 may extend from an inlet 834 which may be in communication with a storage compartment 802 containing crystalline constituent. The tubing 832 may be oriented so as to allow for gravity feed of constituent into the tubing 832. The inlet 834 may include a restrictor which lowers the rate of constituent flow into the tubing 832.

The tubing 832 may be held in place by one or more cradle 836. In the example embodiment two cradles 836 are included. The cradles 836 may position the flexible tubing

832 such that the tubing 832 lays up against pairs of support members 838A, B. In the example embodiment, each pair of support members 838A, B includes a support projection 838A and a support roller 838B. In alternative embodiments, only support rollers 838B or support projections 838A may be used. The support members 838A, B of each pair may be spaced apart such that an occluder 840 may be displaced into an intermediary space between the support members 838A, B. As shown in FIG. 157 and FIG. 158, the occluders 840 of the dispensing assembly 787 may be actuated into a space between the support members 838A, B or each pair of support members 838A, B. This may deform the flexible tubing 832 and prevent flow through the tubing 832.

As the dimensions of the tubing 832 may be known, the spacing between each pair of support members 838A, B may be selected such that the interior volume of the tubing between each of the support member 838A, B pairs is a desired value. The occluder 840 associated with the downstream pair of support members 838A, B may be actuated to block off flow through the tubing 832 (see FIG. 157). Constituent may enter the tubing 832 and fill the volume of tubing 832 between the pairs of support members 838A, B. The upstream occluder 840 may then be actuated to isolate the known volume of constituent between the pairs of support members 838A, B. The downstream occluder 840 may then be actuated to retract that occluder 840 (see FIG. 158). This may allow the constituent to exit the tubing 832 and enter into a dosing manifold 784.

Referring now to FIGS. 159-160, in certain system 10 embodiments, it may be desirable to perform filling and sealing of a bag 26 outside of an enclosure 12 which is controlled to a clean room standard. In such embodiments, the system 10 may fill bags 26 which have been previously sterilized without exposing the interior volume of the bag 26 to the surrounding environment. This may be accomplished by establishing an aseptic connection between a port 392 of the bag 26 and a filling conduit where the interiors of the port 392 and filling conduit are sealed from the surrounding environment until that connection is formed. Fluid from a fluid circuit 710 (see, e.g., FIG. 138) may be transferred through the filling conduit and into the interior volume of the bag 26. The connection between the filling conduit and the port 392 of the bag 26 may then be broken in an aseptic fashion. In some embodiments, the filling conduit and port 392 may be sealed from the surrounding environment as communication between the two is severed.

An exemplary fluid packaging apparatus 900 which may facilitate filling of bags 26 in an uncontrolled or less stringently controlled surrounding environment is shown in FIGS. 159-160. In certain embodiments, a fluid packaging apparatus 900 may replace any of the sealing stations 358 described elsewhere herein. A fluid packaging apparatus 900 may also double as a filling station 356 allowing the fluid packaging apparatus 900 to be used in place of discrete filling and sealing stations 356, 358. This may reduce the complexity of system 10, allow a system 10 to be made more compact, and limit requirements for tight environmental control of the area in which bags 26 are filled and sealed.

As shown in FIGS. 159-160, the example fluid packaging apparatus 900 may include a fill conduit feed assembly 902. The fill conduit feed assembly 902 may advance a segment of fill conduit from a conduit dispenser 1050 (see FIG. 161) such as a spool or reel into the fluid packaging apparatus 900. The fill conduit 1060 (see FIG. 161) may have a terminal end which is sealed. The terminal end may be provided sealed or may be in a sealed state after the filling of a previous bag 26. Thus the interior of the fill conduit 1060 lumen may be kept out of communication with the surrounding environment. The fill conduit 1060 may be fed into a tube retainer 934 of a tubing manipulation assembly 904 (see FIG. 164) of the fluid packaging apparatus 900.

Referring now to FIGS. 161 and 162, an exemplary embodiment of conduit dispenser 1050 is depicted. As shown, the conduit dispenser 1050 may include a guide portion 1052 and a reel portion 1054. The guide portion 1052 may be in the form of a conic frustum. The guide portion 1052 may direct the fill conduit 1060 out of an aperture of the guide portion 1052 as a fill conduit feed assembly 902 pulls fill conduit 1060 out of the conduit dispenser 1050. The guide portion 1052 may include a bracket for mounting of the guide portion 1052 to a stand or the like which positions the conduit dispenser 1050 above the fill conduit feed assembly 902. Any other suitable mounting member may be used in other embodiments. As shown, the reel portion 1054 may couple to the guide portion 1052. In the example embodiment a bayonet mount is included. The guide portion 1052 includes mounting pins 1062. The reel portion 1054 includes cooperating mounting tracks 1064. In other embodiments, a magnetic coupling, threaded coupling, interference fit, snap fit, fasteners, adhesive, etc. may be used. In certain embodiments, the guide portion 1052 may be a reusable component. The reel portion 1054 may be disposable and new reel portions 1054 may be coupled to the guide portion 1052 as fill conduit 1060 is consumed.

The reel portion 1054 may have a cup like shape in which a coil of fill conduit 1060 may be stored. An organizer 1058 may be disposed within the reel portion 1054. In the example embodiment, the organizer 1058 is depicted as a plurality of walls which may provide a set or tracks within which the fill conduit 1060 may be laid. As the guide portion 1052 is a conic frustum, the walls may increase in height with proximity to the center of the reel portion 1054. This may allow for more fill conduit 1060 to be placed within the tracks formed by the organizer 1058. In alternative embodiments, a mandrel around which the fill conduit 1060 is wrapped may be used as the organizer 1058. The reel portion 1054 may be sized so as to hold a length of fill conduit 1060 sufficient to fill 50-100 bags 26. In some embodiments, the reel portion 1054 may hold around 10-20 feet of coiled fill conduit 1060. Larger or smaller reel portions with varying capacities may also be available. The fill conduit 1060 may come pre-primed and sterile. The fill conduit 1060 may be provided in a sealed state such that the interior of the fill conduit 1060 and the fluid contained therein is out of communication with the surrounding environment.

As best shown in FIG. 161, the reel portion 1054 of the conduit dispenser 1050 may include an inlet orifice 1066. A portion of the fill conduit 1060 which extends to the fluid circuit 710 (see, e.g. FIG. 138) may enter into the reel portion 1054 via the inlet orifice 1066. In the example embodiment, a standoff 1068 which cradles the fill conduit 1060 upstream of the inlet orifice 1066 is also included. The standoff 1068 may aid in ensuring that the radius of any bend in the fill conduit 1060 as it enters the inlet orifice 1066 is greater than a value which could lead to kinking of the fill conduit 1060. In certain embodiments, the terminal end of the fill conduit 1060 which connects to the fluid circuit 710 may include a quick connect fitting to facilitate establishment of a fluidic connection. In alternative embodiments, the inlet orifice 1066 may be included in side wall of the reel portion 1054 as opposed to a top face of the reel portion as shown. In other embodiments, the reel portion 1054 may include a quick connect or other fitting which an end of the fill conduit 1060 is in communication with. The reel portion 1054 may be docked on a cooperating fitting in communication to a source of fluid to place the fill conduit 1060 into communication with the source. In these alternative embodiments, the standoff 1068 may be omitted.

In the example embodiment, the organizer 1058 is also arranged to aid in preventing any kinking of the fill conduit 1060. As shown, the inlet orifice 1066 opens into the innermost portion of the track formed by the organizer 1058. The inner most portion of the track has a radius which may not cause kinking of the fill conduit 1060 within the reel portion 1054. The fill conduit 1060 may be wrapped once around the inner track 1070A, then pass through a break 1072 in the organizer 1058 wall to an intermediate track 1070B. The fill conduit 1060 may be wrapped once around the intermediate track and then pass through a break 1072 in the organizer 1058 wall to and outermost track 1070C. In alternative embodiments where the reel portion 1054 has a larger capacity there may be at least one additional intermediate track 1070B. The fill conduit 1060 may be wrapped along the outermost track 1070C. The intermediate track or tracks 1070B may then be filled followed by the inner most track 1070A. This wrapping process may be repeated until the fill conduit 1060 is completely wrapped into the organizer 1058. This may encourage fill conduit 1060 to be dispensed in a manner which is unlikely to lead to snagging or kinking. Additionally, as shown, the organizer 1058 may include rounded or chamfered edges which may similarly limit opportunity for fill conduit 1060 to kink or snag.

Where the fill conduit 1060 does not come pre-primed, the fill conduit 1060 may be connected to the fluid circuit 710 and hot water may be delivered through the fill conduit 1060 to a drain or a priming reservoir (e.g. a bag or other container). The control system 15 may require that hot water flow through the fill conduit 1060 for a predefined period of time (which may be preset depending on the temperature of the hot water) before the control system 15 may allow the fluid packaging apparatus 900 to operate with a new conduit dispenser 1050. Once the time period has been met, the downstream end of the fill conduit 1060 may be sealed by a bag or tube sealer assembly 906 (described later in the specification). This may leave the fill conduit 1060 primed and disinfected prior to use.

Referring now to FIG. 163, an exploded view of an example fill conduit feed assembly 902 is shown. As shown, the fill conduit feed assembly 902 may include a motor 912. The motor 912 may drive a shaft 914 which may be keyed (in the example embodiment with a "D" shaped cross section). The shaft 914 may mate into an orifice in a first gear 916 or a feed roller 920 coupled thereto. The first gear 916 may interdigitate with a second gear 918. Each of the gears 916, 918 may be coupled to a respective feed roller 920. As the shaft 914 rotates, this rotation may be transferred to the first and second gear 916, 918 which in turn may cause rotation of the feed rollers 920. As shown, the gears 916, 918 and feed rollers 920 may be captured within a housing 922. The housing 922 may include a feed passage 924 through which the fill conduit 1060 may be displaced. As shown, the rollers 920 include a concave surface 926 which may contact the exterior surface of the fill conduit 1060. This may ensure that the feed rollers 920 do not collapse or obstruct the lumen of the fill conduit 1060 as the fill conduit 1060 is displaced through the fill conduit feed assembly 902. The feed rollers 920 or the concave surface of the feed rollers 920 may be constructed of an elastomer or other material with a high friction coefficient so as to facilitate feed of the fill conduit 1060 as the feed rollers 920 are rotated.

Referring again primarily to FIGS. 159 and 160, in the example embodiment a grasper 418 is depicted and may be attached to a robotic arm 360 which may transport bags 26 to and from the fluid packaging apparatus 900. In some embodiments, the grasper 418 may remain at the fluid packaging apparatus 900 during filling and may hold the bag 26 in place. The bag 26 may be introduced to the fluid packaging apparatus 900 pre-sterilized. The port 392 of the bag 26 which is to be used for filling may be provided in a sealed state. Thus, the interior volume of the port 392 and bag 26 may be kept out of communication with the surrounding environment. When the bag 26 is introduced to the fluid packaging apparatus 900, the port 392 to be used for filling may be fed into the tube retainer assembly 934 of the tubing manipulation assembly 904 through a base plate 911 (see FIG. 164) of the fluid packaging apparatus 900. When both the port 392 and fill conduit 1060 are disposed in the tube retainer assembly 934, they may be substantially parallel to one another.

Referring now also to FIGS. 164-165, an example tubing manipulation assembly 904 and example base plate 911 are shown. As shown, a fill conduit feed guide 930 (best shown in FIG. 164) is included and may direct the fill conduit 1060 as the fill conduit 1060 is displaced into the tube retainer assembly 934. The fill conduit feed guide 930 may have a funnel like shape and may direct the fill conduit 1060 into a fill conduit retention trough 932 of the tube retainer assembly 934. Similarly, the base plate 911 may include a port guide 936 which may aid in directing the port 392 of the bag 26 into a port retention trough 938 of the tube retainer assembly 934. The fluid packaging apparatus 900 may include tubing sensors 933, 935 which may sense whether tubing is present in the fill conduit retention trough 932 and port retention trough 938. The tubing sensors 933, 935 may be optical sensors such as reflectivity based sensors which may monitor the fill conduit retention trough 932 and port retention trough 938 via windows 937 extending into each of the fill conduit retention trough 932 and port retention trough 938. The control system 15 may monitor the output of the tubing sensors 933, 935 and may use data from the tubing sensors 933, 935 as feedback for the fill conduit feed assembly 902 and grasper 418.

As shown, the tube retention assembly 934 may include a first portion 940A and a second portion 940B. The first and second portion 940A, B may be separated by a gap. The first portion 940A of the tube retention assembly 934 may be displaceable relative to the second portion 940B which in the example embodiment is fixed to the base plate 911. As shown, the first portion 940A is attached to a sled body 942 which may translationally displace along a set of guide rods 946 via a motor 944. The sled body 942 may also be coupled to a pivot body 943. The pivot body 943 may be pivotally coupled to a guide rod 945 allowing for rotation of the tubing manipulation assembly 904 and attached first portion 940A of the tube retention assembly 934 about the axis of the guide rod 945.

Additionally, as best shown in FIG. 165, the fill conduit retention trough 932 and the port retention trough 938 may each include enlarged regions 948 on each side of the gap between the first and second portion 940A, B of the tube retention assembly 934. These enlarged regions 948 may accommodate the shape change of the fill conduit 1060 and port 392 when the fill conduit 1060 and port 392 are flattened by an occluder assembly 908.

Referring now also to FIGS. 166-168, an exemplary occluder assembly 908 is depicted. The occluder assembly 908 may include a motor 952 which may displace a carriage 953 to which an occluder 950 is coupled toward and away from the tube retainer assembly 934. This may cause the fill conduit 1060 and the port 392 to be flattened against the walls of their respective fill conduit retention trough 932 and port retention trough 938. This may drive fluid out of the port 392 and fill conduit 1060 at least along a portion of the both the port 392 and the fill conduit 1060 that is located in the tube retainer assembly 934. As shown, the occluder 950 may include a first portion 956A and a second portion 956B. The first and second portion 956A, B may be separated from one another by a gap. The gap between the first and second portion 956A, B of the occluder 950 may be about the same width as the gap between the first and second portion 940A, B of the tube retainer assembly 934. The gap may also be disposed along the same plane as that of the tube retainer assembly 934. Each of the first and second portion 956A, B of the occluder 950 may include a set of occluder members 958. The occluder members 958 of each set of occluder members 958 may be spaced apart from one another a distance equal to the spacing between the fill conduit retention trough 932 and the port retention trough 938 of the tube retention assembly 934. This may allow the occluder members 958 to pass into the fill conduit retention trough 932 and the port retention trough 938 when the occluder 950 is advanced by the motor 952.

As shown, the second portion 956A of the occluder 950 is mounted on a rail 960. This may allow the second portion 956B of the occluder 950 to displace along with the first portion 940A of the tube retention assembly 934 as the sled body 942 of the tubing manipulation assembly 904 (see, e.g., FIG. 165) is moved. The rail 960 is included on a boom 962 which may be pivotally coupled to the guide rod 945 (see, e.g., FIG. 164). This may allow the second portion 956B of the occluder 950 to rotationally displace in tandem with the tube manipulation assembly 904. The guide rod 945 may also direct movement of the occluder assembly 908 as the motor 952 displaces the carriage 953 and attached occluder 950 toward and away from the tube retention assembly 934.

As shown, the first and second portion 956A, B of the occluder 950 may also include tie pins 964. The tie pins 964 may extend through the first and second portion 940A, B of the tube retention assembly 934 into the first and second portion 956A, B of the occluder 950. The tie pins 964 may help to couple motion of first and second portion 956A, B of the occluder 950 to motion of the first and second portions 940A, B of the tube retention assembly 934.

The second portion 956B of the occluder 950 may be coupled to the carriage 953 via a fastener 961. Specifically, the fastener 961 may extend through an elongate slot in the boom 962 and into a receiving hole in the carriage 953. As best shown in FIG. 168, the second portion 956B of the occluder 950 may also be coupled to the carriage 953 via a bias member 957. In the example embodiment, the bias member 957 is depicted as an extension spring, though any suitable bias member 957 may be used. The bias member 957 may exert a force which urges the second portion 956B of the occluder 950 to rotate about the guide rod 945 (see, e.g., FIG. 165) toward the first portion 956A of the occluder 950. The bias member 957 is further described in relation to FIG. 171. The elongate slot in the boom 962 may provide sufficient clearance for the fastener 961 to allow for this rotation to occur. Additionally, the carriage 953 may include rolling element bearings 959 which extend proud of the face of the carriage 953 adjacent the boom 962. The rolling element bearings 959 may allow the boom 962 to pivot without binding up against the carriage 952.

Referring now to FIG. 169, a cutter assembly 910 may be included in the fluid packaging apparatus 900. The cutter assembly 910 may be actuated by a cutter motor 970 which may drive a heated blade 972. The heated blade 972 may be disposed in a blade retainer 974 which may include a chamber in which a heater 976 is disposed. The example heater 976 is shown as a cartridge heater. The blade retainer 974 may also include a mount 978 for a temperature sensor 980 which may provide data to a control system 15 which governs operation of the heater 976. In certain embodiments, the heated blade 972 may be constructed of a metallic material which may be coated. In certain embodiments, a ceramic coating may be applied to the metallic material. The ceramic coating may be a cerakote in certain embodiments available from Cerakote of 7050 6th Street White City, Oregon. In alternative embodiments a synergistic surface enhancement coating such as NASA material #20386 MSFC Handbook 527F (NEDOX SF-2), Johnson Space Flight Center #D9604F may be used. Such coatings may allow the heated blade 972 to be repeatedly reused during operation of the fluid packaging apparatus 900.

As shown, the blade retainer 974 may be mounted on an arm 975 of the cutter assembly 910 which may couple onto the guide rod 945 to aid in directing the actuation movement of the cutter assembly 910. Thus, the guide rod 945 may provide a single axis which the cutter assembly 910, occluder assembly 908, tubing manipulation assembly 904 are all constrained to. By placing each of these assemblies on a single axis, the fluid packaging apparatus 900 may be made in a compact fashion.

Referring now also to FIG. 170, the cutter motor 970 may actuate the heated blade 972 into the gap extending through the tube retainer assembly 934 and occluder 950. This may be done while the occluder assembly 908 is actuated to flatten the fill conduit 1060 and port 392 within the fill conduit retention trough 932 and the port retention trough 938 of the tube retention assembly 934. The heated blade 972 may cut through the port 392 and fill conduit 1060 as the heated blade 972 is displaced into the gap. This may sever the terminal ends of the port 392 and fill conduit 1060 from the remaining portions of port 392 and fill conduit. Since the fill conduit 1060 and port 392 are flattened, substantially no liquid (e.g. water or saline) may be present in the lumens of these tubes. This may ensure that the liquid does not behave as a heat sync or boil due to the heat of the heated blade 972. Thus, flattening of the fill conduit 1060 and port 392 may simplify cutting and welding of the fill conduit and port 392.

Still referring to FIG. 170, as the heated blade 972 cuts through the port 392 and fill conduit 1060, the material of the port 392 and fill conduit 1060 may melt against the faces of the blade such that a seal is formed and maintained against the face of the heated blade 972 during the cutting action. This may prevent the interior lumens of the fill conduit 1060 and the port 392 from being exposed to the surrounding environment as they are cut. With the cutting assembly 910 held in the actuated position, a first portion 940A of the tube retainer assembly 934 may be displaced relative to a second portion 940B of the tube retainer assembly 934 until the remaining portions of the port 392 and the fill conduit 1060 are aligned or coaxial with one another. As mentioned elsewhere, the second portion 956B of the occluder 950 may be disposed on a rail 960 and may be coupled to the first portion 940A of the tube retention assembly 934. Thus, the second portion 956B of the occluder 950 may displace in tandem with the first portion 940A of the tube retention assembly 934. This may ensure that the fill conduit 1060 remains in a flattened and occluded state during displacement of the first portion 940A of the tube retention assembly 934. The first portion 940A of the tube retainer assembly 934 may be on a first side of the heated blade 972 while the second portion 940B may be on an opposing side of the heated blade 972. The interior lumens of the remaining portions of the port 392 and the fill conduit 1060 may remain in sealing contact with and slide along opposing faces of the heated blade 972 during this displacement. Thus, the interior lumens of the remaining portion of the port 392 and fill conduit 1060 may be maintained out of communication with the surrounding environment as they are brought into alignment with one another.

Referring now primarily to FIG. 171, in certain embodiments, as the heated blade 972 is withdrawn, the filling conduit 1060 and port 392 may be joined to one another such that a continuous lumen extending from the fill conduit 1060 to the interior of the bag 26 through the port 392 is formed. As the withdrawal occurs, the remaining portions of the port 392 and fill conduit 1060 may be pressed against one another such that a junction is formed and their interiors are kept isolated from the surrounding environment. As shown, the cutter assembly 910 may include a carriage portion 982 in which a cam surface 984 is provided. The tubing manipulation assembly 904 may include a cam follower 986. The cam follower 986 may be held in place against the cam surface 984 via force exerted by the bias member 957 of the occluder assembly 908 (see, e.g. FIG. 168). This force may be transferred through the tie pin 964 coupling the second portion 956B of the occluder 950 to the first portion 940A of the tube retention assembly 934 (see, FIG. 167). When the heated blade 972 of the cutter assembly 910 is actuated into the tube retention assembly 934 the cam follower 986 may be positioned against a raised portion 985A of the cam surface 984 as depicted in FIG. 171. In this position, the gap between the first and second portion 940A, B of the tube retention assembly 934 and the gap between the first and second portion 956A, B of the occluder 950 may be present.

In certain embodiments, a counterweight may be included on the tubing manipulation assembly 904. The counterweight may extend from the tubing manipulation assembly 904 past the cam surface 984. Thus, the counterweight may provide additional force that may aid in holding the cam follower 986 against the cam surface 984. In some embodiments, a counterweight may be used in place of the bias member 957. In certain embodiments, an additional bias member which couples the tubing manipulation assembly 904 to the base plate 911 may be included. This additional bias member may provide additional force which may aid in holding the cam follower 986 against the cam surface 984. In some embodiments, a bias member coupling the tubing manipulation assembly 904 may be used in place of the bias member 957 (with or without the above described counterweight).

As the heated blade 972 begins to be retracted out of the cut fill conduit 1060 and port 392, the cam follower 986 may transition to a sloped section 985B of the cam surface 984. The sloped section 985B of the cam surface 984 may lead to a recessed section 985C of the cam surface 984. Thus, as the cam follower 986 passes along the sloped section 985B of the cam surface 984, the force exerted by the bias member 957 (see FIG. 168) may cause the gaps to begin to close. Specifically, in the example embodiment, this force may cause the second portion 956B of the occluder 950 to pivot about the guide rod 945 and against the roller element bearings 959 toward the first portion 956A of the occluder 950 (see FIG. 168). In turn, this may pull on the tubing manipulation assembly 904 (see, e.g., FIG. 164) via the tie pin 964 connecting the first portion 940A of the tube retention assembly 934 to the second portion 956B of the occluder 950 (see FIG. 167). The pulling force may cause the tubing manipulation assembly 904 to rotate about the axis of the guide rod 945 (see, e.g. FIG. 164). As a result, the previously aligned remaining portions of the port 392 and the filling conduit 1060 may be driven toward one another via force originating from the bias member 957. The remaining portions of the filling conduit 1060 and port 392 may melt into each other and begin to form a junction as the heated blade 972 is retracted out of the way.

When the heated blade 972 is completely retracted out of the tube material, the cam follower 986 may transition to the recessed portion 985C of the cam surface 984. The force exerted by the bias member 957 may substantially close the gap and press the remaining portion of the port 392 and filling conduit 1060 against one another. This may allow the formation of the junction to complete. As the port 392 and filling conduit 1060 melt together as the heated blade 972 is removed, the interior of the tubing may be kept out of communication with the surrounding environment during the joining process.

In certain fluid packaging apparatus 900 embodiments, the lumen at the juncture between the fill conduit 1060 and port 392 may not always remain patent or entirely patent after the junction is formed. In such examples, one of first portion and second portion 940A, B of the tube retainer assembly 934 may be displaced relative to the other in order to break any seal which is obstructing the lumen. In the example embodiment described above, the sled 942 of the tubing manipulation assembly 904 may be driven back and forth over a predefined distance a number of times to exert stress on the bond closing off the lumen or portion of the lumen. This stress may disrupt the bond in the lumen without disrupting the integrity of the junction between the filling conduit and port 392. Fluid may then be delivered into the bag 26 to fill the bag 26.

The fill conduit feed assembly 902 may be positioned such that the feed passage 924 is aligned substantially in the center of the range of displacement of the displaced portion 940A, B of the tube retainer assembly 934. Thus, as the sled is driven back and forth to disrupt any potential bond within the lumen, the angle of fill conduit 1060 exiting the fill conduit feed assembly 902 is kept as small as possible. This may limit axial stresses exerted on the fill conduit 1060 during this displacement and may limit any force which may tend to pull apart the newly formed junction.

Referring now to FIG. 172 and FIG. 173, the tube sealer assembly 906 may then be actuated to seal and cut the port 392 in order to free the filled bag 26 from the fluid packaging apparatus 900. Again, this may be accomplished without exposing the interior of the port 392 lumen or bag 26 to the surrounding environment. Bag sealer assemblies 906 such as that described in relations to FIG. 172 and FIG. 173 may be included in other embodiments described herein. For example, a tube sealer assembly 906 may be included in the filling station 1110 described in relation to FIGS. 133-137. Such a tube sealer assembly 906 may be used to shorten the length of fill lines 1090 extending from the bags 26.

As shown, the example tube sealer assembly 906 of FIG. 172 and FIG. 173 may include a set of opposing jaws 990. The opposing jaws 990 may be displaced toward and away from each other via a motorized drive 992. In the example embodiment, the opposing jaws 990 may be coupled into a track 994 along which the jaws 990 may be displaced. When a port 392 of a bag 26 is ready to be sealed, the opposing jaws 990 may be driven toward one another so as to pinch the port 392 between sealing plates 998 of each jaw 990. This may drive fluid out of the lumen at the pinched region of the port 392.

A heater 996 such as a cartridge heater may be disposed in each of the opposing jaws 990. The heaters 996 may be powered so as to heat a sealing plates 998 to a temperature sufficient to melt the port material. As the port 392 is pinched, the walls of the lumen of the port 392 may be pressed against one another. As the material melts, the walls of the lumen of the port 392 may melt into one another sealing off the port 392. Each of the sealing plates 998 may include a mounting hole in which a temperature probe 999 may be disposed. Data from the temperature probes 999 may be utilized by the control system 15 to govern the heating of the sealing plates 998 via the heaters 996.

As shown, each of the jaws 990 may also include a cutter insert 1000. The cutter insert 1000 may include a raised peak 1004 which may extend through a slot 1002 in the sealing plate 998 with which it is associated. In the example embodiment, the peaks 1004 of each opposing jaw 990 are in the same plane as one another such that they may abut when the opposing jaws 990 are actuated closed by the motorized drive 992. The peaks 1004 may serve to cut the port 392 and free the filled bag 26 from the fluid packaging apparatus 900. Preferably, the cutter inserts 1000 may only cut through the port 392 after a robust seal has been created in the port 392 by the sealing plates 998. In some examples, the cutter insert 1000 may be constructed of a material with relatively low thermal conductivity. For instance, the cutter insert 1000 may be a plastic with a low thermal conductivity and high resistance to thermal degradation such as a plastic from the Polyaryletherketone (PAEK) family like Polyether ether ketone (PEEK). Other suitable materials may be used in alternative embodiments. Using a material which is a poor conductor of heat to construct the cutter inserts 1000 may be desirable as it may ensure that the port 392 reaches a suitable temperature to form a robust seal before the port 392 is severed. The heat from the sealing plates 998 may heat the port 392 until the port 392 material becomes sufficiently molten that the pressure exerted by the peaks 1004 is able to press through and cut the port 392. As shown, the peaks 1004 are blunt and rounded so as to limit concentration of pressure at any one point along the port 392 further helping to ensure that a robust seal is generated prior to severing of the bag 26.

With the bag 26 freed, the fill conduit 1060 may be advanced such that the junction formed between the fill conduit 1060 and the port 392 is located at the tube sealer assembly 906. The tube sealer assembly 906 may again be actuated to form a seal in the fill conduit 1060 upstream of the junction and sever the juncture from the fill conduit 1060. The fill conduit feed assembly 902 may then retract the fill conduit 1060 such that the sealed end of the fill conduit 1060 is disposed in the fill conduit retention trough 932 of the tube retainer assembly 934. The next bag 26 may be loaded into the fluid packaging apparatus 900 and the process may be repeated as desired.

It should be noted that the motors 944, 952, 970, 992 of the fluid packaging apparatus 900 may, in certain embodiments, be replaced with pneumatic or hydraulic actuators. In such embodiments, a compressor and accumulator may be provided to facilitate actuation. Alternatively, a consumable cartridge of pressurized gas may be installed in the fluid packaging apparatus 900 and plumbed via a manifold to each of the actuators. Where motors 944, 952, 970, 992 are used, each of the motors included in the fluid packaging apparatus 900 may be outfitted with an encoder which may provide feedback on displacement.

Referring now to FIGS. 174 and 175, in certain embodiments, a bag sealing assembly 906 may be used to isolate a sample of fluid within the port 392 of the bag 26. In such embodiments, a cutter insert 1000 may not be included in each of the sealing plates 998. The bag sealing assembly 906 may be included in various embodiments of the system 10 which may not necessarily include a fluid packaging apparatus 900. A bag sealing assembly 906 may for example be included in the systems 10 depicted in FIG. 54, FIG. 56, and FIG. 111. This may allow for a system 10 to be constructed without a quarantine repository 362 (see, e.g. FIG. 56) within the enclosure 12 of that system 10. Bags 26 may be filled and an aliquot of fluid for later sampling may be isolated within a segment of the port 392 through which the bag 26 is filled. The port 392 of the bag 26 may be sealed at a first location 1140 which is proximal to the interior volume of the bag 26. As above, when the seal is generated, the walls of the lumen on the interior of the port 392 may melt into one another closing off the flow path through the port 392. As shown in FIG. 174, the port 392 of the bag 26 may also be sealed at a second location 1142 which is upstream of the first location 1140. In certain examples, the seal at the first location 1140 may be generated before the seal at the second location 1142. The distance between the first location 1140 and second location 1142 may be selected based on the lumen diameter of port 392 and the desired sample volume.

Once the bag 26 has been filled and a sample has been isolated within the port 392, the bag 26 may be released from the system 10. A user may use a sampling instrument to access to the sample for testing. For example, the user may puncture the port 392 between the first and second locations with a syringe or similar implement and extract fluid from the sample volume. Testing (e.g. pyrogen testing) may be conducted on fluid from the sample. The port 392 may then be cut at the first location 1140 and the portion of the port 392 including the sample volume and seal at the second location 1142 may be discarded.

Various alternatives and modifications can be devised by those skilled in the art without departing from the disclosure. Accordingly, the present disclosure is intended to embrace all such alternatives, modifications and variances. Additionally, while several embodiments of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. And, those skilled in the art will envision other modifications within the scope and spirit of the claims appended hereto. Other elements, steps, methods and techniques that are insubstantially different from those described above and/or in the appended claims are also intended to be within the scope of the disclosure.

The embodiments shown in drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

What is claimed is:

1. A system for producing and packaging medical fluid proximate a point of use comprising:

a source input;

at least one treatment apparatus for producing water conforming to a predefined standard from fluid received from the source input;

a mixing circuit in communication with an output of the at least one treatment apparatus and including a source of concentrate, the mixing circuit having at least one flow controller configured to adjust flow of fluid through the mixing circuit so as to generate a fluid of a predefined composition;

a reservoir feeder having a supply of reservoirs to be filled, the reservoir feeder configured to feed reservoirs of the supply of reservoirs through the reservoir feeder to an output of the reservoir feeder;

a fluid dispensing station coupled to the mixing circuit, the fluid dispensing station including a reservoir dimension sensing assembly and a filling output for dispensing the fluid of the predefined composition;

a drain coupled to a conduit, the drain displaceable from a stowed location to a receiving position, fluid dispensed from the filling output being dispensed into the drain when the drain is in the receiving position;

a closure station; and a reservoir labeler assembly.

2. The system of claim 1, wherein the at least one treatment apparatus comprises at least one of a reverse osmosis unit, a plurality of charcoal filters, and an ultrafilter.

3. The system of claim 1, wherein the source of concentrate is a reservoir of solid concentrate having an inlet in fluid communication with the output of the at least one treatment apparatus and a fluid concentrate outlet.

4. The system of claim 1, wherein the system further comprises an enclosure having at least one gloved interface.

5. The system of claim 1, wherein the closure station comprises a ram and a stopper dispenser, the closure station further comprising a stopper guide and a portion configured to receive a reservoir port.

6. The system of claim 1, wherein the system further comprises a pyrogen tester.

7. The system of claim 1, wherein the system further comprises a robotic assembly including a gripper.

8. The system of claim 7, wherein the system further comprises a control system configured to displace at least a portion of the robotic assembly and actuate the gripper to collect a reservoir from the supply of reservoirs, displace the reservoir to the fluid dispensing station, determine the fill capacity of the reservoir via data from the reservoir dimension sensing assembly, command filling of the reservoir with a volume of fluid no greater than the fill capacity of the reservoir, displace the reservoir to the closure station, and command closure of the reservoir.

9. The system of claim 1, wherein the reservoir dimension sensing assembly comprises a set of reservoir characteristic sensors and the system further comprises a control system configured to analyze data received from the reservoir dimension sensing assembly and configured to determine the fill capacity of a reservoir in place at the fluid dispensing station.

10. The system of claim 9, wherein the control system is configured to govern operation of the at least one flow controller to deliver a volume of a concentrate fluid containing concentrate from the source of concentrate to the reservoir in place at the fluid dispensing station and a subsequent volume of water conforming to the predefined standard to the reservoir in place at the fluid dispensing station to achieve a fill volume selected based on the fill capacity.

11. The system of claim 1, wherein the source input is configured to couple to a drinking water supply.

12. The system of claim 1, wherein the predefined standard is a pharmacopeia standard.

13. The system of claim 1, wherein the system further comprises a sensor suite including a total organic carbon sensor, a bioburden sensor, a particulate monitor, a plurality of ultrapure water conductivity sensors, and a concentrate conductivity sensor.

14. A system for production and packaging of medical fluid comprising:

a source water input;

a water treatment assembly configured to generate water meeting a predefined quality specification using water received via the source water input;

a mixing circuit coupled to an output of the water treatment assembly and including a source of concentrate, the mixing circuit having at least one flow controller configured to adjust flow of fluid through the mixing circuit so as to generate a fluid of a predefined composition;

a reservoir dispenser configured to accept a plurality of reservoirs;

a filling station including an outlet in fluid communication with the mixing circuit and having an unfilled reservoir physical characteristic sensor;

an undesired fluid receptacle coupled to a conduit and displaceable from a stowed location to a receiving position, fluid from the outlet being dispensed into the undesired fluid receptacle when the undesired fluid receptacle is in the receiving position; and a reservoir labeler.

15. The system of claim 14, wherein the water treatment assembly further comprises at least one of a reverse osmosis unit, a set of charcoal filters, an electrodeionization unit, and an ultrafilter.

16. The system of claim 14, wherein the source of concentrate is a reservoir of crystalline concentrate having an inlet and a fluid concentrate outlet.

17. The system of claim 14, wherein the system further comprises an enclosure with an antechamber and a packaging compartment separated by a partition including at least one door from the antechamber to the packaging compartment.

18. The system of claim 14, wherein the system further comprises a robotic arm including a gripper.

19. The system of claim 18, wherein the system further comprises a control system configured to actuate the robotic arm and actuate the gripper to collect a reservoir of the plurality of reservoirs, displace the reservoir to the filling station, command filling of the reservoir, displace the reservoir to the reservoir labeler, and the control system is configured to orchestrate application of a label to the reservoir via commands to the labeler and robotic arm.

20. The system of claim 14, wherein the unfilled reservoir physical characteristic sensor assembly comprises a set of reservoir characteristic sensors and the system further comprises a control system configured to analyze data received from the unfilled reservoir physical characteristic sensor assembly and configured to determine a capacity of a reservoir in place at the filling station based on the data.

21. The system of claim 20, wherein the control system is configured to govern operation of the at least one flow controller based on the capacity.

22. The system of claim 14, wherein the water treatment assembly further comprises a sensor suite including a total organic carbon sensor, a bioburden sensor, a particulate monitor, and a plurality of ultrapure water conductivity sensors.

23. The system of claim 14, wherein the source water input is configured to couple to a municipal water supply.

24. A system for producing and packaging fluid comprising:

a source water input;

a water treatment assembly including a plurality of water production devices;

a mixing circuit coupled to a product output of the water treatment assembly and a source of concentrate, the mixing circuit having at least one flow controller configured to generate a fluid of a predefined composition;

an enclosure having a plurality of compartments;

a reservoir feed assembly having a reservoir magazine;

a fluid dispensing station receiving the fluid of the predefined composition from the mixing circuit;

an undesired flow disposal assembly including a drain inlet and a conduit, the drain inlet displaceable from a stowed location to a receiving position, fluid from the fluid dispensing station being dispensed into the drain inlet when the drain inlet is in the receiving position;

a set of reservoir physical parameter sensors; and a reservoir labeler.

25. The system of claim 24, wherein the water production devices include at least one endotoxin removal filter, a water distillation device, and a set of redundant charcoal filters.

26. The system of claim 24, wherein the source of concentrate is a reservoir of a crystalline salt concentrate.

27. The system of claim 24, wherein there is at least one door between a first compartment of the plurality of compartments and a second compartment of the plurality of compartments.

28. The system of claim 24, wherein the system further comprises a robotic arm including a gripper, the gripper configured to displace the inlet between the receiving position and the stowed position.

29. The system of claim 24, wherein the system further comprises a robotic manipulator and a control system configured to displace the robotic manipulator to collect a reservoir from the reservoir feed assembly, displace the reservoir to the fluid dispensing station, determine a potential fill capacity of the reservoir via data from the set of reservoir physical parameter sensors, command filling of the reservoir with a volume of fluid no greater than the potential fill capacity, displace the reservoir to a stoppering station, and orchestrate stoppering of the reservoir.

30. The system of claim 24, wherein the set of reservoir physical parameter sensors comprises at least a reservoir width sensor and a reservoir length sensor.

31. The system of claim 29, wherein the control system is configured to govern operation of the at least one flow controller to, via the fluid dispensing station, deliver a volume of a concentrated fluid to the reservoir and a subsequent volume of product water from the water treatment assembly to achieve a fill volume selected based at least in part on the potential fill capacity.

32. The system of claim 24, wherein the system further comprises a sensor suite including a total organic carbon sensor, a bioburden sensor, a particulate monitor, a plurality of ultrapure water conductivity sensors, and a concentrate conductivity sensor.

33. The system of claim 24, wherein the at least one water production device includes a distillation device configured to generate product water in a disinfection temperature range and a reservoir filling temperature range.

* * * * *